United States Patent
Houston et al.

(10) Patent No.: US 12,374,978 B2
(45) Date of Patent: Jul. 29, 2025

(54) AERODYNAMIC ECCENTRIC ROTATING MASS ATTACHMENT FOR VIBRATION MOTOR

(71) Applicant: General Vibration Corporation, San Francisco, CA (US)

(72) Inventors: John Houston, San Francisco, CA (US); Nicholas G. Currier, San Jose, CA (US); Nikhil Bajaj, West Lafayette, IN (US); Rob Morris, Cincinnati, OH (US)

(73) Assignee: General Vibration Corporation, San Francisco, CA (US)

( * ) Notice: Subject to any disclaimer, the term of this patent is extended or adjusted under 35 U.S.C. 154(b) by 721 days.

(21) Appl. No.: 17/422,468

(22) PCT Filed: Jan. 22, 2020

(86) PCT No.: PCT/US2020/014610
§ 371 (c)(1),
(2) Date: Jul. 13, 2021

(87) PCT Pub. No.: WO2020/167430
PCT Pub. Date: Aug. 20, 2020

(65) Prior Publication Data
US 2022/0094253 A1    Mar. 24, 2022

Related U.S. Application Data

(60) Provisional application No. 62/796,485, filed on Jan. 24, 2019.

(51) Int. Cl.
*H02K 33/18* (2006.01)
*H02K 1/34* (2006.01)
*H02K 7/00* (2006.01)

(52) U.S. Cl.
CPC ............ *H02K 33/18* (2013.01); *H02K 1/34* (2013.01); *H02K 7/003* (2013.01)

(58) Field of Classification Search
CPC .......... H02K 7/003; H02K 1/34; H02K 7/061; H02K 33/18; B06B 1/161
(Continued)

(56) References Cited

U.S. PATENT DOCUMENTS

2002/0080112 A1   6/2002   Braun et al.
2006/0281550 A1   12/2006   Schena
(Continued)

OTHER PUBLICATIONS

International Search Report and Written Opinion for Application No. PCT/US2020/014610 dated Sep. 11, 2020.

*Primary Examiner* — Gabriel Agared
(74) *Attorney, Agent, or Firm* — Botos Churchill IP Law LLP

(57) ABSTRACT

The technology introduces a new type of attachment to the shaft of a vibration motor designed to have the dual properties of eccentricity and an aerodynamic shape. This aerodynamic shape is intended to enhance the performance of the ERM-based device, improve its capabilities, or both. In this disclosure the term "performance" means current draw, noise, or controllability of the aerodynamic vibration attachment. The aerodynamic vibration attachment may have additional properties such as an embedded or otherwise incorporated shape or target that facilitates the estimation or measurement of the aerodynamic vibration attachment's angular position, angular velocity, or both, by a sensor or sensors. Alternatively, the aerodynamic vibration attachment may have additional properties such as an embedded sensor or sensors, and facilitates the estimation or measurement of the aerodynamic vibration attachment's angular position, angular velocity, or both, compared to signals obtained from
(Continued)

external, non-rotating sensors, targets, markers or references.

21 Claims, 160 Drawing Sheets

(58) Field of Classification Search
USPC .......................................................... 318/114
See application file for complete search history.

(56) References Cited

U.S. PATENT DOCUMENTS

| | | |
|---|---|---|
| 2010/0253487 A1 | 10/2010 | Grant et al. |
| 2012/0232780 A1* | 9/2012 | Delson .................. A63F 13/285 340/407.1 |
| 2015/0081110 A1* | 3/2015 | Houston ................ G05D 19/02 700/280 |
| 2015/0253854 A1 | 9/2015 | Nakamura et al. |
| 2016/0144404 A1* | 5/2016 | Houston ................ H02K 33/00 318/114 |
| 2016/0258758 A1* | 9/2016 | Houston ................ G01D 5/145 |
| 2017/0021762 A1* | 1/2017 | Daman .................. B60K 35/10 |
| 2017/0291319 A1* | 10/2017 | Hendriks .............. B26B 21/443 |
| 2018/0004291 A1* | 1/2018 | Dauhajre ................ H04L 67/01 |

* cited by examiner

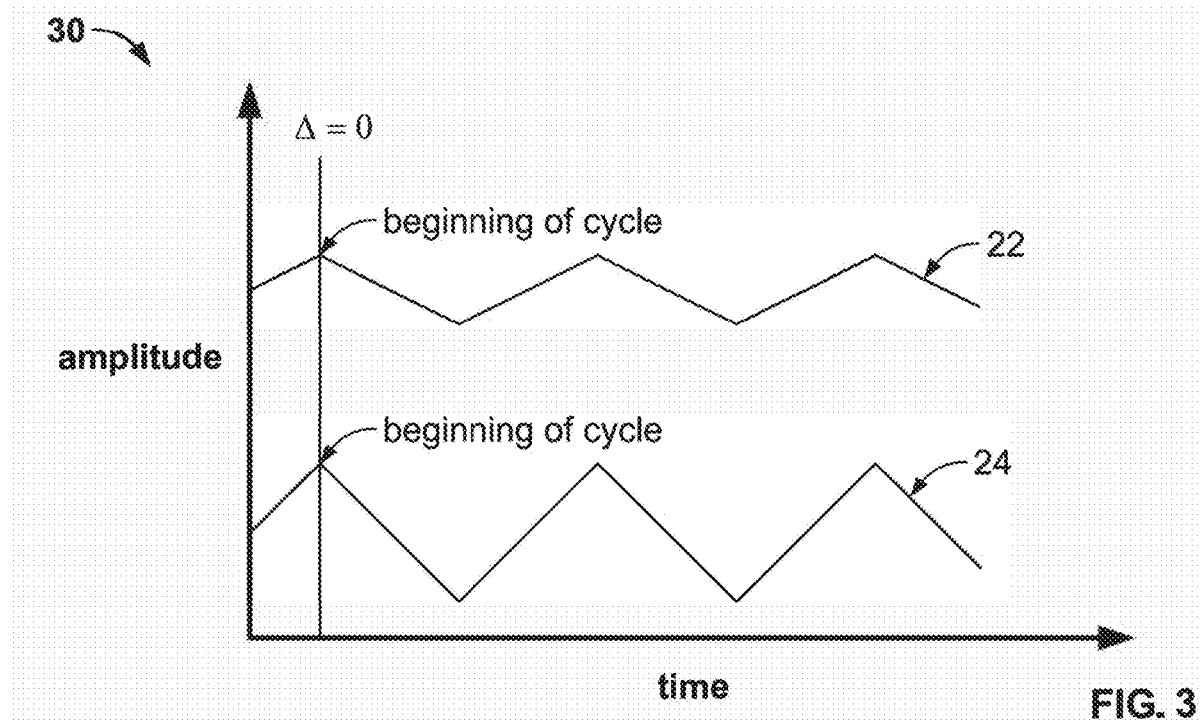
FIG. 3
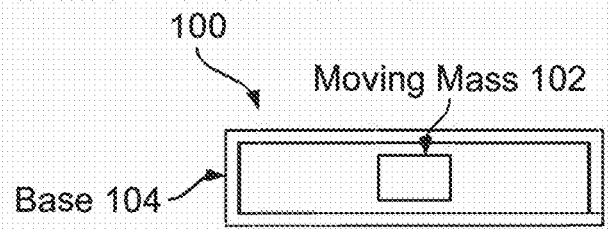
FIG. 4
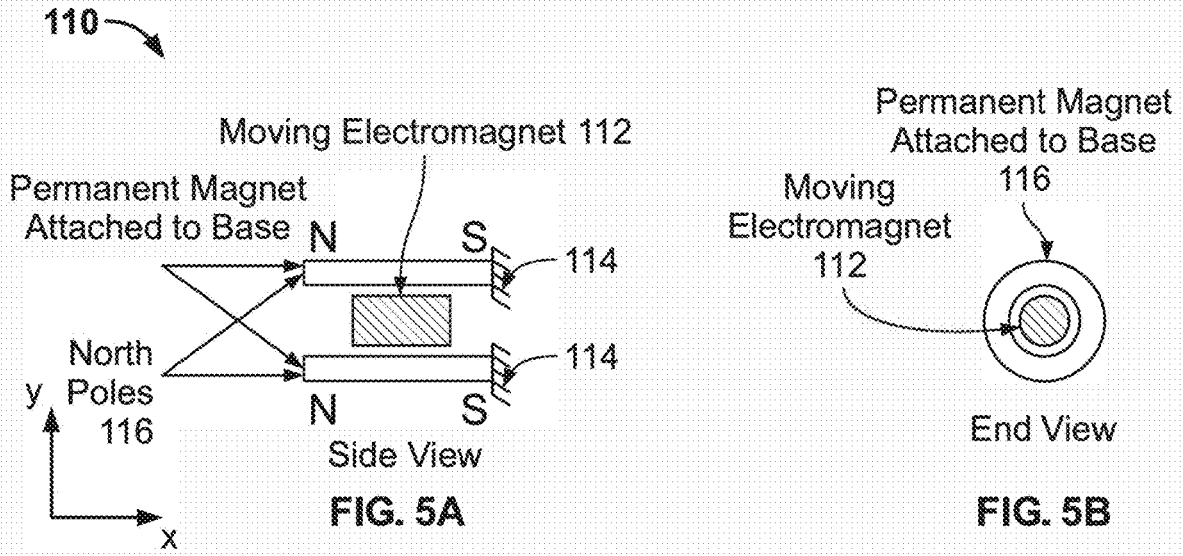
FIG. 5A
FIG. 5B

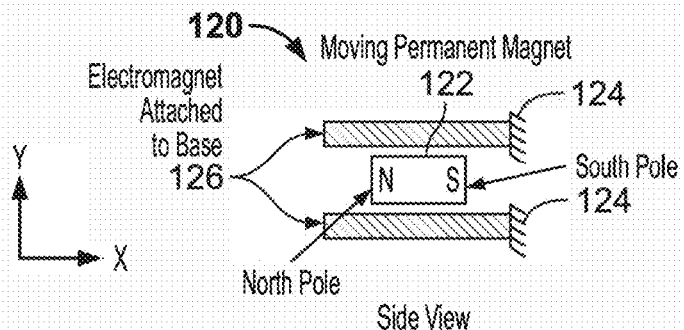
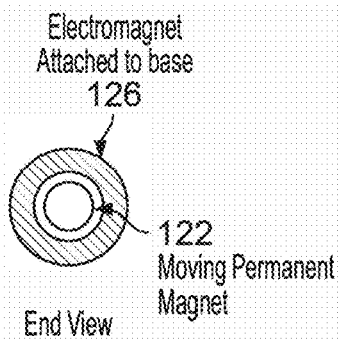
FIG. 6A  FIG. 6B
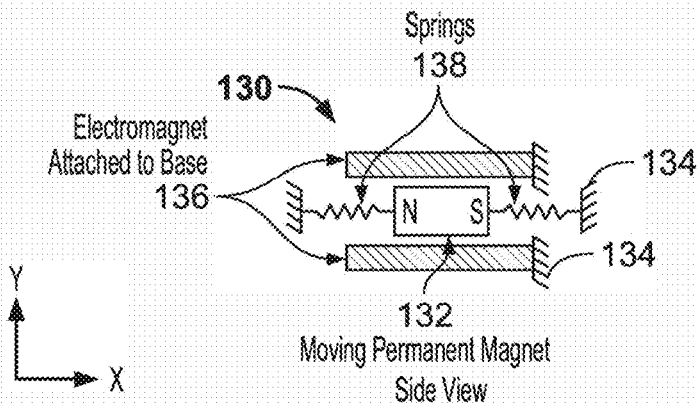
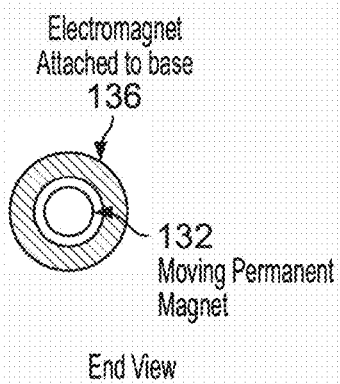
FIG. 7A  FIG. 7B
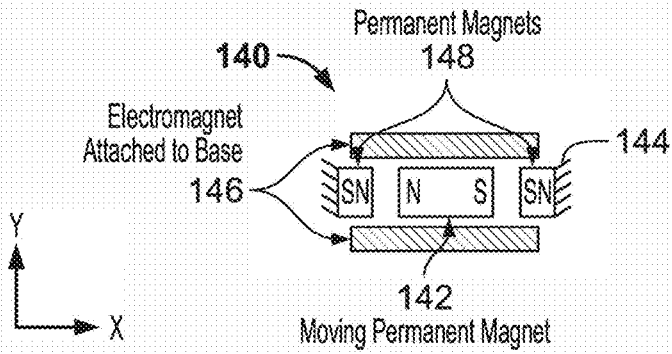
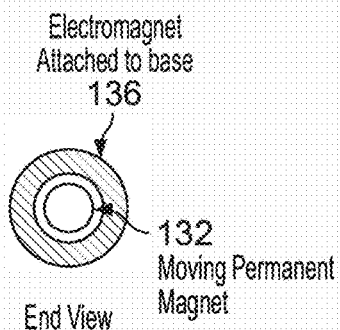
FIG. 8A  FIG. 8B
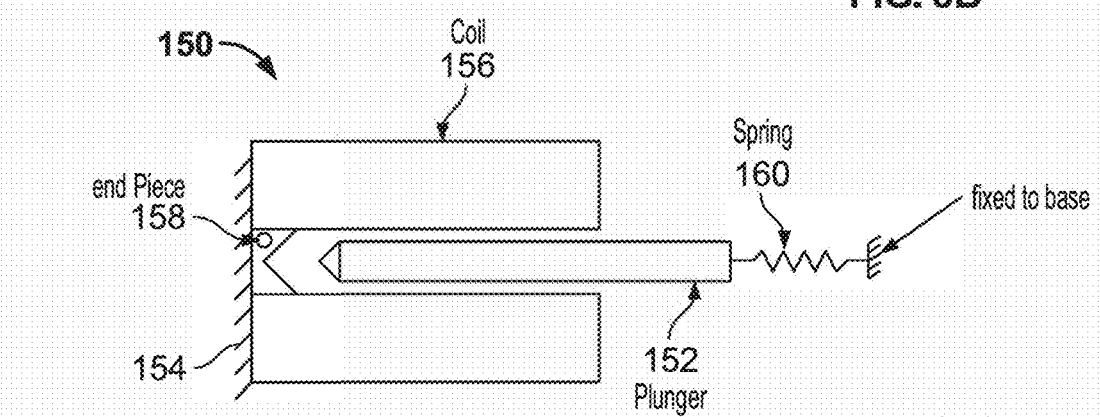
FIG. 9

Pivoted Counterclockwise Position

Pivoted Clockwise Position

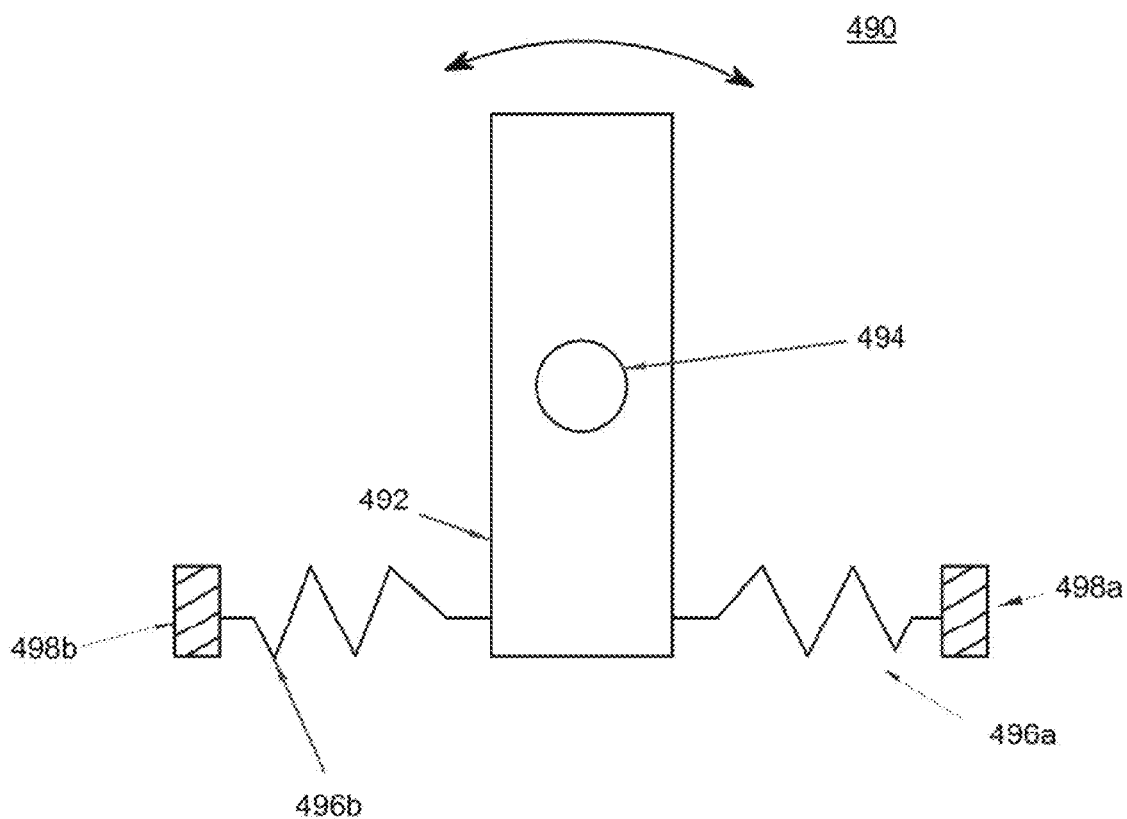

FIG. 63
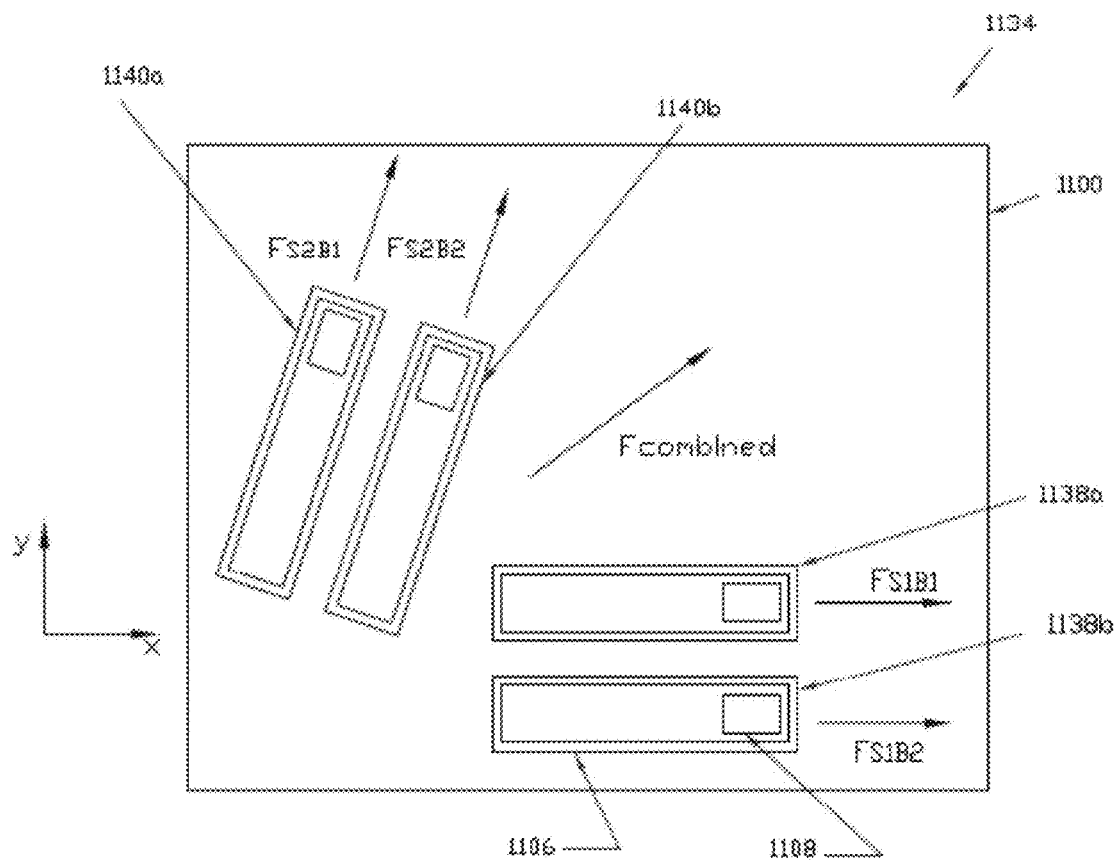
FIG. 64
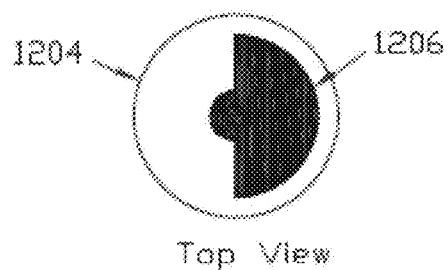
Top View
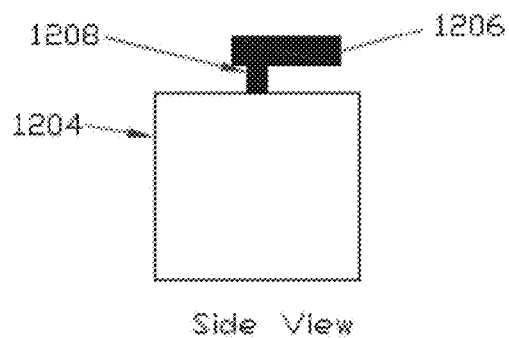
Side View

FIG. 69
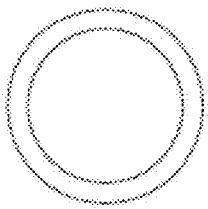
Top View
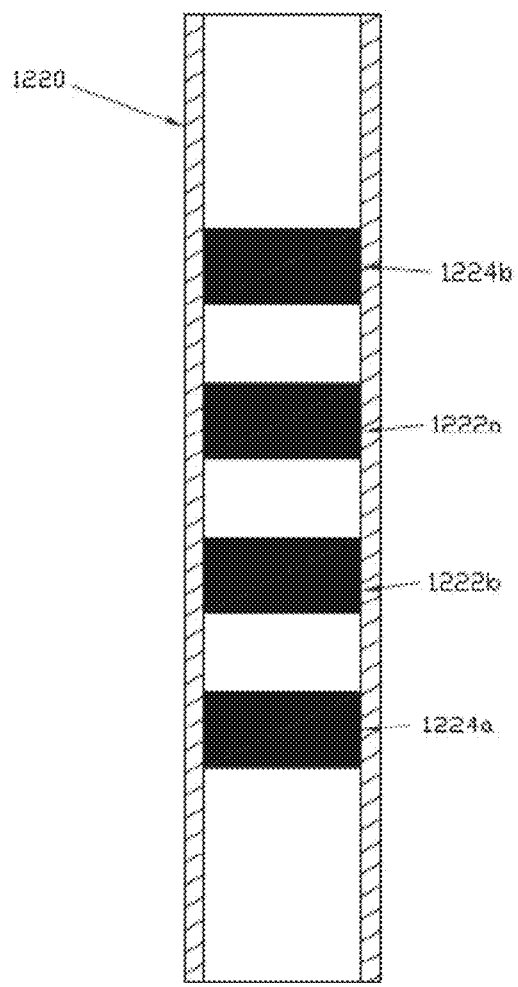
Cross Section Side View

SECTION A-A

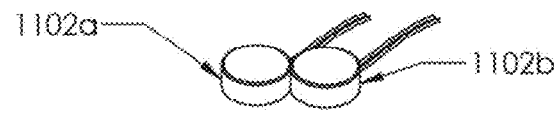
FIG. 92D
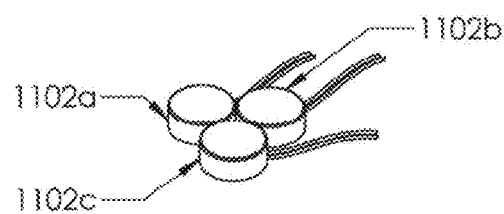
FIG. 92E
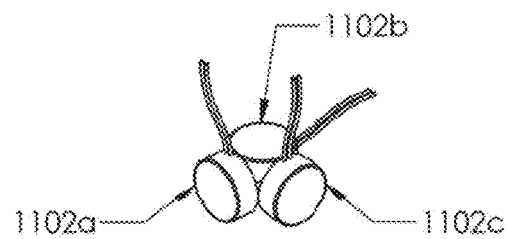
FIG. 92F
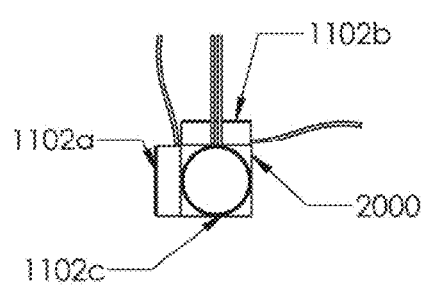
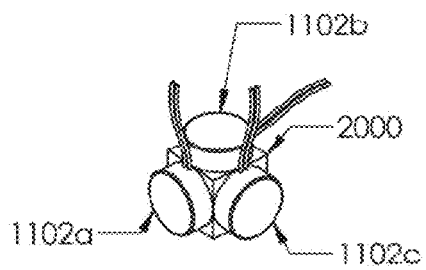
FIG. 92G

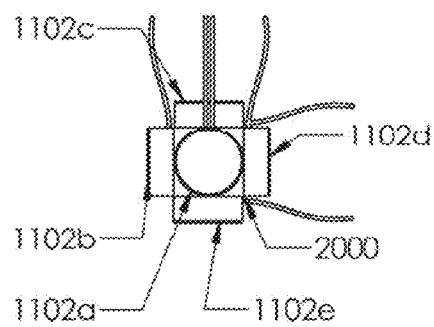
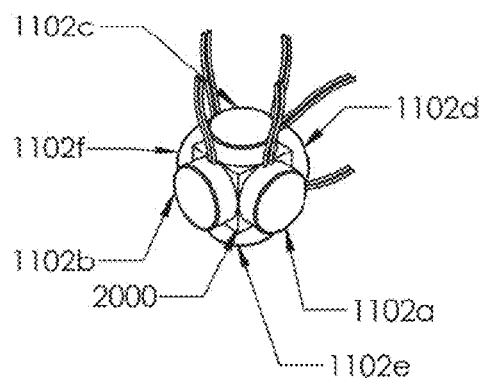
FIG. 92H
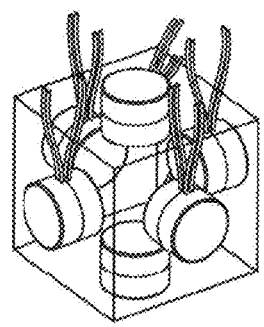
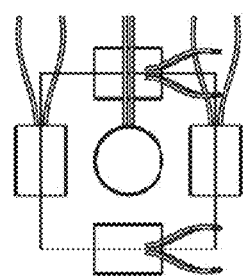
FIG. 92I
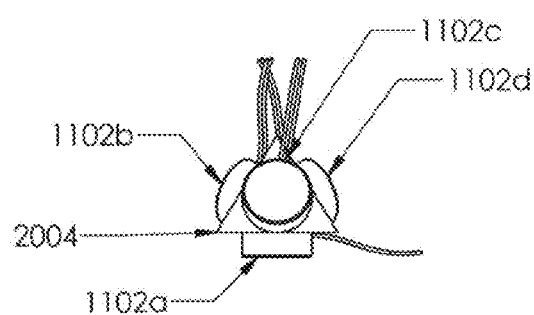
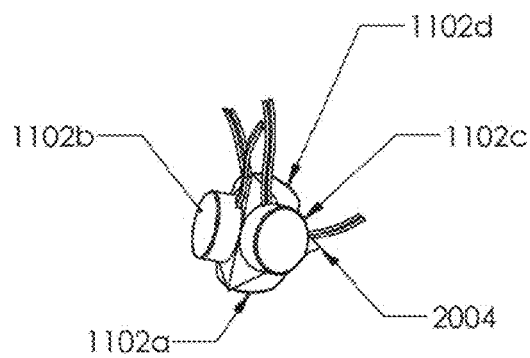
FIG. 92J Note: this figure is missing a box with four cells to contain the four sub-drawings.

Note: this figure is missing a box with four cells to contain the four sub-drawings.

Note: this figure is missing a box with four cells to contain the four sub-drawings.

Small phase angle: High force output

Large phase angle: Low force output

Example: D=0mm, W=100mm

Same or Similar Parts to COTS Mass Produced Motors

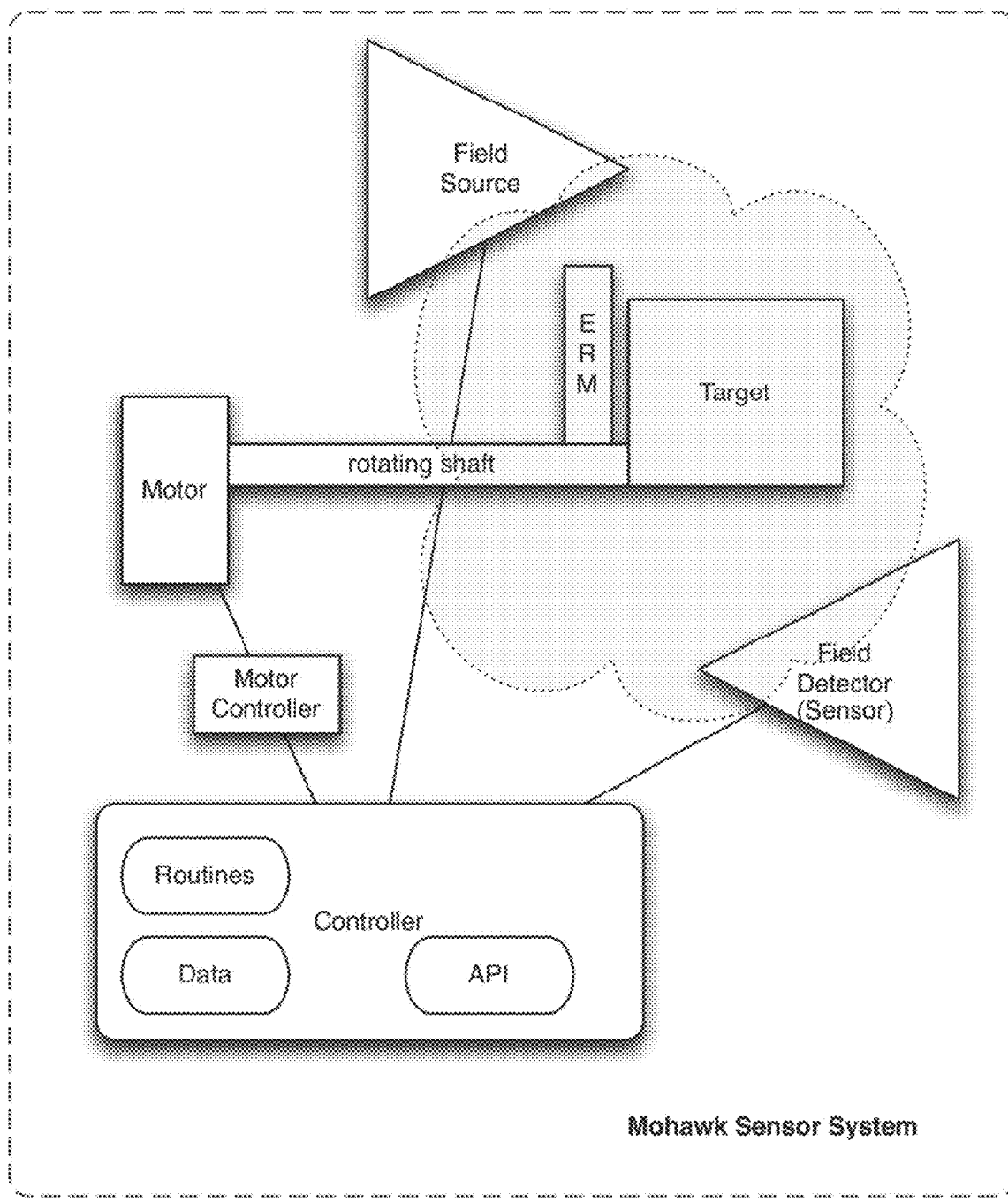
FIG 134 Mohawk Sensor System

FIG 135: TRADITIONAL ERM WITH SINGLE SENSOR + TARGET
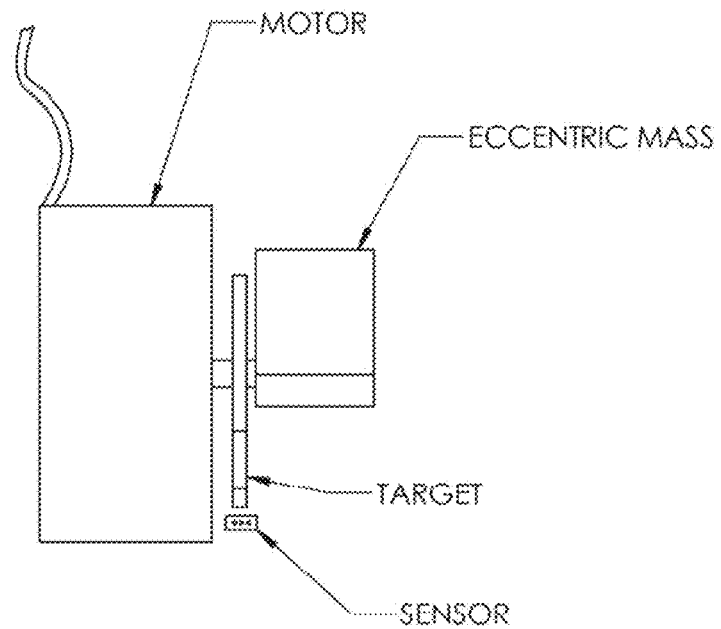
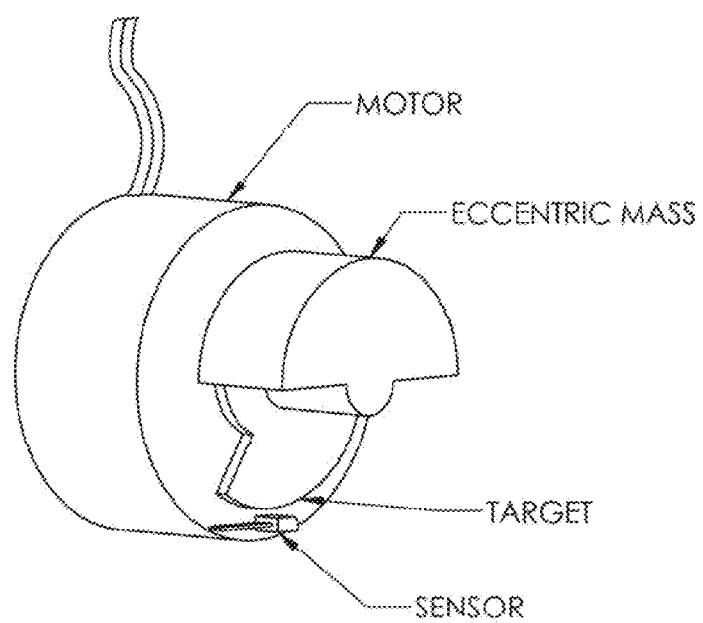

FIG 136 : EXAMPLE TARGETS
EXAMPLE TARGET
FOR ANALOG SENSOR
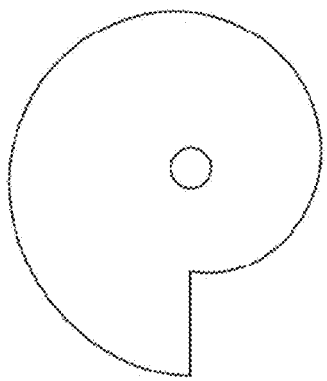
EXAMPLE TARGET
FOR DIGITAL SENSOR
NO ABSOLUTE REFERENCE
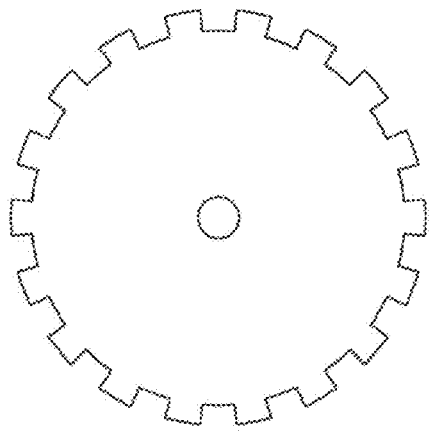
EXAMPLE TARGET
FOR DIGITAL SENSOR
WITH ABSOLUTE REFERENCE
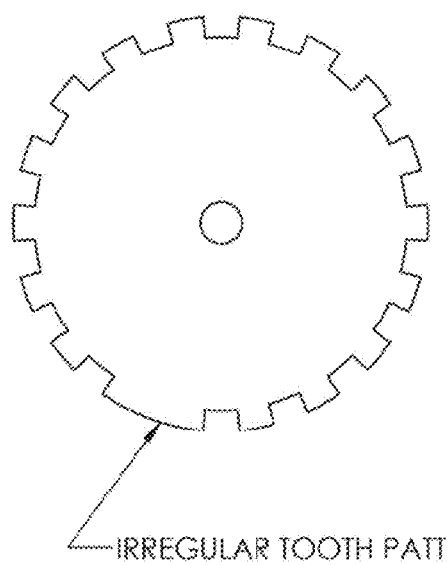
—IRREGULAR TOOTH PATTERN
EXAMPLE TARGET
FOR DIGITAL SENSOR
WITH ABSOLUTE REFERENCE
AND HOLLOW REGION
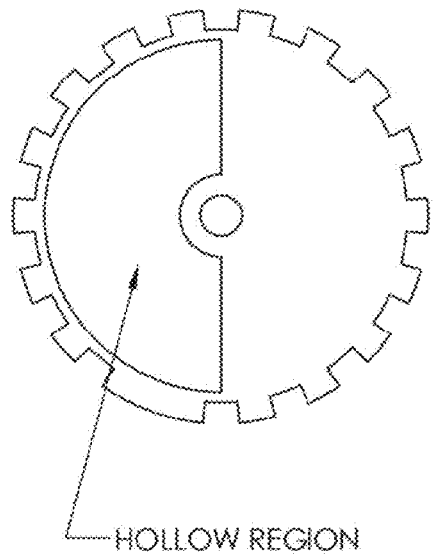
—HOLLOW REGION

FIG 137 : EXAMPLE SENSOR POSITION FOR SENSING IN RADIAL DIRECTION
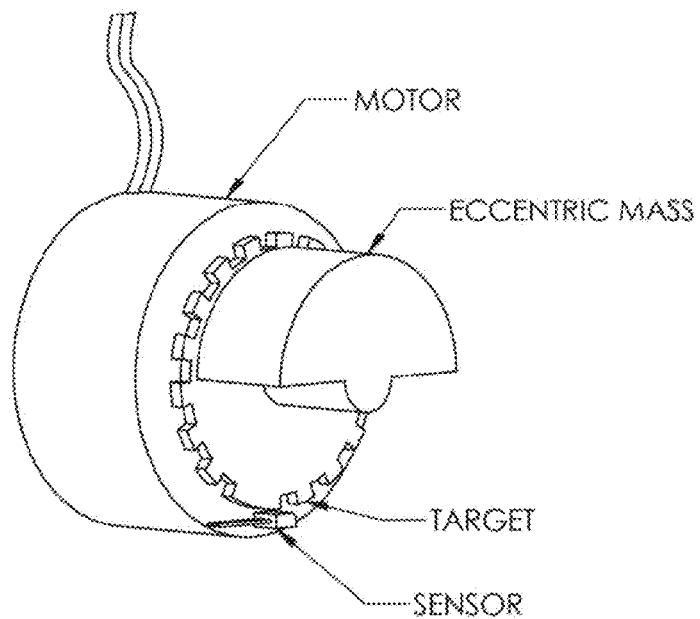
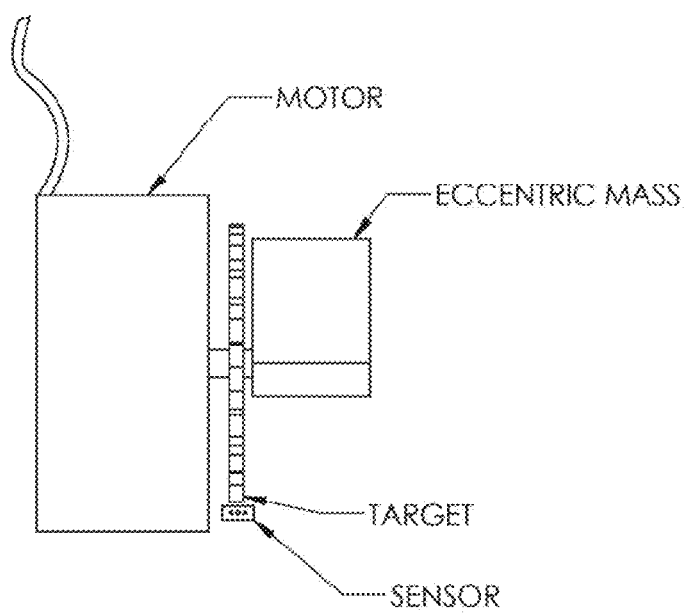

FIG 138 : EXAMPLE SENSOR POSITION FOR SENSING IN AXIAL DIRECTION
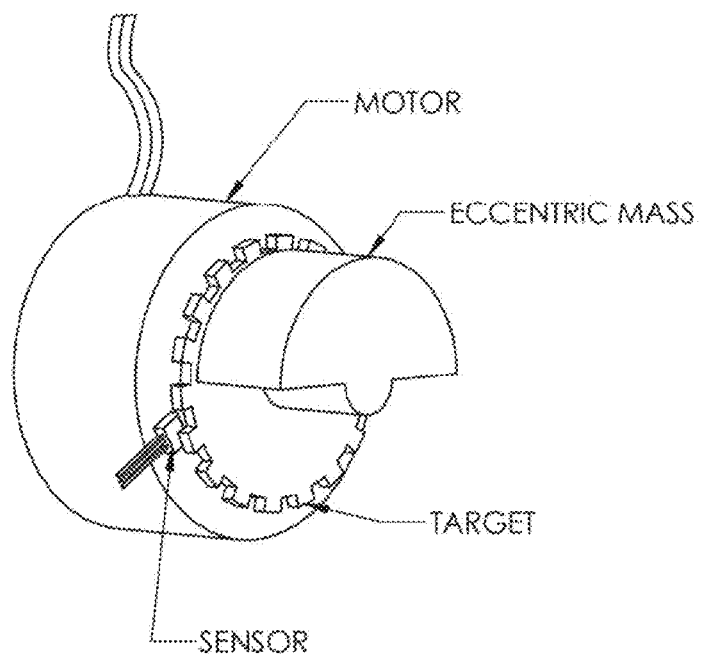
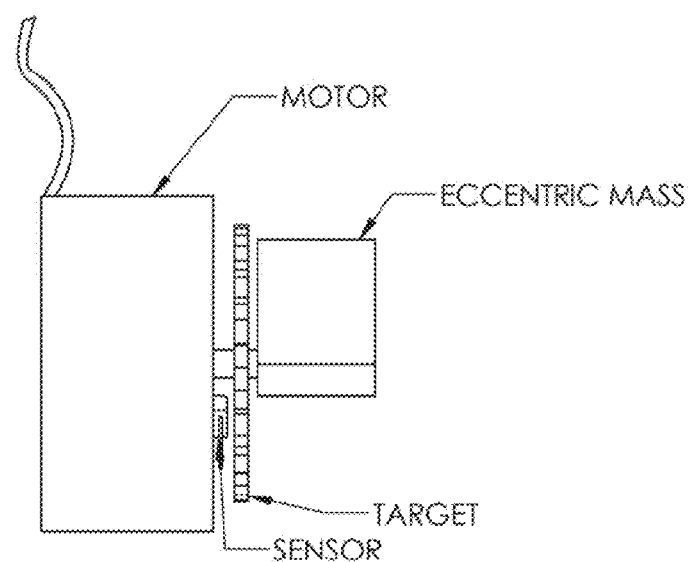

FIG 139: EXAMPLE MAGNET LOCATION FOR USE WITH FERROUS TARGET AND MAGNETIC SENSOR
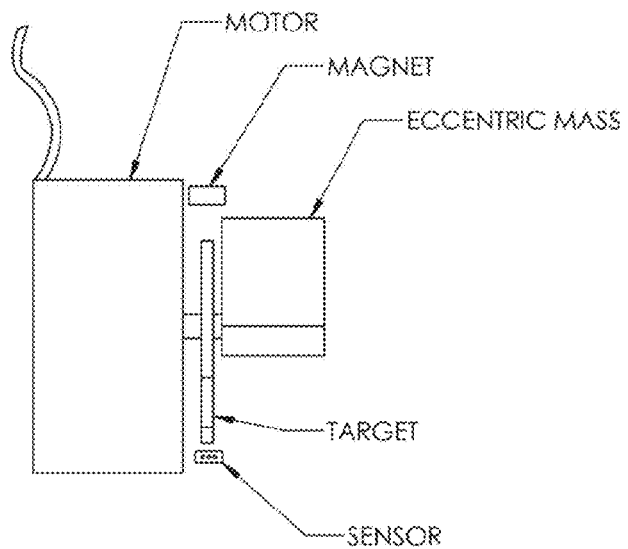
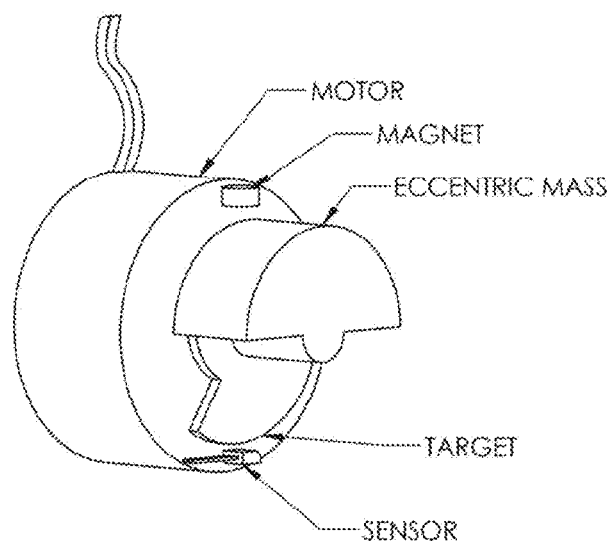

FIG 140 : ERM WITH COMBINED TARGET AND MASS
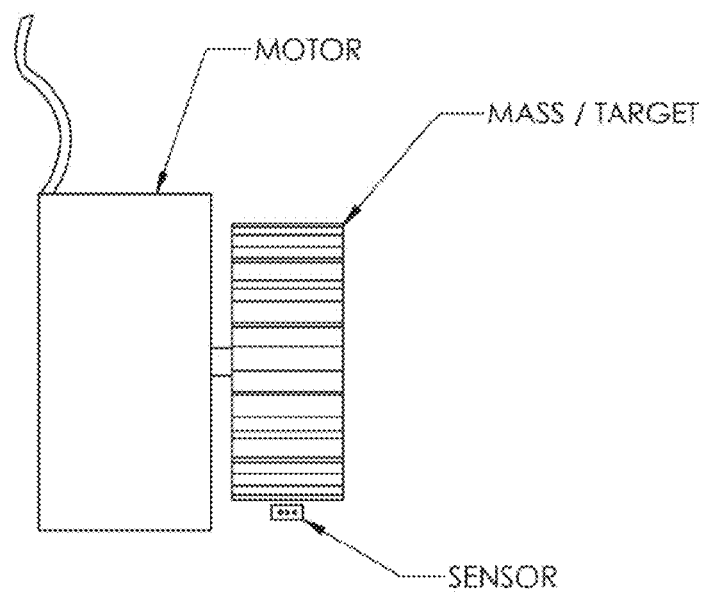
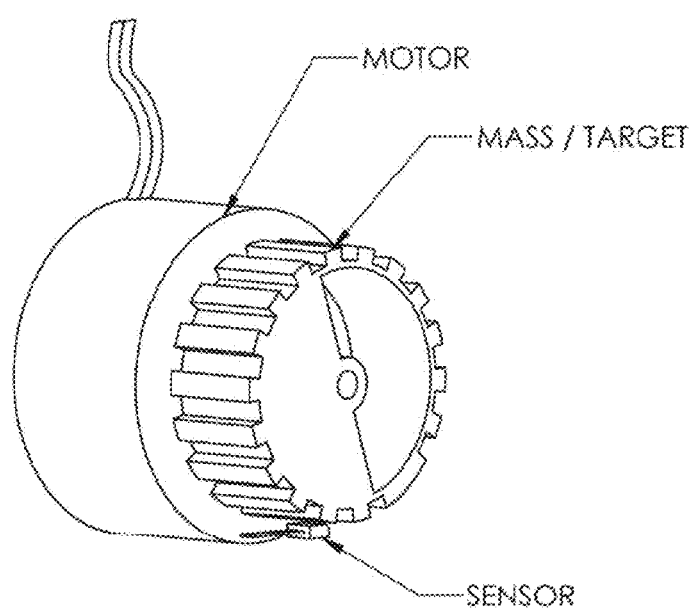

FIG 141 : 4 EQUAL MASS / TARGETS SHARING COMMON SHAFT
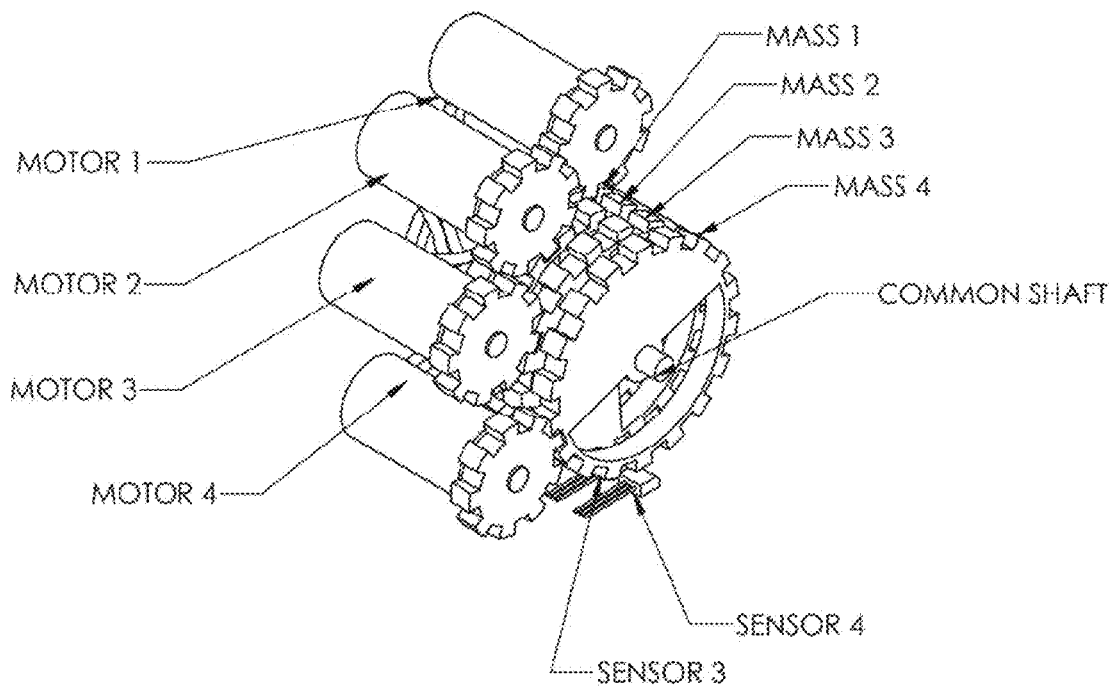
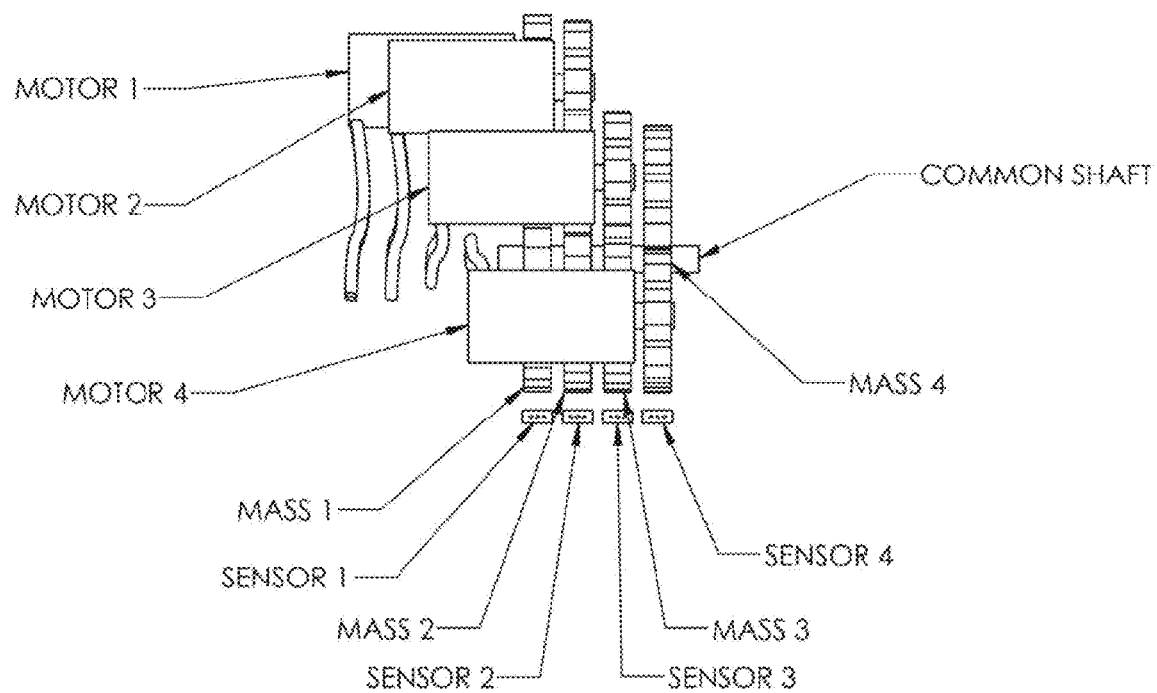

FIG 142 : 3 MASSES ON COMMON SHAFT, WITH CENTER MASS 2X HEAVIER THAN OUTER 2
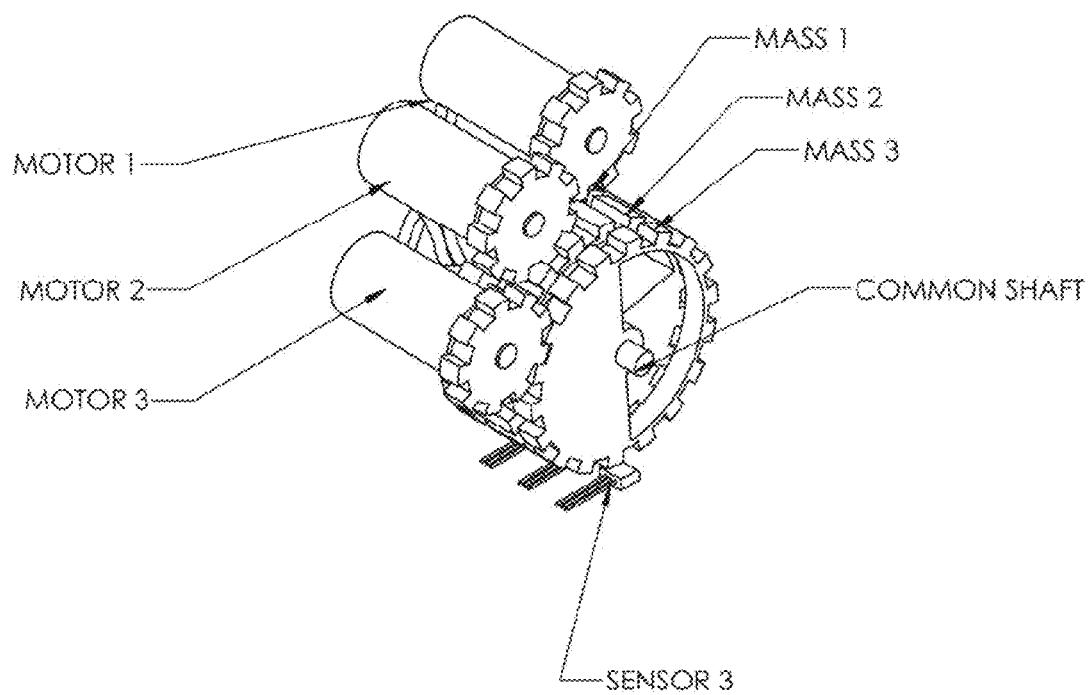
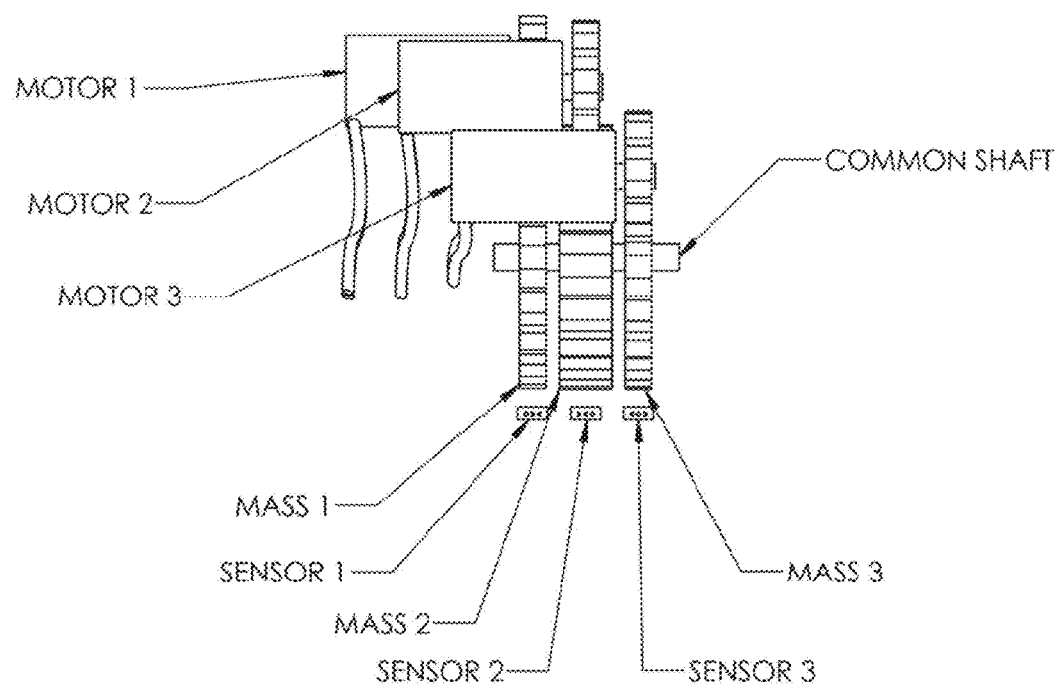

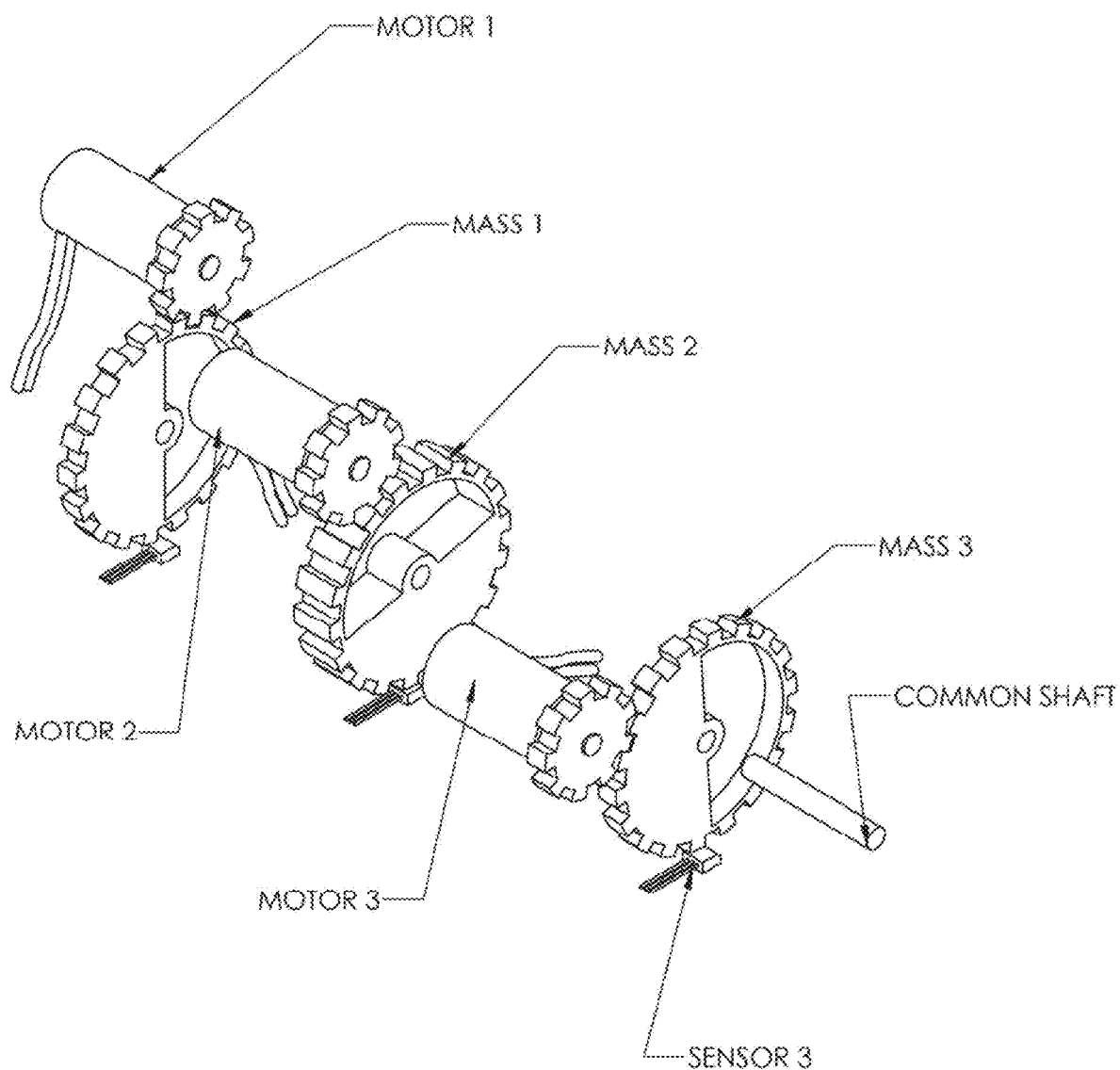

FIG 144 : GEMINI MODULE WITH POSITION SENSING EXAMPLE
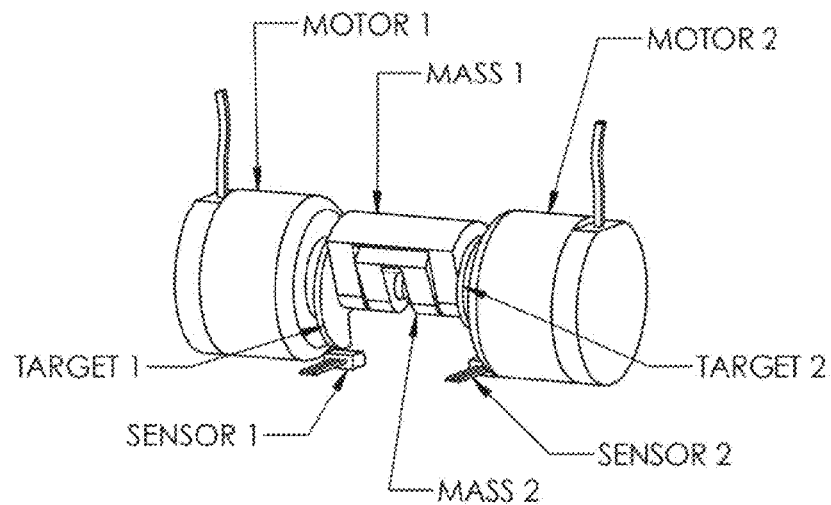
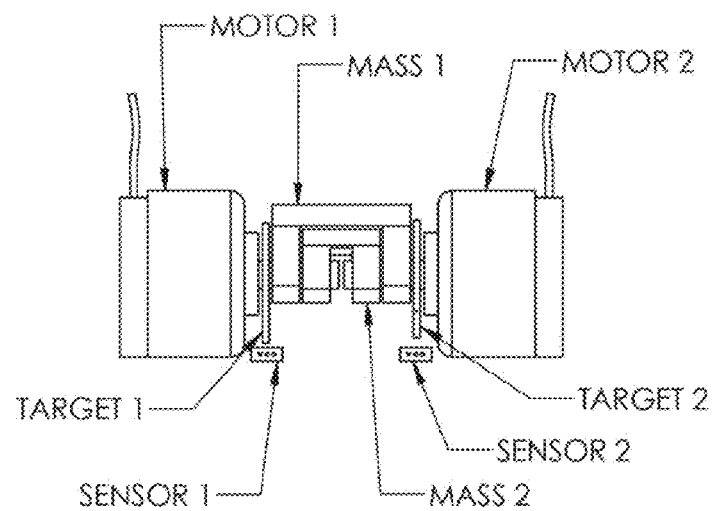

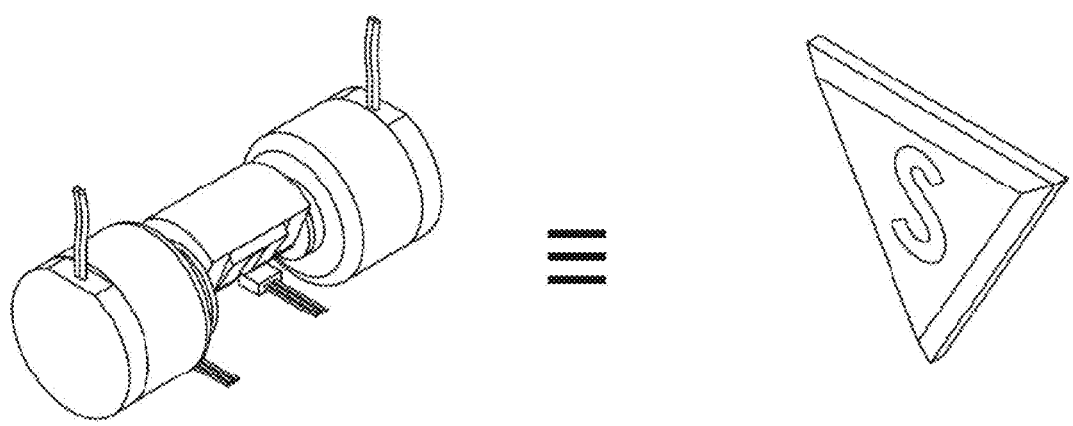
FIG 145 GEMINI MODULE AS A SAVANT

FIG 146 LINEAR ARRAYS OF GEMINI MODULES
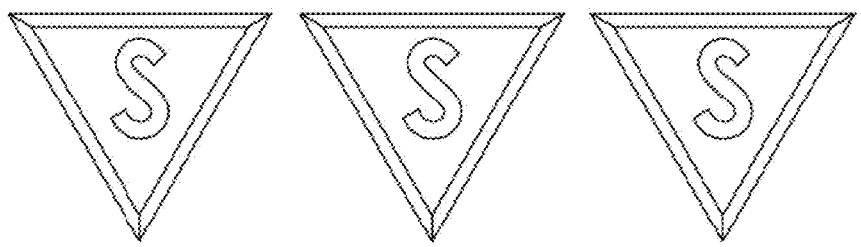
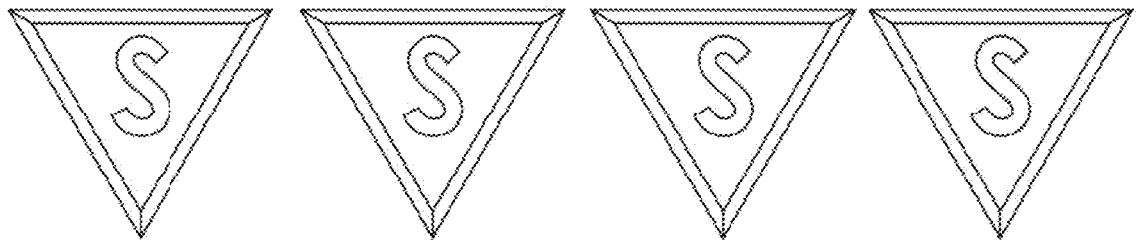

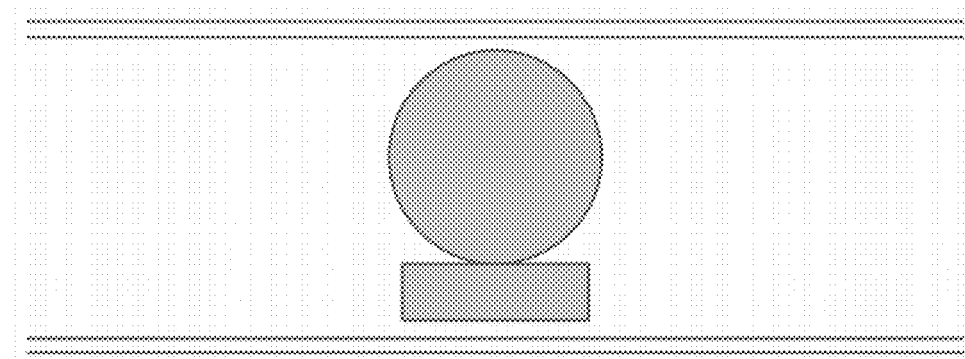
Fig. 168A - SIDE VIEW
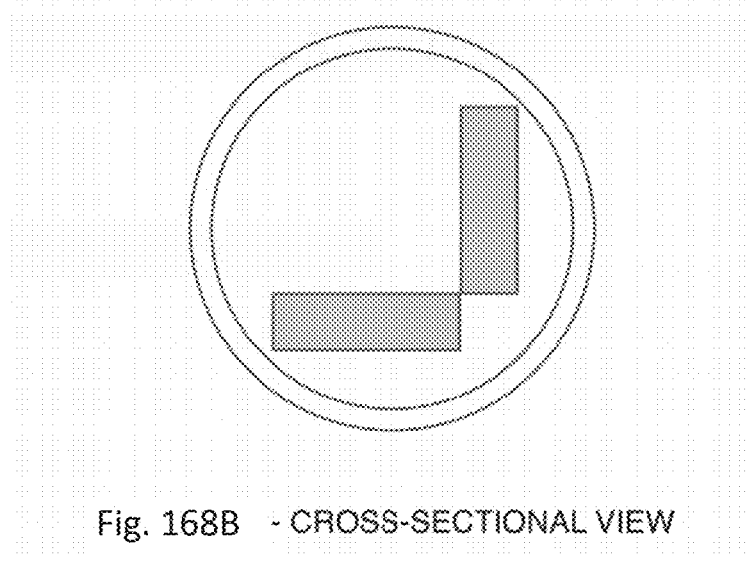
Fig. 168B - CROSS-SECTIONAL VIEW

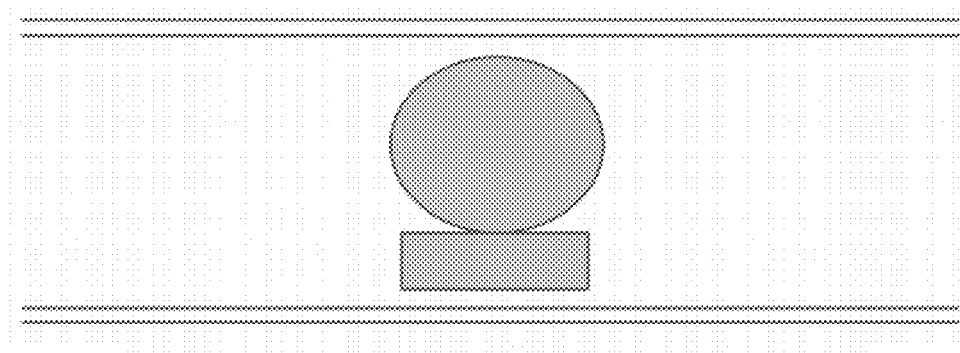
Fig. 169A - SIDE VIEW
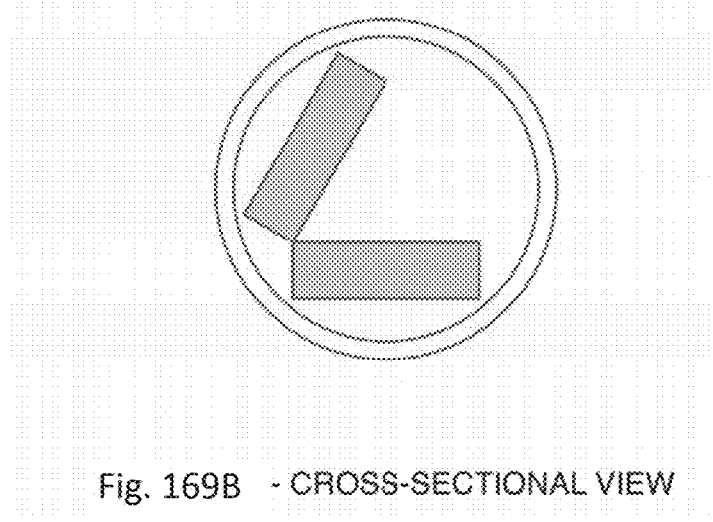
Fig. 169B - CROSS-SECTIONAL VIEW

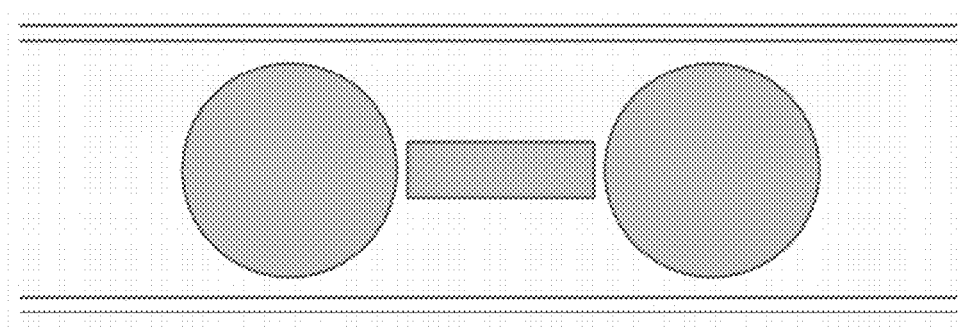
Fig. 170A - SIDE VIEW
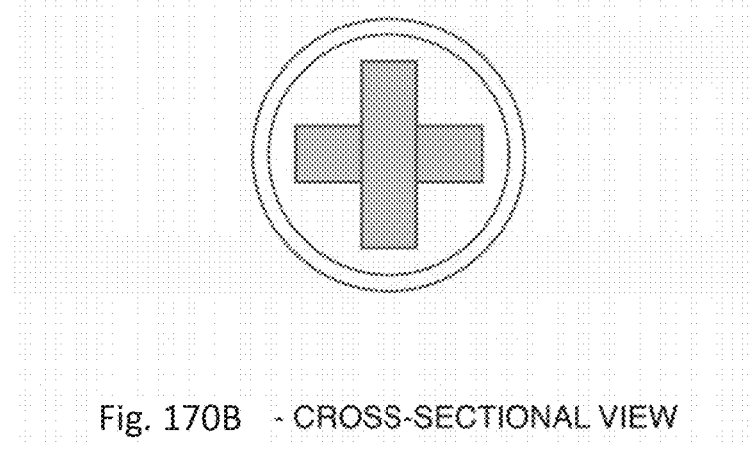
Fig. 170B - CROSS-SECTIONAL VIEW

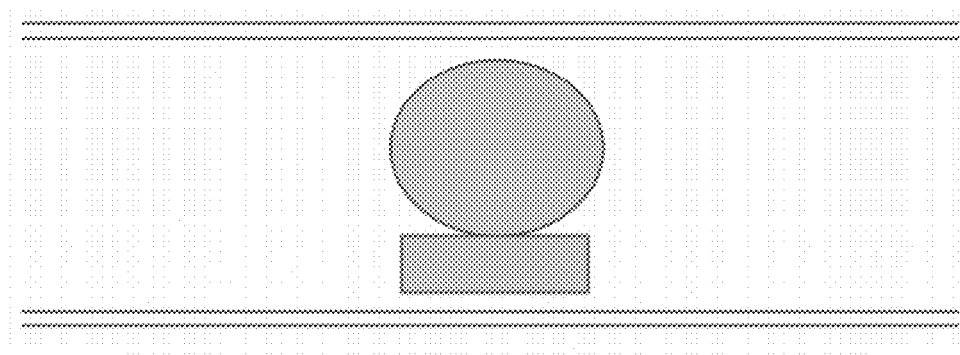
Fig. 171A - SIDE VIEW
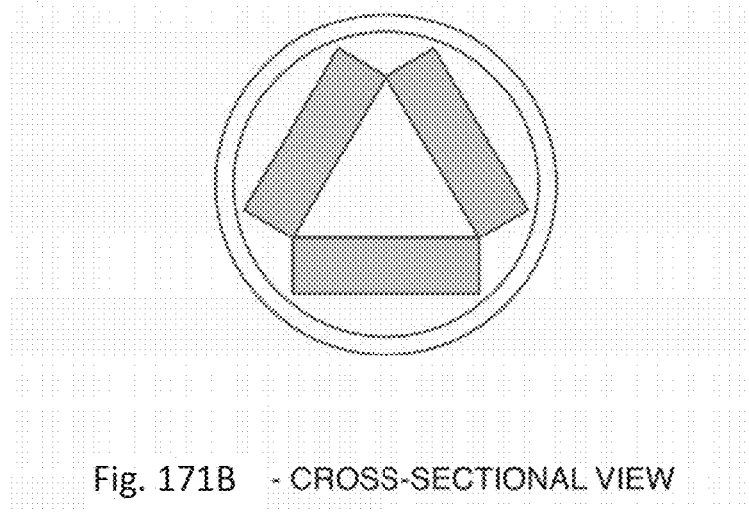
Fig. 171B - CROSS-SECTIONAL VIEW

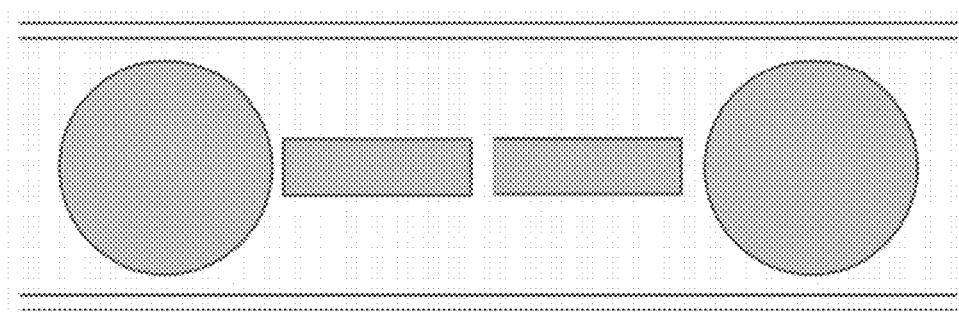
Fig. 172A  - SIDE VIEW
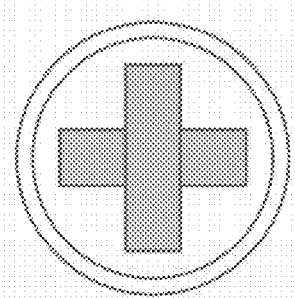
Fig. 172B  - CROSS-SECTIONAL VIEW

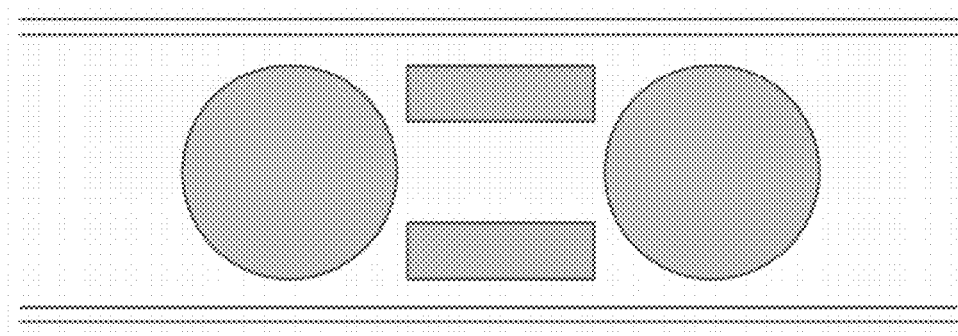
Fig. 173A - SIDE VIEW
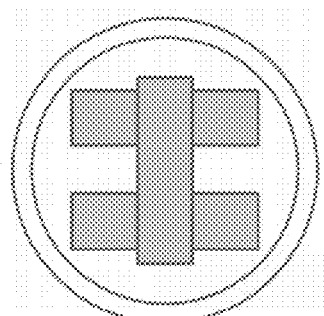
Fig. 173B - CROSS-SECTIONAL VIEW

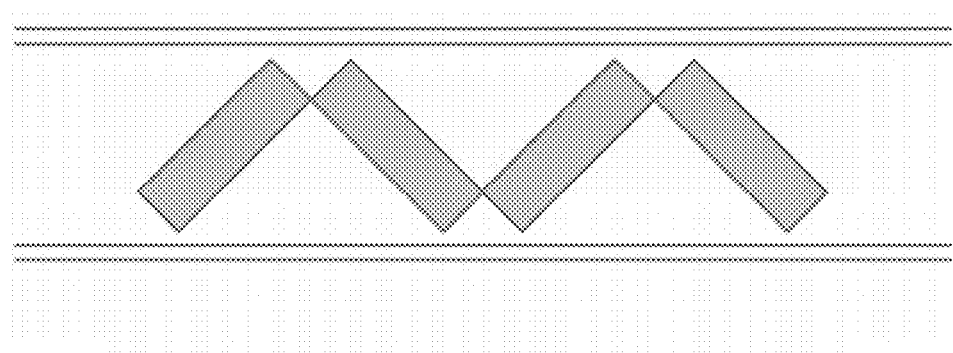
Fig. 174A  - SIDE VIEW
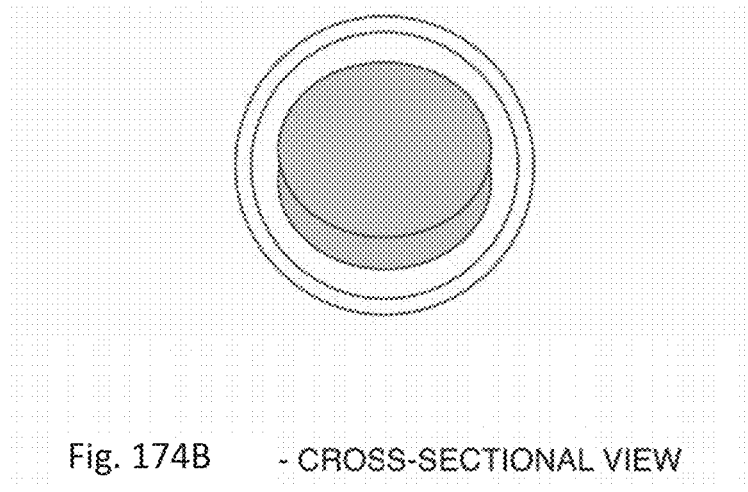
Fig. 174B  - CROSS-SECTIONAL VIEW

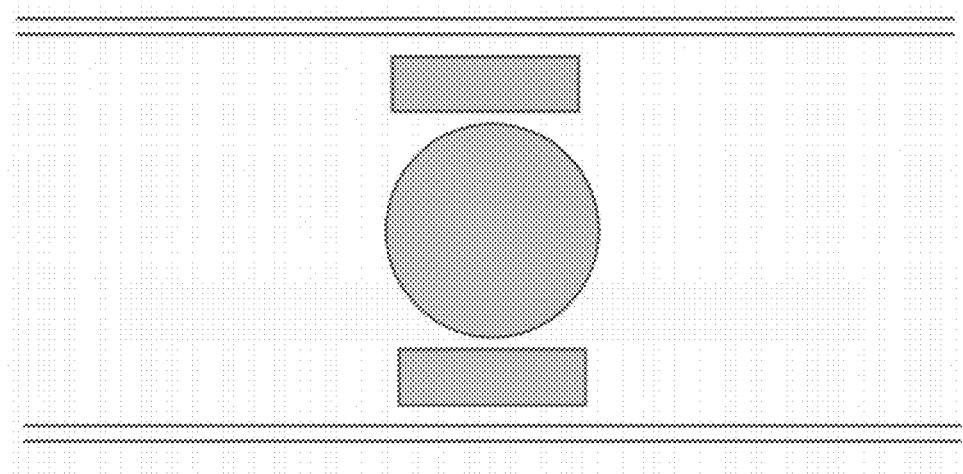
Fig. 175A  - SIDE VIEW
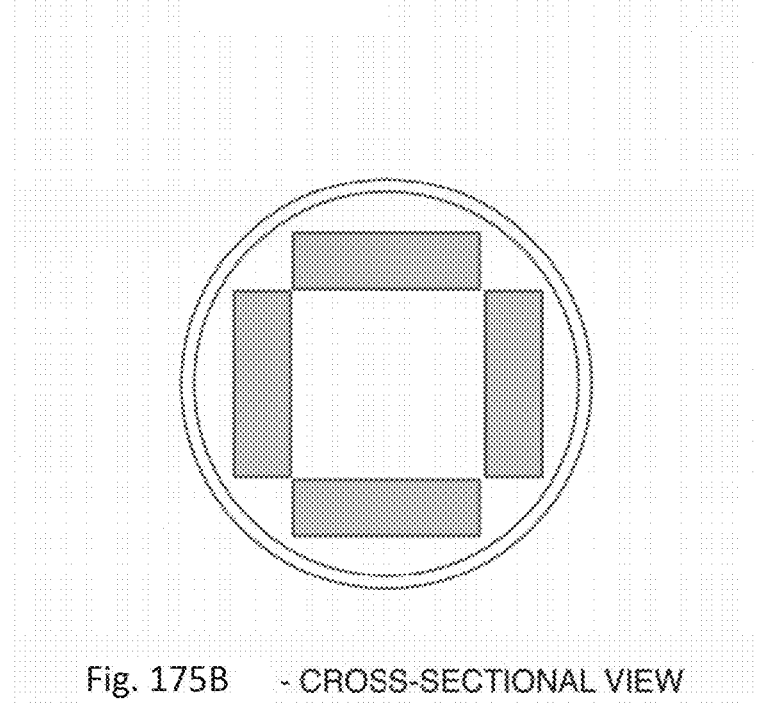
Fig. 175B  - CROSS-SECTIONAL VIEW

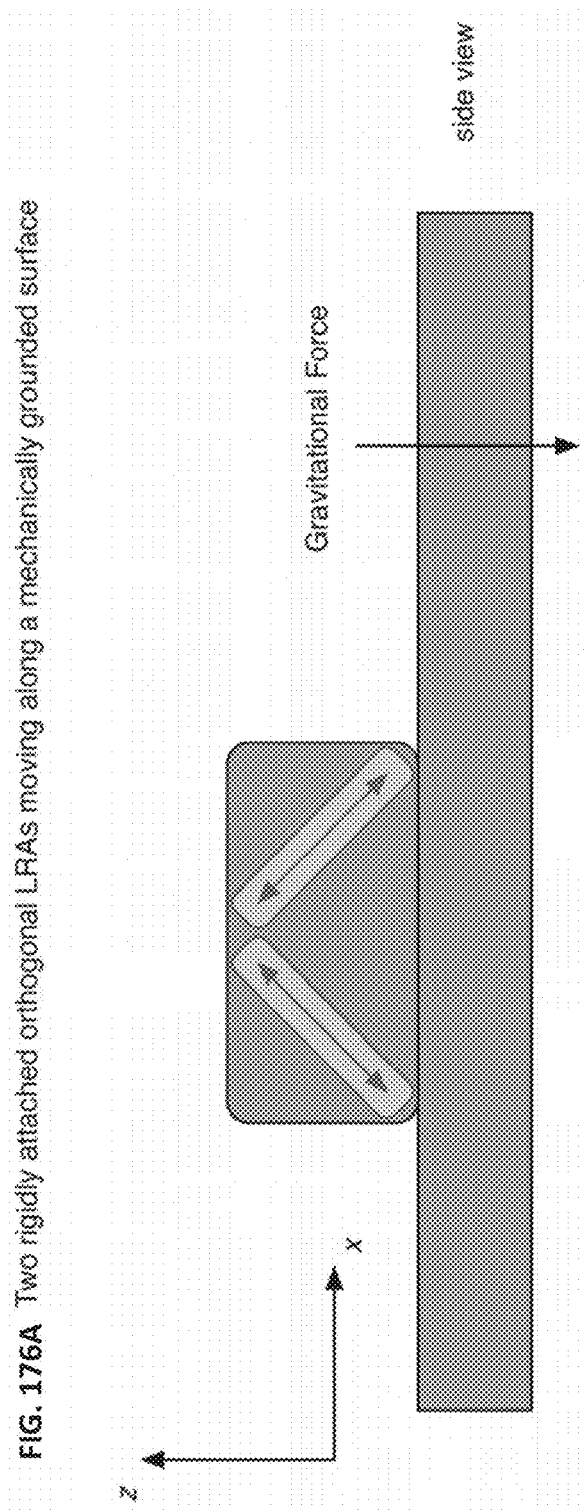
FIG. 176A Two rigidly attached orthogonal LRAs moving along a mechanically grounded surface
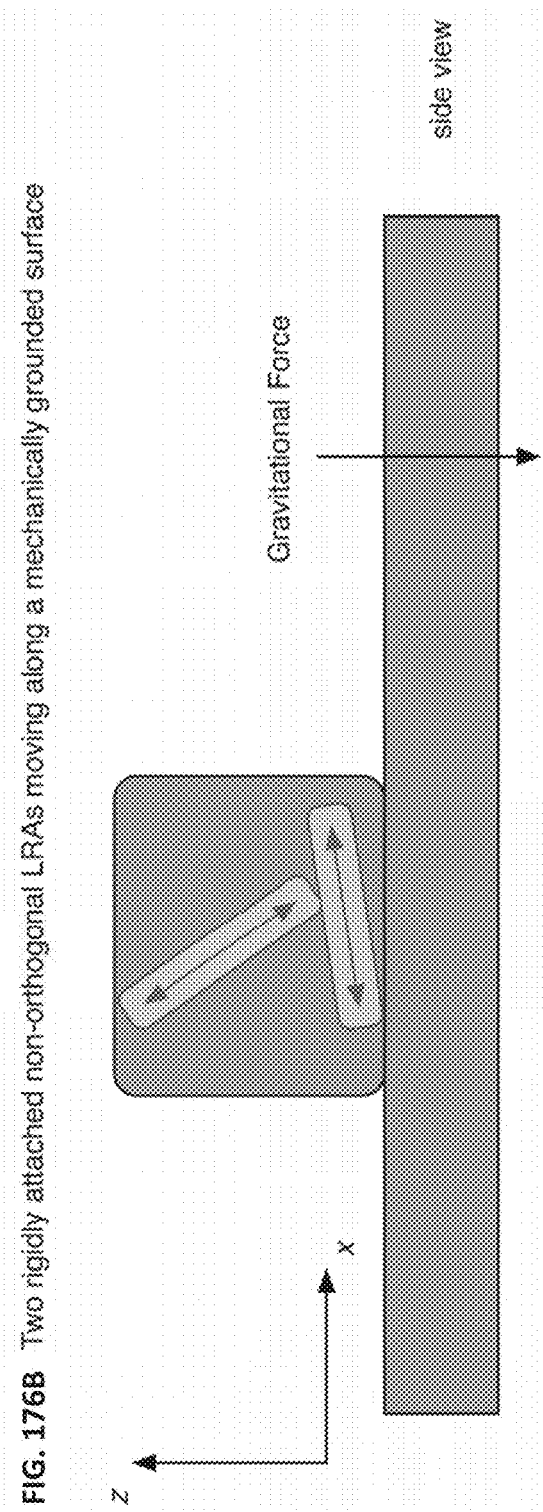
FIG. 176B Two rigidly attached non-orthogonal LRAs moving along a mechanically grounded surface

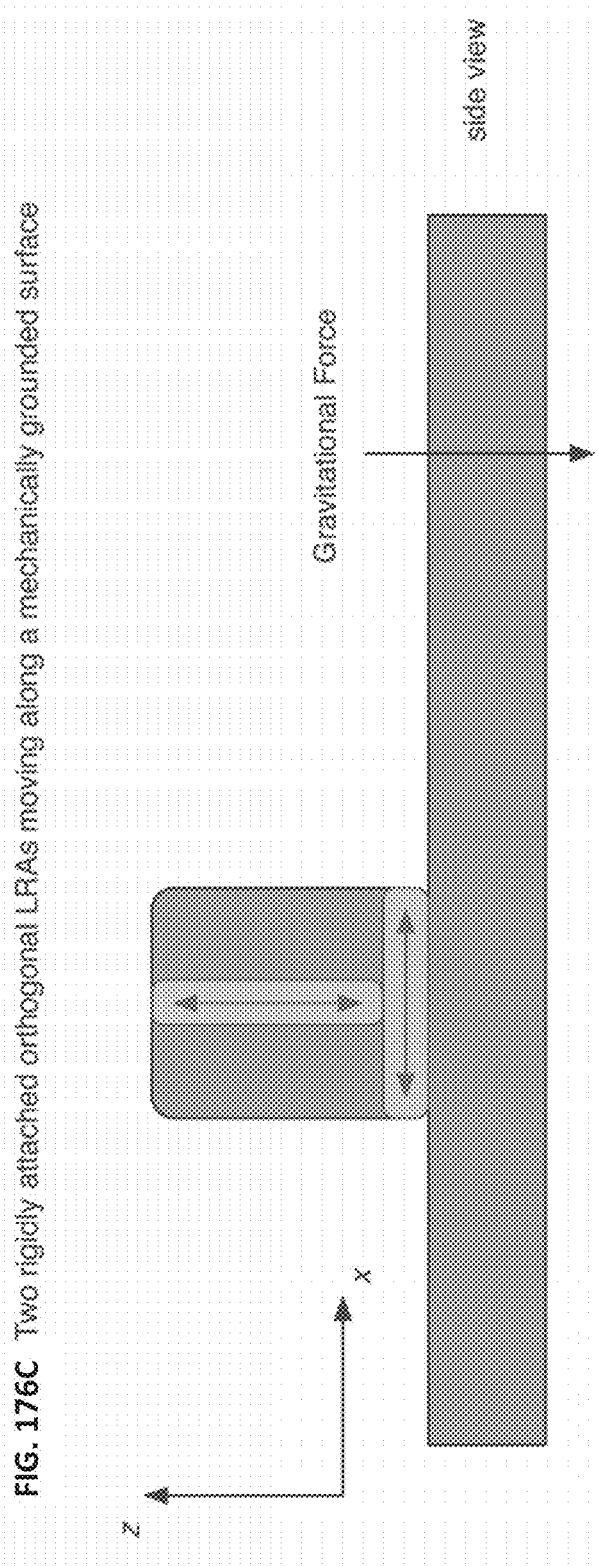
FIG. 176C Two rigidly attached orthogonal LRAs moving along a mechanically grounded surface
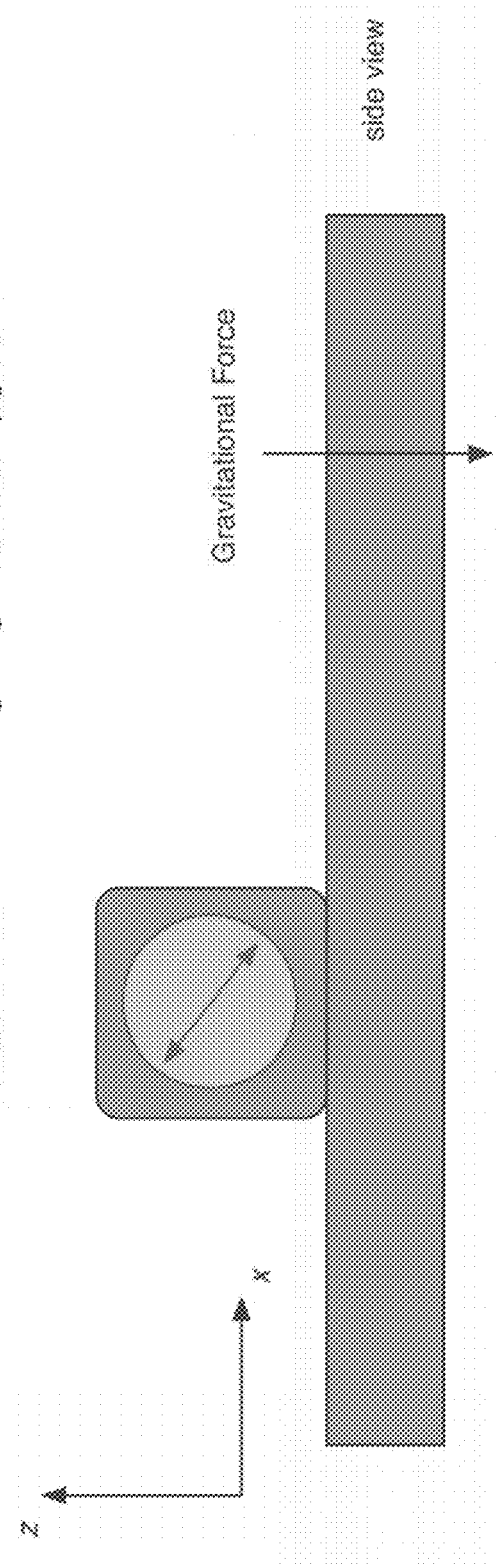
FIG. 176D A Gemini Drive with a rotatable vibration axis moving along a mechanically grounded surface

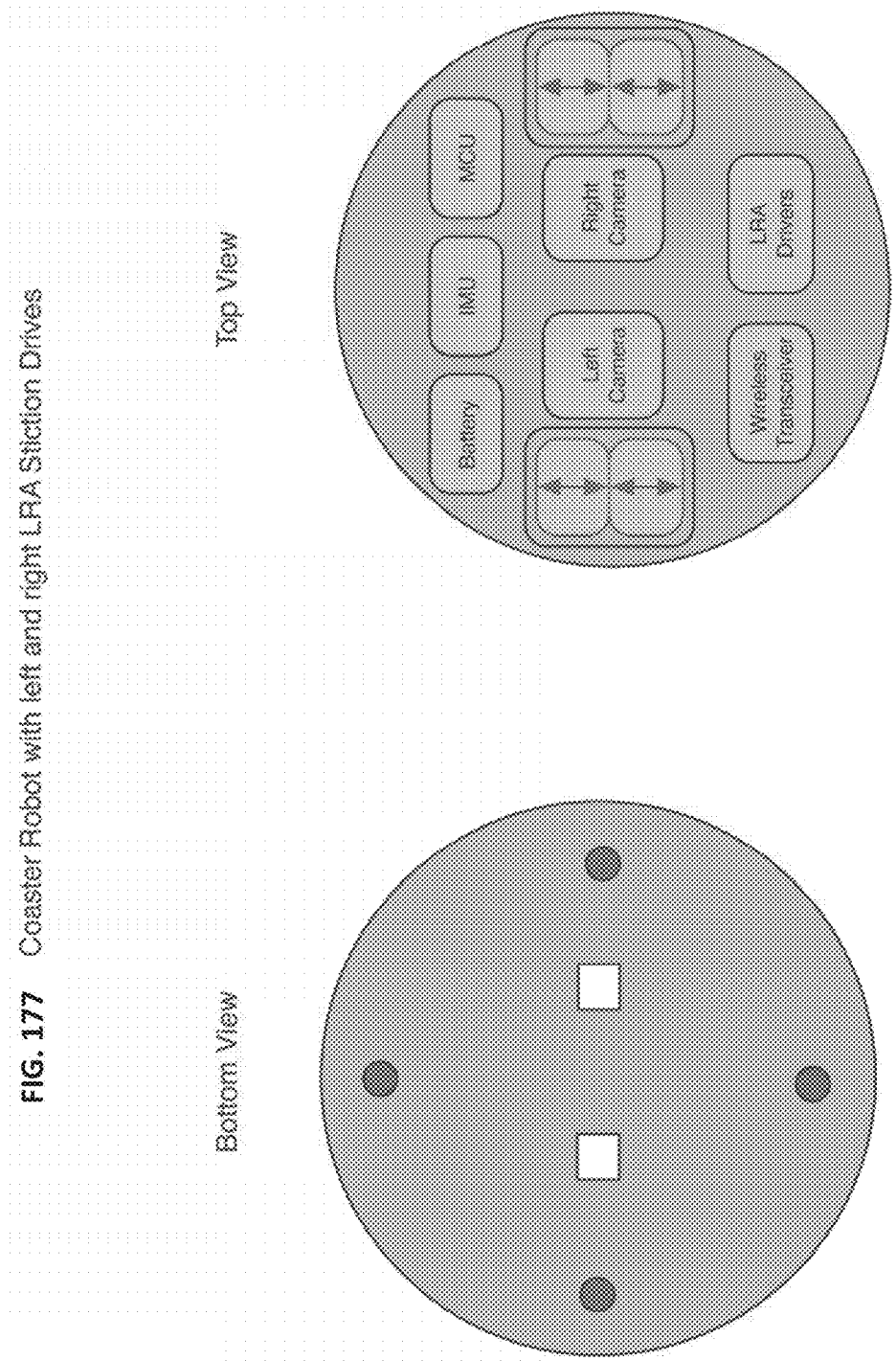
FIG. 177 Coaster Robot with left and right LRA Stiction Drives

```
With[ {a = 1, b = -.03} ,
  ParametricPlot[ { { a Cos[t] Exp[b t] , a Sin[t] Exp[b t] } , {a Cos[t] , a Sin[t] } } , {t, 0, 2 Pi} ,
    PlotStyle→ {Red, Blue} , PlotRange→ All, AspectRatio→ Automatic, Ticks →None]
]
```

Isometric View of a Dot as External Marking on the Surface of a Spinor

Top View of a Dot as External Marking on the Surface of a Spinor

Isometric View of an Arrow as External Marking on the Surface of a Spinor

Top View of an Arrow as External Marking on the Surface of a Spinor

AERODYNAMIC ECCENTRIC ROTATING MASS ATTACHMENT FOR VIBRATION MOTOR

CROSS REFERENCE TO RELATED APPLICATIONS

The present application is a national phase entry under 35 U.S.C. § 371 of International Application No. PCT/US2020/014610 filed Jan. 22, 2020, published in English, which application claims the benefit of U.S. Provisional Application No. 62/796,485 filed Jan. 24, 2019, the disclosures of which are hereby incorporated herein by reference.

This inventive disclosure describes multiple inventions and embodiments of those inventions relating to and building upon the SAVANT ("Synchronized Array of Vibration Actuators in a Network Topology") architecture.

BACKGROUND OF THE INVENTION

Vibration devices are used in a wide range of applications including haptic displays, haptic interfaces, force feedback devices, vibratory feeders, beauty products, personal hygiene products, personal pleasure products, personal massagers, tree harvesters, and seismic vibrators. Some widely used products that include haptic displays include the DUALSHOCK® 4 wireless controller for Sony Computer Entertainment's PlayStation® 4; the PlayStation® Move motion controller for motion gaming with Sony Computer Entertainment's PlayStation® 4; Microsoft Corporation's Xbox 360 Wireless Speed Wheel; and the Wii Remote™ Plus controller which is used for motion gaming with the Nintendo Wii.

Vibration actuators are typically the smallest and lowest cost method for generating haptic sensations. Therefore, it is advantageous to use vibration actuators to create a wide range of haptic sensations. Common low cost vibration actuators include Eccentric Rotating Mass actuators (ERMs) and Linear Resonant Actuators (LRAs). One of the advantages of both ERMs and LRAs is that they can generate relatively large vibration forces from low power input. Both ERMs and LRAs generally build up kinetic energy during their ramp-up period; an ERM does this as the velocity of its rotating mass increases, and an LRA does this as the amplitude of vibration of its moving mass increases. These low cost actuators are used in many applications, including in consumer electronics products such as smartphones and videogame controllers.

Many smartphones today use either a single ERM or a single LRA to produce alerts by vibrating the entire device. This has the advantage that the vibration alert can be felt while the device is inside a person's pocket. Game controllers (also commonly termed interchangeably as "videogame controllers" or simply "controllers") often incorporate two ERMs within a two-handed device such as the Xbox 360 Wireless Controller or the Xbox 360 Wireless Speed Wheel (both devices from Microsoft). Sometimes such dual-ERM controllers are configured with one ERM having a large rotating mass and the other ERM having a small rotating mass. A single-handed controller such as the Wii Remote™ Plus (from Nintendo) will typically have a single ERM to provide vibration feedback to the user.

A common limitation of most existing vibration devices is the inability to define the directionality of the vibratory forces. ERM actuators generate centripetal forces that rotate in a plane, and generally the direction of vibration (that is to say, the instantaneous direction of the rotating centripetal force vector) cannot be not sensed in haptic applications due in part to the high rate of change of the direction of vibrations. In an ERM a centripetal force is applied onto the eccentric mass by the motor shaft, and an equal and opposite centrifugal force is applied onto the motor shaft. In this document both the terms centripetal and centrifugal are used with the understanding that these are equal but opposite forces. LRAs vibrate back and forth, and thus it may be possible to sense the axis of vibration, but it is not possible to provide more of a sensation in the forward direction relative to the backward direction or vice versa. Since haptic applications are often integrated with audio and video displays such as in computer gaming where directions are an integral component of the game, it is desirable to provide a haptic sensation that also corresponds to a direction. Moreover, it is be useful to generate haptic cues of directionality for applications where a person does not have visual cues, such as to guide a vision-impaired person. Therefore, it is desirable to provide a human-perceptible indication of directionality in vibratory haptic displays and interfaces. In addition, it is advantageous to use vibration actuators to generate a wide range of vibration waveforms including both directional and non-directional waveforms.

There have been some haptic vibration devices that provide a sensation of vibration direction, but these prior implementations have disadvantages. Specifically, asymmetric vibrations have been used to generate a haptic sensation that is larger in one direction than the opposite direction.

However, existing asymmetric vibrators are complex, costly, or have limited controllability. They tend to be bulky and have low power efficiency. Tappeiner et. al. demonstrated a vibration device that generated asymmetric directional haptic cues (Tappeiner, H. W.; Klatzky, R. L.; Unger, B.; Hollis, R., "Good vibrations: Asymmetric vibrations for directional haptic cues", World Haptics 2009, Third Joint Euro Haptics Conference and Symposium on Haptic Interfaces for Virtual Environments and Teleoperator Systems), yet this device uses a high power and an expensive 6-DOF magnetic levitation haptic device. Amemiya et. al. (Tomohiro Amemiya; Hideyuki Ando; Taro Maeda; "Kinesthetic Illusion of Being Pulled Sensation Enables Haptic Navigation for Broad Social Applications, Ch. 21, Advances in Haptics, pp. 403-414") illustrated a device that also generates asymmetric vibrations for haptic applications, yet this device uses a complex and large linkage system with 6 links and it appears that the direction of vibration cannot be modified in real-time.

Another limitation of vibration devices that use ERMs is that the amplitude of vibration is dependent on the frequency of vibration, since the vibration forces are generated from centripetal acceleration of an eccentric mass. Some prior approaches have used multiple ERMs to control frequency and amplitude independently, but in the process also generate undesirable torque effects due to the offset between the ERMs.

BRIEF DESCRIPTION OF THE DRAWINGS

FIG. 3 illustrates a pair of in-phase vibration profiles.

FIG. 4 illustrates a linear motion vibration actuator for use with aspects of the present disclosure.

FIGS. 5A-B illustrate an example of a linear motion vibration actuator in accordance with aspects of the present disclosure.

FIGS. 6A-B illustrate another example of a linear motion vibration actuator in accordance with aspects of the present disclosure.

FIGS. 7A-B illustrate a further example of a linear motion vibration actuator in accordance with aspects of the present disclosure.

FIGS. 8A-B illustrate yet another example of a linear motion vibration actuator in accordance with aspects of the present disclosure.

FIG. 9 illustrates a further example of a linear motion vibration actuator in accordance with aspects of the present disclosure.

FIG. 30 illustrates a rocking actuator in accordance with aspects of the present disclosure.

FIG. 63 illustrates a vibration device that includes two non-orthogonal sets of LRAs according to aspects of the disclosure.

FIG. 64 illustrates an ERM for use with aspects of the disclosure.

FIG. 69 illustrates a vibration device with four vertically stacked ERMs in one example used according to aspects of the disclosure.

FIG. 92D illustrates an example of a SAVANT node having two LRAs in a compact planar arrangement in accordance with aspects of the present disclosure.

FIG. 92E illustrates an example of a SAVANT node having three LRAs in a compact planar arrangement in accordance with aspects of the present disclosure.

FIG. 92F illustrates an example of a SAVANT node having three LRAs in a compact arrangement with their axes of vibration spanning three dimensions in accordance with aspects of the present disclosure.

FIG. 92G illustrates an example of a SAVANT node having three LRAs in a cube arrangement with their axes of vibration spanning three dimensions in accordance with aspects of the present disclosure.

FIG. 92H illustrates an example of a SAVANT node having six LRAs in a cube arrangement with their axes of vibration spanning three dimensions in accordance with aspects of the present disclosure.

FIG. 92I illustrates an example of a SAVANT node having twelve LRAs in a cube arrangement with their axes of vibration spanning three dimensions in accordance with aspects of the present disclosure.

FIG. 92J illustrates an example of a SAVANT node having four LRAs in a tetrahedral arrangement with their axes of vibration spanning three dimensions in accordance with aspects of the present disclosure.

FIG. 109 represents four snapshot views of the resultant motion for two orthogonal springs driven with different amplitudes and out-of-phase by 900 in accordance with aspects of the present disclosure.

FIG. 110A represents four snapshot views of the resultant motion for two orthogonal springs driven with the different amplitudes and out-of-phase by 22.5° in accordance with aspects of the present disclosure.

FIG. 110B represents four snapshot views of the resultant motion for two orthogonal springs producing an elliptical vibrational effect with time-varying direction and axes in accordance with aspects of the present disclosure.

FIG. 111 is a graph of an example Lissajous curve produced by two orthogonal LRAs in accordance with aspects of the present disclosure.

FIG. 112 is a plot of the beat pattern produced by two parallel LRAs driven at 175 Hz and 180 Hz respectively in accordance with aspects of the present disclosure.

FIG. 113 is a plot of the Sawtooth wave approximation in a 5-LRA system. The amplitudes and driving frequencies of the LRAs are given by the Fourier series approximation of f(t)=t in accordance with aspects of the present disclosure.

FIG. 114 is a plot of an Asymmetric waveform produced by three 2-LRA systems driven at the first three harmonics of 22.5 Hz in accordance with aspects of the present disclosure.

FIG. 115 is a plot of an Asymmetric waveform produced by three 2-LRA systems driven at the first three harmonics of 4.5 Hz in accordance with aspects of the present disclosure.

FIG. 116 is a plot of an h-pulse control effect for a 3-LRA SAVANT in accordance with aspects of the present disclosure.

FIG. 117 is a plot of a Scaled h-pulse of a 3-LRA SAVANT in accordance with aspects of the present disclosure.

FIG. 118 is a plot of an Amplitude Seeking control effect using a 3-LRA system in accordance with aspects of the present disclosure.

FIG. 119 is an example of a Vibrational Gradient produced with a 3-LRA system in accordance with aspects of the present disclosure.

Figure 120:
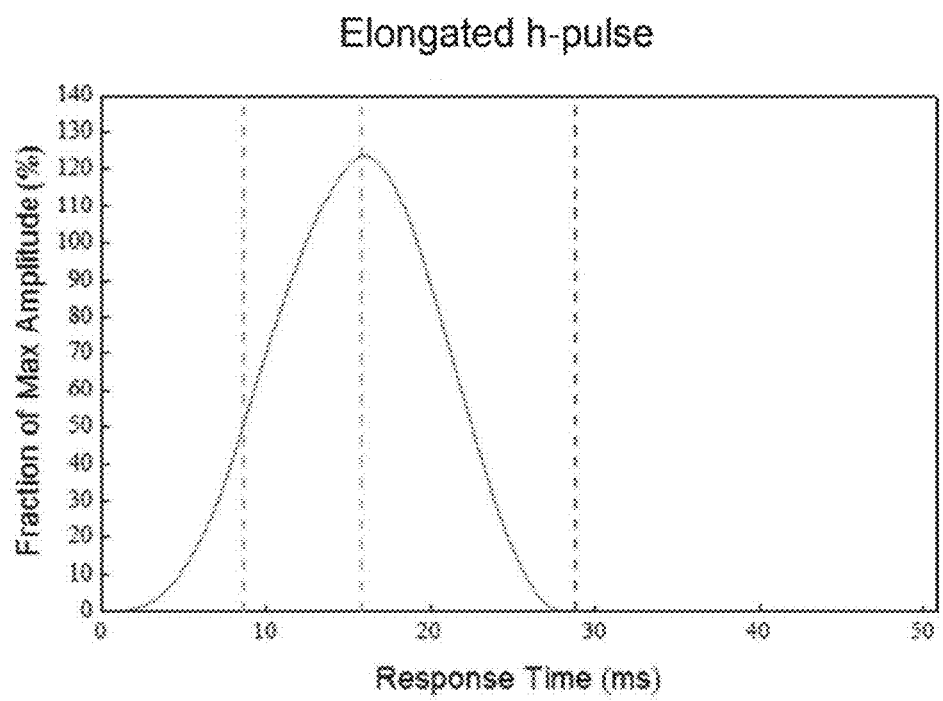

FIG. 120 is an example of an Elongated h-pulse created by 150 Hz LRAs driven at 25 Hz in accordance with aspects of the present disclosure.

Figure 121:
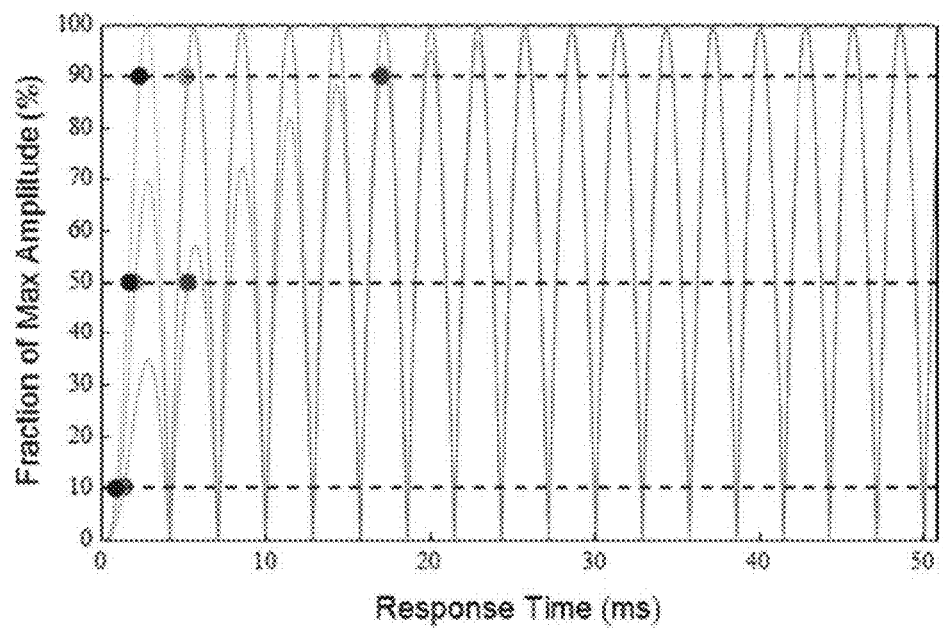

FIG. 121 is a graph of the response times for 3-LRA, 2-LRA and 1-LRA systems modeled with a resonant frequency of 175 Hz in accordance with aspects of the present disclosure.

Figure 122:
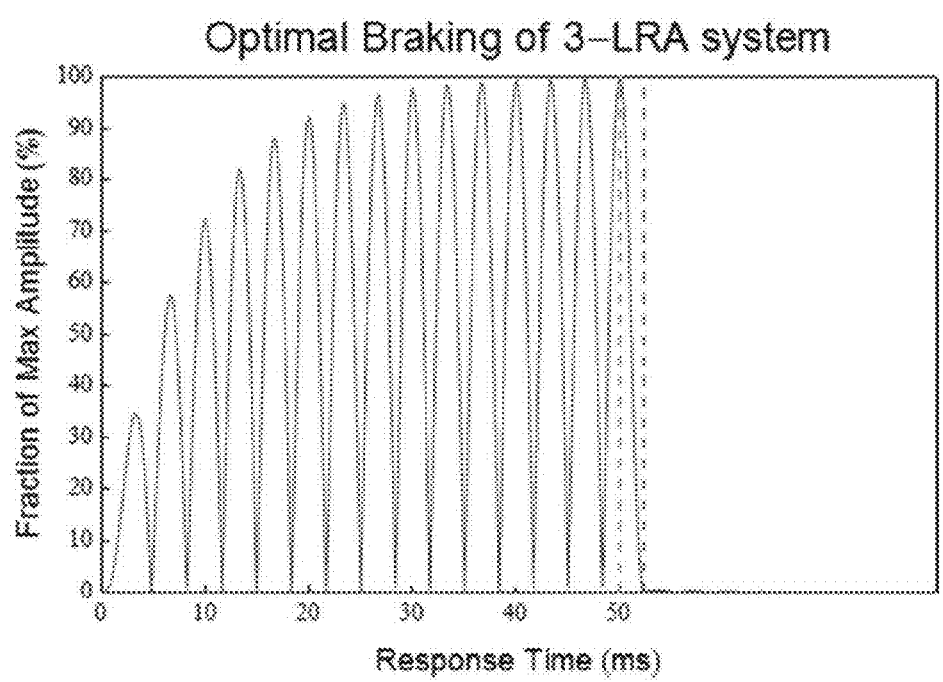

FIG. 122 is a graph illustrating Optimal Braking of a 3-LRA System in accordance with aspects of the present disclosure.

Figure 123A:
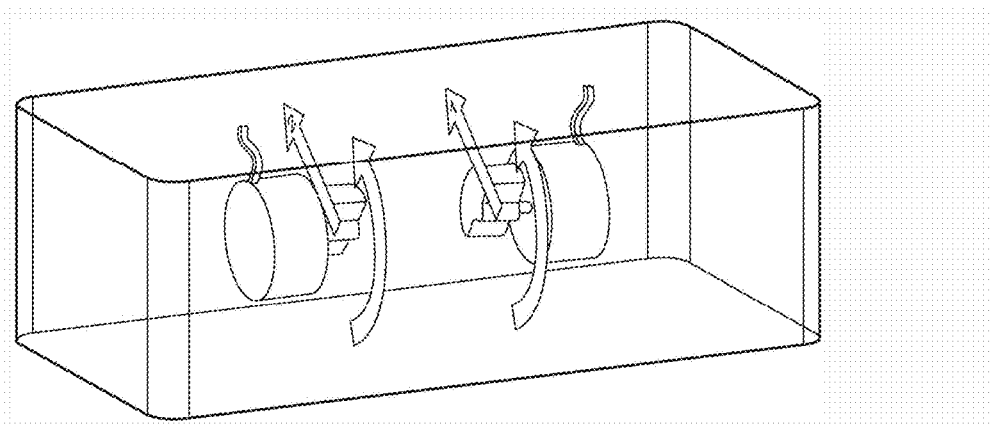
Figure 123B:
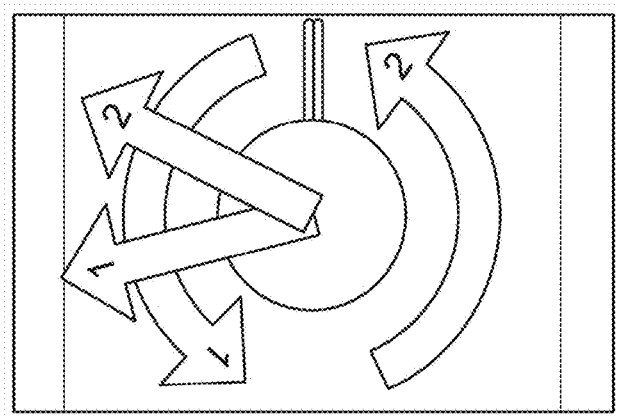
Figure 123C:
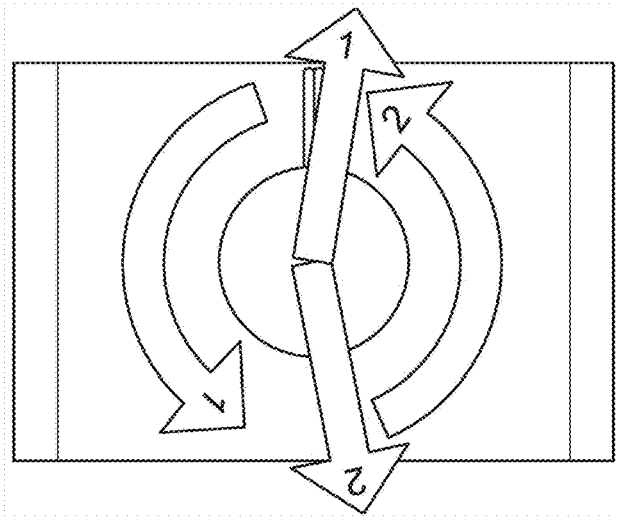

FIGS. 123A-C illustrate examples of co-rotating ERMs in accordance with aspects of the present disclosure.

Figure 123D:
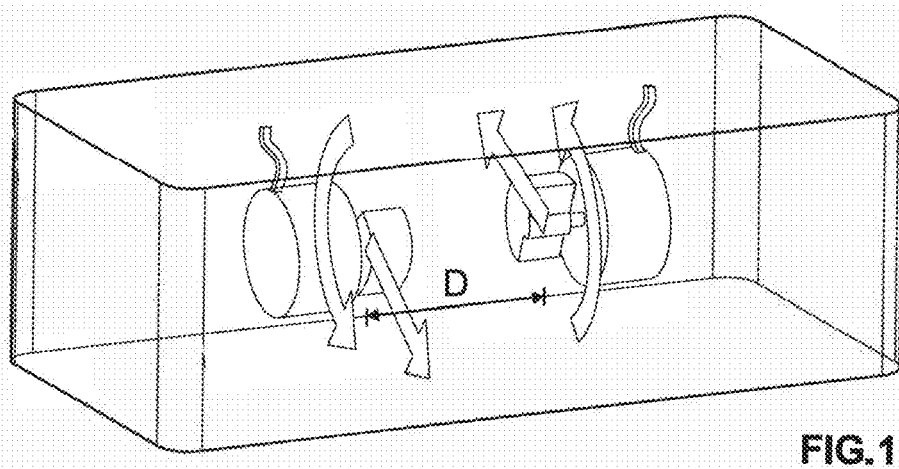
Figure 123E:
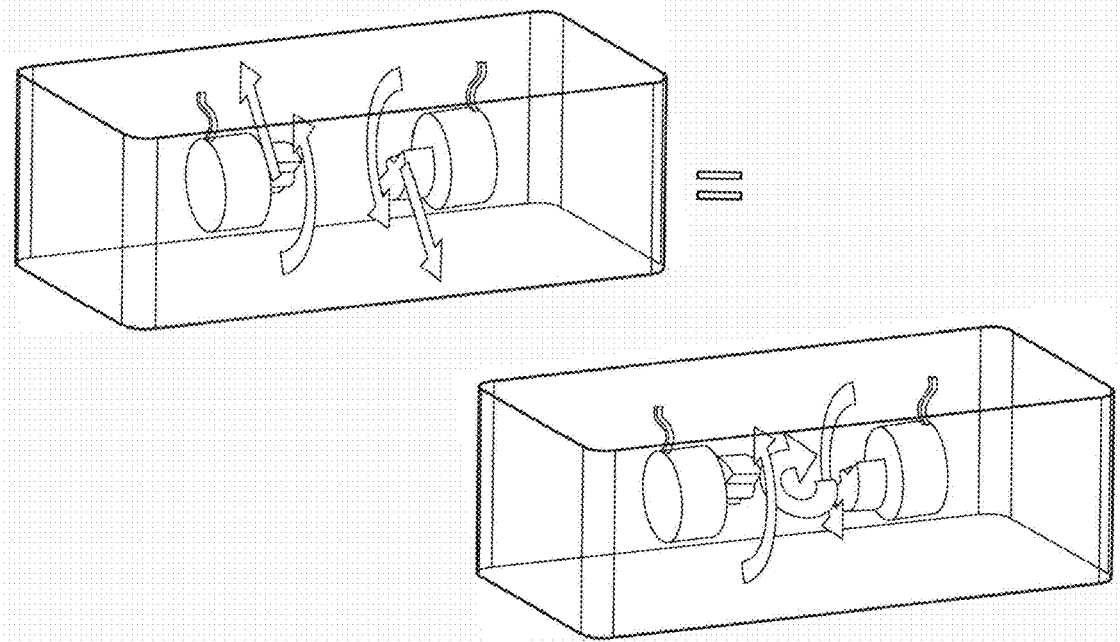
Figure 123F:
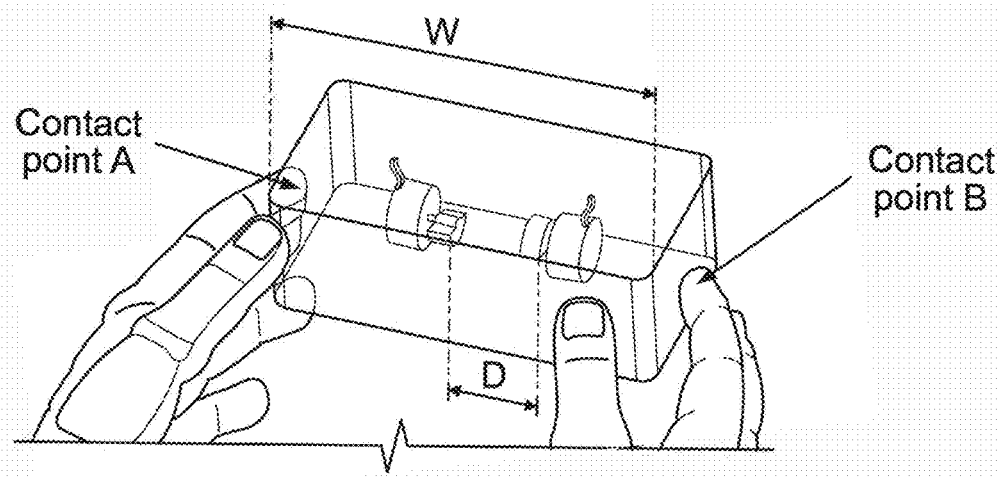

FIGS. 123D-F illustrate the effects of parasitic torque in ERMs.

Figure 124A:
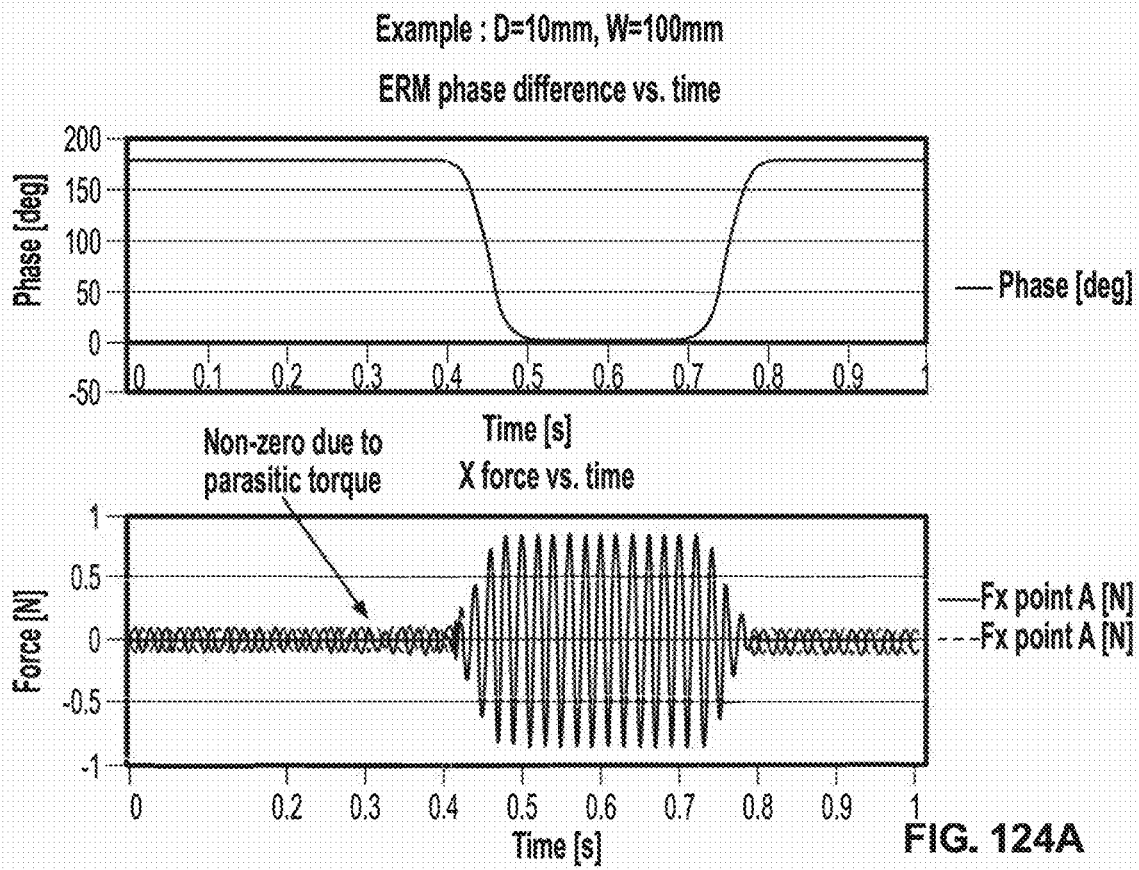
Figure 124B:
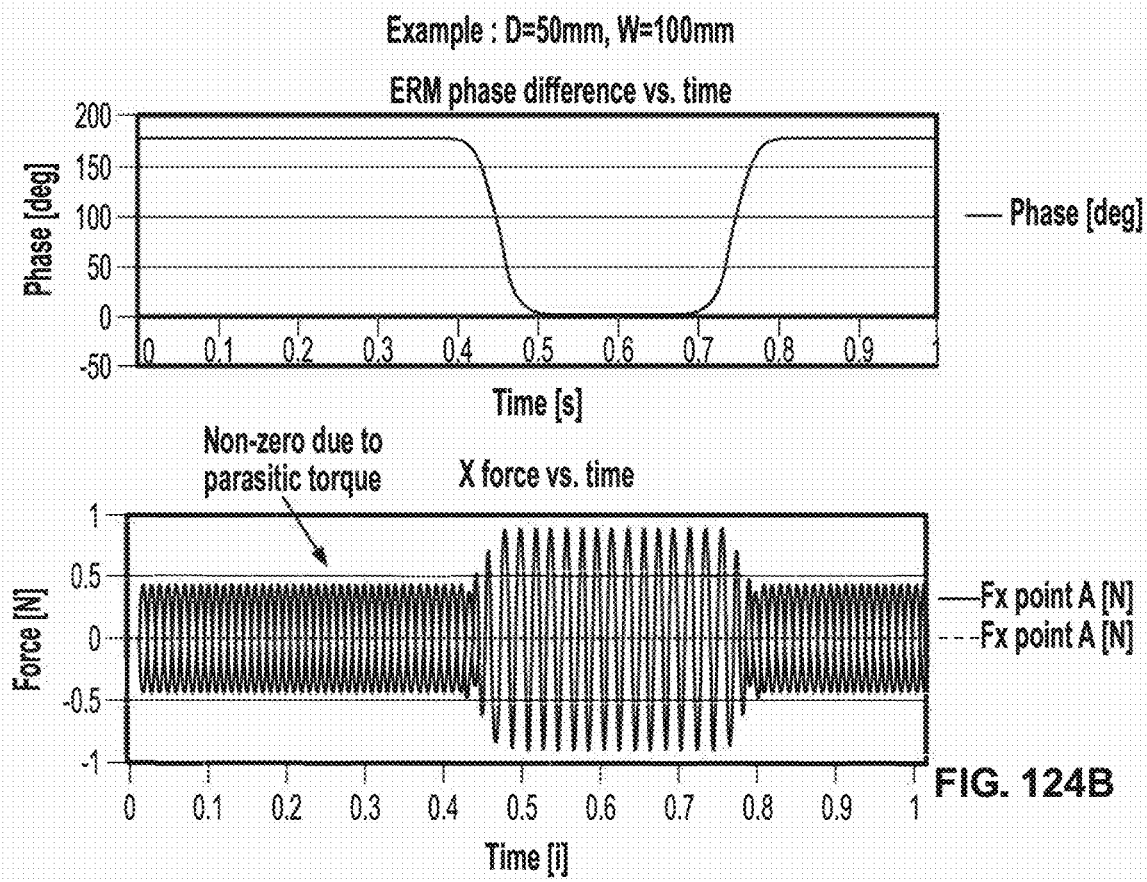

FIGS. 124A-B illustrate examples of parasitic torques based on ERM distance and contact point distance.

Figure 125A:
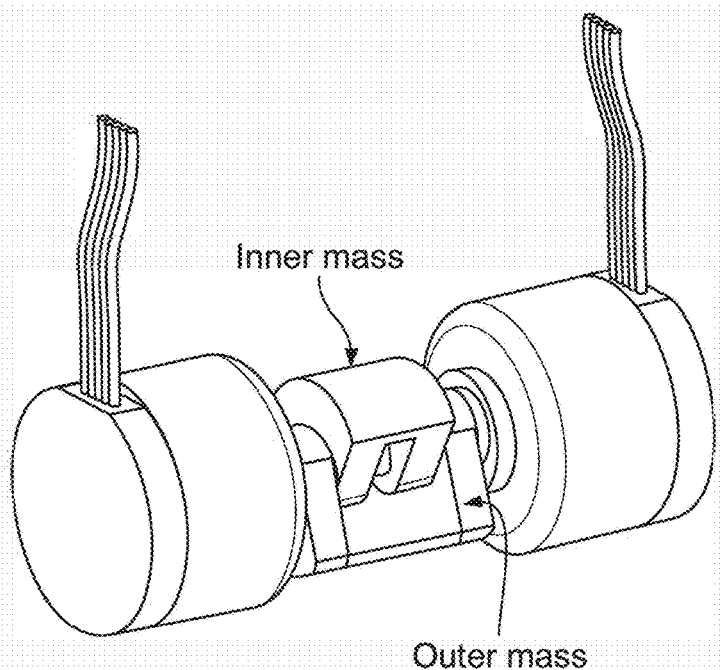
Figure 125B:
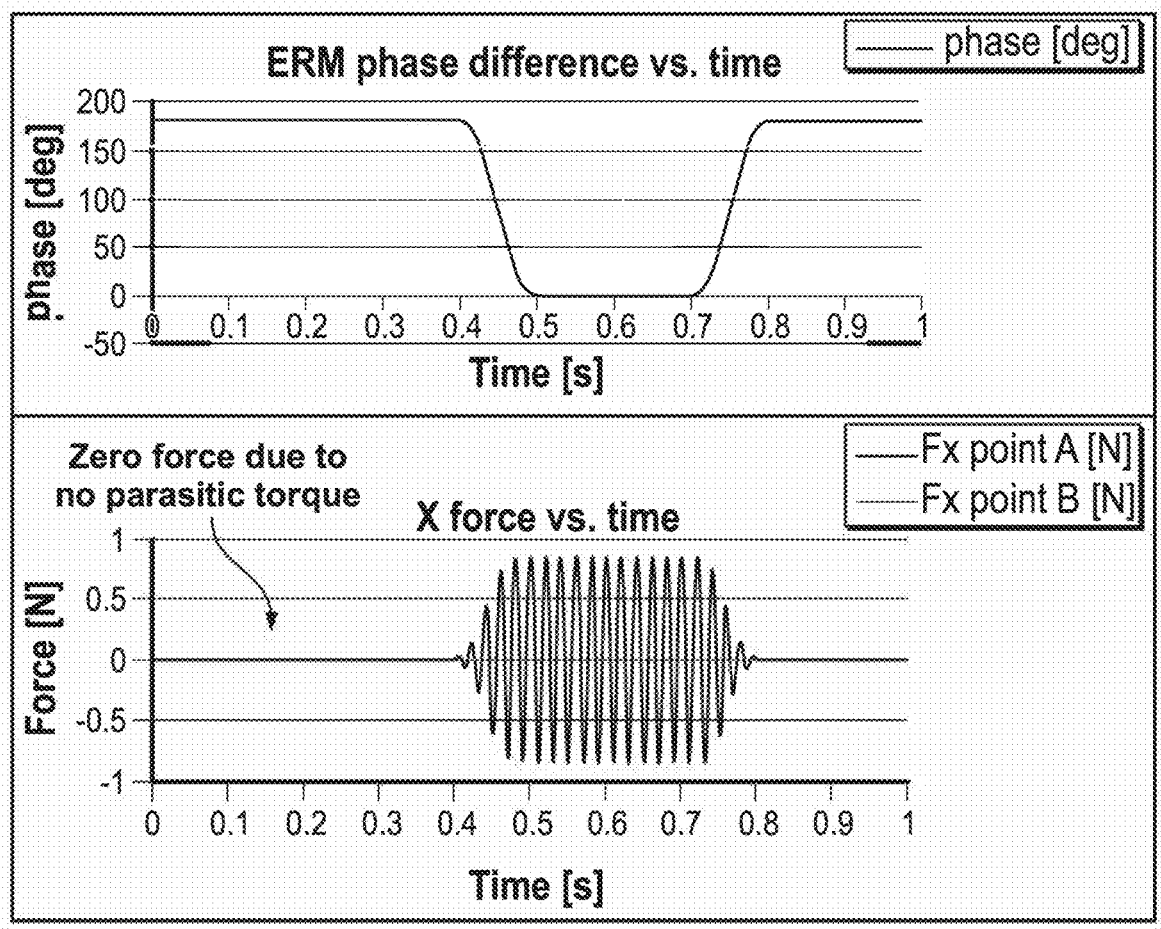

FIGS. 125A-B illustrate interleaved ERMs and the elimination of parasitic effects in accordance with aspects of the disclosure.

FIGS. 126A-I illustrate a method of manufacturing interleaved ERMs in accordance with aspects of the disclosure.

Figure 127A:
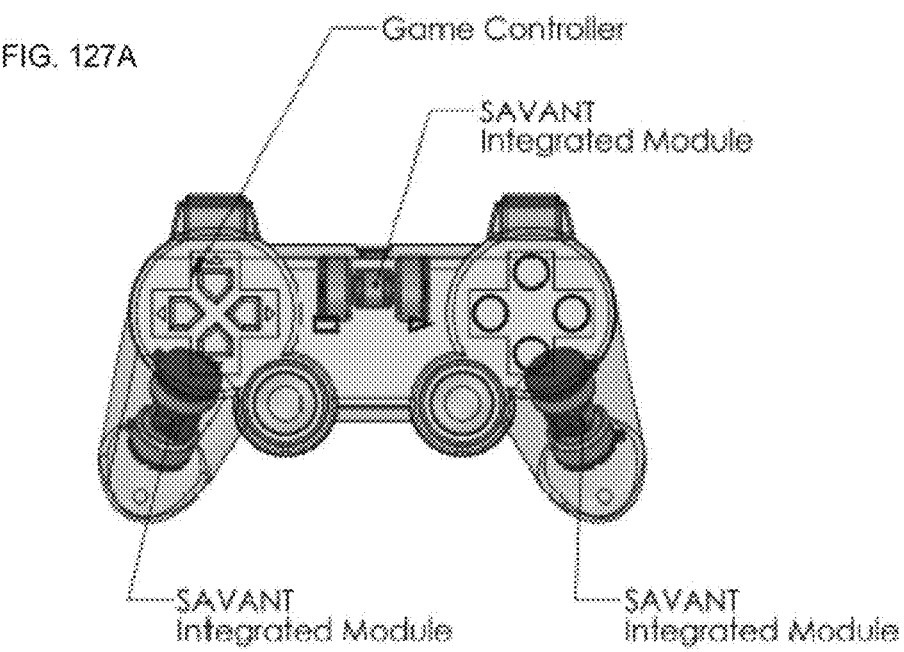
Figure 127B:
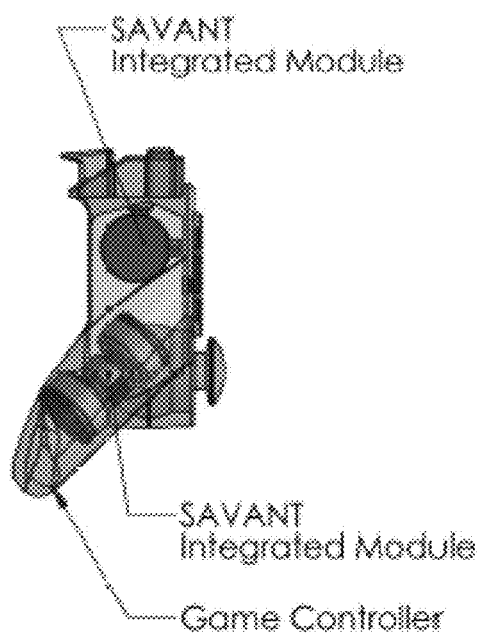
Figure 127C:
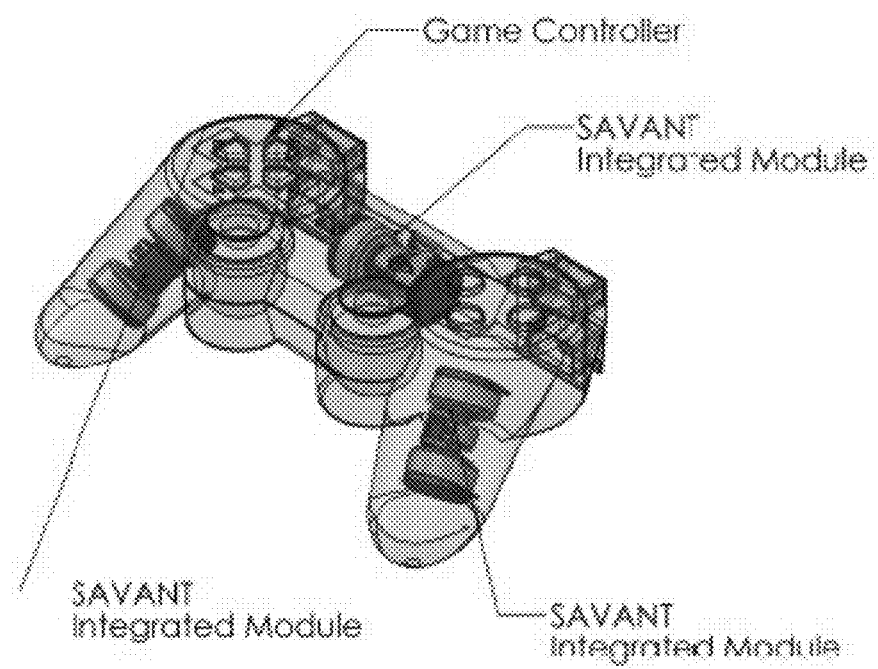

FIGS. 127A-C illustrate a game controller device.

Figure 128A:
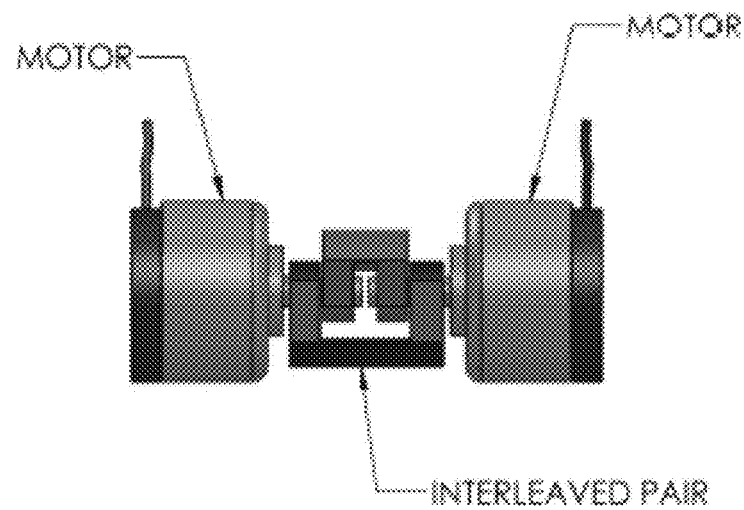
Figure 128B:
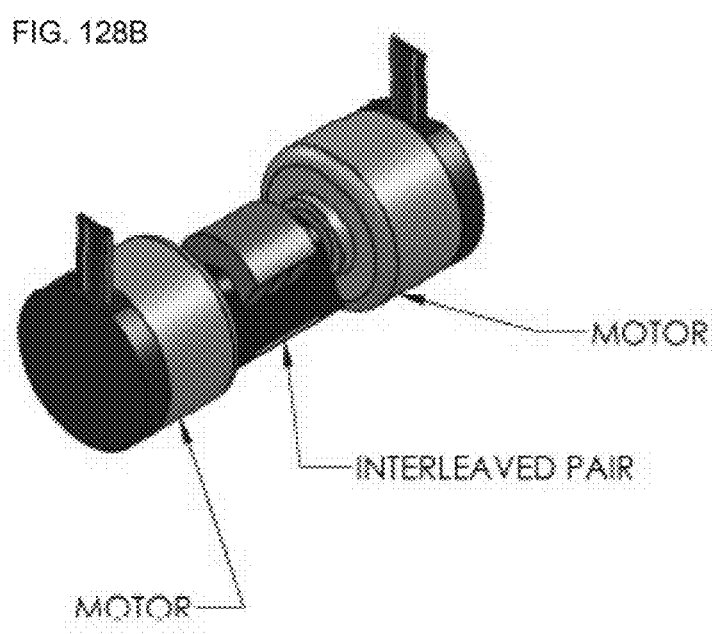

FIGS. 128A-B illustrate interleaved ERMs as manufactured with regard to FIGS. 126A-I.

Figure 129A:
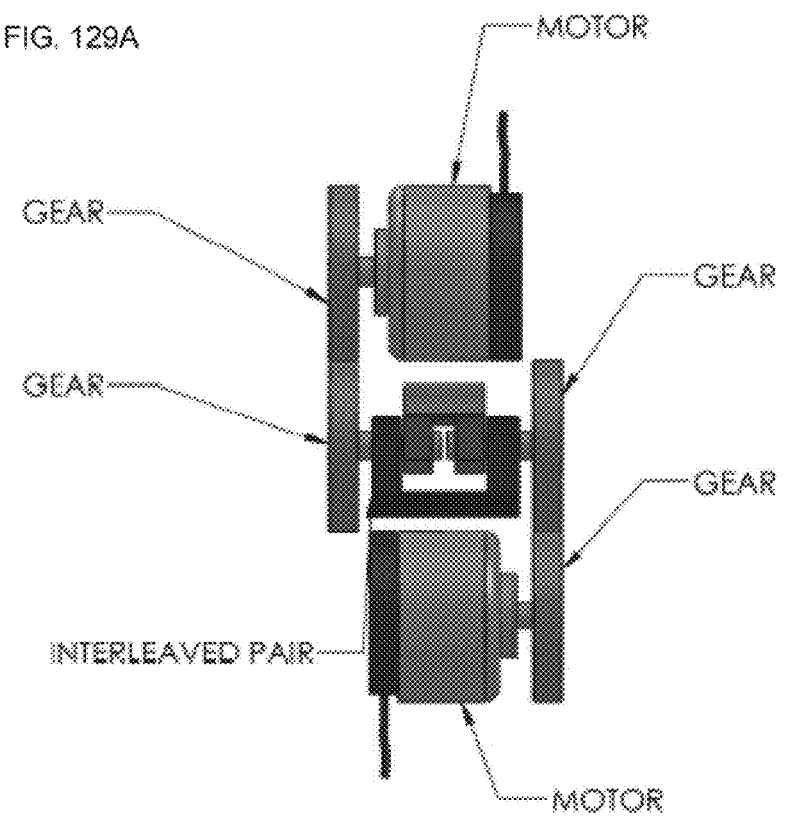
Figure 129B:
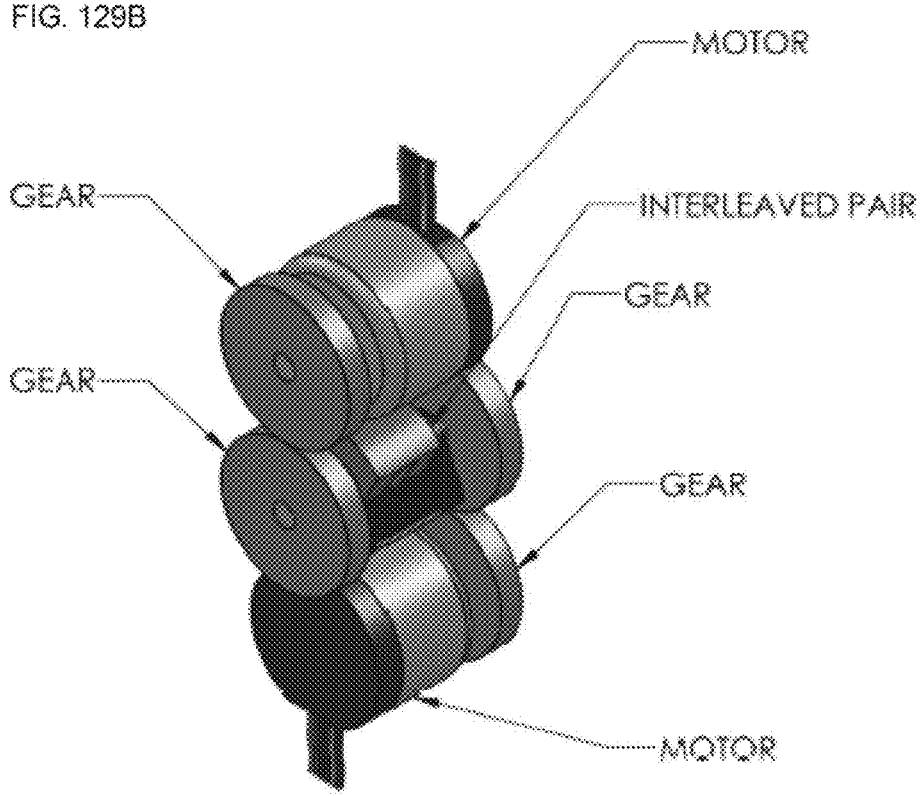

FIGS. 129A and 129B show an embodiment of interleaved ERMs driven by spur gears, in accordance with aspects of the disclosure.

Figure 130A:
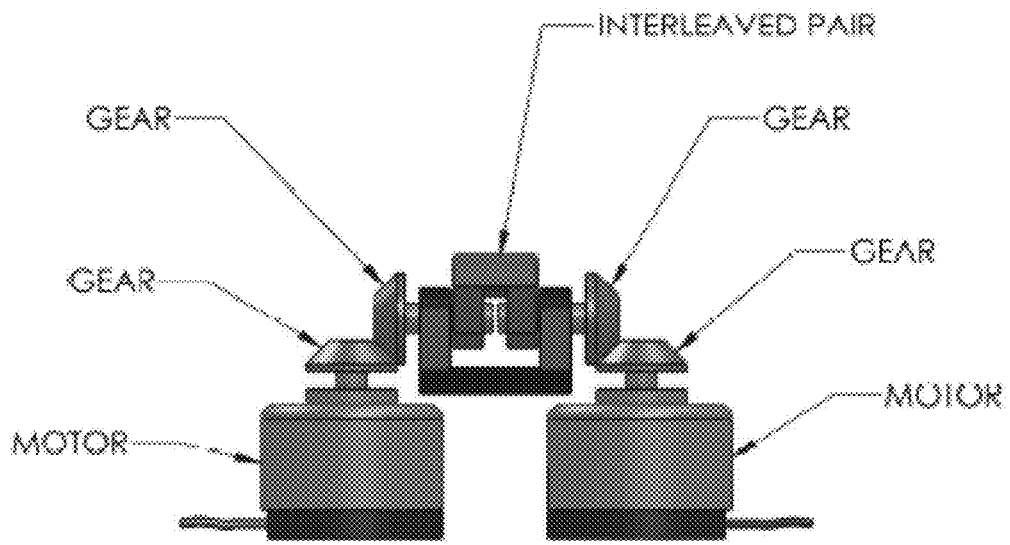
Figure 130B:
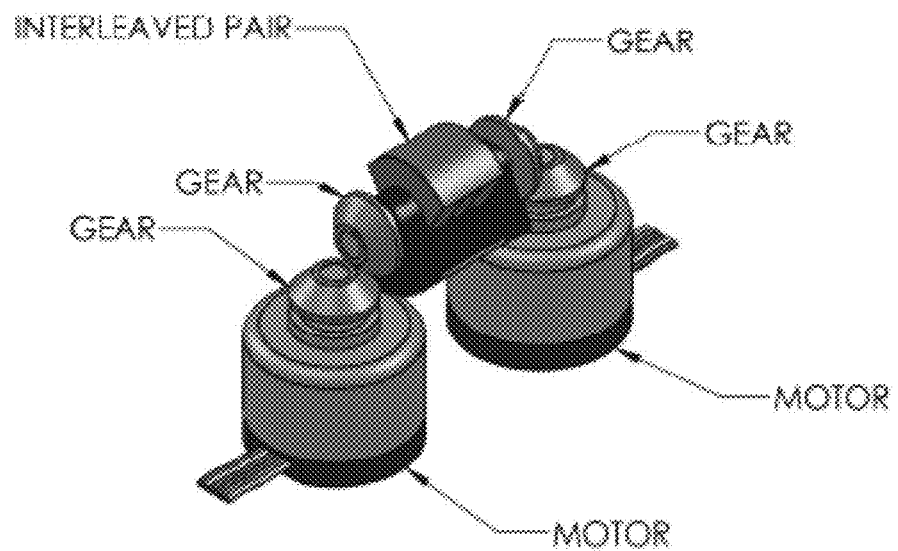

FIGS. 130A and 130B show an embodiment of interleaved ERMs driven by bevel gears, in accordance with aspects of the disclosure.

Figure 131:
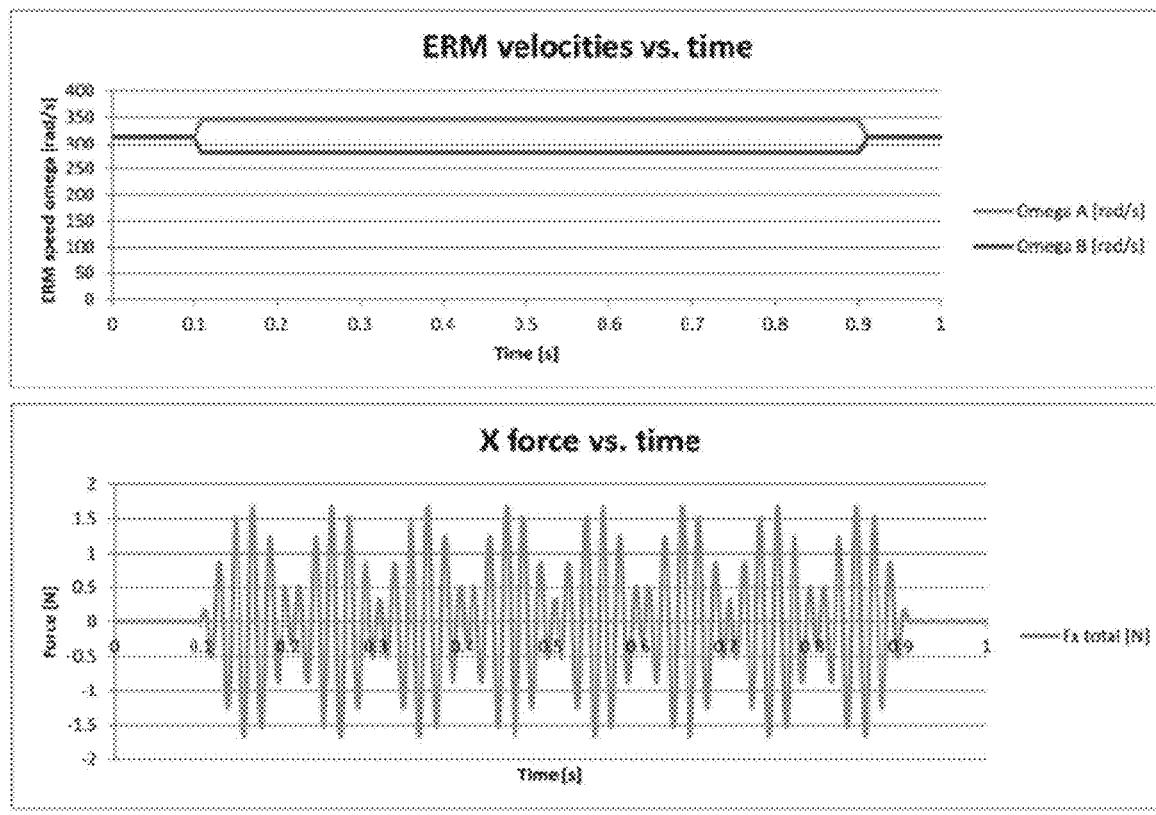
Figure 132:
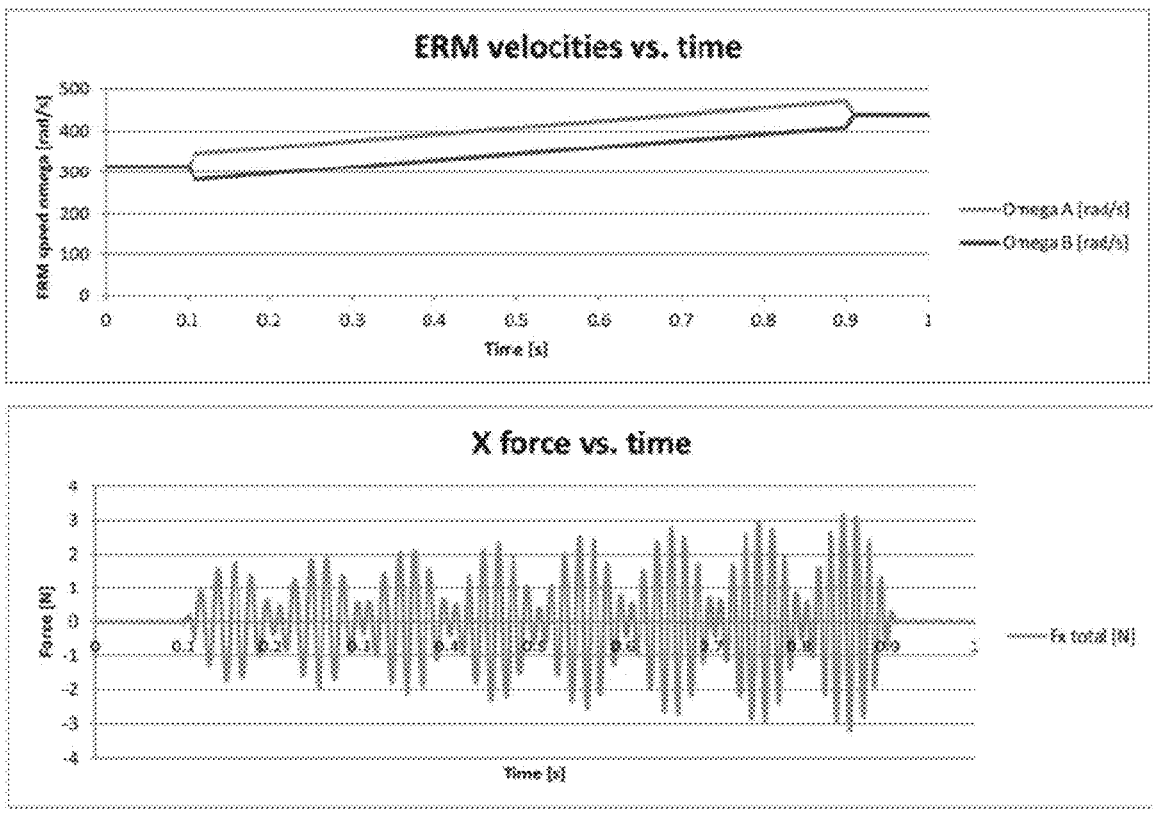
Figure 133:
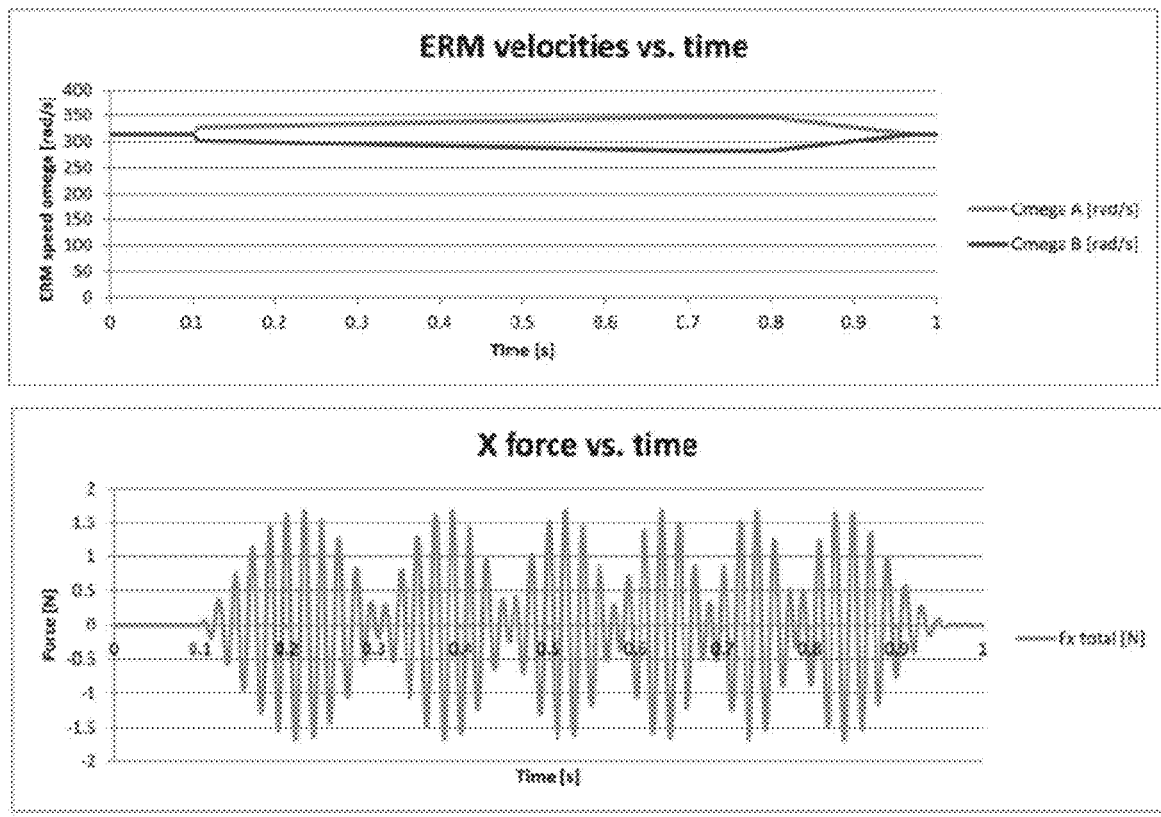

FIGS. 131-133 illustrate examples of beating patterns for a pair of co-rotating ERMs with equal eccentricities, in accordance with aspects of the disclosure.

FIG. 134 shows a top-level block diagram of an example MOHAWK Sensor System.

FIG. 135 shows a traditional ERM with a single sensor for position sensing.

FIG. 136 shows four example targets for use in a MOHAWK Sensor System.

FIG. 137 shows a possible sensor location for sensing position in the radial direction.

FIG. 138 shows a possible sensor location for sensing position in the axial direction.

FIG. 139 shows a possible sensor location and magnet location, for use with ferromagnetic target and magnetic sensor.

FIG. 140 shows an ERM where the eccentric mass is used as the sensor target.

FIG. 141 shows four equal eccentric masses/sensor targets, driven by four motors.

FIG. 142 shows three eccentric masses/sensor targets driven by three motors, where the center eccentric mass/target has twice the mass of each of the outer eccentric masses/targets.

FIG. 143 shows an exploded view of the system in FIG. 142.

FIG. 144 shows a GEMINI module with example MOHAWK position sensing.

FIG. 145 establishes the equivalence of a GEMINI module with a SAVANT node.

FIG. 146 shows linear arrays of GEMINI modules.

Figure 147A:
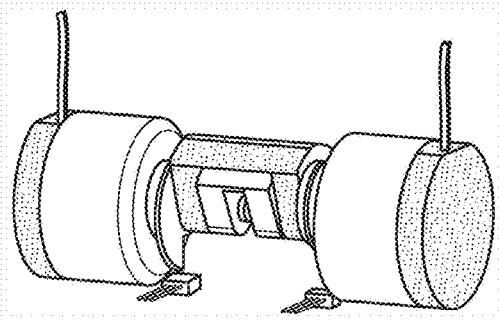
Figure 147B:
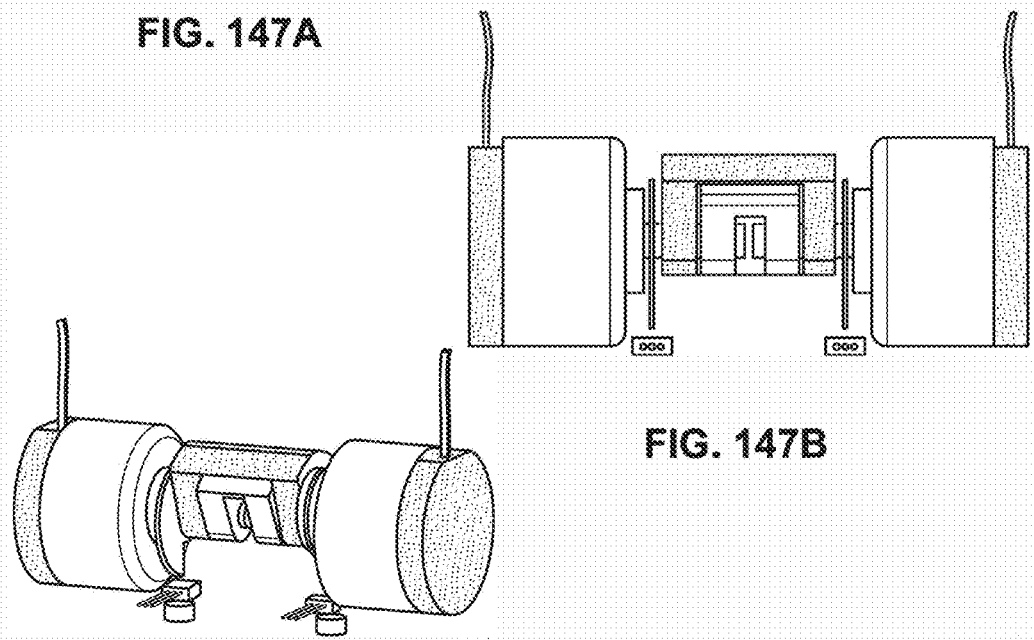
Figure 147C:
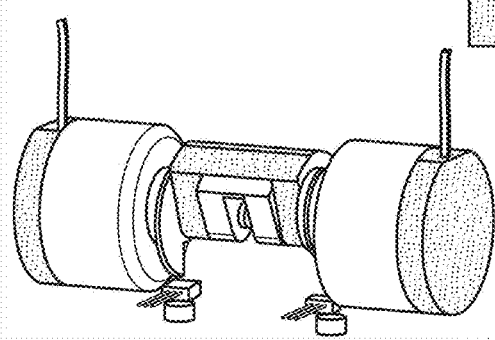
Figure 147D:
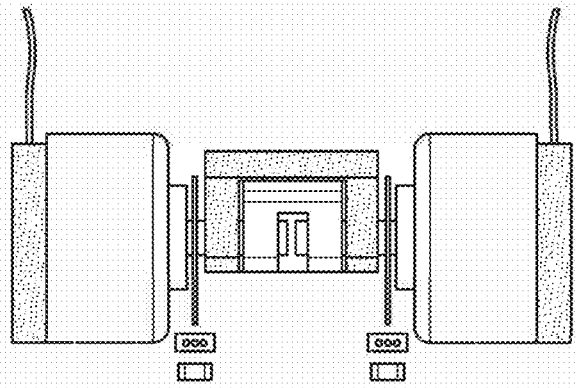

FIGS. 147A-B illustrate an example of an assembled GEMINI module without magnets, and FIGS. 147C-D illustrate the assembled GEMINI module with magnets.

Figure 148:
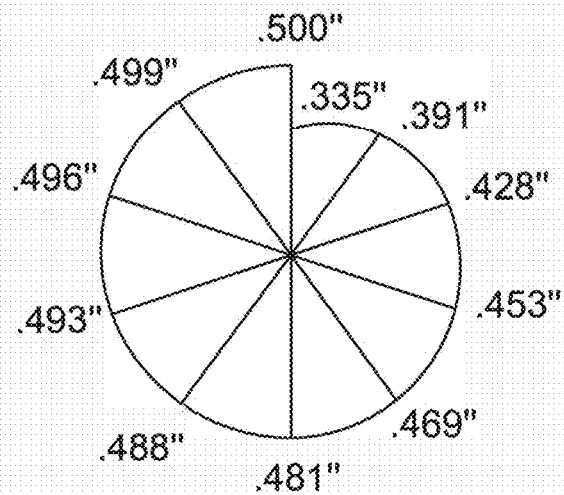

FIG. 148 illustrates a log taper for a target used in accordance with aspects of the disclosure.

Figure 149A:
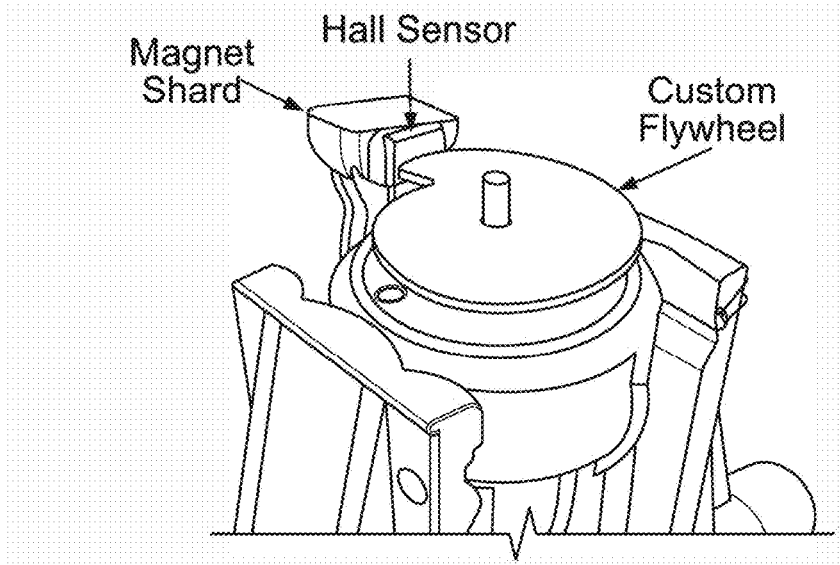
Figure 149B:
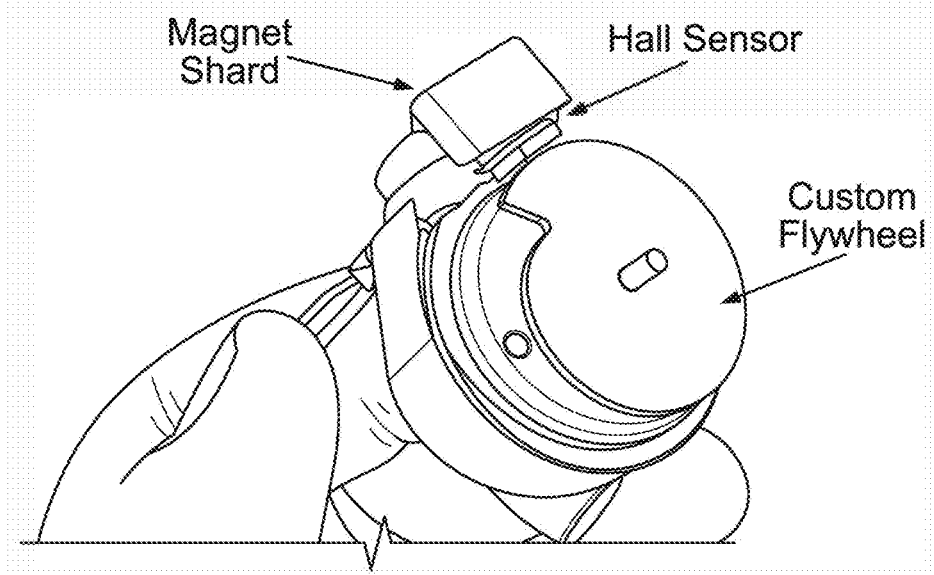

FIGS. 149A-B illustrate a physical setup of a MOHAWK Drive device in accordance with aspects of the disclosure.

Figure 150A:
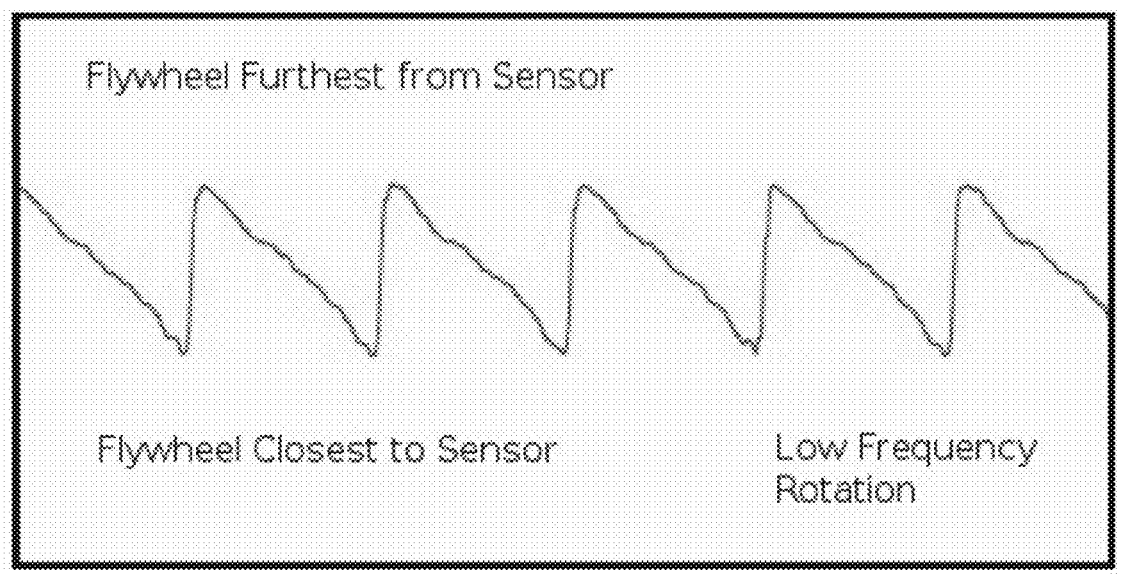
Figure 150B:
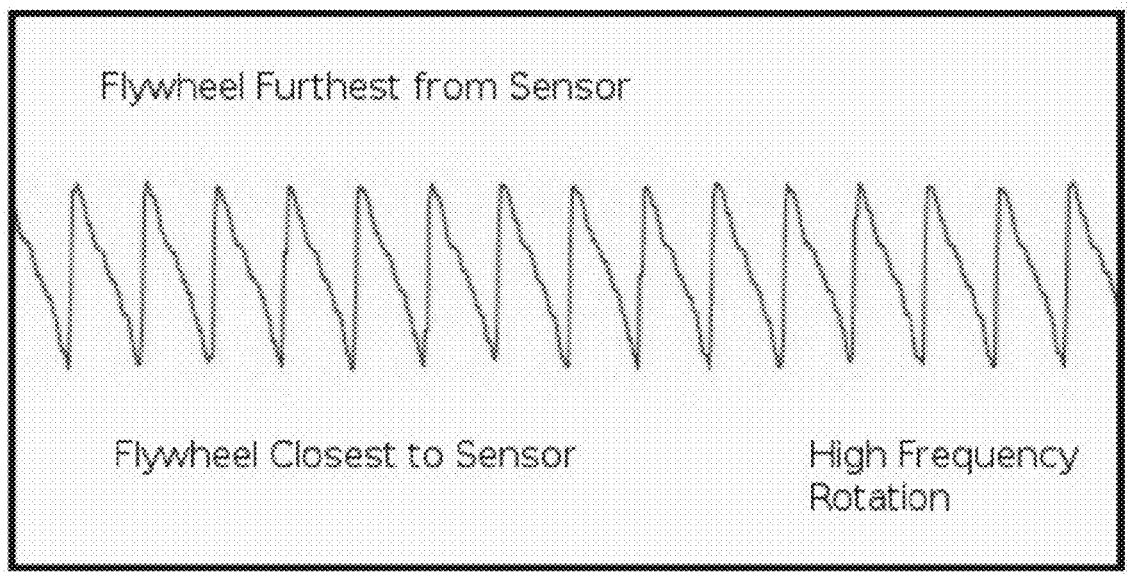

FIGS. 150A-B illustrate measured Hall sensor values for the physical setup of FIGS. 149A-B.

Figure 151:
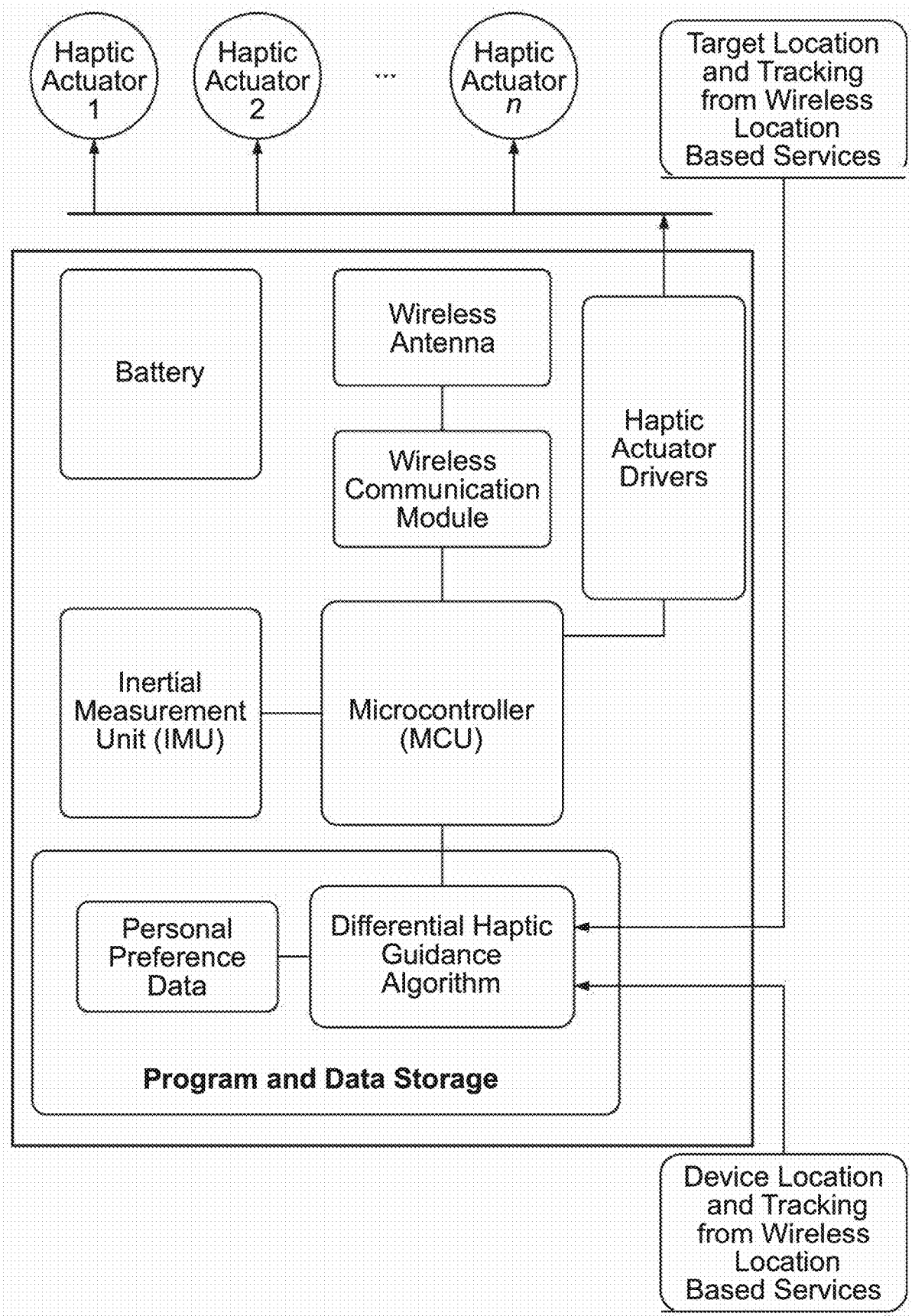

FIG. 151 is a system level diagram of a wearable haptic device with haptic actuators and a differential haptic guidance algorithm in accordance with aspects of the disclosure.

Figure 152:
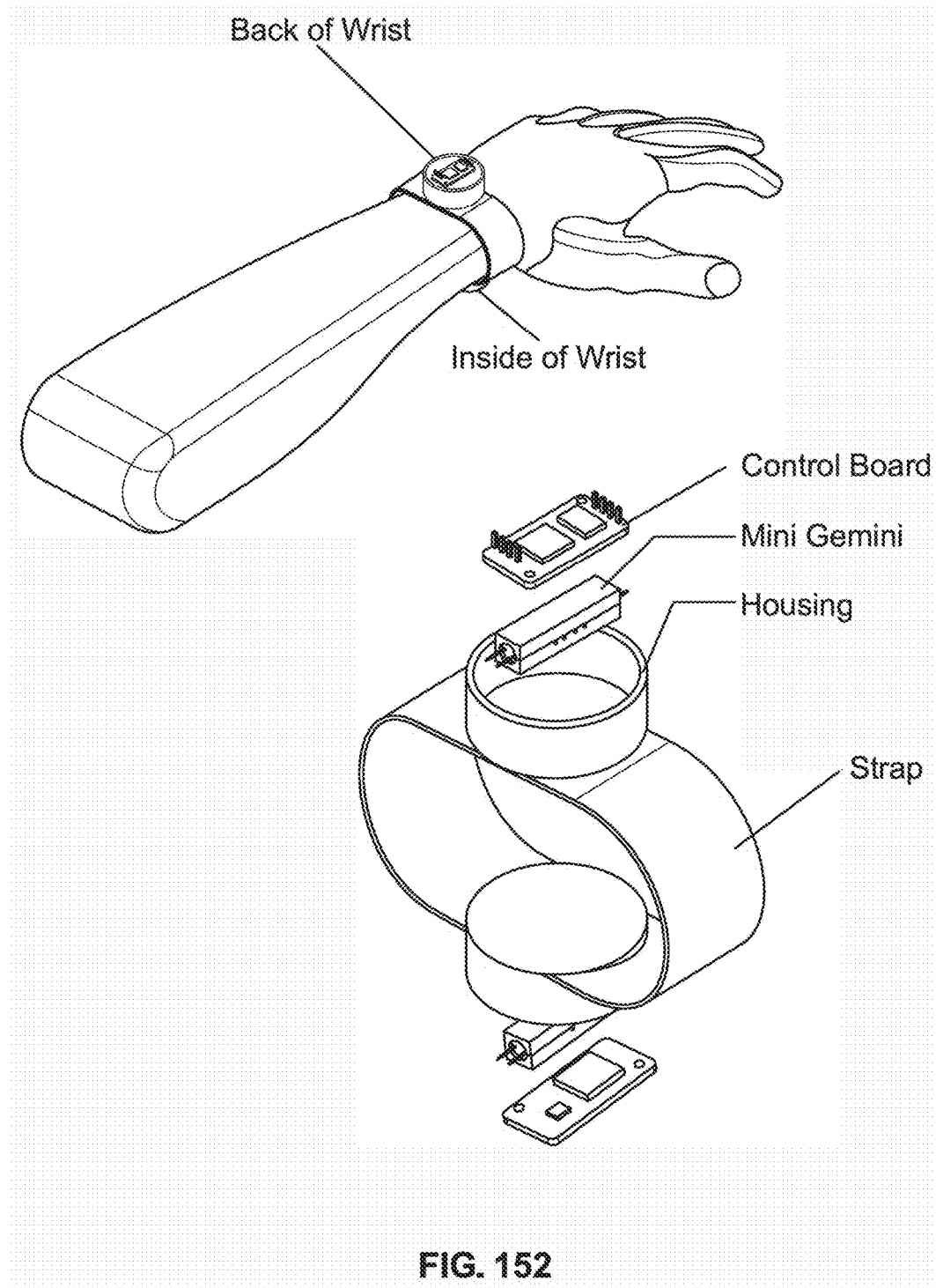

FIG. 152 is an example of a wearable haptic device with two mini Gemini Drives.

Figure 153:
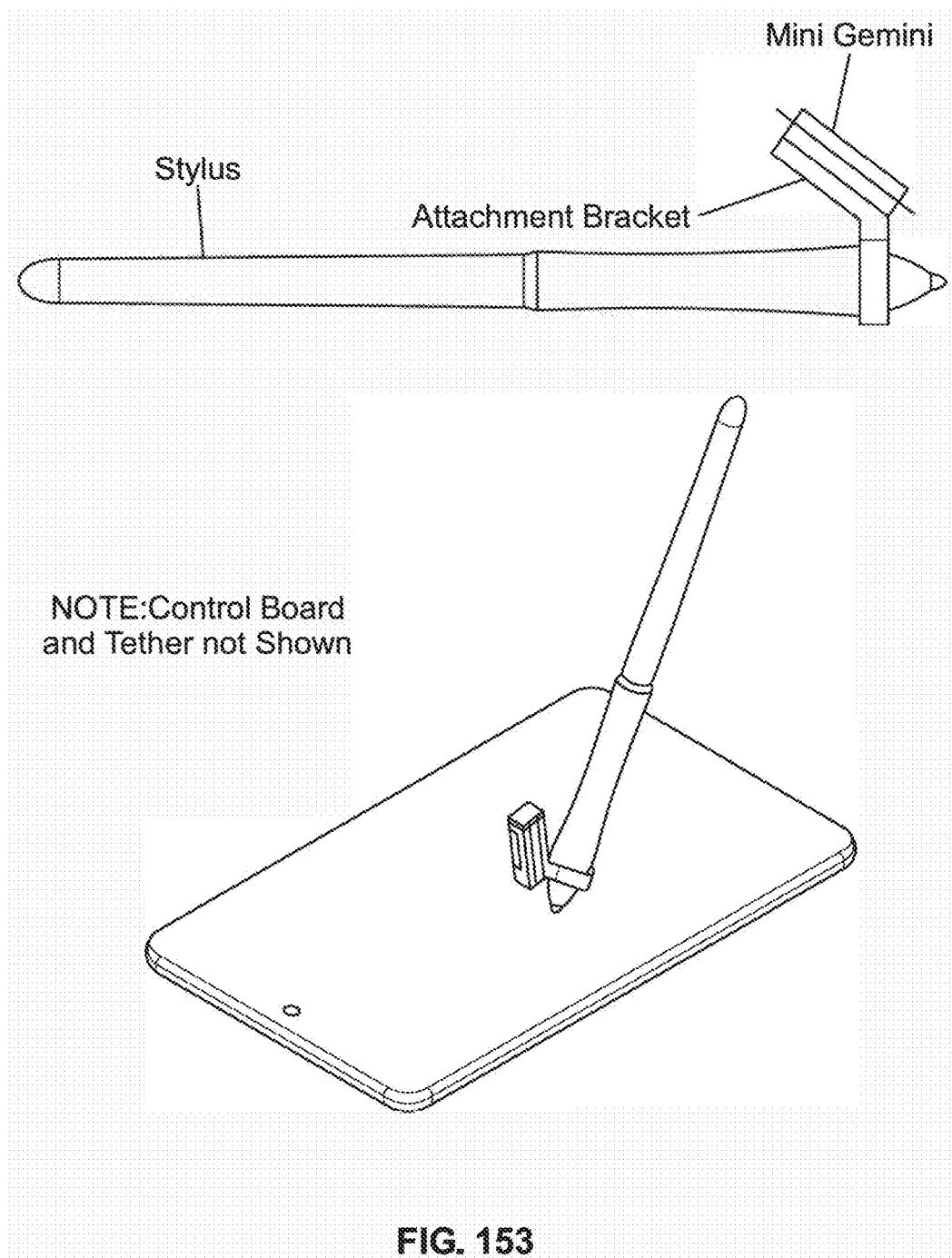

FIG. 153 is an example of a haptic stylus device with a mini Gemini Drive.

Figure 154:
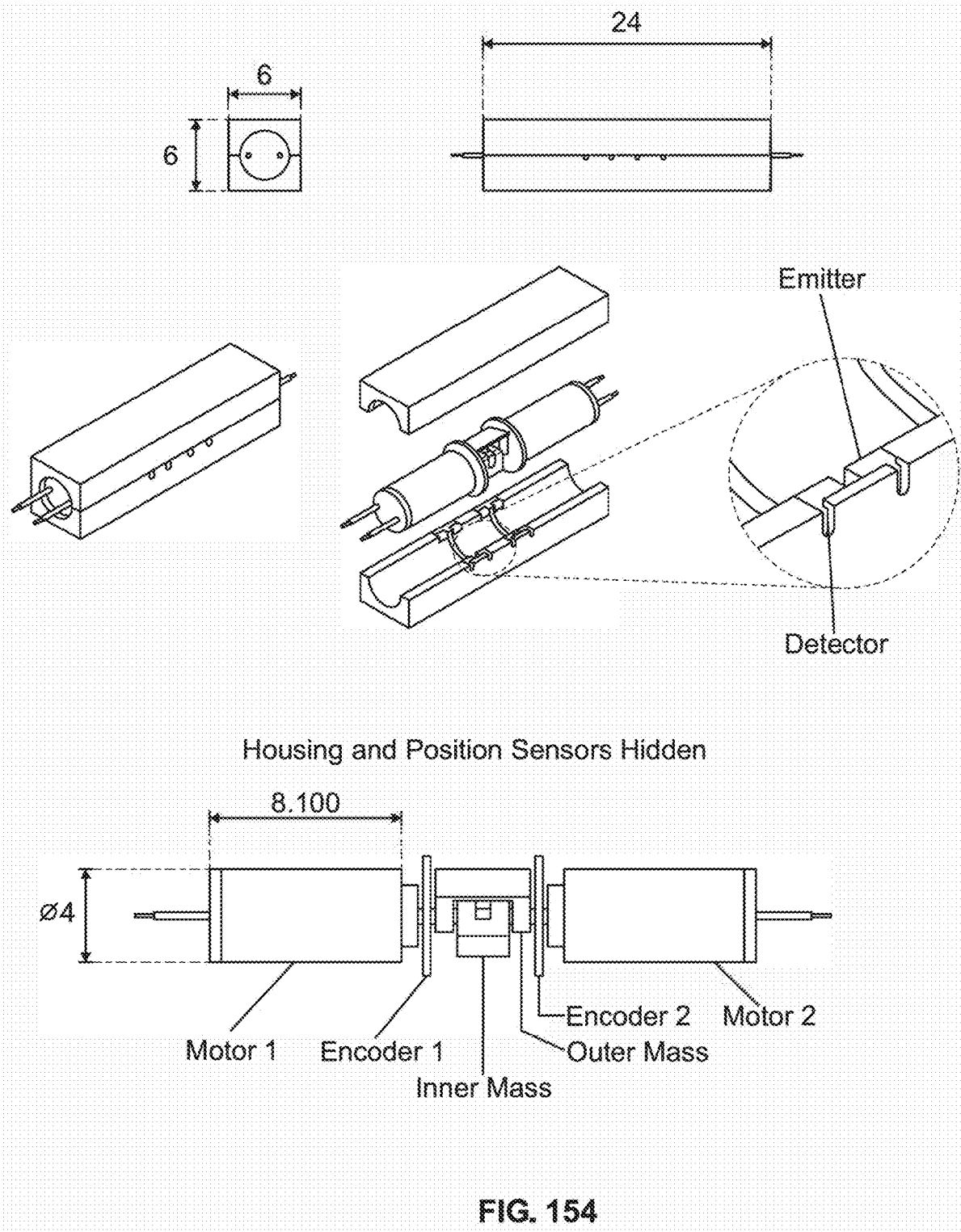

FIG. 154 is an exploded view and a side view of a mini Gemini Drive.

Figure 155A:
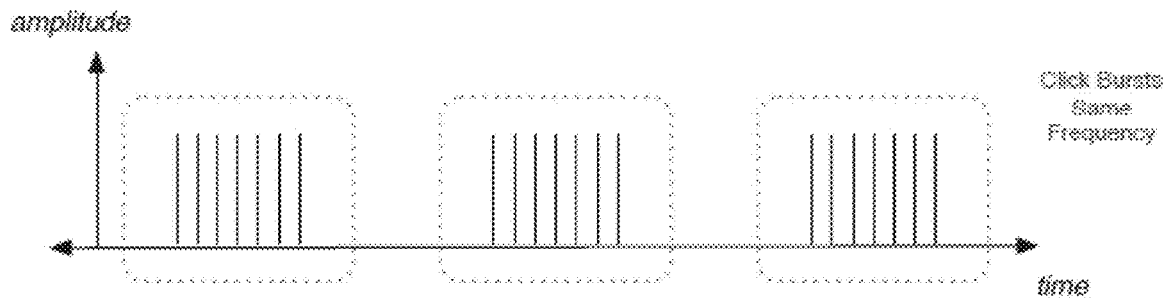
Figure 155B:
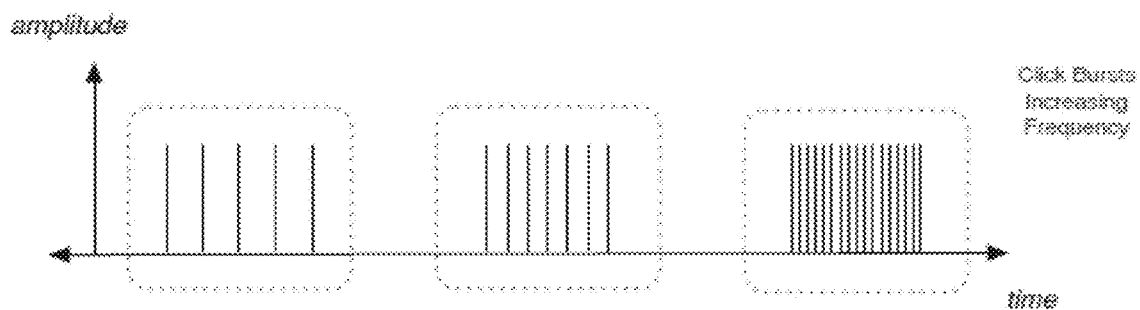

FIGS. 155A and 155B illustrate various click bursts in accordance with aspects of the disclosure.

Figure 156A:
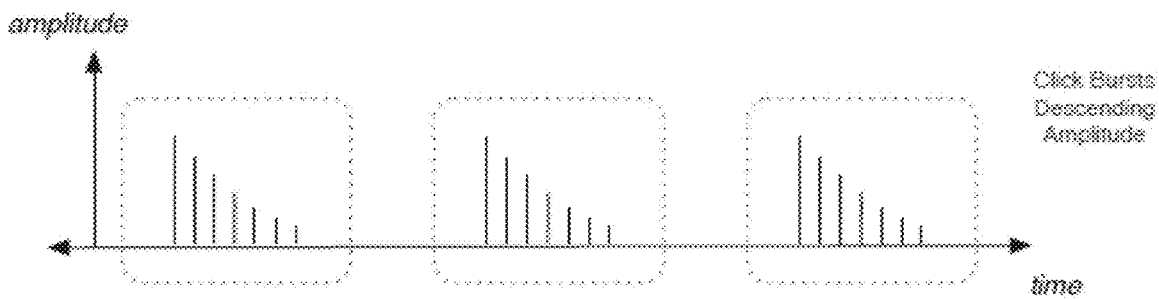
Figure 156B:
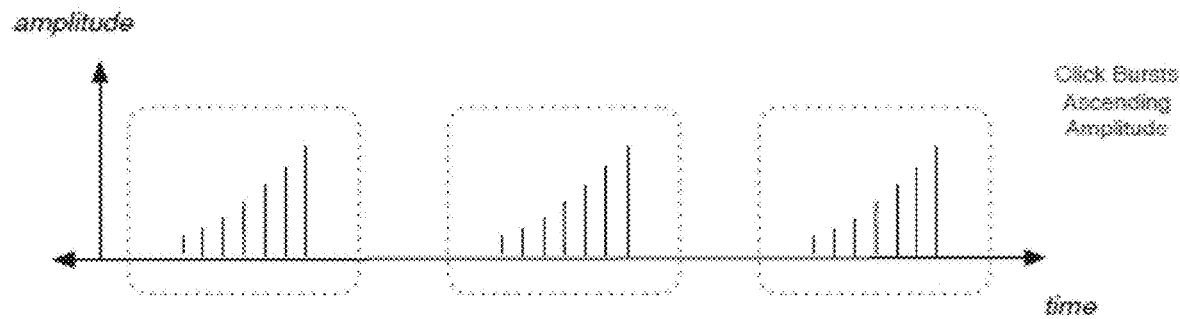

FIGS. 156A and 156B illustrate various ascending and descending click bursts in accordance with aspects of the disclosure.

Figure 157:
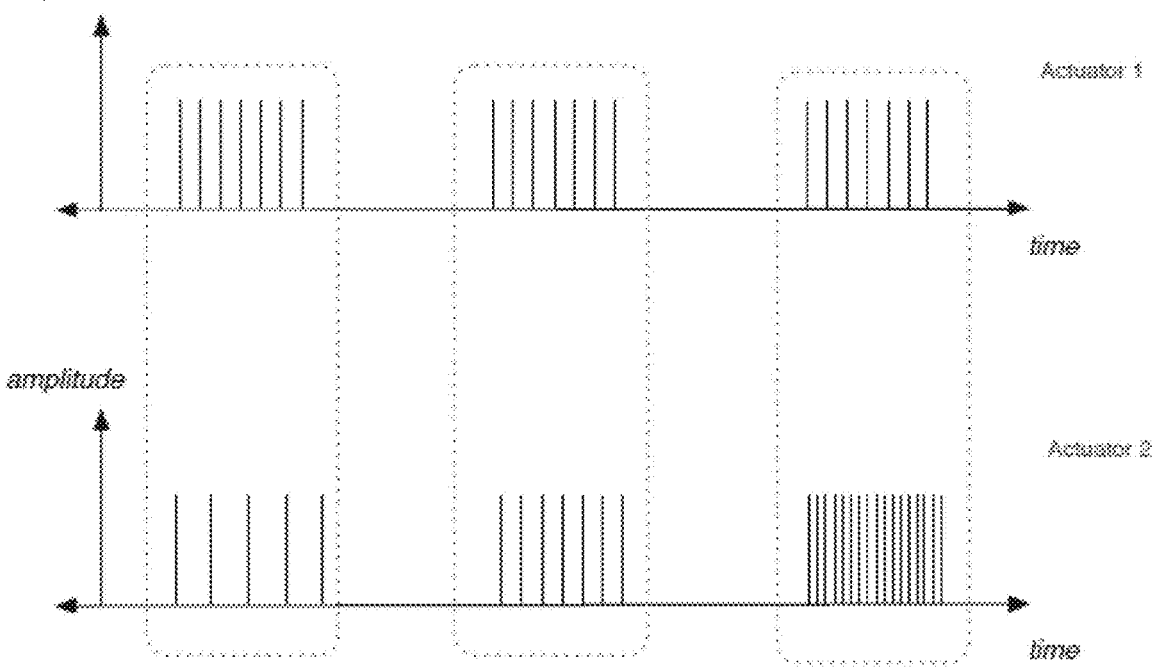

FIG. 157 illustrates how a person may compare pairs of click bursts across distal actuators in accordance with aspects of the disclosure.

Figure 158:
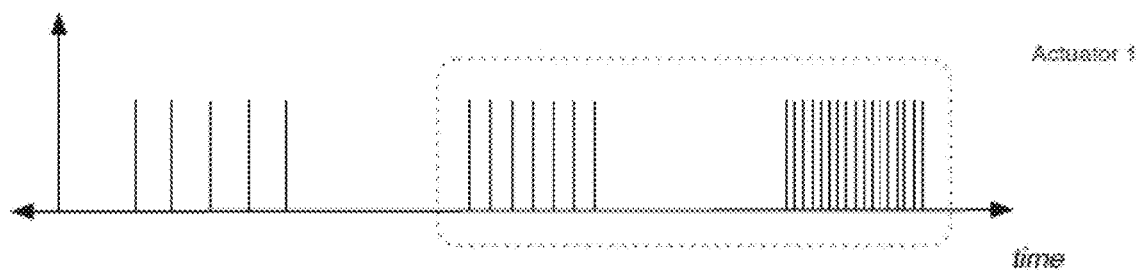

FIG. 158 illustrates how a person may compare pairs of click bursts across time in accordance with aspects of the disclosure.

Figure 159A:
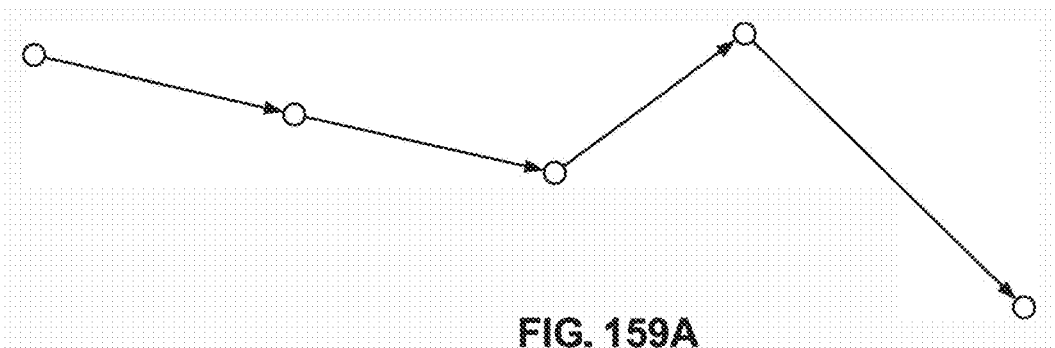
Figure 159B:
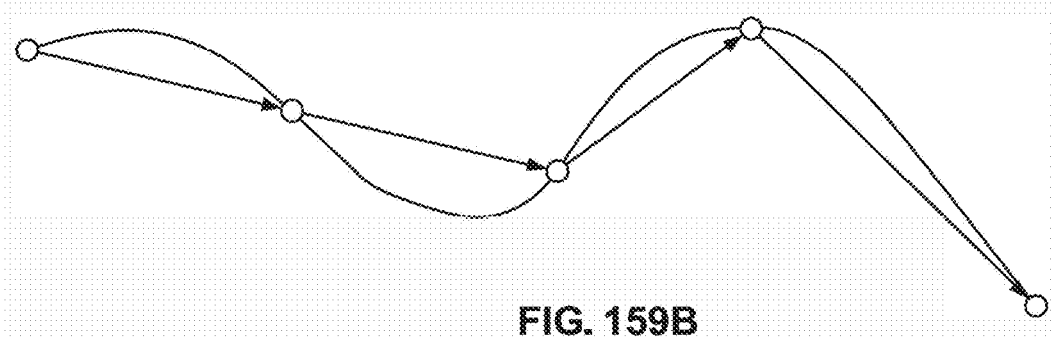

FIGS. 159A and 159B illustrate smooth and segmented paths through waypoints in accordance with aspects of the disclosure.

Figure 160:
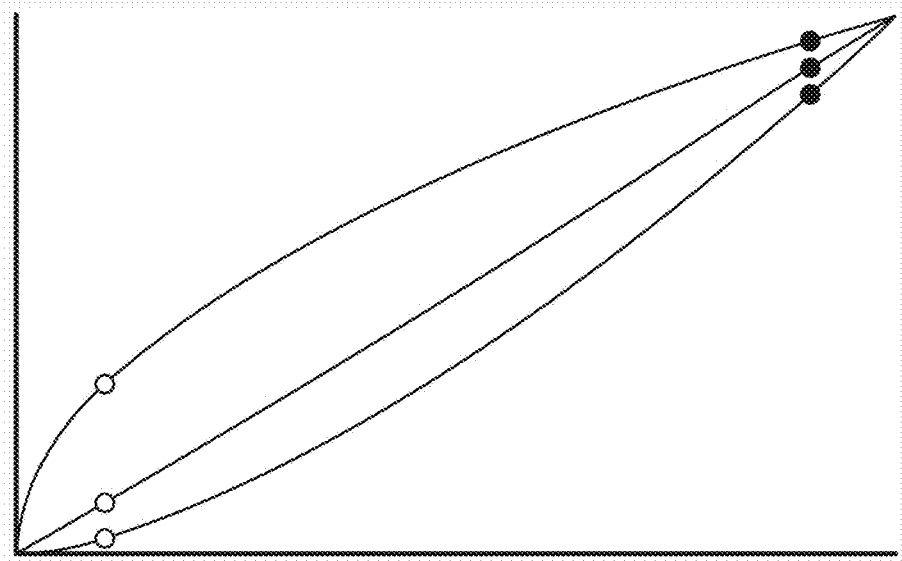

FIG. 160 illustrates three haptic gradients in accordance with aspects of the disclosure.

Figure 161:
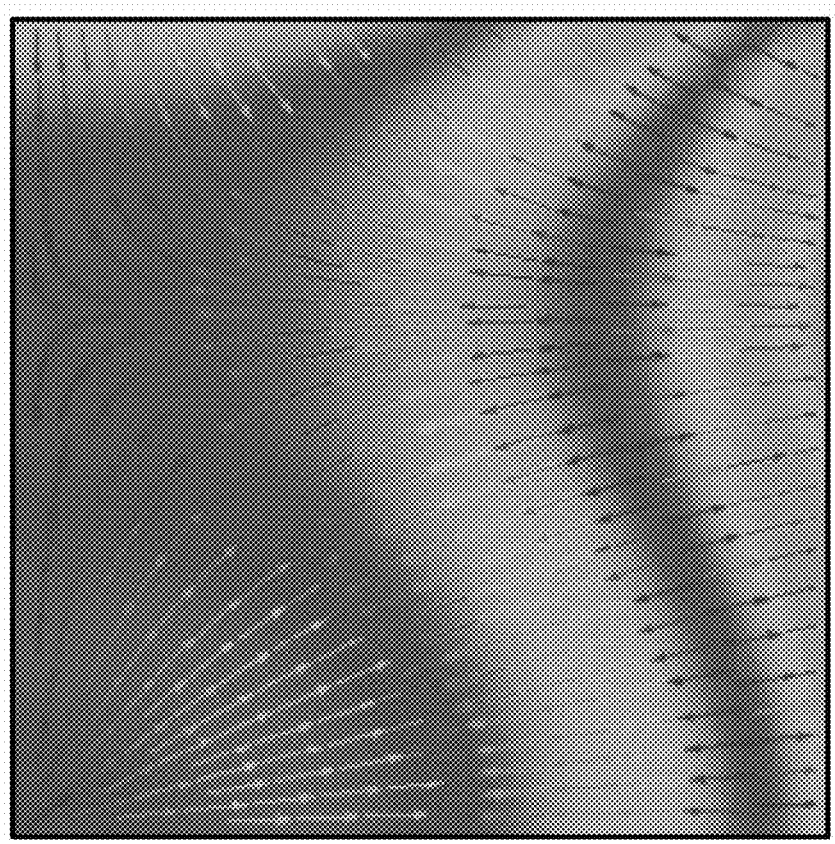

FIG. 161 illustrates a vector field for haptic guidance in accordance with aspects of the disclosure.

Figure 162:
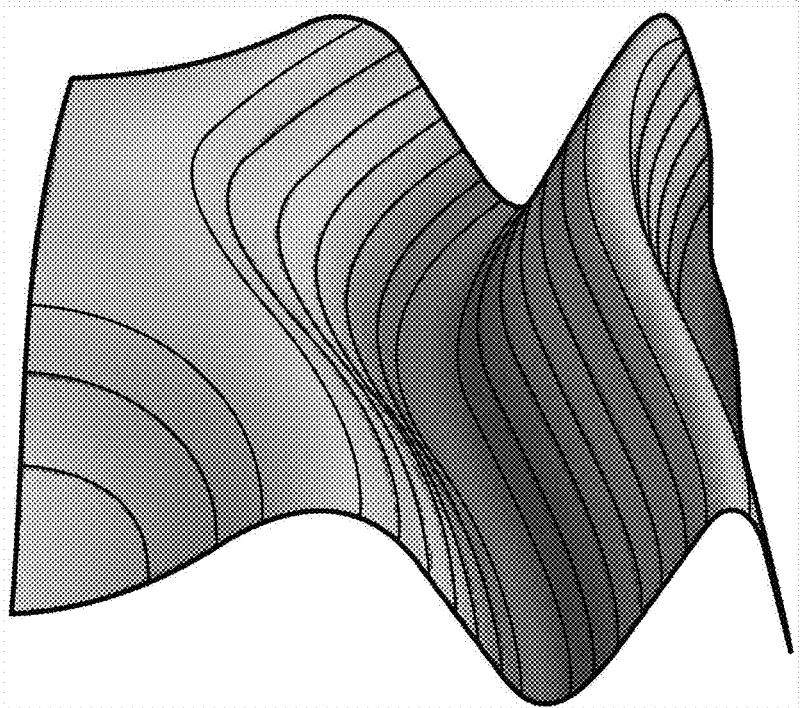

FIG. 162 illustrates a topographic map for haptic guidance in accordance with aspects of the disclosure.

Figure 163:
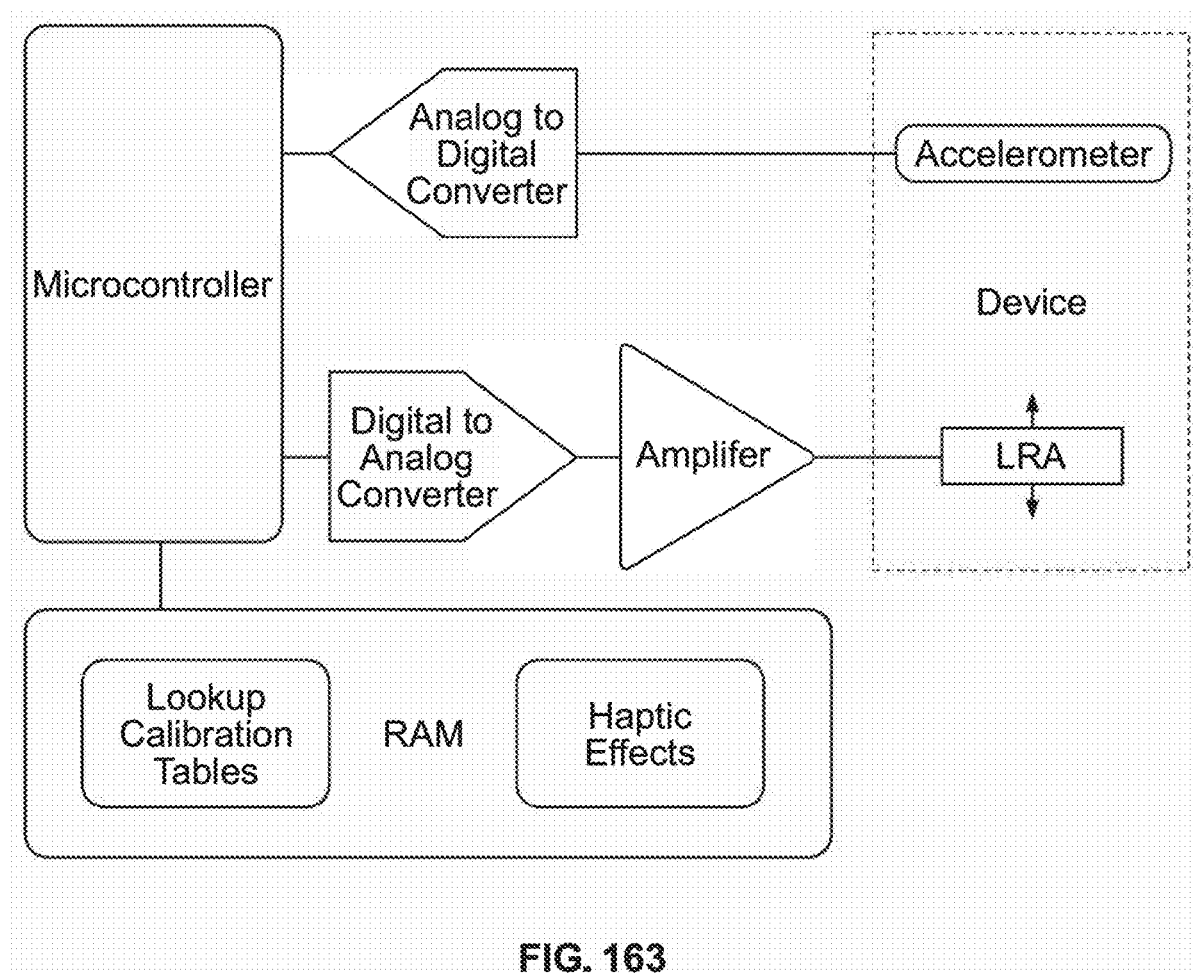

FIG. 163 is a system level view of an example system to drive a single LRA.

Figure 164:
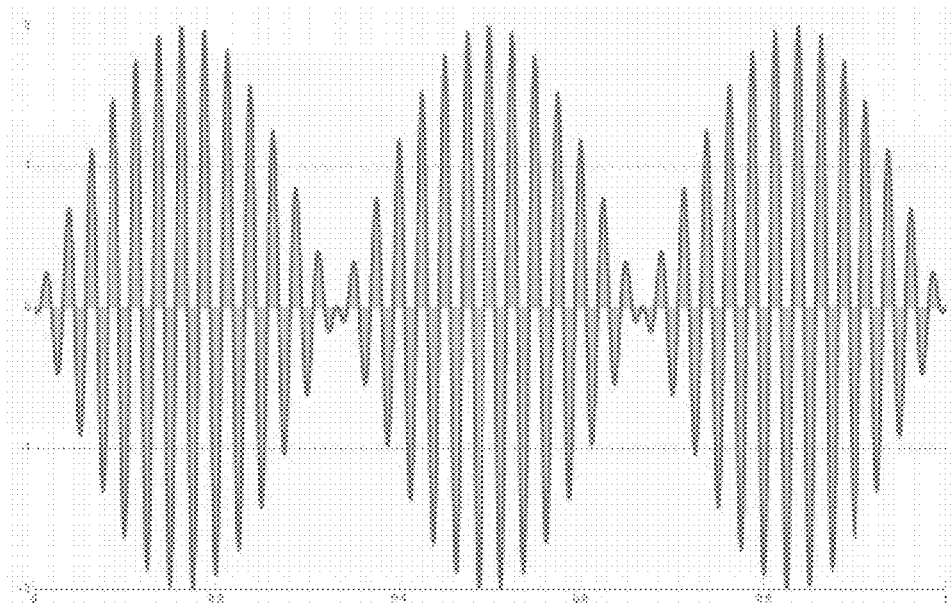

FIG. 164 is a graph of an example of the output of beats from a single LRA.

Figure 165:
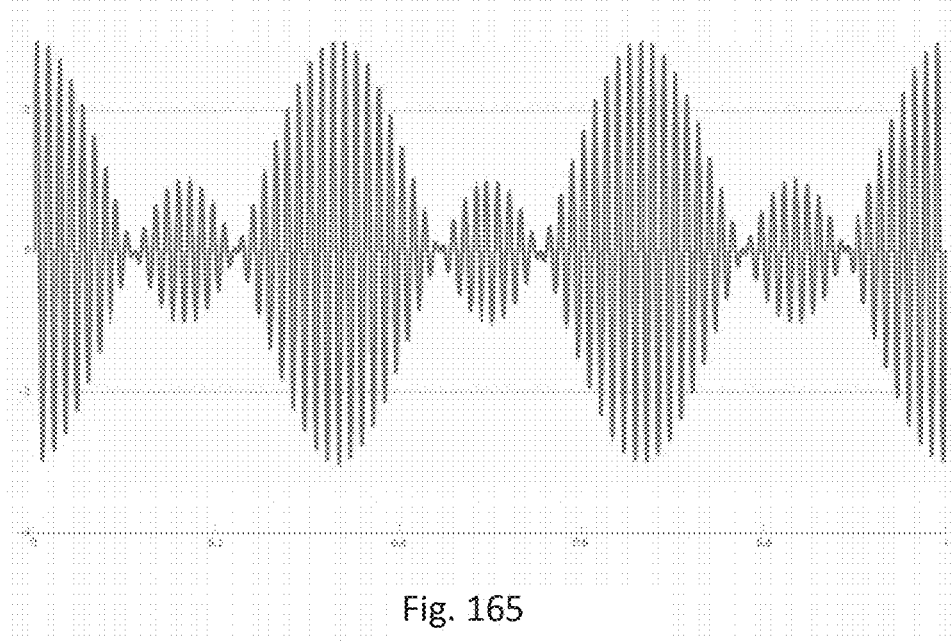

FIG. 165 is a graph of an example of the output of superbeats from a single LRA.

Figure 166:
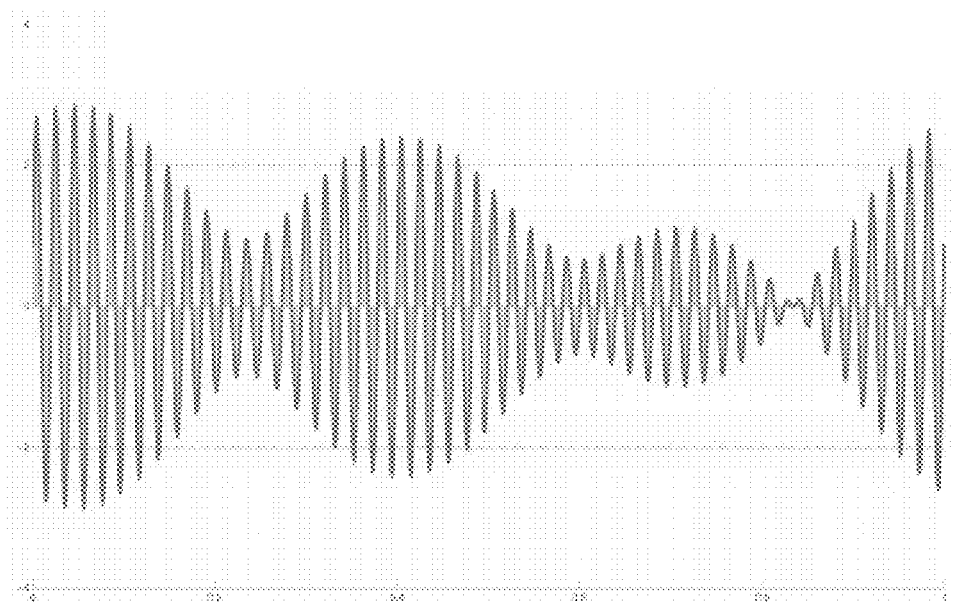

FIG. 166 is a graph of an example of a waveform formed from three mixed sine waves being output from a single LRA.

Figure 167:
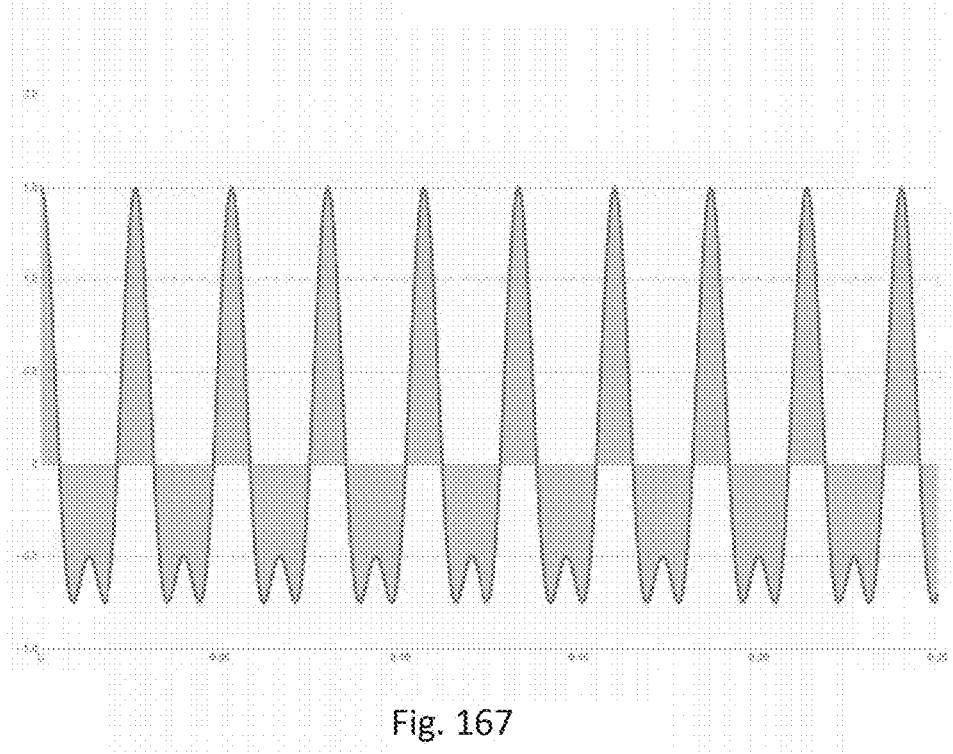

FIG. 167 is a graph of an example of an asymmetric waveform having two harmonics being output from a single LRA.

FIGS. 168A-B illustrate side and cross-sectional views of a compact LRA arrangement for spatial beating with two LRAs.

FIGS. 169A-B illustrate side and cross-sectional views of a compact LRA arrangement for spatial beating with two LRAs.

FIGS. 170A-B illustrate side and cross-sectional views of a compact LRA arrangement for spatial beating with three LRAs.

FIGS. 171A-B illustrate side and cross-sectional views of a compact LRA arrangement for spatial beating with three LRAs.

FIGS. 172A-B illustrate side and cross-sectional views of a compact LRA arrangement for spatial beating with four LRAs.

FIGS. 173A-B illustrate side and cross-sectional views of a compact LRA arrangement for spatial beating with four LRAs.

FIGS. 174A-B illustrate side and cross-sectional views of a compact LRA arrangement for spatial beating with four LRAs.

FIGS. 175A-B illustrate side and cross-sectional views of a compact LRA arrangement for spatial beating with four LRAs.

FIG. 176A illustrates two rigidly attached orthogonal LRAs moving along a mechanically grounded surface.

FIG. 176B illustrates two rigidly attached non-orthogonal LRAs moving along a mechanically grounded surface.

FIG. 176C illustrates two rigidly attached orthogonal LRAs moving along a mechanically grounded surface.

FIG. 176D illustrates a Gemini Drive with a rotatable vibration axis moving along a mechanically grounded surface.

FIG. 177 illustrates a Coaster Robot with Left and Right LRA Stiction Drives.

Figure 178A:
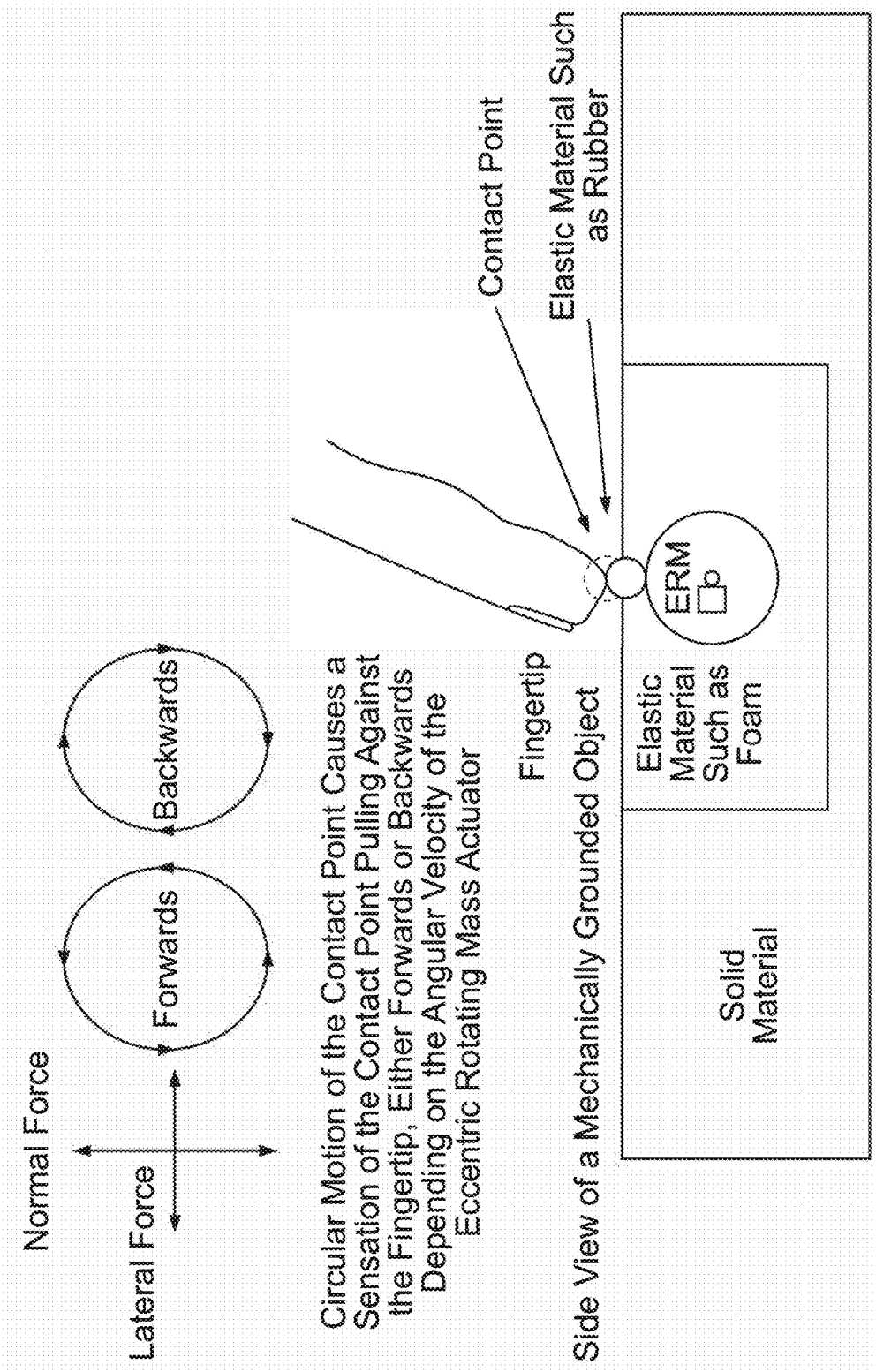

FIG. 178A illustrates an Elliptical Drive with an ERM embedded in an elastic region with a nub contact.

Figure 178B:
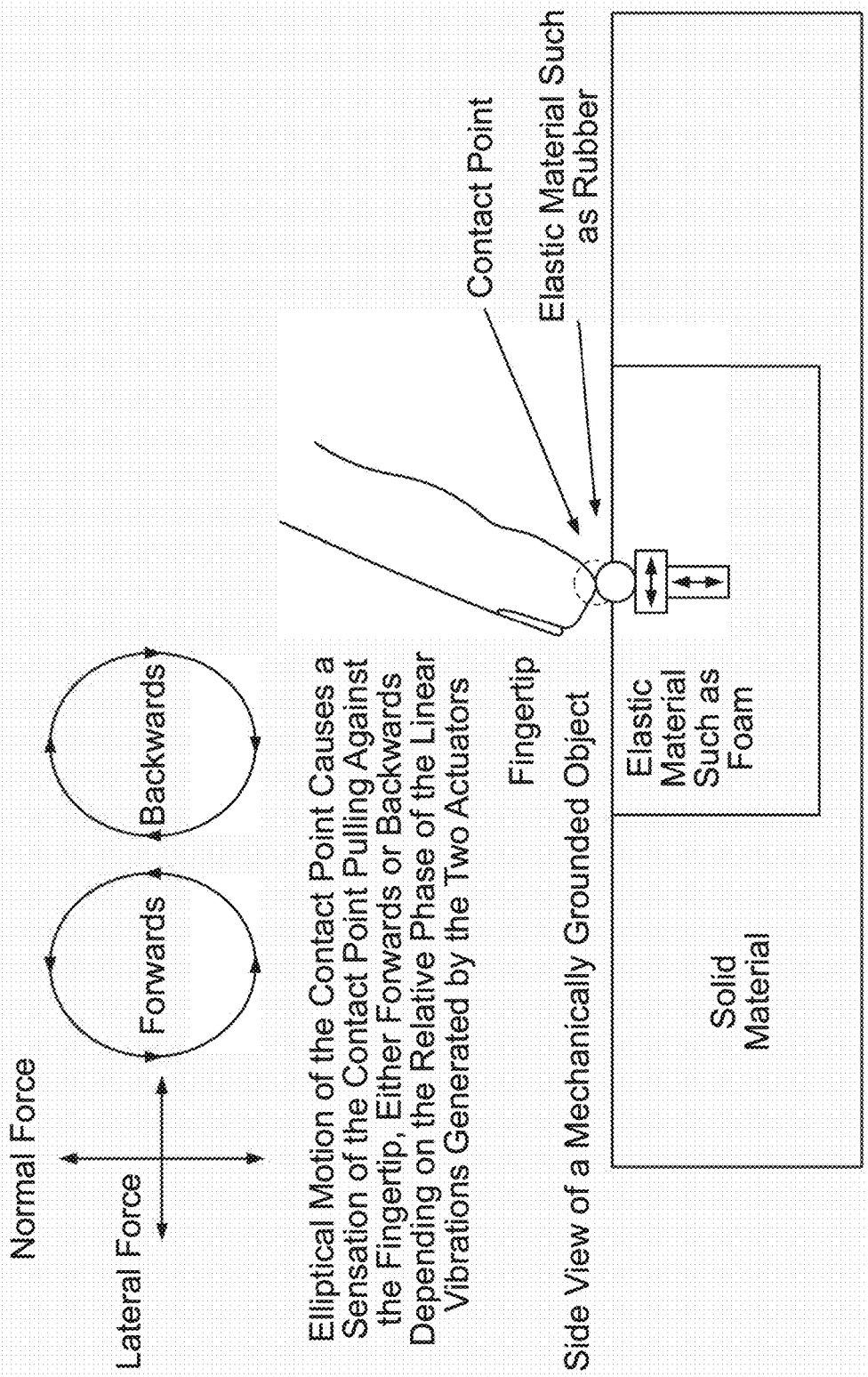

FIG. 178B illustrates an Elliptical Drive with dual LRAs embedded in an elastic region with a nub contact.

Figure 178C:
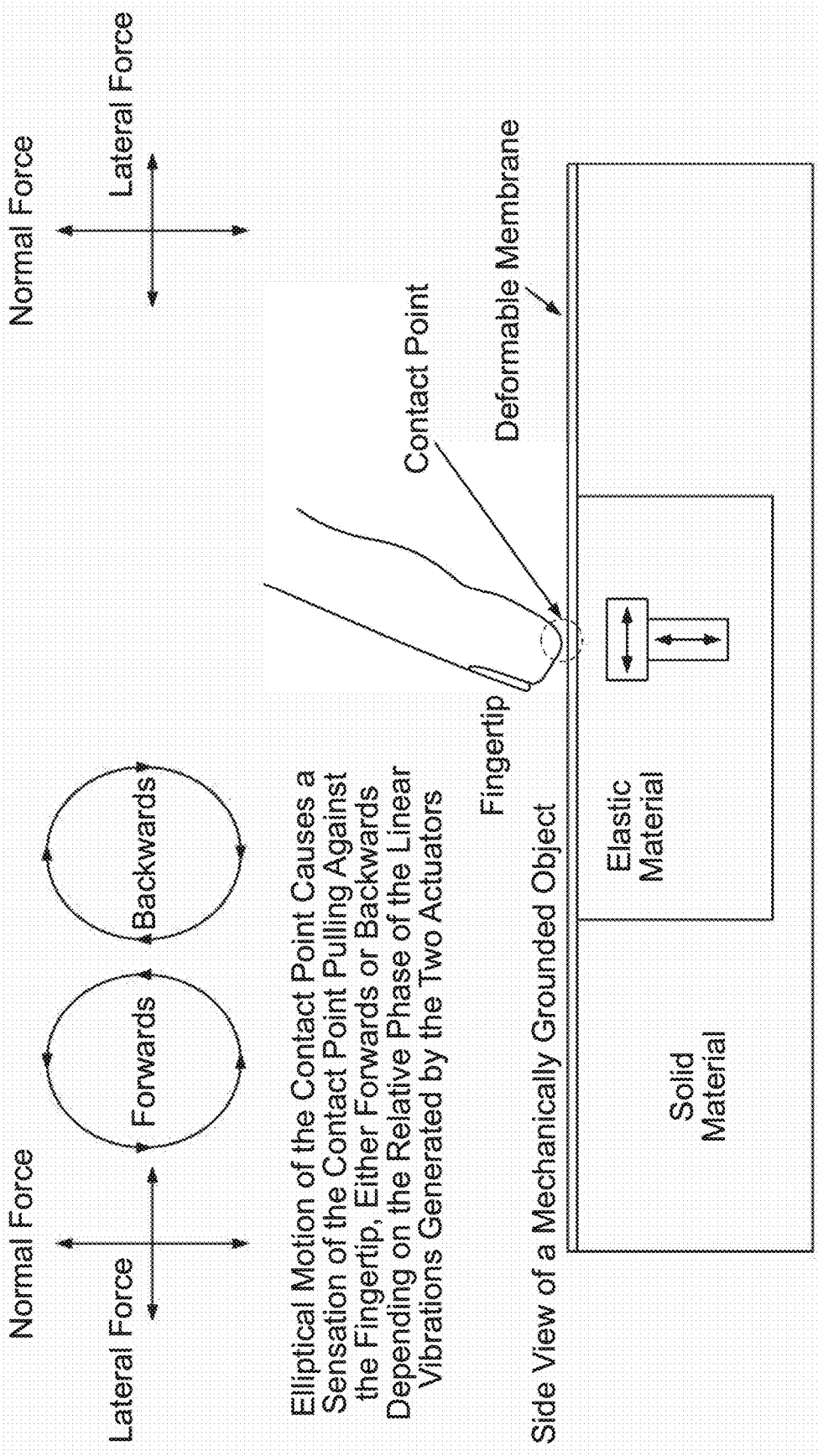

FIG. 178C illustrates an Elliptical Drive with dual LRAs embedded in an elastic region with a deformable membrane.

Figure 179:
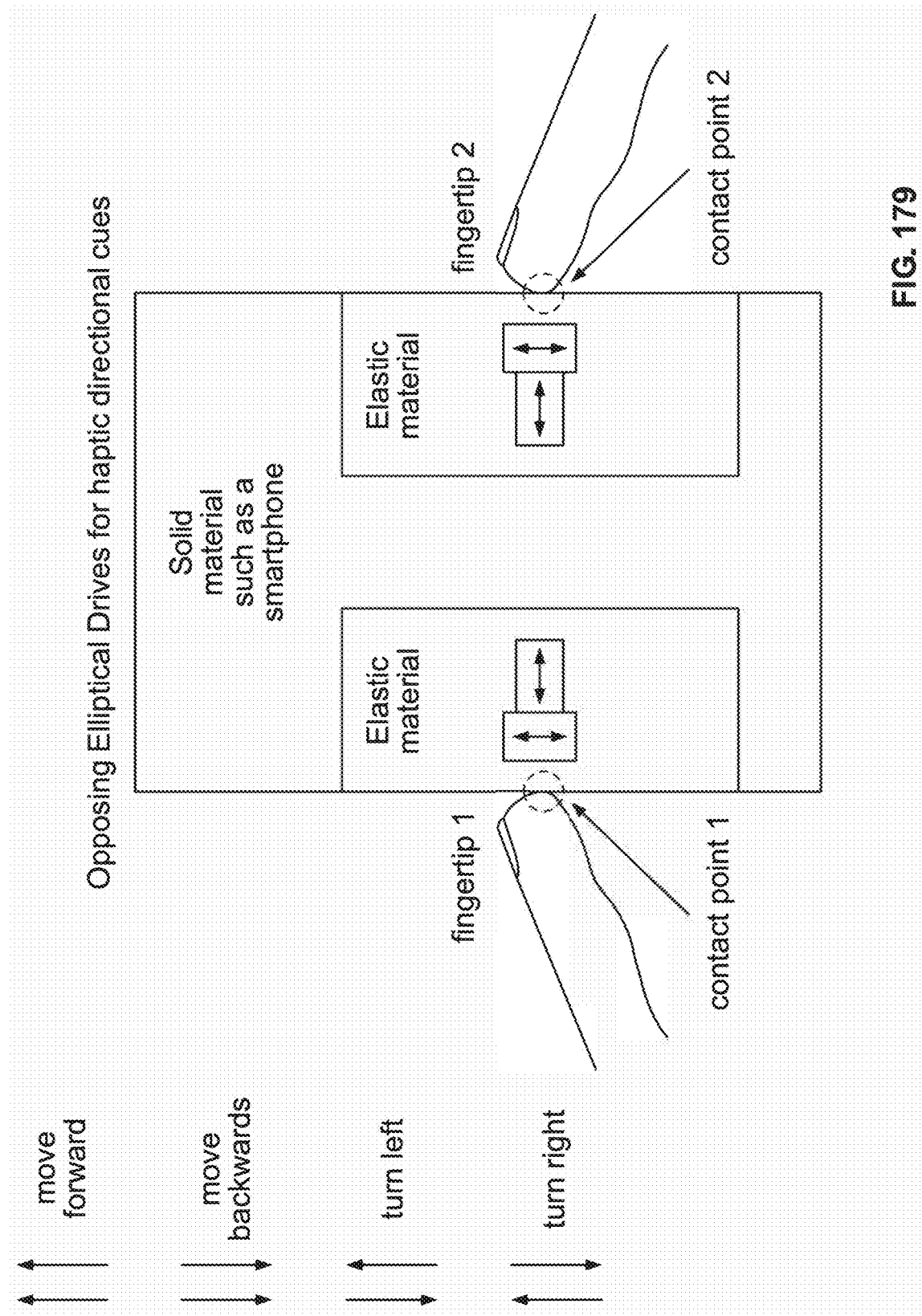

FIG. 179 illustrates Opposing Elliptical Drives for haptic directional cues.

Figure 180:
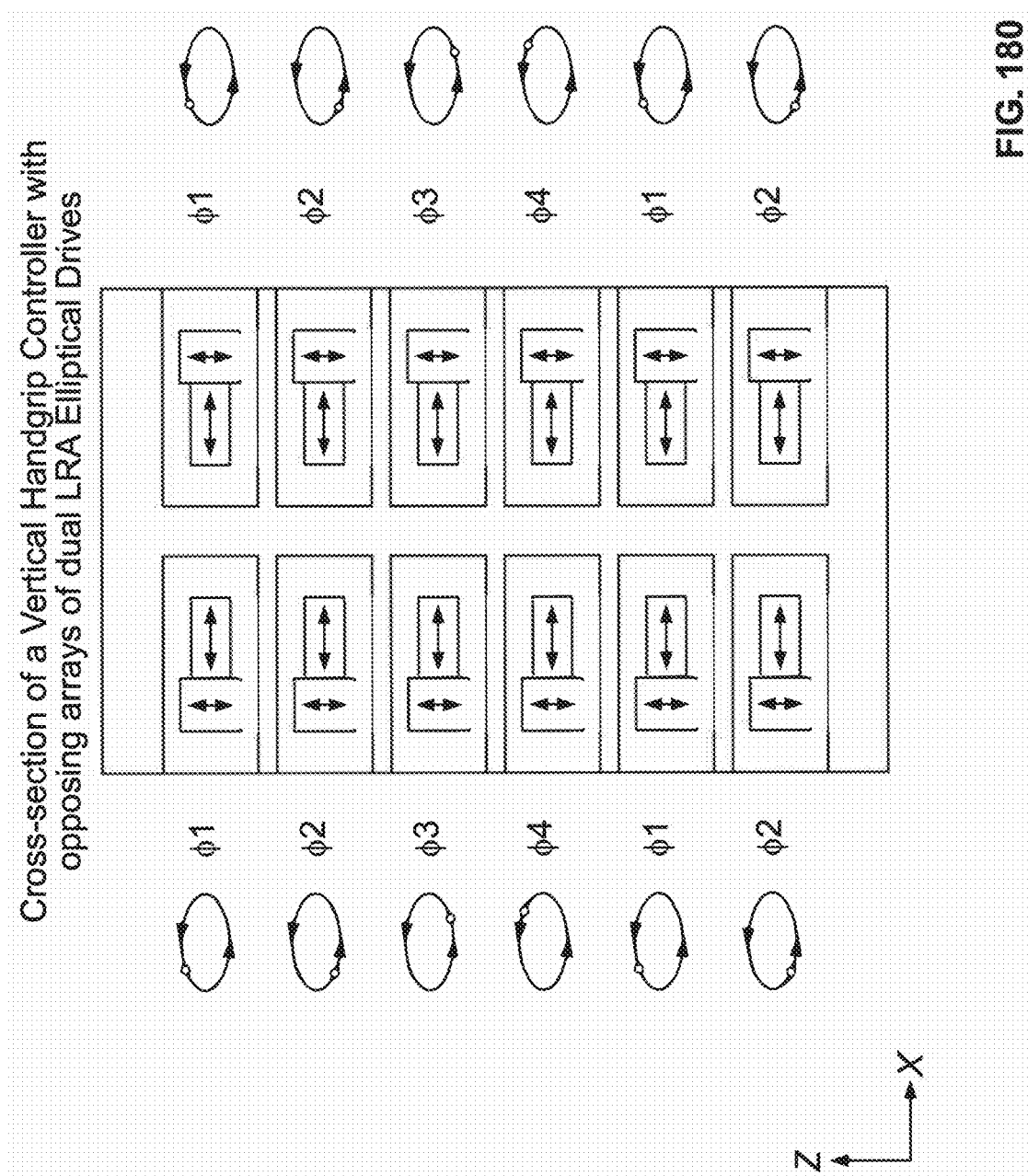

FIG. 180 illustrates a cross-section of a Vertical Handgrip Controller with opposing arrays of dual LRA Elliptical Drives.

Figure 181:
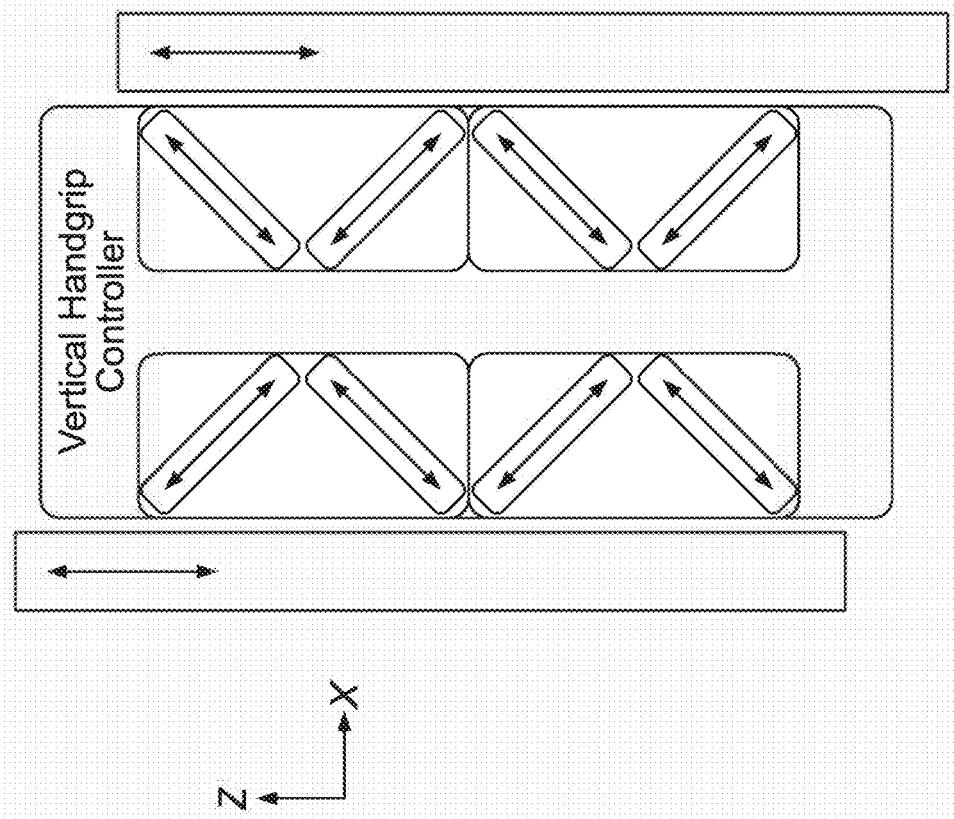

FIG. 181 illustrates a Vertical Handgrip Controller with opposing translating grips driven by Stiction Drives.

Figure 182:
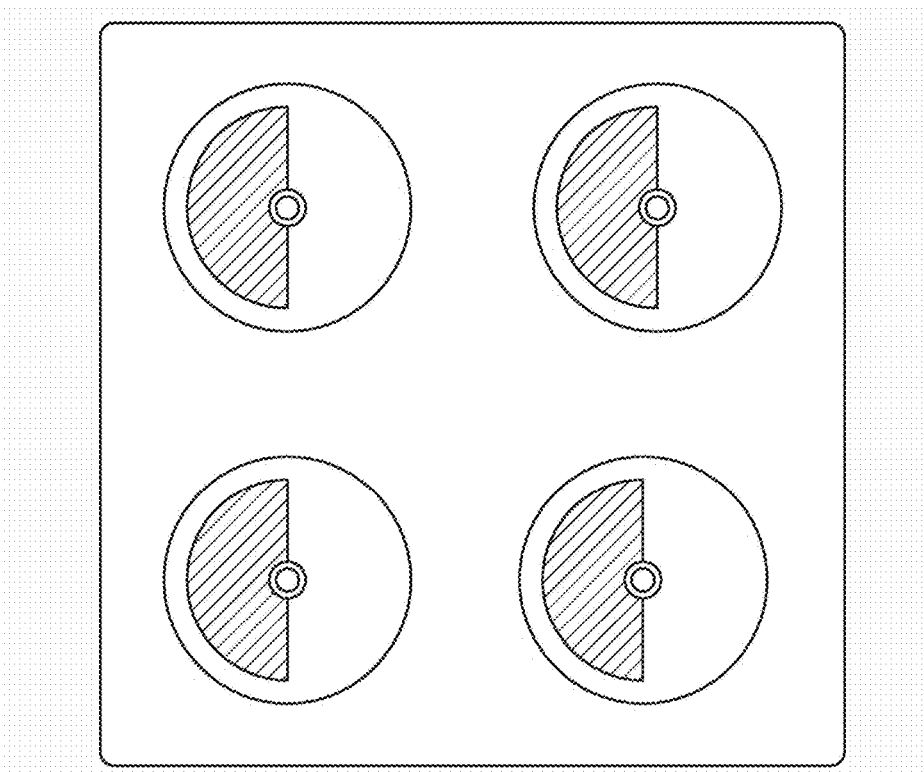

FIG. 182: Top view of a SAVANT having four identical eccentric rotating masses arranged in a square configuration.

Figure 183:
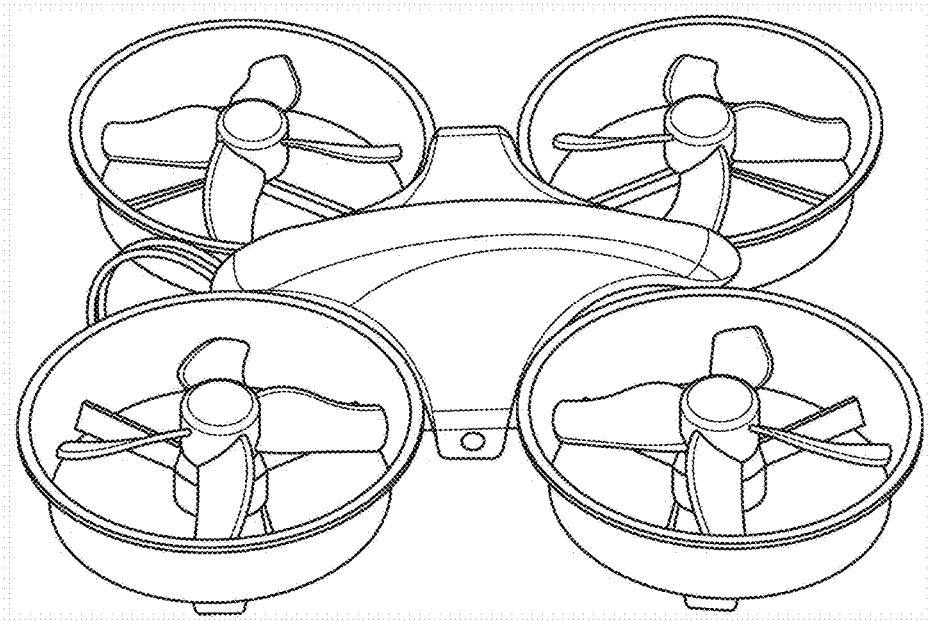

FIG. 183: Example of a Quadcopter with ducted propellers.

Figure 184:
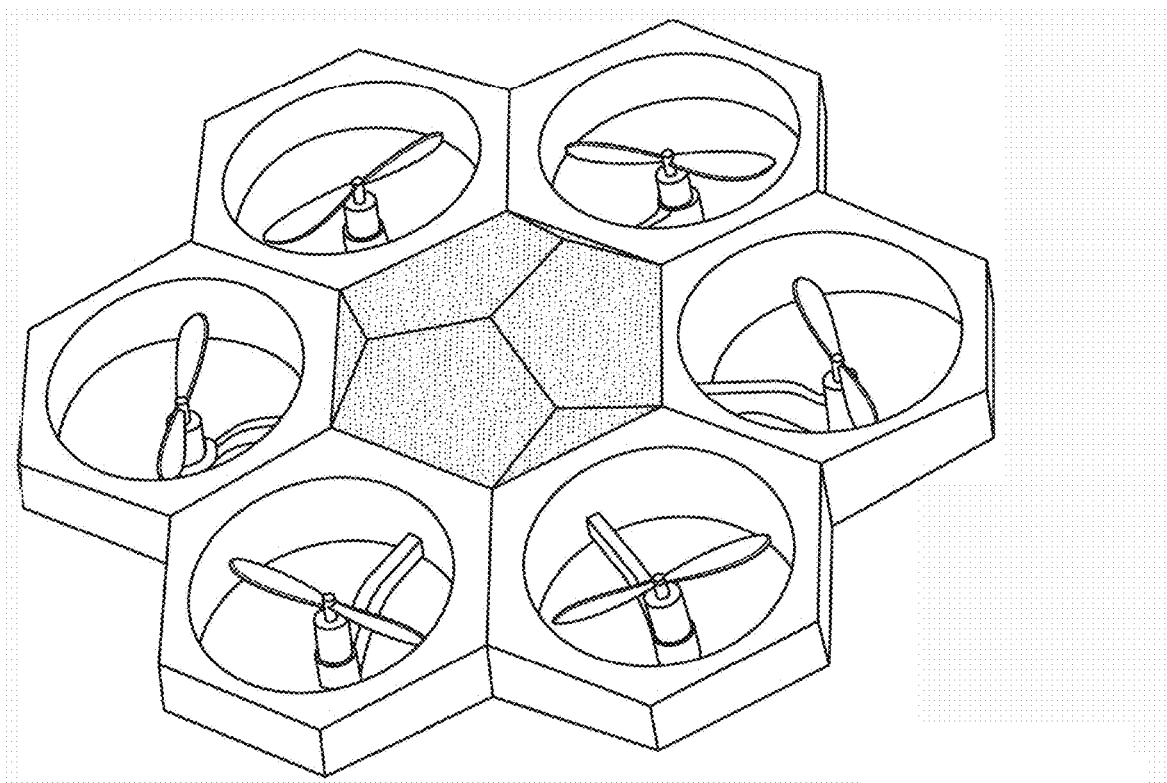

FIG. 184: Example of a Hexacopter with circular openings.

Figure 185:
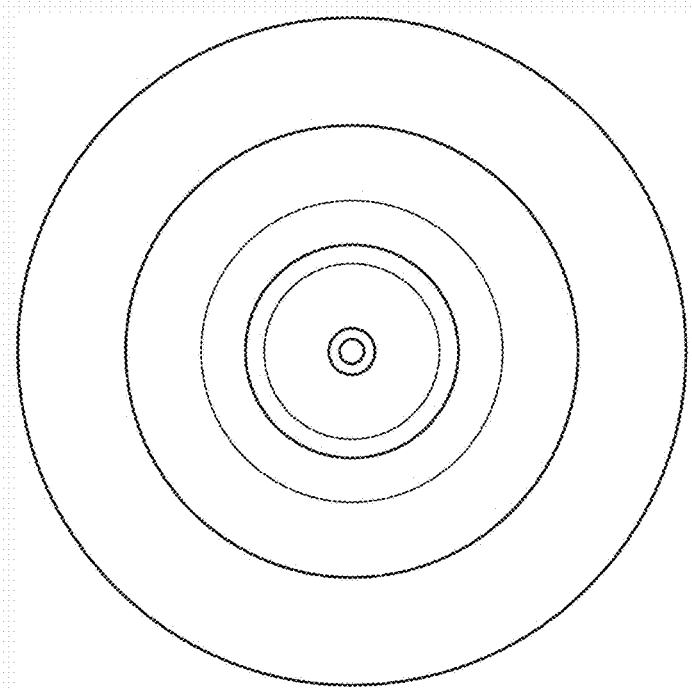

FIG. 185: Example of a cylindrically symmetric flying disc.

Figure 186A:
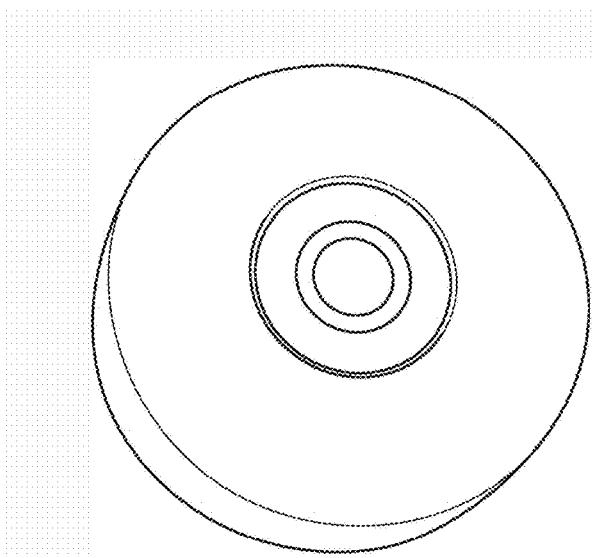

FIG. 186A: Top view of a cylindrically symmetric skateboard wheel with a bearing.

Figure 186B:
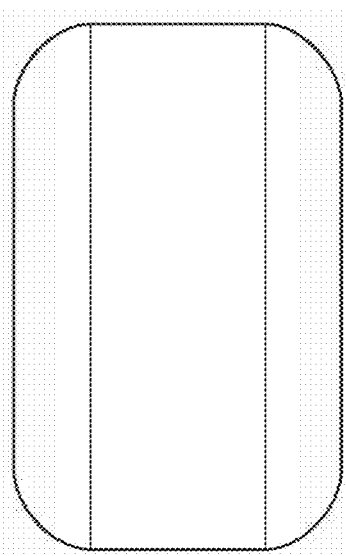

FIG. 186B: Side view of a cylindrically symmetric skateboard wheel with a bearing.

Figure 187A:
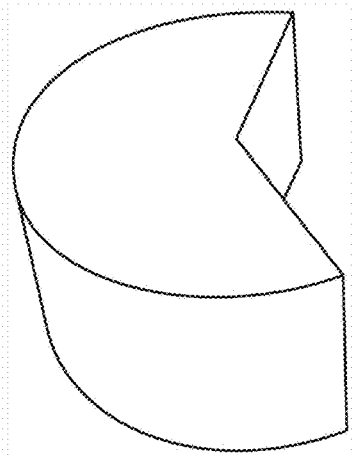

FIG. 187A: 5π/4 cylindrical segment.

Figure 187C:
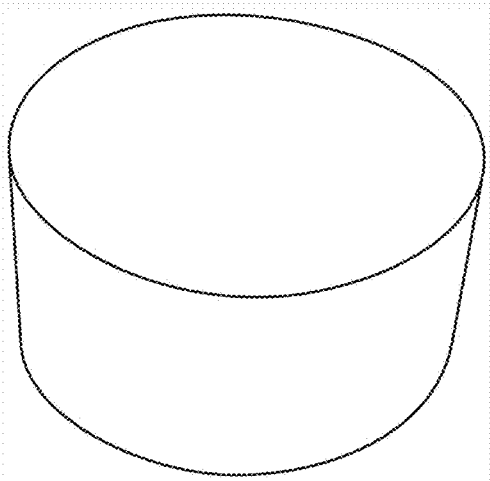
Figure 187B:
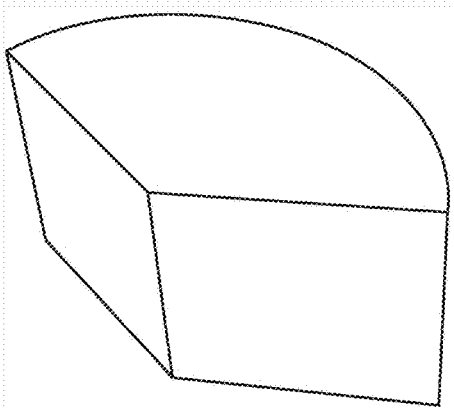

FIG. 187B: 3π/4 cylindrical segment.

FIG. 187C: 5π/4 and 3π/4 Conjugate Segments combined into a complete cylinder.

Figure 188A:
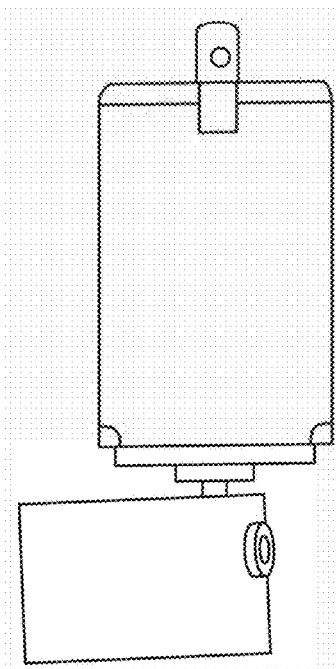

FIG. 188A: Side view of a typical commercial brushed DC motor with cylindrical shaped mass with an off-center hole for the motor shaft.

FIG. 1886B: End view of a typical commercial brushed DC motor with cylindrical shaped mass with an off-center hole for the motor shaft.

Figure 188B:
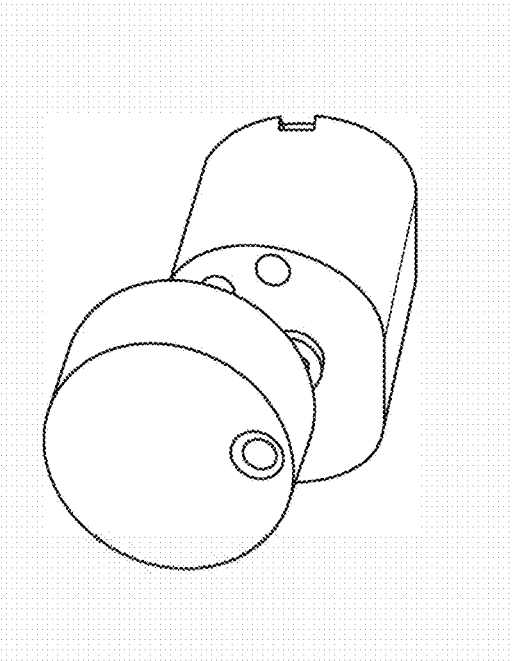
Figure 188C:
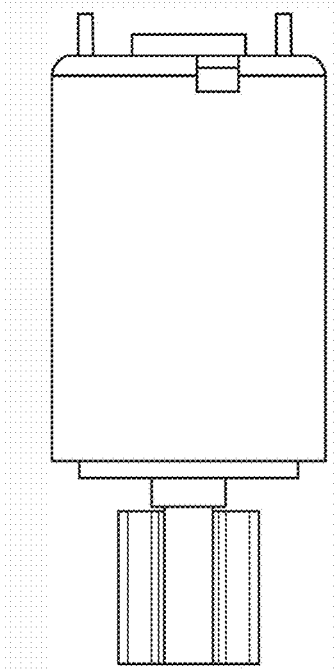

FIG. 188C: Side view of a typical commercial brushed DC motor with cylindrical segment shaped mass with a central hole for the motor shaft.

Figure 188D:
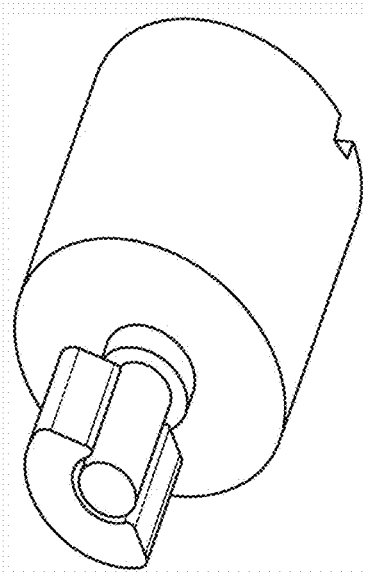

FIG. 188D: End view of a typical commercial brushed DC motor with cylindrical segment shaped mass with a central hole for the motor shaft.

Figure 189A:
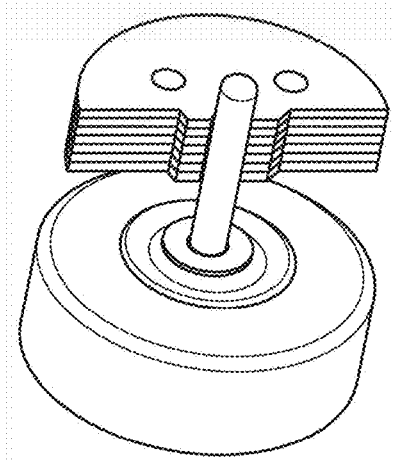

FIG. 189A: End view of a typical commercial brushed DC motor with cylindrical segment shaped mass with a central hole fabricated as a stack of metal plates.

Figure 189B:
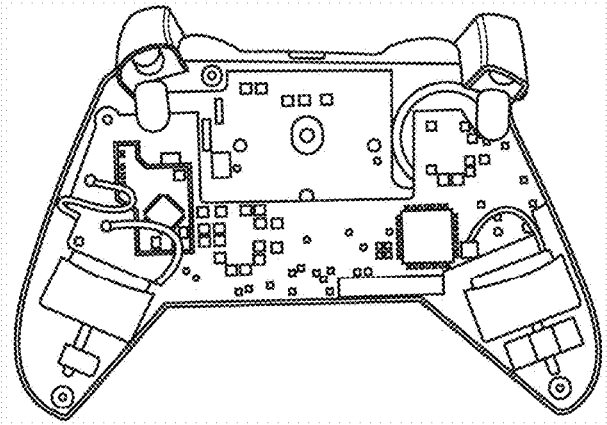

FIG. 189B: Underside view of the interior of a typical two-handed game controller having a small ERM on the left side (right grip) and a large ERM on the right side (left grip).

Figure 189C:
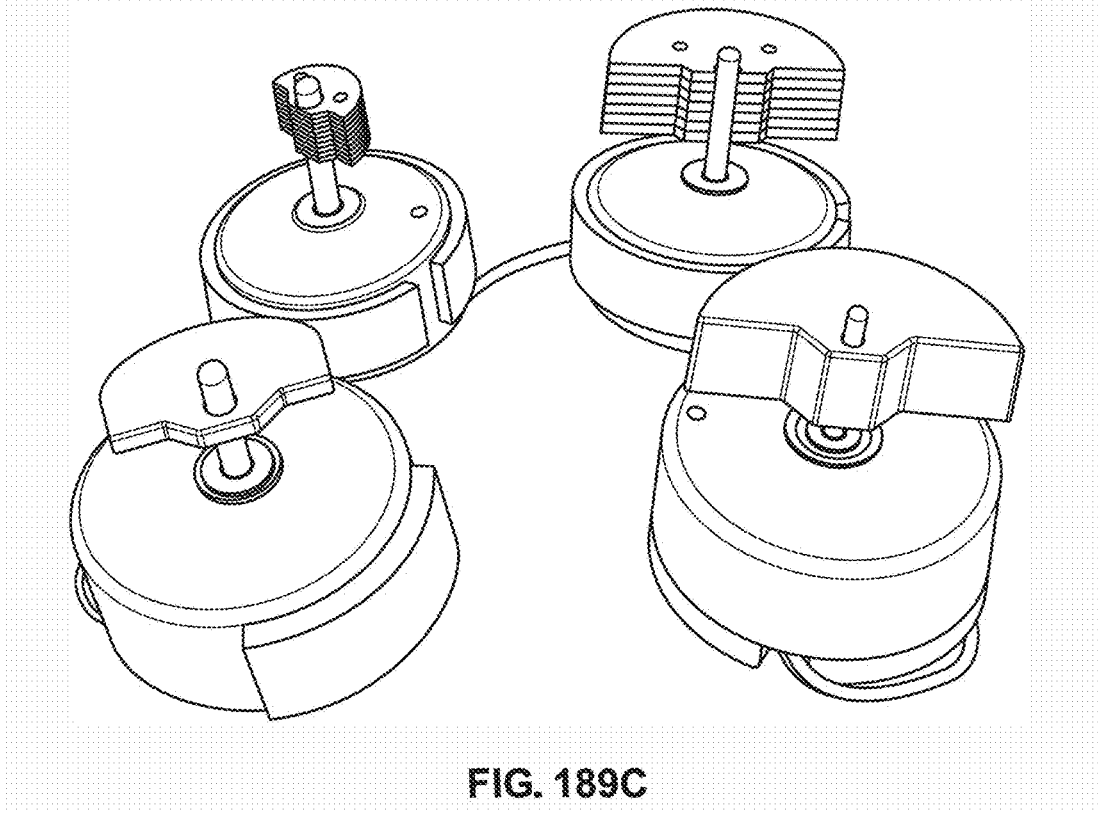

FIG. 189C: Example inexpensive, mass produced, ERMs using similar sized motors but with different masses and fabrication methods.

Figure 190A:
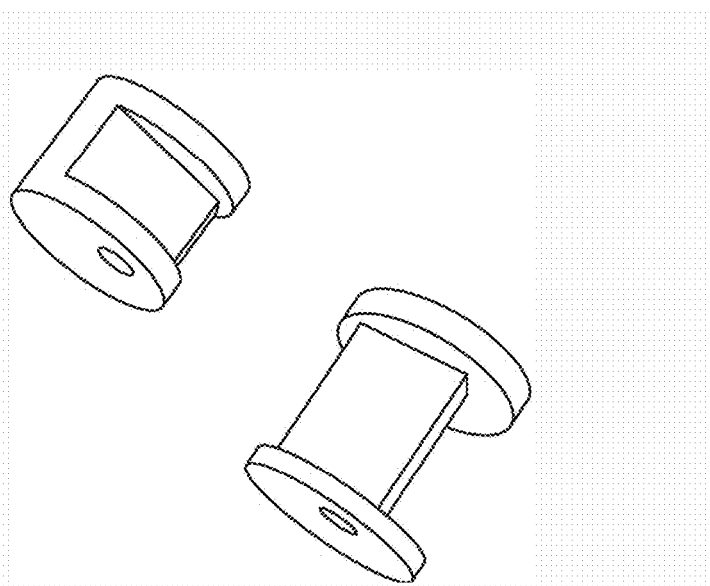

FIG. 190A: Example (separated view) pair of different shaped masses but with matched eccentricities for integration into a Gemini Drive.

Figure 190B:
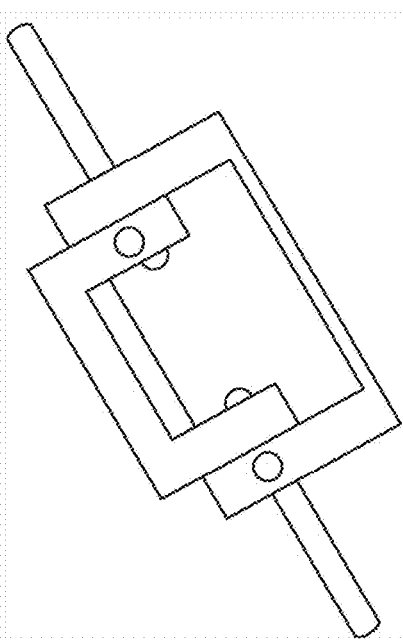

FIG. 190B: Example (integrated) pair of masses with matched eccentricities for a Gemini Drive, where they are mechanically decoupled to rotate independently and interleaved.

Figure 191A:
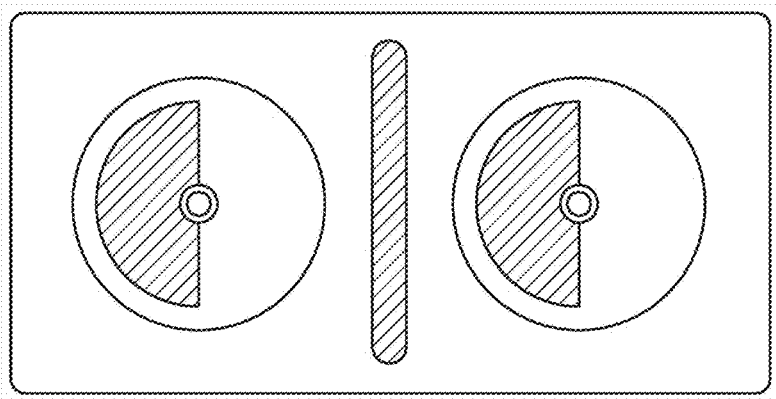

FIG. 191A: Example pair of identical ERMs arranged side by side in a planar SAVANT with an air baffle interposed between them.

Figure 191B:
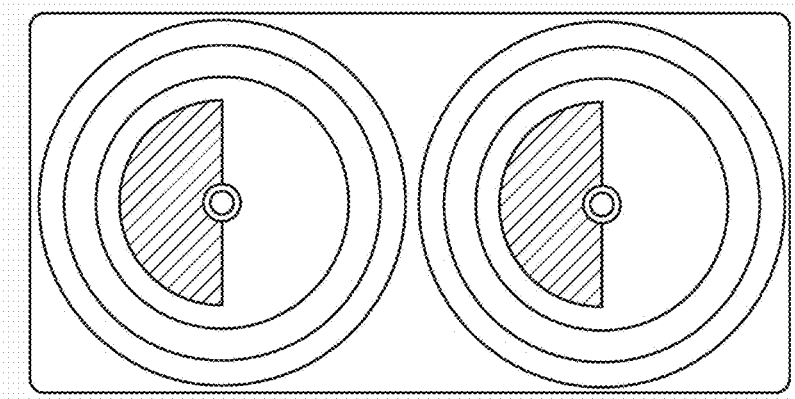

FIG. 191B: Example pair of identical ERMs arranged side by side in a planar SAVANT with each ERM enclosed with a circular shroud.

Figure 192A:
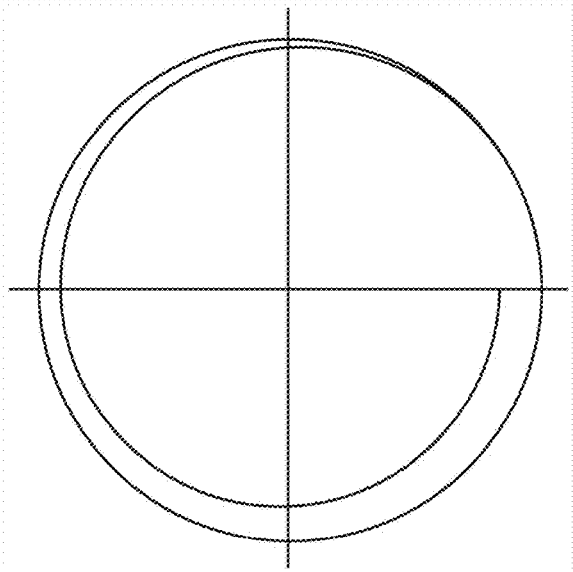

FIG. 192A: Example Mathematica code and parametric plot showing an example curvature for a Mohawk target.

Figure 192B:
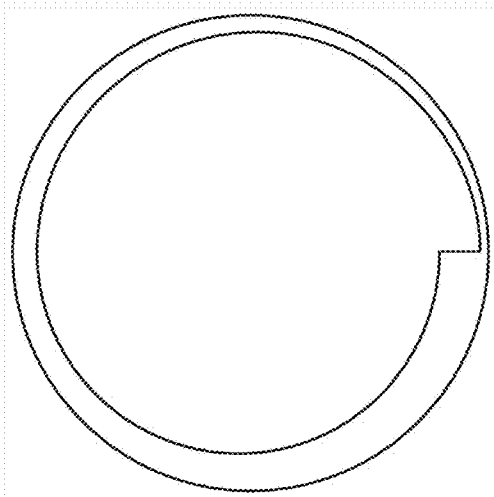

FIG. 192B: Cross-section view of an example Mohawk target shape.

Figure 192C:
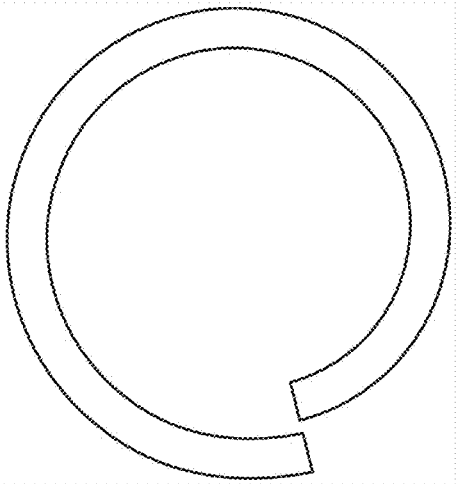

FIG. 192C: Top view of an example Mohawk target shape constructed as a thin tube with a lateral displacement as the discontinuity.

Figure 193A:
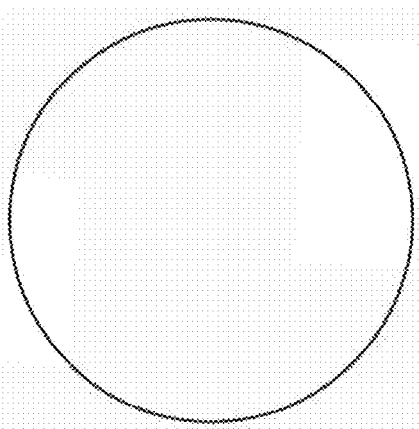

FIG. 193A: Isometric view of an example axisymmetric surface for a Spinor—this example is a sphere.

Figure 193B:
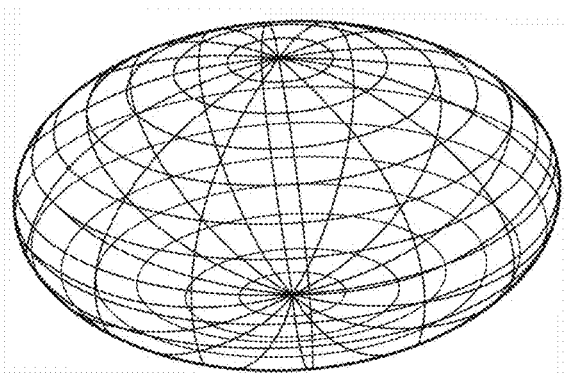

FIG. 193B: Isometric view of an example axisymmetric surface for a Spinor—this example is an ellipsoid.

Figure 193C:
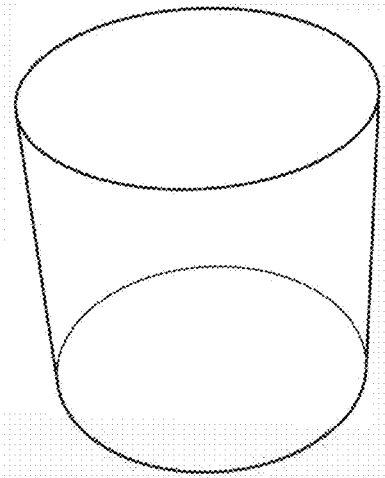

FIG. 193C: Isometric view of an example axisymmetric surface for a Spinor—this example is a cylinder.

Figure 193D:
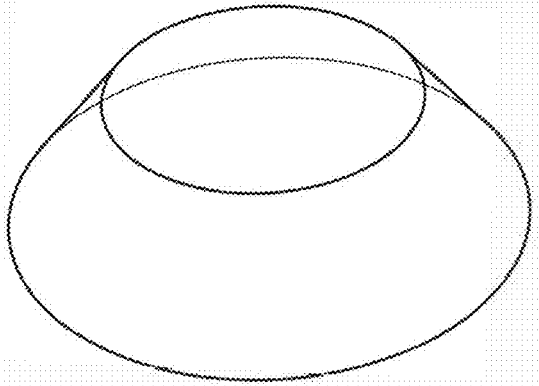

FIG. 193D: Isometric view of an example axisymmetric surface for a Spinor—this example is a conical frustrum.

Figure 194A:
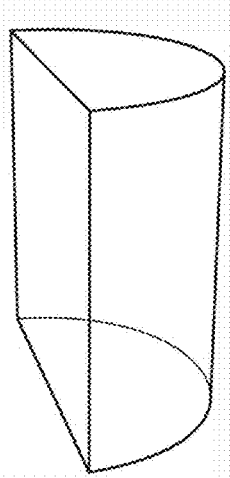

FIG. 194A: Isometric view of an example shape for an eccentric rotating mass, a half cylinder.

Figure 194B:
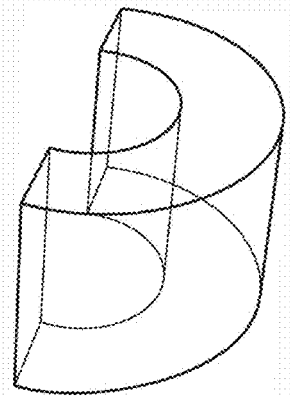

FIG. 194B: Isometric view of an example shape for an eccentric rotating mass, a half cylindrical shell.

Figure 195A:
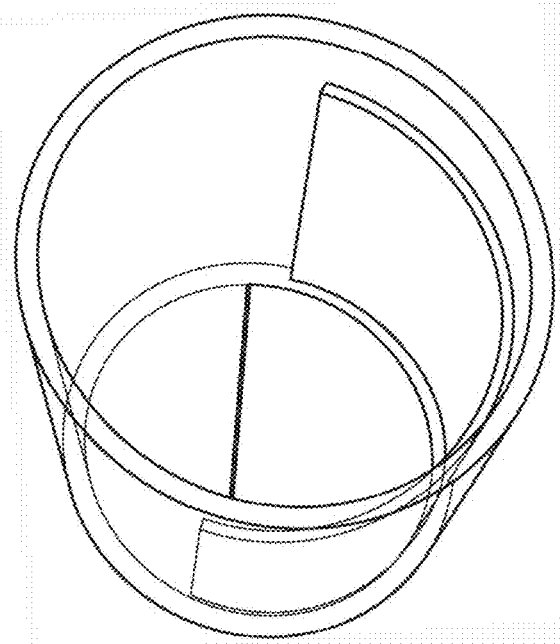
Figure 195B:
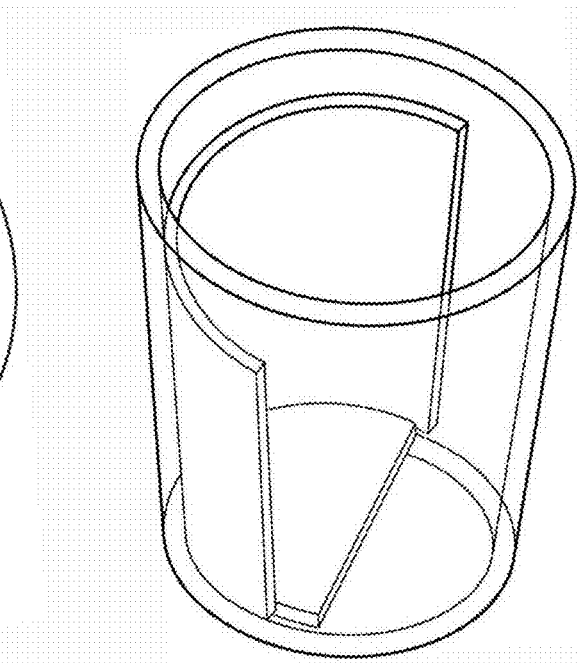
Figure 195C:
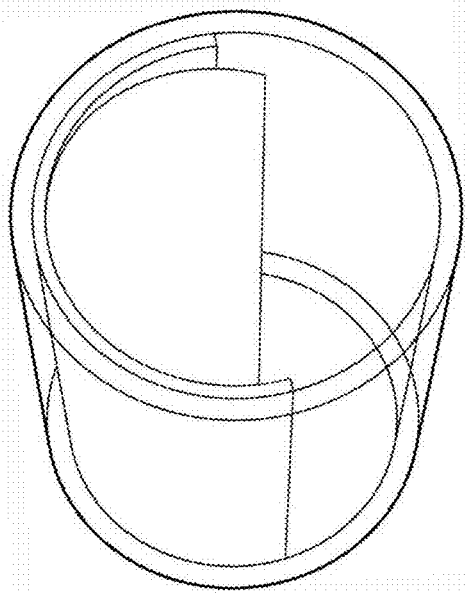

FIGS. 195A, 195B, 195C: Views of a simple "mockup" prototype of a Cylindrical Spinor Cup Shape (represented by acrylic cup) with embedded eccentric mass (represented by blue paper within the acrylic cup).

Figure 196:
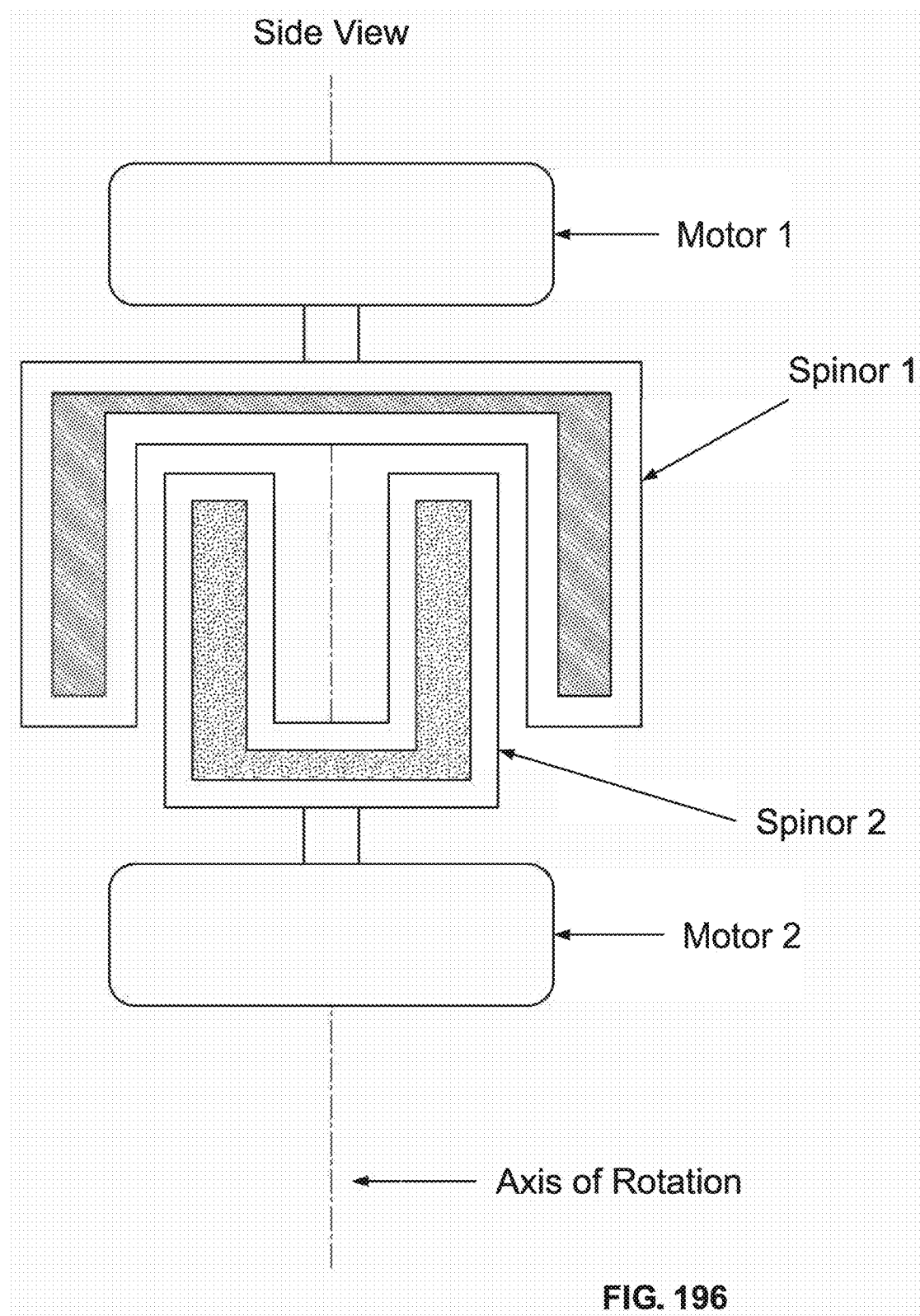

FIG. 196: Side view of an interleaved pair of cup-shaped Spinors, showing axis of rotation.

Figure 197A:
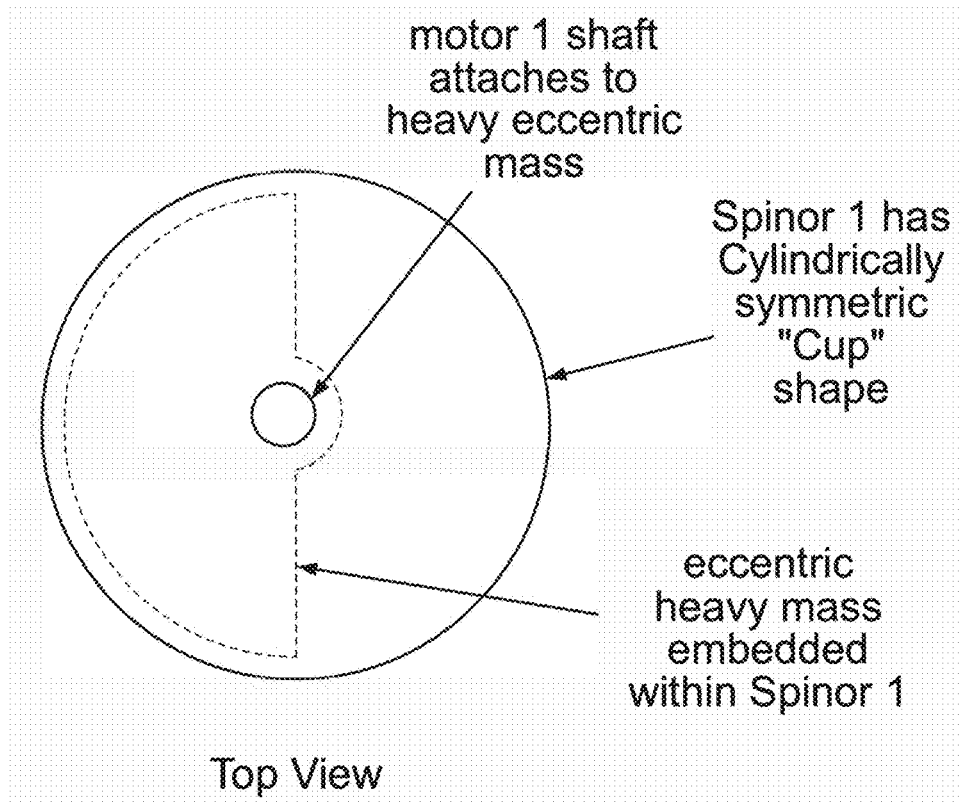
Figure 197B:
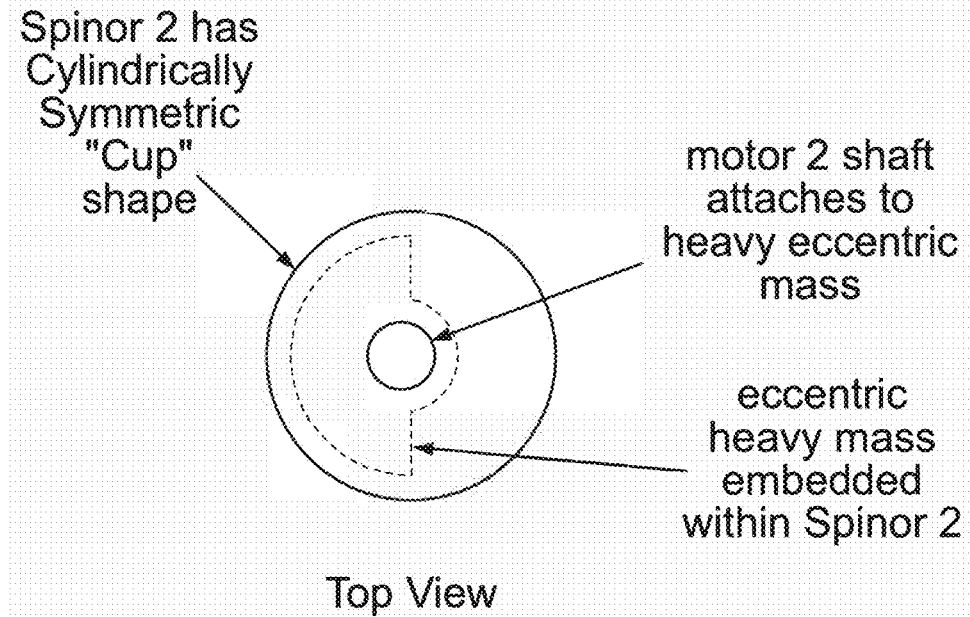

FIGS. 197A and 197B: Top views of cup-shaped Spinors, each showing its embedded heavy eccentric mass and motor shaft attachment point.

Figure 198:
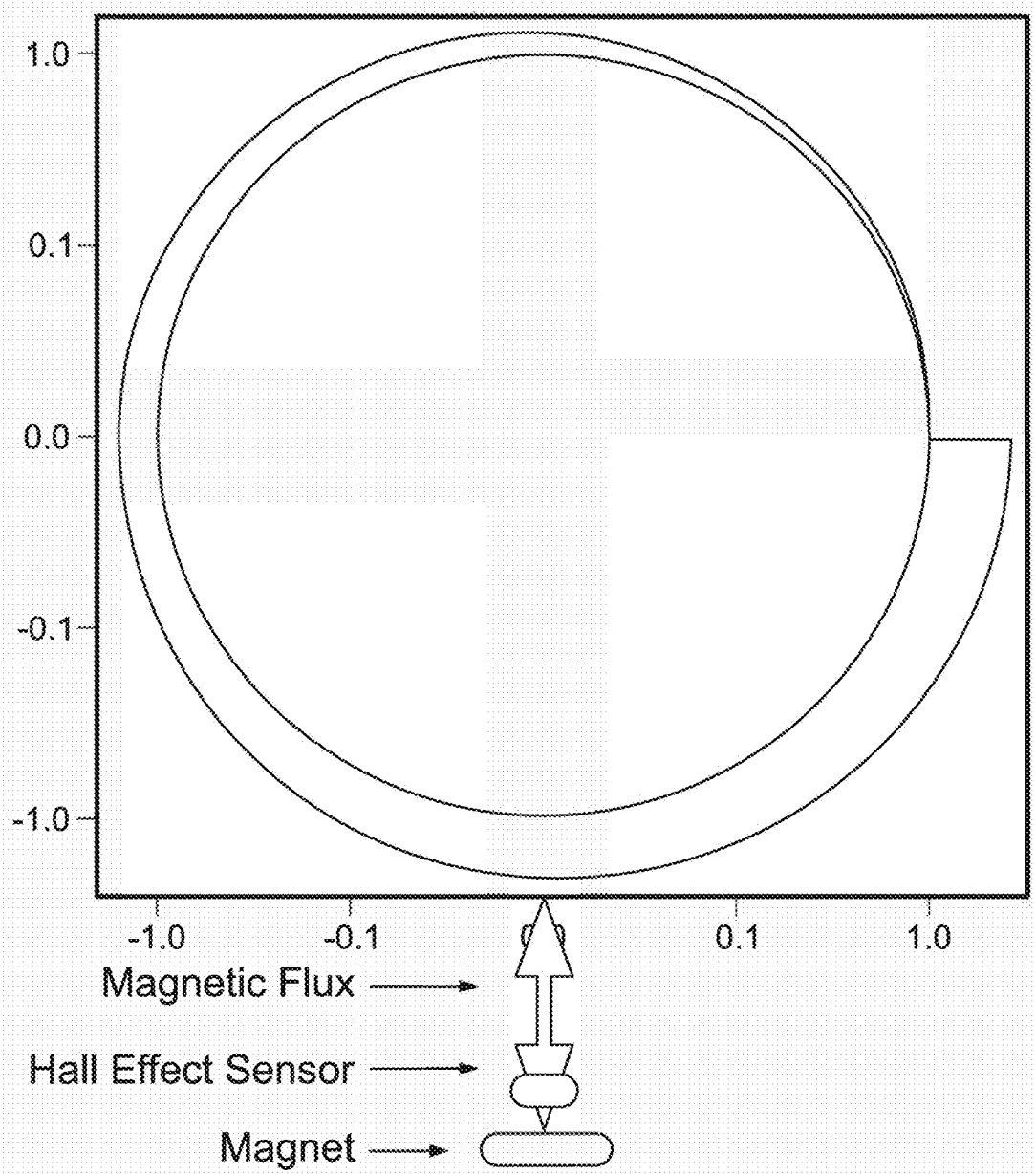

FIG. 198: Planar view of a Mohawk approach using a Hall Effect Sensor.

Figure 199:
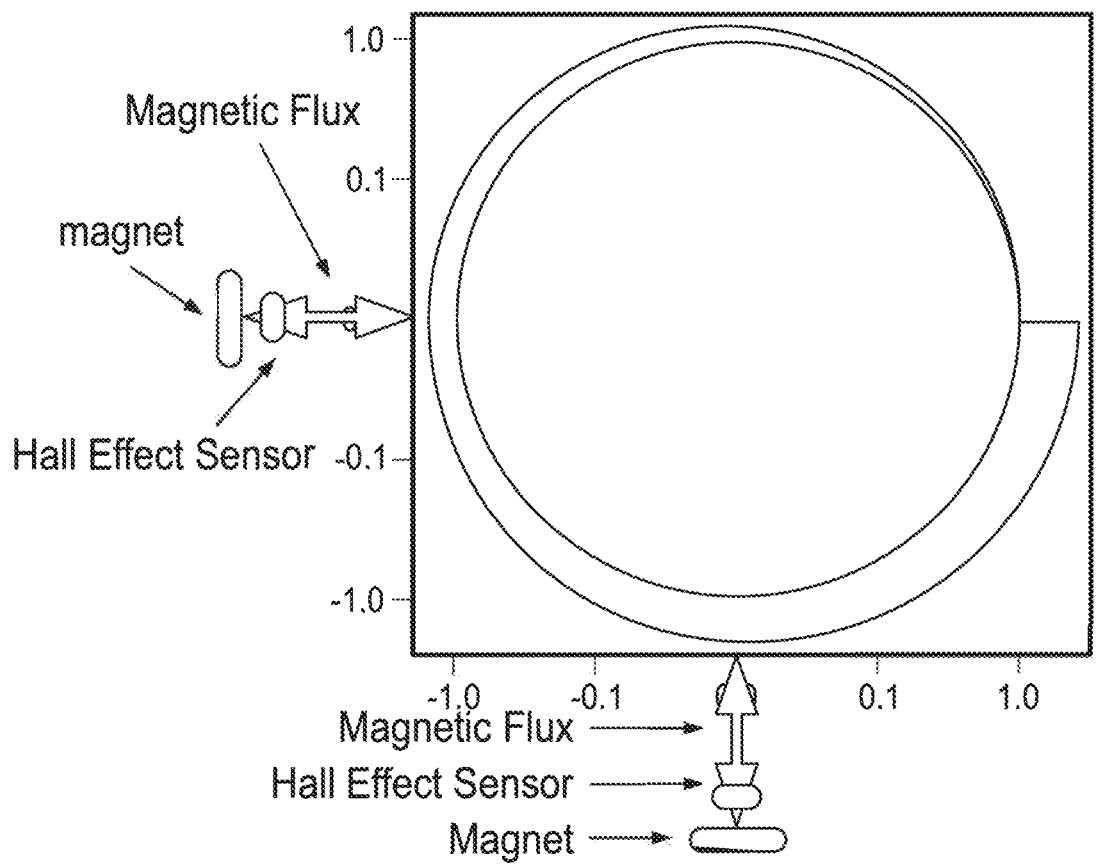

FIG. 199: Planar view of a Mohawk approach using dual Hall Effect Sensors.

Figure 200A:
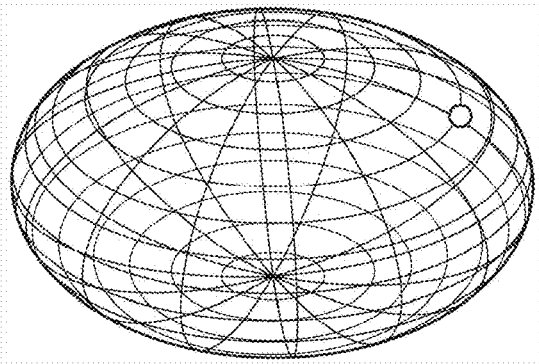
Figure 200B:
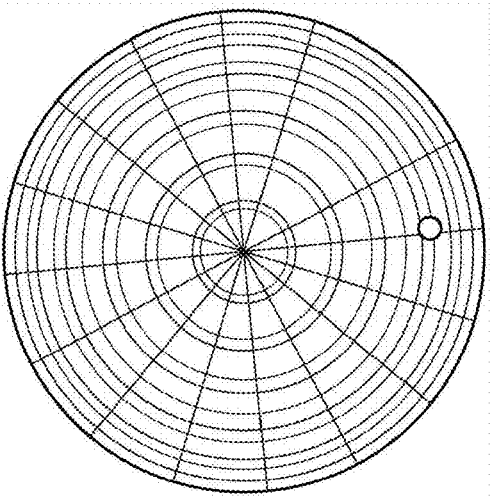

FIGS. 200A and 200B: Isometric and Top views of a (red) dot as external marking on the surface of a Spinor to indicate the Spinor's center of mass projected onto its surface.

Figure 200C:
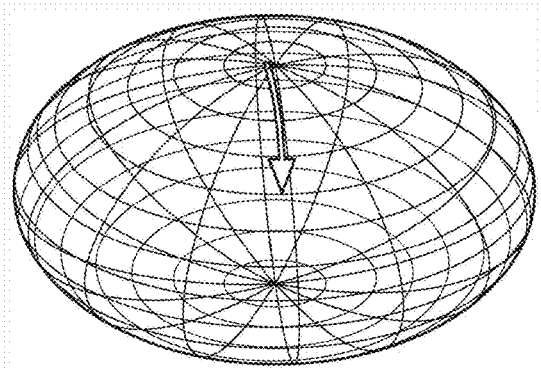
Figure 200D:
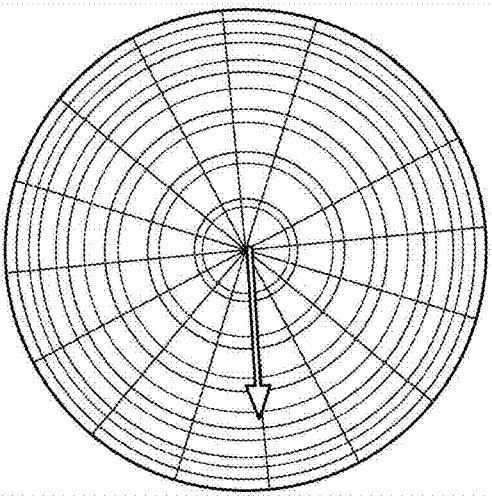

FIGS. 200C and 200D: Isometric and Top views of a (red) arrow as external marking on the surface of a Spinor to indicate the Spinor's center of mass projected onto its surface.

Figure 201A:
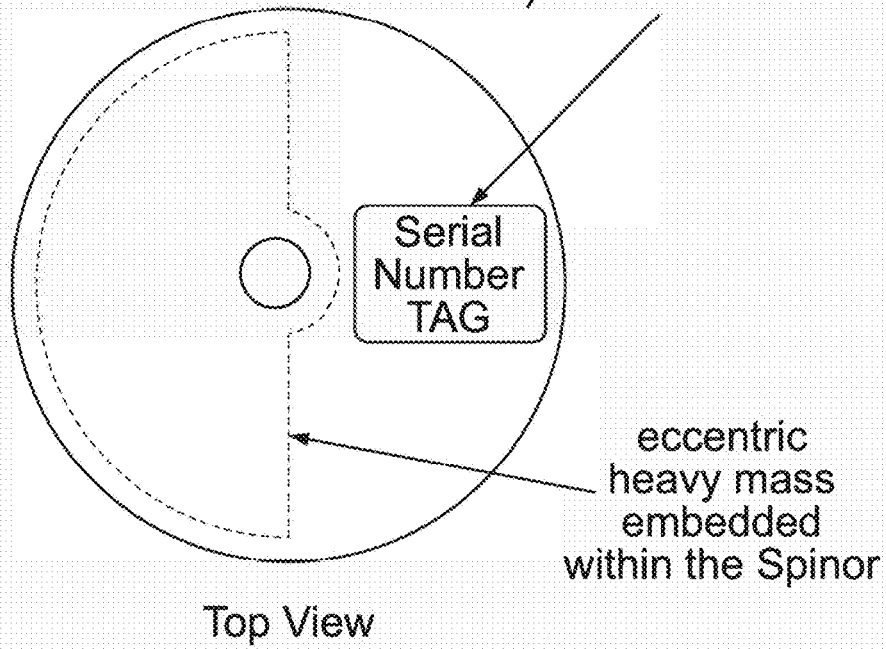

FIG. 201A: Top interior view illustration of an Example Spinor embodiment with a Serial Number TAG (for example RFID) embedded inside the Spinor.

Figure 201B:
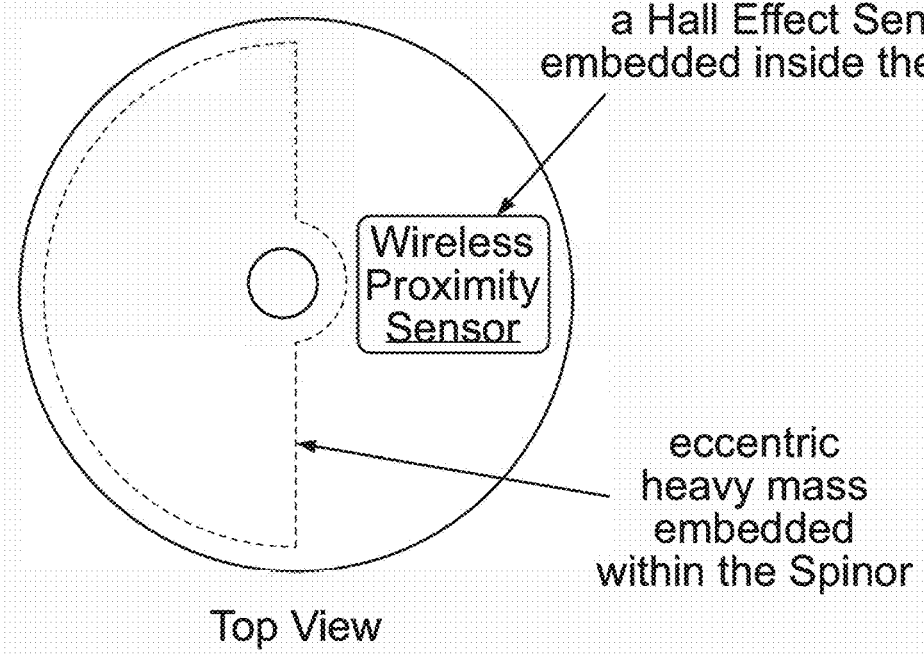

FIG. 201B: Top interior view illustration of an example Spinor embodiment with a wireless sensor (for example, a Hall Effect sensor) embedded inside the Spinor.

Figure 202:
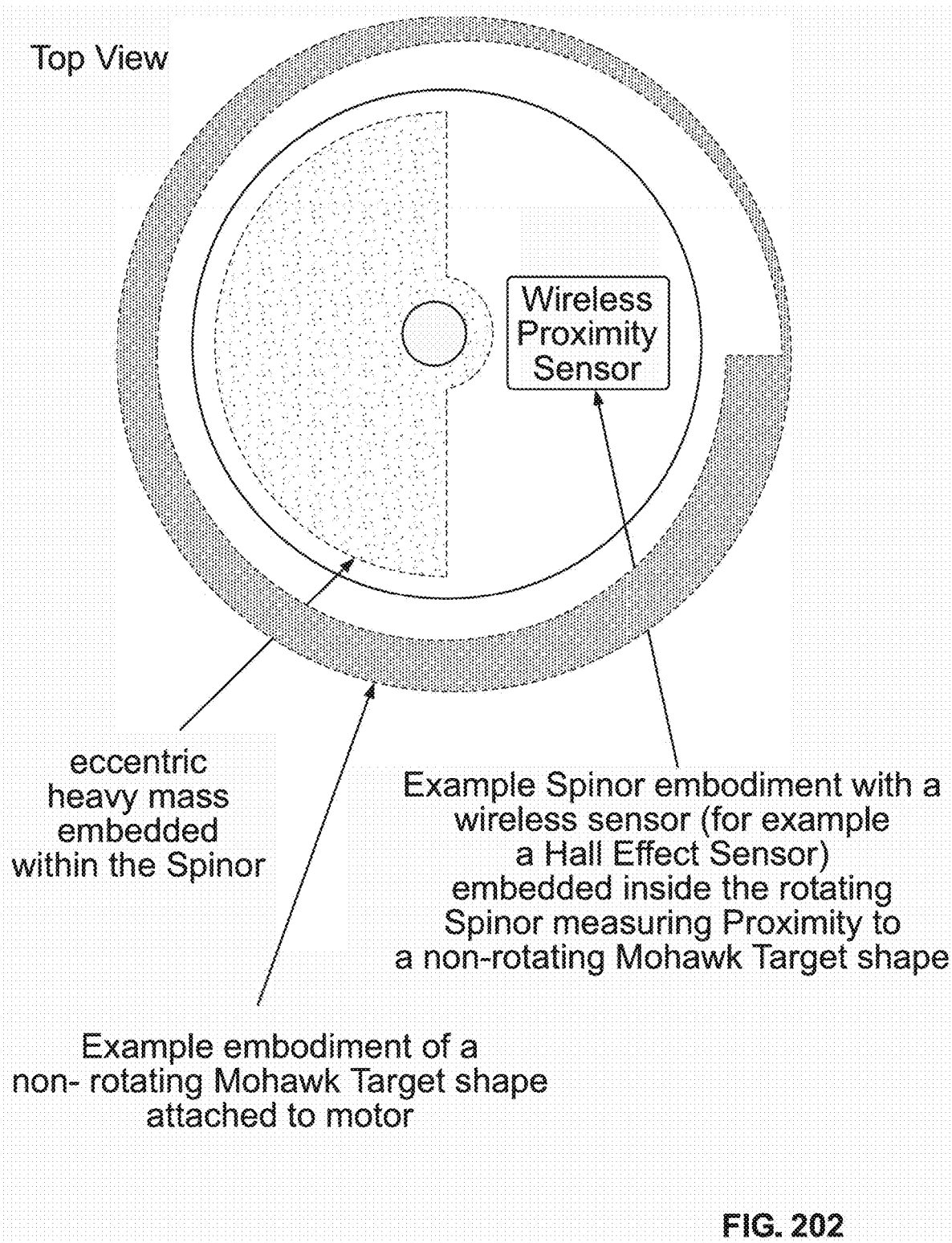

FIG. 202: Top view of an "Inside out" Mohawk Sensor/Target Embodiment, showing the fixed external Mohawk Target shape and the interior of a Spinor having an embedded wireless proximity Sensor.

DETAILED DESCRIPTION

The foregoing aspects, features and advantages of the present disclosure will be further appreciated when considered with reference to the following description of preferred embodiments and accompanying drawings, wherein like reference numerals represent like elements.

As used herein, an actuator is a device that can generate mechanical motion or force. Actuators can convert a source of energy into mechanical motion or force. The source of energy can be electrical, pneumatic, hydraulic, or another source. Examples of actuators include rotary and linear motors. Examples of electric actuators include DC, AC, and stepper motors.

The term "direction" includes the orientation of an axis, also referred to as vector direction. A vector aligned with a specific direction can be either in the positive direction along the axis or the negative direction along the axis. As used herein, the term direction may distinguish between all angles in a circle, such as 0 to 360 degrees. And vibration control may distinguish between positive and negative directions along a single axis. Furthermore, the term "controller" is used herein in some situations to reference to game controller, and in other situations to a real-time controller of actuators, such as a microprocessor or an ASIC.

I. General Synchronized Vibration

In this disclosure, the term "General Synchronized Vibration" refers to control of the timing, and in some cases also control of amplitude, of multiple vibration forces, torques, or forces and torques. The sources of these vibration forces and torques can be electromagnetic, electrostatic, magnetic, spring forces, inertial forces such as centripetal forces, piezoelectric, pneumatic, hydraulic, or other force and torque sources. The sources of these vibration forces and torques can include those described in the text "Engineering Haptic Devices: A Beginner's Guide for Engineers" by Thorsten A. Kern, © 2009 (the entire disclosure of which is hereby expressly incorporated by reference herein). These vibration forces and torques can be generated from separate Vibration Actuators or from actuators that generate multiple force, torques, or forces and torques. In General Synchronized Vibration the forces, torques, or forces and torques are vectorially combined so that they generate a combined force, torque, or force and torque onto an object. The vector combination of force and torque vectors is also referred to as superposition. General Synchronized Vibration results in a combined vibration force, a combined vibration torque, or a combined vibration force and vibration torque onto an object. A force applied onto an object can also apply a torque onto that object. Accordingly, the references in this document to force also apply to force and torque unless explicitly described otherwise.

In the event that there is a difference in the usage of terminology between the instant application and any wholly included reference identified herein, the usage of the differing term definitions will be governed by the use in the present disclosure.

A vibration (or vibratory) actuator can impart repeated forces onto an object. These repeated forces can repeat a similar force profile over time during each repetition. Examples include rotary motors with eccentric masses, and linear actuators which move masses back and forth. These actuators can be DC, AC, stepper, or other types of actuators. A vibration actuator can repeat a similar force profile (waveform) in each cycle, or there can be variations in force profiles between cycles. Variations between cycles can be in amplitude, frequency, phase, and profile shape.

Figure 1:
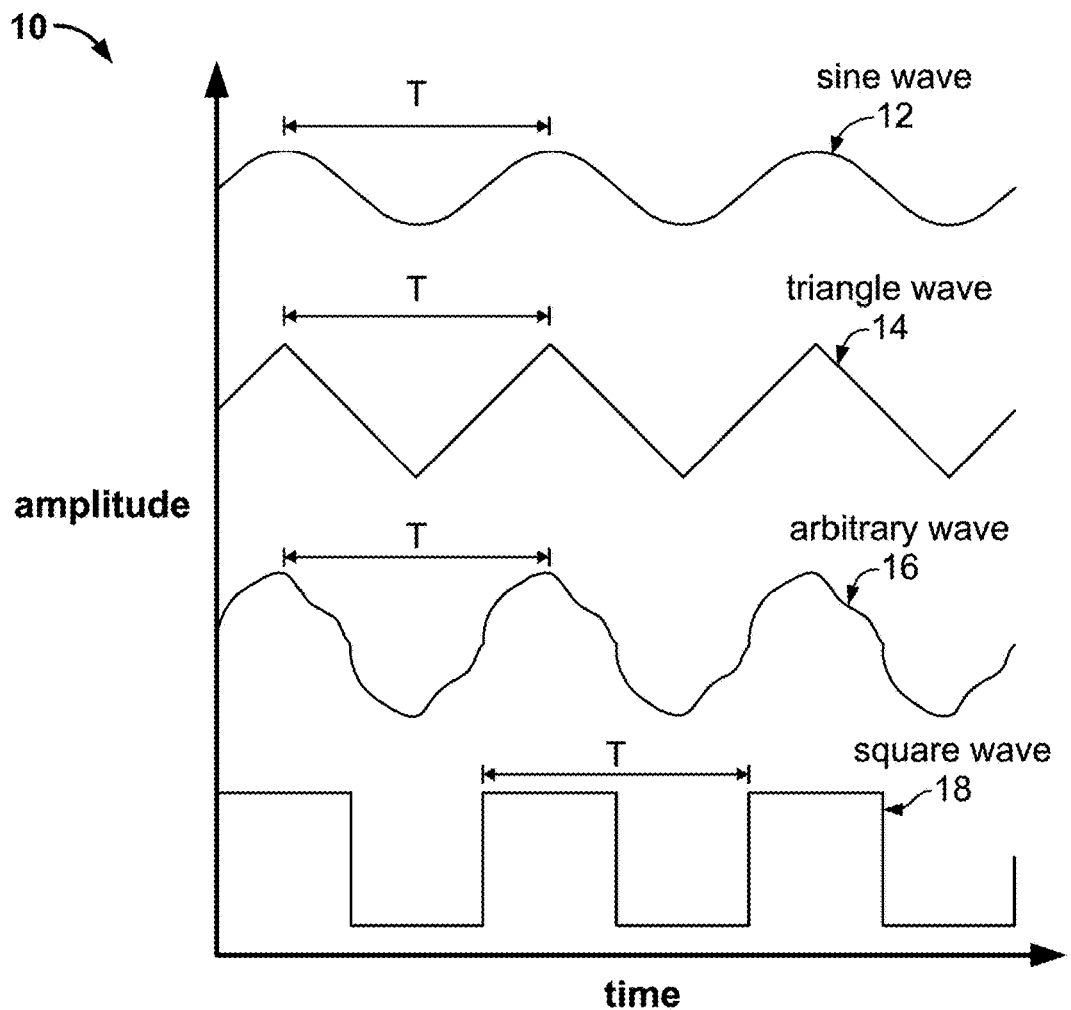
FIG. 1 is a chart illustrating a number of different waveform types suitable for use with aspects of the present disclosure.

When a force is generated in a repeated cycle it can generate a vibratory force. The profile (also referred to as a waveform) of a repeated force cycle can be in a sinusoidal shape, triangular wave, a square wave, or other repeated profile as shown in FIG. 1. The frequency of vibration describes how frequently a vibration cycle is repeated. A frequency of vibration, f, is defined as the number of vibrations per unit time, and often is given in Hertz whose units are cycles per second. The period of vibration, T, is the duration of each cycle in units of time. The mathematical relationship between frequency and period of vibration is given by the following equation:

$$f = 1/T \qquad (1)$$

A vibration force, F, is in a repeated cycle when $$F(t+T) = F(t) \qquad (2)$$

where T is the period of vibration and t is time.

For purposes of vibration devices it is sufficient for the period of vibration to be approximate, and therefore a vibration is considered to be in a repeated cycle when:

$$F(t+T) \approx F(t) \qquad (3)$$

One vibration waveform is a sinusoidal waveform, where the vibration force can be given $$F(t) = A\sin(\omega t + \phi) \qquad (4)$$

Here, F(t) is force as a function of time. A is the maximum amplitude of force. $\omega$ is the frequency of vibration in radians per second (the frequency in Hertz is $f=\omega/(2\pi)$). And $\phi$ is the phase of vibration in radians. When $\omega t=2\pi$ the force profile repeats itself.

A vibration actuator may impart repeated forces onto an object. Due to the dynamics of an actuator, a single actuator can impart forces at multiple frequencies at the same time. However, for the purposes of analyzing vibrations and describing vibration devices herein, the primary frequency of an actuator's motion means the frequency having the largest component of kinetic energy in it.

The period of vibration can be defined by the time elapsed between the beginning of one vibration cycle and beginning of the next cycle. Thus to identify the period of vibration it is useful to identify the beginning of a cycle. One method for defining the beginning of cycle is to define the beginning of the cycle as the point with maximum amplitude in the profile. FIG. 1 is an amplitude versus time chart 10 showing the vibration profiles of a sine wave 12, a triangle wave 14, an arbitrarily shaped profile 16, and a square wave 18. The period for each of these profiles is designated by T.

The sine wave 12, triangle wave 14, and arbitrary profile wave 16 all have a unique point of maximum amplitude during each repeated cycle, and this point of maximum amplitude is used to define the beginning of the cycle. The square wave 18 does not have a unique point of maximum amplitude within a cycle; in such cases a repeated point on the profile can be selected to designate the beginning of the cycle. In FIG. 1, the point at which the square wave 18 transitions from a low value to a high value is designated at the beginning point of the cycle, and used to define the period of the repeated profile. Thus, any profile that can be represented as repeated cycles can represent a vibration.

A frequency of vibration can also be identified when the shape of signal does not consist of exactly repeated profiles. Variations in amplitude of the cycle and small changes in the shape of a cycles profile still allow one to identify a unique point that designates the beginning of the cycle. As long as a repeated point in the profile can be identified, then the beginning of each cycle, a vibration period, and vibration frequency can be determined.

Figure 2:
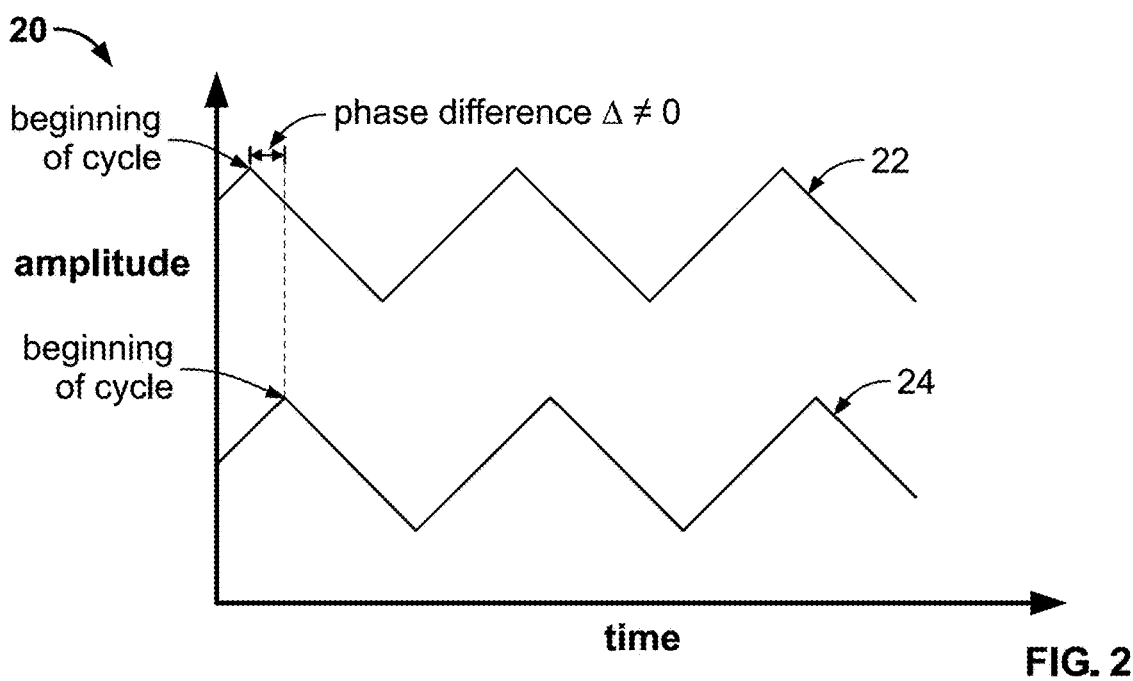
FIG. 2 illustrates a pair of vibration profiles having a phase difference.

The phase of vibration defines the timing of the beginning of a cycle of vibration. A phase difference between two vibration waveforms is defined as the difference between the beginning of a vibration cycle in one waveform and the beginning of a vibration cycle in the other waveform. If there is a nonzero difference in the phase of vibration between two profiles, then the beginning of the cycles do not coincide in time. FIG. 2 is an amplitude versus time chart 20 showing two vibration profiles, 22 and 24, with a phase difference A between them. The phase difference A can be given in units of time, such as shown in FIG. 2. Alternatively, the phase of vibration can also be given in radians for sinusoidal vibrations. When the phase difference A between two waveforms is zero, then the two waveforms are considered to be in-phase, as shown in the amplitude versus time chart 30 of FIG. 3.

As long as it is possible to identify the beginning of a cycle it is possible to identify a phase of vibration, even when the amplitude and frequency of vibration change between cycles of vibration.

One implementation of synchronized vibration is a vibration force formed by the superposition of two or more vibration waveforms where each of the waveforms include peaks that coincide in time with the peaks of the other waveforms on a regularly repeating basis. In a preferred embodiment, each of the waveforms would have the same frequency and a specified phase difference between them. Superposition can preferably be the vector sum of forces, torque, or forces and torque. Typically, the sources of these vibration waveforms are different vibration actuators. Often in synchronous vibration the waveforms have a zero phase difference between them, and thus the vibration waveforms are in-phase and in synchronous vibration. As used herein, specified phase difference may range between and including 0° and 360°. In some embodiments, the specified phase difference is 0° or 180°. In synchronized vibration, the various vibration waveforms can have different amplitudes. FIG. 3 illustrates two vibration waveforms of triangular profile that are synchronized. Both of these waveforms have the same frequency, they have different amplitudes, and the waveforms are in-phase. The maximum amplitude of both waveforms in FIG. 3 occurs at the same time.

Typically, synchronized vibration profiles will have similar shaped profiles. However, vibration actuators with different shaped vibration profiles can also be vibrated synchronously by matching frequency of vibration and specifying the phase difference between the waveforms. The matching of phase and frequency of vibration can be done approximately and still result in synchronized vibration.

Synchronized vibration can be generated by adding two vibration profiles together, where the amplitude of the second vibration profile is a multiple of the amplitude of the first vibration profile. This multiplying factor can be either positive or negative.

If there are two or more vibrating actuators where the peak amplitude of force of each vibrating actuator occurs repeatedly at approximately the same time, then these actuators are in-phase and in synchronous vibration. The peak amplitude of force can be either in the positive or negative direction of the vibration actuators' or vibration device's coordinate system. Thus if a positive peak amplitude from one actuator occurs at approximately the same time as the negative peak amplitude of another actuator, then these actuators are in-phase and are in synchronous vibration.

An exemplary linear motion vibration actuator 100 is shown in FIG. 4. As shown, the linear motion vibration actuator 100 contains a moving mass 102 and a base 104. The moving mass 102 moves relative to the base 104 in a back and forth linear motion. Force can be applied from the base 104 to the moving mass 102 and in a similar fashion from the moving mass 102 onto the base 104. The force transfer can occur, for instance, via magnetic forces, spring forces, and/or lead screw forces. Examples of linear actuators suitable for use in accordance with the present disclosure are described in U.S. Pat. Nos. 5,136,194 and 6,236,125, and in U.S. patent application Ser. No. 11/325,036, entitled "Vibration Device," the entire disclosures of which are hereby incorporated by reference herein.

As the moving mass 102 in the linear motion vibration actuator 100 moves back and forth, forces are generated between the moving mass 102 and the base 104. These forces can be transmitted through the base 104 of the actuator 100 to an object that the actuator is mounted to (not shown). The moving mass 102 may also be attached to an object, such as a handle (not shown), that is external to the actuator 100, and may transmit forces directly to an object external to the actuator 100.

The forces in the linear motion vibration actuator 100 may be magnetic forces, such as with a voice coil. The moving mass 102 may contain, for instance, a permanent magnet, electromagnet, ferromagnetic material, or any combination of these. The base 104 may contain, for instance, a permanent magnet, an electromagnet, ferromagnetic material, or any combination of these. Magnetic forces may be generated between base 104 and the moving magnet that generate acceleration and motion of the moving mass 104. A force in the linear motion vibration actuator 100 generated with an electromagnet can be modulated by controlling the current flowing through the electromagnet.

One embodiment of linear motion vibration actuator 100 in accordance with the present disclosure is shown in FIGS. 5A-B as linear motion vibration actuator 110. Actuator 110 preferably contains a moving mass 112 that comprises an electromagnet, as well as a permanent magnet 116 attached to the base 114. The motion of the moving mass 112 is along the x axis as shown in the side view in FIG. 5A. The magnetization polarity of the permanent magnet 116 is along the x axis as shown by the North and South poles on the permanent magnet 116. The electromagnet is preferably configured as a coil wound about the x axis. As shown in the end view of FIG. 5B, in the present embodiment the shape of the electromagnet is desirably cylindrical and the shape of the permanent magnet 116 is desirably tubular, although the electromagnet and the permanent magnet 116 may have any other configuration. In this embodiment both the electromagnet and the permanent magnet 116 may have ferromagnetic material placed adjacent to them to increase the force output of the actuator 110.

In this embodiment, the force in the actuator 110 can be modulated by controlling the current in the electromagnet. When the current in the electromagnet flows in one direction, then the magnetic force will push the moving mass 112 towards one side of the actuator. Conversely when the current in the electromagnet flows in the other direction, then the moving mass 112 will be pushed to the other side of the actuator 110. Increasing the amount of current in the electromagnet will increase the amount of force applied onto the moving mass 112.

Another embodiment of the linear motion vibration actuator 100 in accordance with the present disclosure is shown in FIGS. 6A-B. Here, linear motion vibration actuator 120 preferably contains a moving mass 122 that comprises a permanent magnet, as well as an electromagnet magnet 126 attached to base 124. The motion of the moving mass 122 is along the x axis as shown in the side view in FIG. 6A. The magnetization polarity of the permanent magnet is along the x axis as shown by the North and South poles on the permanent magnet. The electromagnet 126 is preferably a coil wound about the x axis. As shown in the end view of FIG. 6B, in this embodiment the shape of the electromagnet 124 is tubular and the shape of the permanent magnet is cylindrical.

In this embodiment both the electromagnet 124 and the permanent magnet of the moving mass 122 may have ferromagnetic material placed adjacent to them to increase the force output of the actuator 120. The force in the actuator 120 can be modulated by controlling the current in the electromagnet 124. When the current in the electromagnet 124 flows in one direction, then the magnetic force will push the moving mass 122 towards one side of the actuator 120. Conversely when the current in the electromagnet flows in the other direction, then the moving mass 122 will be pushed to the other side of the actuator 120. Increasing the amount of current in the electromagnet will increase the amount of force applied onto the moving mass 122.

Another embodiment of the linear motion vibration actuator 100 in accordance with aspects of the present disclosure is shown in FIGS. 7A-B, which is similar to the embodiment shown in FIGS. 6A-B. Here, actuator 130 includes a moving mass 132 and a base 134. The moving mass 132 preferably comprises a permanent magnet. An electromagnet 136 at least partly surrounds the moving mass 132. The electromagnet 136 is desirably connected to the base 134. Unlike the actuator 120, the actuator 130 in this embodiment preferably includes one or more springs 138 that are attached to the base 134 and to the moving magnet 132 at either end, as shown in the side view of FIG. 7A. The springs 138 are operable to generate forces in a direction that returns the moving mass 132 to a center position, for instance midway between either end of the electromagnet 136.

The springs 138 function to keep the moving mass 132 close to the center position when the actuator power is off, and to provide a restoring force when the moving mass 132 is at one end of travel of the actuator 130. The stiffness of the springs 138 can be selected so that the natural frequency of the actuator 130 increases the amplitude of vibration at desired natural frequencies. This spring effect can be generated from a single spring, from a nonlinear spring, from extension springs, as well as compression springs. A number of such spring configurations which may be employed with the present disclosure are described in the aforementioned U.S. patent application Ser. No. 11/325,036.

Another embodiment of the linear motion vibration actuator 100 according to aspects of the present disclosure is shown in FIGS. 8A-B. This embodiment is similar to the embodiments shown in FIGS. 6A-B and 7-B in that actuator 140 includes a moving mass 142 including a permanent magnet, a base 144, and an electromagnet 146 coupled to the base 144 and at least partly surrounding the moving mass 142. The electromagnet 146 may be, e.g., rigidly or semi-rigidly coupled such that a vibration force is transmitted from the actuator 140 to the base 144, for instance to enable a user to perceive the vibration force. In this embodiment, a pair of permanent magnets 148 is attached to the base and are in operative relation to the moving magnet 142 at either end as shown in the side view of FIG. 8A. The permanent magnets 148 have poles, as shown by the N and S in FIG. 8A, which are configured to repel the moving mass 142 and to generate forces in a direction that returns the moving mass 142 to a center position. The permanent magnets 148 function to keep the moving mass 142 close to a center position when the actuator power is off, and to provide a restoring force when the moving mass 142 is at one end of travel of the actuator 140.

The size of the permanent magnets 148 attached to the base 144 can be selected so that the natural frequency of the actuator 140 increases the amplitude of vibration at desired natural frequencies. The actuator 140 may be controlled so that one or more natural frequencies are selected during different modes or times of operation. Use of repulsive magnetic forces as shown in FIG. 8A to generate centering forces on the moving permanent magnet of the moving mass 142 can provide lower friction than use of springs 138 as shown in FIG. 7A, and thus can generate increased actuator efficiency and smoothness. A number of configurations showing use of permanent magnets to center a moving mass, which are suitable for use in the present disclosure, are described in the aforementioned "Vibration Device" patent application.

Alternative embodiments of linear motion vibration actuators that may also be utilized with the present disclosure include both springs and magnets, either alone or in combination, that return a moving mass towards the center of range of motion of the actuator.

A further alternative embodiment of the linear motion vibration actuator 100 in accordance with the present disclosure is shown in FIG. 9. This embodiment comprises actuator 150, which is similar to a solenoid in that it has a ferromagnetic moving plunger 152 for moving relative to a base 154. The plunger 152 is pulled into an electromagnetic coil 156 when current flows through the coil 156. The coil 156 is coupled to the base 154. A ferromagnetic end piece 158 can be located within or at the end of the coil 156 to increase the force output of the actuator 150. A spring device 160 may be positioned opposite the end piece 158. The spring device 160 is preferably employed to retract the plunger 152 out of the coil 156. As shown in FIG. 9, both an end of the coil 156 and an end of the spring 160 are desirably fixed to the base 154 of the actuator 150. The coil 156 and the spring 160 may be fixed to a single base at different sections thereon, or may be fixed to separate base elements that are coupled together. The current in the coil 156 can be turned on and off to generate a vibration force.

Figure 10:
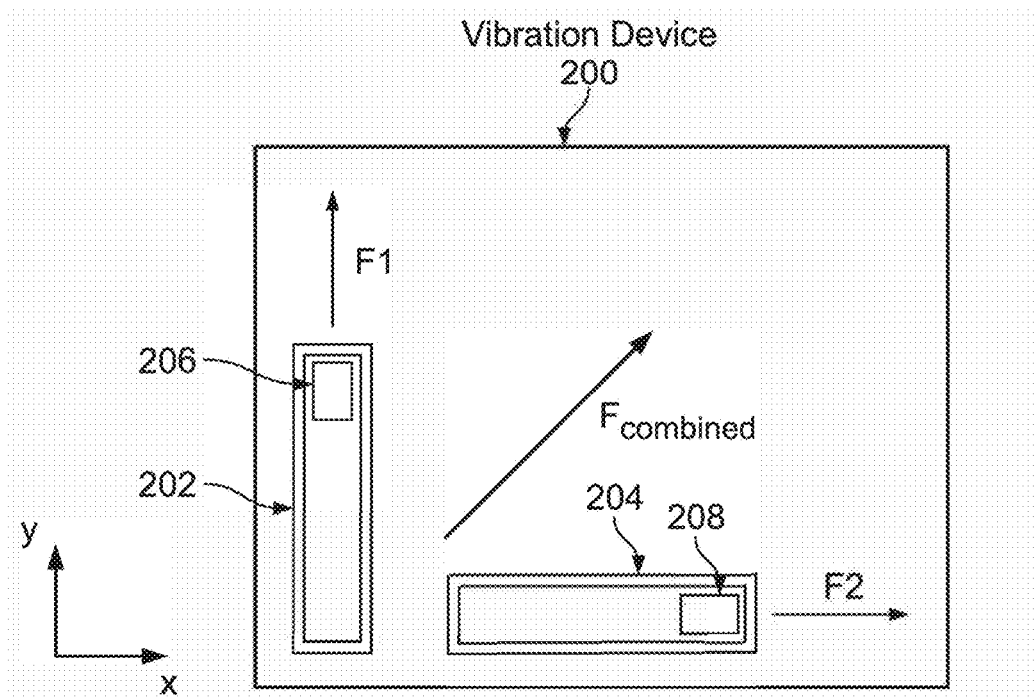
FIG. 10 illustrates a vibration device in accordance with aspects of the present disclosure.

A preferred embodiment of a vibration device 200 according to the present disclosure is shown in FIG. 10. In this embodiment, the vibration device 200 preferably includes two linear motion vibration actuators mounted on to it, namely actuator 202 and actuator 204. The actuator 202 includes a moving mass 206 and the actuator 204 includes a moving mass 208. The vibration actuators 202, 204 are attached to the vibration device 200 in a manner that transmits the force from the vibration actuators 202, 204 to the vibration device 200. Preferably the vibration device 200 has an enclosure or base (not shown) to which the vibration actuators 202, 204 are connected.

The vibration actuators 202, 204 are desirably attached in a relatively rigid fashion to the vibration device enclosure or base. Rigid attachment provides a common base to the vibration device 200, upon which forces from both vibration actuators 202, 204 are applied. In this embodiment, the two actuators 202, 204 are mounted at approximately right angles to each other. The force generated by actuator 202 is shown as force vector F1, and the force vector from actuator 204 is shown as F2. As expressed herein, vectors and matrices are designated by bold font and scalars are designated without bolding. The combined force generated by the vibration device 200 is the vector sum of the vibration forces from both of the actuators 202, 204, and is shown in FIG. 10 as vector Fcombined.

The combined force, Fcombined, applied by the vibration actuators 202 and 204 onto the vibration device 200 is a superposition of the vibration forces from each actuator, and is a function of time, t. The force vector can Fcombined(t) is given by the vector equation:

$$F_{combined}(t) = F_1(t) + F_2(t) \tag{5}$$

where $F_1(t)$ is the force vector from actuator 202 as a function of time, and $F_2(t)$ is the force vector from actuator 204 as a function of time.

Both actuators 202, 204 can be operated in a vibratory fashion. For the case of a sine wave vibration, the actuator forces can be given by:

$$F_1(t) = a_1 A_1 \sin(\omega_1 t + \phi_1) \tag{6}$$

and $$F_2(t) = a_2 A_2 \sin(\omega_2 t + \phi_2) \tag{7}$$

respectively, where $A_1$ and $A_2$ are the respective amplitudes of vibration, $a_1$ and $a_2$ are the unit vectors corresponding to the respective directions of vibration, $\omega_1$ and $\omega_2$ are the respective frequencies of vibration, $\phi_1$ and $\phi_2$ are the respective phase angles, and t is time. Other profile vibrations including square waves, triangle waves, and other profiles can also be implemented with each actuator.

In the example shown in FIG. 10, actuator 202 is aligned with the y axis, and thus the unit vector $a_1$ is represented by:

$$a_1 = \begin{bmatrix} 0 \\ 1 \end{bmatrix} \tag{8}$$

and the unit vector $a_2$ aligned with the x axis and is represented by:

$$a_2 = \begin{bmatrix} 1 \\ 0 \end{bmatrix} \tag{9}$$

The combined force vector, $F_{combined}$, is given by the superposition of forces form the actuators 202 and 204, and thus is given by:

$$F_{combined}(t) = a_1 A_1 \sin(\omega_1 t + \phi_1) + a_2 A_2 \sin(\omega_2 t + \phi_2) \tag{10}$$

It is possible to vibrate actuators 202 and 204 shown in FIG. 10 in a manner that is in-phase and in synchronous vibration. Under such vibration, there will be a single vibration frequency, $\omega$ and a single phase $\phi$ Accordingly, $F_{combined}$ can be given by:

$$F_{combined}(t) = [a_1 A_1 + a_2 A_2]\sin(\omega t + \phi) \tag{11}$$

With such in-phase and synchronous vibration the vibration is synchronized, then the peak forces from both linear motion vibration actuators will occur at the same instances during each cycle of vibration. The net direction of vibration force is the vector combination of $[a_1 A_1 + a_2 A_2]$. Thus, in synchronized vibration and in-phase vibration, the vibration device generates a vibration force at a specified frequency in a specified direction that results from the vector combination of forces from the direction and magnitude of each of the actuators in the device. It is possible to control the magnitude of vibration in each linear motion vibration actuator, and thereby control the net direction of vibration of $F_{combined}$.

In a preferred example, the vibration frequency, $\omega$, phase $\phi$, and waveform of each actuator are substantially identical. For instance, $\omega_2$ may be set to be substantially equal to $\omega_1$ and $\phi_2$ may be set to be substantially equal to $\phi_1$. By way of example only, $\omega_2$ may be set to within 10% of the value of $\omega_1$, more preferably to within 5% of the value of $\omega_1$. Similarly, by way of example only, $\phi_2$ may be set to within 10% of the value of $\omega_1$, more preferably to within 5% of the value of 41. In another example, the frequencies and/or phases may be set exactly equal to one another. Alternatively, the frequencies, phases, and/or waveforms of each actuator may be set so that a user would not be able to notice the difference in frequency, phase or waveform. In a further alternative, if the vibration device is used in a haptic application to generate force sensations on the user, small variations may occur which may not be detected by the user or which cannot be significantly felt by the user. In other instances, force sensations in a haptic application or in a vibratory feeder application may vary minutely so that user performance in the haptic application or performance of the vibratory feeder is not significantly changed.

It is also possible to apply equation 11 to a vibration profile/waveform of arbitrary shape. Here, waveform p(t) may be used to represent the waveform shape over time t. A period of vibration may be represented by p(t)=p(t+nT), where n=1, 2, 3, etc. and T is the period of vibration. In this case, an arbitrarily shaped synchronized vibration profile may be represented as:

$$F_{combined}(t) = [a_1(t) A_1(t) + a_2(t) A_2(t)] p(t) \tag{11.1}$$

When the direction of vibration force for each actuator is substantially constant relative to a base member, the arbitrarily shaped synchronized vibration profile may be represented as:

$$F_{combined}(t) = [a_1 A_1(t) + a_2 A_2(t)] p(t) \tag{11.2}$$

Figure 11:
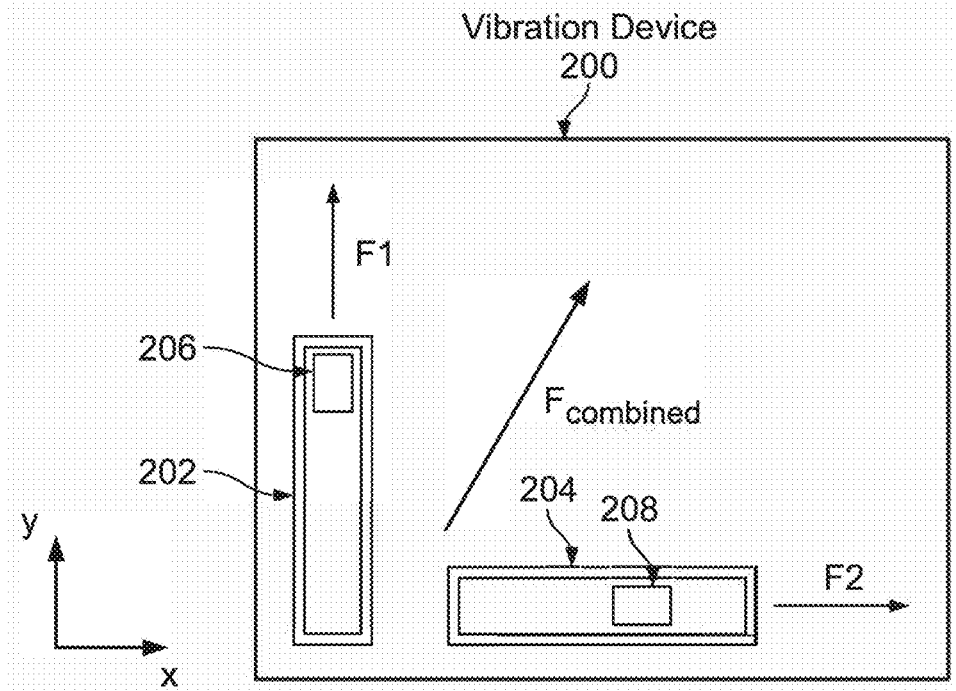
FIG. 11 illustrates the vibration device of FIG. 10 for generating a counterclockwise rotation in accordance with aspects of the present disclosure.

To illustrate how the direction of $F_{combined}$ can be controlled, the peak magnitudes, $A_1$ and $A_2$, are represented in FIGS. 10 and 11 by the location of the moving masses 206 and 208 within each of the actuators 202 and 204, respectively. In FIG. 10, both actuator 202 and actuator 204 are desirably vibrated at the same amplitude, and the corresponding $F_{combined}$ is at approximately a 45 degree angle between the actuators 202, 204.

By varying the magnitude of the vibration force in the actuators 202, 204, it becomes possible to control the direction of vibration of the combined force effect. In FIG. 11, the actuator 202 is vibrating at peak amplitude as illustrated by the peak position of moving mass 206 at the end of travel limits of actuator 202. However, actuator 204 is vibrating at a lower peak amplitude, as illustrated by the peak position of moving mass 208 closer to the middle of travel limits of actuator 204. The lower peak force is also illustrated in FIG. 11 by the shorter length vector for $F_2$. The direction of the combined force, $F_{combined}$, is the result of vector addition of $F_1$ and $F_2$, and for vibrations illustrated in FIG. 11 is rotated counterclockwise relative to the direction shown in FIG. 10.

Figure 12:
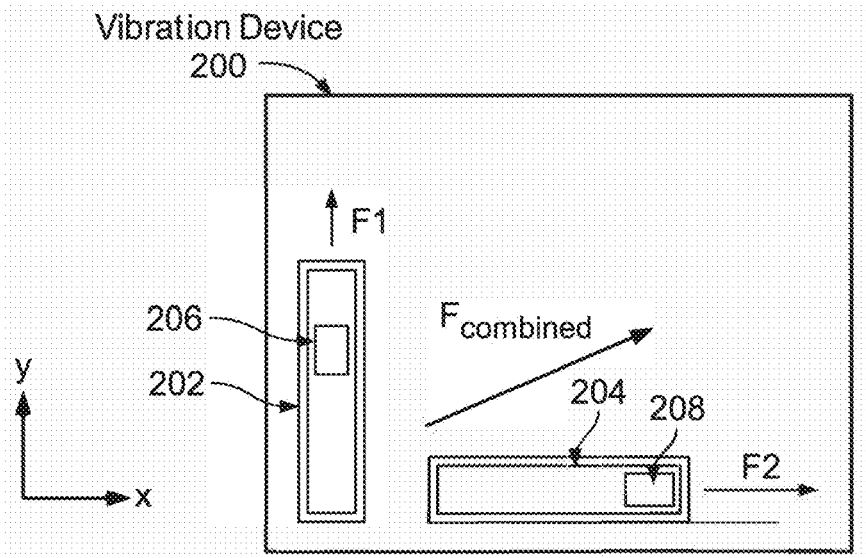
FIG. 12 illustrates the vibration device of FIG. 10 for generating a clockwise rotation in accordance with aspects of the present disclosure.

In a similar fashion, the direction of combined force can be rotated in the clockwise direction as shown in FIG. 12. The vibration case illustrated in FIG. 12 shows the peak amplitude of vibration of actuator 202 reduced relative to that shown in FIG. 10, while the peak amplitude of actuator 204 remains high. In this case, the vector addition of $F_1$ and $F_2$ results in a clockwise rotation of $F_{combined}$ in FIG. 12 relative to the direction shown in FIG. 10.

Figure 13:
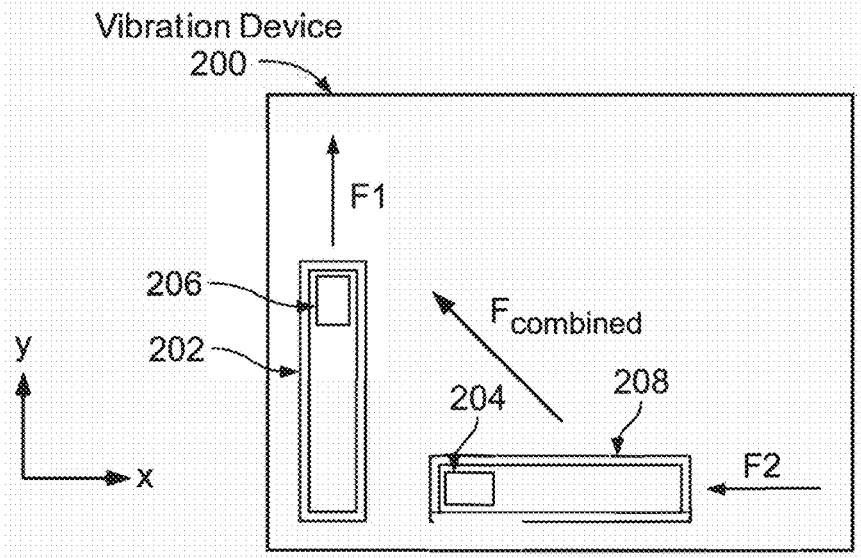
FIG. 13 illustrates the vibration device of FIG. 10 for generating a change in the direction of force in accordance with aspects of the present disclosure.

It is also possible to change the direction of $F_{combined}$ to an adjacent quadrant. As shown in FIG. 13, the sign of the $F_2$ has changed be in the direction of the negative x axis, relative to the positive x direction that shown in FIG. 10. The change in sign of $F_2$ can be achieved by changing the sign of $A_2$ in equation 11 above. It should be noted that one could achieve a similar representation of the combined force equation by defining actuator 204 vibration as at 180 degrees out of phase of actuator 202. However, changing the sign on the actuators vibration amplitude maintains the form of equation of synchronous vibration shown in equation 11. Thus, vibration that can be represented as 180 degrees out of phase can also be represented as in-phase vibration but with a negative amplitude of vibration.

Figure 14:
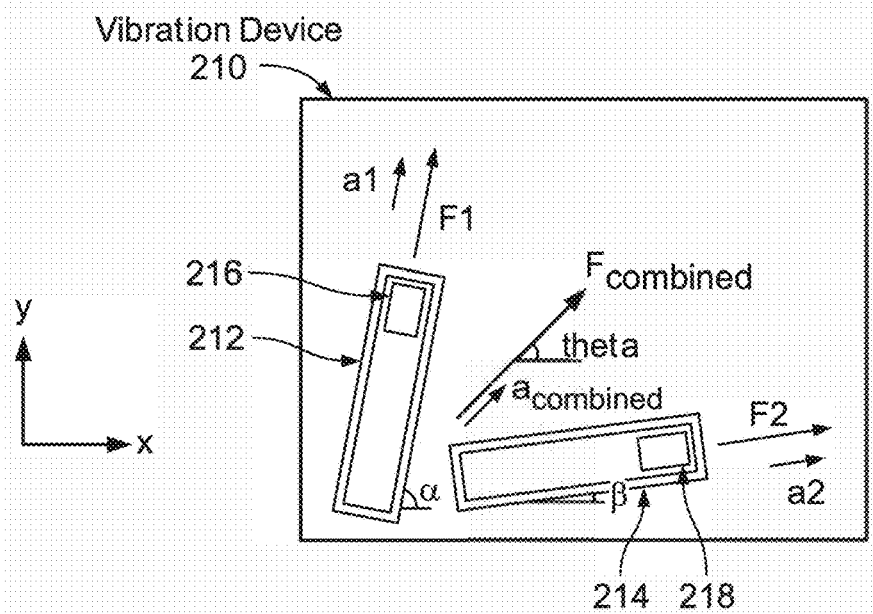
FIG. 14 illustrates a vibration device employing non-orthogonal linear actuators in accordance with aspects of the present disclosure.

An alternative embodiment of a vibration device in accordance with the present disclosure is shown in FIG. 14. Here, vibration device 210 includes a first actuator 212 and a second actuator 214, having respective moving masses 216 and 218. FIG. 14 represents a two dimensional embodiment where two linear motion vibration actuators 212, 214 are aligned with an xy plane. In this embodiment, it is not necessary for the actuators 212, 214 to be orthogonal to each other. A1 and A2 are respectively the amplitudes of vibration of actuators 212 and 214, while a1 and a2 are respectively the unit vectors specifying the direction of vibration of actuators 212 and 214.

The unit vector $a_1$ is given by:

$$a_1 = \begin{bmatrix} \cos(\alpha) \\ \sin(\alpha) \end{bmatrix} \tag{12}$$

where the angle α describes the orientation of actuator 1 relative to the x axis as shown in FIG. 14. The unit vector $a_2$ is given by:

$$a_2 = \begin{bmatrix} \cos(\beta) \\ \sin(\beta) \end{bmatrix} \quad (13)$$

where the angle β describes the orientation of actuator 2 relative to the x axis as shown in FIG. 14.

For a given vibration waveform the maximum magnitude of force vectors, $F_{1,max}$ and $F_{2,max}$, from actuators 212 and 214 in FIG. 14 can be given by equations:

$$F_{1,max} = A_1 a_1 \quad (14)$$

$$F_{2,max} = A_2 a_2 \quad (15)$$

When actuators 212 and 214 are vibrated synchronously and in-phase (e.g. with the same frequency and with zero phase difference), then the maximum force amplitude occurs at the same time. Thus the maximum combined force vector, $F_{combined,max}$, is given though superposition of the force vectors, and is given by:

$$F_{combined,max} = F_{1,max} + F_{2,max} \quad (16)$$

$$D_L = [a_1 \mid a_2] \quad (17)$$

A matrix of actuator directions, $D_L$, can be created where each of its columns is a unit vector that corresponds to the direction of vibration of a linear motion vibration actuator in a vibration device. For a vibration device with two linear motion vibration actuators, such as the one shown in FIG. 14, the matrix $D_L$ is given by:

$$D_L = [a_1 \mid a_2] \quad (17)$$

where $a_1$ and $a_2$ are column vectors.

A matrix representation of the combined force is given by:

$$F_{combined,max} = D_L \begin{bmatrix} A_1 \\ A_2 \end{bmatrix} \quad (18)$$

where $A_1$ and $A_2$ are scalars. For the case of vibration in a plane, the vectors a, and $a_2$ will be 2×1 vectors and the matrix $D_L$ will be 2×2.

When the direction matrix, $D_L$, is invertible then the amplitude of vibration in the individual actuators that corresponds to a desired combined force vector, $F_{combined}$, is given by:

$$\begin{bmatrix} A_1 \\ A_2 \end{bmatrix} = D^{-1} F combined \quad (19)$$

When the actuators are aligned orthogonally, then the direction matrix, $D_L$, is orthonormal and its inverse is given by its transpose as shown below:

$$D^{-1} = D^T \quad (20)$$

When the direction matrix, $D_L$, in not invertible because there are more vibration actuators than directions of force being controlled, then a pseudo inverse of matrix $D_L$ can be used. For example, if there are 3 vibration actuators in the xy plane, and the control objective is only to control a two dimensional force, the $D_L$ matrix is given by:

$$D_L = [a_1 \mid a_2 \mid a_3] \quad (21)$$

where $a_1$, $a_2$, and $a_3$ are 2×1 column vectors.

The pseudo inverse is described in "*Introduction to Linear Algebra*", 3rd Edition by Gilbert Strang, published in 2003 by Wellesley-Cambridge Press, the entire disclosure of which is incorporated by reference herein.

One method for calculating a pseudo inverse, $D_L^+$, is given by:

$$D_L^+ = D_L^T (D_L D_L^T)^{-1} \quad (22)$$

In such a case the amplitude of vibration for each actuator can be given by:

$$\begin{bmatrix} A_1 \\ A_2 \\ A_3 \end{bmatrix} = D_L^+ F combined \quad (23)$$

It is possible to specify the combined force vector, $F_{combined}$, in terms of a direction of vibration and amplitude. For a two dimensional embodiment the combined amplitude of vibration can be specified by the scalar $A_{combined}$, and the direction of vibration can be specified by an angle, theta, as shown in FIG. 14. In this two dimensional embodiment $F_{combined}$ can be given by:

$$F_{combined} = A_{combined} \begin{bmatrix} \cos(theta) \\ \sin(theta) \end{bmatrix} \quad (24)$$

Thus, it can be seen that the amplitudes of vibration, $A_1$ and $A_2$, can be represented in terms of the direction of vibration, theta, combined amplitude of vibration, $A_{combined}$, and direction matrix, $D_L$, as given by:

$$\begin{bmatrix} A_1 \\ A_2 \end{bmatrix} = D_L^{-1} A combined \begin{bmatrix} \cos(theta) \\ \sin(theta) \end{bmatrix} \quad (25)$$

Equation 25 provides the scalar magnitude of $A_1$ and $A_2$. When the sign of $A_1$ is different than the sign of $A_2$ then vibration waveform can be generated directly using the results of Eq. Avec. Alternatively, the waveform can be generated using absolute values of $A_1$ and $A_2$ but with one waveform completely out of phase with the other waveform. A sine wave is defined to be completely out of phase when it is 180 degrees out of phase. General waveforms are defined to be completely out of phase when the maximum positive amplitude of vibration of one waveform concedes with the maximum negative amplitude of the other waveform. A depiction of two actuators vibrating completely out of phase is shown in FIG. 13. Two actuators vibrating completely out of phase are also considered to be in synchronized vibration.

It is also possible to specify the combined direction of vibration in terms of a unit vector, $a_{combined}$, as shown in FIG. 14. The vector $F_{combined}$ can be given by:

$$F_{combined} = A_{combined} \times a_{combined} \qquad (26)$$

Figure 15:
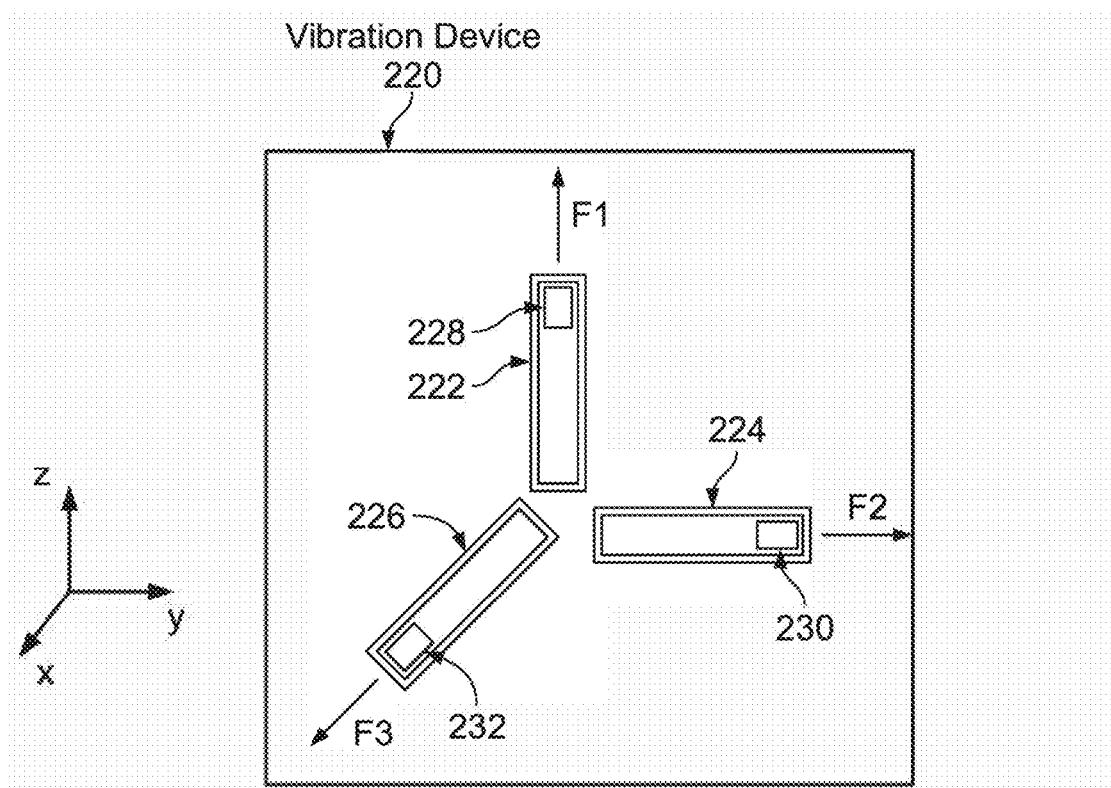
FIG. 15 illustrates a vibration device employing a set of linear actuators for generation of a three dimensional force vector in accordance with aspects of the present disclosure.

Another configuration according to aspects of the present disclosure is a three dimensional configuration, where there are at least 3 linear motion vibration actuators as shown in FIG. 15.

In the vibration device 220 of FIG. 15, actuators 222, 224 and 226 each include a moving mass 228, 230 and 232, respectively. The actuators 222, 224 and 226 are preferably orthogonal to each other and aligned with an xyz coordinate system. In an alternative three dimensional embodiment the actuators are not necessarily orthogonal to each other; yet the force vectors of the actuators span the three dimensional vector space. With such an alternative, an arbitrary direction of three dimensional force can be generated. In the three dimensional cases, the combined direction of vibration can be specified by the 3×1 unit vector, $a_{combined}$. The three dimensional combined force can be given by the same equations for the 2 dimensional case, as shown below $$F_{combined} = A_{combined} \times a_{combined} \qquad (27)$$

where $a_{combined}$ and $F_{combined}$ are 3 dimensional vectors.

Vibration devices according to the present disclosure may include an arbitrary number of actuators in arbitrary locations and orientations.

Figure 16:
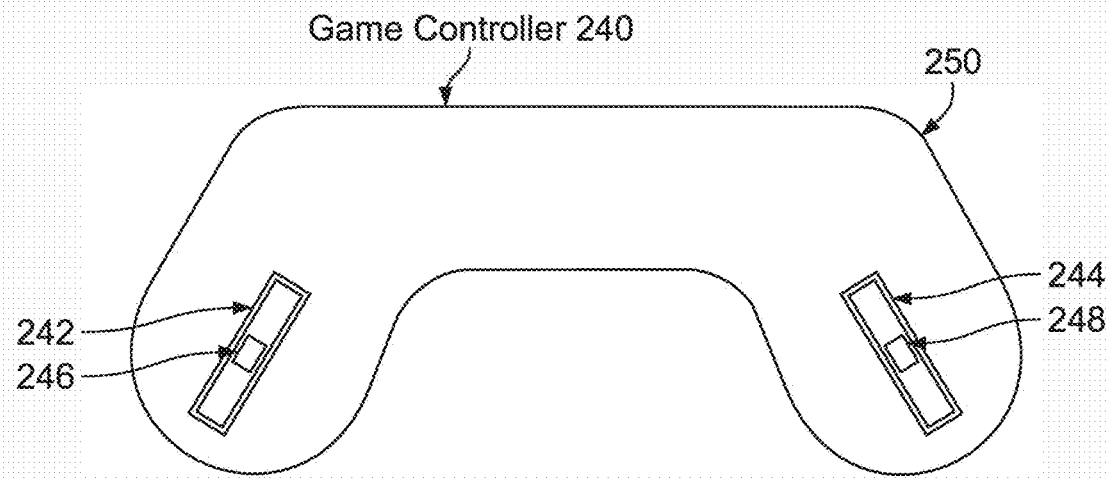
FIG. 16 illustrates a game controller in accordance with aspects of the present disclosure.

FIG. 16 illustrates a vibration device 240 having a pair of actuators 242 and 244. The actuators 242 and 244 include moving masses 246 and 248, respectively. In this embodiment, vibration device housing 250 is configured as a hand held game controller for computer or video games. Linear motion vibration actuator 242 is shown as being located in the left handle and linear motion vibration actuator 244 is shown as being located in the right handle. The actuators 242 and 244 need not be orthogonal, and need not be in the same plane.

Figure 17:
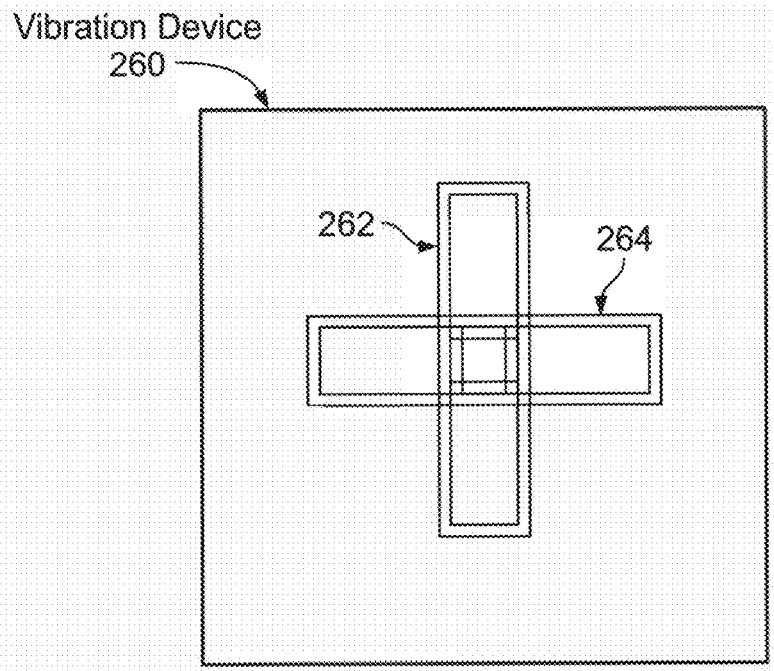
FIG. 17 illustrates a vibration device in accordance with aspects of the present disclosure.

Another alternative embodiment of a vibration device according to the present disclosure is shown in FIG. 17, where vibration device 260 includes a first linear motion vibration actuator 262 and a second linear motion vibration actuator 264. As shown, the actuators 262, 264 are located on top of each other. An advantage of such a configuration is that the actuators 262, 264 create little torque about the center of the vibration device 260, which may be desirable in some vibration applications.

Figure 18:
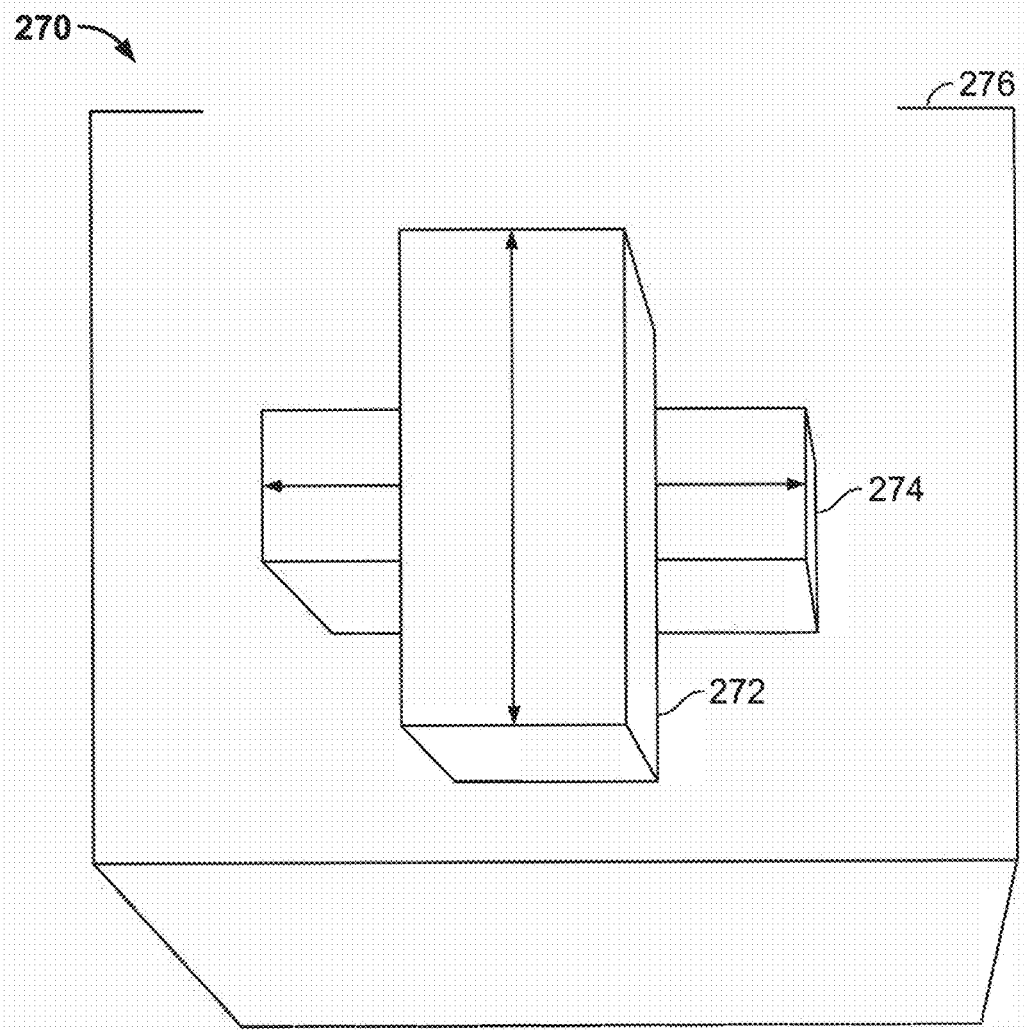
FIG. 18 illustrates another vibration device in accordance with aspects of the present disclosure.

In a variation of FIG. 17, FIG. 18 illustrates a game controller 270 having two linear actuators, 272 and 274 disposed perpendicular to each other. The actuators 272 and 274 are preferably rigidly mounted to case 276 of a game controller. The actuators 272 and 274 could be mounted in a plane of any angle; however, they are preferably mounted in a horizontal plane of the case 276. The actuators 272 and 274 do not have to be located one on top of the other; rather they can be attached to the same rigid body, such as the case 276 of a game controller. Of course, one could attach three or more linear actuators to the case 276, preferably at right angles to each other to create force vectors than span the three dimensional space of the case 276. Moreover, the actuators do not have to be at right angles to each other. Desirably, the actuators are positioned relative to one another with different orientations.

Figure 19:
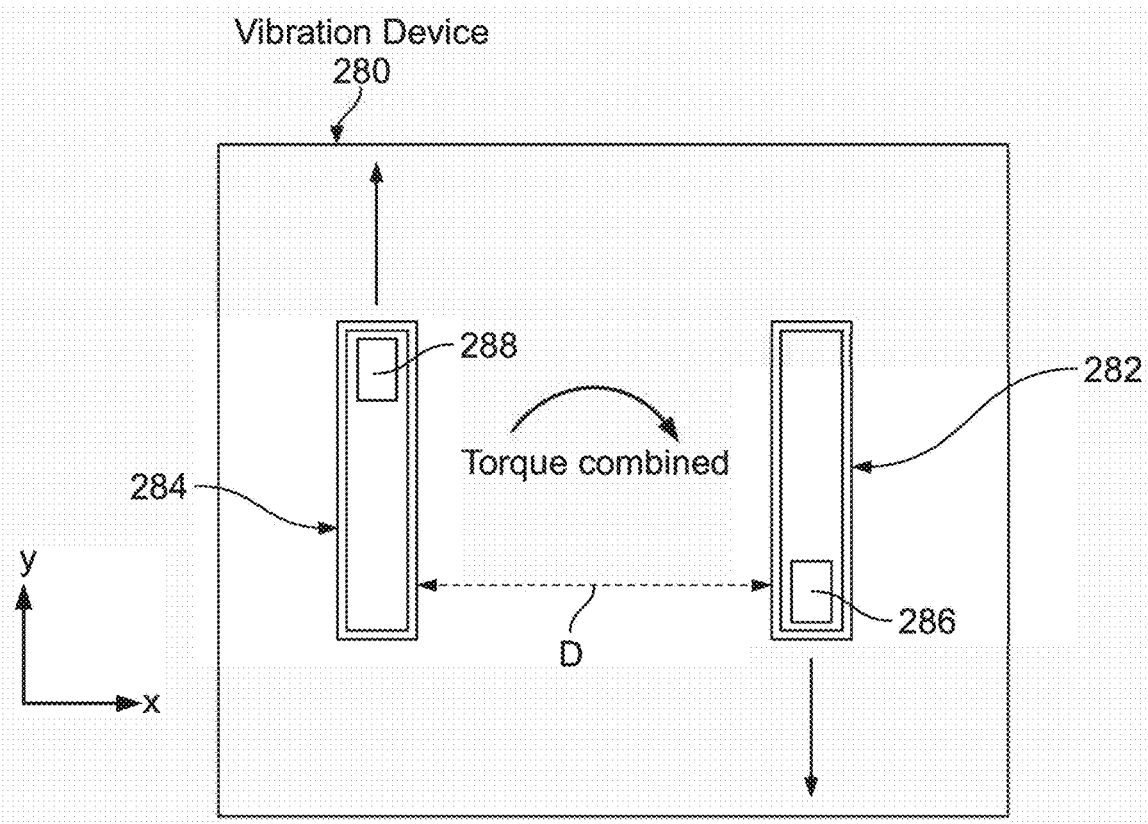
FIG. 19 illustrates a vibration device for generating a combined torque in accordance with aspects of the present disclosure.

A further embodiment of a vibration device according to the present disclosure is shown in FIG. 19. Here, vibration device 280 includes two linear motion vibration actuators, 282 and 284, which are aligned in their orientation but separated by a distance D. Actuator 282 includes moving mass 286 and actuator 284 includes moving mass 288. The actuators 282, 284 may be vibrated such that the moving mass 286 in actuator 282 is at a negative extreme along the y axis when the moving mass 288 in actuator 284 has a positive extreme along the y axis. In this fashion the two actuators 282, 284 generate a combined torque when vibrated in a synchronous fashion. The embodiment shown in FIG. 19 could be operated, in one example, such that the moving masses 286 and 288 move in the same direction when synchronized, and thereby generate a combined force along the y axis. In this fashion the configuration shown in FIG. 19 could be used to generate a combined torque, a combined force, or a combination of force and torque.

Figure 20:
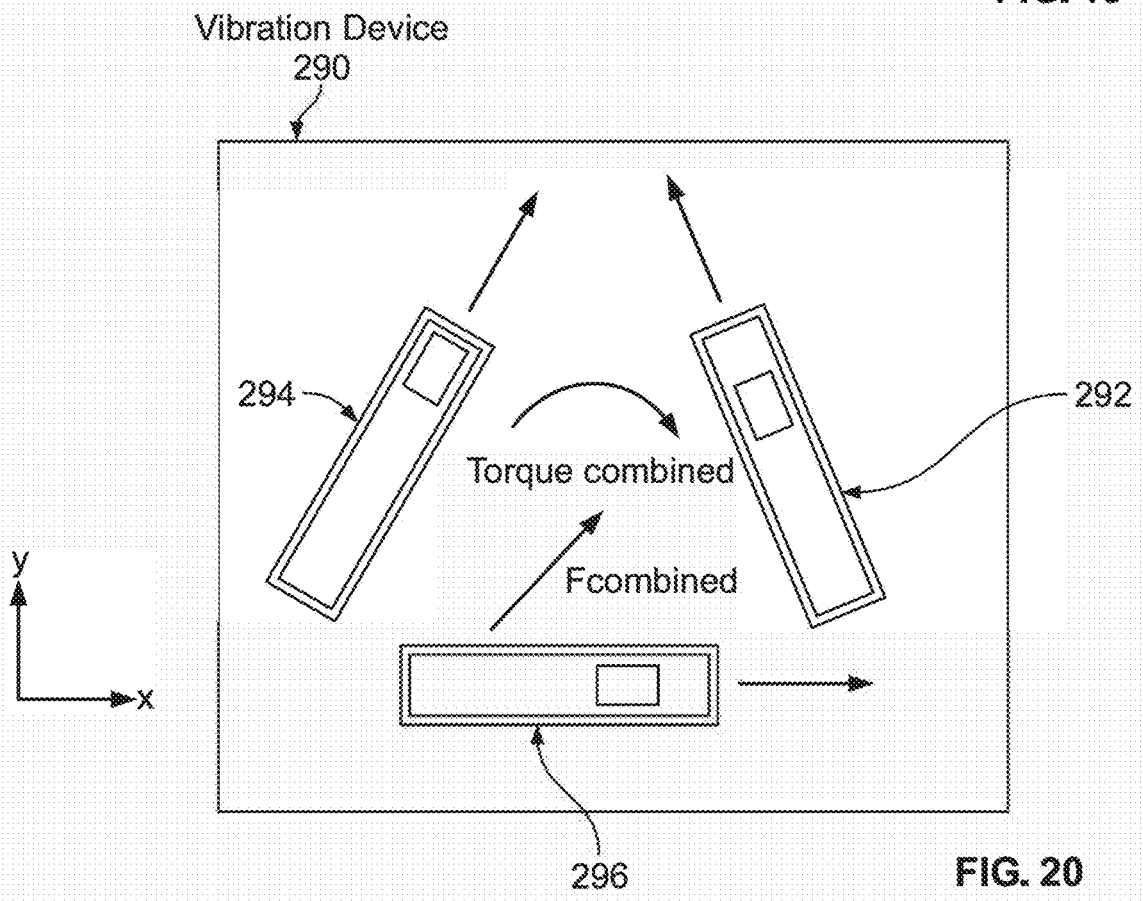
FIG. 20 illustrates another vibration device for generating a combined torque in accordance with aspects of the present disclosure.

An alternative embodiment of a vibration device 290 in accordance with aspects of the present disclosure is shown in FIG. 20. Here, three linear motion vibration actuators 292, 294 and 296, each having a moving mass, are orientated on an xy plane. In this embodiment it is possible to generate a combined force and a combined torque. It is also possible to independently control the combine force and torque by modulating the amplitude of vibration in each of the actuators 292, 294 and 296. The combined torque and force are superpositions of the forces and torques generated by each actuator. Since there are three actuators that can be controlled independently, the components of the force along the x axis, the force along the y axis, and the torque about a selected point on the xy plane can all be modulated independently.

In the vibration device embodiments described herein the vibration actuators may be attached to the vibration device in a rigid, a semi-rigid or a non-rigid fashion. Even when vibration actuators are attached in a non-rigid fashion to a vibration device, the vibration device is operable to transmit the superposition of forces from all vibration actuators. When vibration actuators are attached in a rigid fashion to a vibration device, the combined force applied by the vibration device becomes less dependent on the location where the vibration device transmits force and torques to other bodies. In addition, the more rigid the attachment between the vibration actuators and the vibration device, the more uniform the timing of the force superposition becomes at all points of the vibration device.

In an example, it is possible to attach the actuators directly onto a person's hand and body, for instance as shown in U.S. Pat. Nos. 6,275,213 and 6,424,333. In uses of the present disclosure where actuators are directly attached or indirectly coupled to the hand or body, the vibration force from each actuator may be felt directly at different locations on the body, yet a synchronized combined force vector can still be applied onto the body by synchronizing the operation of the actuators.

Vibration devices in accordance with the present disclosure can be built with rotary vibration actuators as well as with linear motion vibration actuators. In some cases the cost to manufacture rotary vibration actuators is less than the cost to manufacture linear motion vibration actuators. Thus, if cost is a factor, it may be desirable to utilize rotary vibration actuators in place of or in combination with linear motion vibration actuators. However, in order to generate synchronized vibration with rotary vibration actuators, it is necessary to control the rotary position of the actuators along with the rotary velocity.

A rotary vibration actuator may comprise, for example, a DC motor, a rotary solenoid, a rotary stepper motor, a servo motor, or other type of rotary actuator. One advantage of rotary actuators is their relatively low cost. The servo motor uses a position sensor and/or a velocity sensor for feedback. In some situations the rotary stepper motor may be more desirable because it allows for control of position and velocity without the use of a sensor.

Figure 21:
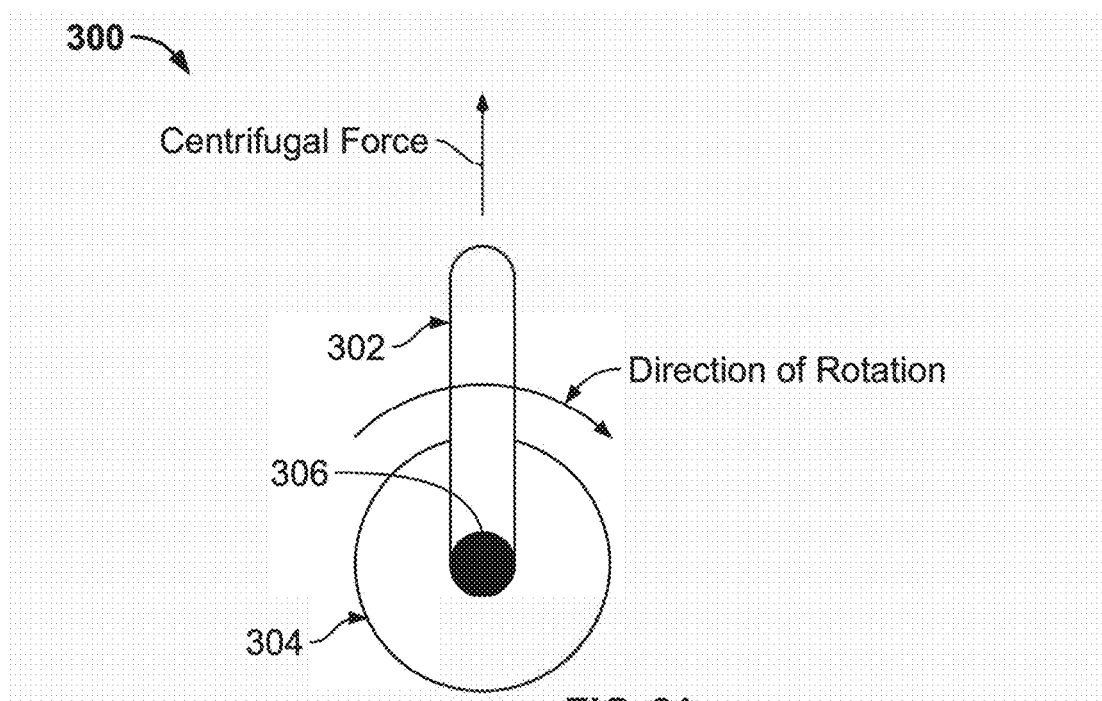
FIG. 21 illustrates a rotary vibration actuator with eccentric mass in accordance with aspects of the present disclosure.

FIG. 21 shows a rotary vibration actuator 300 suitable for use with the present disclosure. The actuator 300 includes an eccentric mass 302 coupled to a rotary actuator 304 along a shaft 306. As the rotary actuator 304 is rotated, a centrifugal force is generated in the radial direction aligned with the eccentric mass 302 as shown by the vector CF in FIG. 21.

Many existing vibrators utilize rotary vibration actuators with eccentric masses, but not with synchronized vibration. In accordance with the present disclosure, a pair of rotary vibration actuators can be configured to achieve a vibration force that is aligned with a single direction of motion. Accordingly, a pair of such rotary actuators can be used when a vibration force in a specified direction is required.

Figure 22:
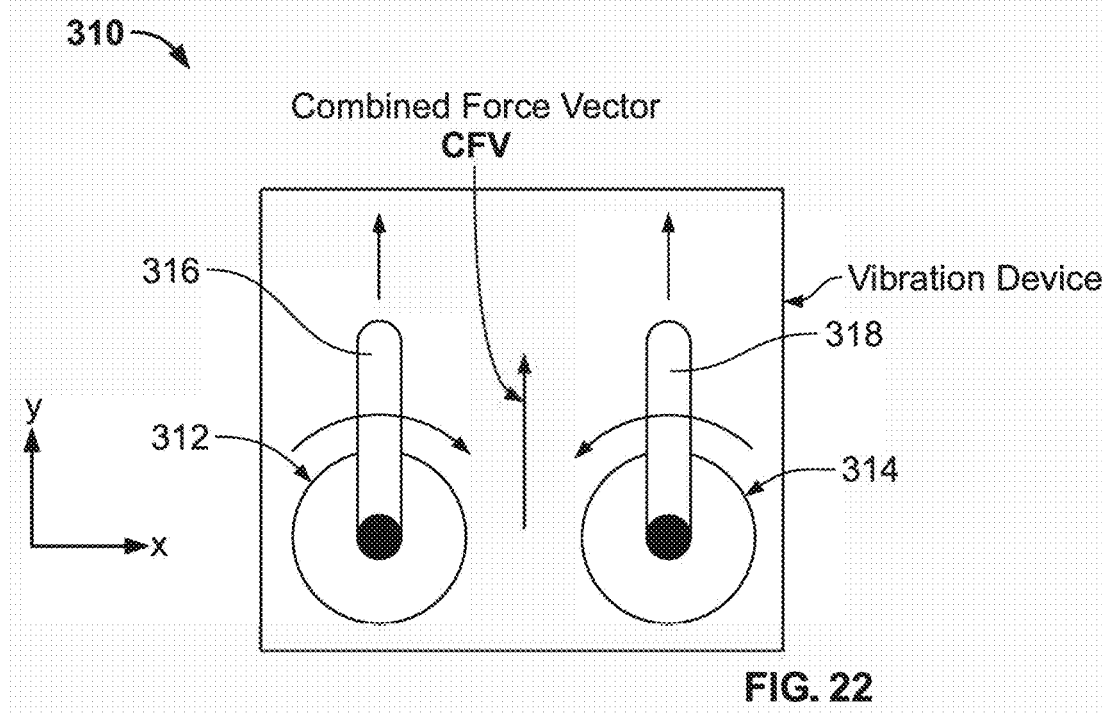
FIG. 22 illustrates a vibration device with a pair of eccentric mass actuators in accordance with aspects of the present disclosure.

For instance, a vibration device according to the present disclosure can be built, by way of example only, with two rotary vibration actuators that rotate in opposite directions, as shown in FIG. 22. As shown, the vibration device 310 includes a pair of rotary vibration actuators 312 and 314, each having an eccentric mass 316 and 318, respectively. Actuator 312 preferably rotates clockwise, and actuator 314 preferably rotates counterclockwise. In the orientation shown the centrifugal force vectors from both actuators are aligned with the y axis and superimpose to create a combined force vector, CVF, in the y direction.

With rotary vibration actuators it is possible to create synchronized vibration in an analogous fashion to the synchronized vibration described with linear motion vibration actuators. With rotary vibrating actuators, synchronized vibration is defined to occur where two rotary actuators rotate in approximately the same plane at the same angular velocity in opposite directions, and where the relative angle between the actuators is controlled, such that the actuator centrifugal force vectors align repeatedly in the direction of desired vibration force.

The direction of vibration force can be controlled with a pair of rotary (or rocking) vibration actuators by controlling the angle at which the centrifugal force vectors become aligned. Therefore, it is possible to control the direction of combined force with rotary actuators in a fashion analogous to how the direction of combined force can be controlled with multiple linear vibration actuators.

Figure 23:
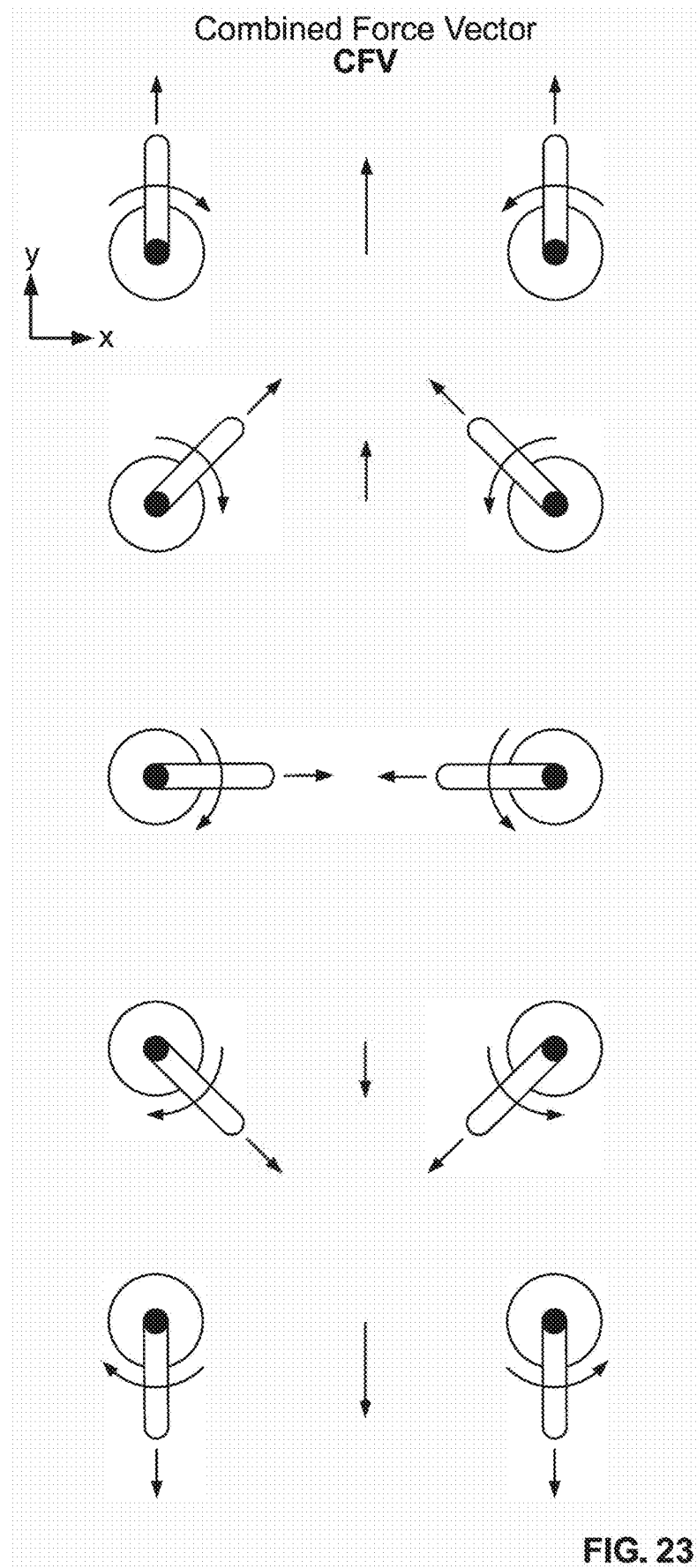
FIG. 23 illustrates synchronous vibration of eccentric mass actuators in accordance with aspects of the present disclosure.

FIG. 23 shows the embodiment of two rotary vibration actuators as described with respect to FIG. 22, wherein the actuators are controlled in synchronized vibration for a number of positions. As shown in FIG. 23, the combined force vector, CFV, remains in the y axis, and its magnitude changes according to the rotary position of the actuators. The maximum combined force vector occurs when the centrifugal force from both rotary actuators are aligned.

Figure 24A:
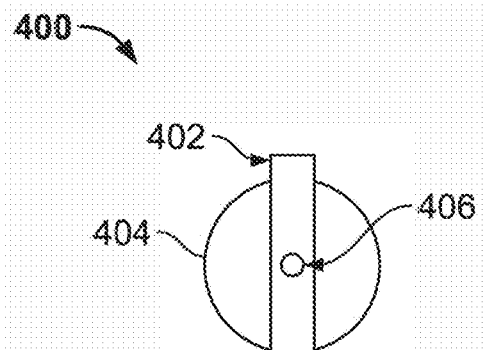
FIGS. 24A-C illustrate a pivoting actuator in accordance with aspects of the present disclosure.
Figure 24B:
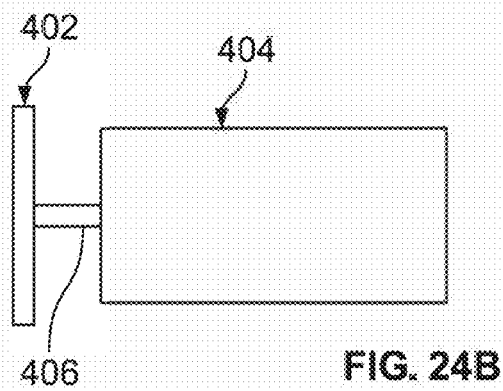
Figure 24C:
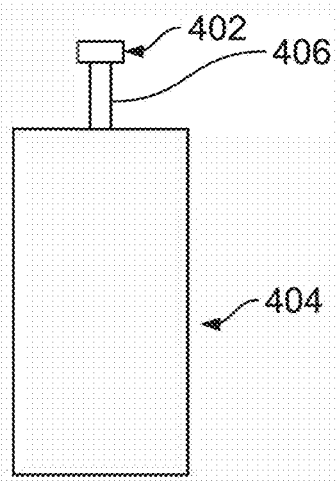

An alternative type of rotary actuator suitable for use with the present disclosure is a rotary actuator with a pivoting mass. FIGS. 24A-C illustrate respective front, side and bottom views of an exemplary pivoting actuator 400, which includes a mass 402 operable to pivot relative to a rotary actuator 404. The mass 402 is connected to the rotary actuator 404 via a shaft 406. The center of mass of the mass 402 can be located anywhere on the body of the mass 402. Thus, the center of mass may be concentric with the axis of rotation, or eccentric to the axis of rotation. The pivoting actuator 400 may be configured to function in a manner similar to the rotary vibration actuators discussed above.

Figure 25A:
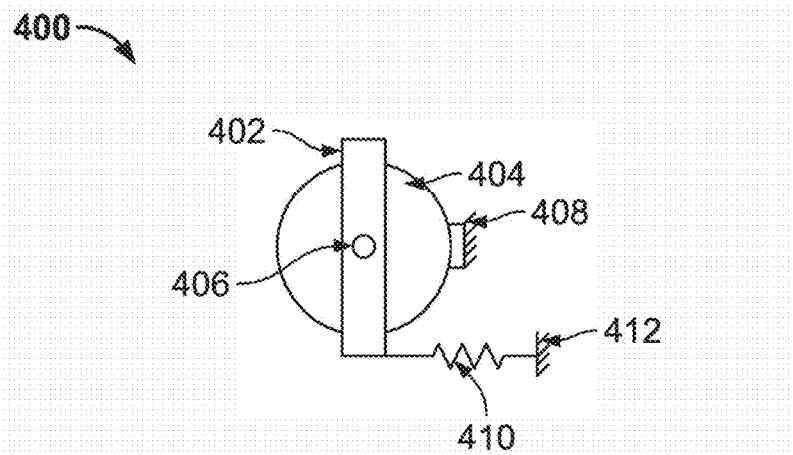
FIGS. 25A-C illustrate another pivoting actuator in accordance with aspects of the present disclosure.
Figure 25B:
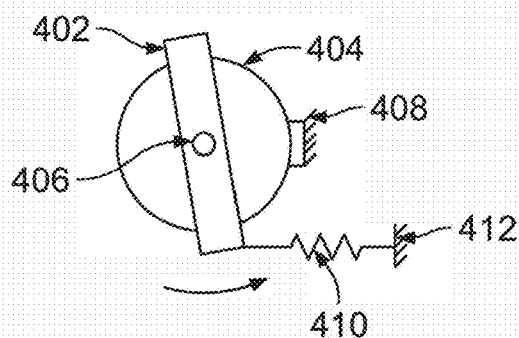
Figure 25C:
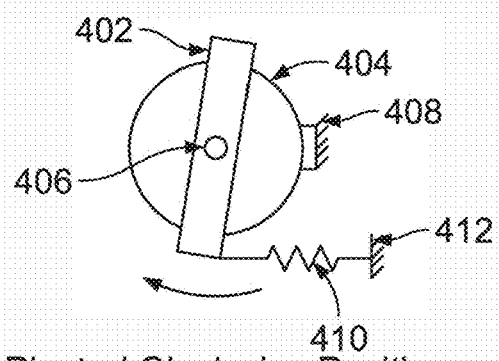

As seen in FIGS. 25A-C, the rotary actuator 404 may be affixed to a support 408, which, in turn, may connect to another object (not shown). Preferably a spring device 410 couples the pivoting mass 402 to a support 412, which may be the same or a different support than the support 408. FIG. 25A illustrates the pivoting actuator 400 when the spring device 410 is in a rest state when the pivoting mass 402 is in a central position.

The mass 402 may pivot in either a clockwise or counterclockwise manner. FIG. 25B illustrates counterclockwise operation. Here, the spring device 410 is in a compressed state. In the present embodiment as shown, the spring device 410 is under a compression force that is primarily linear and is applied toward the right hand side of the figure. FIG. 25C illustrates clockwise operation of the mass 402. Here, the spring device 410 is in an uncompressed state in response to a force that is primarily linear and is applied toward the left hand side of the figure.

Vibration forces and/or torques can be generated with the pivoting actuator 400 as shown in FIGS. 25A-C. The pivoting actuator 400 can be activated to pivot the pivoting mass 402 first clockwise and then counterclockwise, or vice versa. As the pivoting mass 402 rocks back and forth, the spring device 410 generates a vibration force, a torque, or both a vibration force and torque onto the object to which it is affixed via the support 408. In this fashion, if the pivoting mass 402 has a center of mass concentric with the axis of rotation, the pivoting mass 402 can be used to generate a vibration torque. Also in this fashion, if the pivoting mass 402 has a center of mass eccentric with the axis of rotation, the pivoting mass 402 can be used to generate a vibration force.

Vibration forces and/or torques can be generated by moving a mass back and forth. It is possible to define the beginning of a vibration waveform as an instance at which a mass reverses its direction of motion. For linear actuators, the reversal of direction is a reversal of translation. For rotary actuators, the reversal of direction is a reversal of rotation. In general, the reversal of motion of a mass in an actuator may include both translation and rotation.

In actuators having a spring device attached to a moving mass, energy can be built up in the spring device, especially when the mass is moved back and forth close to a natural frequency of the mass and spring system. In such cases, the maximum vibration force can occur at the maximum deformation of the spring device, which can occur when the mass reaches its maximum excursion and reverses its direction. Accordingly, moving masses in two (or more) actuators that are operating in synchronized vibration, can reverse direction at approximately the same time.

An alternative method for generating vibration would be to operate the pivoting actuator 400 in a clockwise (or counterclockwise) direction and then deactivate the pivoting actuator 400 while allowing the spring device 410 to rotate the pivoting mass 402 in the counterclockwise (or clockwise) direction. This approach would allow one to use pivoting actuators and control circuitry that only operates in a single direction.

Figure 26:
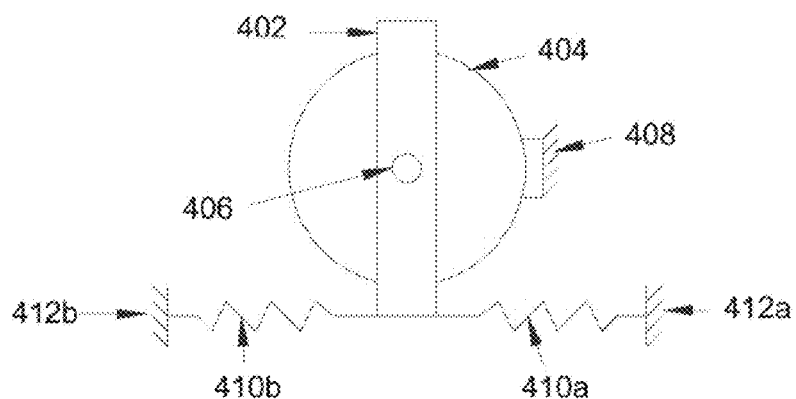
FIG. 26 illustrates a pivoting actuator utilizing a pair of spring devices in accordance with aspects of the present disclosure.

FIG. 26 illustrates a variation of the pivoting actuator 400, namely pivoting actuator 400', which desirably includes the pivoting mass 402 operable to pivot relative to the rotary actuator 404, and which is connected thereto via the shaft 406. As above, the rotary actuator 404 may be affixed to the support 408, which, in turn, may connect to another object (not shown). Preferably a first spring device 410a couples the pivoting mass 402 to a first support 412a, and a second spring device 410b also couples the pivoting mass 402 to a second support 412b. The supports 412a and 412b may be a single support, separate supports that are physically connected, or physically disconnected supports. One or both of the supports 412a,b may be the same or a different support than the support 408.

One type of pivoting actuator 400 that could be employed is a DC motor. However, not all the components of the DC motor are necessary for this application, because the output shaft does not rotate continuously. Accordingly it is not necessary to have motor brushes, which can reduce cost as well as electrical power losses and frictional losses. In a preferred example, the pivoting actuator 400 may essentially include a stator and a rotor. The stator may be stationary and desirably contains permanent magnets and/or electromagnets. The rotor is operable to pivot and can contain permanent magnets and/or electromagnets. The polarity of the magnets in the stator and rotor can be configured so that activation of the electromagnets causes an electromagnetic torque to be exerted onto the rotating mass 402.

In the embodiment of FIGS. 25A-C, the spring device 410 is configured to operate in a generally linear fashion. However, In order to generate large magnitude of vibration forces with small actuators, it can be advantageous to utilize the resonance of a system. The embodiments shown in FIGS. 25A-C have both a mass and a spring, and thus have a resonant frequency. If the actuator is excited at or close to this resonant frequency large amplitude vibrations can build up. However, it can be desirable to operate the vibration device at a range of frequencies. It is possible for a device to have a variable resonant frequency with use of nonlinear spring forces, as discussed in the aforementioned "Vibration Device" patent application. Accordingly, one could use a nonlinear spring in the vibration device to achieve larger amplitude of vibration over a range of frequencies.

It is possible to generate nonlinear spring force, even with use of a linear spring element. Consider the embodiment shown in FIG. 27A. Here, pivoting actuator 420 has a mass 422 operable to pivot relative to a rotary actuator 424. The mass 422 is connected to the rotary actuator 424 via a shaft 426. The rotary actuator 424 may be affixed to a support 427, which, in turn, may connect to another object (not shown). Preferably a spring device 428 couples the pivoting mass 422 to a support 427', which may be the same or a different support than the support 427.

Figure 27A:
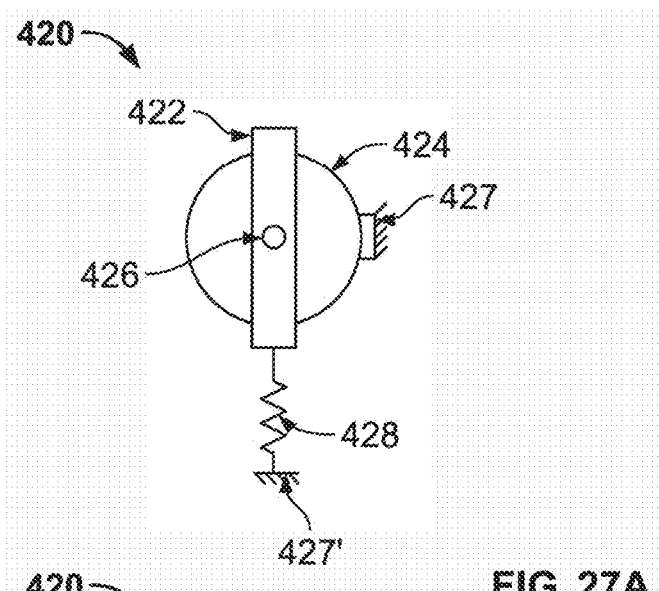
FIGS. 27A-F illustrate a further pivoting actuator in accordance with aspects of the present disclosure.

As shown in FIG. 27A, the spring device 428 is desirably placed in-line with the pivoting mass axis. When the pivoting mass 422 is rotated a small amount about the center position very little lengthening occurs in the spring device 428. Accordingly, the effective spring constant is low and the resonant frequency is low.

Low frequency operation is desirable in some situations, for instance in games that have low frequency effects. For instance, games may generate actions or events in the sub-200 Hertz range, such as between 15 and 150 Hertz. In certain cases the actions or events may be as low as 20-50 Hertz or lower, such as about 10-20 Hertz. Examples of such actions/events include gunshots, automobile related sounds such as a car spinning out of control, and helicopter related sounds such as the whirring of the rotor blades. Eccentric mass actuators may not be suitable to generate a haptic sensation in this frequency range, but pivoting actuators or linear actuators may generate such frequencies.

Figure 27B:
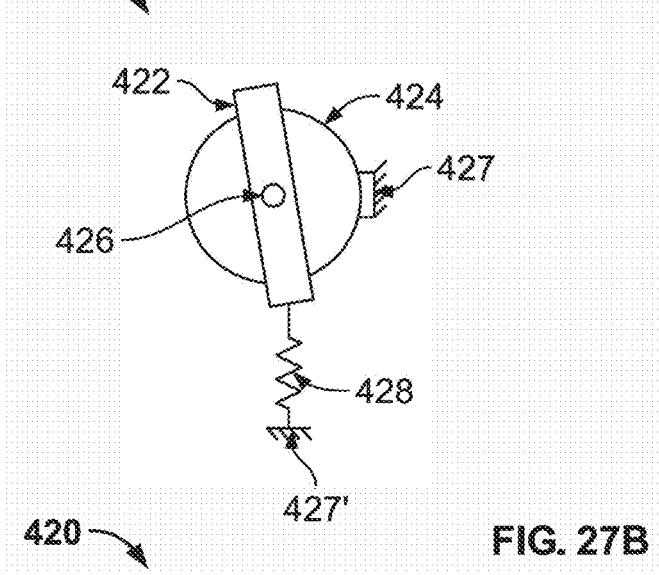
Figure 27C:
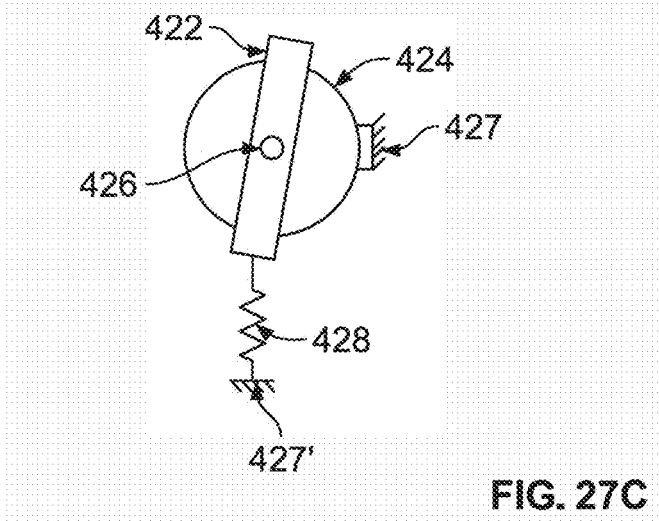

As the magnitude of rotation of the pivoting mass 422 increases, the lengthening of the spring device 428 increases as shown in FIGS. 27B and 27C. Accordingly, for larger amplitudes of rotation, the effective spring constant is higher and the natural frequency of the system is higher. In order to quickly ramp up the vibration amplitude when a nonlinear spring force is used, the excitation frequency can be varied so that it always matches the natural frequency of the vibration device.

Figure 27D:
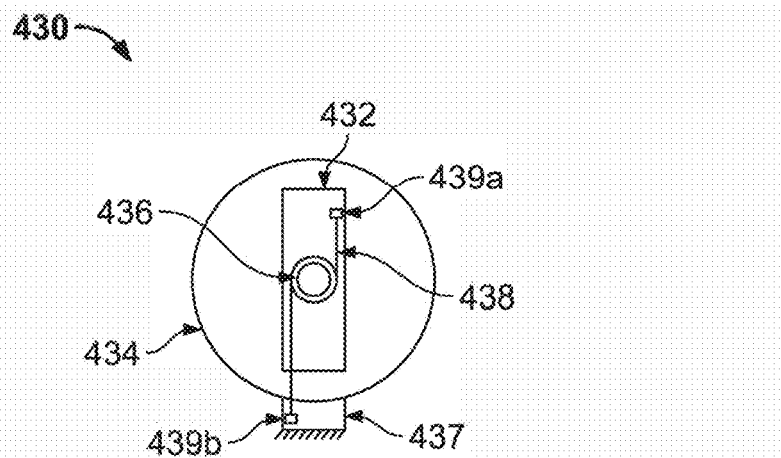

FIG. 27D illustrates a rotating actuator 430 having a rotating mass 432 coupled to rotary actuator 434 via shaft 436. The rotary actuator 434 is desirably coupled to a support 437, which, in turn, may connect to another object (not shown). In this alternative, a spring device such as a torsion spring 438 is attached between the rotating mass 432 and the rotary actuator 434. As shown, one end or tang 439a of the torsion spring 438 is attached to the rotating mass 432, and the other end or tang 439b is attached to the support 437 (or, alternatively, to the rotary actuator 434 itself). Torsion spring 438 may be employed because such spring devices permit a large degree of rotation of the rotating mass 432 relative to the rotary actuator 434 and the support 437.

Figure 27E:
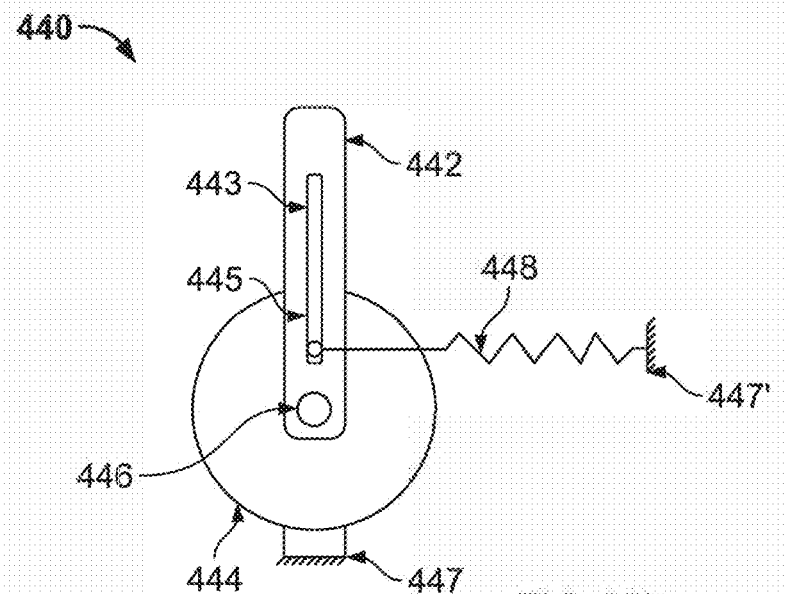
Figure 27F:
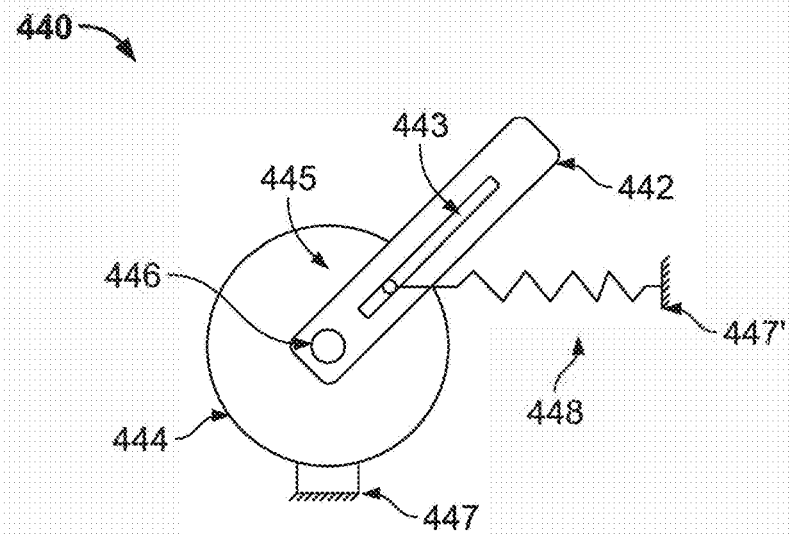

FIGS. 27E and 27F illustrate a further rotating actuator, namely rotating actuator 440. The rotating actuator 440 includes a rotating mass 442 having a slot 443 therein, a rotary actuator 444, and a shaft 446 coupling the rotating mass 442 to the rotary actuator 444. The rotary actuator 444 is desirably coupled to a support 447, which, in turn, may connect to another object (not shown). In this embodiment a pin 445 is held within the slot 443. A spring device 448 is coupled at one end or tang 449a to the pin 445. The spring device 448 is coupled at the other end or tang 449b to a support 447'. The support 447' is preferably different from the support 447, or, alternatively, is preferably a different section of the support 447 from where the rotary actuator is coupled.

FIG. 27E shows the spring device 448 in a "rest" position. FIG. 27F shows the spring device 448 in a "compressed" position. Here, by way of example only, the rotating mass 442 may be rotating in a clockwise direction. As the rotating mass 442 rotates, the pin 445 moves relative to the slot 443, but the spring device 448 remains in substantially the same orientation relative to the support 447'. In this fashion, the force applied onto the fixed 447' remains in relatively the same direction as the moving mass 442 rotates. It is possible to incorporate a gap between the slot 443 and the pin 445 that would allow for some rotation of the shaft 446 before the spring device 448 is extended or compressed from its rest position. The gap would create a non-linear force effect on the rotating mass 442, which could aid in increasing the magnitude of vibration. The gap would allow the shaft 446 to more quickly reach higher speeds and for the rotating actuator 440 to more quickly build up rotating inertia.

While several types of actuators have been described above that may be used with the present disclosure, other types of actuators may also be employed so long as they can be controlled as described herein. For instance, piezoelectric devices without separate or distinct "moving" and "stationary" masses may be employed either alone or in combination with other actuator types to impart vibratory forces in the manners described herein.

Figure 28:
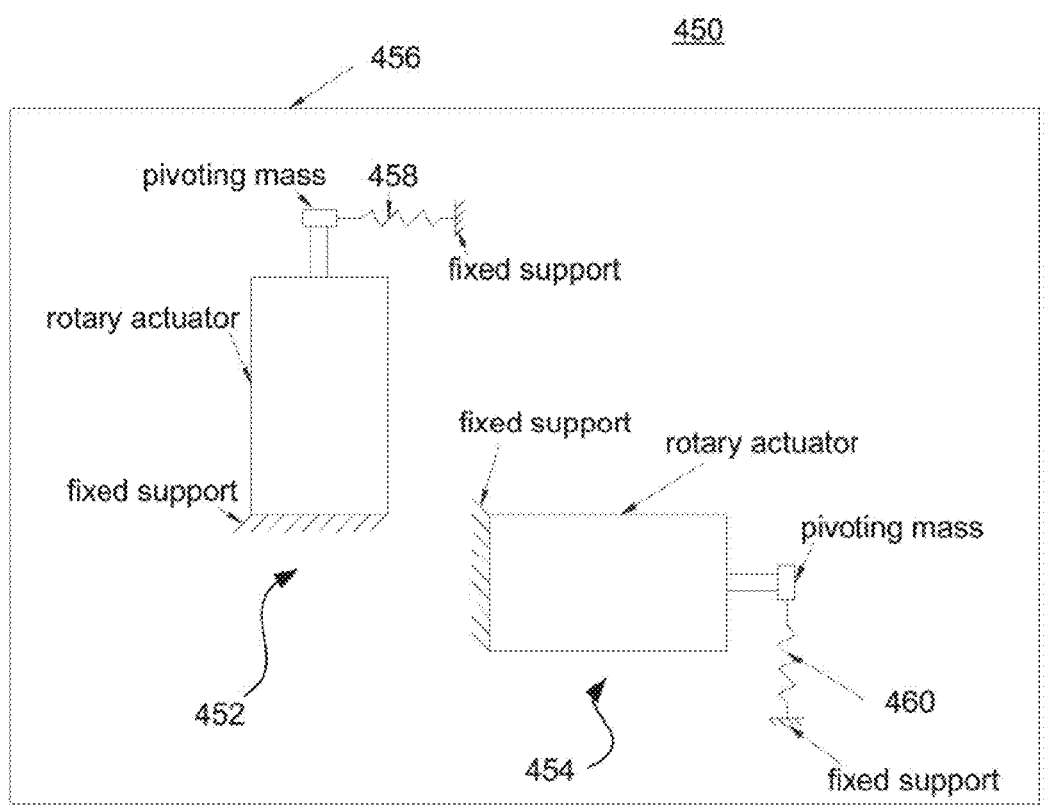
FIG. 28 illustrates a synchronized vibration system employing rotary actuators in accordance with aspects of the present disclosure.

FIG. 28 illustrates a synchronized vibration system 450, which may comprise two vibration devices 452 and 454, such as any of those of FIGS. 24A-C, 25A-C, 26 and/or 27A-F. Of course, more that two vibration devices may be provided. The vibration devices 452 and 454 are preferably mounted onto a base plate 456 in a generally orthogonal manner as shown, although orthogonality is not required. The vibration device 452 is preferably a horizontal vibrator that desirably has a spring device 458 which applies primarily horizontal forces onto the base plate 456. The vibration device 454 is preferably a vertical vibrator that desirably has a spring device 460 that applies primarily vertical forces onto the base plate 456. As long as the directions of the vibration forces of the different vibration devices are not aligned, it is possible to control the combined direction of vibration using the synchronized vibration methods as described herein as well as in the aforementioned "Vibration Device" patent application.

An alternative embodiment of the present disclosure includes two rotary vibration actuators whose planes of vibration are not the same; however, in this case the two planes are not orthogonal to each other. In this embodiment, the component of centrifugal force from one actuator that can be projected onto the plane of the other actuator can be used to achieve a component of synchronous vibration.

Figure 29A:
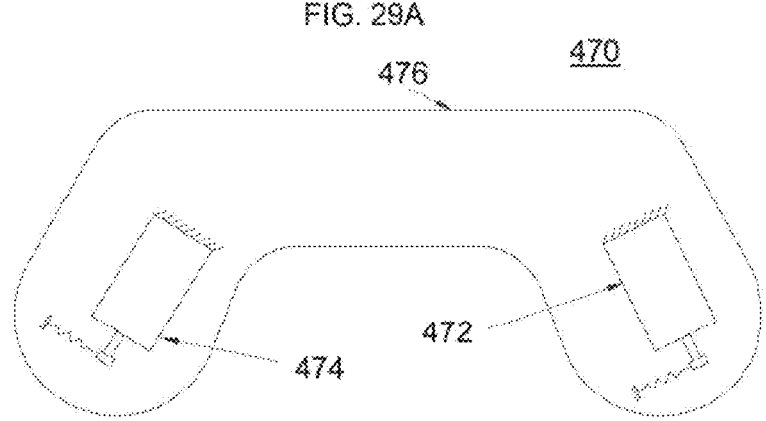
FIGS. 29A-B illustrate game controllers in accordance with aspects of the present disclosure.

In one example, two or more vibration devices may be mounted devices into a game controller, as shown in FIG. 29A. Here, a game controller 470 includes a pair of vibration devices 472 and 474 mounted in both the right and left handles, respectively, of housing 476. The directions of vibration of the vibration devices 472 and 474 are preferably not aligned, and thus it is possible to control the direction of vibration using the synchronized vibration approach discussed herein.

Figure 29B:
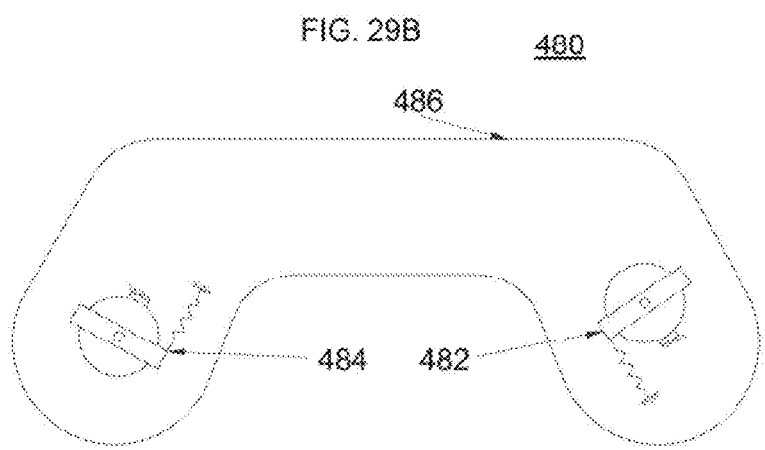

There are many orientations of both the rotary actuators and springs that can be used to achieve an embodiment where synchronized vibration is possible. For instance, the axis of rotation of both actuators can be aligned while the spring direction can vary, allowing an alternative configuration for synchronized vibration. FIG. 29B illustrates a game controller 480 having a pair of vibration devices 482 and 484 within a housing 486 where the axes of the rotating shafts in both rotary actuators are aligned, yet the spring forces are not aligned.

FIG. 30 illustrates yet another variation similar to the rotary and pivoting vibration devices. Here, a rocking actuator 490 preferably includes a rocking weight 492 rotatable about a shaft 494. Desirably, one end of the rocking weight 492 is operatively coupled via a first spring device 496a to a first support 498a. The same end of the rocking weight 492 is also desirably operatively coupled via a second spring device 496b to a second support 498b. The supports 498a and 498b may be a single support, separate supports that are physically connected, or physically disconnected supports. The rocking actuator 490 may be implemented in a device such as a game controller in any of the configuration described above.

A controller for synchronized vibration of a pair of rotary vibration actuators specifies the angular position of each rotating shaft, such that the angle where the centrifugal force vectors are aligned is the desired direction of force vibration and the angular position is incremented such that the rotational velocity matches the desired vibration frequency.

Figure 31:
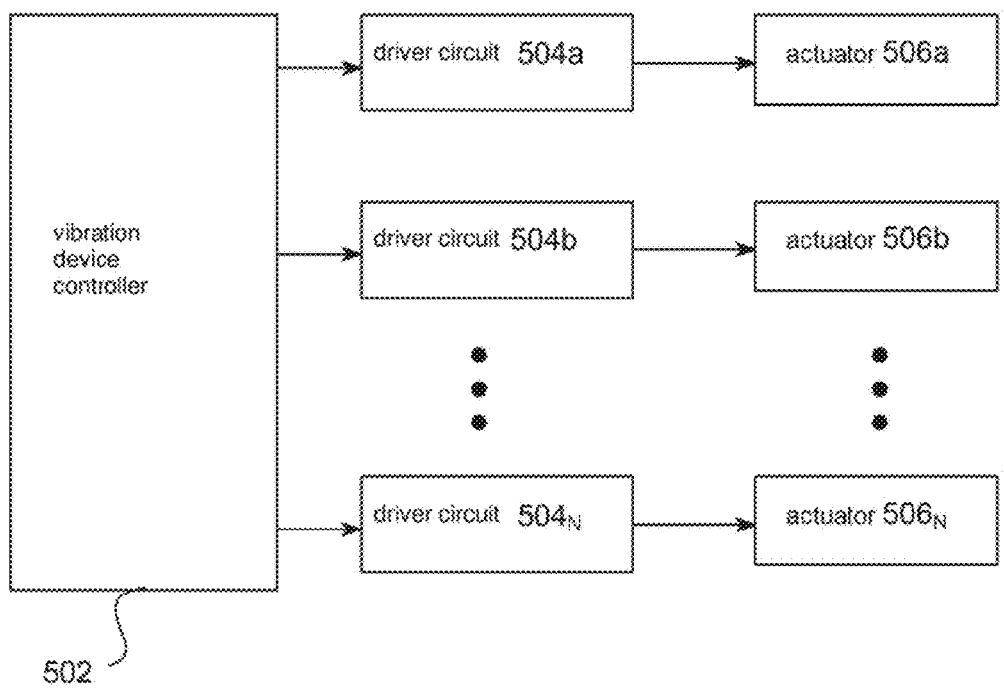
FIG. 31 illustrates a vibration system in accordance with aspects of the present disclosure.

A system 500 having a controller for one or more vibration devices that use linear motion vibration actuators is shown in FIG. 31. Vibration device controller 502 specifies the desired vibration effect and one or more driver circuit(s) 504a, 504b, . . . , 504N provide the necessary power to actuators 506a, 506b, . . . , 506N. While each actuator 506 is shown as being powered by a separate driver circuit 504, it is possible for multiple actuators 506 to be driven by one driver circuit 504.

The controller 502 may be, by way of example only, a microprocessor and the driver circuit(s) 504 may be, for instance, one or more electrical amplifiers. The controller 502 and drive circuit 504 may be integrated into a single microprocessor or single electrical circuit. The control method in this figure is for a configuration with N actuators, where N is an arbitrary number of actuators. Some of the figures showing various control methods in the instant application illustrate only two actuators. However, it should be understood that control methods according to the present disclosure can be extended to include an arbitrary number of actuators, as shown in FIG. 31.

Figure 32:
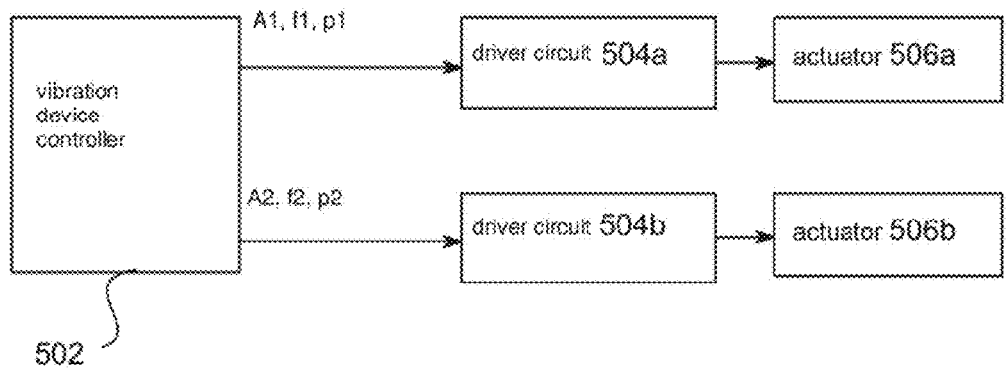
FIG. 32 illustrates control of a vibration system in accordance with aspects of the present disclosure.

FIG. 32 shows a control method for two actuators. Here the controller 502 specifies the desired vibration amplitude, A, frequency, f, and phase, p, for each actuator 506. The amplitude, frequency, and phase of actuator 506a ($A_1$, f1, p1) may differ from the amplitude, frequency, and phase of actuator 506b ($A_2$, f2, p2). The profile/waveform of the desired vibration force may be a sine wave, square wave, triangle wave, or other profile, such as is discussed above with regard to FIG. 1. The actual vibration profiles/waveforms of the actuators 506a,b may differ from the desired vibration profiles due the dynamics of the drive circuits 504a,b and actuators 506a,b.

Figure 33:
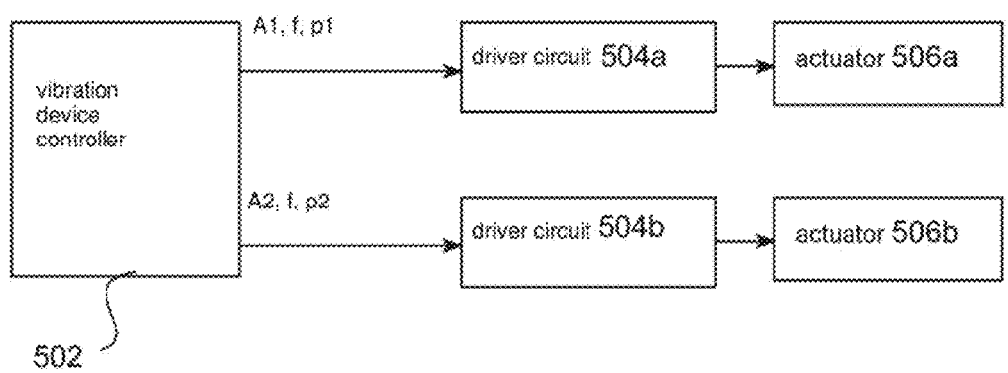
FIG. 33 illustrates control of a vibration system in accordance with aspects of the present disclosure.
Figure 34:
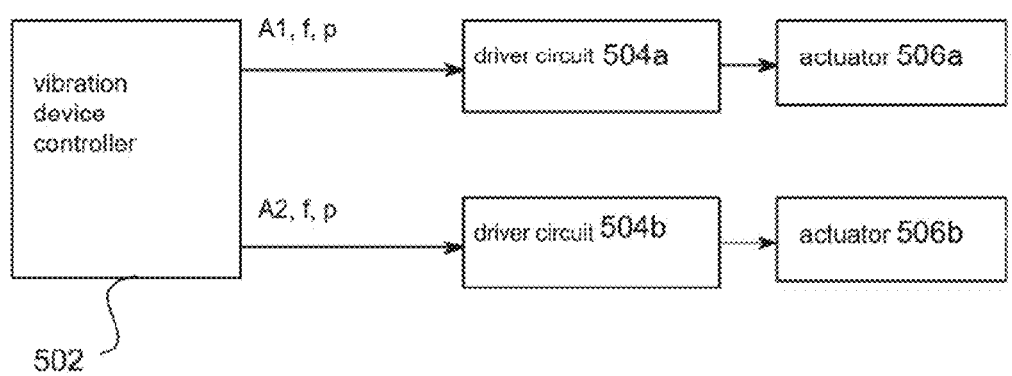
FIG. 34 illustrates control of a vibration system in accordance with aspects of the present disclosure.

FIG. 33 shows a control method where the frequency of vibration, f, is the same for both actuators 506a,b. FIG. 34 shows a control method where the frequency of vibration, f, and the phase of vibration, p, are the same for both actuators 506a,b. In this embodiment, the actuators 506a,b are desirably driven synchronously such that the peak amplitude of vibration will occur approximately at the same time for both actuators 506a,b. The amplitude of vibration may differ between the actuators 506a,b.

Figure 35:
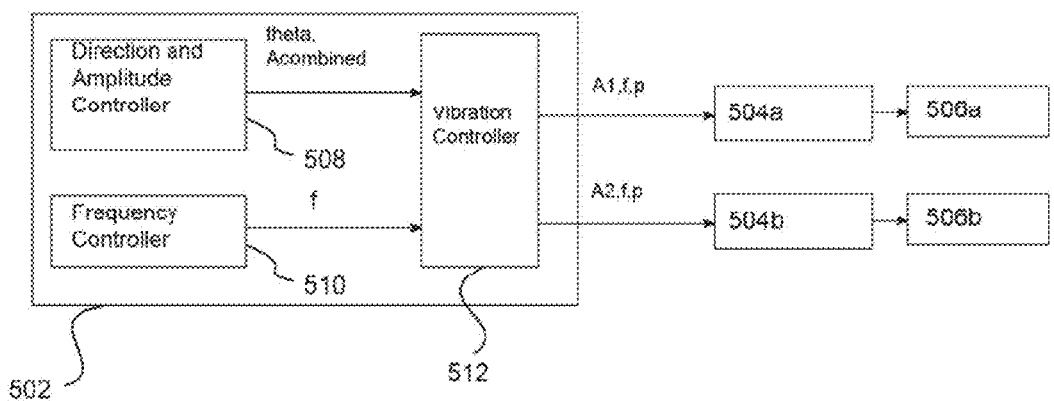
FIG. 35 illustrates a vibration system in accordance with aspects of the present disclosure.

FIG. 35 shows a control embodiment in accordance with the present disclosure where the vibration device controller 502 includes an internal direction and amplitude controller 508, an internal frequency controller 510, and an internal vibration controller 512. The direction and amplitude controller 508 desirably specifies the combined vibration amplitude, Acombined, and the direction of vibration theta. The frequency controller 510 desirably specifies the vibration frequency, f. The vibration controller 512 uses the inputs of theta, Acombined, and f to output vibration commands to the individual actuators 506a,b. The vibration controller 512 is operable to output various waveforms including sine waves, square waves, triangle waves, or other profiles as discussed herein.

The output from the vibration device controller 502 shown in FIG. 35 provides the magnitude of vibration as a function of time to each drive circuit 504a,b. In the case where the profile of vibration is a sine wave, the amplitude of vibration for each actuator as a function of time is given by the equation shown below:

$$\begin{bmatrix} A_1(t) \\ A_2(t) \end{bmatrix} = D^- Acombined \begin{bmatrix} \cos(theta) \\ \sin(theta) \end{bmatrix} \sin(\omega t + p) \quad (28)$$

Here, t is time and $\omega$ is the vibration frequency in radians per second. The parameter p is the phase of vibration and may be set to zero. The value of $\omega$ in terms of frequency f in vibrations per second is given by $\omega=2\pi f$.

When the vibration actuators have a linear relationship between the command magnitude and the magnitude of vibration, the output $A_1(t)$ and $A_2(t)$ from equation 28 can be applied directly to the vibration actuators to generate a combined vibration direction corresponding to the angle theta. However some vibration actuators may have a non-linear relationship between the command magnitude and the magnitude of vibration. For such nonlinear actuators it is possible to generate vibration in the direction theta by using a linearization function that adjusts the magnitude of $A_1$ and $A_2$ to compensate for the nonlinearity of the actuator, as shown in the following equation.

$$\begin{bmatrix} A_1(t) \\ A_2(t) \end{bmatrix} = \text{linearization\_function}\left\{ D^{-1} A\text{combined} \begin{bmatrix} \cos(theta) \\ \sin(theta) \end{bmatrix} \sin(\omega t + p) \right\} \quad (29)$$

The linearization equation described above can be a lookup table or a scaling algorithm or other type of function.

The ability to control the direction of vibration over time, such as though use of equations 28 and 29, is an important advantage of the present disclosure. The ability to control vibration direction can be used in vibratory feeders to direct parts in a desired direction. In addition, there are numerous advantages of using the disclosure for haptic devices as described herein.

Figure 36A:
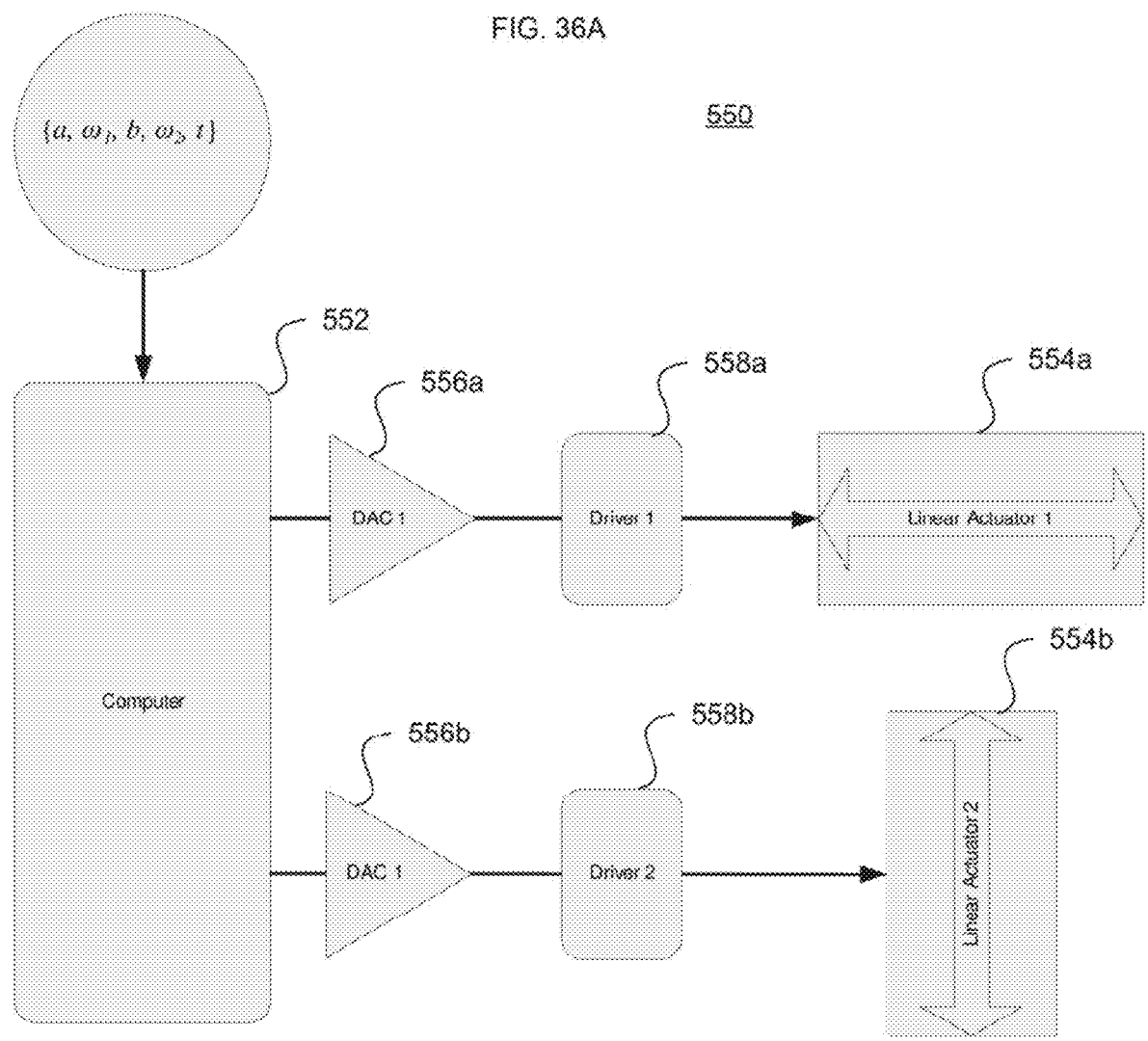
FIGS. 36A-B illustrate equation parameter and pattern selection processing in accordance with aspects of the present disclosure.

FIG. 36A illustrates a system 550 showing the input of various input parameters of amplitude, phase and position (or time) for a pair of linear actuators. A computer 552 receives input of the parameters, which are preferably entered using a computer keyboard (not shown); however, the parameters also could be input using a graphical user interface, analog potentiometers, or many other means generally known to those skilled in the art. The appropriate output waveforms for linear actuators 554a and 554b are then computed using the computer 552. Each waveform is preferably independent. While computation may be performed using an analog computer, a digital computer is preferred.

If a digital computer is used, the digital output for each actuator 554a,b is then preferably fed into respective digital-to-analog ("DAC") converters 556a and 556b, which convert the output to the appropriate analog waveform. The analog waveforms are then fed into the appropriate driver circuits 558a and 558b. Those skilled in the art could use other means to modulate the linear vibrations of each actuator 554a and 554b, for example via pulse width modulated ("PWM"). Varying the parameters produces an extremely broad range and rich set of haptic sensations for the end user.

In addition to creating varying force effects, one could control the direction of vibration—that is to say the direction of vibration could remain stationary. The resultant force effects can be of lower frequency than the frequency of vibration.

There are also useful applications for generating precise patterns of vibrations from simple parameters. Such patterns include circles, ellipses and straight lines. Furthermore, the amplitude and duration of the patterns may be precisely controlled over time. Moreover, a sequence of patterns may be generated as desired.

Figure 36B:
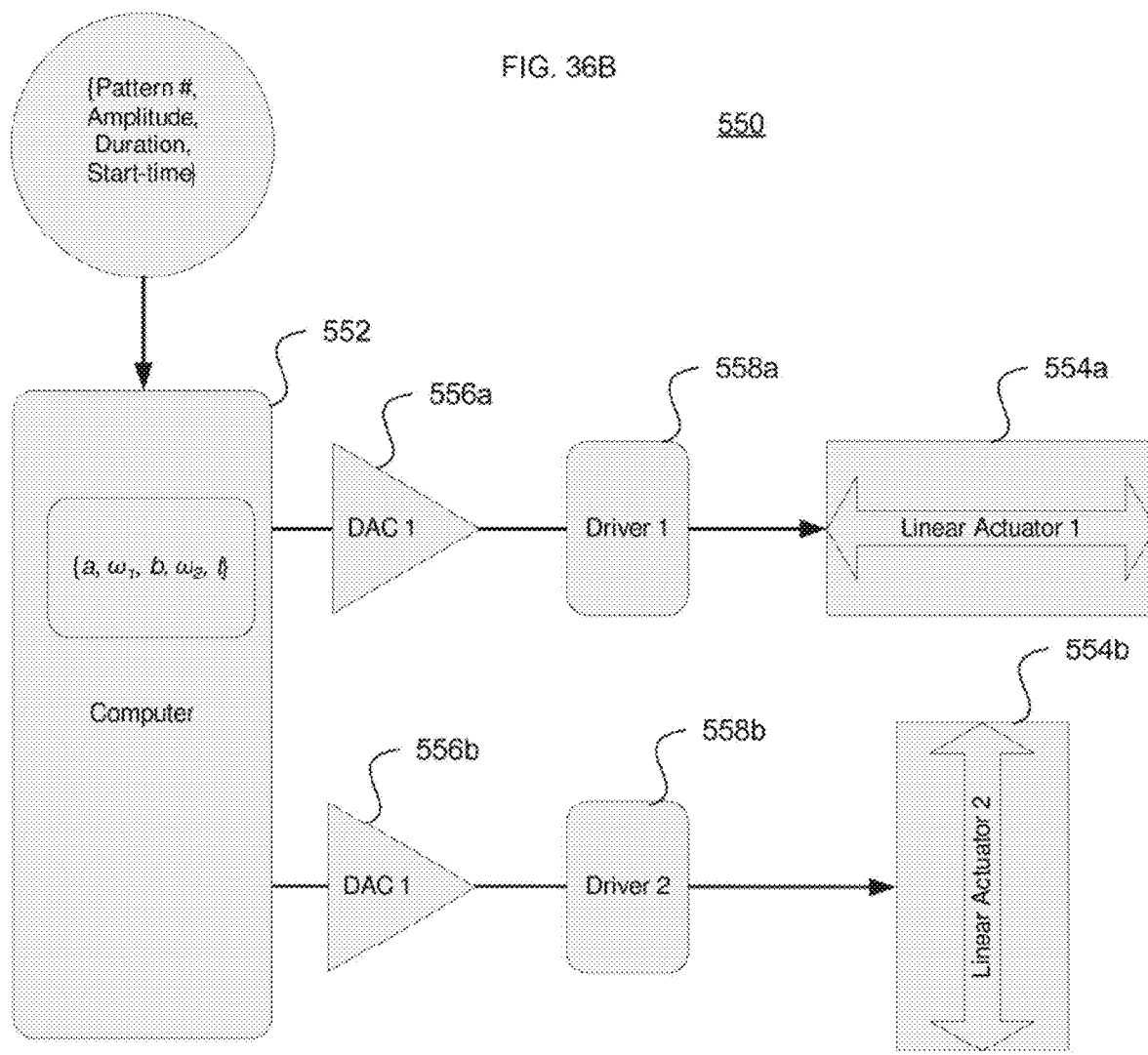

FIG. 36B illustrates the system 550 where the input of various input parameters includes input of pattern number, amplitude, duration and start-time for the vibration device using compound vibrations. The parameters are preferably entered using a computer keyboard. The appropriate output waveforms for each linear actuator are then computed at computer 552. As described above, the digital output for each actuator 554a and 554b is then fed into DACs 556a and 556b for conversion to the appropriate analog waveforms. The waveforms are then fed into the driver circuits 558a and 558b. Again, the various parameters produce an extremely broad and rich set of haptic sensations for the end user.

Each of the vibration devices described herein according to the present disclosure can be used as a haptic interface. Haptic interfaces provide force sensation to a user. Haptic interfaces include computer gaming controllers, robot controllers, surgical tool controllers, as well as other devices where a force sensation is provided to a user.

Figure 37:
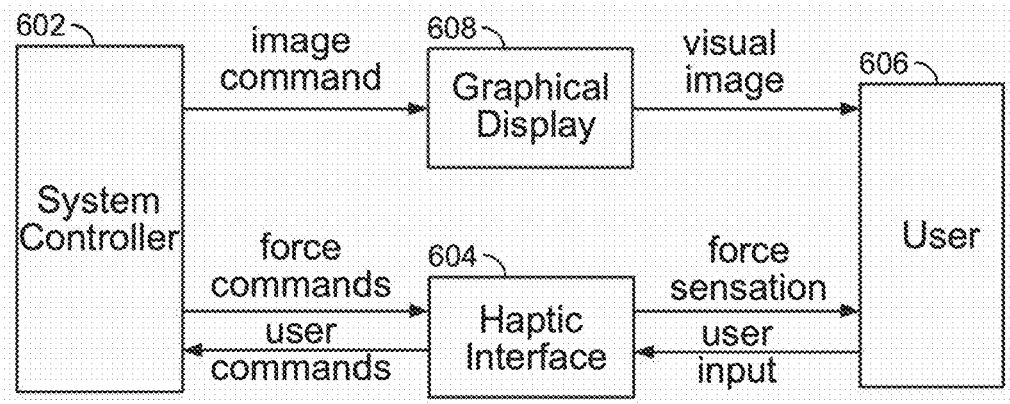
FIG. 37 illustrates a haptic interface system in accordance with aspects of the present disclosure.

An embodiment 600 of the present disclosure with a haptic interface application is shown in FIG. 37. In this embodiment a systems controller 602 provides force commands to a haptic interface 604 which generates forces which result in force sensations to user 606. The systems controller 602 may be microprocessor, a central processing unit, an ASIC, a DSP, a game controller, an analog controller, or other type of controller or any combination thereof. The user 606 can input commands to the haptic interface 604 that are transmitted as user commands back to the system controller 602. The user commands can be input through pressing buttons, moving joysticks, squeezing the haptic interface at various level forces, moving the haptic interface, applying force and torque onto the haptic interface and through other means.

In the embodiment shown in FIG. 37, there is preferably a graphical display 608 which receives an image command from the system controller 602 and displays a visual image to the user 606. The graphical display 608 may be, for instance, a computer monitor, a television monitor, an LCD display, a plasma display, a combination of light sources, or other type of means for generating a graphical image. A haptic interface application can also be implemented without a graphical display 608.

A haptic interface application can include a simulation of a virtual environment or representation of a real environment to the user 606. A systems controller method of control can be based upon this real or virtual environment. Typical simulated environments include games, driving and flight simulations, surgical simulations, and other types of simulations. Typical real world environments include control of robots and remote machines, long distance interactions, and other types of environments. It is often desirable that a haptic interface provide force sensations that correlate with the real or simulated environment in which the haptic interface is being used.

Figure 38:
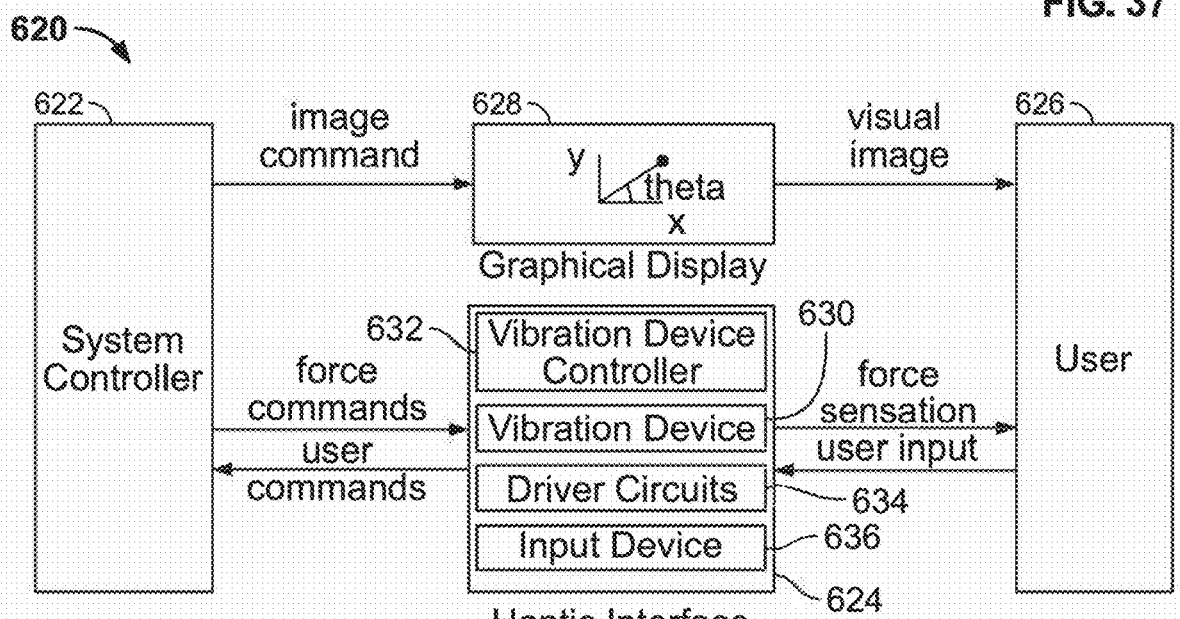
FIG. 38 illustrates another haptic interface system in accordance with aspects of the present disclosure.

Another embodiment 620 having a haptic interface application is shown in FIG. 38. This embodiment is similar to the one of FIG. 37, and includes a systems controller 622, which provides force commands to a haptic interface 624 that generates forces which result in force sensations being received by user 626. A graphical display 628 is also provided for receiving image commands from the system controller 622 and for displaying a visual image to the user 626.

In the embodiment of FIG. 38, the haptic interface 624 desirably includes a vibration device 630 having vibration actuators (not shown), a vibration controller 632, driver circuits 634 which drive the vibration device actuators, and an input device 636, which can detect user input and which can include buttons, joysticks, and pressure sensors. The components of the haptic interface 624 may be of any of the configurations described herein. In this embodiment the graphical display 628 preferably presents a two dimensional image. The graphical display 628 shows an object of interest at a direction specified by the angle theta. It is may be desirable that the force sensation felt by the user 626 correspond to the image on the graphical display in terms of direction, such as theta, and other attributes.

The embodiment shown in FIG. 38 can be utilized so that the force sensations felt by the user 626 are generated by the vibration device controller 632 specifically to correspond to the image on the graphical display 628. The vibration device controller 632 may specify one or more of the amplitude of vibration, $A_{combined}$, direction of force, theta, and frequency of vibration, f, as described above. The values of $A_{combined}$, theta, and/or f can be selected to correspond to the image on the graphical display 628 and the environment being used by the system controller 622. The complete force effect (including frequency, amplitude, combined direction of force and torque, and duration of force effect) generated by the vibration device may correlate events within a graphical computer simulation. Several examples of such operation follow.

A first example involves the simulation of a user firing a gun. In this simulation, the vibration device controller 632 could specify the angle theta to represent the direction of a gun firing, the amplitude of vibration, $A_{combined}$, to represent the amplitude of the gun recoil, and the frequency of vibration, f, to represent the frequency of bullets leaving the gun.

A second example involves an impact between objects. In this simulation the vibration device controller 632 may specify the angle theta to represent the direction of impact, and the amplitude of vibration, $A_{combined}$, to represent the amplitude of impact.

A third example involves driving a vehicle. In this simulation the vibration device controller 632 could specify the angle theta to represent the direction of vehicle motion, the frequency of vibration, f, to represent the frequency of vehicle vibration as it drives over bumps in the road or the speed of the vehicle, and the amplitude of vibration, Acombined, to represent the amplitude of bumps in the road.

A fourth example involves a car or spacecraft spinning out of control. In this simulation the vibration device controller 632 could specify an angle theta that represents the vehicle's orientation. To represent the vehicle spinning, the angle theta can vary over time. The rate at which the angle theta can be different than the vibration frequency. Typically the frequency at which a vehicle spins would be significantly lower than typical vibration frequencies.

An algorithm that can be used to create the vehicle spinning described above varies the direction of vibration continually. The direction of vibration may be rotated at a rate of β radians per second, using the equation below:

$$\begin{bmatrix} A_1(t) \\ A_2(t) \end{bmatrix} = D^- A_{combined} \begin{bmatrix} \cos(\beta t) \\ \sin(\beta t) \end{bmatrix} \sin(\omega t + p) \quad (30)$$

Equation 30 illustrates that the frequency of direction change, β, can be modified independently from the frequency of vibration ω. A user such as user 606 or 626 can sense both the frequency of vibration and the direction of vibration. In this fashion, sensations at both the β and ω frequencies can felt by the user. It is possible to set the frequency β much lower than the frequency ω, thereby overcoming a limitation of known devices. By way of example only, ω may vary between 10 Hz and 100 Hz while β may be on the order of 1 Hz. In another instance, β may vary from between about 5% to 20% of ω. Of course, in other instances ω and β may be similar or the same, or, alternatively, β may be larger than ω. All of these examples will depend on the specific effect that is desired.

Low frequency operation is desirable in some situations, for instance in games that have low frequency effects. For instance, games may generate actions or events in the sub-200 Hertz range, such as between 1 and 150 Hertz. In certain cases the actions or events may be as low as 2 Hertz or lower, such as about 0.5-1 Hertz. Examples of such actions/events include gunshots, automobile related sounds such as corresponding to a car spinning out of control, and helicopter related sounds such as the whirring of the rotor blades. A traditional eccentric mass actuator may not be suitable to generate a haptic sensation in this frequency range; however, two or more vibration actuators operated in synchronized vibration may generate such frequencies.

β is not limited to any particular rate or range of rates. For instance, β may be a relatively low rate to represent a slow spinning action, e.g., of a car spin out at less than 10 miles per hour, or β may be a relatively high rate to represent a fast spinning action, e.g., of a car spin out at a speed in excess of 40 miles per hour. Similarly, ω is not limited to any particular frequency of vibration. Preferably, ω is set within a range of frequencies that can be felt or otherwise detected by a user.

Equation 30 may be modified by changing the vibration profile from a sine wave to a square wave, triangle wave, or other profile. In addition, the amplitude of vibration, Acombined, can be varied over time. The frequencies β and ω can also be varied over time. In this fashion a wide range of force effects can be created.

Vibration actuators can be used to provide haptic sensations either through synchronized vibration or otherwise. Actuators can be vibrated without synchronization when there is no need to convey directional information, and then the actuators can be switched to synchronous vibration when there is a need to convey directional information though the haptic interface.

Many linear motion vibration actuators take advantage of resonance to achieve relatively high level of forces with low power requirements. However, to achieve these high levels of forces a number of vibration cycles have to occur before the peak magnitude of vibration occurs. In addition when the actuator is shut off, the moving mass in the actuator may continue to oscillate for a number of cycles. Thus the dynamics of the actuator prevents instantaneous response of the actuator to increase or decrease the magnitude of vibration.

When synchronous vibration is used to control the direction of combined force, the actuator dynamics may limit the speed at which the direction of combined force can be changed. One of the examples presented above describes implementation of a haptic force sensation that corresponds to the spinning of a car. However, the actuator dynamics may limit the rate at which such spinning effect can be generated. As will be described in detail below, it is possible to provide a method that can increase the rate at which the direction of force can be changed for a system of vibration actuators that are synchronously vibrated.

Equation 25 above defines the required amplitude of vibration of actuators to achieve a combined force direction corresponding to an angle theta. For a given actuator in a vibration device, the required amplitude of vibration is defined as $A_{des}$, which indicates the desired amplitude of vibration of that actuator. If the actuator is at rest or at a lower level of vibration than $A_{des}$, then it may be desirable to initially drive the actuator at a higher level of vibration to more quickly raise the amplitude of vibration to $A_{des}$. Conversely if the actuator is already vibrating at an amplitude higher than Ades it may be desirable to initially drive the actuator at a lower level or even brake the actuator to more quickly lower the amplitude of vibration to Ades. These variations in the amplitude at which the actuator is driven are defined as corrections to the commanded vibration magnitude.

One method of determining the proper corrections to the vibration magnitude is to model the dynamics of the actuator. This approach allows one to predict the dynamic states of the actuator and optimal commands to most quickly generate the desired amplitude of vibration.

An alternate method of determining the corrections to the vibration magnitude does not require a dynamic model of the actuator or explicitly predicting the dynamic states of the actuator. In this method a counter is maintained to track the recent number of vibrations of the actuator and the corresponding commands sent to the actuator during these recent vibrations. The command to the actuator at the $k^{th}$ vibration is given by the following equation:

$$A_{com\_k} = A_{des\_k} + A_{cor\_k}$$

$A_{des\_k}$ represents the desired actuator amplitude for the $k^{th}$ vibration of the actuator. $A_{cor}$_k represents the correction to the command for the $k^{th}$ vibration. And $A_{com\_k}$ represents the actual amplitude of the command sent to the actuator for the $k^{th}$ vibration.

If the desired amplitude at the $k^{th}$ vibration is greater than the amplitude during the previous vibration, then most likely the vibration level needs to be increased. Accordingly, the correction to the command at vibration k, $A_{cor\_k}$, can be chosen to be proportional to the difference between the current desired amplitude, $A_{des\_k}$, and the previous commanded amplitude $A_{com\_k-1}$. An equation which described this approach for calculation $A_{cor\_k}$ is:

$$A_{cor\_k} = K * (A_{des\_k} - A_{com\_k-1}) \quad (31)$$

Here, K is a gain chosen based upon actuator performance. This same equation works for reducing the magnitude of vibration quickly. When $A_{des\_k}$ is less than the value of $A_{com\_k-1}$, it indicates that most likely the level of vibration needs to be reduced and the correction $A_{cor\_k}$ is negative. If the large reduction in vibration amplitude is commanded, then the negative magnitude of $A_{cor\_k}$ may be greater than $A_{des\_k}$ and the actual command sent to the actuator, $A_{com\_k}$, will be negative resulting in braking of the moving mass in the actuator.

Another approach to correcting the magnitude of vibration takes into consideration the two previous commanded amplitudes, and is given by the following equation:

$$A_{cor\_k} = K_1 * (A_{des\_k} - A_{com\_k-1}) + K_2 * (A_{des\_k} - A_{com\_k-2}) \quad (32)$$

Here $K_1$ is a gain that corresponds to the k-1 vibration command, and $K_2$ is a gain that corresponds to the k-2 vibration command. In a similar fashion even more prior commands can be incorporated into the correction algorithm. The following equation shows how "m" prior commands can be incorporated into an actuator command.

$$A_{cor\_k} = K_1 * (A_{des\_k} - A_{com\_k-1}) + \\ K_2 * (A_{des\_k} - A_{com\_k-2}) + \ldots + K_m(A_{des\_k} - A_{com\_k-m}) \quad (33)$$

Figure 39:
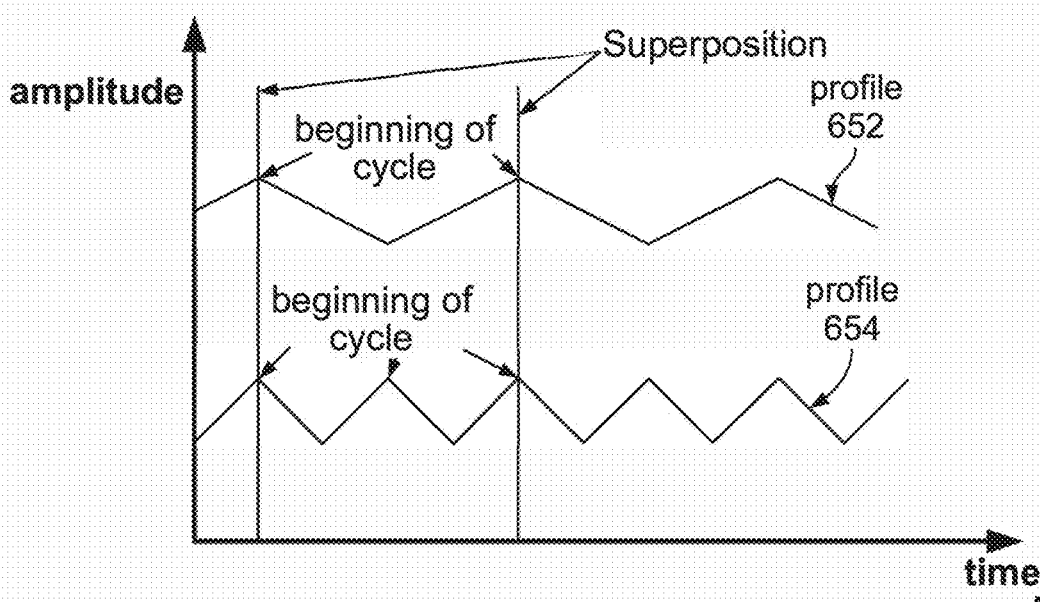
FIG. 39 illustrates control of vibration profiles in accordance with aspects of the present disclosure.

Alternative methods of control for multiple vibrating actuators may include modified synchronization. One method of modified synchronization is for one actuator to vibrate at a frequency that is an integer multiple of the vibration frequency of another actuator. FIG. 39 is a plot 650 presenting two vibration profiles, 652 and 654, showing such a control method. The vibration frequency of profile 654 is twice the vibration frequency of profile 652. The beginning of cycles of vibration can be controlled to occur at the same time only ever other cycle for profile 2. Thus the superposition of peak amplitudes only occurs every other cycle for profile 654. This modified synchronization method can be applied for arbitrary integer multiples of vibration frequency, arbitrary vibration profiles, and an arbitrary number of actuators.

One advantage of such a modified synchronization method is that multiple vibration frequencies can occur at the same time while still providing for some superposition or peak amplitudes. The superposition of peak amplitudes allows for control of direction of vibration, in a similar fashion to how the direction for vibration is controlled for synchronized vibration. With this modified method of synchronized vibration, it is possible to specify the direction of combined force only during a portion of the vibration cycle. Nevertheless, a direction component to the vibration can be controlled in the duration close to the time where the superposition of peaks occurs. Close to the time at which there is superposition of peaks in the vibrations, the combined force vector, $F_{combined}$, can be approximated by:

$$F_{combined} = a_1 A_1 + a_2 A_2 \quad (34)$$

Here, $a_1$ and $a_2$ are the unit vectors aligned with the directions of actuator 1 and actuator 2, respectively. $A_1$ and $A_2$ are the amplitudes of force of actuator 1 and actuator 2, respectively, near the duration of the superposition of peaks. By modifying the amplitudes $A_1$ and $A_2$ it is possible to modify the amplitude and direction of the combined force vector, $F_{combined}$. A similar approach can be used when there are more than two vibration actuators.

If there are two or more vibrating actuators where repeatedly the peak amplitude of force of these vibrating actuators occurs at approximately the same time, then the combined direction of force of these actuators can be controlled near the time when these repeated peak amplitudes occur. In this case, the combined direction of force can be controlled by modifying the amplitude of vibration of the actuators.

An alternative modified synchronization is to drive two vibration actuators at the same frequency but one vibration actuator at a phase where its peak magnitude of force occurs when a second vibration actuator is at zero force, which is at 90 degrees out of phase for a sinusoidal vibration. In such a modified synchronization the combined force direction rotates in a circle or ellipsoid during each vibration period.

Additional methods for modified synchronization of vibration may include the superposition of profiles as described in the "Jules Lissajous and His Figures" ("Lissajous"), appearing in chapter 12 of "Trigonometric Delights" by Eli Maor, published in 1998 by Princeton University Press. The entire disclosure of Lissajous is hereby incorporated by reference. Lissajous describes how profiles can be combined through various combinations of frequencies, phases, amplitudes, and profiles to generate a wide range of output figures. These are also known as Bowditch curves. Lissajous also describes how geometric shapes can be created from multiple vibration sources. These combinations of vibrations can be applied to haptic devices and vibration devices in accordance with aspects of the present disclosure. Thus, the concepts of superposition described in Lissajous can be applied by vibration actuators to yield a wide range of force sensations.

Electric actuators often require a driver circuit separate from a controller. The driver circuit provides sufficient current and voltage to drive the Actuators with the necessary electrical power. A wide range of driver circuits have been developed for electrical actuators and specifically for vibration actuators, and are known to those skilled in the field. Such driver circuits include linear drivers, PWM drivers, unipolar drivers, and bipolar drivers. A circuit block diagram for a vibration actuator 700 according to the present disclosure includes a vibration controller 702, a driver circuit 704, and an actuator 706, as shown in FIG. 40.

Figure 40:
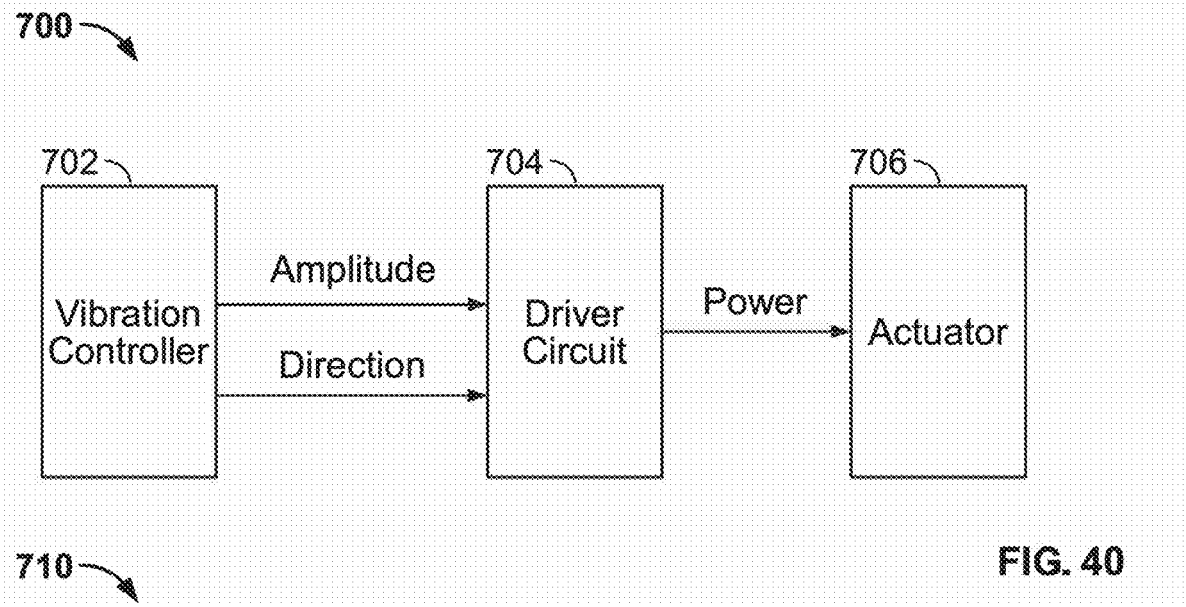
FIG. 40 illustrates a vibration actuator in accordance with aspects of the present disclosure.

The vibration controller 702 shown in FIG. 40 can be located on the vibration device itself or could be located remotely, where the vibration signals are transmitted to the driver circuit 704 through wired or wireless communication.

It is often desirable to control a vibration device or actuators from a digital controller such as a microprocessor or other digital circuit. Digital control circuits often have low level power output, and therefore require a higher power driver circuit to drive an actuator. In addition, low cost digital controllers often have digital outputs, but do not have analog outputs. To simplify the vibration controller circuitry and lower cost, the vibration signal can be a binary logic directional signal which signals the moving mass to move either forward or backwards. In this configuration, the vibration signal can be in the form of a square wave to generate the desired vibration effect. Even with such a square wave control signal, the actual motion and vibration force of the vibration actuator will most likely not follow a square wave exactly due to the dynamics of the actuator.

Figure 41:
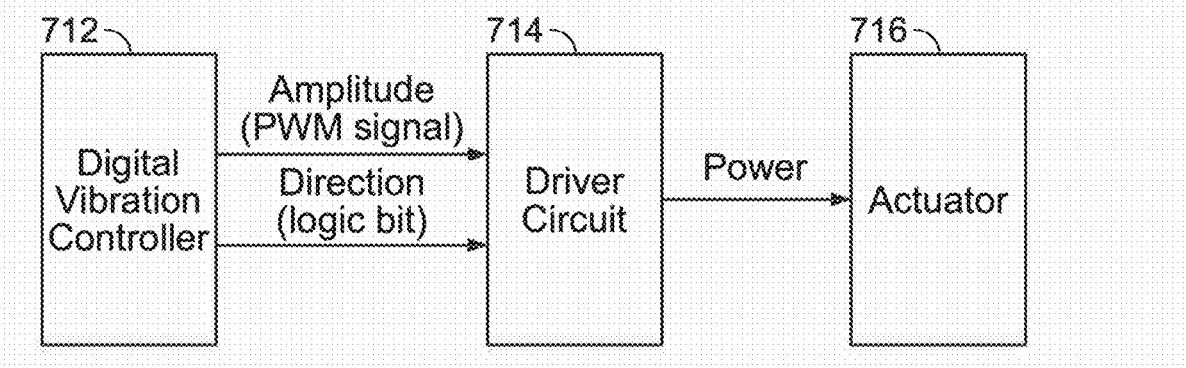
FIG. 41 illustrates another vibration actuator in accordance with aspects of the present disclosure.

To further simplify the vibration controller circuitry and lower cost, the amplitude of the vibration signal can be modulated with a PWM signal, where the duty cycle of the signal is proportional to the amplitude of vibration. An embodiment 710 with such a digital vibration controller 712 for one actuator 716 is shown in FIG. 41. In this embodiment, the output of the digital vibration controller 712 includes an amplitude signal in PWM form and a direction signal, for instance in the form of a logic bit, both of which preferably are sent to a driver circuit 714. The driver circuit 714, in turn, sends electrical power to the actuator 716.

Digital control circuitry can be used to control a complete vibration device in synchronized vibration. In synchronized vibration the frequency and phase of two or more actuators are the same. Accordingly, a single square wave can be used to control the direction of the vibration actuators that are in synchronized vibration. The amplitude of vibration can be controlled independently for each actuator, with separate PWM signals.

Figure 42:
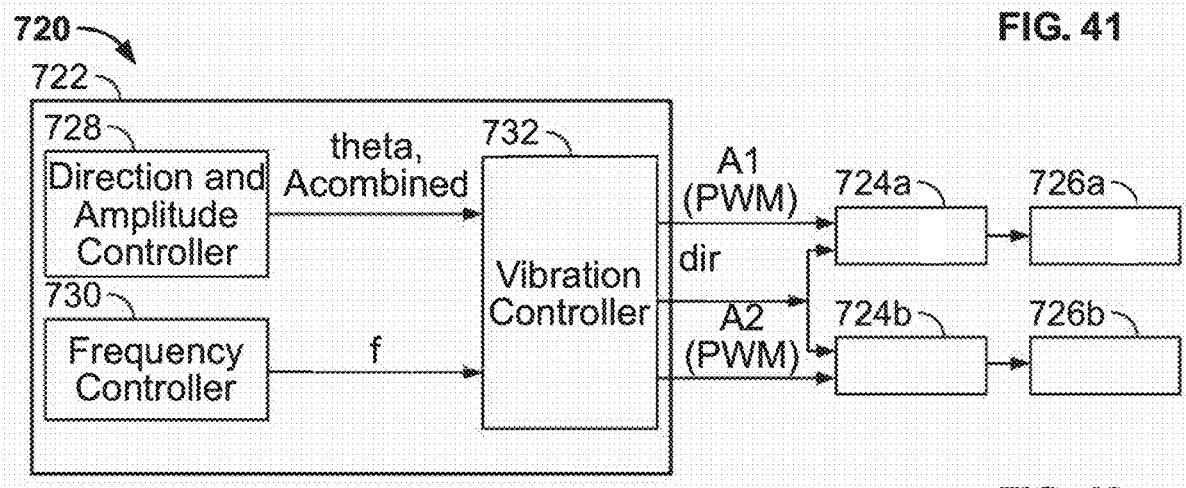
FIG. 42 illustrates a vibration device controller in accordance with aspects of the present disclosure.

FIG. 42 shows an embodiment 720 where a vibration device controller 722 generates one directional signal ("dir"), which may be in the form of a square wave. The dir signal is preferably provided to a pair of drive circuits 724a and 724b. The vibration device controller 722 desirably generates separate amplitude signals, A1 and A2, in PWM form to the drive circuits 724a,b for a pair of actuators 726a and 726b. The vibration device controller 722 preferably includes a direction and amplitude controller 728, a frequency controller 730 and a vibration controller 732 as in the embodiment described above with regard to FIG. 35. The direction and amplitude controller 728, the frequency controller 730 and the vibration controller 732 may be configured in hardware, software, firmware or a combination thereof, and may be implemented either as separate components or processes, or may be implemented as a single component or process.

The embodiment 720 of FIG. 42 may be used to control in synchronous vibration the vibration devices with two actuators, for instance as described above with regard to FIGS. 10-20. Embodiment 720 can also be used to vibrate two or more actuators completely out of phase, which occurs during synchronized vibration when equation 25 provides results with the sign of $A_1$ being different than the sign of $A_2$. To vibrate two actuators completely out of phase, the binary direction signal dir can be inverted for one of the actuators. The inversion of the directional signal dir can occur at a driver circuit 724a or 724b, or the vibration controller 732 can output two directional signals, with one being the inverse of the other. The case where two actuators are being driven completely out of phase is shown in FIG. 13.

Electric actuators in accordance with the present disclosure can be driven with unipolar or bipolar drivers. A unipolar driver will generate current in an actuator in a single direction. A unipolar driver is well suited for actuators where the moving mass is ferromagnetic and an electromagnetic coil only generates attractive magnetic forces, such as the actuator 150 shown in FIG. 9. One example of a unipolar driver circuit is a Darlington array, such as the ULN2803A DARLINGTON TRANSISTOR ARRAY manufactured by Texas Instruments.

A bipolar driver can generate current in two directions. Bipolar drivers are well suited for actuators where the moving mass is magnetic and where reversing the direction of current in an electromagnetic coil can reverse the direction of force on the moving mass. Examples of such actuators are presented in FIGS. 5A-B through 8A-B. One example for a bipolar driver circuit is an H bridge, such as the L298 manufactured by ST Microelectronics. Alternative H bridges are the 3958 and 3959 drivers manufactured by Allegro Microsystems.

In vibrating circuits it can be advantageous to increase power output of the driver circuits through use of a charge pump capacitor as used in 3958 and 3959 drivers manufactured by Allegro Microsystems. It can also be advantageous to incorporate a capacitor in series with a linear motion vibrating actuator to benefit from a resonance effect and temporary storage of energy in the capacitor, as described in the aforementioned U.S. Patent Application entitled "Vibration Device."

As detailed herein, vibration actuators can be used in a variety of methods to create haptic effects. Vibration actuators can be operated continuously throughout the duration of a specified haptic effect, or can be pulsed on and off during the haptic effect. By pulsing vibration actuators on and off the user feels only a small number of vibrations, then feels a pause, and then the vibration resumes. In this fashion it is possible to generate secondary sensations associated with the frequency of pulsing the actuators on and off. Examples of how such pulse effects can be used are described in U.S. Pat. Nos. 6,275,213 and 6,424,333.

Any of the actuators described herein may be used in accordance with the present disclosure to produce a wide variety of haptic effects. While some actuators such as linear actuators and rocking mass actuators may be particularly suited for low frequency operation, all actuators herein may provide synchronized feedback. Such feedback may be employed in games, virtual reality equipment, real-world equipment such as surgical tools and construction equipment, as well as portable electronic devices such as cellular phones and pagers. By way of example only, cellular phones and pagers may implement different vibration effects to identify different callers or different actions. Synchronized vibration may provide directional feedback, for instance, with the impact or recoil of a gun in a game, or to distinguish between frontal and side impacts in driving games. Synchronized vibration may also provide a continual rotation of a vibration force vector in a game to simulate a car spinning out of control. Synchronized vibration may also be used in endless other applications and situations to provide a rich haptic experience to a user.

As mentioned above, other aspects of the disclosure include General Synchronized Vibration. General Synchronized Vibration differs from non-synchronized vibration in that the frequency and phase of multiple vibration forces are controlled. Embodiments with multiple Vibration Actuators that are not controlled with the General Synchronized Vibration approach will often have inconsistent frequency, amplitude, or relative phase between the actuators. With General Synchronized Vibration the frequency and phase of the Vibration Actuators may vary during the start-up and transitions between various waveforms. However, once the actuators are synchronized, each actuator is controlled to a specific frequency and phase.

Often each actuator is controlled to a fixed frequency and phase for a given duration of time. This duration of time depends on the application, but is typically longer than the period of the highest frequency vibration force that is being synchronized. In haptic applications this duration of time is typically along enough for a person to sense the effect. However, there are some implementations of General Synchronized Vibration where the desired waveform of vibration varies quickly, such as a quickly changing direction used to provide a sensation of spinning. In such quickly varying waveforms, the desired frequency and phase of a vibration actuator may be changing in a duration that is shorter than the period of the vibration of that actuator. A common characteristic of General Synchronized Vibration is that the frequency and relative phase of multiple vibration actuators are explicitly controlled to desired values rather than randomly selected values.

In General Synchronized Vibration there is typically a consistent correlation between frequency and phase of the actuators and desired vibration effects. For example, a haptics effect library for software developers may have a routine labeled "spin," which generates a sequence of desired frequency and phase for a plurality of Vibration Actuators. Each time the spin effect is executed, a similar sequence of frequency and phase and generated by the plurality of Vibration Actuators.

Embodiments of this disclosure include a Vibration Device comprised of multiple Vibration Actuators mounted onto a mounting platform such as a base plate, sub-frame, housing, or enclosure. For example the mounting platform could be the housing of a game controller, or the housing of a Vibration Actuator. The mounting platform transfers force and torque between the Vibration Actuators and thereby allows the vibration forces and torques to be superimposed upon each other. The mounting platform is preferably rigid, but can also be relatively rigid component, or a semi-rigid component. The mounting platform could be made of separate pieces. The mounting platform could include components of an object upon which vibration forces are being applied. For example if multiple Vibration Actuators are mounted onto a person's arm or other body parts and forces are transmitted from these actuators through the arm or body parts, then the arm or body parts can serve as the mounting platform. This disclosure pertains to any configuration where the forces and torques from multiple Vibration Actuators can be vectorially combined to generate a net vibration force, vibration torque, or vibration force and torque.

The mounting platform is typically attached to a number of items such as battery, control circuit board, and the stationary parts of the Vibration Actuators including housing and stator. The combined mass of the mounting platform and items that are attached to it is defined as a "Reference Mass". The vibration force and torques are transferred from Vibration Actuators to the Reference Mass. If the mounting platform is able to move, the vibration forces may shake the Reference Mass. Typically the Reference Mass is in contact with an "External Object", and forces and torques are transmitted between the Reference Mass and the External Object. For example, a game controller held in a user's hand would transfer forces and torques from the game controller's Reference Mass onto a user's hands, which in this case is an External Object. The mounting platform may be attached to the Earth, which would also be an External Object. A Vibration Device attached to the Earth is sometimes termed a "Shaker" or a "Shaker Device".

Figure 43:
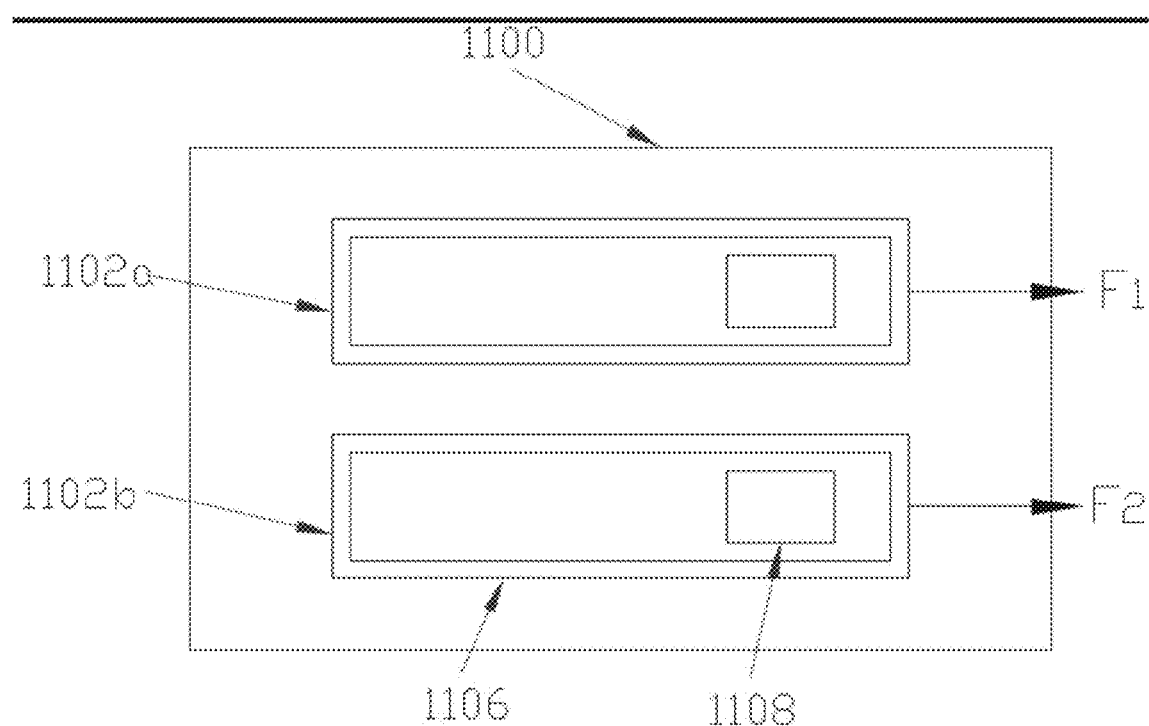
FIG. 43 illustrates a vibration device with two linear resonant actuators for use with aspects of the disclosure.

A preferred embodiment uses two aligned LRAs, as shown in FIG. 43. LRA 1102a and LRA 1102b are attached to mounting platform 1100 and are aligned in the axis of vibration that they generate. Each LRA has a moving mass, 1108, and a housing 1106 which is attached to the Mounting platform 1100. This configuration of vibration actuators is referred to as an LRA Pair. The vibration forces from each LRA are combined together through the mounting platform 1100. The vibration force generated by LRA 102a is designated as F1 and the vibration force generated by LRA 1102b is designated by F2.

For the embodiment shown in FIG. 43, one method of generating an asymmetric vibration force is to operate LRA 1102b at twice the frequency of LRA 1102a, with a specified phase difference of either 90 or −90 degrees. The vibration forces in such an embodiment with sinusoidal vibrations can be given by:

$$F_1 = B_1 \sin(\omega_1 t + \phi_1)$$
$$F_2 = B_2 \sin(\omega_2 t + \phi_2)$$
Where $\omega_2 = 2\omega_1$
$\phi_1 = 0$, and $\phi_2 = -90$ The combined force for the LRA Pair is given by:

$$F_{LRA\_Pair} = B_1 \sin(\omega_1 t + \phi_1) + B_2 \sin(\omega_2 t + \phi_2) \qquad (35)$$

Typically it is not critical to control vibration effects relative to absolute time. Accordingly, when implementing the vibration effect described in Eq. 35 above, it is not critical to control both the phase $\phi_1$ and $\phi_2$, but rather the relative phase between the two actuators. Therefore in some implementations one could set phase $\phi_1$ to zero and control only $\phi_2$. Alternatively one could directly control the phase difference between the actuators. In this application typically the phases of all the actuators are shown in the equations. However, without loss of utility only the relative phase of the actuators can be controlled. Thus the phase of Vibration Actuators 2, 3, 4, etc. would be controlled relative to the phase of actuator 1; thereby eliminating the need to control the phase of actuator 1 relative to absolute time.

Figure 44:
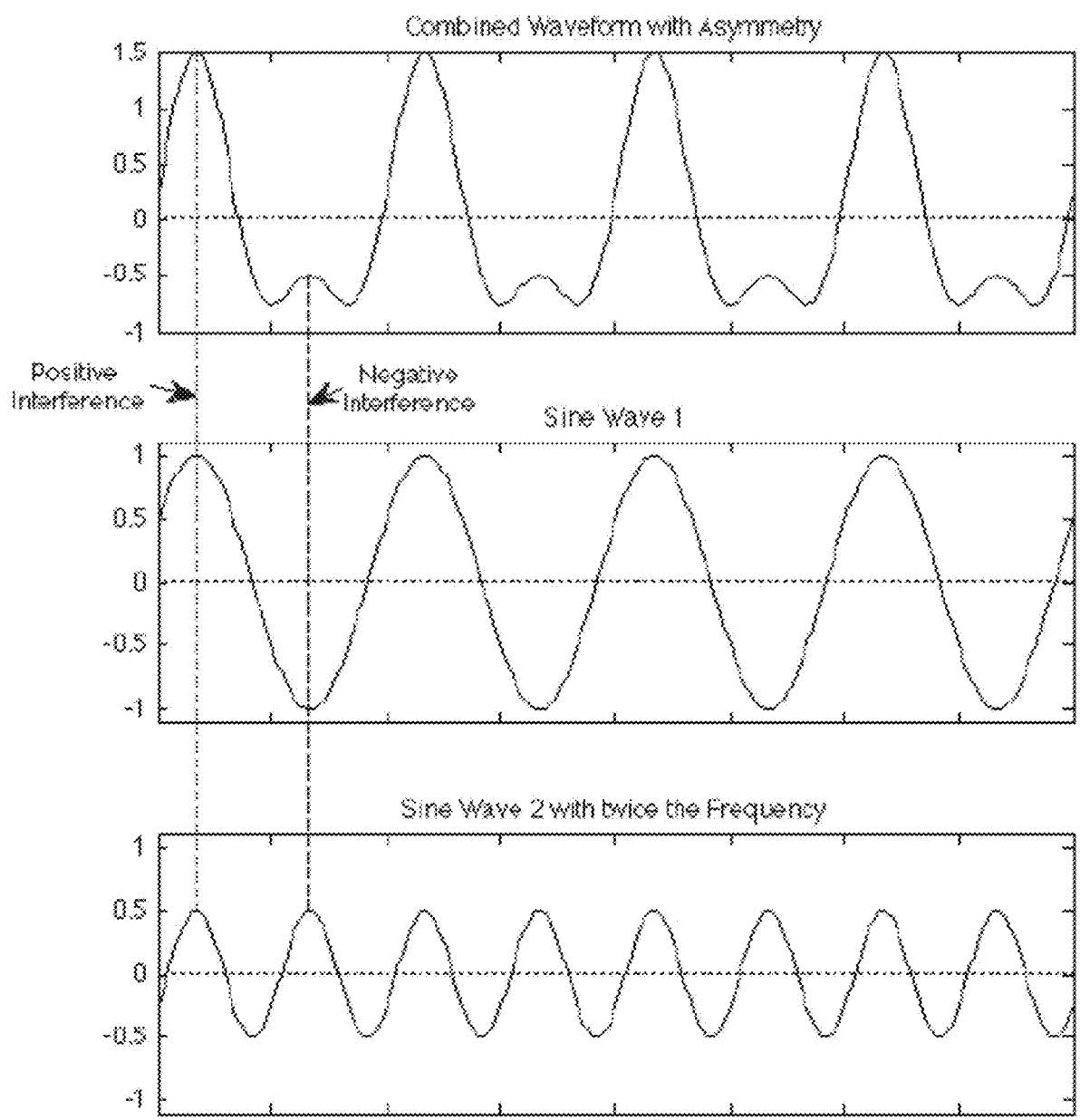
FIG. 44 illustrates superposition of two synchronized sine waves with a phase offset that generates a combined waveform with asymmetry according to aspects of the disclosure.

A feature of this disclosure includes the use of superposition of synchronized vibration waveforms. When multiple vibration forces are generated on a single vibration device, the Combined Vibration Force for the device is the superposition of the multiple waveforms. An example with two synchronized sine waves described by Eq. 35 is shown in FIG. 44. As shown, waveform 2 has twice the frequency of waveform 1. The phase of both waveforms is set such that at a time of zero the peaks of both waveforms have their maximum value in a positive direction, and the forces magnitudes are added together (also referred to as constructive interference or positive interference).

Furthermore, at the time when waveform 1 is at its negative peak then waveform 2 is at a positive peak, and the forces magnitudes are subtracted from each other (also referred to as destructive interference or negative interference). Due to this synchronization the combined vibration waveform is asymmetric, meaning that the force profile for positive force values is different than the force profile for negative force values. In the asymmetric waveform shown in FIG. 44 there is a higher peak positive force and a lower peak negative force. In haptic applications the larger force in the positive direction can generate more of a force sensation than the lower magnitude force in the negative direction, even though the duration of force in the negative direction is longer. In this fashion asymmetric vibrations can be used to generate a haptic cue in a specific direction with a vibration device.

In an LRA, a moving mass moves relative to the actuator housing, and a restoring spring transfers force between the moving mass and the actuator housing. The force imparted by an LRA onto a mounting platform is a combination of the force from the restoring spring, and the electromagnetic force between the stator and moving mass. The restoring spring can be, for example: a mechanical spring or a magnetic spring. As resonance builds up in an LRA, the magnitude of the spring restoring force increases and becomes the dominant portion of the actuator force. Accordingly, the peak force imparted by a LRA onto the mounting platform typically occurs at or near the peak excursion point of the moving mass.

In FIG. 43 the moving masses are graphically depicted as towards the right side of the LRAs to indicate actuator forces being applied to the right. Accordingly, when the embodiment shown in FIG. 43 is controlled to follow the waveform described by Eq. 35, then the moving mass of LRA 1102*a* is at its peak excursion to the right at the same time when the moving mass of LRA 1102*b* is at its peak excursion to the right resulting in a large combined force to the right, yet when the moving mass of LRA 1102*a* is at or near its peak excursion to the left then the moving mass of LRA 1102*b* is at or near its peak excursion to the right (since it is vibrating at twice the frequency) resulting in force cancelation and a low combined force to the left.

Figure 45:
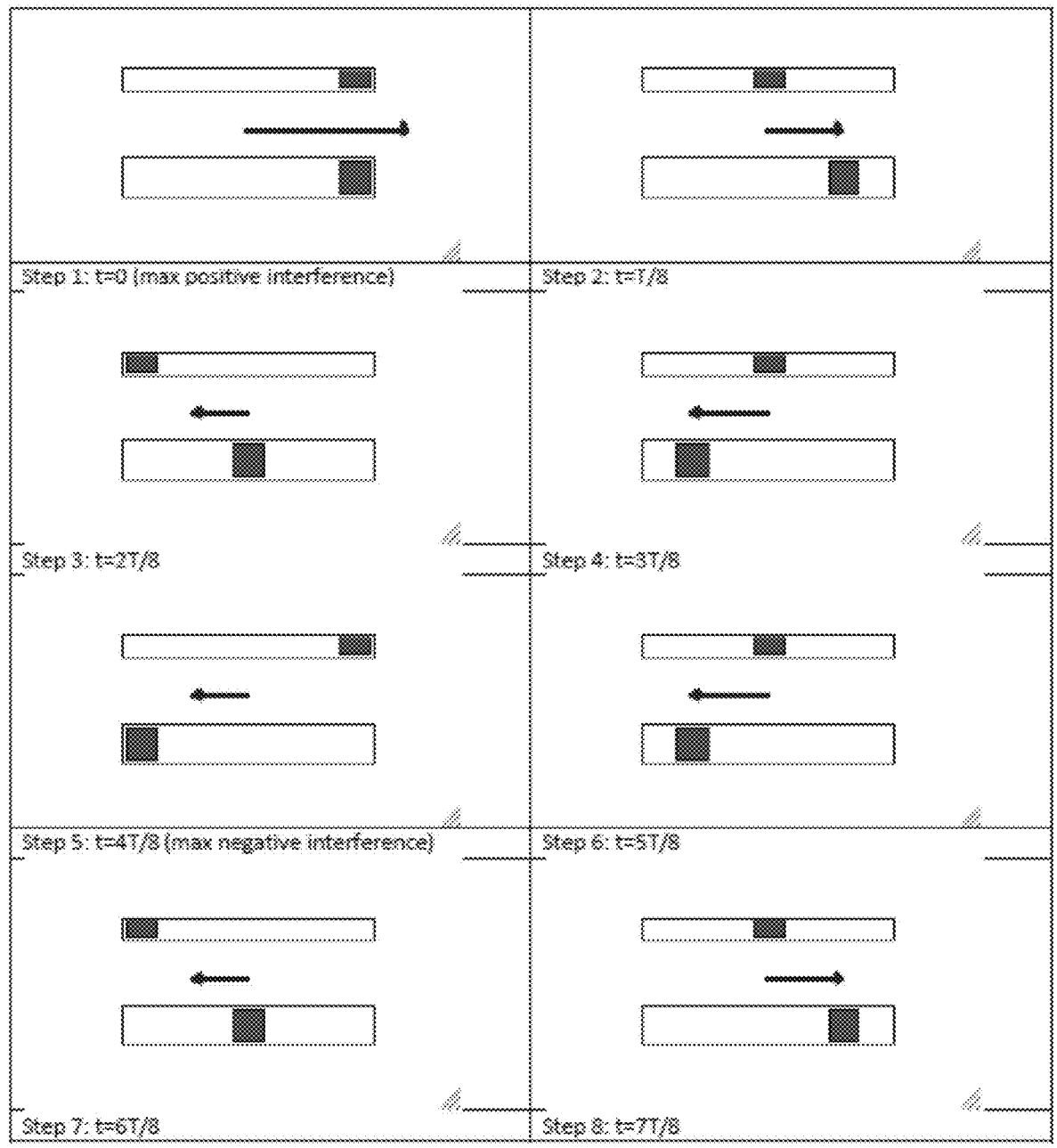
FIG. 45 illustrates time steps within a vibration cycle of two linear resonant actuators generating an asymmetric waveform according to aspects of the disclosure.

Thus, in this embodiment the timing of the moving masses is an indication of an asymmetric vibration waveform. In FIG. 45, the embodiment shown in FIG. 43 is shown at various time steps as it implements the vibration waveform shown in FIG. 44. In 45, the top LRA vibrates at twice the frequency and generates lower forces that the bottom LRA, the position of the moving masses indicates the forces generated by each LRA, and the combined force vector is shown between the LRAs. Each time step in FIG. 45 is labeled according to the period, T, of the slower LRA.

In the embodiment shown in FIG. 43, the alignment of the actuators does not have to be precise. Indeed, in haptic applications having the two actuators are not precisely aligned may not deter from the primary haptic effect that is being generated.

Figure 46:
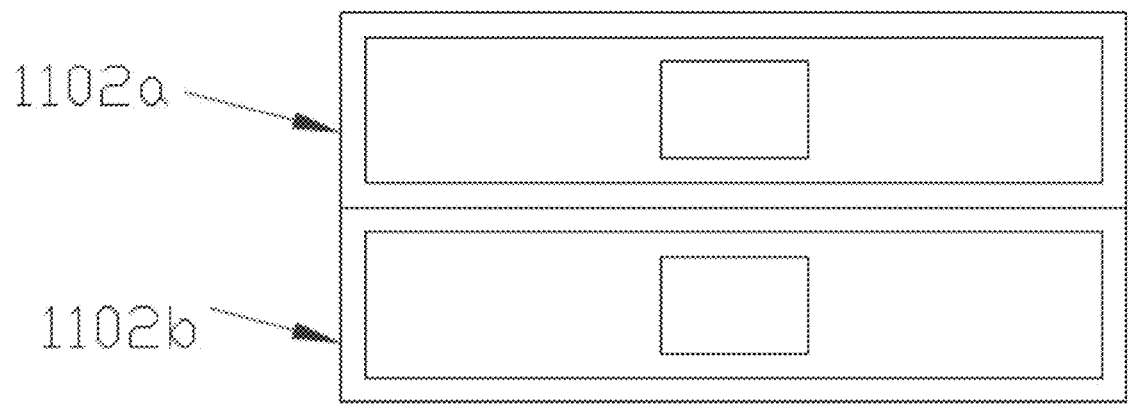
FIG. 46 illustrates two linear resonant actuators directly attached to one another for use with aspects of the disclosure.

A variation of this embodiment is shown in FIG. 46. The actuators 1102*a* and 1102*b* are attached directly to each other to provide an even more compact configuration. Also the LRAs can share housings, shafts, power supplies, and other components to make the device even more compact.

Figure 47:
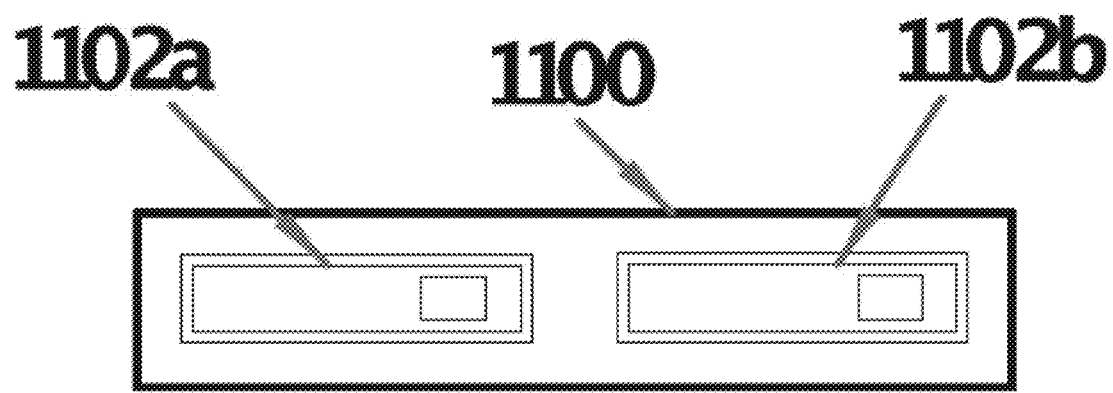
FIG. 47 illustrates an alternative example of two linear resonant actuators attached in line with one another for use with aspects of the disclosure.

Another variation of this embodiment is shown in FIG. 47. The actuators 1102*a* and 1102*b* are attached in line with each other. In this embodiment, the forces of each LRA are collinear, and create no net torque along the axis of the LRAs. This embodiment is useful where pure force output is desired without any torque output.

Figure 48:
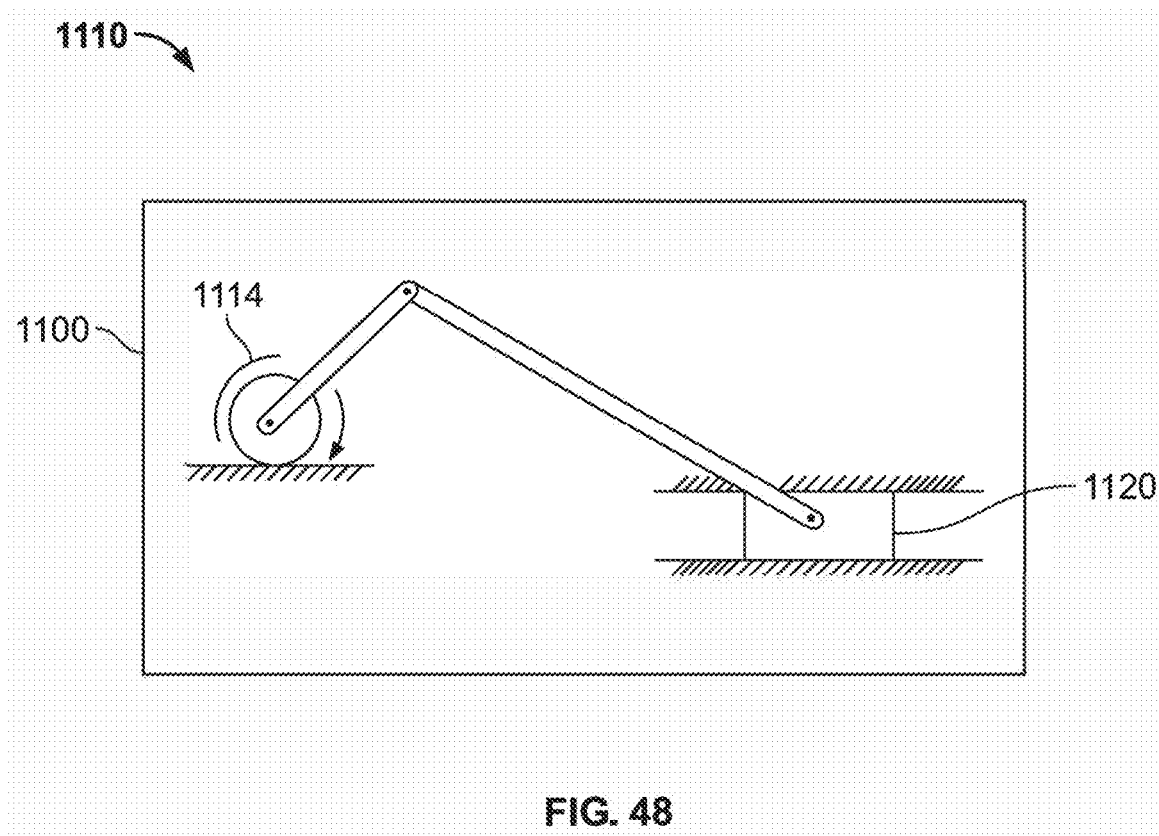
FIG. 48 illustrates a vibration device that uses a slider-crank linkage for use with aspects of the disclosure.

The timing of vibration force within a Vibration Actuator can be correlated with a number of physical properties. For example, in many LRAs a spring applies a restoring force onto a moving mass and the vibration force is largely correlated with the position of the moving mass. In ERMs the direction of the vibration force largely correlates to the angular position of a rotating eccentric mass. Linkage mechanisms can be used to generate vibrations, such as a slider-crank vibration actuator 1110 shown in FIG. 48, where a rotating motor 1114 moves a mass 1120 back and forth. With such linkages the vibration force can be correlated with the acceleration of a moving mass. Since the vibration force can be correlated with a number of physical properties, General Synchronized Vibration can also be characterized by control of the frequency and phase of the position or acceleration of moving masses within Vibration Actuators.

Figure 49:
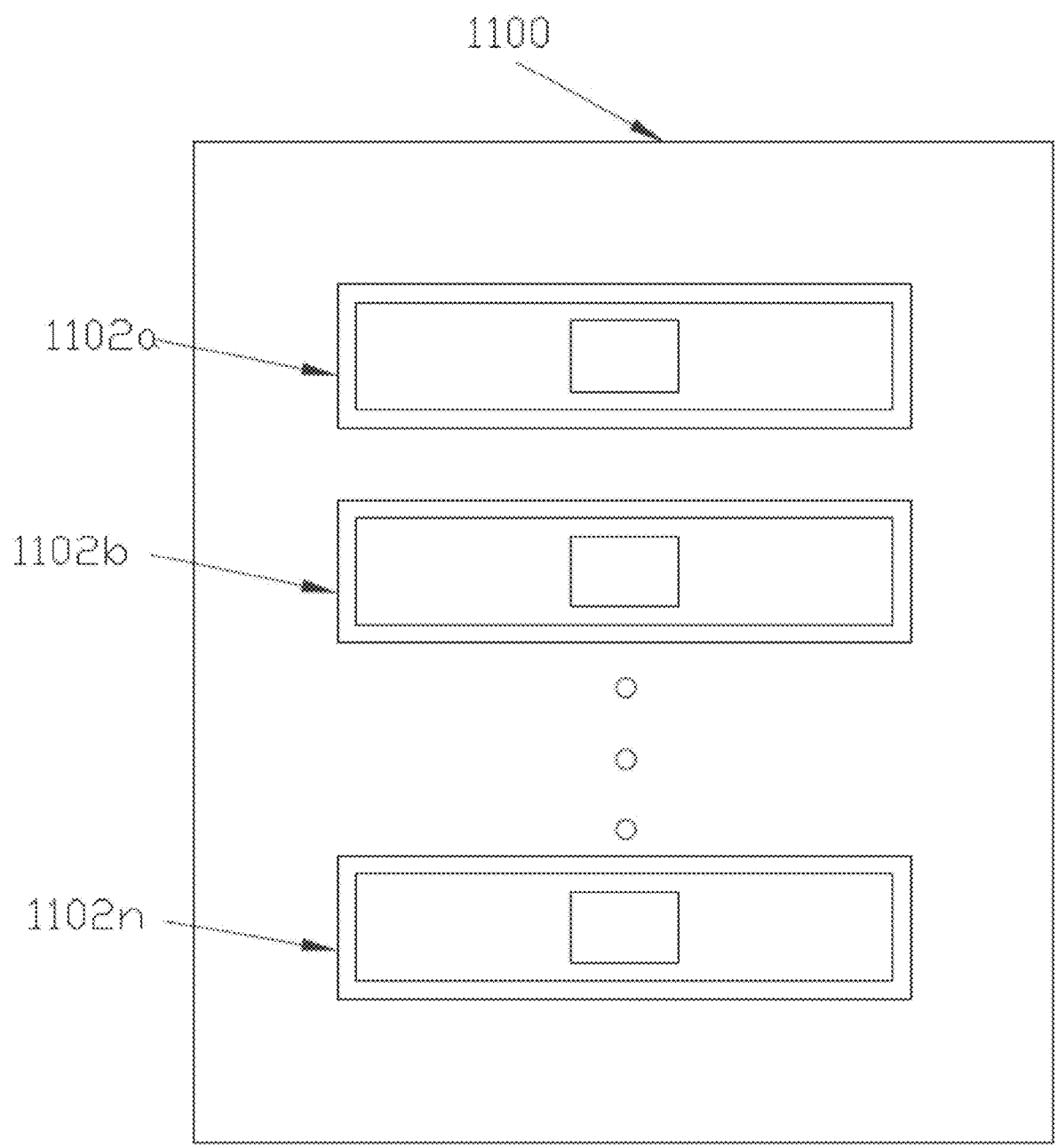
FIG. 49 illustrates a vibration device with n LRAs for use with aspects of the disclosure.

A feature of this disclosure includes combining vibration waveforms from multiple Vibration Actuators to generate a more complex vibration waveform. The asymmetric vibration described by Eq. 35 and shown in FIG. 44 is only one such type of combined vibration waveform. A more general embodiment shown FIG. 49 has a set of N LRAs all aligned with the same axis. According to one aspect, in General Synchronized Vibration a plurality of Vibration Actuators are synchronized in phase and frequency, and in some cases amplitude. A wide range of vibration effects can be generated by controlling the frequencies and phases of all N actuators.

A vibration force, F, is in a repeated cycle over a period T when F(t+T)=F(t). The vibration force of an ith actuator in a repeated cycle can be given by:

$$F_i(t + \Delta_i + T_i) = F_i(\Delta_i + t),$$

where $\Delta_i$ is the phase and $T_i$ is the period of the ith actuator. For the embodiment shown in FIG. 49, there is a set of N LRAs all aligned with the same axis. If all actuators are operated at set frequencies and phases, then the combined vibration force can be given by:

$$F_{AlignedSet} = F_1(\Delta_1 + t) + F_2(\Delta_2 + t) + \ldots + F_N(\Delta_N + t) \qquad (36)$$

In the general case, the waveform shapes of $F_i$ can be a wide range of waveforms including sine waves, triangle waves, square waves, or other waveforms. In some embodiments, the frequency of the actuator with the lowest frequency is defined as the fundamental frequency, $\omega_1$, and the remaining actuators vibrate at integer multiples of the fundamental frequency. In these embodiments the period of the fundamental frequency is given by $T_1$ and the remaining vibration periods are given by such that:

$$T_1 = 2T_2, T_1 = 3T_3, \ldots T_1 = NT_N$$

When all the vibration actuators vibrate at integer multiples of the fundamental frequency, then the combined waveform has a repeated waveform with a period of the fundamental frequency. The fundamental frequency is also referred to as the first harmonic.

One method of implementing General Synchronized Vibration is to use sinusoidal vibrations in each actuator of an aligned set, and use Fourier Waveform Synthesis to select the phase, frequency, and amplitude of each actuator to approximate a desired vibration waveform. For a set of N aligned actuators with sinusoidal waveforms, the combined force of an Aligned Set, $F_{AlignedSetFourier}$, is given by:

$$F_{AlignedSetFourier} = \qquad (37)$$
$$B_1\sin(\omega_1 t + \phi_1) + B_2\sin(\omega_2 t + \phi_2) + \ldots + B_N\sin(\omega_N t + \phi_N)$$

A wide range of additional waveforms can be synthesized from a set (a plurality) of vibration waveforms. Fourier synthesis is a method whereby an arbitrary waveform can be approximated from a combination of sine waves, including both symmetric and asymmetric waveforms. It is advantageous to use actuators vibrating at frequencies that are integer multiples of the frequency of vibration of other actuators. The lowest frequency in the set is referred to as the fundamental frequency or the first harmonic, the second harmonic is twice the fundamental frequency, the third harmonic is three times the fundamental frequency, and so on.

An advantage of using harmonics is that all the waveforms in the set repeat at the period of the fundamental frequency, thereby providing a repeating waveform profile of the combined waveform. In many vibration applications each vibration actuator generates a force with a repeated waveform that has a zero DC component and the combined force is described by Eq. 37. Accordingly, the combined vibration force does not have a DC component. Fourier synthesis is widely used in create a wide range of waveforms. One example waveform is a Sawtooth waveform, which creates a sudden change of force in one direction. In this manner, the Sawtooth waveform can be used to generate directional haptic cues. When the set of waveforms consists of three sine waves, the Sawtooth waveform can be generated with the first harmonic at relative amplitude 1, the second harmonic is at relative amplitude of ½, and the third linear sine wave with a relative amplitude of ⅓. With Fourier waveform synthesis, arbitrary waveforms can be approximated including both symmetric and asymmetric waveforms. When using Fourier waveform synthesis, both constructive and destructive interference can occur for both the positive and negative forces amplitudes.

An operating advantage of an LRA is to use resonance to generate high magnitude vibration forces from a relatively low power input, and an LRA can be designed and manufactured to have a specific resonant frequency by optimizing its spring stiffness and moving mass. In embodiments of General Synchronized Vibration, it can be advantageous to select a set of LRAs with resonant frequencies that correspond to at least some of the harmonics of a desired waveform. For example for a vibration device such as that in FIG. 49 with a set of n LRAs, the first LRA 1102a could have a specified resonant frequency of $\omega_1$, the second LRA 1102b could have a specified resonant frequency of $2\omega_1$, the third LRA could have a specified resonant frequency of $3\omega_1$, and so on through the nth LRA 1102n.

Although LRAs are generally designed to operate at their resonant frequency, one can operate LRAs at other frequencies with lower amplitude force output per input command signal. Since lower amplitude force output is typically required at higher harmonics, once could build a Vibration Device with LRAs that all have the same resonant frequency, but operate them at different frequencies. For example for a vibration device with a set of 2 LRAs, both LRAs could have a specified resonant frequency of $(3/2)\omega_1$, where the first LRA is driven at $\omega_1$, and the second LRA is driven at $2\omega_1$. In this configuration both LRAs are amplifying the input signal, but less than if they were driven at the resonant frequency of the LRAs, which is $(3/2)\omega_1$ for this example.

Asymmetric Vibration waveforms are useful for generating directional haptic cues, and can be synthesized using Fourier synthesis. For instance, an example of a method for selecting frequency, phase, and amplitude of sinusoidal vibrations to generate a high level of asymmetry is discussed below. Vibration parameters are specified for a set of 2, 3, and 4 actuators. In addition a process is presented for identifying parameters for waveforms with a high level of vibration asymmetry for any number of actuators. It should be noted that high levels of asymmetry may be achieved even if the values specified by this example are only approximately implemented. For instance, in the case of superposition of two sine waves, if there is a 30% error in the amplitude of vibration then 90% of desired asymmetry effect will still be realized.

Figure 50:
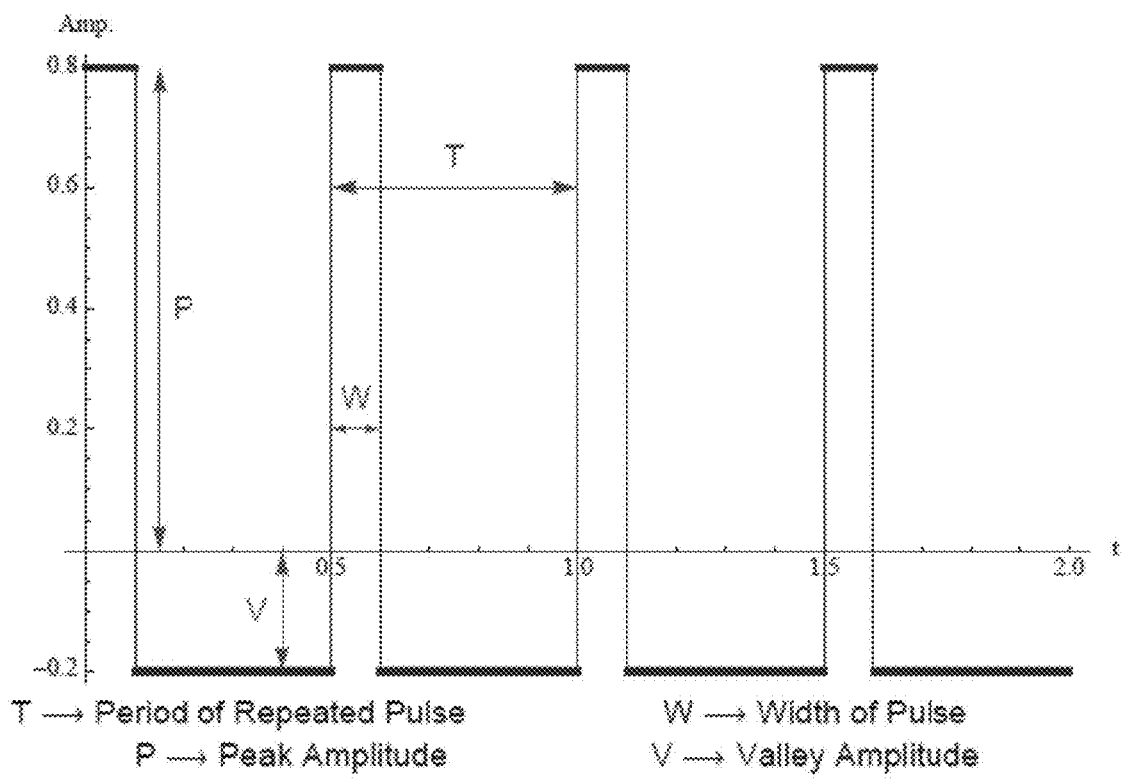
FIG. 50 illustrates an asymmetric pulse train according to aspects of the disclosure.

Fourier synthesis allows one to approximate an arbitrary waveform with a superposition of sinusoidal waves. However, it is advantageous in some applications to generate asymmetric waveforms that have higher peak magnitudes in the positive direction than in the negative direction (or vice versa). The question then becomes what is the best function to approximate that will maximize the amount of asymmetry for a given number of superimposed sine waves? It is of special interest to consider asymmetric waveforms that have a zero DC component and thus can be composed solely of sine waves. Waveforms with a zero DC component can be used to generate vibrations from a set of vibrators since each vibrator will typically have a zero DC component. An asymmetric pulse train is illustrated in FIG. 50. The pulse-train is just one example of an asymmetric waveform, but it is a useful example. For the pulse-train to have a zero DC component, the area above the axis. Thus:

$$W \cdot P = (T - W)V, \text{ and}$$
$$V = \frac{W \cdot P}{(T - W)},$$

where W is the pulse width, V is valley amplitude, T is period of repeated pulse, and P is peak amplitude.

The amount of asymmetry in a pulse-train can be defined by the percentage increase of P over V. One could increase the amount of asymmetry by reducing W, which would generate a thin and high pulse. However, if W is too small, the waveform would not be well-approximated with a small number of sine waves. Accordingly, an analytical question is, "What is the optimal value of W for a waveform composed of N sine waves?"

Figure 51:
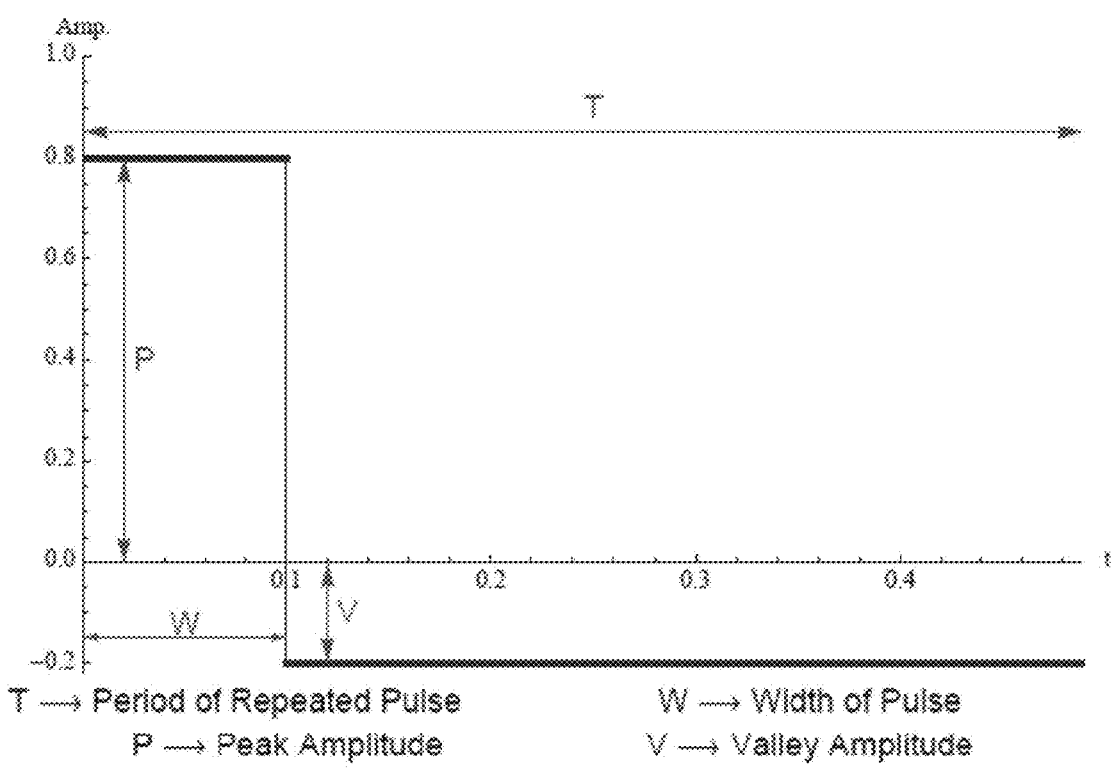
FIG. 51 illustrates a pulse train with zero DC according to aspects of the disclosure.

FIG. 51 illustrates a pulse-train with zero DC component. Given this waveform, one may find its Fourier coefficients according to the Fourier series:

$$f(t) = a_0 + \sum_{n=1}^{N} (a_n \sin(2\pi nt) + b_n \cos(2\pi nt)),$$

where f(t) is an arbitrary waveform and when $a_0=0$ it have zero DC component. The Fourier coefficients can be calculated by multiplying both sides of the above equation by sin(2 πn t) or cos(2 πn t) and then canceling out terms. The coefficients are:

$$\frac{a_n}{2} = \int_0^T f(t) \sin(2\pi nt)dt$$
$$\frac{b_n}{2} = \int_0^T f(t) \cos(2\pi nt)dt$$
$$a_0 = \int_0^T f(t) dt = 0$$

The equation for $a_0$ holds if the DC component is zero. For the pulse waveform above, an is given by:

$$\frac{a_n}{2} = \int_0^W P \sin(2\pi nt)dt + \int_W^T (-V) \sin(2\pi nt)dt$$
$$= \frac{-P \cos(2\pi nt)}{2\pi n}\Big]_0^W + \frac{V \cos(2\pi nt)}{2\pi n}\Big]_W^T$$
$$\frac{a_n}{2} = \frac{-P \cos(2\pi nW)}{2\pi n} + \frac{P}{2\pi n} + \frac{V \cos(2\pi nT)}{2\pi n} - \frac{V \cos(2\pi nW)}{2\pi n}$$
$$\frac{a_n}{2} = \left(\frac{1}{2\pi n}\right)(P + V \cos(2\pi nT) - (P + V) \cos(2\pi nW))$$

In a similar fashion:

$$\frac{b_n}{2} = \int_0^W P \cos(2\pi nt)dt + \int_W^T (-V) \cos(2\pi nt)dt$$
$$\frac{b_n}{2} = \left(\frac{1}{2\pi n}\right)((P + V) \sin(2\pi nW) - V \sin(2\pi nT))$$

By substituting in V from the equation above, the result is:

$$\frac{a_n}{2} = \frac{-PT \cos(2\pi nW) + PW \cos(2\pi nT) + PT - PW}{2\pi nT - 2\pi nW}$$
$$\frac{b_n}{2} = -\frac{PW \sin(2\pi nT) - PT \sin(2\pi nW)}{2\pi nT - 2\pi nW}$$

Figure 52:
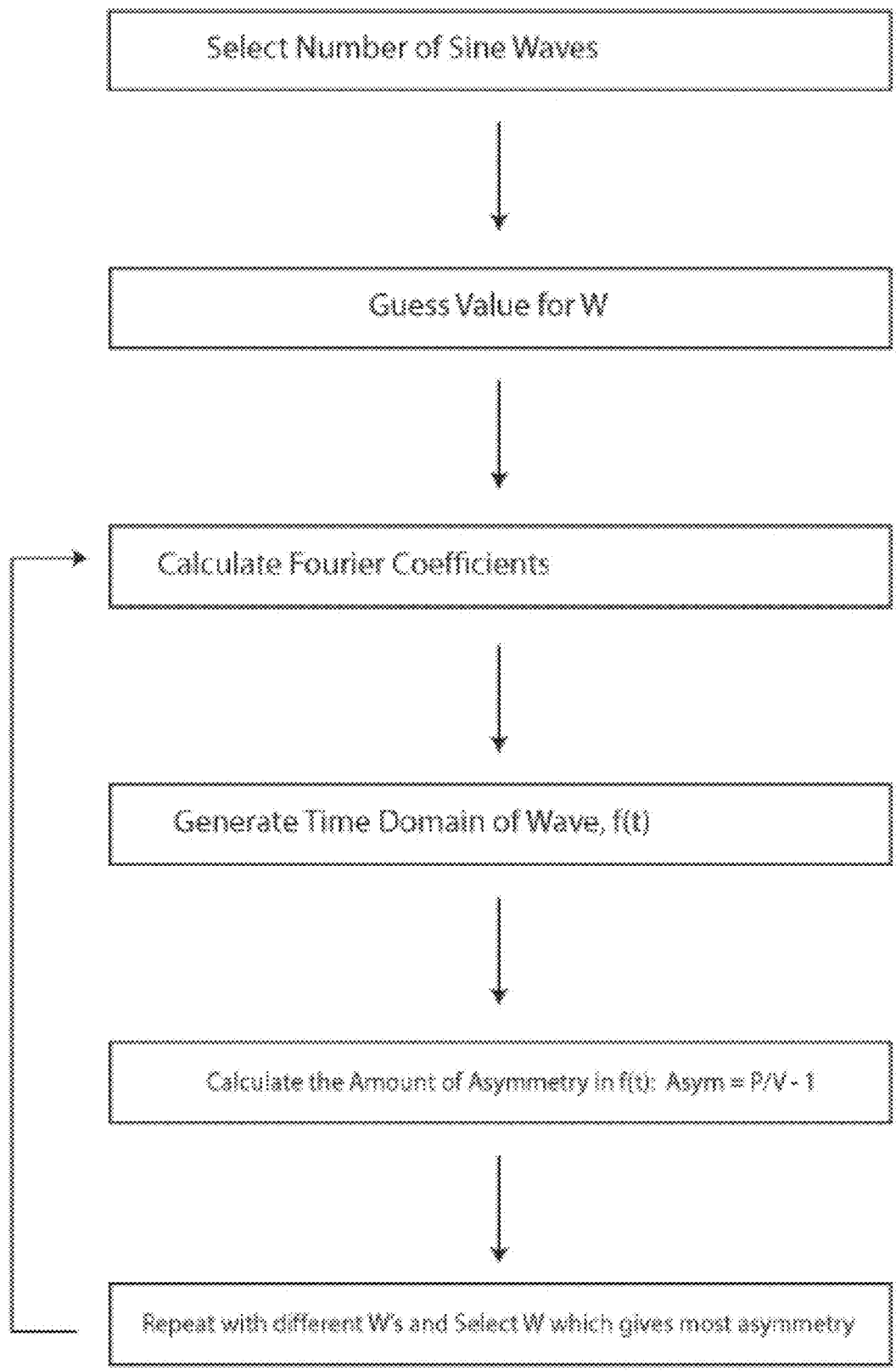
FIG. 52 is a flow diagram illustrating a process for maximizing asymmetry according to aspects of the disclosure.

FIG. 52 is a flow diagram illustrating a process for maximizing asymmetry. As shown in the flow diagram, the process includes selecting a number of sine waves, and then guessing (estimating) values for W. Fourier coefficients are then calculated, and the time domain of the wave, f(t), is generated according to the equation set forth above. The amount of asymmetry in f(t) is then calculated. The process may be repeated with different values for W, and the value for W is selected that gives the most asymmetry.

Fourier coefficients can be represented by $a_n$ and $b_n$ as:

$$f(t) = a_0 + \sum_{n=1}^{N} (a_n \sin(2\pi nt) + b_n \cos(2\pi nt))$$

An alternative representation using sine waves and phase is:

$$f(t) = A_0 + \sum_{n=1}^{N} A_n \sin(2\pi nt + \phi_n)$$

To relate the two representations, the addition of sines formula:

$$\sin(\alpha + \beta) = \sin(\alpha)\cos(\beta) + \cos(\alpha)\sin(\beta)$$

may be used with:

$$\alpha = 2\pi nt$$
$$\beta = \phi_n$$
$$A_n \sin(2\pi nt + \phi_n) = A_n \cos(\phi_n) \cdot \sin(2\pi nt) + A_n \sin(\phi_n)\cos(2\pi nt)$$

Let $$a_n = A_n \cos(\phi_n) \text{ and } b_n = A_n \sin(\phi_n)$$
$$\therefore A_n = \sqrt{a_n^2 + b_n^2} = \sqrt{A_n^2 \cos^2(\phi_n) + A_n^2 \sin^2(\phi_n)} = A_n$$

where $$\phi_n = \tan^{-1}\left(\frac{b_n}{a_n}\right)$$

In one scenario, the process shown in FIG. 52 was implemented for a range of sine waves according to the table below.

TABLE I

| NACT | W | Asym | $A_1$ | $\phi_1$ | $A_2$ | $\phi_2$ | $A_3$ | $\phi_3$ | $A_4$ | $\phi_4$ |
|---|---|---|---|---|---|---|---|---|---|---|
| 2 | 0.33 | 100% | 1 | 30° | 0.5 | −30° | | | | |
| 3 | 0.25 | 189% | 1 | 45° | 0.71 | 0° | 0.33 | −45° | | |
| 4 | 0.2 | 269% | 1 | 54° | 0.81 | 18° | 0.54 | −18° | 0.25 | −54° |

Figure 53:
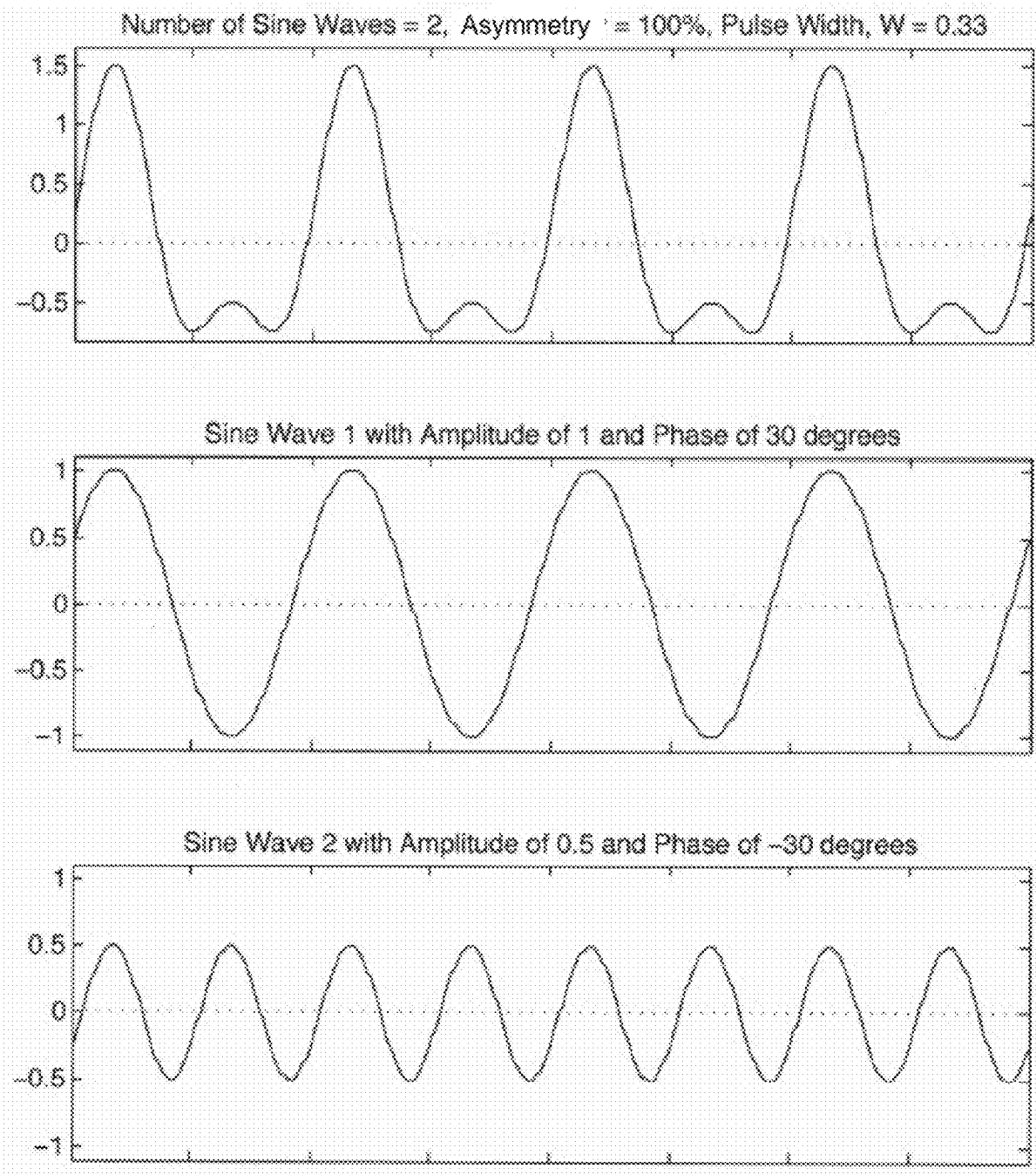
FIG. 53 illustrates an example of waveform asymmetry according to aspects of the disclosure.
Figure 54:
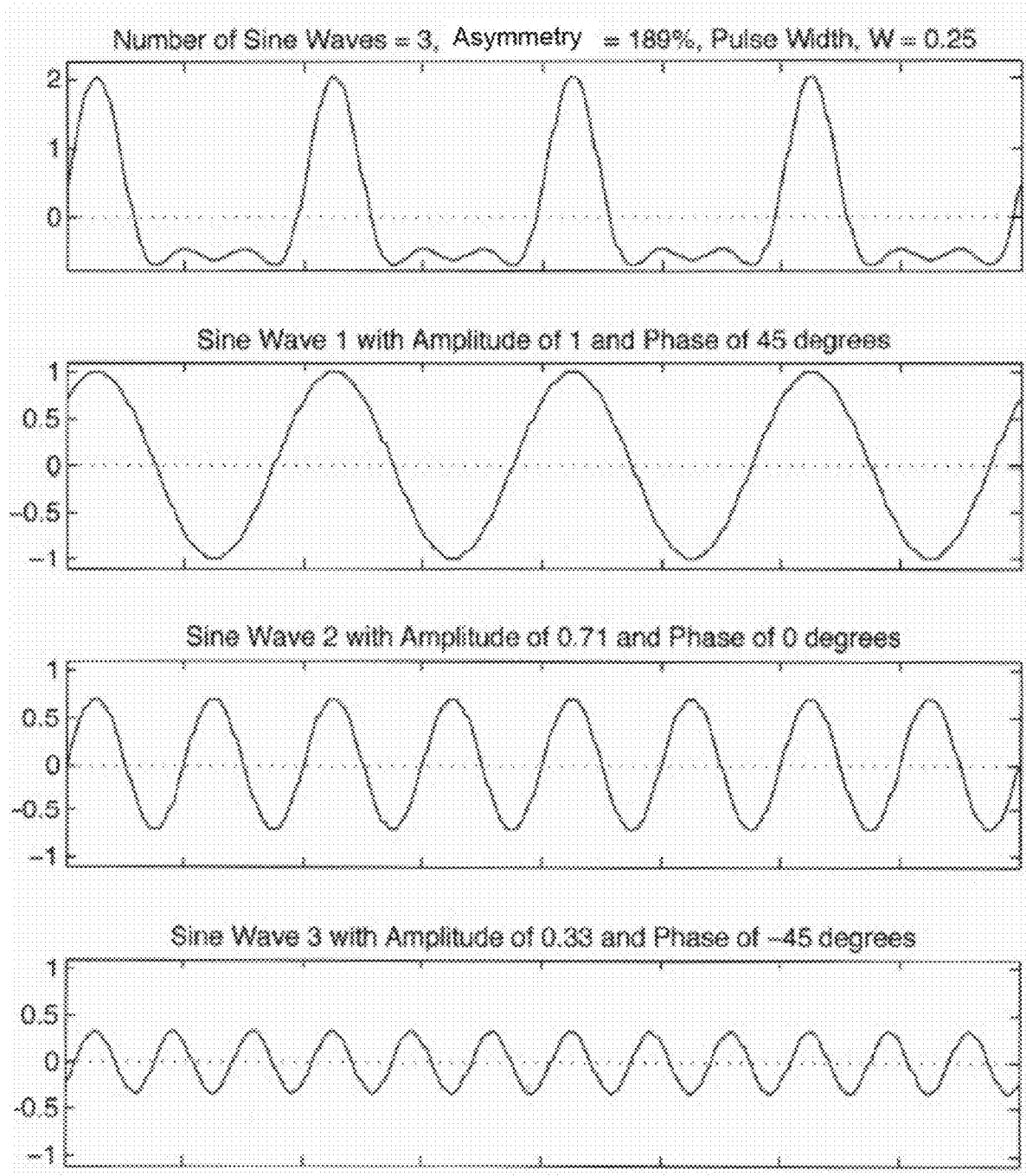
FIG. 54 illustrates another example of waveform asymmetry according to aspects of the disclosure.
Figure 55:
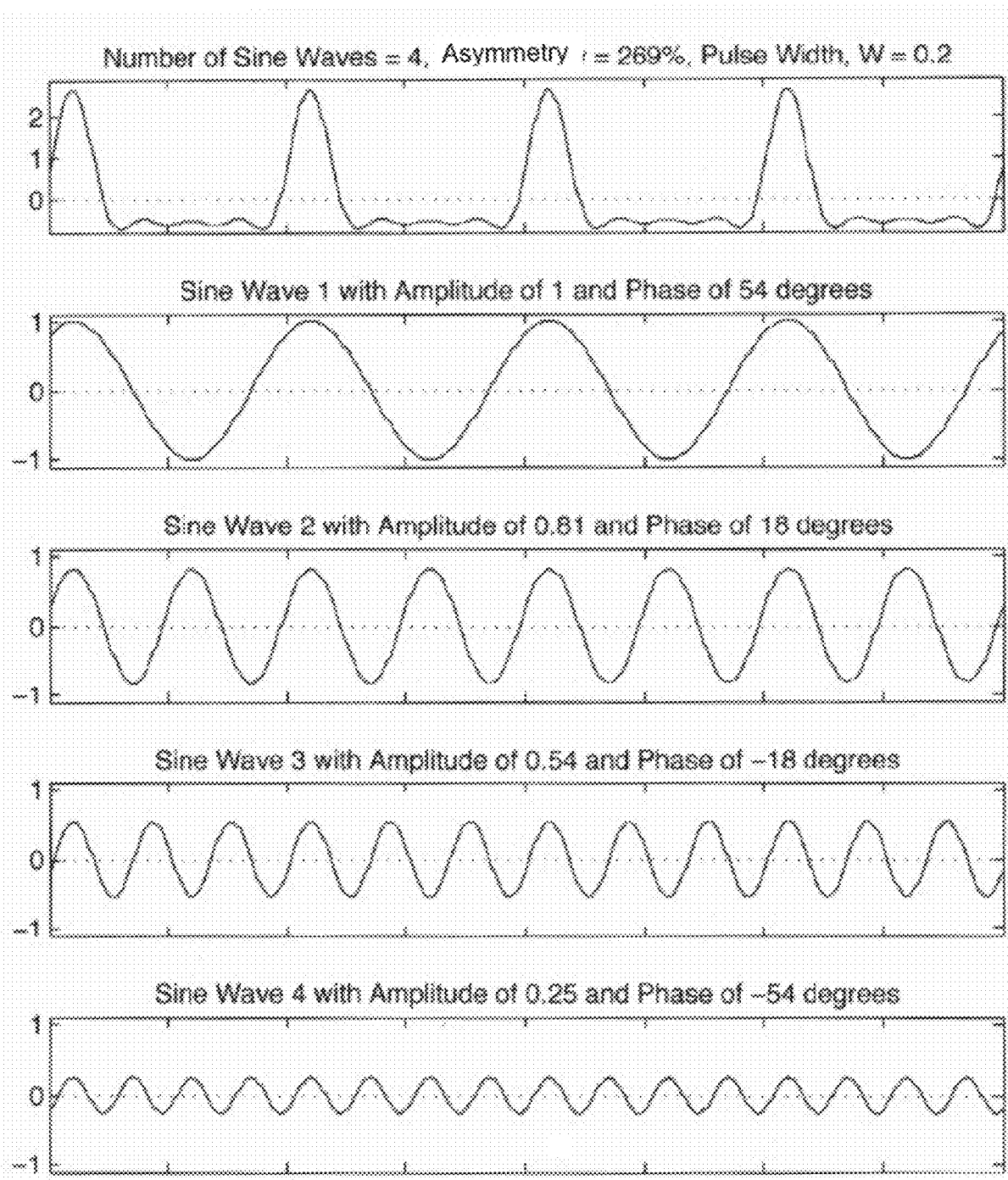
FIG. 55 illustrates a further example of waveform asymmetry according to aspects of the disclosure.

The variable "NACT" in Table I is used to define the number of sine waves since it can also represent the number of actuators. For two sine waves, an asymmetry of 100% can be achieved, which indicates there is twice the magnitude in the positive direction (or vice versa). Higher numbers of sine waves can provide even higher amounts of asymmetry as shown in Table I. One example is shown in FIG. 44. Other examples are shown in FIGS. 53-55.

General Synchronized Vibration can be performed with a set of non-sinusoidal waveforms. Even without use of Fourier synthesis, asymmetric waveforms can be generated by synchronizing the waveforms to create positive interference of two or more waveforms in one direction, and negative interference of two or more waveforms in the opposite direction. Embodiments with non-sinusoidal waveforms can still have the peaks of two or more waveforms occur simultaneously with positive interference in one direction and also occur simultaneously with negative interference in the opposite direction.

Figure 56:
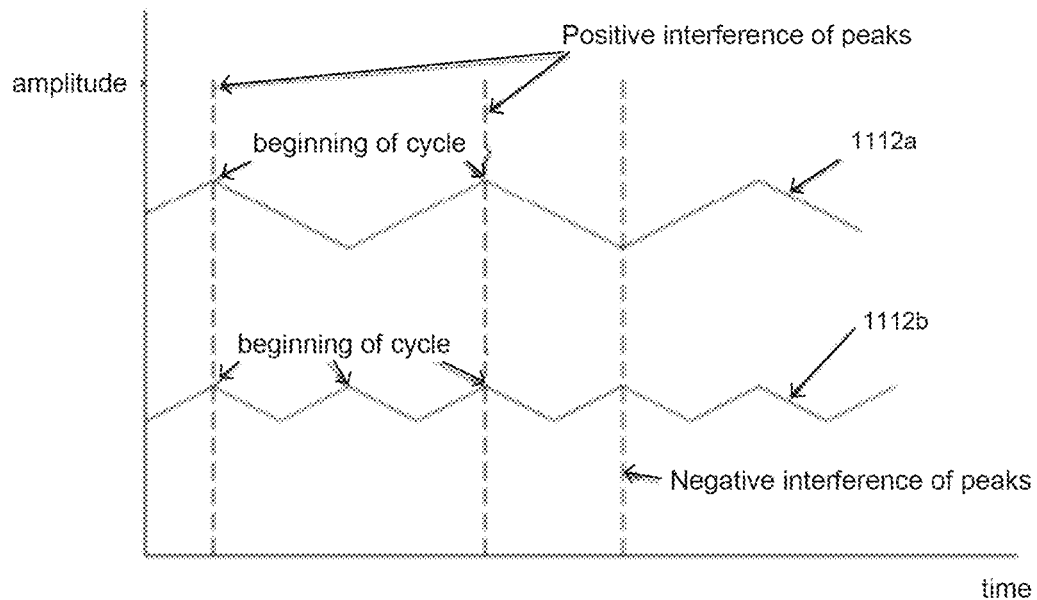
FIG. 56 illustrates synchronized triangular waveforms according to aspects of the disclosure.

FIG. 56 shows two triangular waveforms that are synchronized together. Profile 1112*a* has twice the amplitude of profile 1112*b*, while profile 1112*b* vibrates at twice the frequency of profile 1112*a*. The peaks of profile 1112*a* and 1112*b* occur simultaneously, at times with positive interference and at times with negative interference. The combined waveform of profile 1112*a* and 1112*b* will generate an asymmetric waveform in a similar fashion that the combined waveform in FIG. 44.

To create an especially distinct vibration effect, some LRA vibration actuators can be operated at an amplitude high enough to push the moving mass into the travel stops, thereby creating an impact force during each oscillation. The impact with the travel stops will generate a vibration waveform that is not sinusoidal. Multiple such actuators can be synchronized together to generate positive and negative interference as instances of impacts of masses with travel stops. This configuration can generate sharp peaks of vibration force, where direction of vibration is controllable. These sharp peaks of vibrations could be used to generate haptic sensations corresponding to impacts such as simulating the recoil of a gun. A wide range of vibration effects can be generated with non-sinusoidal vibrations. Examples are presented herein that use sine wave vibration waveforms, with the understanding that similar approaches could be generated with other waveforms.

One waveform that can be simulated is referred to as a "missing fundamental" waveform, which takes advantage of a phenomenon of human perception. As explained in "Music and Connectionism" by Peter M. Todd, D. Gareth Loy, MIT Press 2003, humans may perceive that a sound contains pitch of a certain frequency even though that frequency is not present in the sound if the sound contains higher frequencies that are integer multiples of the low frequency. In haptic applications, low frequency vibrations may be difficult to generate due to size and power constraints, while it may be easier to generate higher frequency vibrations. A vibration waveform can be generated that does not contain a desired low frequency, but does include higher frequencies at integer multiples of the desired low frequency. A person may perceive the desired low frequency vibration, just as they perceive the missing fundamental in a sound. The perception of a missing fundamental in vibration can be enhanced by including audio or visual effects at the desired low frequency.

Figure 57:
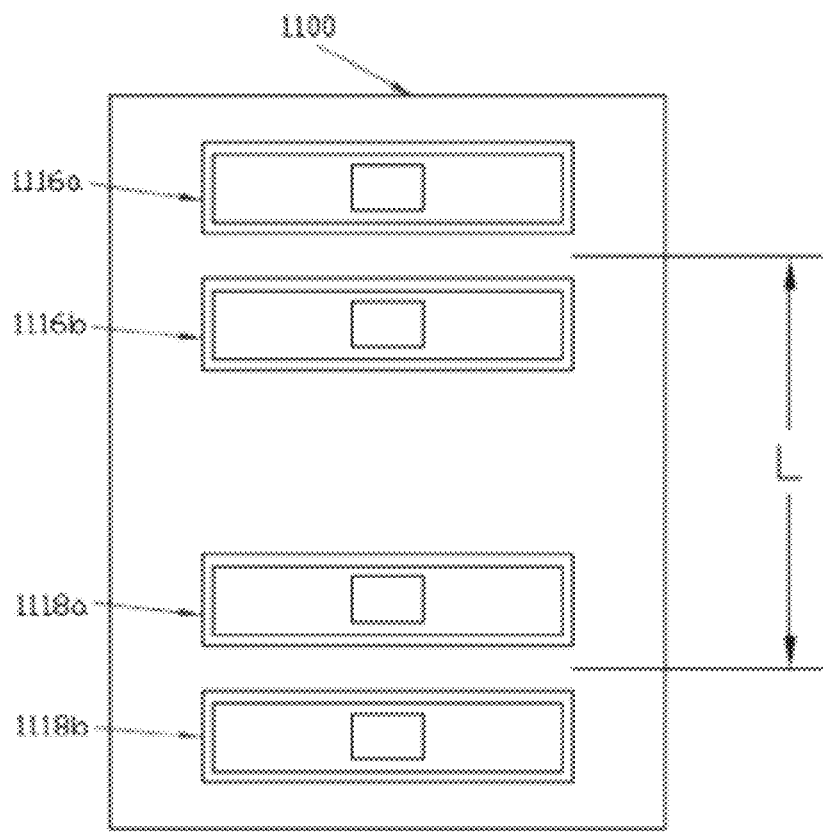
FIG. 57 illustrates a vibration device that can generate asymmetric torques according to aspects of the disclosure.

The embodiment shown in FIG. 57 can generate asymmetric torques about the mounting platform. A pair of LRAs 1116*a* and 1116*b* are mounted towards the top of the mounting platform 1100. A second pair of LRAs 1118*a* and 1118*b* are mounted towards the bottom of mounting platform 1100. When the top pair of LRAs is operated with the same magnitude but opposite direction force than the bottom pair, a pure torque is generated on the mounting platform. When both the top and bottom pair vibrate with an asymmetric waveform, such as that shown in FIG. 44, then the torque vibration is also asymmetric and can apply a higher peak torque in the clockwise direction than the counterclockwise direction (or vice versa). Furthermore, the amplitude of the asymmetric torque vibration may be controlled by proportionally controlling the peak force in each LRA.

LRAs generate vibration forces along an axis and thus are described as "Linear Force Actuators." Other Linear Force Actuators include slider-crank vibrators, rack and pinion vibrators, linear actuators that do not use resonance, pistons, and solenoids. Rocking actuators and pivoting actuators (such as described in U.S. patent application Ser. No. 11/476,436) generate forces that are approximately along an axis and for many applications can be considered Linear Force Actuators. Indeed, any embodiment described herein as employing LRAs can also be implemented with Linear Force Actuators or other actuators that generate forces that are approximately along an axis.

Figure 58:
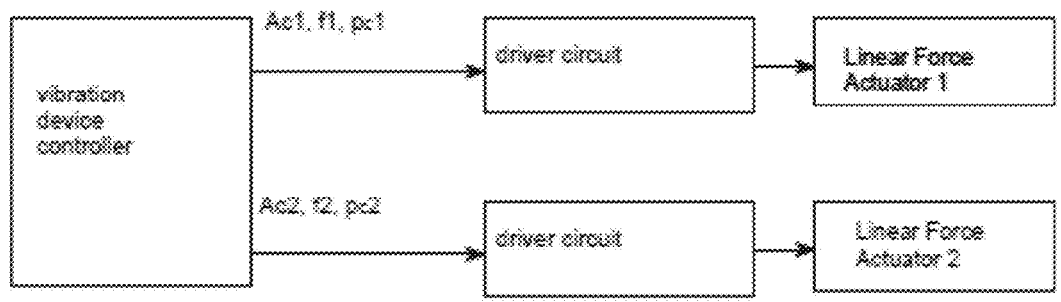
FIG. 58 illustrates a controller for General Synchronized Vibration of a pair of linear force actuators according to aspects of the disclosure.

A controller for General Synchronized Vibration of a pair of Linear Force Actuators is shown in FIG. 58, which could control embodiments such as that shown in FIG. 43. A vibration device controller generates commands of frequency, f, commanded amplitudes, Ac, and commanded phase pc. A driver circuit generates the voltage and current that drives the actuators. The driver circuit may output a waveform of a sine wave, square wave, triangle wave, or other waveform. The actuator may generate a force waveform that is similar to the waveform output of the driver circuit. Alternatively, the actuator may generate a force waveform that differs from the waveform output of the driver circuit. For example, the driver circuit may output a square wave but the actuator may generate a force that is mostly a sine wave due to the physics of the actuator.

Both LRA and ERM Vibration Actuators take some time to ramp up to speed to generate their maximum force output. Embodiments described herein include controllers that may or may not synchronize the actuators during the ramp up period. In addition, a Vibration Device may be commanded to transition from one vibration effect to another vibration effect. During this transition time interval, the controller may or may not synchronize the actuators.

A vibration device controller can be a microprocessor or other programmable device. For each actuator in the vibration device, the vibration device controller can modify the frequency of vibration, the phase of vibration, the amplitude of vibration, or any combination of these parameters. The ability to change these parameters allows for a single vibration device to generate a wide range of waveforms.

The phase and amplitude of the force output of a Vibration Actuator depends on both the control signal and the physical characteristics of the actuator. For example there is often a phase lag between the control signal and the force output of the actuator. To distinguish between the waveform of the actuator outputs and the waveform of the control signal, the subscript "c" notation is used to designate the control waveform. Thus the commanded amplitudes, Ac, and the commanded phase pc are not necessarily a direct correlation to the actual amplitude and phase of the actuator force. For example, the command voltage, V, of a vibration device controller of an LRA actuator driven with a sinusoidal voltage signal at a frequency ω, with a command phase of $\phi_c$, and a voltage peak magnitude $A_c$, given by:

$$V = A_c \sin(\omega t + \phi_c) \tag{38}$$

However, due to the phase lag inherent in the actuator and frequency response of the actuator, the steady state force output of the actuator, $F_a$, may be given by:

$$F_a = A \sin(\omega t + \phi) \tag{39}$$

The phase lag is the difference between $\phi$ and $\phi_c$. The frequency response is reflected in the ratio between Ac and A. Both the phase lag and the frequency response are functions of the actuator physics that can vary with vibration frequency, and which is often represented by an actuator specific Bode plot. For effective implementation of synchronized vibration it can be advantageous to take into consideration the phase lag inherent in each vibration actuator. This can be done by adding an equal but opposite phase offset to the controller waveform so that the actuator phase lag does not impact synchronization.

One method to implement this offset is to use a look up table, Bode plot, or algorithm for each actuator that determines the appropriate phase offset for a given vibration frequency. In addition, it can be advantageous to use a lookup table, Bode plot, or algorithm to determine the required voltage magnitude needed to generated the desired vibration force magnitude. The Fourier synthesis approach and the approach of matching positive and negative peaks of vibration described herein are implemented in reference to the actual phase of the actuator force output rather than the phase of the waveform from the actuator drive circuits. In order to simplify notation herein, the phase lag due to the actuator physics is generally not included in the equations relating to synchronization. Rather a more compact notation is used which represents the vibration force output, F, with the understanding that the appropriate command signal is generated to provided that output. The command signal includes the necessary phase lag and magnitude adjustment as needed based upon the actuator physics. The magnitude control can be implemented with a voltage, current, PWM signal of voltage or current, or other type of command used to drive said actuator. The Fourier synthesis approach and the approach of matching positive and negative peaks of vibration describe specific target frequency and phase of vibration for actuators within the vibration device; however, even if these target frequency and phase are not exactly met, the overall vibration effect often is close enough to the desired waveform to achieve a desired effect.

Figure 59:
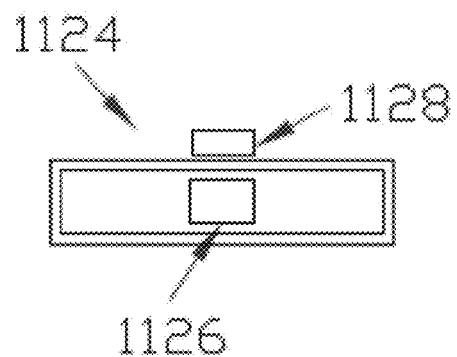
FIG. 59 illustrates a linear force actuator with a sensor that detects when a moving mass passes a midpoint position according to aspects of the disclosure.

Due to manufacturing variations, two actuators that are built on the same assembly line may have different physical characteristics that affect their Bode plot, including phase lag, amplitude characteristics or resonant frequency. In some embodiments a sensor or sensors can be used to detect the phase of an actuator, the amplitude of vibration of an actuator, or the amplitude and phase. Such a sensor could be an optical sensor, Hall-effect sensor or other type of sensor that detects when a moving mass passes the midpoint or other point of vibration. One such embodiment is shown in FIG. 59, where a sensor 1128 is integrated into to a Linear Force Actuator 1124 and detects when the moving mass 1126 reaches passes a midpoint position. A sensor integrated into an actuator can provide continuous, continual or periodic measurement of actuator performance and be used to update calibration parameters while the device is in use and does not require a specified calibration period.

Figure 60:
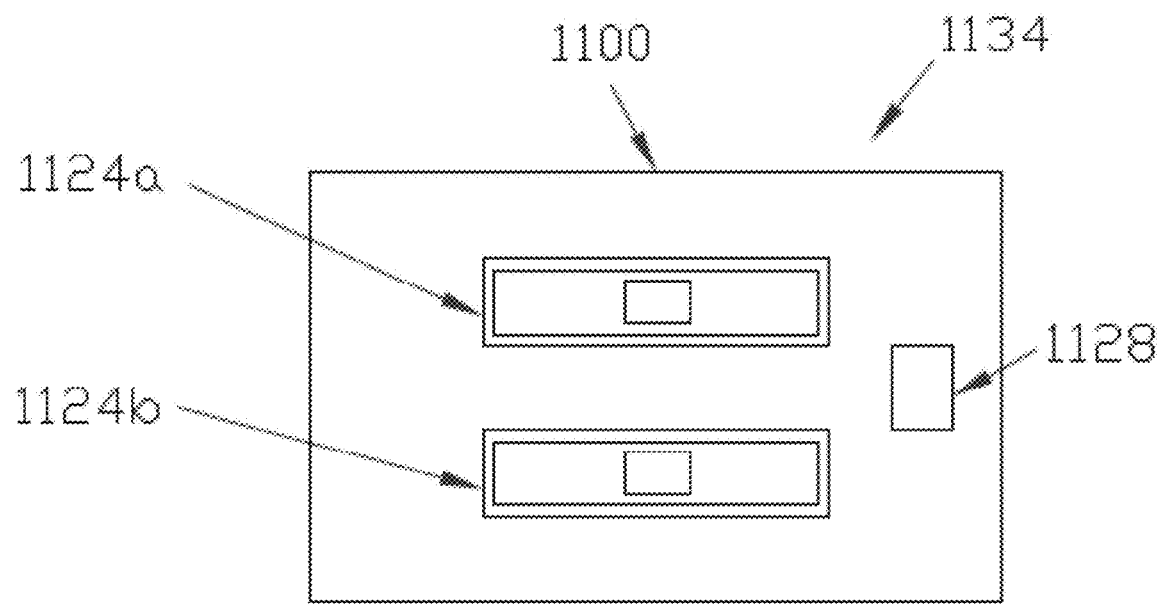
FIG. 60 illustrates a sensor attached to a mounting platform according to aspects of the disclosure.

Another method of sensing is to attach actuators 1124a and 1124b to the Mounting Platform 1100 of the vibration device 1134 as shown in FIG. 60. This sensor 1136 could be an accelerometer or other sensor that measures the combined motion or combined force of the mounting platform.

Figure 61:
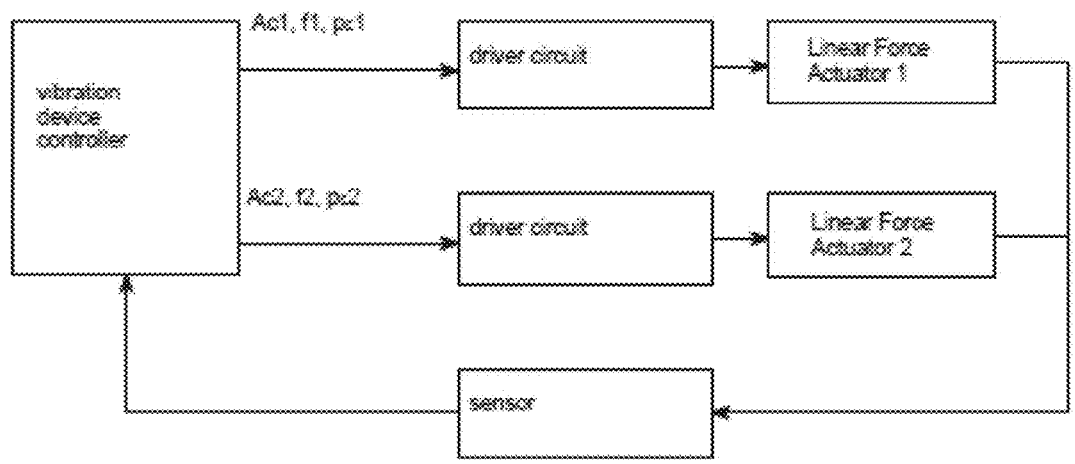
FIG. 61 illustrates a vibration device controller that uses sensor measurements to update a commanded amplitude, phase and/or frequency according to aspects of the disclosure.

The sensor measurements can be used to self-calibrate the vibration devices. A test pattern can operate each actuator separately to identify the actuator phase lag, force amplitude characteristics, and resonant frequency. These characteristics can be used to update a lookup table, Bode plot, or algorithm used to generate the voltage commands to the actuators. The combined force of multiple actuators can also be measured to confirm that the desired force effects are being achieved. Accordingly, the vibration device controller can use the sensor measurements to update the commanded amplitude, phase, and frequency as shown in FIG. 61.

Figure 62:
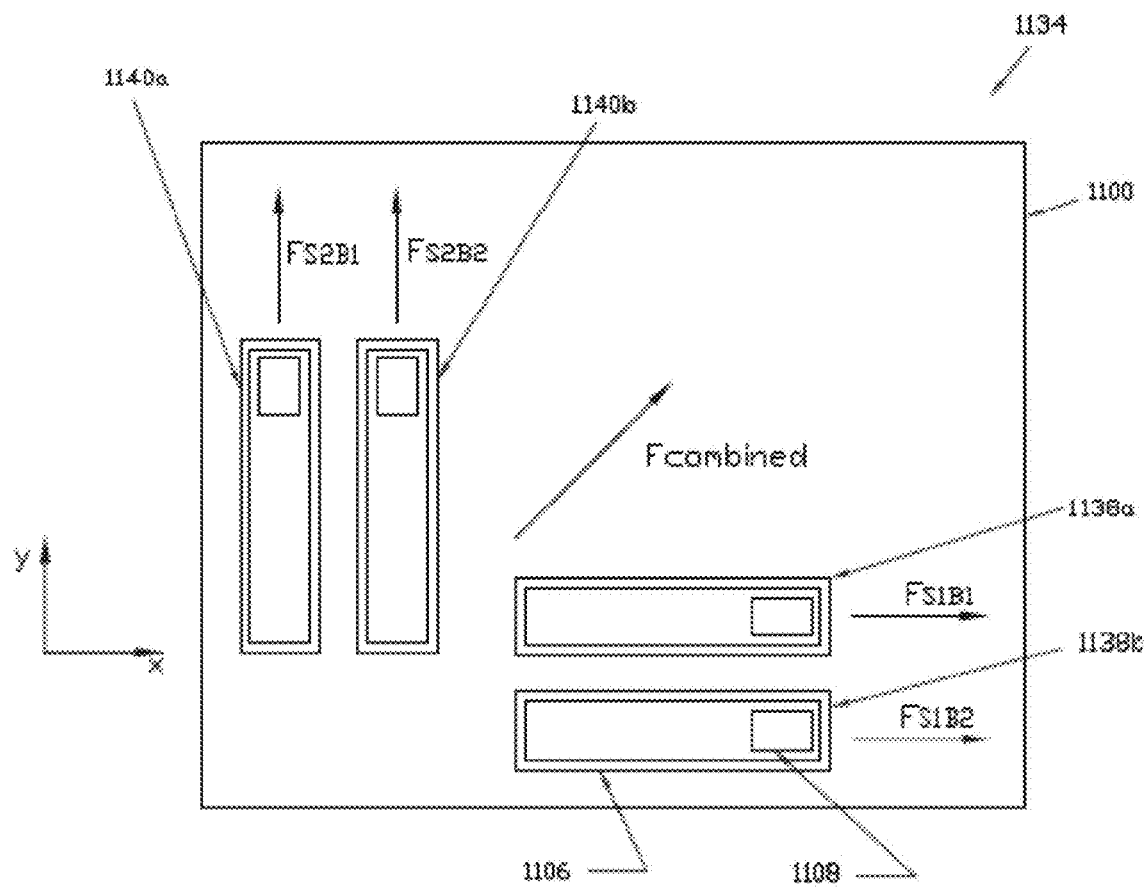
FIG. 62 illustrates a vibration device that includes two orthogonal sets of LRAs according to aspects of the disclosure.

Embodiments of the disclosure also include configurations with multiple sets of aligned vibration actuators. One such configuration is shown in FIG. 62 that includes two sets of actuators. Set 1 consists of two LRAs 1138a and 1138b that are both aligned with the x axis of the vibration device 1134. Set 2 consists of two LRAs 1140a and 1140b that are both aligned with the y axis of the vibration device. Set 1 generates force $F_{S1B1}$ from LRA 1138a, and generates force $F_{S1B2}$ from LRA 1138b. Set 2 generates force $F_{S2B1}$ from LRA 1140a, and generates force $F_{S2B2}$ from LRA 1140b.

In the embodiment shown in FIG. 62, the combined vibration force is the vector sum of all the vibration actuators. Using the notation of U.S. patent application Ser. No. 11/476,436, a, and $a_2$ are unit vectors aligned with the forces from set 1 and set 2 respectively. In one control approach for the embodiment shown in FIG. 62, the waveforms of both sets are controlled to have similar shapes but with different magnitudes. Magnitude coefficients are designated by the variable A, where the scalar $A_1$ multiplies the waveform of set 1 and the scalar $A_2$ multiplies the waveform of set 2. The combined force vector, $F_{combined}$, with this control approach with sinusoidal waveforms is given by:

$$F_{combined} = a_1 A_1 (B_1 \sin(\omega_1 t + \phi_1) + B_2 \sin(\omega_2 t + \phi_2)) + \tag{40}$$
$$a_2 A_2 (B_1 \sin(\omega_1 t + \phi_1) + B_2 \sin(\omega_2 t + \phi_2))$$

As described in U.S. patent application Ser. No. 11/476, 436, there are methods for selecting the magnitude of $A_1$ and $A_2$ that will generate a desired direction for the vector $F_{combined}$, yet these methods may only specify the axis of vibration and not whether the magnitude of force is positive or negative and thus limit the range of unique direction of vibrations to a range of 180 degrees. According to one aspect of the disclosure, an embodiment allowing control of the direction of vibration in all 360 degrees of the plane of the Mounting Platform, may have the following parameter relationships:

$\omega_2 = 2\omega_1$;

$\phi_1 = 0$ and $\phi_2 = -90$ for a direction between $-90$ and $+90$ degrees;

$\phi_1 = 0$ and $\phi_2 = 90$ for a direction between 90 and 270 degrees;

$A_1$ and $A_2$ specified by equation 19 above

Numerous other embodiments are possible with multiple sets of aligned vibration actuators. Each set of aligned actuators can generate an arbitrary waveform, $p_{AlignedSet}$. Embodiments of synchronized vibrations created from arbitrary shaped profiles are described above. Many such embodiments show a single actuator generating each waveform. However, it is also possible to have a set of aligned actuators create these waveforms. Therefore, such embodiments can be expanded to include configurations where a set of aligned actuators take the place of a single actuator. In these configurations, the arbitrary waveform profiles would take the form of the arbitrary waveform, $p_{AlignedSet}$, as discussed herein.

Accordingly, embodiments of asymmetric vibration include 3D configurations and non-orthogonal configurations. An example of two non-orthogonal LRA Pairs is shown in FIG. 63. These LRAs can generate waveforms in desired directions throughout the xy plane. The actuators in each aligned set can be LRAs, rocker actuators, and other sets of actuators that generate approximately linear forces. An equation describing the combined force vector for M aligned sets with all sets having similar shaped waveforms but potentially different magnitudes is given by:

$$F_{combined} = a_1 A_1(p_{AlignedSet}) + a_2 A_2(p_{AlignedSet}) + \ldots + a_M A_M(p_{AlignedSet}) \quad (41)$$

The approaches used to determine the values of A described above can be applied to these configurations as well. A variety of Lissajous vibration patterns are also described above, including lines, circles, ellipses, parabolas, etc. Asymmetric vibration waveforms can be used to produce larger peak forces during one part of the Lissajous vibration pattern than another part.

Turning to another aspect of the disclosure, an ERM is depicted in FIG. 64. A basic ERM includes a motor 1204, a shaft 1208, and an eccentric mass 1206. The motor 1204 could be a DC brushed motor, a DC brushless motor, an AC induction motor, stepper motor, or any other device that turns electrical energy into rotary motion. The shaft 1208 is a power transmission element that transmits the rotary motion of the motor into rotary motion of the eccentric mass. However, alternate power transmission methods could be any means of transmitting the rotary motion of the motor 1204 into rotary motion of the eccentric mass 1206, such as a belt, gear train, chain, or rotary joint. The eccentric mass 1206 could be any body that spins on an axis that is not coincident with its center of mass. Furthermore, the power transmission element may include geometry such that the axis of rotation of the eccentric mass 1206 is not necessarily coincident or parallel to the rotation axis of the motor 1204, and the eccentric mass 1206 does not necessarily rotate at the same angular velocity as the motor 1204.

Figure 65:
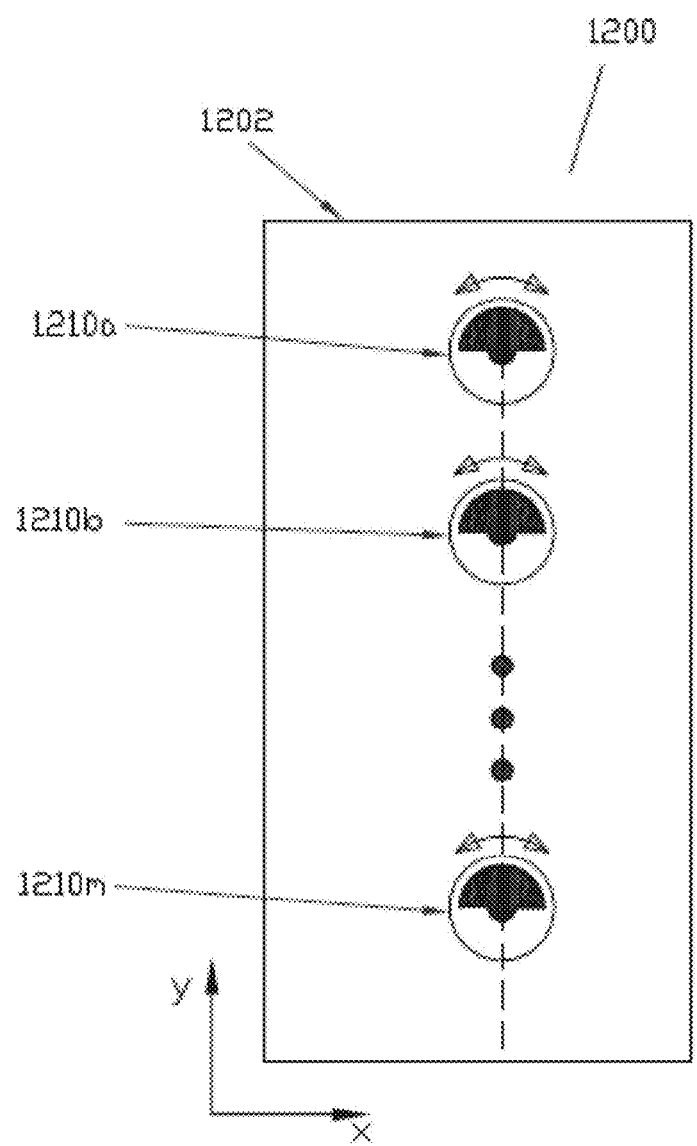
FIG. 65 illustrates a vibration device using an arbitrary number of ERMs according to aspects of the disclosure.

One method of generating vibration forces is with an ERM where an eccentric mass is attached to motor shaft. As the motor rotates, centrifugal forces are generated onto the motor. General Synchronized Vibration can be applied to multiple ERMs by controlling the frequency and phase of rotation of the eccentric masses. FIG. 65 shows one embodiment for a vibration device 1200 that uses an arbitrary number M ERMs; the first two being ERM 1210a, 1210b and the last being 1210m. All ERMs are attached to a mounting platform 1202 and the combined vibration force of the device is the vector sum from all ERMs.

For the ith ERM, Ai is the amplitude of the vibration force, $\omega i$ is the frequency of vibration, and $\phi i$ is the phase of vibration. The combined vibration force of the ERMs in FIG. 65 is given in the x and y coordinates by:

$$F_{Ex} = A_1 \cos(\omega_1 t + \phi_1) + A_2 \cos(\omega_2 t + \phi_2) + \ldots + A_M \cos(\omega_M t + \phi_M)$$

$$F_{Ey} = A_1 \sin(\omega_1 t + \phi_1) + A_2 \sin(\omega_2 t + \phi_2) + \ldots + A_M \sin(\omega_M t + \phi_M)$$

Figure 66:
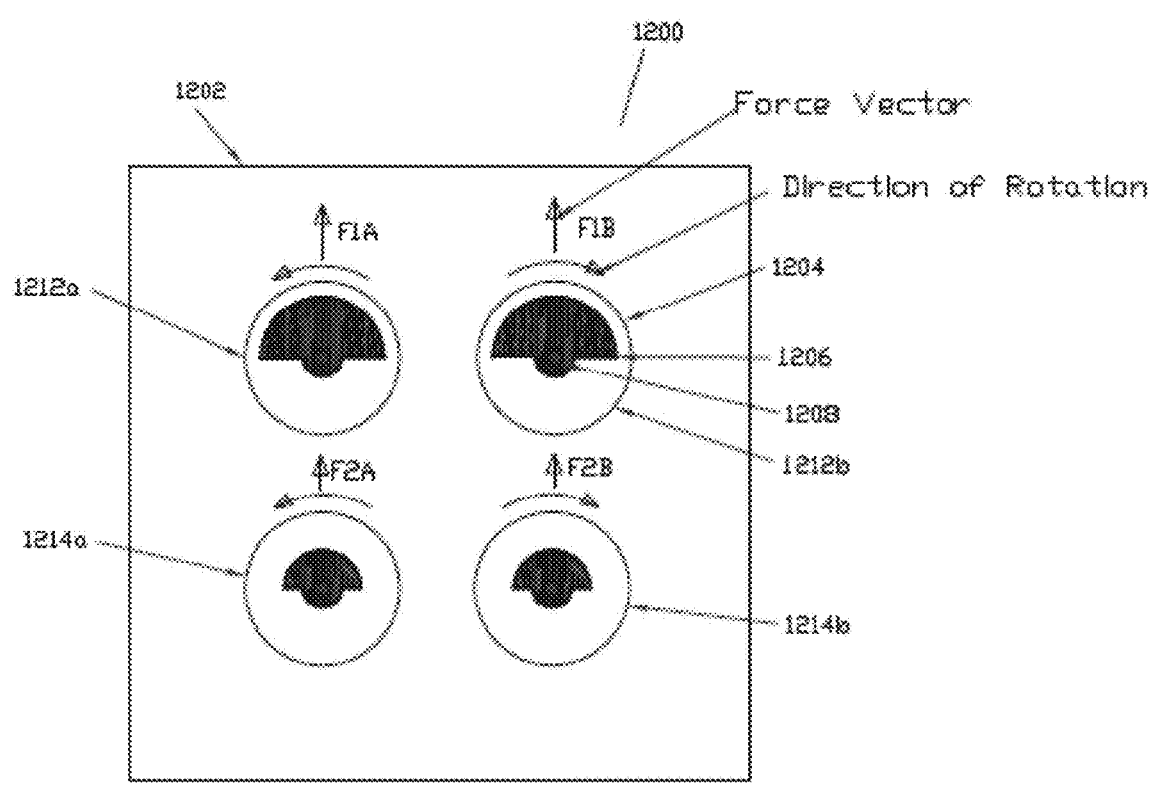
FIG. 66 illustrates a vibration device having 4 ERMs for use with aspects of the disclosure.

FIG. 66 shows one embodiment for a vibration device 1200 that uses four ERMs 1212a, 1212b, 1214a, and 1214b. All four ERMs are attached to a mounting platform 1202 and the combined vibration force of the device is the vector sum from all four ERMs.

The force and torque imparted by an ERM onto a mounting platform are due to a combination of the centrifugal force from the rotating eccentric mass, the torque between the stator and rotor of the motor and other inertial forces such as gyroscopic effects. As the speed of the ERM increases the centrifugal force increases and typically becomes the dominant portion of the vibration force. Accordingly, once an ERM has sped up, the vibration force imparted by an ERM onto the mounting platform is close to the centrifugal force imparted by the rotating eccentric mass.

In one embodiment, the ERMs are configured in counter-rotating pairs, where each ERM in a pair has the same eccentric mass and operates at the same angular speed but the ERMs rotate in opposite directions from each other. FIG. 66 shows such an embodiment with a first counter-rotating pair consisting of ERM 1212a and ERM 1212b. The combined vibration force of just this first pair is given by:

$$F_{E1x} = A_1 \cos(\omega_1 t + \phi_1 + \sigma_1) + A_1 \cos(-\omega_1 t - \phi_1 + \sigma_1)$$

$$F_{E1y} = A_1 \sin(\omega_1 t + \phi_1 + \sigma_1) + A_1 \sin(-\omega_1 t - \phi_1 + \sigma_1)$$

The phase difference between ERM 1212a and ERM 1212b is represented by two variables, $\phi_1$ and $\sigma_1$, where $\phi_1$ represents a temporal phase and is half of the difference in overall phase and $\sigma_1$ represents a geometric angle and is half of the average of the overall phase difference. For an ERM the magnitude of the vibration force, A, is equal to $mr\omega^2$, where m is the mass, r is the radius of eccentricity, and $\omega$ is the velocity of angular rotation in radians per second. Through trigonometric identities, this combined vibration force vector of the first ERM pair can be represented by the equation below. In this configuration, the force from a single counter-rotating pair generates a sinusoidal vibration force aligned with an axis of force direction defined by the angle $\sigma_1$.

$$F_{E1} = 2A_1 \cos(\omega_1 t + \phi_1) \begin{bmatrix} \cos(\sigma_1) \\ \sin(\sigma_1) \end{bmatrix} \quad (42)$$

The embodiment in FIG. 66 has a second counter-rotating pair formed by ERM 1214a and ERM 1214b, with both ERMs having the same eccentric mass as each other and operating at the same angular speed as each other but in opposite directions. This second counter-rotating pair generates a combined vibration force of:

$$F_{E2x} = A_2\cos(\omega_2 t + \phi_2 + \sigma_2) + A_2\cos(-\omega_2 t - \phi_2 + \sigma_2)$$

$$F_{E2y} = A_2\sin(\omega_2 t + \phi_2 + \sigma_2) + A_2\sin(-\omega_2 t - \phi_2 + \sigma_2)$$

In one control method, $\sigma_1$ and $\sigma_2$ are set equal to the same value, $\sigma$, and therefore both ERM pairs generate a vibration along the same axis and the combined vibration force vibration force vector of all four ERMs is given by:

$$F_E = 2A_1\cos(\omega_1 t + \phi_1)\begin{bmatrix}\cos(\sigma)\\\sin(\sigma)\end{bmatrix} + 2A_2\cos(\omega_2 t + \phi_2)\begin{bmatrix}\cos(\sigma)\\\sin(\sigma)\end{bmatrix} \quad (43)$$

In another control method, $\sigma_2$ is set equal to $\pi+\sigma_1$ and therefore both ERM pairs generate a vibration along the same axis but the contribution from the second ERM pair has a negative sign. With this method the combined vibration force vibration force vector of all four ERMs is given by:

$$F_E = 2A_1\cos(\omega_1 t + \phi_1)\begin{bmatrix}\cos(\sigma)\\\sin(\sigma)\end{bmatrix} - 2A_2\cos(\omega_2 t + \phi_2)\begin{bmatrix}\cos(\sigma)\\\sin(\sigma)\end{bmatrix} \quad (44)$$

There are similarities between the application of General Synchronized Vibration to Linear Force Actuators and ERMs. In both cases, the combined vibration force can be composed of a superposition of sine waves, and in both cases it is possible to implement asymmetric vibrations. One embodiment asymmetric vibration uses the relative magnitudes and phases for superposition of two sinusoidal waves. In this embodiment, the amplitude of the fundamental frequency is twice that of the second harmonic. For the embodiment shown in FIG. 66, a configuration for high asymmetry is shown in Table II below. The Geometric Angle, a, can be selected arbitrarily based upon the desired direction of vibration. The eccentricity of the second ERM pair is represented relative to the eccentricity of the first ERM pair. The speed of rotation of the second ERM pair is twice the speed of rotation of the first ERM pair. It should be noted that high levels of asymmetry may be achieved even if the values specified in Table II are only approximately implemented. For example, in the case of superposition of two sine waves, if there is a 30% error in the amplitude of vibration, then 90% of desired asymmetry effect may still be realized.

TABLE II

| ERM | Centrifugal Force Magnitude | Eccentricity | Geometric Angle, σ (radians) | Frequency of Rotation (radians/sec) | Temporal Phase, φ (radians) |
|---|---|---|---|---|---|
| 1212a | $A_1$ | $m_1 r_1$ | σ | $\omega_1$ | 0 |
| 1212b | $A_1$ | $m_1 r_1$ | σ | $\omega_1$ | 0 |
| 1214a | $(1/2)A_1$ | $(1/8)\,m_1 r_1$ | σ | $2\omega_1$ | 0 (or π) |
| 1214b | $(1/2)A_1$ | $(1/8)\,m_1 r_1$ | σ | $-2\omega_1$ | 0 (or π) |

Figure 67:
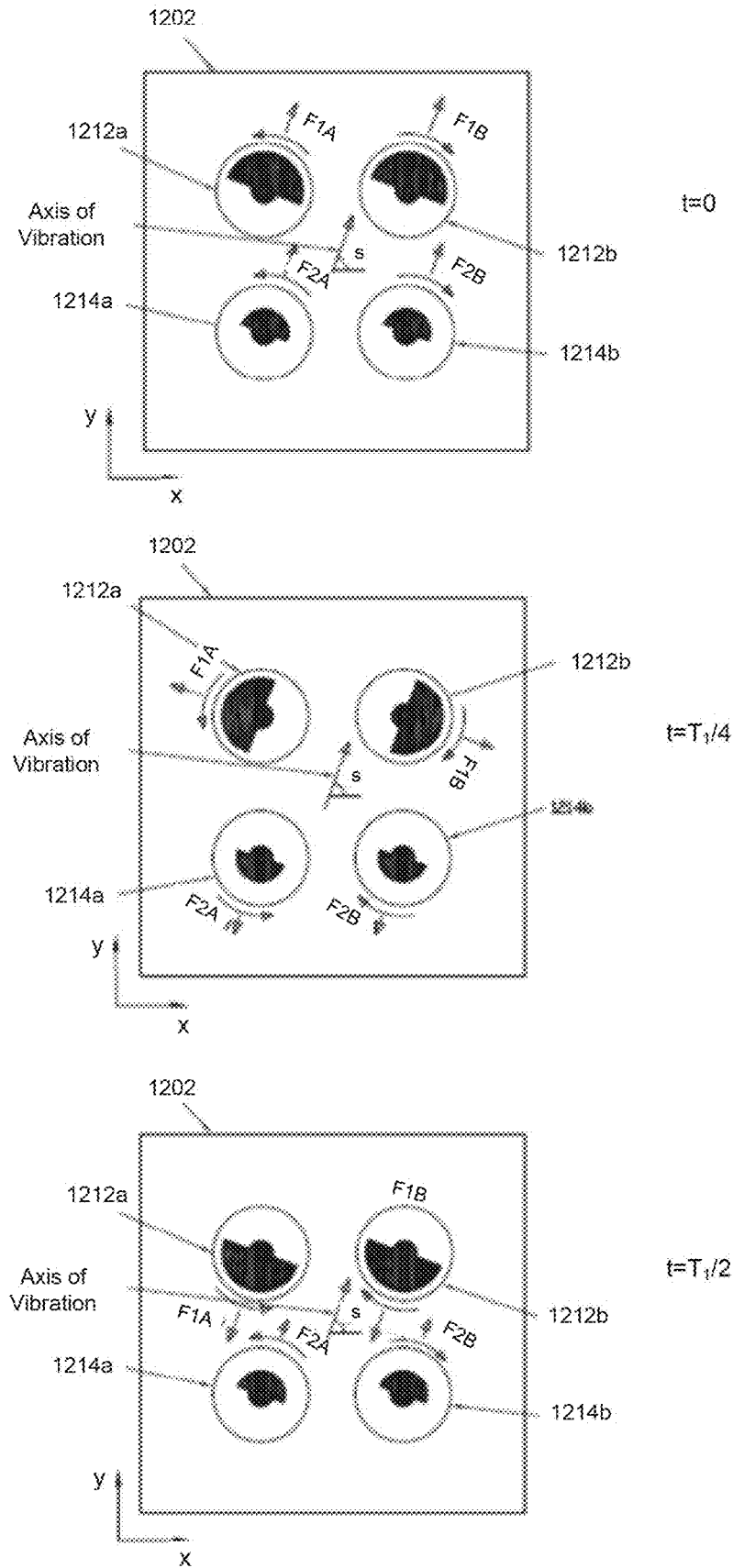
FIG. 67 illustrates time steps within a vibration cycle of ERMs generating an asymmetric waveform according to aspects of the disclosure.

Steps of General Synchronized Vibration are shown in FIG. 67 for the case of a configuration shown in Table II. The time, t, is represented in terms of the period of the fundamental frequency, where $T_1=2\pi/\omega_1$. As seen in the uppermost illustration of FIG. 67, at time t=0, the forces of all ERMs are aligned with the axis of vibration in the positive direction, and the position of the eccentric masses are all aligned in the same orientation. Accordingly, at t=0 the combined vibration force has a large magnitude. At $t=T_1/4$ as shown in the center illustration, the combined force vector is in the negative direction along the axis of vibration, yet the negative magnitude is not at a peak value since contribution only occurs from ERM 1214a and ERM 1214b, while the forces from ERM 1212a and ERM 1212b cancel each other out. At $t=T_1/2$, as shown in the bottom illustration, the combined force vector is also in the negative direction along the axis of vibration, yet the negative magnitude is not at a peak value since there is negative interference between the first ERM pair (ERM 1212a and 1212b) and the second ERM pair (ERM 1214a and 1214b). At $t=T_1/2$ the forces of the first ERM pair are in the opposite direction of the forces from the second ERM pair, and the orientation of the eccentric masses of the first ERM pair is 180 degrees opposite the orientation of the eccentric masses of the second ERM pair. Accordingly, asymmetric vibration is generated with a larger peak force occurring along the positive direction aligned with the axis of vibration. As shown in Table II the temporal phase of ERMs 1214a and 1214b can also be set to n, in which case asymmetric vibration will occur with a larger peak force along the negative direction aligned with the axis of vibration.

Figure 68:
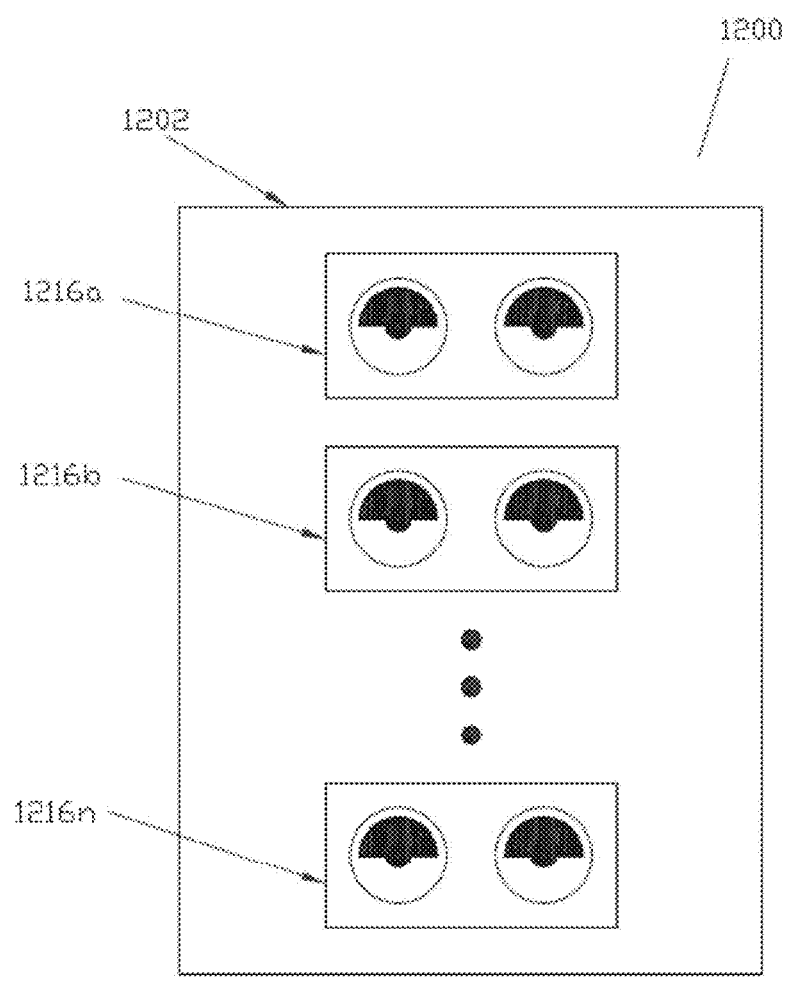
FIG. 68 illustrates an example vibration device with a plurality of ERM pairs.

Embodiments are possible with a plurality of ERM pairs, as shown in FIG. 68 which has N ERM pairs; the first two pairs being 1216a and 1216b, and the last pair 1216n. In one control method the first ERM pair 1216a is rotated at a fundamental frequency, the second ERM pair 1216b is rotated at twice the fundamental frequency, and so on through all N pairs with the Nth pair 1216n rotating at N times the fundamental frequency. Using Fourier synthesis it is possible to approximate a wide range of waveforms.

In the embodiment shown in FIG. 68, each ERM within a pair can have the same eccentricity, and each pair can be controlled so that one ERM in the pair rotates in the opposite direction of the other ERM with the same rotational speed. Asymmetric vibrations can be generated that have a higher peak force in a direction relative to the peak force in the opposite direction. High amounts of asymmetry can be generated using the process discussed above with regard to FIG. 52 (and Table I), which specifies magnitudes and phases for each harmonic sine wave. The magnitude of vibration of an ERM is the product of the eccentricity, mr, and the angular velocity, ω, squared, thus the magnitude of vibration of an ERM is equal to $mr\omega^2$. Accordingly, the eccentricity of the ith ERM as a function of the relative sine wave amplitude is given by:

$$m_n r_n = (A_n/A_1) m_1 r_1 / n^2 \quad (45)$$

The phases may be represented relative to the starting time of a specific waveform of pulse-trains being approximated. In some implementations it is more convenient to set the phase of the first harmonic to zero and represent the phases of the other harmonics relative to the first harmonic. An equation that converts the phase of the nth harmonic, (n, to a phase of the nth harmonic relative to the first harmonic, is given by:

$$\phi_{rn} = \phi_n - (\omega_n/\omega_1)\phi_1 \quad (46)$$

In addition, the phases may be defined relative a series of sine waves, while the ERM vibration equation Eq. 42 is specified in terms of a cosine wave. A cosine wave is a sinusoidal wave, but the phase is shifted by 90 degrees from a sine wave. Table I shows parameters for embodiments that superimpose 2, 3, and 4 sine waves. These parameters can be converted to relevant parameters for embodiments with 2, 3, and 4 ERM pairs, using Eq. 45 and Eq. 46 along with the 90-degree shift for the cosine representation. Table III, provided below, shows these parameters for ERM pairs which generate high levels of asymmetry. The method described in FIG. 52 can be used to specify parameters for any number of ERM pairs.

TABLE III

| Number of ERM Pairs | 2 | 3 | 4 |
|---|---|---|---|
| Pair 1 Amplitude: A1 | 1 | 1 | 1 |
| Pair 1 Eccentricity | $m_1r_1$ | $m_1r_1$ | $m_1r_1$ |
| Pair 1 Relative Phase $\phi_{r\text{-}1}$ (degrees) | 0 | 0 | 0 |
| Pair 2 Amplitude: A2 | 0.5 | 0.71 | 0.81 |
| Pair 2 Eccentricity | 0.125 $m_1r_1$ | 0.1775 $m_1r_1$ | 0.2025 $m_1r_1$ |
| Pair 2 Relative Phase $\phi_{r\text{-}2}$ (degrees) | 180 | 180 | 180 |
| Pair 3 Amplitude: A3 | | 0.33 | 0.54 |
| Pair 3 Eccentricity | | 0.0367 $m_1r_1$ | 0.060 $m_1r_1$ |
| Pair 3 Relative Phase $\phi_{r\text{-}3}$ (degrees) | | 270 | 270 |
| Pair 4 Amplitude: A4 | | | 0.25 |
| Pair 4 Eccentricity | | | 0.0156 $m_1r_1$ |
| Pair 4 Relative Phase $\phi_{r\text{-}4}$ (degrees) | | | 0 |

Implementing General Synchronized Vibration with ERMs has an advantage that a wide range of vibration frequencies can be generated without being restricted to a specific resonance range. As the ERM frequency increases the centrifugal forces increase, the ratio of waveform amplitudes of $A_1$ and $A_n$ remains constant. Accordingly, high levels of asymmetric vibrations can be generated with a single ratio of eccentricity, as shown in Table II and Table III, over an arbitrary frequency.

An embodiment with four ERMs is shown in FIG. 69. ERMs 1222a, 1222b, 1224a and 1224b are stacked vertically inside a tube 1220, which serves as the mounting platform 1202. This embodiment could be used as a user input device which is grasped by the hand, similar to how the PlayStation® Move motion controller is grasped. Configurations with stacked ERMs are convenient for a wide range of hand held devices and to apply vibration forces to a wide range of body parts.

Figure 70:
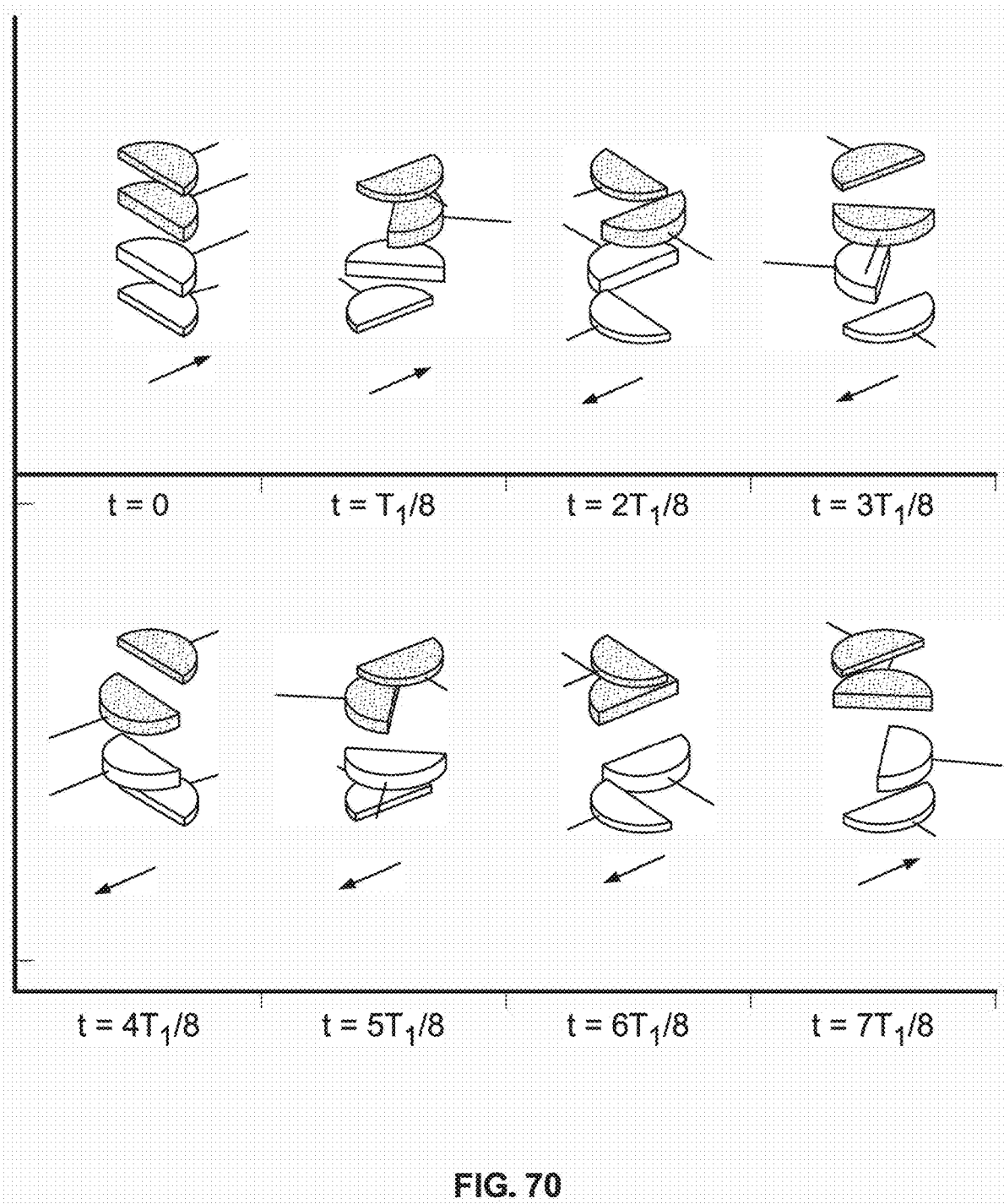
FIG. 70 illustrates time steps of an asymmetric waveform for a vibration device with four ERMs that are vertically stacked, according to aspects of the disclosure.

Steps of General Synchronized Vibration are shown in FIG. 70 for the case of a configuration shown in FIG. 69. The parts shown in FIG. 69 are the same parts as shown in FIG. 70, but part numbers are not called out in FIG. 70. Each frame of FIG. 70 shows the eccentric masses of the ERMs and a line extending from each mass indicates the centrifugal force vector that the mass generates. The combined force vector of all ERMs is shown by the thicker line under the ERMs. In the embodiment shown in FIG. 70 the top two ERMs 1222a and 1224b are rotating clockwise from the top view perspective, and the bottom two ERMs 1222a and 1224b are rotating counter-clockwise. Furthermore the top 1224b and bottom 1224a ERMs have lower eccentric masses and are rotating at twice the frequency of the middle two ERMs 1222a and 1222b.

Other embodiments are possible with different frequency and mass relationships. The time, t, is represented in terms of the period of the fundamental frequency, where $T1=2\pi/\omega1$. As seen in FIG. 70, at time t=0, the forces of all ERMs are aligned with the axis of vibration in the positive direction, and the position of the eccentric masses are all aligned in the same orientation. Accordingly, at t=0 the combined vibration force has a large magnitude. At t=2T1/8 the combined force vector is in the negative direction along the axis of vibration, yet the negative magnitude is not at a peak value since contribution only occurs from ERM 1224a and ERM 1224b, while the forces from ERM 1222a and ERM 1222b cancel each other out. At t=4T1/8 the combined force vector is also in the negative direction along the axis of vibration, yet the negative magnitude is not at a peak value since there is negative interference between the first ERM pair (ERM 1222a and 1222b) and the second ERM pair (ERM 1224a and 1224b). At t=4T1/8 the forces of the first ERM pair are in the opposite direction of the forces from the second ERM pair, and the orientation of the eccentric masses of the first ERM pair is 180 degrees opposite the orientation of the eccentric masses of the second ERM pair. The magnitude of the combined vibration force is shown by the line beneath the eccentric masses at each point in time.

Figure 71:
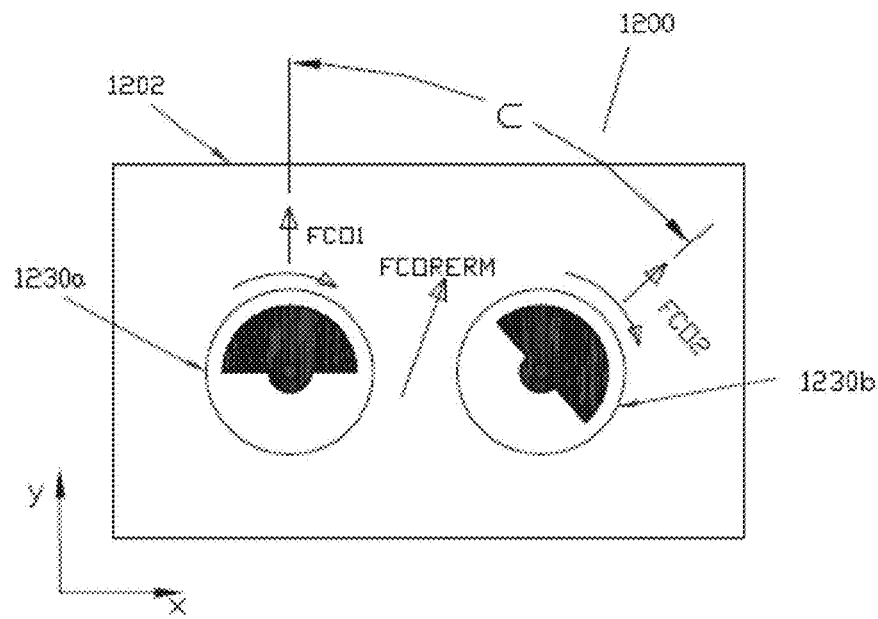
FIG. 71 illustrates a vibration device with two ERMs that rotate in the same direction.

Another vibration device is shown in FIG. 71, in which the device contains two ERMs 1230a and 1230b attached to a mounting platform 1202 that are rotating in the same direction. When the rotational speed and eccentricity of both ERMs are the same, this configuration is referred to as a Co-Rotating Pair, or "CORERM Pair". The center between the ERM eccentric masses is referred to as the center of the COREMR Pair. When the angle between the two ERMs is kept at a fixed value of angle, c, the CORERM Pair generates a combined centrifugal force that is equivalent to a single ERM. However, the magnitude of centrifugal force of the CORERM Pair is a function of the angle c. When c is equal to zero the combined force magnitude is twice that of a single ERM and when c is equal to 180 degrees then the centrifugal force magnitude is equal to zero since there is no overall eccentricity. Accordingly, when c is close to 180 degrees, the centrifugal force may not be the dominant force output of the CORERM Pair. Instead, gyroscopic or torque effects may take on a larger proportion of the force and torques applied onto the Vibration Device. Where A is the magnitude of force from just one of the ERMs in the pair, ω is the rotational speed, and φ is the phase of rotation, then the combined vibration force generated by a CORERM Pair is given by:

$$F_{CORERM} = 2A\cos(e)\begin{bmatrix}\cos(\omega t + \varphi) \\ \sin(\omega t + \varphi)\end{bmatrix} \quad (47)$$

A single vibration device could operate similar to ERMs as either counter-rotating pairs or co-rating pairs. There are a number of advantages of operating a vibration device in a mode where some of the ERMs function as CORERMs. One advantage is that the magnitude of vibration can be increased by using a CORERM pair. Another advantage is that legacy vibration effects can be generated that simulate a single ERM rotating. For example, a haptic interface could be operated at one time to generate asymmetric vibration forces and at another time to simulate a single ERM. If users are accustomed to haptic signals from a single ERM, the CORERM pair allows for such familiar effects to be generated.

A large number of co-rotating ERMs could by synchronized together in with no phase offset such that their force magnitudes combine to create a vibration effect similar to a single large ERM. If all the co-rotating ERMs are CORERM pairs with co-located centers, then the center for the combined force would be the same as for a single large ERM.

Figure 72:
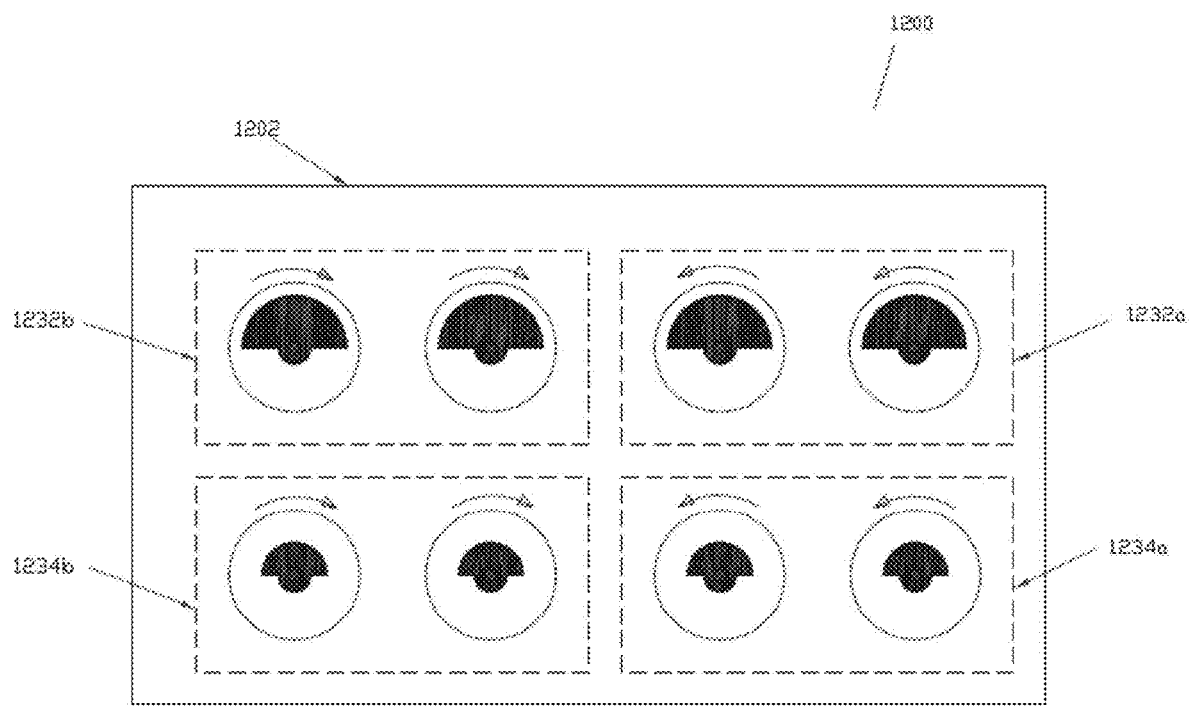
FIG. 72 illustrates a vibration device with four co-rotating pairs of ERMs according to aspects of the disclosure.

Another advantage of using CORERM pairs is that they allow for Fourier syntheses of a wider range waveforms. One such embodiment is to replace each ERM in FIG. 66 with a CORERM pair, which is shown in FIG. 72. ERM 1212a, 1212b, 1214a, and 1214b in FIG. 66 correspond to CORERM 1232a, 1232b, 1234a, and 1234b in FIG. 72. Such an embodiment would be similar to the original configuration of FIG. 66, but where the magnitude of centrifugal force from each ERM could be adjusted independently of the speed of rotation (by adjusting the angle c within CORERM pairs). Fourier synthesis allows arbitrary waveforms to be approximated with a superposition of sine waves where the amplitude, phase, and frequency of the sine waves can be adjusted. With a sufficiently large number of CORERM pairs, any waveform with a zero-DC offset could be approximated. The embodiment in FIG. 72 also allows the direction of vibration to be controlled.

Control of amplitude of vibration force can be especially useful in asymmetric vibrations used for haptic applications. A vibration device can be grasped by one hand, two hands, held with other body parts, attached to any body part, or placed in contact with any body part. Generally at least two sides of a haptic vibration device are in contact with a user, and each side contacts the user at somewhat different locations on their body. These different locations could be the different sides of a grip of a tube vibration device, such as shown in FIG. 69.

Human perception often requires that a threshold be exceeded before a sensory event is perceived. In one embodiment, the magnitude of an asymmetric waveform is adjusted so that on one side of a Vibration Device low vibration forces are generated that are below a threshold of perception and on the opposite side higher peak forces are generated that are above a threshold of perception. In this manner, a vibration force may be perceived on mostly one location that is in contact with the vibration device, even though the vibration device is in contact with a number of locations on the body. As the direction of vibration is varies, the location on the body at which vibration is perceived may also vary. This approach uses vibration to generate effects that are vary significantly according to the direction of vibration, and thus are useful for indicating directional cues.

Figure 73A:
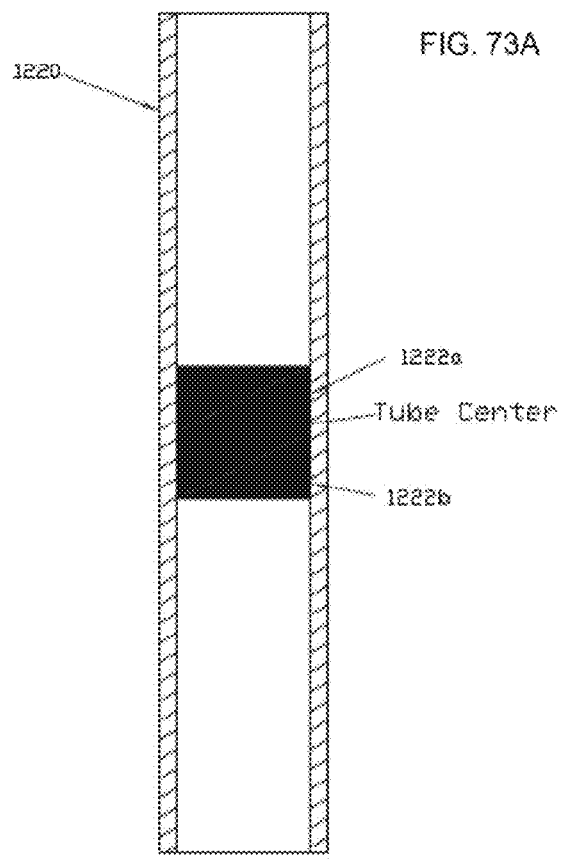
FIGS. 73A-B illustrate vibration devices with two ERMs mounted in different arrangements according to aspects of the disclosure.
Figure 73B:
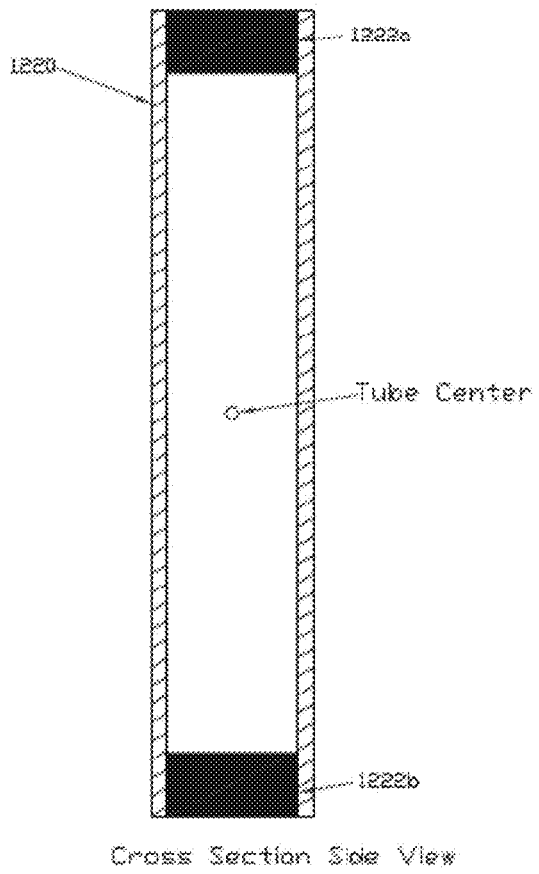

An embodiment with 2 ERMs in a tube is shown in FIG. 73. In FIG. 73A the ERMs 1222a and 1222b are mounted close to the center of the tube 1220 and thereby reduce the torque vibration that is due to the distance between the ERMs. One way of controlling this configuration is to operate the ERMs in a counter-rotating mode and generate force in a specified direction, with only a small torque vibration so as to minimize distraction from the force effect. In FIG. 73B the ERMs 1222a and 1222b are mounted close to the ends of the tube 1220 and thereby increase the torque vibration that is due to the distance between the ERMs. One way of controlling this configuration is to operate the ERMs in a counter-rotating mode and generate force in a specified direction, while simultaneously generating a large torque vibration effect.

The embodiment in FIG. 69 can also be operated with CORERM pairs. ERMs 1224a and 1224b can form one pair, and ERMs 1222a and 1222b can form another pair. When both of these CORERM pairs are rotating in the same direction and have a 180 degree phase difference, there will be no net force or net torque on the vibration device. However, this embodiment will create a gyroscopic effect with minimal force or torque vibrations. This implementation could be used to generate the sensation of moving a sword or a heavy mass in a video game or other type of simulation.

The forces between an ERM and a mounting platform include both centrifugal forces and the motor torque generated between the motor stator and rotor. When an ERM is rotating at operating speed, the centrifugal forces are typically large and dominate the effect from the motor torque. However, some embodiments can bring effects from the motor torque to the forefront. When two ERMs with parallel axes are operated as a co-rotating pair with a phase offset of 180 degrees, the two eccentric masses balance each other out and the centrifugal forces cancel each other out. In this embodiment, the torque about the axes of rotation can be felt more prominently. The torque about the axis of rotation is felt during the acceleration and deceleration of the rotating masses. Higher torques can often be generated by periodically reversing the applied voltage to the motor, since the electromagnetic force (back EMF) in the motor can add to the reverse voltage being applied.

Figure 74:
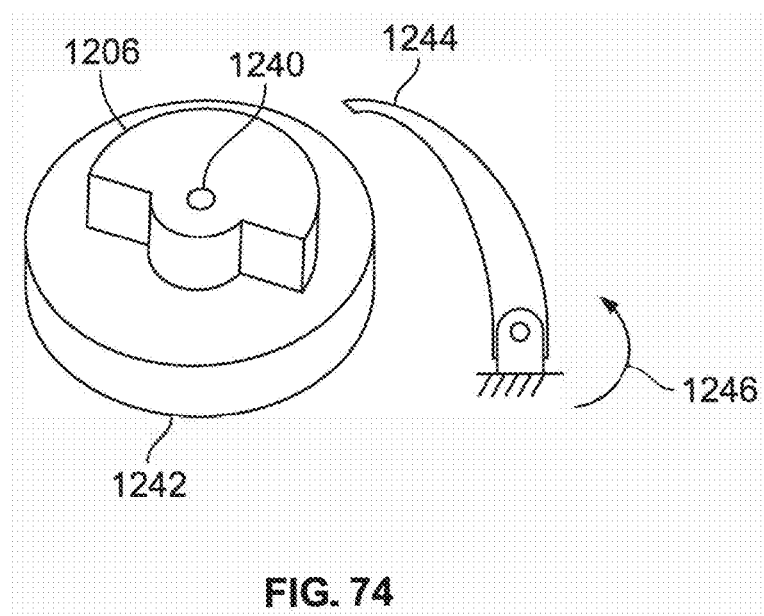
FIG. 74 illustrates an eccentric mass configured for use as a reaction wheel according to aspects of the disclosure.

Even higher torques about the axis of rotation can be generated by using a brake to cause a sudden deceleration to a rotating mass. This approach is known as a reaction-wheel method for generating torques, and is useful when there is no grounded actuator to apply a torque effect. FIG. 74 shows an eccentric mass 1206 configured for use as a reaction wheel. A rim 1242 is attached to the eccentric mass 1206, and creates a surface for a brake 1244 to contact. When the brake 1244 is actuated a relatively high torque can be generated. The reaction-wheel configuration is another example of the wide range of effects that General Synchronized Vibration can generate. A single vibration device can have ERMs that are operated in counter-rotating modes, co-rotating modes, and as reaction-wheels.

Figure 75:
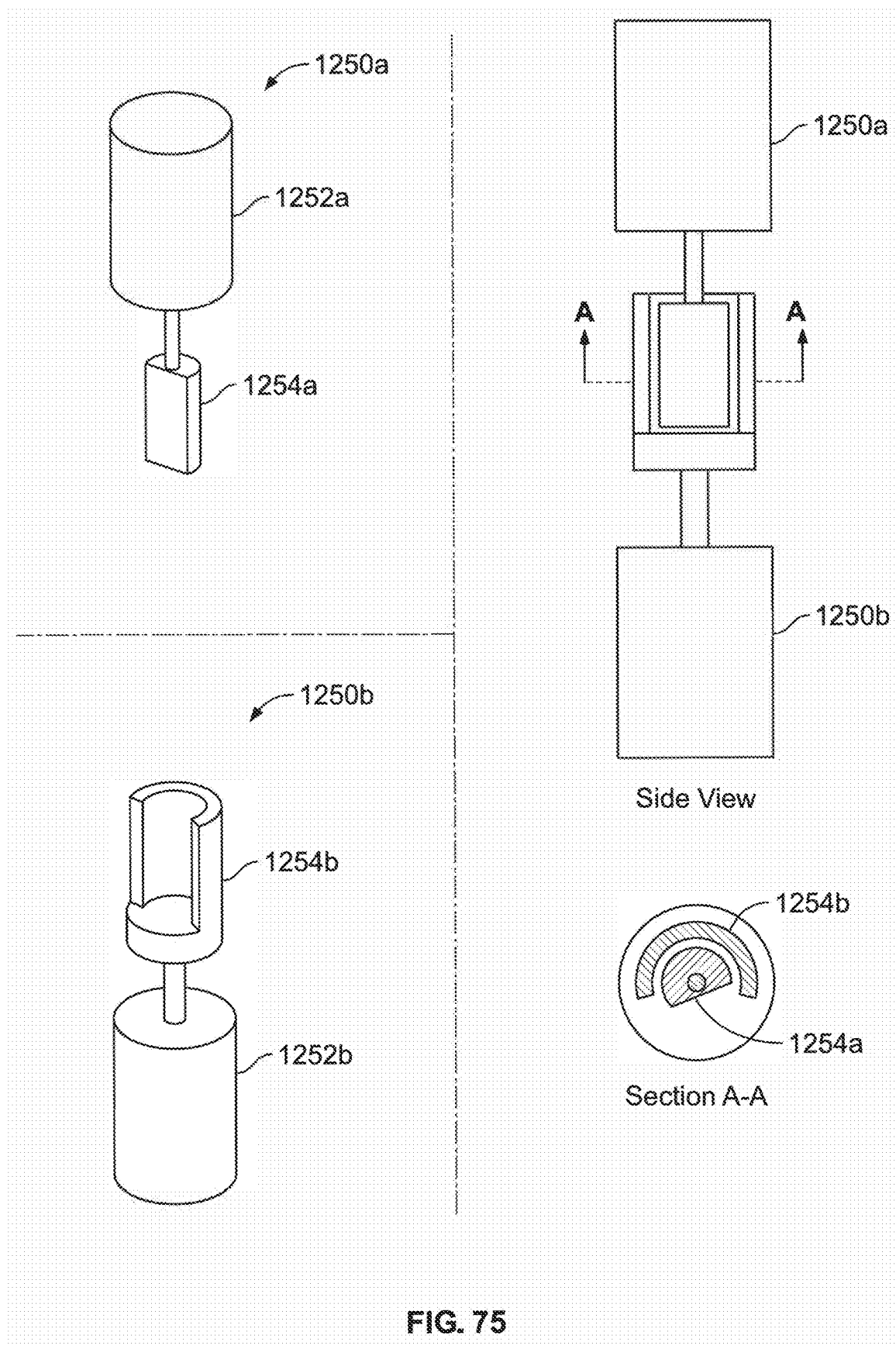
FIG. 75 illustrates an ERM pair with interleaved masses according to aspects of the disclosure.

One embodiment of an ERM Pair uses interleaved masses, an example of which is shown in FIG. 75. In this embodiment, the shapes of the eccentric masses are implemented so that the masses can be interleaved within one another yet still rotate independently. With interleaved masses, both ERMs can share the same axis of rotation. In addition, a mass distribution can be implemented such that the eccentric forces share the same plane (which can be indicated by the height in the side view in FIG. 75). Each ERM in the pair has a rotating mass that includes both an eccentric component, and a symmetric component such as the motor's rotor. The center of mass of the eccentric mass refers to the center of mass of only the eccentric component of the rotating mass. The center of mass of the eccentric mass rotates about the axis of rotation of the ERM, yet its position can be projected (in a linear algebra sense) onto a single point on the axis of rotation. With interleaved masses the geometry and density of the eccentric masses can be selected such that the center of mass of the eccentric masses from both ERMs are projected onto the same position on the axis of rotation. In this configuration the eccentric forces from both ERMs share the same plane. In FIG. 75, ERM1 1250a, contains a motor 1252a and an eccentric mass 1254a which is shaped with a semi-circle cross section, and ERM2 1250b, contains a motor 1252b and an eccentric mass 1254b which is shaped with an arc cross-section. Other shapes of eccentric masses are possible that allow for independent rotation of two masses.

In an embodiment with interleaved masses, the ERM pair can generate centrifugal forces without generating a torque due to the distance between the ERMs. Interleaved ERM pairs are useful for generating pure force vibrations without torque vibrations. Interleaved ERM pairs can be operated as a co-rotating pair, and thereby vary the amplitude of vibration independently from the frequency of vibration. A co-rotating interleaved pair can switch between a 180 degree angle between the ERMs and a 0 degree angle to rapidly turn the vibration effect on or off. Since there are no torque effects, the complete vibration sensation will be turned off when the ERMs have a relative phase angle of 180 degrees. In addition, such a configuration can generate a gyroscopic effect without generating torque vibrations.

An interleaved ERM pair can also be operated as a counter-rotating pair, and thereby generate a vibration force along an axis. By controlling the phase of the interleaved ERMs, the direction of the vibration force can be controlled.

Figures 76A, 76B:
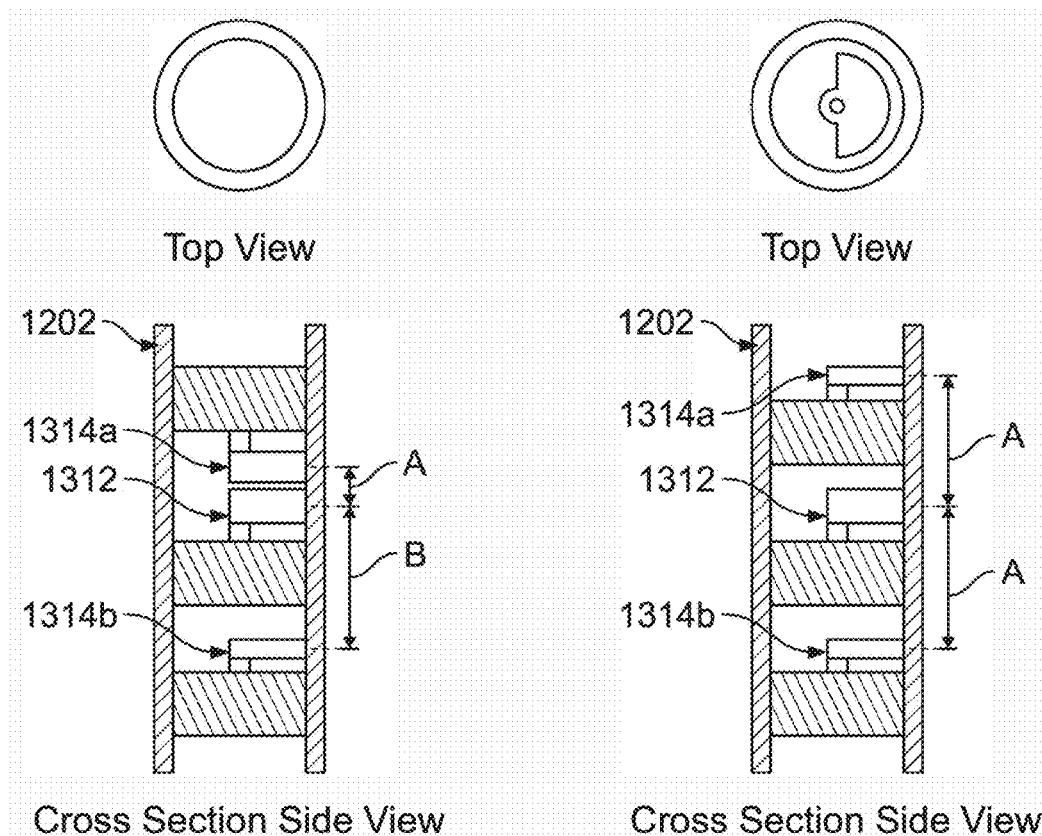
FIGS. 76A-B illustrate example configurations having three ERMs for use with aspects of the disclosure.

Embodiments with 3 ERMs are shown in FIGS. 76A-B. In FIG. 76A, a mounting platform 1202 shaped as a tube, holds a center ERM, 1312, an ERM 1314a is located above the Center ERM, and an ERM 1314b is located below the center ERM. All 3 ERMs are aligned such that their axis of rotation is collinear. In this figure, the dimension A is the distance along the axis of rotation between the projection of the center of the rotating eccentric mass of ERM 1312 onto the axis of rotation and the projection of the center of the rotating eccentric mass of 1314a onto the axis of rotation. In a similar fashion, ERM 1314b is located such that it is at a distance B along the axis of rotation between the projection of the center of its eccentric mass onto the axis of rotation and that of the projection of the center of the rotating eccentric mass of ERM 1312 onto the axis of rotation. Furthermore, the ERMs 1314a and 1314b can be synchronized to operate at the same frequency and same phase, which will generate a combined force centered along the axis of rotation.

When the distance A times the eccentricity of ERM 1314a is equal to the distance B times the eccentricity of ERM 1314b, then the combined vibration force from synchronized ERMs 1314a and 1314b is projected onto the axis of rotation at the same point along this axis that the center of the eccentric mass of ERM 1312 is projected onto. In this configuration the combined vibration force from all 3 ERMs share the same plane. With this configuration, a vibration force can be generated by all 3 ERMs without generating a torque. Accordingly, the embodiment with 3 ERMs in FIG. 76A can be operated in a mode where it is functionally similar to the embodiment with 2 ERMs shown in FIG. 75, but the embodiment in FIG. 76A uses standard shaped eccentric masses. The embodiment in FIG. 76A can be operated in a co-rotation mode, where all 3 ERMs rotate in the same direction and with the same frequency. ERMs 1314a and 1314b can be operated with the same phase, and this phase can be adjusted relative to the phase of the center ERM, 1312, which will modulate the amplitude of the vibration force.

If the eccentricity of ERM 1314a plus the eccentricity of ERM 1314b is equal to the eccentricity of ERM 1312, then complete cancellation of the vibration forces can occur when all 3 ERMs are rotating. This complete cancellation allows for rapid on and off control of vibration forces. The embodiment in FIG. 76A can also be operated in a counter-rotation mode, where the direction of rotation and phase of ERMs 1314a and 1314b are the same, yet the center ERM, 1312, is operated in the opposite direction. In the counter-rotating mode, vibration forces along an axis can be generated, and the direction of the vibration can be controlled by modulation the relative phase of the ERMs. The embodiment in FIG. 76A, also can be operated in a mode that is not similar to the interleaved embodiment in FIG. 75; here, the center ERM can be turned off and ERM 1314a can be operated out of phase with ERM 1314a to create a rocking torque in the device. In addition, each ERM in FIG. New_76A can be operated at a different frequency. ERMs with smaller eccentric masses often can be operated at higher top frequencies, and thereby the embodiment in FIG. 76A can create even a wider range of vibration effects.

Another embodiment with 3 ERMs is shown in FIG. 76B. A mounting platform 1202 shaped as a tube holds a center ERM, 1312, an ERM 1314a is located above the center ERM, and an ERM 1314b is located below the center ERM. All 3 ERMs are aligned such that their axis of rotation is collinear. In FIG. 76B, the dimension A is the distance along the axis of rotation between the center of the rotating eccentric mass of ERM 1312 and the center of the rotating eccentric mass of 1314a. ERM 1314b is located at the same distance A along the axis of rotation between its center of the rotating eccentric mass and that of the center of the rotating eccentric mass of ERM 1312.

When the eccentricity of ERMs 1314a and 1314b are half the eccentricity of the center ERM 1312, and the ERMs 1314a and 1314b are synchronized to operate at the same frequency and same phase, then complete cancellation of vibration forces and torques can occur at a phase offset of 180 degrees. Thus, the embodiment in FIG. 76B can have the same functional advantages as the embodiment in 76A. A further advantage of the embodiment of FIG. 76B is that two ERMs have identical specifications and thus can be more easily manufactured.

Figure 77:
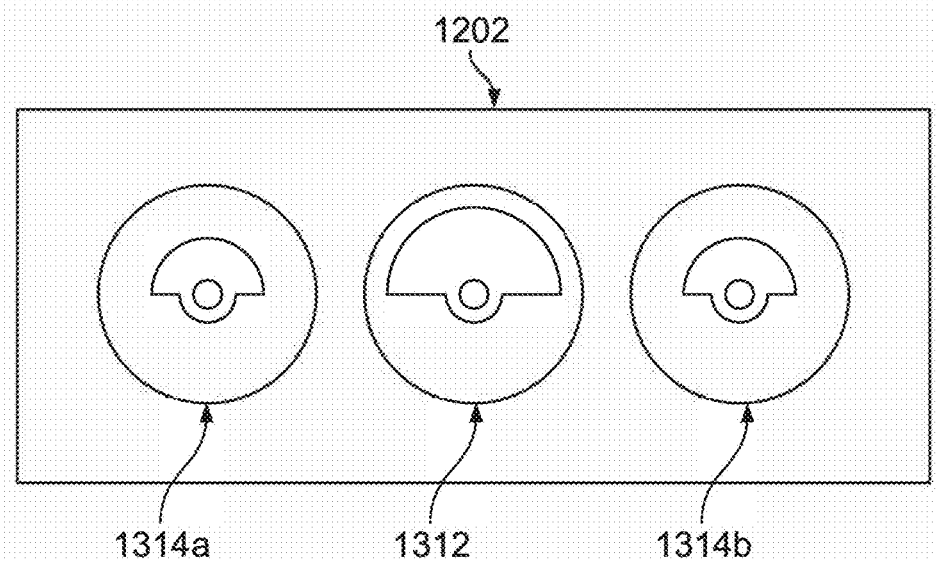
FIG. 77 illustrates another configuration with three ERMs arranged in a row.

An additional embodiment with 3 ERMs is shown in FIG. 77. A mounting platform 1202, holds a center ERM, 1312, an ERM 1314a is located to one side of the center ERM, and an ERM 1314b is located to the other side the Center ERM. All 3 ERMs are aligned such that their axes of rotation are parallel. When all 3 ERMs are rotating in the same direction, the embodiment in FIG. 77 can create similar vibration effects as the embodiments in FIGS. 76A-B; the frequency off all 3 ERMs can be the same, the phase of ERMs 1314a and 1314b can be the same, and the relative phase with the center ERM 1312 will determine the magnitude of the vibration force.

To provide complete cancellation of the vibration force, the eccentricity of the rotating mass of ERMs 1314a and 1314b can be selected to be half that of the center ERM 1312. Complete cancellation of vibration torques can occur in the co-rotating mode when the center ERM 1312, is located in the center between ERMs 1314a and 1314b. The embodiment in FIG. 77 can also be operated in a counter-rotating mode, where the ERMs 1314a and 1314b rotate in the same direction with the same phase, and the center ERM 1312 rotates in the opposite direction. This counter-rotating mode provides a vibration force along an axis, and the direction of the vibration force can be controlled by the phases of the ERMs. However, in the embodiment in FIG. 77, there will be a vibration torque during the counter-rotating mode since the axes of the ERMs are not collinear.

The embodiment in FIG. 77 can also be operated in a counter-rotating mode, where the ERMs 1314a and 1314b rotate in the same direction with the same phase, and the Center ERM 1312 rotates in the opposite direction. This counter-rotating mode provides a vibration force along an axis, and the direction of the vibration force can be controlled by the phases of the ERMs. However, in the embodiment in FIG. 77, there will be a vibration torque during the counter-rotating mode since the axes of the ERMs are not collinear.

Figure 78:
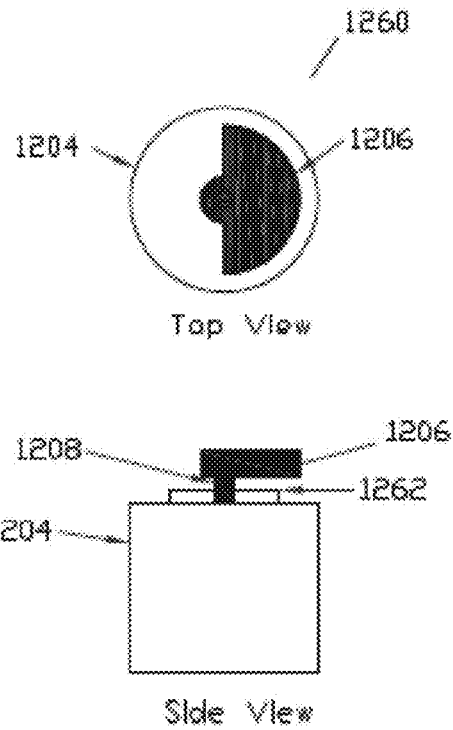
FIG. 78 illustrates an ERM with a sensor for use with aspects of the disclosure.

General Synchronized Vibration of ERMs requires control of both the frequency and phase of rotating eccentric masses. One method is to use a motor, such as a stepper motor, where the position and speed can be defined open-loop by specifying a desired series of steps. Another method is to use closed loop control with a sensor or sensors that measure frequency and phase. An ERM with a sensor 1260 is shown in FIG. 78. The sensor 1262 can be a continuous position sensor that measures the position of the eccentric mass at frequent intervals. Continuous sensors could be encoders, potentiometers, a Hall Effect sensor that detects a series of gear teeth or other feature of a rotating object, or other types of position sensors. The velocity of the eccentric mass could be calculated from the time interval between subsequent rotations, through taking the derivative of position measurements, or directly through use of a tachometer.

Another method to sense frequency and phase is to use a discrete sensor that detects when the motor shaft spins by a set position relative to the motor housing, or a number of set positions relative to the motor housing. Such discrete sensors can use reflective optical sensors that reflect off a rotating object coupled to the motor shaft, line-of-sight optical sensors that detect when a rotating object coupled to the motor shaft interrupts the line of site, Hall effect sensors that detect a discrete component that is coupled to the rotating shaft, or other method of discrete detection of the shaft position.

Figure 79:
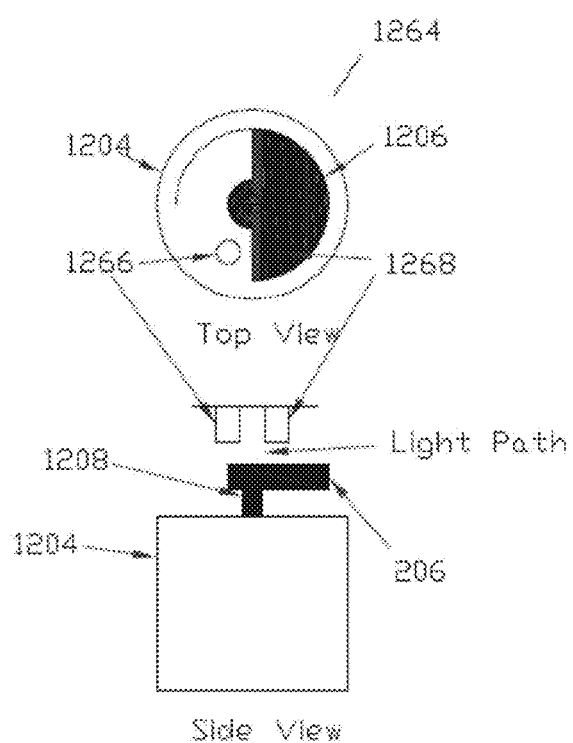
FIG. 79 illustrates an ERM with a reflective optical sensor for use with aspects of the disclosure.

FIG. 79 shows an ERM with a reflective optical sensor 1264 which detects light reflecting off an eccentric mass 1206. A light source 1268, such as an LED, is shining onto the pathway of the eccentric mass 1206. When the eccentric mass 1206 rotates by the sensor 1266, light reflects off the eccentric mass 1206 into the light sensor 1266. For each rotation of the eccentric mass 1206 the light sensor 1266 will detect when the eccentric mass 1206 comes into the range of the sensor 1266 and begins to reflect light, and when the eccentric mass 1206 leaves the range of the sensor 1266 and stops to reflect light. The velocity of the ERM 1264 can be determined between the intervals of each rotation, such as the time when the eccentric mass 1206 begins to reflect light. Alternatively the velocity of the ERM 1264 can be calculated by the duration of time that the eccentric mass 206 reflects light. The phase of the eccentric mass 1206 can be determined by the timing of a specific event such as the rising or falling edge of the light sensor 1266 which corresponds to the time when the eccentric mass 1206 begins and stops reflecting light.

Figure 80:
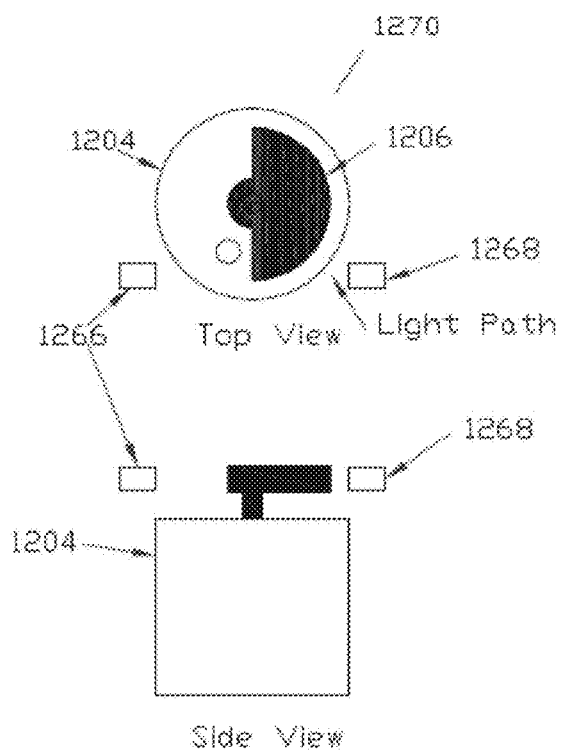
FIG. 80 illustrates an ERM with a line of sight sensor for use with aspects of the disclosure.
Figure 81:
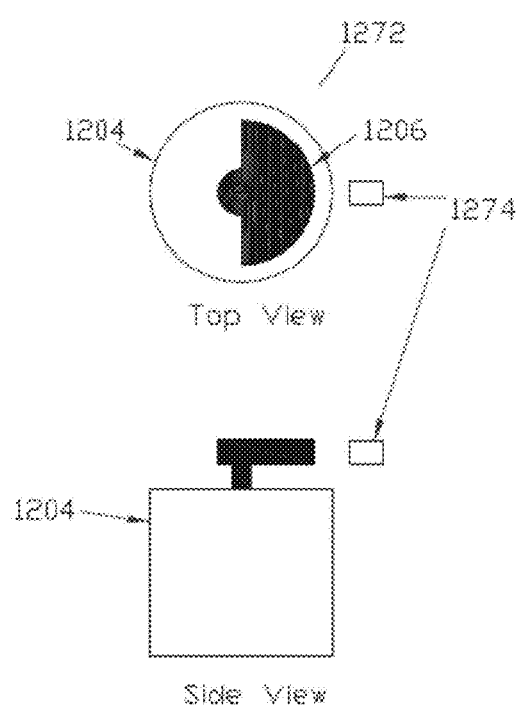
FIG. 81 illustrates an ERM with a Hall effect sensor for use with aspects of the disclosure.

FIG. 80 shows an ERM with a line-of-sight optical sensor 1270. The light sensor 1266 detects when the eccentric mass 1206 interrupts the light path. A light source 1268, such as an LED, is shining onto the pathway of the eccentric mass 1206. When the eccentric mass 1206 rotates through the light path, the sensor 1266 detects the interruption. FIG. 81 shows an ERM with a Hall Effect sensor 1272. The Hall Effect sensor 1274 is triggered when the eccentric mass 1206 rotates by.

Implementing General Synchronized Vibration with ERMs requires that the frequency and phase be controlled for each ERM that is used to synthesize the desired waveform. Both the frequency, $\omega$, and phase, $\phi$, can be controlled by controlling the position, $\theta$, of the rotating shaft of the ERM to be at a desired position as a function of time. Accordingly, control of frequency and phase can also be equivalent to control of the position of an eccentric mass to a desired position trajectory over time. Measurement of the shaft position can be performed continuously or at discrete instances such as when the shaft passes a certain position. Continuous measurements could be made with an encoder or other type of sensor that measures positions at frequency intervals. Discrete measurements could be made with an optical sensor that detects when the eccentric mass passes by. Discrete measurements could be made at a single position of motor rotation or at multiple positions. Discrete measurements can be augmented with a second sensor that also measures the direction of rotation. A direction sensor could be a second optical sensor mounted close to the first optical sensor. The direction of rotation can be determined by which optical sensor is triggered first.

A wide range of methods can be used for real-time control the position and speed of an ERM. One method is Proportional-Integral-Control. Another method includes time optimal control as described by "Optimal Control Theory: An Introduction", by Donald E. Kirk, Dover Publications 2004. One real-time control approach is presented below for controlling a set of synchronized ERMs. The approach is written for use with a discrete sensor, but can also be applied with a continuous sensor. When a continuous sensor is used, the dynamic performance of the system can be improved by more accurately updating the commands to the motor continuously.

An exemplary control approach for a system with M ERMs is now discussed. For each ERM for i=1 to M, define the desired frequency, $\omega_{des,i}$, and desired phase, $\phi_{des,i}$. The desired direction of rotation is defined as $dir_{des,i}=\text{sign}(\omega_{des,i})$. Initialize the following variables:

a. Time, t=0
b. Number of revolutions of each ERM, $nrev_i=0$ (for all i)

Next, start motors turning by providing an open-loop command, $V_{open\_loop,i}$, to each ERM corresponding to the desired frequency, $\omega_{des,i}$. The open-loop command can be determined by the motor's torque-speed curve and correspond to the voltage that will generate a terminal velocity as the desired value. An optional startup operation is to turn on the motors at a high or maximum voltage to reduce the startup time. Since sensors exist to detect speed of rotation, the voltage can be reduced to a desired level when the ERMs reach an appropriate speed. In this fashion the sensors used for synchronization can also be used to reduce the startup time of the overall vibration device. As each ERM passes its discrete sensor:

a. Measure the time and record: $t_{meas,i}=t$
b. Calculate the desired position at the measured time:

$$\theta_{des,i}=\theta_{des,i}t_{meas,i}+\phi_{des,i}$$

c. Calculate the measured position, $\theta_{meas,i}$, at the measured time:
Increment the number of revolutions: $nrev_i=nrev_i+1$ $$\theta_{meas,i}=2\pi dir_i nrev_i+\theta_{sensor\_offset,i}$$

$\theta_{sensor\_offset,i}$ is based upon the mounting location of the discrete sensor, and is often equal to zero.

$dir_i$ is the actual direction of the ERM rotation. Typically the ERM will be rotating in the direction of the initial open-loop command. However, it is also possible to use a second sensor input to measure the direction of rotation, or use the time history of the motor command to calculate the direction.

d. Calculate the error in position, $\theta_{error,i}$, for each ERM:

$$\theta_{error,i} = \theta_{des,i} - \theta_{meas,i}$$

A control law may be implemented to reduce the position error of each ERM. There are a wide range of control of control approaches in the field of control, including:

a. Proportional, Integral, Derivative ("PID") based upon the calculated error in position. The command to the motor would be:

$$V_{com,i} = K_{P,i}\theta_{error,i} + K_{I,i}\int \theta_{error,i}dt + K_{D,i}d\theta_{error,i}/dt$$

b. Use the open-loop command as a baseline command to the ERM, since it is based upon the motor's characteristics, and apply PID to correct for remaining errors. The command to the motor would be:

$$V_{com,i} = V_{open\_loop,i} + K_{P,i}\theta_{error,i} + K_{I,i}\int \theta_{error,i}dt + K_{D,i}d\theta_{error,i}/dt$$

The use of the open-loop command can reduce the need for a large integral control gain, and improve dynamic performance.

c. State-space control approach. The physical state of each ERM is a function of both its position and velocity. Each time an ERM passes its discrete sensor, the speed of revolution can be calculated from the time interval since the last sensor measurement. The state-space approach uses both the position and velocity to determine an appropriate control signal. For the durations where no sensor measurements are made, a state observer can be used to estimate the motor's position and speed, where the model of the state observer is based upon the physical properties of the motor and rotating mass.

d. Use bang-bang control, which operates the motor at maximum forward command and maximum reverse commands for specified durations of time. For example, if an ERM is operating at the correct speed but position has a phase lag, then the motor should be accelerated for a duration of time and then decelerated back to the original speed for a second duration of time. A physical model of the motor dynamics can be used to determine the appropriate durations of acceleration and deceleration.

With all control approaches a bidirectional or unidirectional motor driver could be used. An advantage of using bidirectional motor drivers is that high levels of deceleration can be applied to an ERM by applying a reverse voltage, even if the motor never changes direction of rotation. This approach can reduce the time it takes to synchronize the ERMs. Another advantage of using bidirectional motor drivers is that ERMs could be operated in both counter-rotating and co-rotating modes.

An alternative method of calculating the position error is discussed below. Where the desired force is represented by Aisin($\omega$it+$\phi$i) and the desired position is represented by $\theta_i(t)=\omega_i t+\phi_1$, start all ERMs at open loop voltages corresponding to $\omega$i. Let the motors spin up to speed when ERM 1 passes the sensor so that it starts in phase, then reset the timer so t=0. See Table IV below.

TABLE IV

| Control of ERM | | | | | | | |
|---|---|---|---|---|---|---|---|
| Time at which sensor is triggered | $\theta$ measured ($\theta_{meas}$) | $\theta$ desired ($\theta$ des) | $\Delta t$ | $\theta$ desired ($\theta_{des}$) | Change in $\theta$des ($\Delta\theta$des) | $\Delta\theta_{meas}$ | $\theta_{error}$ |
| $t_1$ | 0 | $\omega t_1 + \phi$ | | | | | $\theta_{des} - \theta_{meas}$ |
| $t_2$ | $2\pi$ | $\omega t_2 + \phi$ | $t_2 - t_1$ | $\omega\Delta t + \theta_{des\_prev}$ | | $2\pi$ | $\theta_{error} = \theta_{error\_prev} + \Delta\theta_{des} - \Delta\theta_{meas}$ |
| $t_3$ | $4\pi$ | $\omega t_2 + \phi$ | $t_3 - t_2$ | $\omega\Delta t + \theta_{des\_prev}$ | $\theta_{des} - \theta_{des\_prev}$ | $2\pi$ | |

In a digital system, ERM control may include the following. First, set rotation counts per revolution (e.g., 256 or 512). Correct for timer overflow so $\Delta t = t_i - t_{i-1}$ is always correct. Define $\omega$ in terms of rotation counts per timer counts. And use interrupts (or other operations) to avoid missing when an ERM passes by a sensor.

Some embodiments of Synchronized Vibration Devices can be controlled such that the combined force and torque sum to zero. In such an embodiment the force and torques from individual Vibration Actuators balance each other out to generate a net zero force and torque. An advantage of such an embodiment is that Vibration Actuators can be brought up to speed and put into a mode when no vibration effects are generated. When vibration effects are desired, they can be quickly implemented by modifying the phase of the vibration, without the lag for bringing the actuators up to speed. This embodiment is referred to as "Spinning Reserve", and is analogous to the same term used for kinetic energy in an electric utility power plant that is held in reserve to quickly provide power when needed. The spinning reserve approach allows vibration to be quickly turned on and off. Spinning Reserve embodiments can include ERM actuators that are spinning in such a manner that the combined forces and torque sum to zero. Spinning Reserve embodiments can also include LRA actuators and other resonant actuators that are vibrating in such a manner that the combined forces and torque sum to zero.

The spinning reserve approach has the advantage of fast on and off response times, but also can require increased power consumption since the vibration actuators are operated even when no overall vibration effects are generated. To reduce the added power consumption, the vibration actuators can be spun up to speed at the first indication that a need for vibration force is imminent. Such indications could be a keystroke, computer mouse motion, user touching a touchscreen, movement detection via a sensor of a game controller, beginning of a game portion where vibration effects are used, or any other event that would indicate that a desired vibration effect would be imminent. In a similar fashion power can be conserved by spinning down and stopping the actuators once the need for vibration is no longer imminent. Indications to spin down the actuators could include passage of a set amount of time where no user input is registered, transition to a new phase of a computer program where vibration effects are no longer needed, or other indication. During the spin up and spin down of the actuators, the actuators can by synchronized so that they operate in a spinning reserve mode and do not generate a combined vibration force. In this fashion, the user will not feel the spin up and spin down of the vibration actuators.

Figure 82:
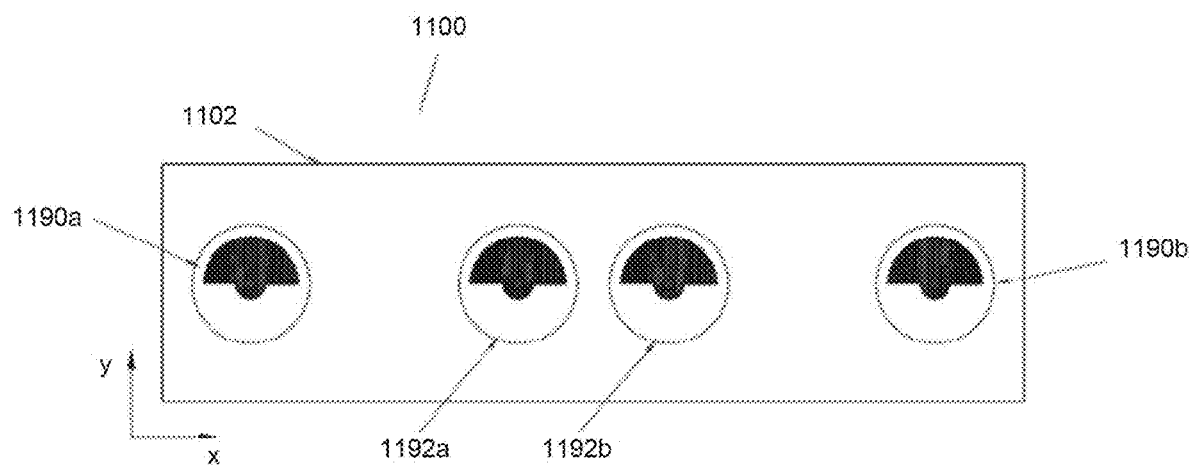
FIG. 82 illustrates a vibration device with four ERMs arranged in a row for use with aspects of the disclosure.

A spinning reserve embodiment with 4 ERMs is shown in FIG. 82. Synchronized Vibration can be applied to the embodiment shown in FIG. 82, where the combined forces and torque cancel each other out. In one such embodiment the eccentricity and rotational inertia of ERMs 1190a, 1190b, 1192a and 1192b are equal to each other. In one such control method all 4 ERMs rotate in the same direction. The frequency and phase could be as shown in Table V below. The synchronized phases within a set of ERMs, can be controlled relative to each other and not just relative to absolute time. Accordingly, the phases shown in Table V and other tables in this document only represent one set of phases in absolute time that achieve the described effect. Other phase combinations can achieve similar effects.

TABLE V

|  | ERM 1190a | ERM 1192a | ERM 1192b | ERM 1190b |
|---|---|---|---|---|
| Frequency | $\omega$ | $\omega$ | $\omega$ | $\omega$ |
| Phase | −90° | 90° | 90° | −90° |

Figure 83:
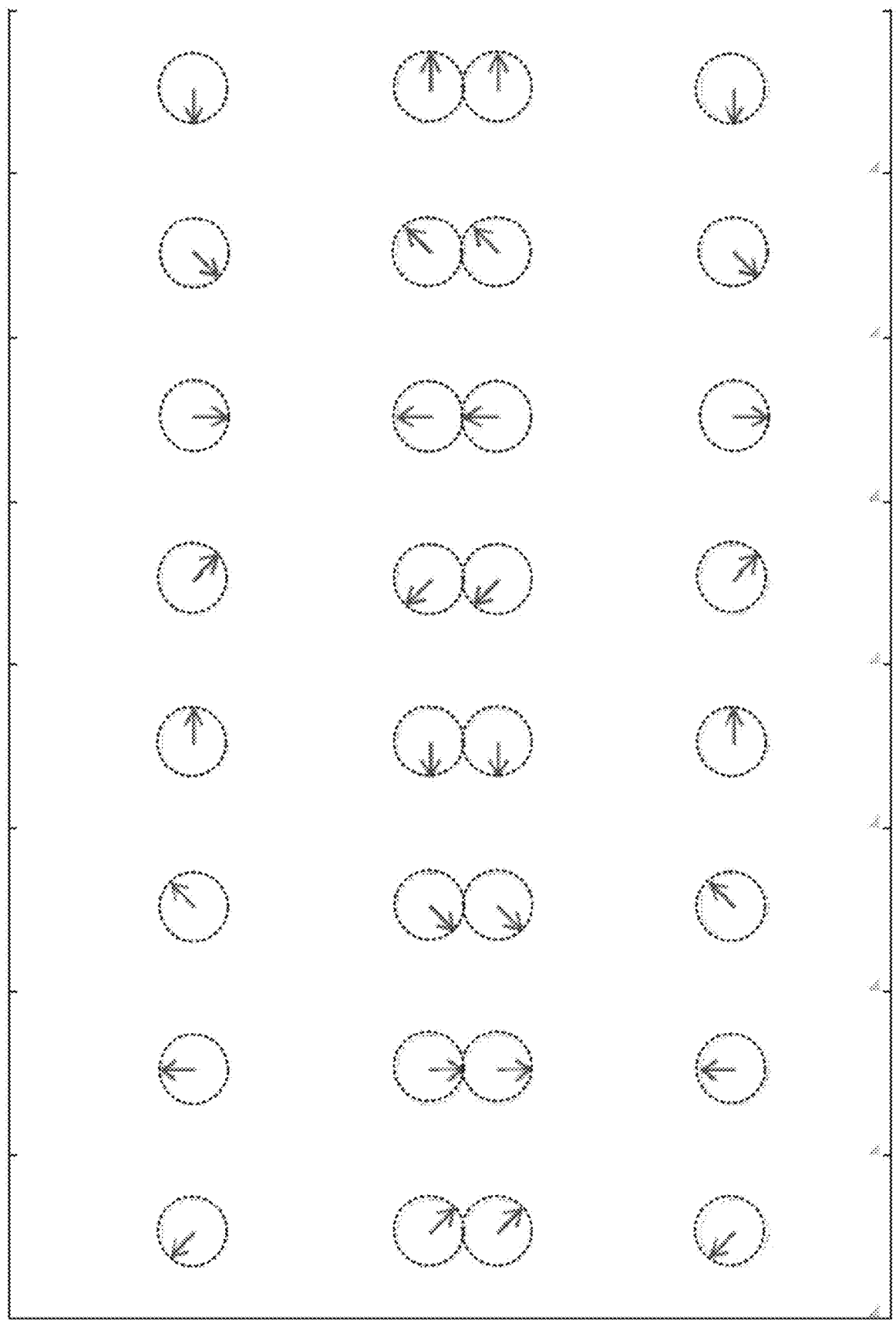
FIG. 83 illustrates time steps of a waveform with cancellation of forces according to aspects of the disclosure.

FIG. 83 shows the forces of the ERMs from Table V as the ERMs progress through time, wherein each row of images illustrates one time slice (8 slices in all). The parameters for frequency and phase shown in Table V correspond to the force vectors shown in FIG. 83. In a similar fashion other configurations and control methods of vibrations devices can also be simulated.

Another method of Synchronized Vibration can be applied to the embodiment shown in FIG. 82, where the combined forces and torque cancel each other out. In such a control method ERM 1190a rotates in the opposite direction of ERM 1190b, and ERM 1192a rotates in the opposite direction of ERM 1192b. The frequency and phase could be as shown in Table VI.

TABLE VI

|  | ERM 1190a | ERM 1192a | ERM 1192b | ERM 1190b |
|---|---|---|---|---|
| Frequency | $\omega$ | $\omega$ | −$\omega$ | −$\omega$ |
| Phase | −90° | 90° | 90° | −90° |

When ERMs are rotating they generate a gyroscopic effect due to the angular inertia of the motor rotor and rotating mass. When the angular velocity of the ERMs is large this gyroscopic effect can be used to generate a haptic sensation in response to changes in orientation of the vibration device. The implementation of spinning reserve as shown in Table V has a gyroscopic effect since all ERMs are rotating in the same direction and their angular inertia combined. The implementation of spinning reserve as shown in Table VI does not have a gyroscopic effect since half the ERMs are rotating in the opposite direction of the other half, and therefore angular inertias cancel each other out when rotational inertias are equal. The mode of implementation of spinning reserve can be selected according to the desired gyroscopic effect.

Another method of Synchronized Vibration can be applied to the embodiment shown in FIG. 82, where the combined forces generate a force along the x axis and the torques cancel each other out. The frequency and phase could be as shown in Table VII.

TABLE VII

|  | ERM 1190a | ERM 1192a | ERM 1192b | ERM 1190b |
|---|---|---|---|---|
| Frequency | $\omega$ | −$\omega$ | −$\omega$ | $\omega$ |
| Phase | 0° | 0° | 0° | 0° |

Another method of Synchronized Vibration can be applied to the embodiment shown in FIG. 82, where the combined forces generate a force along the y axis and the torques cancel each other out. The frequency and phase could be as shown in Table VIII.

TABLE VIII

|  | ERM 1190a | ERM 1192a | ERM 1192b | ERM 1190b |
|---|---|---|---|---|
| Frequency | $\omega$ | −$\omega$ | −$\omega$ | $\omega$ |
| Phase | 90° | 90° | 90° | 90° |

Indeed Synchronized Vibration can be applied to the embodiment shown in FIG. 82, where the combined forces generate a force along any axis in the XY plane. The control that implements an axis at 30 degree and the torques cancel each other out is shown in Table IX.

TABLE IX

|  | ERM 1190a | ERM 1192a | ERM 1192b | ERM 1190b |
|---|---|---|---|---|
| Frequency | $\omega$ | −$\omega$ | −$\omega$ | $\omega$ |
| Phase | 30° | 30° | 30° | 30° |

Another method of Synchronized Vibration can be applied to the embodiment shown in FIG. 82, where a combined torque is generated and the forces cancel each other out. One such pure torque embodiment generates equal amplitudes torque in the clockwise and counterclockwise directions, and is referred to as a symmetric torque implementation. The frequency and phase that generates a symmetric torque could be as shown in Table X.

TABLE X

|  | ERM 1190a | ERM 1192a | ERM 1192b | ERM 1190b |
|---|---|---|---|---|
| Frequency | −$\omega$ | $\omega$ | −$\omega$ | $\omega$ |
| Phase | −90° | −90° | 90° | 90° |

Another implementation of pure torque can produce an asymmetric torque, where the peak torque in the clockwise direction is larger than the peak torque in the counterclockwise direction, or vice versa. One such asymmetric torque implementation for a 4 ERM configuration could be as shown in Table XI. This is achieved by operating ERMs 1192a and 1192b at twice the frequency of ERMs 1190a and 1190b, and controlling the phase appropriately. For the configuration shown in FIG. 82, when all ERMs have the same eccentricity, the amount of asymmetry in the torque can be increased by placing ERMs 1192a and 1192b at a distance of ⅛th from the center relative to the distances of ERMs 1190a and 1190b.

TABLE XI

|  | ERM 1190a | ERM 1192a | ERM 1192b | ERM 1190b |
|---|---|---|---|---|
| Frequency | ω | au | au | ω |
| Phase | −90° | −90° | 90° | 90° |

Yet another method of Synchronized Vibration can be applied to the embodiment shown in FIG. 82, where all ERMs rotate together and forces do not cancel each other out. This implementation generates an effect of one large ERM that would have the eccentricity of all ERMs combined. The frequency and phase that generates a symmetric torque could be as shown in Table XII.

TABLE XII

|  | ERM 1190a | ERM 1192a | ERM 1192b | ERM 1190b |
|---|---|---|---|---|
| Frequency | ω | ω | ω | ω |
| Phase | 0° | 0° | 0° | 0° |

A wide range of haptic effects can be generated by switching between the various effects described herein. When the ERMs are rotating at the same speed in two different effects, the change between effects (including the no-vibration spinning reserve) can be achieved quickly. In many cases the change in effect only requires a positive or negative phase change of 90 degrees in specific ERMs.

Figure 84:
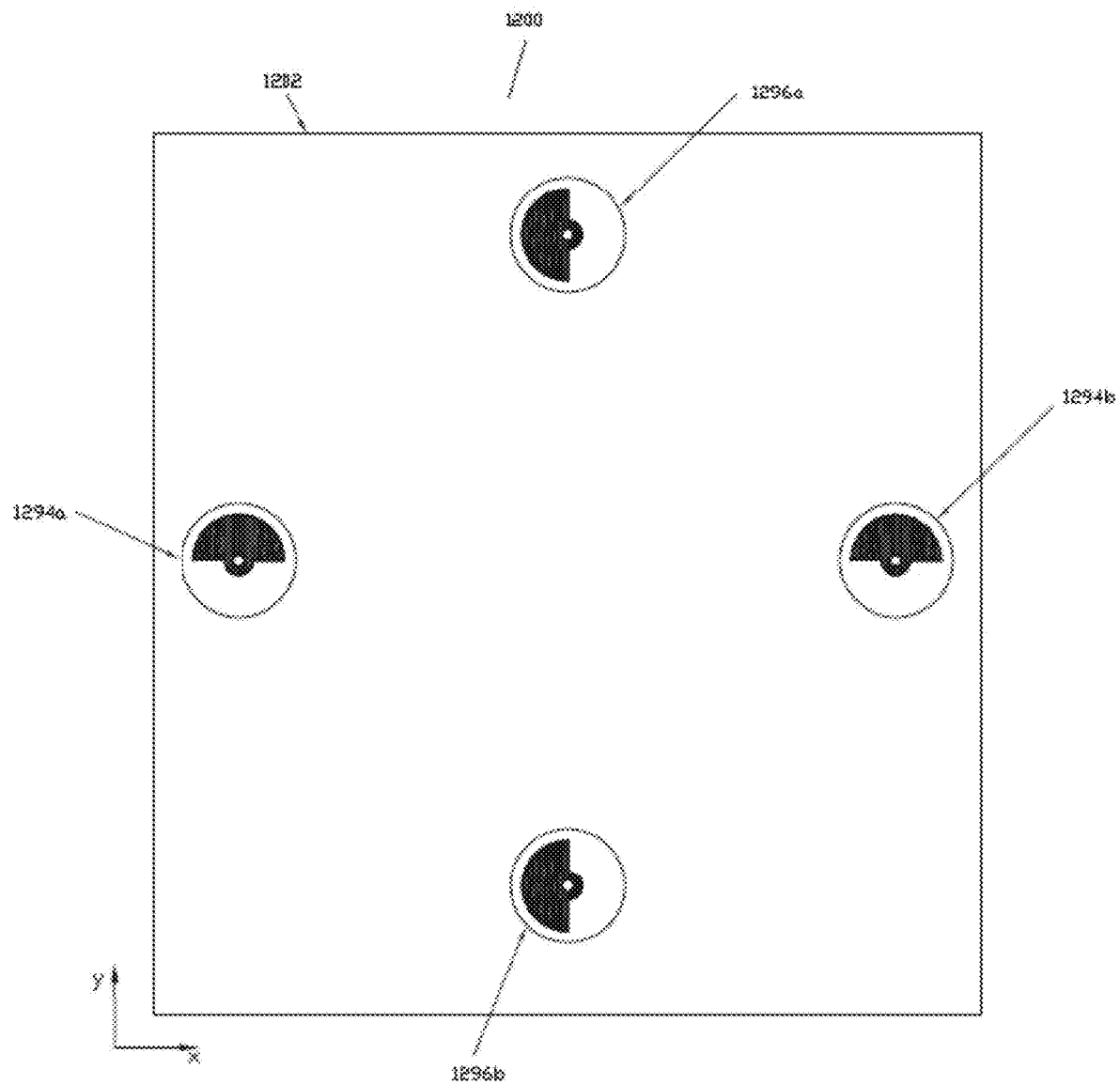
FIG. 84 illustrates a vibration device with two pairs of ERMs that share the same center.

Embodiments with 4 ERMs that are not aligned along the same axis also can generate many useful effects. FIG. 84 shows an embodiment of 4 ERMs. When this embodiment is implemented with 4 ERMs with the same eccentricity, a spinning reserve effect can be generated with same frequency and phases shown in Table V. In FIG. 84 the center of ERM pair 1194a and 1194b, has the same center as ERM pair 1196a and 1196b. Indeed, any embodiment with 2 pairs of ERMs that share the same center can be controlled in a spinning reserve mode.

The embodiment shown in FIG. 84 can also be controlled to generate a pure force vibration along a specified direction, where the torques cancel each other out. The same frequency and phase as shown in Table VII, Table VIII, and Table IX can be used. A symmetric torque can be generated with this embodiment as well, but with a frequency and phase as defined in Table V, and replacing ERMs 1190a, 1190b, 1192a, and 1192b with ERMs 1194a, 1194b, 1196a, and 1196b, respectively.

Figure 85A:
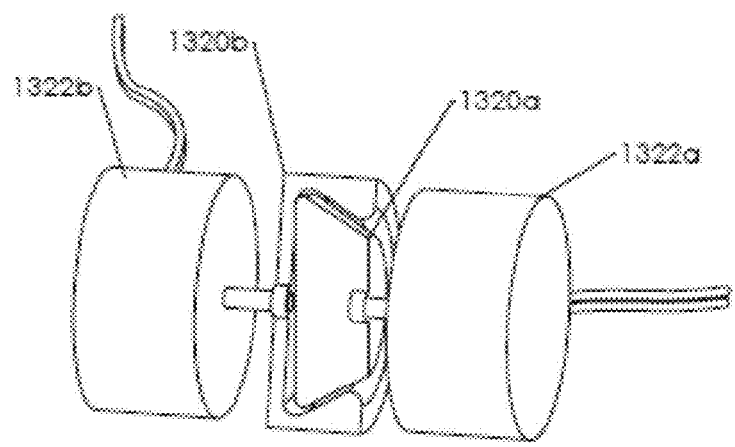
FIGS. 85A-B illustrate an ERM pair with interleaved masses having varying thickness according to aspects of the disclosure.
Figure 85B:
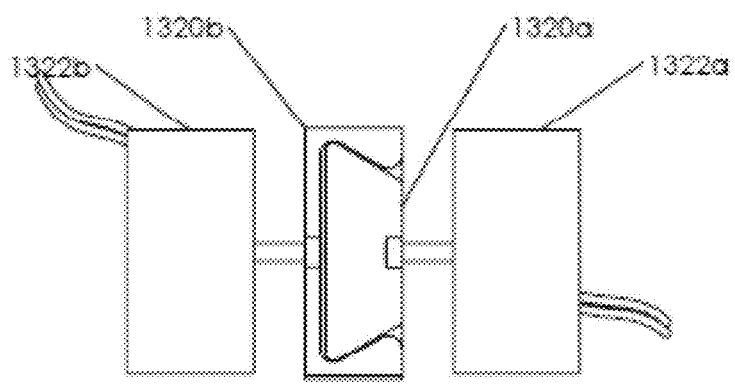

As discussed above with regard to FIG. 75, interleaved ERM pairs may be employed according to aspects of the disclosure. Another embodiment of an interleaved ERM pair is shown in FIGS. 85A-B. As shown in FIG. 85A, an inner eccentric mass 1320a is driven by motor 1322a and an outer eccentric mass 1320b is driven by motor 1322b. The outer eccentric mass 1320b is shaped so that the walls get thicker going away from the motor 1322b. This extra thickness compensates for the material required for structural support of the eccentric mass near the motor. As shown in the side view of FIG. 85B, the inner eccentric mass 1320a fills the void inside eccentric mass 1320b. The result is that both eccentric masses 1320a and 1320b share the identical center of mass, which eliminates unwanted torque effects.

Figure 86A:
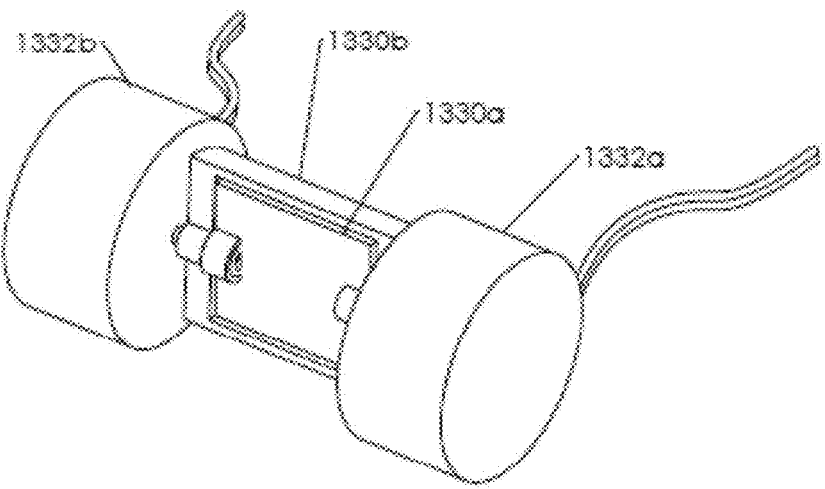
FIGS. 86A-C illustrate an ERM pair with interleaved masses having support bearing according to aspects of the disclosure.
Figure 86B:
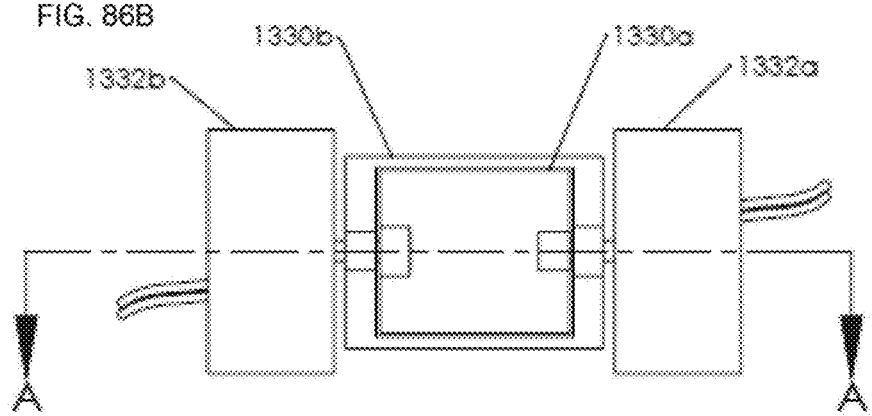
Figure 86C:
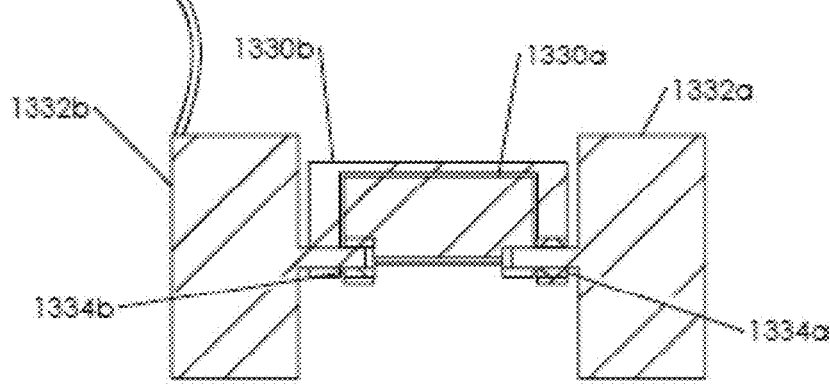

Another embodiment of an interleaved ERM pair is shown in FIGS. 86A-C. Here, an inner eccentric mass 1330a is driven by motor 1332a and an outer eccentric mass 1330b is driven by motor 1332b. The end of eccentric mass 1330a that is furthest from the motor 1332a is supported by a bearing 1334b, which is installed into eccentric mass 1330b. The end of eccentric mass 1330b that is furthest from the motor 1332b is supported by a bearing 1334a, which is installed into eccentric mass 1330a. The bearings 1334a and 1334b allow for the spinning eccentric masses 1330a and 1330b to be supported on both ends. This allows the eccentric masses 1330a and 1330b to spin faster without deflection due to cantilever loads, and helps reduce friction in the motors 1330a and 1330b.

The performance of almost any vibration device can be improved by applying the methods and embodiments of General Synchronized Vibration discussed herein. This approach toward synchronization allows for a wide range of waveforms to be generated including asymmetric waveforms that generate larger peak forces in one direction than the opposing direction. Applications range from seismic shakers and fruit tree harvesters, to vibratory feeders and miniature vibration applications. The embodiments described herein can replace more expensive actuation devices that are used to generate complex waveforms of vibrations. Such applications include seismic shakers that are simulating specific earthquake profiles, and voice coils that are used to generate complex haptic effects.

Figure 87:
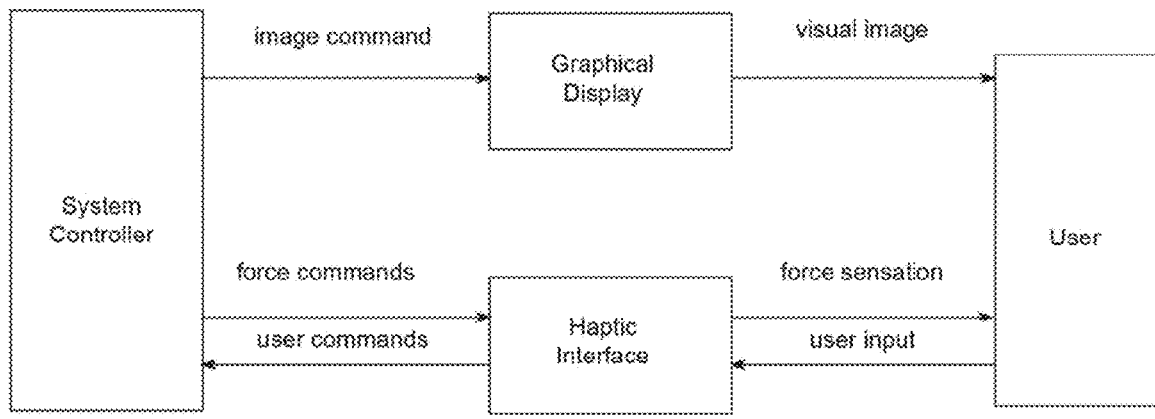
FIG. 87 illustrates haptic feedback within a system having a visual display according to aspects of the disclosure.

Haptic applications described herein can be used to augment any device that has a visual display including computer gaming, television including 3D television, a handheld entertainment system, a smartphone, a desktop computer, a tablet computer, a medical device, a surgical instrument, an endoscope, a heads-up display, and a wristwatch. Implementation of haptic feedback within a system that has a visual display is shown in FIG. 87.

Figure 88:
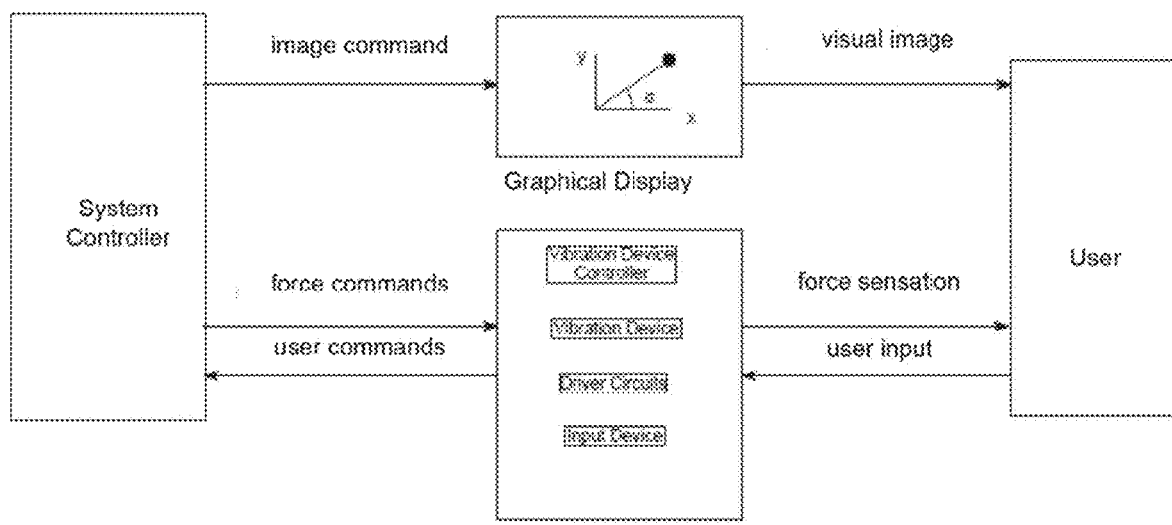
FIG. 88 illustrates another example of haptic feedback within a system having a visual display according to aspects of the disclosure.

As described herein, Vibration Force cues can be generated in specific directions, and these directions can be chosen to correspond to direction that is relevant to an object or event that is being shown on a graphic display. FIG. 88 shows a graphic display with an image that has a direction of interest specific by an angle σ. The Vibration Device shown in FIG. 88 can generate haptic cues in the same direction to provide multi-sensory input and enhance the overall user experience.

Moreover, it is be useful to generate haptic cues of directionality for applications where a person does not have visual cues, such as to guide a blind person or applications where vision is obscured or preoccupied with another task. For example, if a person had a handheld device such as a mobile phone that could generate directional haptic cues through vibration, and the mobile phone knew its absolute orientation as it was being held and the orientation the person should be in to move forward to a goal, then the mobile phone could communicate directional haptic cues through vibration (a force, a torque, or a combined force and torque) that corresponded to the direction and magnitude of the change in orientation the person holding the mobile phone needed to make.

The Vibration Devices describe herein can be used to improve the performance of existing devices that use vibration. For example vibration is used in fruit tree harvesting. By allowing the operator to generate complex waveforms and control the direction of vibration a higher yield of ripe fruit could be harvested, while leaving unripe fruit on the tree. Vibratory feeders are used in factory automation, and typically involve a significant amount of trial and error to achieve the desired motion of the parts. By allowing the operator to generate complex waveforms and control the direction of vibration it can be easier to generate the desired part motion and a wider range of parts could be processed with vibratory feeders.

Figure 89:
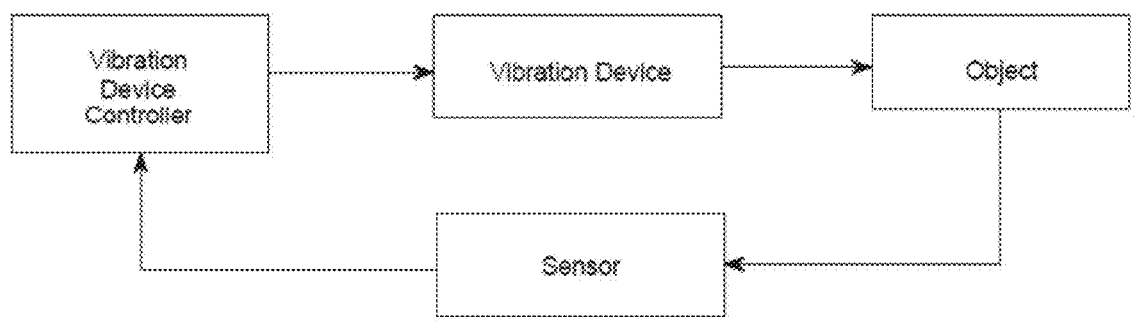
FIG. 89 illustrates a vibration device with sensor feedback according to aspects of the disclosure.

The Vibration Devices described herein allow for a wide and continuous adjustment in areas such as vibration magnitude, frequency, and direction. To improve performance of a Vibration Device, sensor feedback can be used, as shown in FIG. 89. With this approach a Vibration Device applies forces onto an object, and a sensor measures a feature or features of the object. The sensor information is provided to the Vibration Device Controller, which can then modify the vibration waveform to improve overall system performance. One area of application could be a vibratory parts feeder, where a sensor measures the rate at which parts move along a pathway, and the waveform is modified to improve the part motion. Another area of application could be preparation and mixing of biological and chemical solutions. A sensor could measure the effectiveness of the mixing and the vibration waveforms could be adjusted accordingly.

Figure 90:
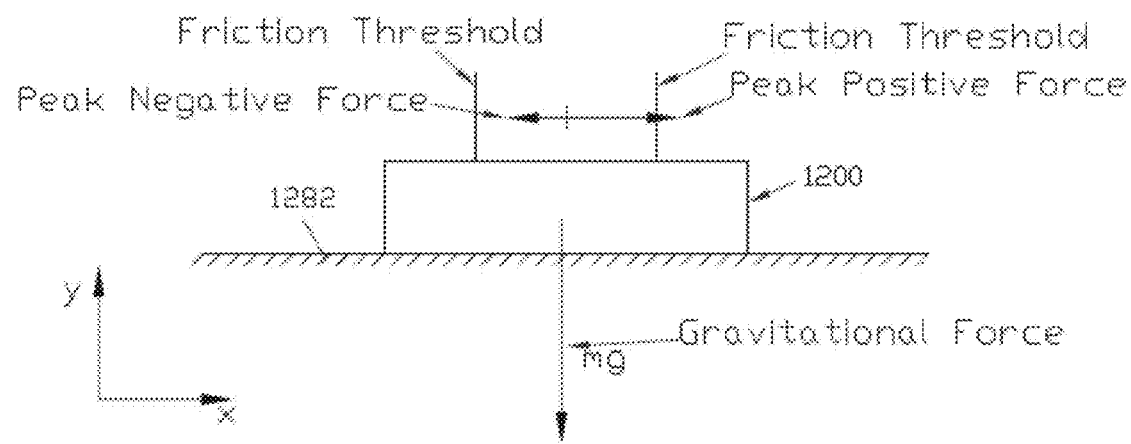
FIG. 90 illustrates a locomotion device for use with aspects of the disclosure.

One application is to use General Synchronized Vibration for locomotion. FIG. 90 shows an embodiment where a Vibration Device 1200 rests on a surface 1282. There exists friction between the surface 1282 and the Vibration Device 1200. Accordingly, motion of the Vibration Device 1200 will only occur if a force parallel to the surface 1282 exceeds a friction threshold. In this embodiment, an asymmetric waveform is being generated so that the peak positive force exceeds the friction threshold and the peak negative force is less than the friction threshold. Accordingly in each vibration cycle the Vibration Device 1200 can be pushed in the positive x direction when the peak force in the positive x direction exceeds the friction threshold.

However, there will generally be no motion in the negative x direction, since the friction threshold is not exceeded. In this fashion, the Vibration Device 1200 will take steps in the positive x direction. The direction of motion along the x axis can be reversed by changing the synchronization of the Vibration Actuators and generating an asymmetric waveform that has a larger peak force in the negative direction. A location device can be made to move in arbitrary directions on a surface 1282 by using a Vibration Device 1200 where the direction of vibration can be controlled on a plane, such as those shown in FIG. 62 and FIG. 66. In a similar fashion a locomotion device can be made to rotate by generating asymmetric torque vibrations, such as the one shown in FIG. 57.

Vibration is also used for personal pleasure products such as Jimmyjane's Form 2 Waterproof Rechargeable Vibrator. Vibration is also used for personal massager products such as the HoMedics® Octo-Node™ Mini Massager. Vibration is also used for beauty products such as Estée Lauder's TurboLash and Lancôme's Oscillation mascara applicators. INOVA produces the AHV-IV Series Vibrators for Vibroseis seismic exploration. General Synchronized Vibration can be used to improve the performance of such products by allowing the user to customize the vibration waveforms and direction of peak vibration forces.

General Synchronized Vibration may also be used in therapeutic medical applications. For example a Vibration Device could vibrate a patient's stomach to aid in digestion, and the patient or a sensor could determine how to adjust the vibration over time.

II. Savant

Now having developed a foundation of General Synchronized Vibration in the previous section, the architecture for a "Synchronized Array of Vibration Actuators in a Network Topology" (herein "SAVANT") is now presented to motivate the use of multiple, low-cost actuator components in lieu of a single, high-cost actuator. When using multiple actuators in an array, the system is able to exhibit various modalities which we will refer to as dimensions of the SAVANT architecture. These orthogonal dimensions are: performance, bandwidth, reliability, magnitude, spatial and temporal.

The SAVANT architecture is generically applicable to any type of low-cost actuator, but for the purposes of the present analysis, systems of linear resonant actuators (LRAs) are discussed. It will first be shown that the analysis for multiple, collinear LRAs can be reduced to the analysis of a single LRA driven by the sum of the component LRA forcing functions. Then, example implementations of the different dimensions of SAVANT will be presented and compared with different single-actuator solutions currently available. Finally a discussion of multi-dimensional control effects and sequences of these effects will be presented.

1. Introduction of SAVANT Architecture

Having developed a foundation of General Synchronized Vibration in the previous section, a new conceptual framework is introduced for creating haptic effects with vibration actuators. This architecture is designed primarily with small, hand-held consumer devices in mind but it is general enough to apply to any device of any size. The basis of the architecture is joining small actuator elements together in different physical geometric configurations, or network topologies, to create a Synchronized Array of Vibration Actuators in a Network Topology—or SAVANT.

The power of SAVANT is three-fold: to synchronize arrays of low-cost, readily available vibration actuators to emulate superlative single actuators; to bring together sets of these emulated high-performance actuators to create almost any desired control effect; and to have an array of vibration actuators that is fault tolerant.

Any array of rigidly or semi-rigidly coupled actuators whose motions and control schemes have been synchronized with the purpose of having characteristics or producing haptic effects beyond the abilities of any single actuator in the array is a SAVANT. Subsets of the set of actuators in a SAVANT are also called SAVANTs as long as they still meet the definition.

While the number of actuators in a SAVANT must be at least two, SAVANTs may be further decomposed into a set of connected SAVANT nodes such that the number of actuators in a SAVANT node must only be at least one. The advantage of representing a SAVANT as a network of SAVANT nodes is that it enables the specification of geometric relationships between the SAVANT nodes. The specification of a SAVANT's nodes as a particular geometrical configuration is defined to be that SAVANT's specific network topology.

Furthermore, the SAVANT node is further defined to be a collection of rigidly or semi-rigidly coupled actuators in close proximity of one another whose resultant vibration effects are designed to appear to emanate from a single spatial point. These groups of actuators are also referred to herein as proximal groups. Groups of actuators that are spatially separated so as to jointly create effects that require non-pointlike origin are referred to herein as distal groups or distal nodes.

The network topology of the actuators in a SAVANT determines how they can be used together. The relevant properties of the SAVANT are the collinearities of the component actuators, the spanning set of displacement vectors and the relative proximities of the nodes.

The division of an array into SAVANT subsets is fluid. A single device may contain a SAVANT having a plurality of synchronized actuators and at any given time these actuators may be functioning in any available capacity. For example a device could have a total of six synchronized actuators: in response to stimulus A the six actuators could be divided into three subsets of two-actuator SAVANTs to produce the resultant control effect α; in response to stimulus B, the six actuators could instead be divided into two subsets of three-actuator SAVANTs to produce the control effect β. By joining together low-cost component actuators to emulate a single actuator with arbitrarily superlative performance characteristics, one also gets haptic capabilities unavailable to devices with unsynchronized vibration actuators, such as directional vibration and asymmetric vibration.

An LRA-type actuator has three performance characteristics that can be improved by combining multiple actuators together: response time, bandwidth and force output. An array of collinear LRA-type actuators can emulate improvement of any of these separately or at the same time. For example, four collinear LRAs could have synchronized control schemes such that they emulate a single component LRA with a faster response time. Alternatively they could be controlled synchronously to emulate a single component LRA with an increased frequency response range, or bandwidth. Or in a completely separate scenario the same four LRAs could be split into two subsets where each subset of two LRAs emulates a single LRA with increased bandwidth and collectively the two subsets work together to emulate faster response times.

Since an array of actuators with a given network topology can work together to emulate any single improved performance characteristic without improving the other two, then in the space of the actuator control schemes we consider these performance modes to be orthogonal. Thus it is possible for a SAVANT to simultaneously be in multiple performance modes, but it is not necessary. Later we will consider many examples of these control modes as well as combinations of them.

Beyond out-performing single actuator elements, arrays of actuators also have available two control modes unique to multiple synchronized actuators. These modes are referred to as spatial and temporal. SAVANTs running in spatial mode can create haptic effects that relate to the user via their position and orientation in space. For instance a set of actuators may work together to create a half-wavelength oscillation or the amplitude of a vibrational effect may change based on the position of the device (per se relatively to another object or positions related to the Earth). In temporal mode, SAVANTs can create vibrational effects that interact with the user to create an awareness of time. These can include asymmetric waveforms created through Fourier synthesis of harmonic forcing functions.

Finally, proximal arrays of collinear actuators have a natural safeguard against individual component failure. Many devices will use haptic effects to protect the wellbeing of their users, often in perilous or extreme environments. It is crucial that the vibration actuators are fault tolerant. One of the ways to achieve this is to build in redundancies for the purposes of reliability. Arrays of actuators that are designed to work together for the purposes of fault tolerant reliability are SAVANTs said to be running in reliability mode.

Because SAVANTs can exhibit these control modalities independently or simultaneously, they may be combined together into a single vector space which is referred to herein as the SAVANT "Control Space." This space spans the haptic capabilities of sets and/or subsets of actuators. The purpose of introducing this space and its comprising directions is to abstract the capabilities of groups of actuators. The discussion of haptic control schemes can be elevated from "on and off" to sequences of control effects designed to enhance the user experience beyond today's capabilities, while only using low-cost components that are readily available today.

All possible haptic effects (within reason) can be created with the SAVANT architecture. In general, a SAVANT of sufficient size can be thought of as a vibration synthesizer, designed to create arbitrary vibrational output either using predefined control sequences or in response to external information, e.g., user interface or sensor feedback. Generically the SAVANT architecture applies to any type of actuator—and SAVANTs of one actuator type can even emulate another actuator type. For instance, two LRA-type actuators can be synchronized to emulate the output of an ERM-type actuator and vice versa. Given this duality, all control sequences designed e.g. for an LRA-type SAVANT are equally valid for an ERM-type SAVANT where each LRA-type actuator is replaced with two synchronized ERMs designed to emulate an LRA.

As previously stated, for the purpose of this inventive disclosure the examples of specific electronic components are designed for haptic applications of hand-held devices. The SAVANT architecture is not limited to actuators of this dimensional scale. That is to say, SAVANT is intended to be applicable at other dimensional scales with appropriate actuators—for example, an array of MEMS LRA actuators which might use electrostatic forces in place of electromagnetic forces; or arrays of very large LRAs that may be used for seismic exploration. Moreover, the examples discussed herein are based on a relatively small number of actuators but the architecture is consistent for any number of actuators. And finally, though the majority of examples in this text are concerned with homogeneous SAVANTs, it is perfectly acceptable and often desirable to have heterogeneous arrays of actuators. Here the notion of heterogeneity includes both actuators of a similar type with varying characteristics and actuators of different types.

Figure 91:
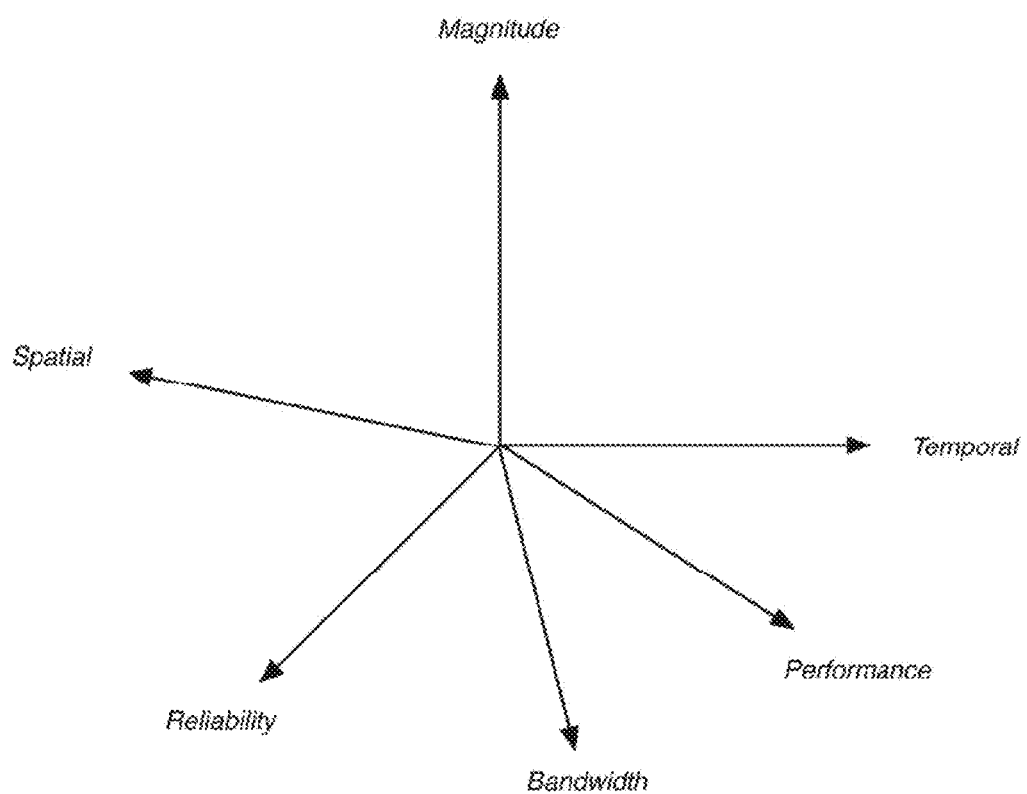
FIG. 91 is a diagram illustrating six dimensions of a Synchronized Array of Vibration Actuators in a Network Topology ("SAVANT") Control Space in accordance with aspects of the present disclosure.

FIG. 91 is a diagram illustrating the six dimensions of the SAVANT Control Space: Bandwidth, Magnitude, Performance, Reliability, Spatial and Temporal.

Figure 92A:
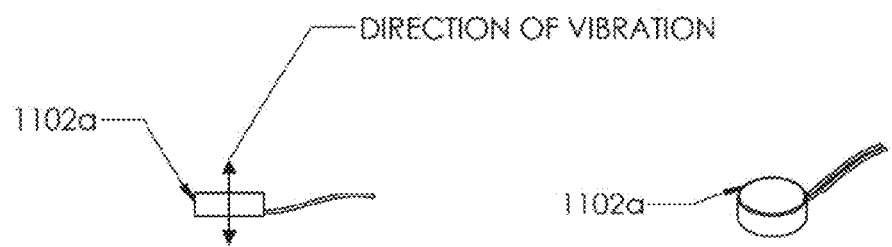
FIG. 92A illustrates an example of a SAVANT node having a single LRA in accordance with aspects of the present disclosure.

FIG. 92A illustrates an example of a SAVANT node having a single LRA, 1102a. FIGS. 92A-92J illustrate an example LRA that has a coin-like shape and has an axis of vibration normal to the surface of the LRA. As described previously, the minimum number of actuators that a SAVANT node must have is one. The minimum number of actuators that a SAVANT must have is two. Thus it follows, for example, that a 2-SAVANT (that is to say, a SAVANT having two actuators) may have a network topology of either one SAVANT node having two actuators or alternatively two SAVANT nodes each having one actuator. Although an LRA is used in this example, other actuators may be used as long as they are simple harmonic systems, or can be combined or controlled to behave as simple harmonic systems. Some alternatives to LRAs include the various actuator types discussed above.

Figure 92B:
FIG. 92B illustrates an example of a SAVANT node having two LRAs arranged in a stack in accordance with aspects of the present disclosure.

FIG. 92B illustrates an example of a SAVANT node having two LRAs, 1102a and 1102b, arranged in a stack, with their axes of vibration vertically aligned.

Figure 92C:
FIG. 92C illustrates an example of a SAVANT node having three LRAs arranged in a stack in accordance with aspects of the present disclosure.

Correspondingly, FIG. 92C illustrates an example of a SAVANT node having three LRAs, 1102*a*, 1102*b* and 1102*c*, arranged in a stack, with their axes of vibration vertically aligned.

FIG. 92D illustrates an example of a SAVANT node having two LRAs, 1102*a* and 1102*b*, in a compact planar arrangement, with their axes of vibration vertically aligned in parallel.

Correspondingly, FIG. 92E illustrates an example of a SAVANT node having three LRAs, 1102*a*, 1102*b* and 1102*c*, in a compact planar arrangement, with their axes of vibration vertically aligned in parallel.

FIG. 92F illustrates an example of a SAVANT node having three LRAs, 1102*a*, 1102*b* and 1102*c*, in a compact arrangement with their axes of vibration spanning three dimensions.

FIG. 92G illustrates a side view (left) and a perspective view (right) of an example of a SAVANT node having three LRAs, 1102*a*, 1102*b* and 1102*c*, in a arrangement around three faces of a cube, 2000, with their axes of vibration spanning three dimensions.

Correspondingly, FIG. 92H illustrates a side view (left) and a perspective view (right) of an example of a SAVANT node having six LRAs, 1102*a*, 1102*b*, 1102*c*, 1102*d*, 1102*e* and 1102*f*, in a arrangement around the six faces of a cube, 2000, with their axes of vibration spanning three dimensions.

Correspondingly, FIG. 92I illustrates a side view (left) and a perspective view (right) of an example of a SAVANT node having twelve LRAs in a arrangement around the six faces of a cube with their axes of vibration spanning three dimensions.

FIG. 92J illustrates a side view (left) and a perspective view (right) of an example of a SAVANT node having four LRAs in a tetrahedral arrangement around the four faces of a tetrahedron, 2004, with their axes of vibration spanning three dimensions in accordance with aspects of the present disclosure.

Figure 93:
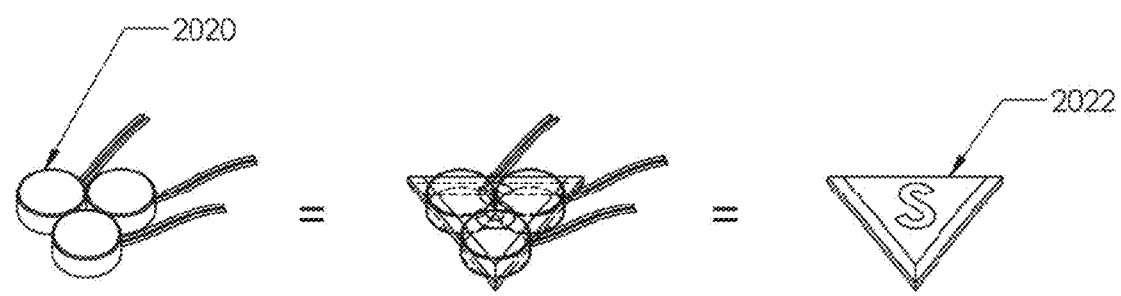
FIG. 93 illustrates an example of a SAVANT node having three LRAs in a triangular planar arrangement in accordance with aspects of the present disclosure.

FIG. 93 illustrates the equivalence between an exact representation of the vibration actuators in a SAVANT, 2020, and a triangularly shaped symbol, 2022, symbolizing a SAVANT node. In accordance with the nomenclature herein, this SAVANT node symbol may represent any of the previous examples of a SAVANT node, as illustrated in the above FIGS. 92A-92J, or any types of actuators and arrangements that meet the requirements of a SAVANT node. For example, FIGS. 85A, 85B, and 85C illustrate a vibration device having a pair of ERMs. This pair of ERMs can be considered both a SAVANT node and a SAVANT, since it meets the requirements for each.

Figure 94:
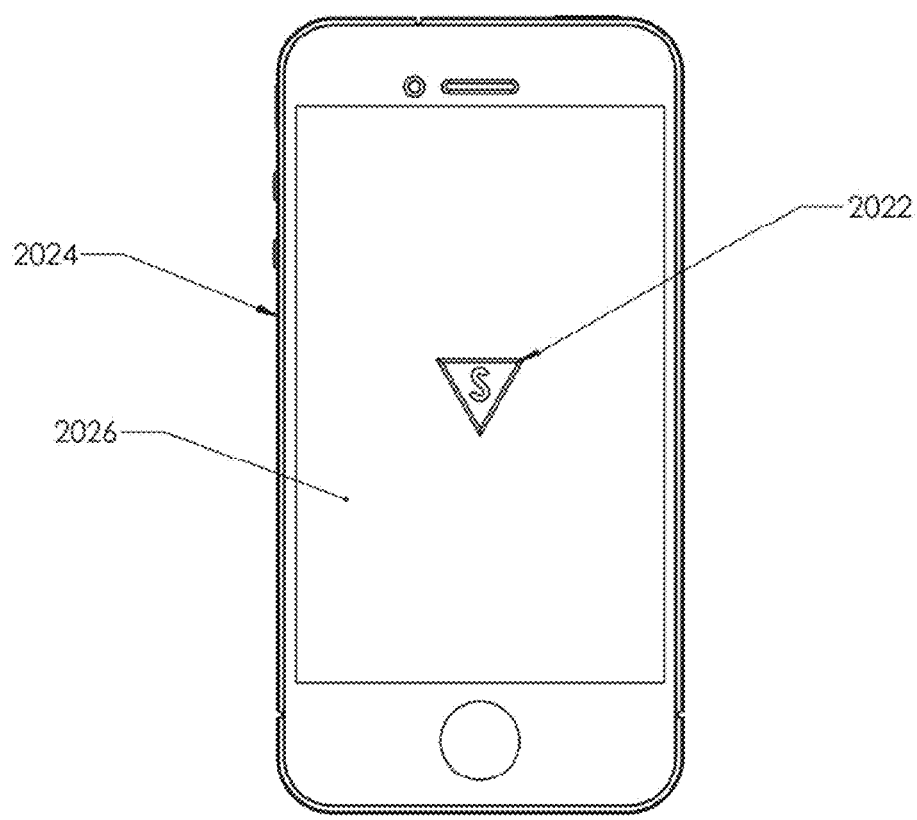
FIG. 94 illustrates an example portable client device incorporating a SAVANT node in accordance with aspects of the present disclosure.

FIG. 94 illustrates a SAVANT node, 2022, inside an example smartphone or PDA, 2024. In this example, the SAVANT node, 2022 may be attached to the smartphone case and disposed directly under a floating touch display, 2026, such that the floating touch display is capable of vibrating vertically, when the SAVANT node, 2022, is controlled by a controller in the smartphone, 2024, to produce haptic sensations to a user in accordance with aspects of the present disclosure. In this manner, the SAVANT node, 2022, can emulate a virtual actuator that can produce the haptic sensation that a person is pressing a physical button when in fact the person is only pressing the floating screen vibrated by the SAVANT node, 2022.

Figure 95:
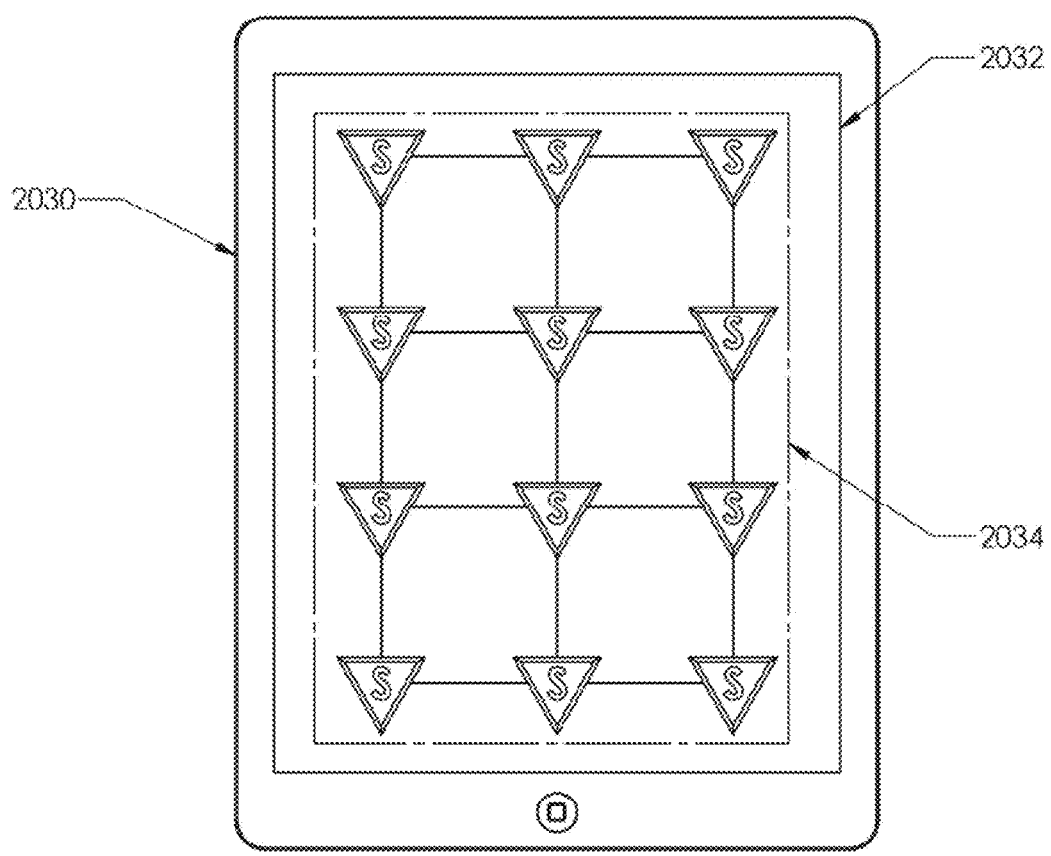
FIG. 95 illustrates another example portable client device incorporating a plurality of SAVANT nodes in accordance with aspects of the present disclosure.

FIG. 95 illustrates a SAVANT, 2034, having twelve nodes in a three by four arrangement, 2022, inside an example tablet computer, 2030. In this example, the SAVANT, 2034, is attached to the tablet computer case and disposed directly under a floating touch display, 2032, such that the floating touch display is capable of vibrating vertically, when the SAVANT, 2034, is controlled by a controller in the tablet computer, 2030, to produce haptic sensations to a user in accordance with aspects of the present disclosure. In this manner, the SAVANT, 2034, can emulate a set of virtual actuators that can produce the haptic sensation that a person is pressing a physical button when in fact the person is only pressing the floating screen vibrated by the SAVANT, 2034. Since each of the twelve SAVANT nodes in this example may be individually or collectively controlled, various methods to produce localized haptic effects for a multi-touch display are possible.

Figure 96:
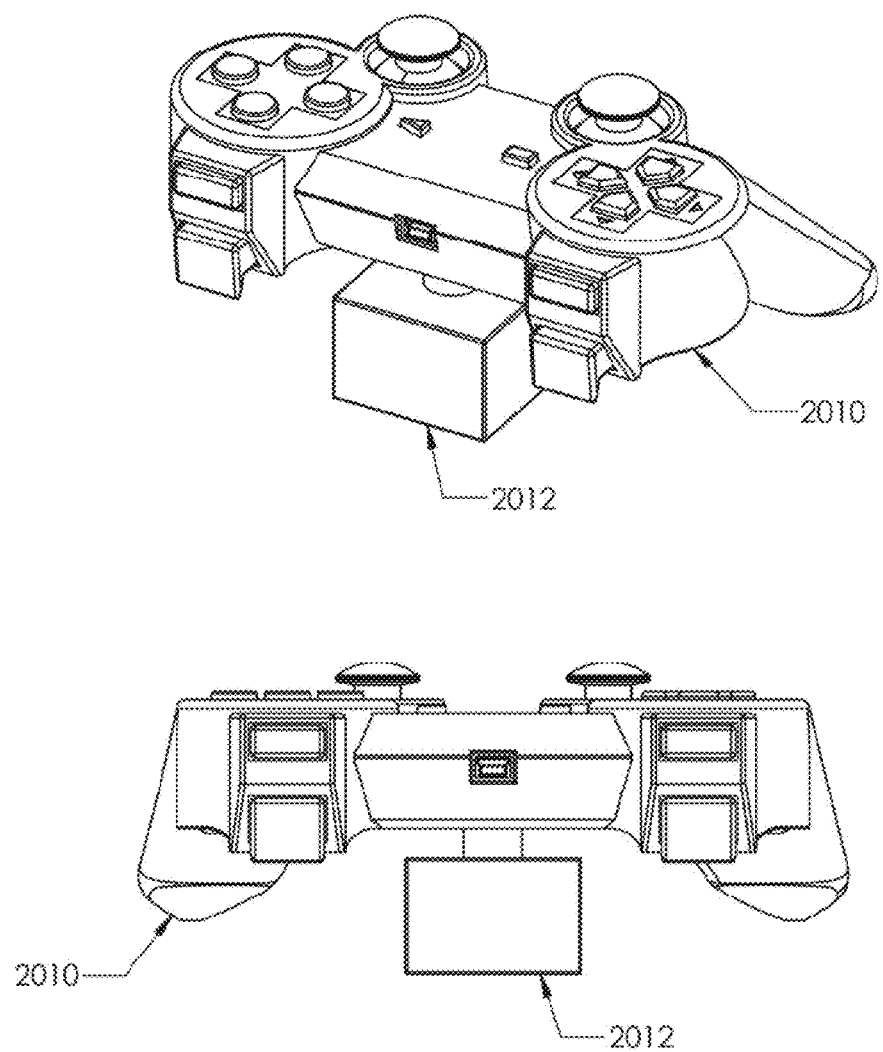
FIG. 96 illustrates an example of a handheld game controller incorporating one or more SAVANT nodes in accordance with aspects of the present disclosure.
Figure 97:
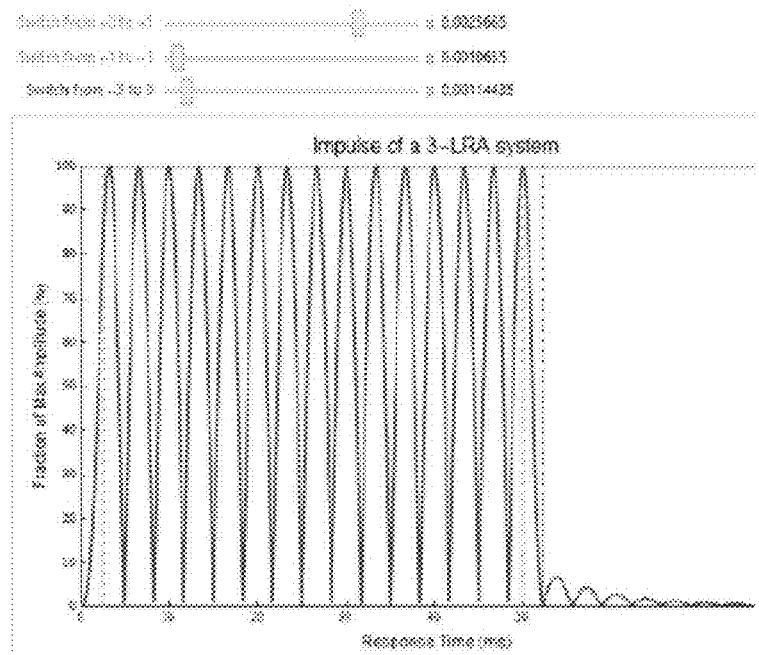
FIG. 97 illustrates an h-pulse of a 3-LRA system at an initial point in time in accordance with aspects of the present disclosure.
Figure 98:
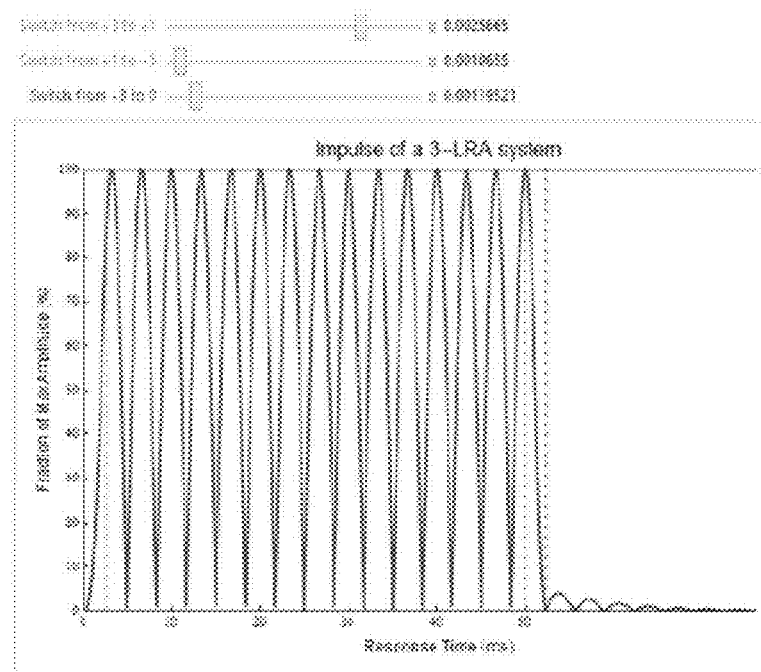
FIG. 98 illustrates an h-pulse of the 3-LRA system at a second point in time in accordance with aspects of the present disclosure.
Figure 99:
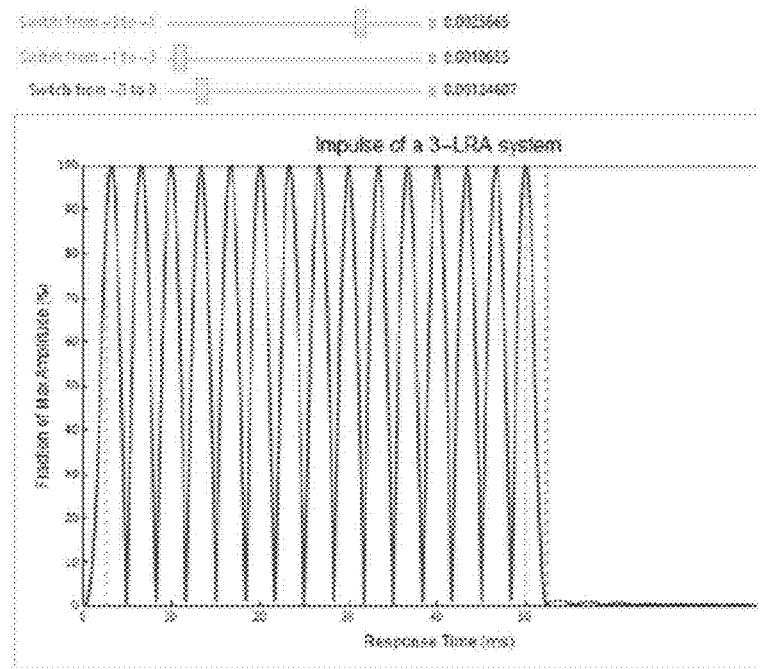
FIG. 99 illustrates an h-pulse of the 3-LRA system at a third point in time in accordance with aspects of the present disclosure.
Figure 100:
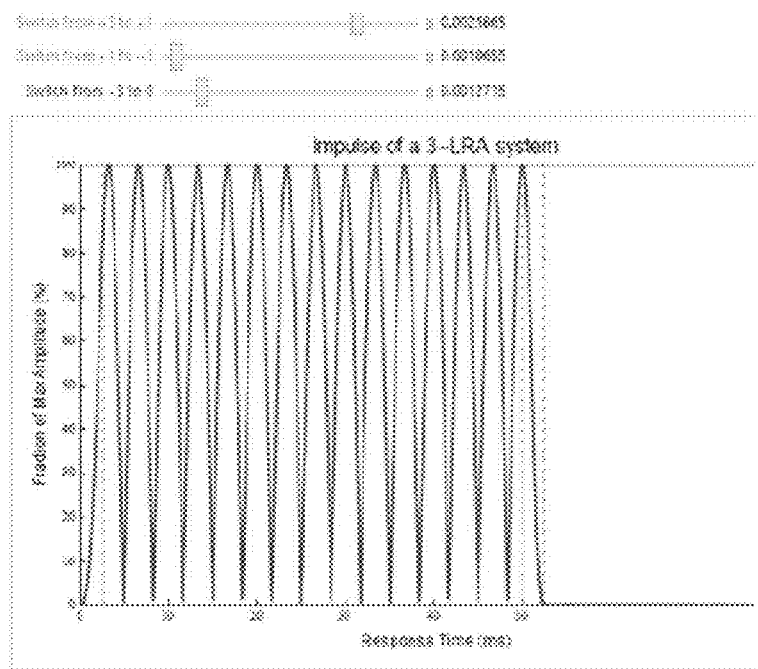
FIG. 100 illustrates an h-pulse of the 3-LRA system at a fourth point in time in accordance with aspects of the present disclosure.

Finally, FIG. 96 illustrates a perspective view (top) and a front view (bottom) of an example game controller, 2012, having a module, 2012, with a SAVANT inside. In this example, the SAVANT, not shown, is attached inside the module, 2012, to impart vibrations to the game controller to enhance the realism of gameplay through haptic cues and other haptic sensations, including directional vibrations in accordance with the present disclosure.

2. Example Implementations of SAVANT Using LRA Arrays

A. Equation of Motion for an LRA Array

First consider a single LRA. The response function of an LRA is that of a damped harmonic oscillator with a resonant angular frequency $\omega_0$, a mass m and a damping ratio C. Usually, though, LRAs are labeled by their resonant frequency $f_0$, where $\omega_0 = 2\pi f_0$. Generically, the LRA can be driven with any arbitrary function of time-usually implemented via the methods of pulse-width modulation, or PWM—but for simplicity let us just consider a simple sinusoidal driving force. This simplification is well-motivated by hardware considerations and as shown below, it is still quite general. Thus the equation of motion for a single LRA will be the solution of the differential equation $$x''(t) + 2\zeta\omega_0 x'(t) + \omega_0^2 x(t) = \frac{f \sin(\omega t + \phi)}{m} \quad \text{(Eq. 101)}$$

where $\omega$ and $\varphi$ determine the characteristics of the driving force. If the LRA is starting from rest then the initial conditions are given by $x(0)=0$, $x'(0)=0$.

The steady-state maximum amplitude is given by $$A_{max}(t) = \frac{f}{m\omega\sqrt{(2\omega_0^2\zeta)^2 + \frac{1}{\omega^2}(\omega_0^2 - \omega^2)^2}} \quad \text{(Eq. 102)}$$

If we were to have n identical LRAs configured in parallel such that all the vibration directions were oriented along e.g. the x-axis, then each LRA would be governed by its own equation $$A_{max}(t) = \frac{f}{m\omega\sqrt{(2\omega_0^2\zeta)^2 + \frac{1}{\omega^2}(\omega_0^2 - \omega^2)^2}} \quad \text{(Eq. 102)}$$

$$x_1''(t) + 2\zeta\omega_0 x_1'(t) + \omega_0^2 x_1(t) = \frac{f_1 \sin(\omega_1 t + \phi_1)}{m}$$ (Eq. 103)

$$x_2''(t) + 2\zeta\omega_0 x_2'(t) + \omega_0^2 x_2(t) = \frac{f_2 \sin(\omega_2 t + \phi_2)}{m}$$

$$\vdots$$

$$x_n''(t) + 2\zeta\omega_0 x_n'(t) + \omega_0^2 x_n(t) = \frac{f_n \sin(\omega_n t + \phi_n)}{m}$$

and the total response of the embedding system, e.g. a phone or game controller, would be proportional to $x(t)=x_1(t)+x_2(t)+\ldots+x_n(t)$. We can reduce the number of equations though by introducing a change of variables. Let $$X(t) = x_1(t) + x_2(t) + \ldots + x_n(t)$$ (Eq. 104)

which leads to $$X'(t) = x_1'(t) + x_2'(t) + \ldots + x_n'(t)$$ (Eq. 105)

and $$X''(t) = x_1''(t) + x_2''(t) + \ldots + x_n''(t).$$ (Eq. 106)

Summing the left-hand sides of Eq. 103 we have $$(x_1''(t) + x_2''(t) + \ldots + x_n''(t)) + \\ 2\zeta\omega_0(x_1'(t) + x_2'(t) + \ldots + x_n'(t)) + \\ \omega_0^2(x_1(t) + x_2(t) + \ldots + x_n(t)) = X''(t) + 2\zeta\omega_0 X'(t) + \omega_0^2 X(t)$$ (Eq. 107)

which we recognize as the equation of motion for a single simple harmonic oscillator whose position is given by X(t). On the right-hand side we are left with the sum of the individual forcing functions. Generically there is no simplification of the addition of sine functions. Note though that we can trivially deal with anti-parallel components by reversing the sign of their forcing function. Thus our array of n (anti-)parallel LRAs is governed by the single equation $$X''(t) + 2\zeta\omega_0 X'(t) + \omega_0^2 X(t) = \left(\frac{f_1 \sin(\omega_1 t + \phi_1)}{m} + \frac{f_2 \sin(\omega_2 t + \phi_2)}{m} + \ldots + \frac{f_n \sin(\omega_n t + \phi_n)}{m}\right)$$ (Eq. 108)

Initial Conditions

Interestingly, the initial condition for the array of LRAs is just the sum of initial conditions of the individual LRAs:

$$X(0) = x_1(0) + x_2(0) + \ldots + x_n(0),$$ (Eq. 109)

$$X'(0) = x_1'(0) + x_2'(0) + \ldots + x_n'(0).$$

This can have unexpected consequences. Consider the case where there is an even number of LRAs with an identical steady-state maximum amplitude and the steady-state motions of each successive pair are out of phase by π-meaning that when 1, 3 and 5 are at A; 2, 4 and 6 are at –A. Even though each individual element is vibrating, the sum of the amplitudes is always zero and there will be no net motion of the embedding system. If one were to change the driving force while the array is in this state, it will have the same response as if it were starting from rest.

B. Analysis of Multiple LRAs

In the following sections we will use LRAs to give example control effects for each of the six dimensions of SAVANT. Since arrays of LRAs are governed by one differential equation, the analysis of multiple LRAs is computationally no different than that of a single LRA. Physically though, there are advantages. If a single LRA can be driven with a maximum driving amplitude F, then the n-LRAs system is effectively a single LRA with a maximum driving amplitude of n×F. The addition of maximum driving amplitudes forms the basis of the performance, bandwidth and magnitude modes.

1. Magnitude Mode

A straightforward consequence of having multiple LRAs in a synchronous topology is that their response amplitudes (and therefore their momentum transfers to the embedding system) simply add together. In the case of two identical, parallel LRAs driven identically, Eq. 108 yields $$X''(t) + 2\zeta\omega_0 X'(t) + \omega_0^2 X(t) = 2\frac{F}{m}\sin(\omega t + \phi),$$ (Eq. 110)

which is the equation of a single LRA with a maximum driving amplitude of 2F. Physically this means that if there is a single LRA that can produce a maximum acceleration of 2 g, then two parallel LRAs will produce a maximum acceleration of 4 g; three LRAs could produce 6 g, and so on. This is due to the fact that LRAs are linear systems, as shown in the previous section. This is not the case for rotating actuators such as ERMs, though the methods of SAVANT are still generically applicable to them. The use of multiple actuators to produce vibrational magnitudes greater than the capacity of a single component actuator is denoted herein as a SAVANT running in magnitude mode.

2. Reliability Mode

Having multiple LRAs is in the system allows the designer to build in redundant components. This could be particularly useful especially for medical, scientific or military applications or in situations where the embedding device is habitually used in a rugged environment. When a device contains a group of identical actuators designed for the sole purpose of having built-in redundancy to safeguard against the failure of component actuators, this group of actuators is described as a SAVANT running in reliability mode.

3. Performance Mode

Actuators like LRAs are attractive because they are relatively low-cost, their design and control characteristics are well-understood and because their manufacturing infrastructure is already well-developed. Current trends disfavor the use of these actuators though because of their relatively long response times and narrow bandwidths compared to more exotic actuators—such as piezo-based solutions. By briefly leveraging the increased maximum driving amplitude afforded by an array of LRAs, one can bring the total response time down to the same order of magnitude as the piezo actuators. In the language of the architecture laid out in this work, the use of multiple actuators to effectively emulate a single, high-performance actuator will be referred to as a SAVANT running in performance mode.

Figure 101:
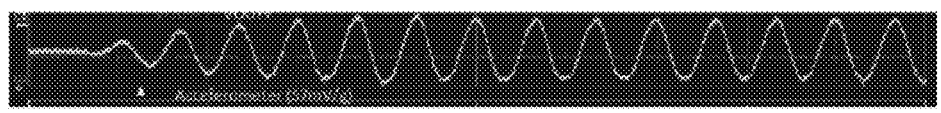
FIG. 101 is a chart of an example oscilloscope trace from the measurement of the ramp-up of an LRA from rest, when driven with a 150 Hz input signal.

To see how a SAVANT in performance mode compares with individual LRAs, the spring characteristics of a single LRA were modeled from data provided by Texas Instruments, Inc. We call this model "MOD1." The data was taken from an AAC ELV1411A LRA from AAC Technologies Holdings Inc. which has a rated resonant frequency of 150 Hz and is shown in FIG. 101. In this figure the scale of the x-axis is 10.0 ms/div and the y-axis is 100 mV/div.

As shown in this figure, the relative heights and positions of the peaks are determined by the resonant frequency, the driving frequency and the damping ratio. The overall scale for they-axis is determined by the forcing amplitude and the mass. One can fit the parameters of the spring equation, Eq. 101, by assuming the driving function is at the same frequency as the resonant frequency; i.e., $\omega=\omega_0$.

Since we are only interested in relative response times, the resulting motion may be rescaled by the steady-state maximum amplitude given by Eq. 102. This allows one to easily see the fraction of the steady-state maximum amplitude as a function of time.

The damping ratio was derived by fitting a damped, driven harmonic oscillator with resonant frequency of 150 Hz (driven at the resonance frequency) to the experimental output in FIG. 101. This ratio was found to be $\zeta=0.135$. The resonant LRA frequency is assumed to be 150 Hz and the phase of the forcing function is assumed to be 0 unless otherwise stated. All amplitudes are normalized to the maximum driving amplitude available. Thus an "amplitude of 0.2" refers to an amplitude equal to ⅕ the maximum forcing amplitude. The generic harmonic oscillator equation of motion, Eq. 101 along with these experimentally derived parameters constitute the model MOD1 used extensively throughout this disclosure.

Figure 102:
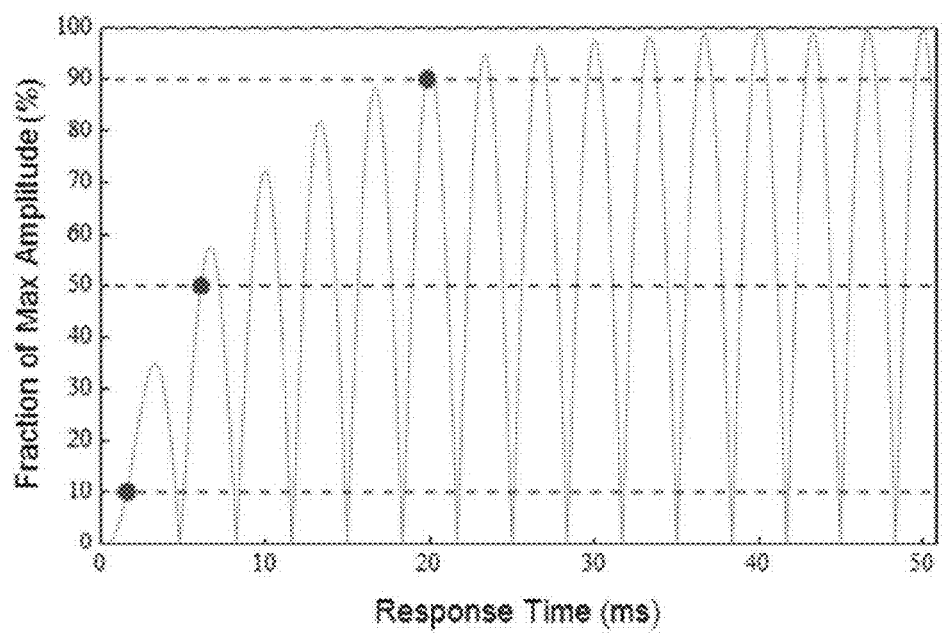
FIG. 102 is a graph of a model fitted to 150 Hz LRA data in accordance with aspects of the present disclosure.

Solving Eq. 101 using the constants for the AAC ELV1411A 150 Hz LRA will give the response of the LRA as a function of time. In FIG. 102 the absolute value of this function is plotted. It is noted in this figure when the LRA reaches 10%, 50% and 90% of its maximum amplitude. The response times for these amplitudes are roughly 1.53 ms, 6.05 ms and 19.75 ms respectively. Although our LRA model, MOD1, of the AAC ELV1411A may be a simple and basic approximation using a generic linear spring LRA model, nevertheless it is useful for our explanation of the SAVANT architecture as follows below.

Now consider the effect of two LRAs working together. The most basic control scheme that can be applied is one where at t=0 both LRAs are driven with their maximum forcing amplitudes for some short time τ. Then at t=r the forcing amplitudes are reduced for each LRA to half the maximum. By running two parallel LRAs together at half their maximum amplitude the resultant steady-state amplitude will equal that of a single LRA driven at the maximum amplitude. This idea trivially generalizes to n LRAs: we initially drive all LRAs at their maximum forcing amplitudes and then after some time the forcing amplitudes are reduced to 1/n; such that the sum of the forcing amplitudes is equal to the maximum forcing amplitude of a single LRA. It is essential that each component is still driven at 1/n, rather than, e.g., driving one at maximum and keeping the others at rest. The reason for this is that undriven LRAs parallel to the driving force will begin to oscillate and act as dampers on the system.

Figure 103:
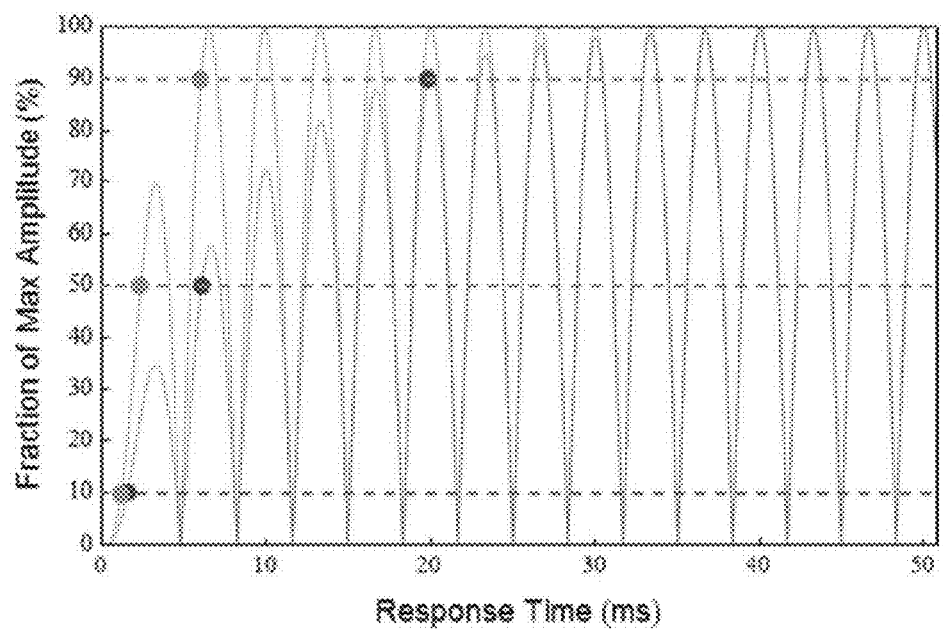
FIG. 103 is a graph of the response times for a 2-LRA system compared with a 1-LRA system in accordance with aspects of the present disclosure.

In FIG. 103 the response of the two-LRA system is presented as a function of time and it is plotted along with the single LRA case. The optimal switching time T2 was determined numerically to be $\tau_2=4.36$ ms For the two-LRA system, the response times are: 1.16 ms, 2.35 ms and 6.02 ms for 10%, 50% and 90% respectively. One can see the response times are significantly faster, especially the time to reach 90% max amplitude, which is almost 70% faster than the single LRA. Note that the 2-LRA 90% time is roughly the same as the 1-LRA 50% time, as expected. also it is noted that with two LRAs, the system has already reached its maximum amplitude in the second half-cycle.

Figure 104:
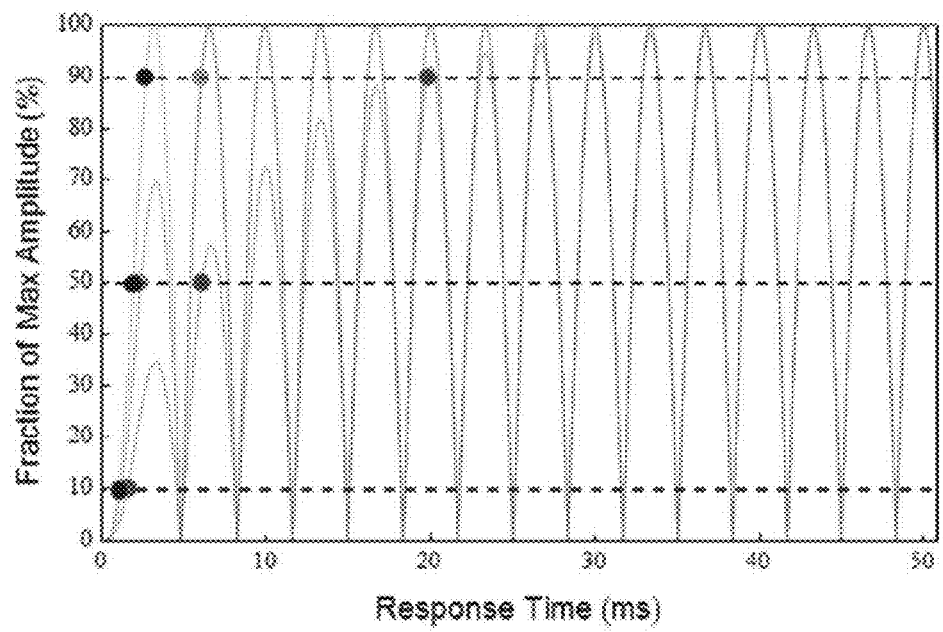
FIG. 104 is a graph of the response times for a 3-LRA system compared with the 2-LRA and 1-LRA systems in accordance with aspects of the present disclosure.

By adding a third LRA to the system one can achieve even faster response times. In FIG. 104 a 3-LRA system is plotted along with the 2-LRA and 1-LRA systems. Again, the optimal switching time $\tau_3$ was determined numerically to be $\tau_3=2.57$ MS The 3-LRA system responds the fastest with 10%, 50% and 90% max amplitude times of 1.00 ms, 1.91 ms and 2.66 ms. A 90% max amplitude response time of 2.66 ms is squarely in competition with piezoelectric actuators. The 90% max amplitude response time for the 3-LRA system is over 55% faster than the 2-LRA system and over 86% faster than the single LRA. In Table 101 we summarize the response times for each system. Moreover we see that the 3-LRA system reached 100% of its steady-state maximum amplitude in the first half-cycle—this fact signals that this control sequence is actually the optimal control sequence, if we consider only sinusoidal forcing functions.

TABLE 101

Response Times for Multiple LRAs

| Number of LRAs | 10% Max Amp. (ms) | 50% Max Amp. (ms) | 90% Max Amp. (ms) | Increase over 1-LRA |
|---|---|---|---|---|
| 1 | 1.54 | 6.05 | 19.75 | 0% |
| 2 | 1.16 | 2.35 | 6.02 | 69.5% |
| 3 | 1.00 | 1.91 | 2.65 | 86.5% |

Response times for 1-LRA, 2-LRA and 3-LRA systems based on our LRA model, MOD1.

4. Bandwidth Mode

Performance mode leverages multiple actuators to emulate a single actuator with an improved response time. The same emulated increase can also be seen in bandwidth. Amplitude response for a typical LRA drops off exponentially as the driving frequency differs from the resonant frequency. The response amplitudes are additive though; meaning that at any given frequency, the maximum amplitude for an n-LRA system is n times the maximum amplitude of the 1-LRA system. We denote systems of multiple, synchronized actuators controlled in a manner as to emulate a single high-bandwidth actuator as a SAVANT running in bandwidth mode.

Figure 105:
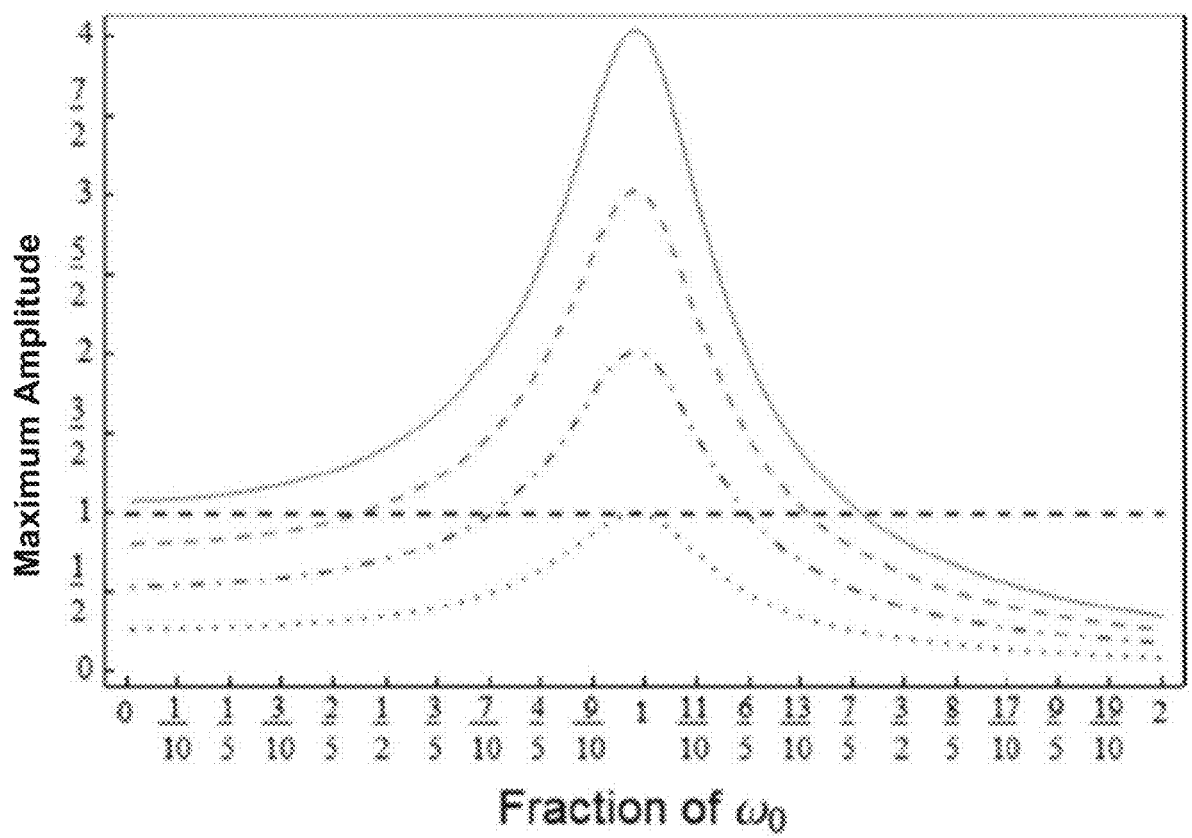
FIG. 105 is a graph of the frequency response curves for various systems of 150 Hz LRAs in accordance with aspects of the present disclosure.

In the specific case of the our first LRA model, MOD1, when the driving frequency is less than half of the resonant frequency, the steady-state maximum amplitude drops to roughly ¼ of the maximum resonance amplitude. Thus, with four parallel LRAs one can achieve the steady state maximum amplitude even when the driving force frequency differs greatly from the resonant frequency. In FIG. 105 we plot the frequency response curves for 1-, 2-, 3- and 4-LRA systems. The frequency response curves in FIG. 105 from bottom to top are: dotted: 1-LRA; dot-dashed: 2-LRA;

dashed: 3-LRA; solid: 4-LRA. We can see from the graph that even extremely low driving frequencies can result in amplitudes greater than the single-LRA resonant-frequency amplitude.

For the system of four 150 Hz LRAs using our LRA model, MOD1, the maximum amplitude while being driven at 1.5 Hz is still 6% higher than a single LRA being driven at its resonant frequency. The response of the 4-LRA system when driven at 1 Hz is almost 90% of the single-LRA amplitude at resonance.

Thus, rather than continually developing more and more exotic actuator solutions, one can use the SAVANT architecture to emulate an LRA with an arbitrarily large bandwidth and force output and/or arbitrarily short response time by adding together an arbitrary number of LRAs.

5. Spatial Mode

So far we have only considered parallel configurations of LRAs. But by orienting groups of LRAs along different axes and synchronizing their control schemes, we can also produce spatial vibrational effects. Examples of such effects are linear vibrations along any line within the space spanned by the vibration axes and circular or elliptical vibrations in any plane within the vibration-axes space. When the system of LRAs is working to produce a spatial vibrational effect, we say that it is running in spatial mode.

Start by considering the action of a single LRA. An LRA is effectively a spring whose mechanical vibrations are oriented along an axis. When the LRA is embedding inside a larger system, it tends to produce vibrations of that embedding system along the axis of orientation. Now add in another LRA: one whose axis of mechanical vibration is oriented perpendicular to the first LRA. Since any two non-collinear lines span the plane, it is not necessary for the two LRAs to be completely orthogonal, only that they not be completely parallel. We choose orthogonal examples for simplicity but more complicated control schemes for non-orthogonal actuators can be devised using the methods of linear algebra.

Figure 106:
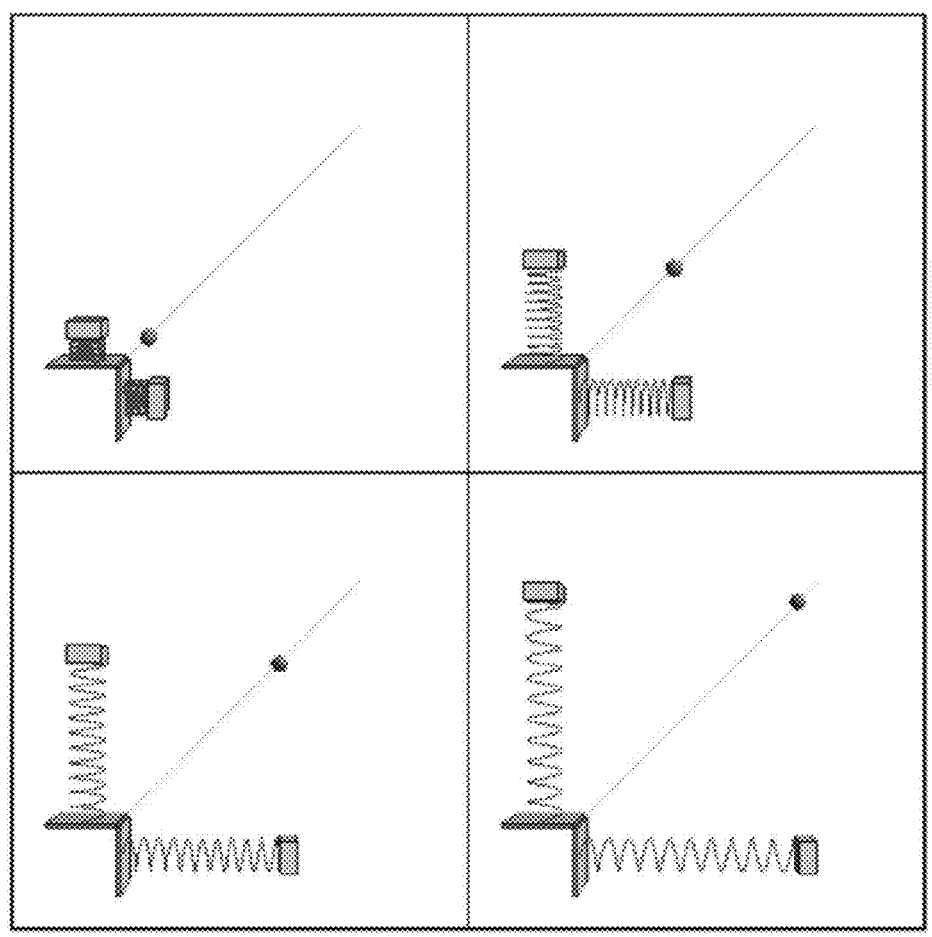
FIG. 106 represents four snapshot views of the resultant motion for two orthogonal springs driven with the same amplitude and phase in accordance with aspects of the present disclosure.

Each LRA will be vibrating along its own axis, but will each be applying a force to the embedding system. Since the forces they're applying are vectors, we need to take the vector sum to find the resultant force; and therefore the resultant motion of the embedding system. If these two identical, perpendicular LRAs are being driven by identical forcing functions, then the resulting motion of the embedding object will be sinusoidal in the plane spanned by the two axes of orientation. The motion of the embedding object will have an angular separation of 450 from either axis, effectively bisecting the vibrational axes (see FIG. 106). FIG. 106 shows the resultant motion for orthogonal springs driven with the same amplitude and phase. These four snapshots are taken from the steady state motion of two LRAs. The line represents the vector sum of the LRA displacements.

The angle of the resulting motion can be changed by changing the relative amplitudes of the forcing functions. If we characterize the resulting motion as the angle it makes with the horizontal axis, then any arbitrary linear motion can be achieved with forcing amplitudes proportional to $\{\cos(\theta), \sin(\theta)\}$, where the first is the forcing amplitude of the horizontal actuator and the second is the forcing amplitude for the vertical actuator. For the example above, we wanted an angle of 45°, $$\{\cos(45°), \sin(45°)\} = \left\{\frac{1}{\sqrt{2}}, \frac{1}{\sqrt{2}}\right\},$$

which means that we need to drive the actuators with the same forcing amplitudes. If instead we wanted to make an angle of 135°, i.e. the mirror-flip of the 45° example, we would drive them with amplitudes proportional to.

$$\{\cos(135°), \sin(135°)\} = \left\{-\frac{1}{\sqrt{2}}, \frac{1}{\sqrt{2}}\right\}.$$

Figure 107A:
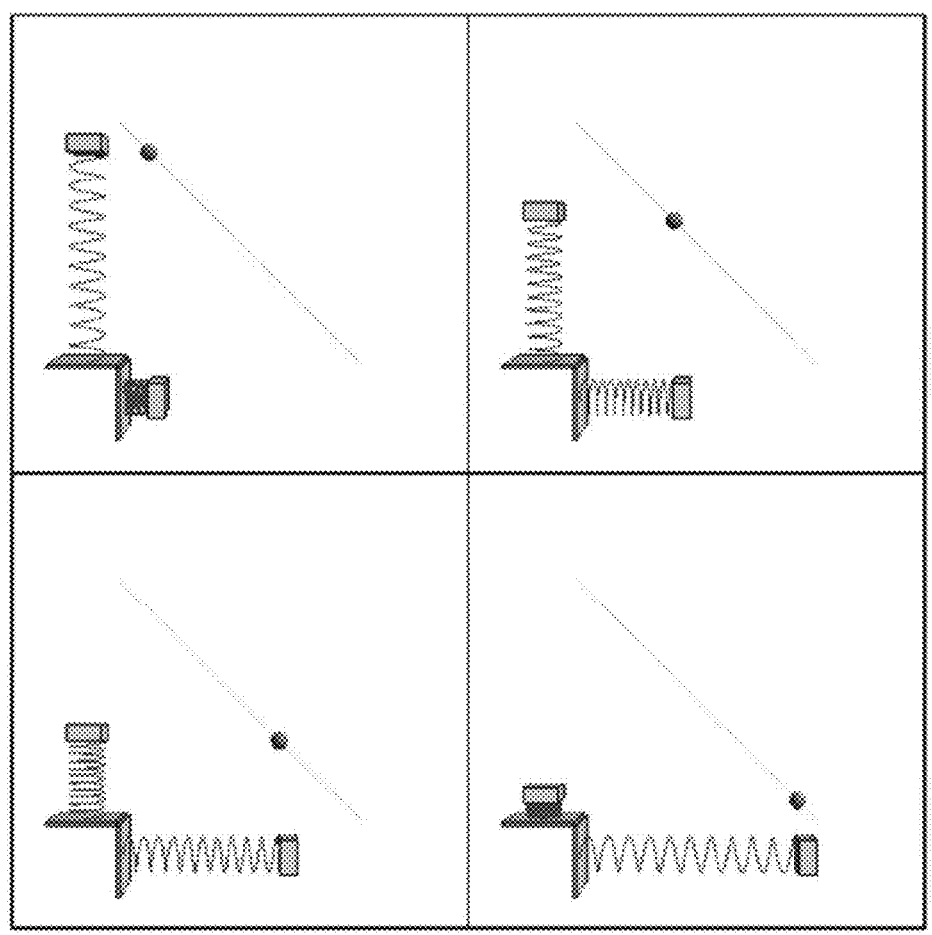
FIG. 107A represents four snapshot views of the resultant motion for two orthogonal springs driven with the same amplitude but out-of-phase by 180° in accordance with aspects of the present disclosure.

This effectively means we would drive them out of phase by 180°. FIG. 107A shows what the resulting motion would look like.

The direction of the linear motion can even be made to vary in time. In this case, the forcing amplitudes become proportional to $\{\cos(\theta(t)), \sin(\theta(t))\}$; where now the angle $\theta$ is taken to be a function of time. FIG. 106B shows a linear vibrational effect where the orientation of the line moves from horizontal to vertical. The time variation of $\theta$ can be a pre-defined function specified for particular user experiences or the value of $\theta$ can be continually or continuously updated by external sensors or user interface. An example of the latter would be a device with a linear vibrational effect that is always oriented north or along the radial line between the device and the center of the Earth. Another example would be a device with a linear vibrational effect capable of tracking an external object, such as a lost pet; or a location, such as a store in a mall.

Figure 107B:
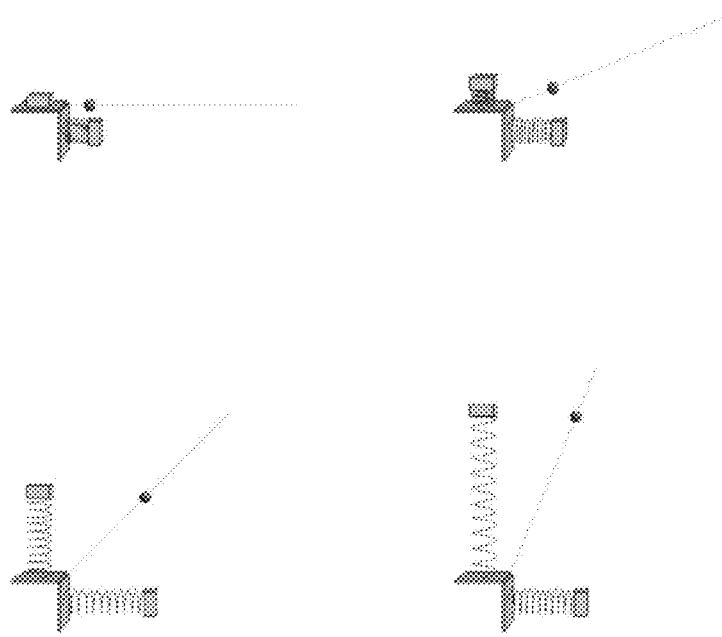
FIG. 107B represents four snapshot views of the resultant motion for two orthogonal springs producing a linear vibrational effect with a time-varying direction in accordance with aspects of the present disclosure.

In FIG. 107A we have an illustration of two orthogonal springs driven with the same amplitude but out-of-phase by 180°. In FIG. 107B (we have an illustration of a linear vibrational effect with a time-varying direction. The line represents the vector sum of the LRA displacements. The amplitudes are given by $\cos(\theta(t))$ and $\sin(\theta(t))$ where $\theta(t)$ is taken to be a positive, slowly oscillating function of time, for example:

$$\theta(t) = \frac{1}{2}(\cos(t/250) + 1)$$

Figure 108A:
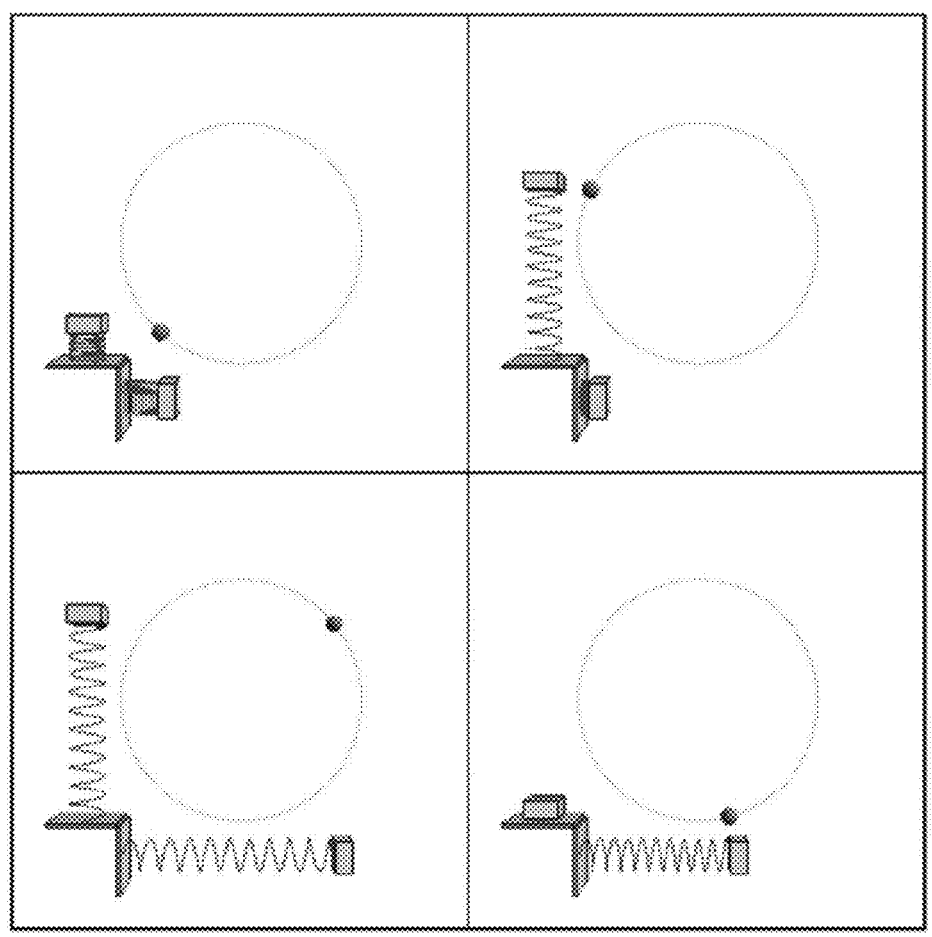
FIG. 108A represents four snapshot views of the resultant motion for two orthogonal springs driven with the same amplitude but out-of-phase by 90° in accordance with aspects of the present disclosure.
Figure 108B:
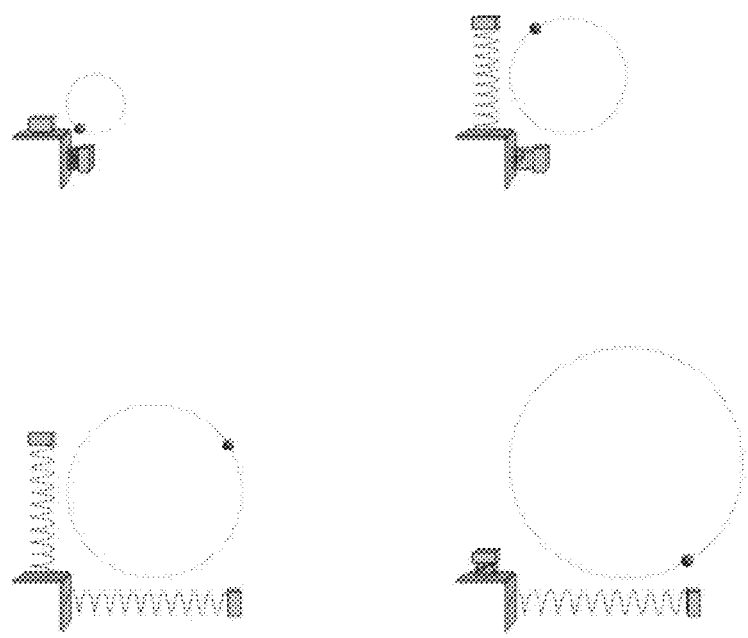
FIG. 108B represents four snapshot views of the resultant motion for two orthogonal springs producing a circular vibrational effect with time-varying radius in accordance with aspects of the present disclosure.

Instead of forcing the two orthogonal LRAs with the same phase but different amplitudes, we can also produce spatial vibrational effects by forcing them with the same amplitude but different phases. In the case above, forcing them with the same amplitude but relative phases of 180° again produced a linear vibration. Instead if we forced them with the same amplitude but relative phases of 90° we can produce circular vibrations, as shown in FIG. 108A. In the case of circular vibrations, the magnitude of the forcing amplitude will determine the radius of the circular vibration. The relative signs of the forcing amplitudes determine the direction of the rotation. In analogy with the linear vibrations of FIG. 107B, the radius of the circular vibration effect can be made to vary in time by varying the amplitudes. FIG. 108B shows a circular vibration effect with the radius increasing with time. Again the time variation of the control effect can be pre-scripted or it can be informed by external information.

Figure 109:
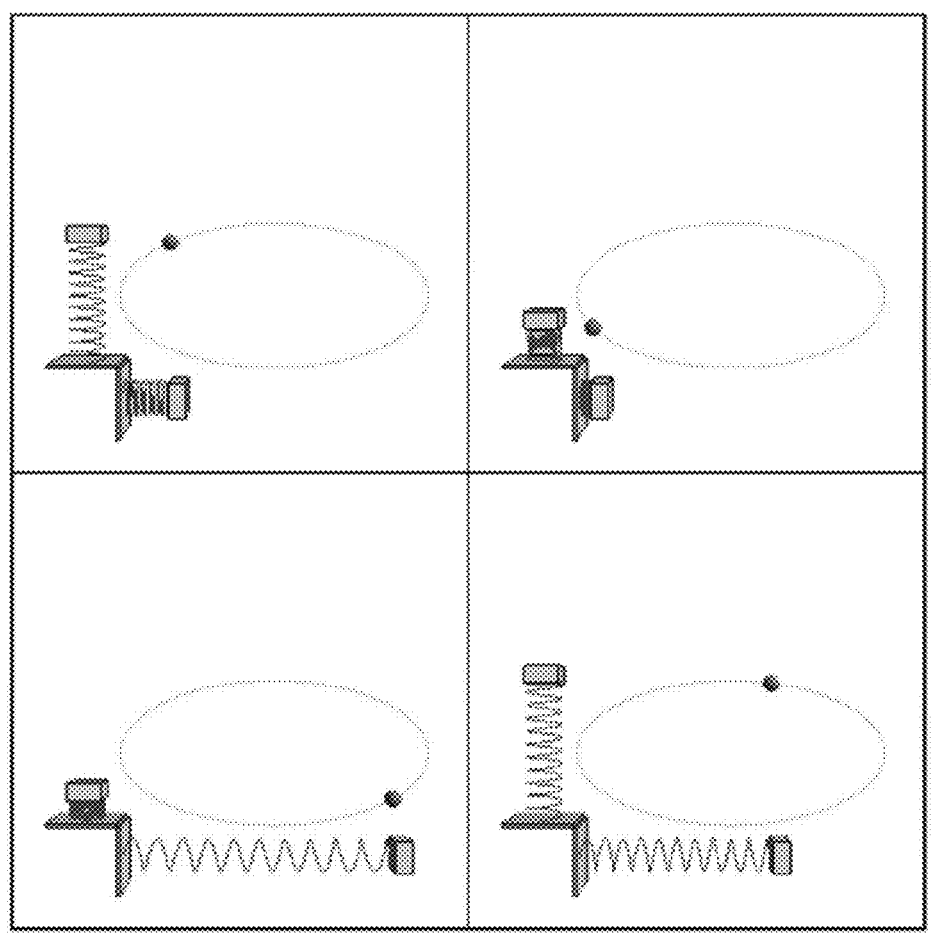
Figure 110A:
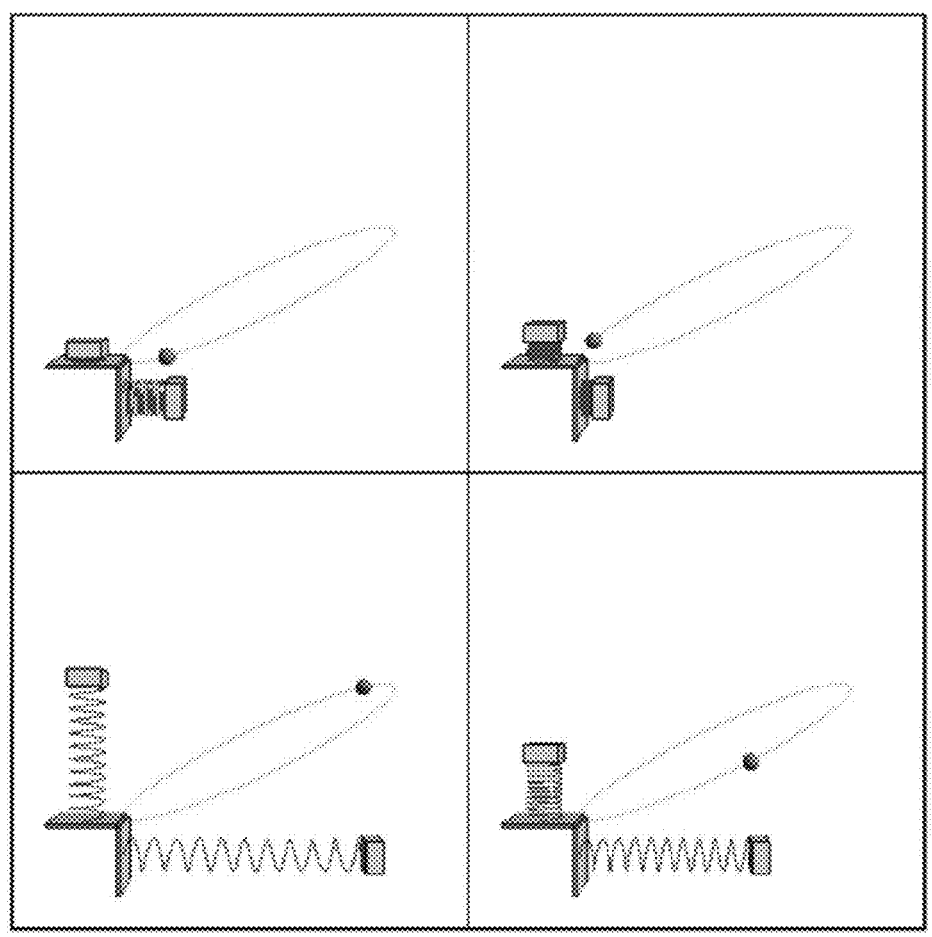
Figure 110B:
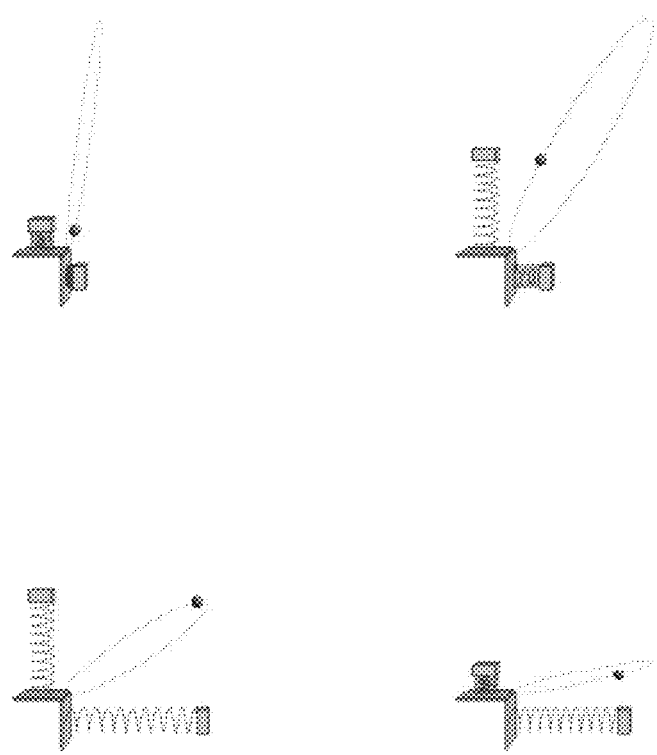

When the amplitudes of the two vibrational directions are different but they are still forced relatively out-of-phase by 90°, the resulting motion is elliptical, like that shown in FIG. 109. If we force the two LRAs with different amplitudes and different phases, then we can produce any generic elliptical pattern, as shown in FIG. 110A. We can also make this generic elliptical pattern change over time by making the phases and amplitudes time-dependent functions as illustrated in 110B.

The linear and elliptical vibration effects described above are created with proximal SAVANTs: groups of actuators (also known as SAVANT nodes) that are designed to have or appear to have point-like origination. Alternatively, one can create distal SAVANTs; which are which are groups of actuators that are separated physically but still physically attached together so as to create effects originating from multiple points or even extended geometries.

For an example configuration of distal SAVANTs running in spatial mode, consider a bar-like object with uniform mass distribution and two SAVANTs, one placed at either end. Each of the SAVANTs are oriented parallel to each other but perpendicular to the axis-of-symmetry of the object. If the SAVANTs are forced with the same amplitude but out-of-phase by 180°, they will produce a torque on the object, creating a rotational vibrational effect. In principle any arrangements of non-collinear (non-coplanar) LRA orientations will span 2-space (3-space), but maximal orientations will provide the easiest orientations. For proximal systems these will be orthogonal orientations; distal systems are often best implemented by orthogonal, triangular and tetrahedral configurations. Orientations along the edges of higher-vertex Platonic solids (e.g. a cube, an octahedron, etc.) could also produce robust haptic possibilities.

Lissajous and Geometric Transformations

Figure 111:
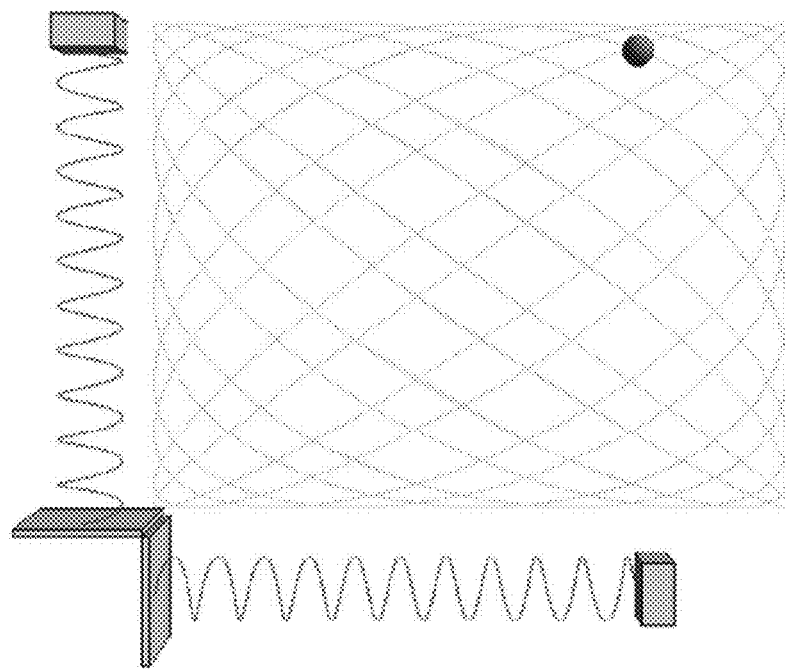

The above examples of the line, circle and ellipse vibration effects are members of the set of Lissajous curves (see FIG. 111). Various Lissajous curves may be synthesized by a SAVANT having a sufficient design and furthermore that geometric transformations including as examples: rotation, scaling and reflection may be used separately or in various combinations to synthesize a wide gamut of vibration effects. These geometric transformations may take place in a space of higher dimension than the Lissajous curve—for example, a linear vibration (1D) may be rotated in the plane (2D) or 3-space (3D) and a circular vibration (2D) may be rotated in 3-space (3D). Furthermore, a control effect may superimpose multiple Lissajous curves such that, for example, a helical vibration effect may be achieved by having one SAVANT subset generate a circular vibration of frequency ω and a second SAVANT subset generating a linear vibration also of frequency ω that is collinear with the circle's normal vector passing through its center of rotation.

These control effects may have parameters which control the geometric transformations, for example: rotation, scaling and reflection. The parameters may be constant or vary during the effect. The parameters may correspond to real-world events, such as having a consumer electronic device containing a SAVANT, such as a remote control, generate a circular vibration that scales in magnitude based on its proximity to a fixed point in space. Alternatively, a parameter may vary with the distance to a real moving target, or a virtual moving target may only exist as a computer-generated object that is rendered haptically, and which may displayed optionally simultaneously in other sensory modalities for example vision or audition.

In many instances of designing real-world devices, the designer may be required to fit the physical components of a SAVANT into a form factor that does not allow optimum orientations. However, as long as the displacement directions (or axes of rotation for ERM-type SAVANTs) are not collinear then one can still create control effects that span the plane by decomposing the motion vectors into orthogonal components using the methods of linear algebra. An example of this might be a hand-held controller (such as the Xbox 360 Wireless Controller from Microsoft Corporation) that includes two non-collinear ERMs whose design placement maximizes the user's proximity to the actuators. In this case the axes of rotation of the ERMs are not orthogonal nor are they collinear. Thus to create synchronized control effects for these two ERMs one must first decompose the relevant vectors into orthogonal components and then refine the orthogonal actuator control schemes accordingly.

6. Temporal Mode

Figure 112:
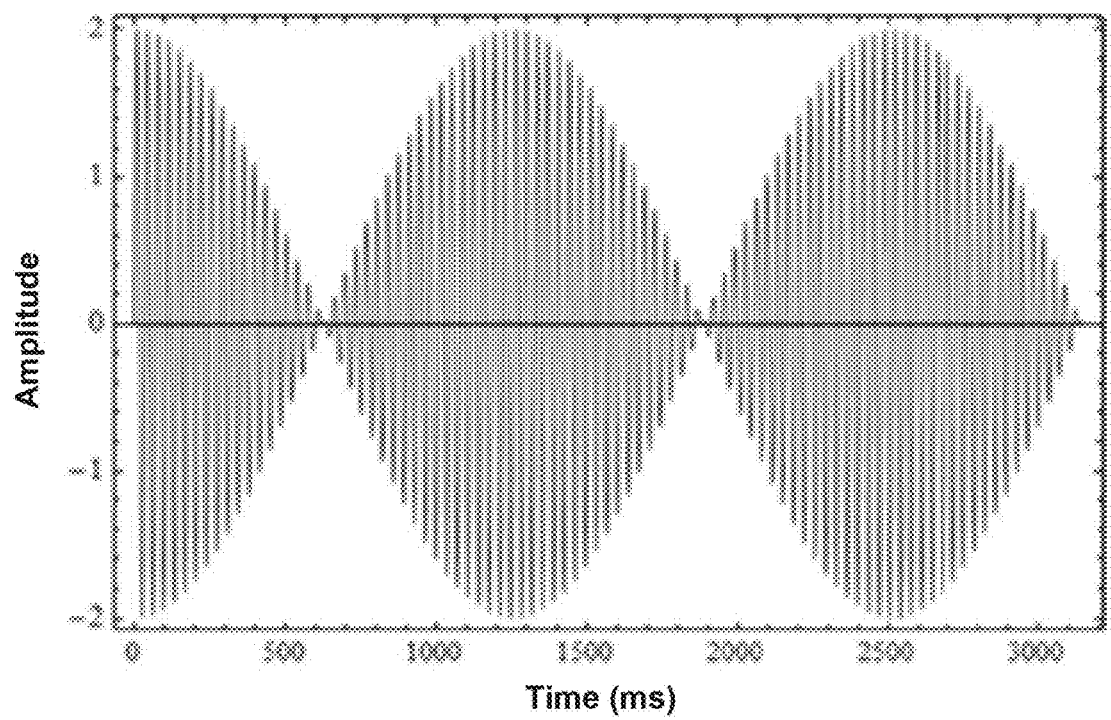

All of the SAVANT systems explored thus far have been homogeneous systems. We can also consider the possibilities offered by heterogeneous SAVANTs. For example, consider a system of two parallel LRAs: one with a resonant frequency of 175 Hz and one with a resonant frequency of 180 Hz. By driving them separately at their resonant frequencies, the resulting steady state motion will have a beat pattern, as shown in FIG. 112. In terms of the SAVANT architecture, when multiple actuators are driven together but at different frequencies, we refer to this as running the SAVANT in temporal mode. Running a SAVANT in temporal mode to create asymmetric waveforms allows for devices to create effects such as pulsating or jerky, inhomogeneous (though still periodic) motion.

Figure 113:
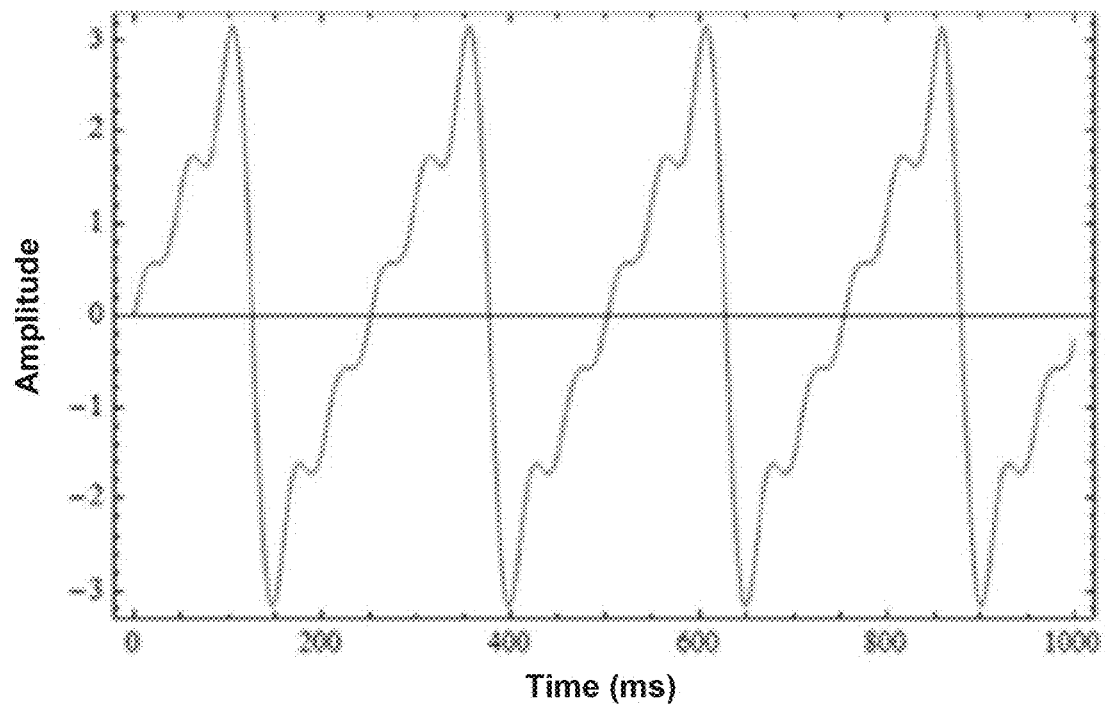

Generically the superposition of two oscillators oscillating at two different frequencies will result in a beat pattern. If the two frequencies are integer multiples of one another then the oscillators can be considered as part of a Fourier series. Fourier synthesis of multiple actuators driven at various harmonics of a given fundamental enables a device to approximate any (finite and bounded) vibrational output via Fourier decomposition. For example, FIG. 113 shows an approximation of a Sawtooth wave produced by the steady-state motion of five oscillators. The oscillators are each driven in multiples of the fundamental frequency, f0=25 Hz, and the amplitudes are given by the coefficients of the Fourier series approximation of the linear function f(t)=t. The curve represents the vector sum of the steady-state displacements of five parallel LRAs. The LRAs have resonant frequencies of 25 Hz, 50 Hz, 75 Hz, 100 Hz and 125 Hz and each is forced independently at its resonant frequency. The relative forcing amplitudes are: 2, 1, ⅔, ½, ⅖; and the relative phases are: 0°, 180°, 0°, 180°, 0°. These amplitudes are the coefficients of the first five terms in the Fourier series expansion of the function f(t)=t.

Prior to the introduction of the General Synchronized Vibration approach as described above and the SAVANT architecture, as described here, the capability to generate haptic vibration waveforms with many harmonics has been extremely limited due to the cost and availability of high bandwidth actuators such as Electro-active Polymers. But by creating synchronized systems of multiple lower-cost vibration actuators, one can leverage the increased bandwidth (see Section 3.2.4) to approximate arbitrary vibrational output by: computing the Fourier series of the function matching the desired output; truncating the series at the desired approximation; and then matching each term in the approximation to a SAVANT.

In the example of the Sawtooth wave above, instead of having five actuators—each with different resonant frequencies—one could instead have five SAVANTs. Each SAVANT would correspond to a term in the Fourier series approximation and each would be designed to provide the appropriate amplitude at the corresponding driving frequency. For example, the first term in the series is $$2 \sin\left(\frac{t}{40}\right),$$

where t is measured in milliseconds and the amplitude of 2 means twice the steady state maximum amplitude of the single 150 Hz LRA. Rather than building an LRA specifically designed to give the appropriate amplitude when driven at the frequency, a SAVANT of eight 150 HZ LRAs could provide the necessary output. The eight LRAs would effectively be a SAVANT running in magnitude and bandwidth modes. The remaining terms in the series approximation would each be created by a SAVANT in the same fashion.

Figure 114:
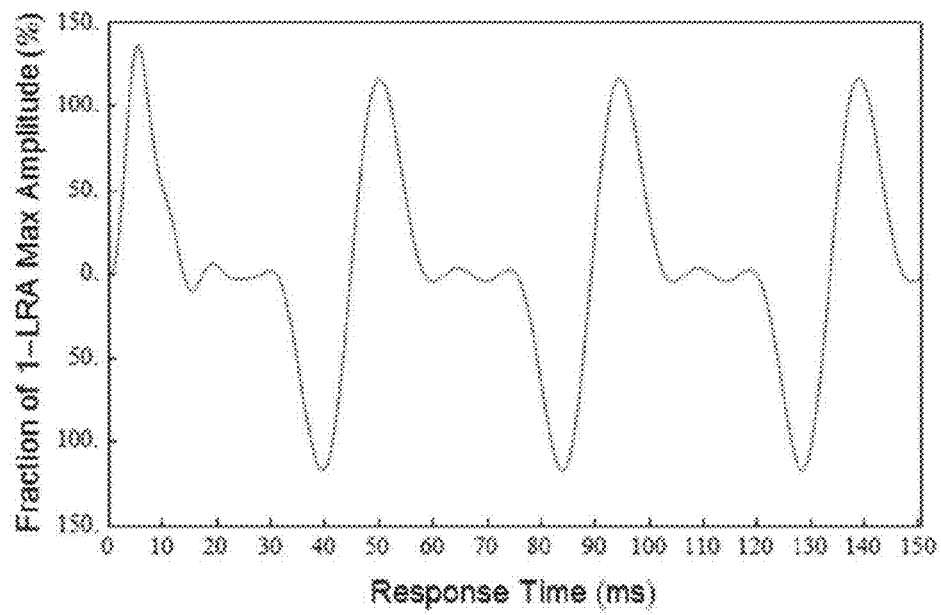
Figure 115:
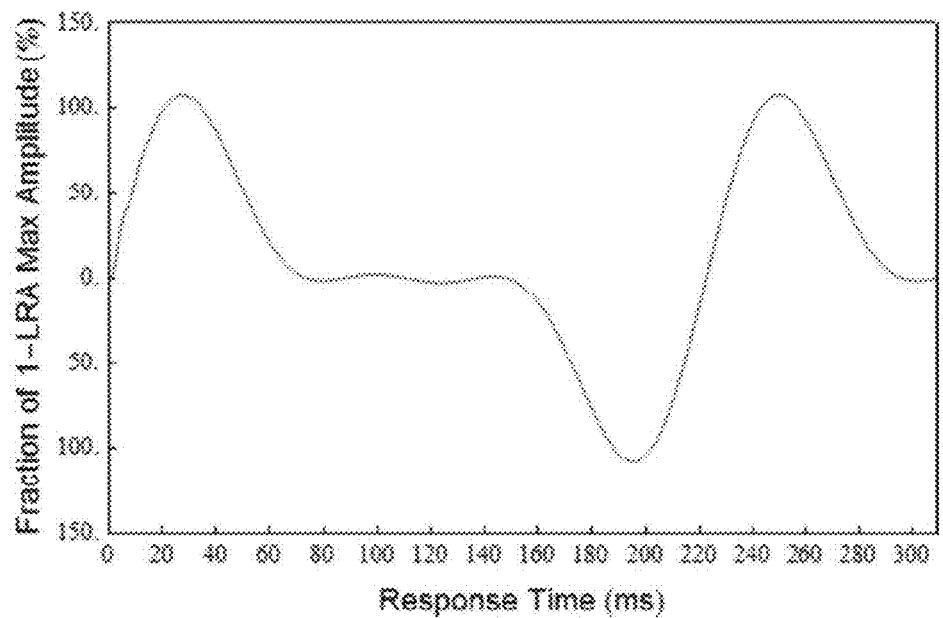

The bandwidth gains from just one extra parallel LRA are significant compared to the single LRA. In FIG. 114 we plot the vibrational effect resulting from the sum of three 2-LRA systems based on our LRA model, MOD1. The first 2-LRA system is being driven at a frequency $f_0=22.5$ Hz, the second and third at $f_1=2\ f_0$ and $f_2=3\ f_0$ respectively. The amplitudes for them are (respectively): 1, 1 and 0.4, in units of the 2-LRA maximum driving frequency. The resulting motion is a quick jerk back-and-forth followed by a rest. FIG. 115 shows the same 2-LRA systems being driven at 4.5 Hz, 9 Hz and 13.5 Hz. Even at these low driving frequencies, the maximum amplitude response is comparable to a single LRA being driven at resonance.

3. Example Control Sequences

In Section II above, we developed some of the individual advantages multiple actuator systems have over single actuators. We now describe how those advantages can be made to work together and lay the framework for how to create a SAVANT system that will produce any desired vibrational output. Any possible vibrational effect can be decomposed into the 6-dimensional control space of the SAVANT architecture. Vibrational effects are only limited by the number and relative orientations of actuators in the SAVANT. The relative orientations of the actuators in a SAVANT will dictate the spatial and temporal characteristics while the number of actuators oriented together in a given direction will determine the performance, bandwidth, magnitude and reliability characteristics.

We define a "control effect" as a set of predetermined sequences of control signals for each actuator in the array, such as the example effects in Sections II(B)(1)-(6) above. They can be triggered by a user interface with the device or by internal triggers, such as information from on-board sensors. Running a SAVANT in a single mode constitutes a control effect which makes use of a single dimension of the 6-dimensional control space. It is easy to construct control effects which simultaneously make use of multiple dimensions of the control space. We refer to these as multi-dimensional control effects.

h-Pulse

Figure 116:
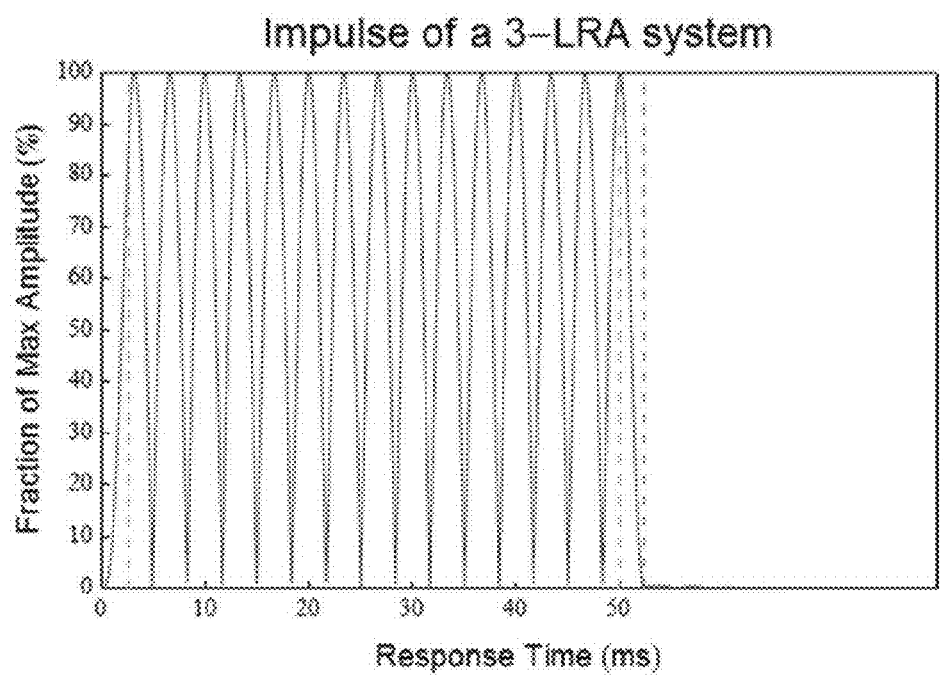

Control effects leverage the power of multiple actuators to produce desired mechanical responses without the limitations inherent to single actuators. Let us look at an example for the familiar 3-LRA case:

When the optimal response time control sequence outlined in Section II(B)(3) is used in conjunction with an optimal braking strategy, the resultant waveform is a sequence of an integer number of half-wavelengths. This entire control effect is referred to as an "h-pulse." An h-pulse is defined such that the system starts from rest, vibrates at the maximum amplitude for some time (with no ramp-up time) and then immediately stops vibrating. In FIG. 116 we plot the vibrational output for a 3-LRA system exhibiting an h-pulse. The control effect makes use of the optimal response of the performance mode and the optimal braking strategy. The curve represents the summed displacement of three in-phase LRAs. At t=0 ms, apply to each LRA a forcing function with amplitude 1. At t=2.57 ms change the forcing amplitudes to ⅓. At t=51.07 ms change the forcing amplitudes back to 1 and change the phase of each forcing function by 180°. At t=52.33° turn off the forcing functions.

Since the h-pulse control effect must go from maximum mechanical vibration to no vibration, it can have any duration that is an integer multiple of half-wavelengths. For a 150 Hz LRA, since there are two half-wavelengths per cycle, that means one can create h-pulses with durations n×3.33 ms, where n is any integer. This duration can be changed by using pairs of LRAs running in bandwidth mode and driving the SAVANTs at lower frequencies.

Amplitude Seeking

Figure 117:
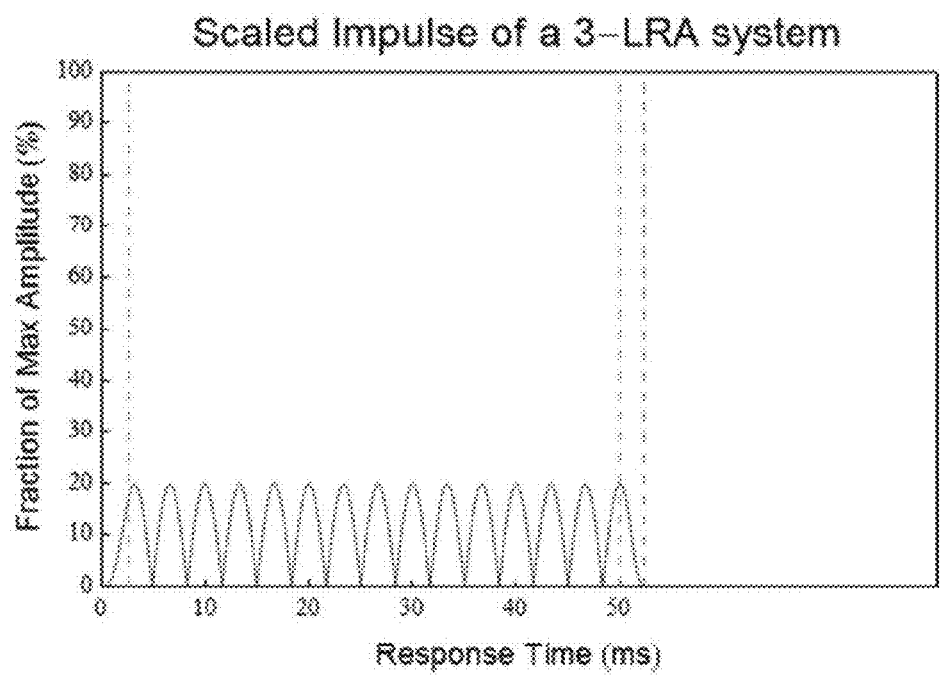

We can arbitrarily rescale an h-pulse by rescaling all of the forcing amplitudes in the control sequence by some scaling factor. This will allow us to have h-pulses of any arbitrary mechanical vibrational amplitude. For instance, in FIG. 117 we have scaled the h-pulse down to 20% of the maximum. Previously, the forcing amplitudes for each LRA were initially 1 (in units of the maximum forcing amplitude); at 2.66 ms the forcing amplitudes were dropped down to ⅓, at 51.07 ms they were shifted out-of-phase by 180° and at 52.33 ms they were set to 0. Now, to create an h-pulse scaled down by 0.2, the forcing amplitudes are initially $0.2 \times_1$; at 2.66 ms they change to $0.2 \times_{1/3}$, at 51.07 ms they are shifted out-of-phase by 180° and at 52.33 ms they are set back to 0. The control sequence is identical except that all forcing amplitudes are scaled by a factor of 0.2.

Figure 118:
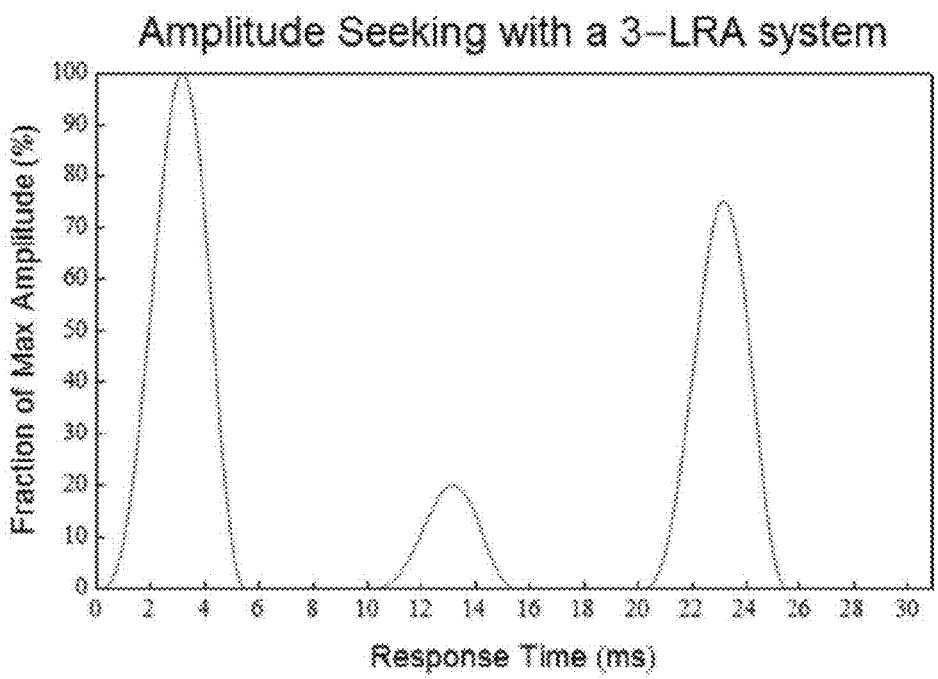

We can use sequences of scaled h-pulses to create an amplitude seeking control scheme, as shown in FIG. 118. Here the mechanical output of the system is a sequence of half-wavelengths, each of a desired amplitude. In this example we have specified the system to have mechanical amplitudes of 1, ⅕, and ¾ the maximum amplitudes. The scaled h-pulse control sequences were initiated at 0 ms, 10 ms and 20 ms and the system took about 3 ms to reach the desired amplitude. The curve represents the summed displacement of three in-phase LRAs. Each LRA is driven identically and the forcing amplitude can be represented as this piecewise function of time (where t is measured in milliseconds):

$$\mathcal{A}(t) = \begin{cases} 1 & 0 < t < 2.57 \\ \frac{1}{3} & 2.57 < t < 4.24 \\ -1 & 4.24 < t < 5.5 \\ 0 & 5.5 < t < 10 \\ \frac{1}{5} & 10 < t < 12.57 \\ \frac{1}{15} & 12.57 < t < 14.24 \\ -\frac{1}{5} & 14.24 < t < 15.5 \\ 0 & 15.5 < t < 20 \\ \frac{3}{4} & 20 < t < 22.56 \\ \frac{1}{4} & 22.56 < t < 24.234 \\ -\frac{3}{4} & 24.24 < t < 25.5 \end{cases}$$

The negative amplitudes can be implemented with positive forcing amplitudes but changes in the forcing phase by 180°. The forcing functions are turned off at t=25.5 ms.

It is possible to create amplitude seeking control sequences with even less time between pulses, but due to the overlap from previous pulses it requires a more detailed algorithm analysis.

Performance ⊗ Magnitude

A simple example of a multi-dimensional control effect is performance ⊗ magnitude (see the discussion below for an explanation of the tensor product notation). The purpose of performance mode is to have a faster response time than a single actuator; the purpose of magnitude mode is to have a stronger mechanical vibration than a single actuator. We can combine these modes when we want to mimic a single actuator that is both faster and stronger than any available component actuator. For the specific case of the 150 Hz LRA discussed above, it was found that the optimal response time required 3 LRAs. Let us then construct a system with 6 LRAs, all oriented along the same axis. We want to position the LRAs as tightly as possible so that the resulting effect will be as point-like as possible. To achieve the performance ⊗ magnitude control effect (assuming the LRAs are initially at rest):

1) Drive each LRA with a sinusoidal forcing function at the maximum amplitude. The phase won't affect the results much.
2) After some pre-determined optimal time τ, change the forcing amplitudes to ⅙ of the maximum amplitude. For the AAC ELV1411A 150 Hz LRA this optimal time is T=2.57 ms.
3) After the desired vibration duration, stop forcing the LRAs. The vibration will damp out in the same time it would take a single LRA to damp out. Alternatively one could apply a braking method.

We note that the control schemes can generically be broken up into two phases: intervals where the SAVANT is outperforming a single component actuator and intervals where the SAVANT is emulating a single component actuator.

Performance ⊗ Magnitude Revisited

We can use performance mode to create extremely fast response and braking times and these allows us to create scaled h-pulses. We can concatenate sequences of these scaled h-pulses to create haptic gradients. These gradients can be scripted effects triggered by sensor information or controlled by a user interface such as a touchscreen. Relying on peoples' inherent ability to detect gradients, these systems could be used as input devices or as devices that give location feedback for the vision impaired. We can make the mechanical output of these gradients arbitrarily large by using multiple 3-LRA systems, effectively leveraging the magnitude mode.

Figure 119:
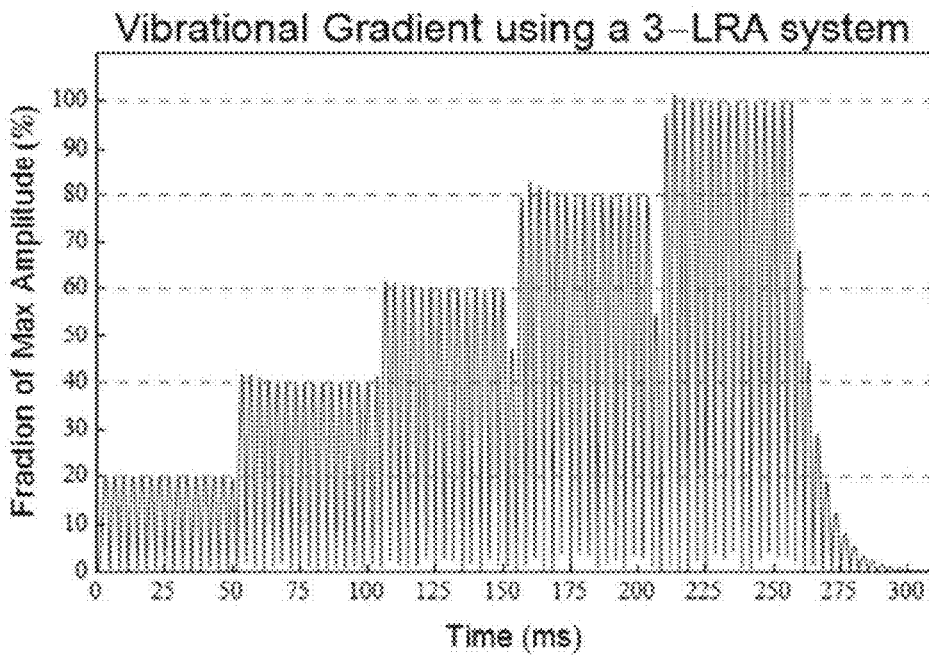

FIG. 119 shows an example of a vibrational gradient produced with a 3-LRA system. The mechanical vibration of the system is ramped up in discrete steps in response to a user input. The curve represents the summed displacement of three in-phase LRAs. Each LRA is driven identically and the forcing amplitude for each is represented as this piecewise function of time (where t is measured in milliseconds $$\mathcal{A}(t) = \begin{cases} \frac{1}{15} & 2.57 < t < 49.24 \\ \frac{2}{15} & 53.99 < t < 100.66 \\ \frac{1}{5} & 0 < t < 2.57 \lor 104.82 < t < 151.49 \\ \frac{4}{15} & 157.52 < t < 204.19 \\ \frac{1}{3} & 210.85 < t < 257.53 \\ \frac{2}{5} & 51.42 < t < 53.99 \\ \frac{3}{5} & 102.25 < t < 104.82 \\ \frac{4}{5} & 154.95 < t < 157.52 \\ 1 & 208.29 < t < 210.85 \end{cases}$$

The forcing functions are turned off at t=257.53 ms.

Bandwidth ⊗ Performance ⊗ Magnitude

The widths of the single-peak h-pulses described in the Amplitude Seeking subsection were set by the driving frequency. Those h-pulses were created by a SAVANT composed of three parallel LRAs. By adding another set of three parallel LRAs we can increase the vibrational magnitude and bandwidth of the SAVANTs. This will allow the SAVANTs to be driven at lower frequencies while still maintaining on-resonance amplitudes. In FIG. 120 we show the motion of a system composed of two 3-LRA systems. The control schemes for both 3-LRA systems are identical and the schemes are very similar to that described for the single-peak h-pulses; only the amplitude switching times have been changed. The major difference though is that in this case the LRAs are being driven at 25 Hz instead of the resonant frequency of 150 Hz.

FIG. 120 illustrates an Elongated h-Pulse created by 150 Hz LRAs using our LRA model, MOD1, driven at 25 Hz. The redundancy of LRAs allows the vibration amplitude to remain comparable to a single one of our LRA models, MOD1, driven at its resonance. Note that the force output is not comparable though because the force scales as the square of the oscillation frequency.

Even though the MOD1 LRAs in this group are being driven at ⅙$^{th}$ of their resonance frequency, their total vibration amplitude is still greater than a single LRA based on our LRA model, MOD1, vibrating at resonance. Note that the total force output of this group of LRAs based on our LRA model, MOD1, is not comparable to that of a single model LRA vibrating at resonance because the force output scales with the square of the vibration frequency. This control scheme is an example of SAVANTs utilizing bandwidth, magnitude and performance modes simultaneously. From the example multi-dimensional control schemes above that, given enough actuators, it is possible to simultaneously control a SAVANT in any subset of the six modes of the SAVANT architecture.

As mentioned above, a SAVANT may incorporate a wide range of vibration actuators including a linear resonant actuator which has a moving mass that oscillates back and forth along a linear path. Other actuators that are useful in a SAVANT include the actuators where the mass is constrained to rotate about a particular vibration axis, following a circular or semi-circular path. These rotational actuators include Eccentric Rotating Mass actuators, Pivoting Mass actuators, and Rocking Mass Actuators as have been introduced earlier in this disclosure. While a single linear resonant actuator can impart a force on the mounting plate it is attached to, a single rotational actuator can impart a torque onto the mounting plate it is attached to. As explained previously in this disclosure, the torques generated by one or more rotating vibration actuators when added with torques generated by one or more counter-rotating vibrating actuators can sum to a net force upon a mounting plate, for example in cases when the axes of rotation of the rotational actuators are arranged collinearly.

Current controllers, such as Nintendo's Wii Remote Plus motion controller and Sony Computer Entertainment's PlayStation Move motion controller, could be augmented at little cost to include a SAVANT that provides additional haptic cues and vibrations. These could be in addition to or instead of the ERMs currently in the devices. Though the incremental cost of adding controllers is small, the potential revenue from the expanded possibility of titles could be very high. Moreover, as other companies move towards controller-less motion controlled gaming and computing, haptic feedback provides an advantage for hand-held controllers. At the same time, it is possible though to develop wearable haptic devices, such as wristbands or belts incorporating SAVANTs, which provide spatial and directional feedback. These devices could be in addition to or in lieu of a hand-held controller.

Other wearable applications include a SAVANT incorporated into a vibration device contained within a wristband, an armband or a leg band. Still other examples of wearable applications include a SAVANT incorporated into a vibration device contained within wearable accessories such as a pair of eyeglasses, a pair of headphones or a hearing aid. Still further applications could include incorporating a SAVANT into a vibration device that is used for providing haptic feedback in a handheld stylus drawing or writing or pointing tasks.

Furthermore, SAVANTs can be incorporated into personal pleasure devices to increase the range of haptic vibration sensations for a person's body, for usage of such haptic vibration devices either externally or internally in relation to a person's body, or both. A SAVANT may be used for other hand tools and devices that are commonly used in construction; for example screwdrivers, hand-drills; pliers; and wrenches.

Another application might be a SAVANT in a device that augments reality for a non-sensory impaired person, or alternatively in a device that substitutes vibratory feedback and sensations for sensory modalities for which a person may have a deficit such as vision or hearing.

SAVANTs may be used to telepresence activities, such that a parent who is located in one city is able to hold a SAVANT enabled device, such as a game controller, that produces vibrations that correspond and convey, for example, to the respiration of the parent's child located in another city, or the heartbeat of a parent conveyed to the parent's child to enable a parent-child connection. A vibration device incorporating a SAVANT may be used to help generate calming vibration patterns for a person having Autism Spectrum Disorder. SAVANTs may also be used to generate vibrations in children's toys, for example inside plush toys, such as a teddy bear.

The SAVANT architecture is intentionally designed as a scalable network topology such that a first vibration device with a first embedded SAVANT may physically and logically interface with a second vibration device with a second embedded SAVANT such that the vibration controllers of both vibration devices could share sensors, data and control to establish a larger SAVANT device. In this fashion, the SAVANTs embedded inside various devices may be considered as modular vibration units that can be attached together to form larger SAVANTs with different and often more robust capabilities.

4. Additional Aspects of SAVANT

A. Discussion of Optimal Control Methods

It is clear from FIGS. 102-104 that additional sinusoidal forcing terms can change the relative heights of the response peaks, but they can't change the temporal distribution, regardless of the switching time $\tau$. This is because the forcing functions applied to each LRA all have the same frequency and phase. Thus before $t=r$, $$\frac{f_1 \sin(\omega_1 t + \phi_1)}{m} + \frac{f_2 \sin(\omega_2 t + \phi_2)}{m} + \ldots + \frac{f_n \sin(\omega_n t + \phi_n)}{m} = \left(\frac{f_1}{m} + \frac{f_2}{m} + \ldots + \frac{f_n}{m}\right)\sin(\omega_0 t). \quad \text{(Eq. 111)}$$

And after the switching time $\tau$, the left-hand side of Eq. 111 is merely rescaled by a factor of 1/n.

(Note that for all of the analysis in Section 3.2.3, we've only considered sinusoidal forcing functions with the phase $\varphi=0$. This phase will give you the fastest 3-LRA response because it allows the system to reach the maximum amplitude in the first half-cycle. For a 2-LRA system though, driving functions with a phase $\varphi=\pi/2$ give a slightly faster 90% max amplitude response time of roughly 4.8 ms.)

It is well known from the theory of linear differential equations that a sinusoidally-driven, damped harmonic oscillator has a response function whose frequency and phase are determined solely by the oscillator characteristics and the frequency and phase of the driving function. Additional LRAs only change the amplitude of the driving function (Eq. 111) and we're only considering identically LRAs in this particular analysis. Therefore, it is impossible to change the position of the first peak by adding or removing LRAs from the system. Hence, since the 3-LRA system has its first peak at maximum amplitude, the control method we propose here is the optimal control method, within the subset of control methods where each LRA is driven by a sinusoidal function with frequency $\omega=\omega_0$.

This analysis assumes that the maximum allowable driving amplitude is the steady-state maximum amplitude. Many actuators can be "over-driven" though; such that they can be driven beyond their steady-state maximum amplitude for a brief period of time. If this is a possibility then the 3-LRA optimal control scheme is equivalent to a 2-LRA control scheme where they are initially driven at 1.5× steady-state maximum amplitude or a single LRA that is briefly driven at 3×steady-state maximum amplitude.

I. Discussion of the Frequency and Amplitude Response Functions

When a harmonic oscillator-type vibration actuator is driven by a constant sinusoidal external force there are two functions that characterize the response of the vibration actuator. The first is the amplitude response, defined as how the amplitude of the resulting motion increases or decreases with time in the presence of an external driving force. For the previously discussed LRA model, MOD1, the vibration actuator reaches 10%, 50% and 90% of its maximum amplitude in roughly 1.53 ms, 6.05 ms and 19.75 ms respectively. Alternatively one could say that these happen in the first, second and sixth half-wavelength. It is desirable to achieve a faster amplitude response.

The second important relationship is how the amplitude responds to the driving force frequency. This relationship is called the bandwidth of the vibration actuator. We shall denote this as the "frequency response". Typically the amplitude responds maximally to the resonant frequency and the response diminishes as the driving force frequency diverges from the resonant frequency. Using the same 150 Hz LRA as mentioned above, the maximum amplitude response happens for a sinusoidal driving force with a frequency of 150 Hz, while a driving force with frequency 105 Hz only produces an amplitude of roughly half the maximum.

Each response function mentioned above is the result of inherent physical limitations associated with harmonic oscillators. These natural limitations of the vibration actuators can be mitigated by employing multiple vibration actuators in parallel. Without loss of generality we shall consider only identical vibration actuators though all that is discussed applies to a heterogeneous population of vibration actuators as well.

For example, when driven at resonance our model of an LRA, MOD1, reaches about 33% of its maximum amplitude in the first quarter-wavelength. Leveraging this fact, one can drive of our MOD1 model LRAs together at resonance and after one quarter-wavelength the summed response amplitude of the three LRAs will roughly be the same the maximum amplitude of any single MOD1 model LRA. Thus we say that these three LRAs can emulate a single LRA that has the maximum amplitude response in minimal time (that is to say, a quarter-wavelength, since for a harmonic oscillator starting from rest and driven by a sinusoidal force, the first quarter-wavelength corresponds to the first inflection point and therefore the first extremum of the motion).

The same approach can be applied to improving the frequency responses to overcome bandwidth limitations of any individual vibration actuator. Since a single MOD1 LRA responds to a 105 Hz driving force with roughly half its maximum possible amplitude, by driving two MOD1 LRAs together one can emulate the single LRA on-resonance amplitude even when driven at 105 Hz.

When one employs a collection of vibration actuators together to emulate a virtual vibration actuator possessing amplitude and/or frequency responses superior to any component vibration actuator in the collection, we denote this as running a SAVANT in performance and/or bandwidth mode respectively. A wide gamut of vibration output patterns can be built from amalgamations and concatenations of performance and bandwidth modes. These output patterns include, but are not limited to: immediate cessation of vibrations; discrete gradients of constant amplitude; and single, unidirectional h-pulses. Various scenarios and examples of control strategies are discussed below.

1) Combining multiple vibration actuators to emulate a vibration actuator with an amplitude response faster than any component vibration actuator. When the virtual vibration actuator goes from zero amplitude to its maximum amplitude within one quarter-wavelength. We denote this vibrational output as optimal amplitude response and the corresponding control strategy as the SAVANT OAR Control Strategy. When the virtual vibration actuator goes from its maximum amplitude to zero amplitude within one quarter-wavelength. We denote this vibrational output as optimal braking and the corresponding control strategy as the SAVANT OB Control Strategy.

2) Combining multiple vibration actuators to emulate a vibration actuator with a frequency response greater than any component vibration actuator, for any given sinusoidal driving force frequency.

3) Combining multiple vibration actuators to emulate a virtual vibration actuator that undergoes optimal amplitude response immediately followed by optimal damping. This effectively mimics a single vibration actuator that exhibits one half-wavelength of sinusoidal motion. We denote this vibrational output as an h-pulse and the corresponding control strategy as the SAVANT HP Control Strategy.

4) Combining multiple vibration actuators to emulate a virtual vibration actuator that exhibits successive h-pulses of arbitrary amplitudes. We denote this vibrational output as amplitude seeking and the corresponding control strategy as the SAVANT AS Control Strategy.

5) Combining multiple vibration actuators to emulate a virtual vibration actuator that undergoes optimal amplitude response followed by constant sinusoidal motion for N>1 half-wavelengths followed by optimal damping. This effectively mimics a single vibration actuator that exhibits N half-wavelength of sinusoidal motion with no periods of reduced amplitude at the onset or offset. We denote this vibrational output as an h-pulse and the corresponding control strategy as the SAVANT IMP Control Strategy.

6) Combining multiple vibration actuators to emulate a virtual vibration actuator that generates a sequence of h-pulses such that successive h-pulses differ in amplitude. The changes in amplitude may or may not be associated with information external to the vibration actuators, such as dynamic position or orientation information. We denote this vibrational output as a vibrational gradient and the corresponding control strategy as the SAVANT VG Control Strategy.

7) Combining multiple vibration actuators to emulate a virtual vibration actuator that exhibits a half-wavelength oscillation of arbitrary width. We denote this vibrational output as an elongated h-pulse and the corresponding control strategy as the SAVANT EHP Control Strategy.

8) Combining multiple vibration actuators to emulate a virtual vibration actuator that exhibits a superposition or sequential concatenation of any one or more of the above mentioned control sequences. This would include for example a control sequence consisting of a sequence of h-pulses with monotonically increasing amplitudes followed by an h-pulse of a given amplitude and duration followed by a sequence of h-pulses with monotonically decreasing amplitudes. This vibrational output is a template for haptically emulating the tactile feedback of a mechanical button press.

ii. Alternative LRA-Type Actuators

In the above analysis only a fitted model from data of the AAC ELV1411A 150 Hz LRA has been considered. There are many types of LRAs on the market today though, so it is instructive to test the robustness of the SAVANT architecture for different actuators. One can take same data from FIG. 101 but fit it to a hypothetical LRA with a resonant frequency of 175 Hz. We can then repeat the analysis for this hypothetical LRA; FIG. 121 and Table 102 are summaries of the results. Surprisingly we see that the relative gains are exactly the same as those for the 150 Hz LRA. Each of the three curves corresponds to a 1-LRA, 2-LRA or 3-LRA system. All LRAs are driven in-phase at 175 Hz. For the single LRA the forcing function is set to maximum at t=0 ms. For the 2-LRA system, at t=0 ms, each LRA is driven at maximum amplitude; at t=4.36 ms the driving amplitudes are set to ½. For the 3-LRA system, each LRA is initially driven at maximum at t=0 ms; and at t=2.18 ms the forcing amplitudes are set to ⅓.

TABLE 102

| | Response Times for Multiple LRAs-175 Hz | | | |
|---|---|---|---|---|
| Number of LRAs | 10% Max Amp. (ms) | 50% Max Amp. (ms) | 90% Max Amp. (ms) | Increase over 1-LRA |
| 1 | 1.33 | 5.19 | 16.93 | 0% |
| 2 | 1.01 | 2.02 | 5.16 | 69.5% |
| 3 | 0.87 | 1.64 | 2.29 | 86.5% |

Response times for 1-LRA, 2-LRA and 3-LRA systems based on fitted model of a 175 Hz LRA.

iii. Optimal Braking Methods

For a given control effect, it is possible to predetermine the optimal braking strategy such that the effect can be halted as quickly as possible. This will usually involve using a forcing (braking) function that is 1800 out-of-phase with respect to the initial forcing function. For the familiar case of the our model LRA, MOD1, the optimal braking method to go from maximum mechanical vibration to effectively zero mechanical vibration is shown in FIG. 122. Each LRA in the system is initially forced with an amplitude of ⅓, mimicking the output and response time of a single LRA. A signal is sent at 50 ms to initiate the braking control sequence, as indicated by the second dashed line. At 51.07 ms the forcing functions are shifted out-of-phase by 180° from the original forcing functions, effectively forcing the LRAs with negative amplitudes. At 52.33 ms the forcing amplitudes were set to 0, as indicated by the third dashed line. Because the mechanical output goes from maximum to effectively zero in a quarter cycle, for the parallel 3-LRA system there is no control sequence that will brake the system faster.

FIG. 122 illustrates Optimal Braking of a 3-LRA System. In this case, the braking strategy effectively fully damps the mechanical vibration within a quarter-cycle. The curve represents the summed displacement of 3 LRAs driven in-phase. At t=0 ms each LRA is driven at ⅓. At t=51.07 ms each driving amplitude is set to 1 and the phases are changed by 180°. At t=52.32 ms the forcing functions are turned off.

iv. Example Operational Process

An example process according to the above is presented by the following steps

Step 1) Select a desired output waveform.

Step 2) Define a collection of harmonic oscillators to emulate the desired waveform.

Step 3) Set up the equation of motion for the collection of harmonic oscillators, with each driven by its own input function. For any set of identical oscillators this reduces to a single equation driven by the sum of the relevant component input functions. Each discontinuous change in the desired output waveform will generically correspond to a discontinuous change in the input functions. For harmonic oscillators with resonant frequency, $f_0$, the times at which these changes in the input function should happen is generically of the order before each discontinuity.

Step 4) Solve $$\frac{1}{2\pi f_0}$$

the equation of motion with a defined set of initial conditions. For a collection of n oscillators trying to emulate a single oscillator with maximum amplitude A, typical initial conditions for various desired effects are: +m A for immediate maximum amplitude; —m A for immediate minimum amplitude (stopping or braking); +A for steady state A; 0 for no amplitude. The necessary number of oscillators needed in order to immediately reach the emulated maximum amplitude within half a wavelength is defined by the characteristic amplitude response function for the oscillator. For our model LRA, MOD1, this number is 3 because in half of a wavelength that particular LRA model has reached about 33% of its maximum amplitude.

Step 5) Slowly vary the amplitudes and/or discontinuity times in the input function until the solution matches the desired output waveform to a sufficient degree of accuracy. Computational tools such as Java applets or Mathematica DynamicModules from Wolfram Research can facilitate this process by enabling smooth manipulation of the input function parameters, as shown in FIGS. 97-100. (Note that the resonant frequency for this oscillator is 150 Hz, which gives $$\frac{1}{2\pi f_0} = 0.00106103 s.)$$

V. Tensor Product Notation

The "circle times" symbol used in Section 4, $\otimes$, is a symbol used to indicate the tensor product of vector spaces. We are using this notation in a similar fashion to how it is used in quantum mechanics. In quantum mechanics the tensor product is used to describe the resulting multi-particle states available to two or more interacting or entangled particles. If one particle is in state a and another is in state b, the two-particle state would be labeled by a $\otimes$ b. It represents all possible multi-particle states available given the two particles that make up the state. In the case of SAVANT, each SAVANT is like a quantum particle with available states and the tensor product of those SAVANTs defines the vector space of control effects available to the system.

For example, consider a collection of six parallel LRAs. We can choose to group these LRAs into two groups of three. Each group of three will be referred to as a SAVANT. We can individually (and independently) run each SAVANT in performance mode to emulate a single LRA with enhanced response time. If we choose to synchronize the control of each SAVANT though, such that they are both driven in performance mode at the same time and with the same phase, we would effectively be running the two SAVANTs in magnitude mode. To denote the fact that the individual LRAs in simultaneously in both the performance "state" and the magnitude "state", we would say that they are being driven in performance $\otimes$ magnitude.

The notation is used for convenience and is not intended to be completely analogous to its usage in tensor algebra.

III. Incorporating a SAVANT into a Module 1.1 the Need for SAVANT Integrated Modules An important means to advance SAVANT technology into systems designed for a variety of applications, especially haptic applications, is to encapsulate and hide the complexity of one or more SAVANT nodes by placing technology inside a module that provides three defined interfaces: 1) a physical interface for rigidly attaching or docking the SAVANT integrated module to other SAVANT integrated modules or other objects; 2) a power interface for powering the SAVANT integrated module; and 3) a communication interface to allow external devices and services such as computers, external timing sources or services, other SAVANT integrated modules, and sensors to interface with the SAVANT integrated module. Within the SAVANT integrated module, a variety of necessary components are integrated together to achieve the functionality needed by a product designer, while hiding the complexity of the implementation from the product designer. Furthermore, the three interfaces for a given SAVANT integrated module can be defined and published independently of the implementation of the functionality of the module—thus allowing the products and the implementation of the functionality of the modules to coevolve via standardized interfaces. Moreover, the defined interfaces allow multiple manufacturers to develop their own implementations of given SAVANT integrated modules, thus permitting competition in the marketplace. These combined advantages should enable an optimized SAVANT integrated module to be manufactured at a low cost when produced in large scale.

The technology integrated into a SAVANT integrated module may include: vibration actuators which can be precisely attached and aligned to the module housing; a microcontroller or other microprocessor, DSP, FPGA, etc.; sensors needed for closed loop control of actuators and the associated sensor conditioning electronics; power electronics including H-bridges or their equivalents for allowing control of the vibration actuators. Additional components that may be optionally included and integrated into a SAVANT integrated module to provide even more functionality may include wireless communication such as a ZigBee low-power radio and energy storage such as a rechargeable battery, capacitor or supercapacitor.

2.1. The SAVANT Integrated Module Physical Interface

It is useful to motivate and illustrate the physical interface through the example of LEGO® bricks. LEGO building blocks have a well-defined physical interface, namely the precise size of the brick studs and their corresponding holes; the arrangements and precise spacing of the studs and the holes; and the high manufacturing precision such that the manufacturing tolerances are measured in microns. Thus a LEGO enthusiast is able to construct his or her LEGO visions without any tools other than his or her hands and achieve a result having exacting precision, and furthermore LEGO bricks from decades ago are still able to physically interface with LEGO bricks of today.

Since the SAVANT architecture encompasses an array of vibration actuators, it is desirable to have a similar physical interface that will provide high precision alignment of the actuators (and their associated moving masses) inside the SAVANT integrated modules as well as a physical interface that will allow precise attachment of SAVANT integrated modules to a housing, other SAVANT integrated modules or various other attachment objectives. The physical interface can enable attachment in multiple orientations and translations.

2.2. The SAVANT Integrated Module Power Interface

The power interface provides external power for the internal components of the SAVANT integrated module—and in the case of a SAVANT integrated module that is designed to not only transduce electrical power to mechanical vibration, but also transduce mechanical vibration into electrical power it may also supply power externally while acting as a generator or when providing power from energy storage within the SAVANT integrated module that has been charged via harvesting vibrational energy. The power interface definition includes a physical connector as well as power specifications.

2.3. The SAVANT Integrated Module Communication Interface

The communication interface allows the SAVANT integrated module to communicate with an external host computer, the cloud, the internet, various services such as a time reference service, other SAVANT integrated modules, a variety of sensors and human interface devices, etc. The communication interface includes the definition of an interface connector; signal characteristics and specifications, as well as communication protocols and specific calls that may be made. Another key capability of the communication interface is to allow an external timing source or time reference that may be an absolute time or a relative time. One SAVANT integrated module may also act as a timing source or time reference to other SAVANT integrated modules. The precise synchronization of vibrations of a SAVANT integrated module with other modules and other temporal events may be an essential capability.

Since SAVANT integrated modules may be used for critical applications such as alerting mechanisms worn on a person's body or perhaps even implanted inside a person's body, the identification and authentication of external computers, external sensors, timing sources or other SAVANT integrated modules may be essential to avoid malware and malicious access to a SAVANT integrated module. Furthermore, each SAVANT integrated module can have a globally unique identifier such as a serial number for addressability. SAVANT integrated modules can have renewable security so in the event that security on the device has been compromised the security can be renewed, or alternatively or additionally the security may be periodically or even aperiodically renewed. Communication with the SAVANT integrated module may be encrypted and messages may be digitally signed to ensure system security.

2.4. Examples of Haptic Scale SAVANT Integrated Modules

Although SAVANT integrated modules may be built at a variety of dimensional scales for different applications, we will now introduce various examples and embodiments at the haptic scale for this inventive disclosure.

2.4.1. "Divide and Sync" Dual ERM SAVANT Integrated Module for Game Controllers

Contemporary game controllers often incorporate two ERMs, one with a large eccentric rotating mass, the other with a small rotating mass, to generate a large variety of vibration or "rumble" effects that enhance a player's experience. The rumble motors provide vibrations ranging from around 15 Hz to 45 Hz.

It is desirable to significantly increase the gamut of vibrational output, while simultaneously ensuring that legacy vibration effects can be emulated, new vibration effects can be synthesized, and directional haptic cues may be produced.

One example embodiment for achieving these goals is to replace a single ERM with a SAVANT node that includes two interleaved and synchronized ERMs of approximately half-size and not only emulate both the large ERM and the small ERM, but perform many other haptic effects, including haptic cues for direction. With suitable engineering and sufficient production volume it is feasible to have the half-sized interleaved pair of ERMs be around the same size and weight as a single ERM, and also have similar power consumption when emulating a single ERM.

Our general concept here is: "Divide and Sync"; that is to say, divide a motor into two approximately half-sized motors; divide an eccentric rotating mass into two interleaved approximately half-sized eccentric rotating masses;

and then use closed loop control to synchronize the motions of the two eccentric rotating masses.

Continuing on with the half-sized interleaved pair of ERMs, we can encapsulate the SAVANT and a controller, position sensors, sensor conditioning electronics, H-bridges, etc. into a small module about the size of a conventionally sized game controller ERM. Typically pulse-width modulation is used to convey a motor speed to each game controller ERM, for example with digital values ranging from 0-255. It is possible for the module to accept a PWM input, integrate that to a voltage level, and map that to the correct frequency and magnitude of vibration. An additional input to the module can determine whether it should emulate, for example, either a small or large eccentric rotating mass.

Some people who play videogames play with the vibration completely off since they believe that the vibration interferes with their ability to aim and distract their attention. With conventional ERMs the frequency and the vibration magnitude are locked together, and thus a gamer cannot reduce the vibration amplitude level without correspondingly reducing the frequencies of the haptic effects. With a half-sized pair of interleaved rotating masses it is possible to have a global vibration amplitude level parameter set by the user in the game options menu so that a gamer may increase or decrease the amplitude of the haptic vibration effects without altering the frequency characteristics of those effects.

Since our perceptual system has a nonlinear response to stimuli, including haptic stimuli, it is further possible to have the global amplitude parameter input to a SAVANT integrated module be mapped nonlinearly to control the magnitude of vibration to appear natural.

The half-sized interleaved pair of ERMs can be incorporated into a SAVANT integrated module for internal integration into a game controller or external integration via an expansion port.

The divide and sync module could also be designed into the game controller itself. One example embodiment is shown in a few views in FIGS. 200a, 200b and 200c. In this embodiment, one divide and sync module is in each hand grip, in the locations typically occupied by one large and one small ERM. In addition, another divide and sync module is placed in the center of the game controller. Other example embodiments include any and all combinations of the three module locations shown in FIGS. 200a, 200b and 200c, as well as in additional locations as permitted by the design of the game controller.

2.4.2. Single ERM Rumble SAVANT Integrated Module

Another SAVANT integrated module for rumble applications is a single, full-sized ERM having either a large or small mass, which is capable of synchronizing with other SAVANT vibration actuators. Although a single ERM module does not have the capabilities of the above described "Divide and Sync" SAVANT integrated modules, it is less expensive and may be a way for game console manufacturers to at least begin to make SAVANT capable game controllers. These SAVANT integrated modules could emulate PWM speed control, but also have the capability for position control, thus allowing the module to be part of a larger SAVANT. The ERM can be incorporated into a SAVANT integrated module for internal integration into a game controller or external integration via an expansion port.

2.4.3. Single Balanced Rotating Mass SAVANT Integrated Module

A final example of a SAVANT integrated module for game controllers may be a rotationally symmetric mass designed for high-speed rotational inertia applications. High-speed rotational inertia might only require speed control rather than position control. The rotational inertia might be switched on inside a game controller, for example, when emulating a Star Wars type Light Saber. Another application might be not for games but rather for stabilization of a handheld apparatus such as a handheld camera or game console. ERMs are exceptional at producing high vibration forces out with a relatively small power input. This balanced rotating mass designed for high rotational inertia can be incorporated into a SAVANT integrated module for internal integration into a game controller or external integration via an expansion port.

2.4.4. "Divide and Sync" Dual ERM Scale SAVANT Integrated Module for Mobile Devices Since consumers often prefer thin form factors for smartphones, tablets and other mobile, portable devices it is desirable to have thin components, including vibration actuators. One means for doing this is to take the eccentric rotating mass of an ERM vibration actuator and divide it in half, and place half on one side of the motor shaft and bearing; and half on the other side of the motor shaft and bearing. This has the advantage of reducing the cantilever effect upon the bearing though the equal distribution of the eccentric rotating mass, and also reduces the radius needed for the eccentric rotating masses. The ERMs in a smartphone typically rotate about up to 175 Hz which is much faster than the ERMs used for rumble effects in game controllers.

This is halfway there to our "Divide and Sync" strategy. By driving the split eccentric rotating masses by two half-sized motors it is possible to not only emulate a traditional mobile phone ERM, but also produce new haptic effects, and directional haptic cues, as will be later shown in this inventive disclosure. At this scale it may be unnecessary to interleave the eccentric rotating masses since the parasitic torque effect is likely to be very small. These can be incorporated into a SAVANT integrated module for internal integration into a smartphone or external integration via an expansion port.

3. Parasitic Torque from Dual ERMs and how to Avoid or Eliminate it Through the Interleaving of Eccentric Rotating Masses As shown in FIG. 123A by the arced arrows, when two co-rotating ERMs co-rotate, the forces shown as 1 and 2 combine. By varying the phase between the ERMs, the total force output is adjustable. This can be used to create high fidelity haptic effects and cues. For instance, as shown in FIG. 123B, a small phase angle may result in a high force output. And as shown in FIG. 123C, a large phase angle may result in a low force output.

When the ERMs are in phase, the forces align and produce double the force of one ERM. When the ERMs are out of phase, the forces point in opposite directions, as shown in FIG. 123D. However, if the ERMs are separated by a distance D, the forces do not exactly cancel out. Rather, as shown in FIG. 123E, the forces from the two ERMs out of phase produce a "parasitic torque", which is generally undesirable for haptics.

As shown by FIG. 123F, when holding a device, parasitic torque is felt based on the distance W between contact points. Examples of this are shown in FIGS. 124A-B, which illustrate situations with varying distances (D) between the ERMs and distances (W) between the contact points. These two examples show that as the ratio of D/W gets larger, the more pronounced the effects of parasitic torque. And that if the ratio of D/W were small enough, the parasitic torque would be negligible.

One solution, as shown in FIG. 125A, interleaves the ERMs and brings the center of the masses into the same plane. In this case, D is equal to zero, which means there is no parasitic torque as shown in FIG. 125B.

Thus, it can be seen that co-rotating, co-axial ERMs can produce high fidelity vibration effects. Axial separation between the ERMs can diminish the quality of the vibration effects due to parasitic torque. By interleaving the ERMs, the parasitic torque can be eliminated, resulting in the highest quality effects.

4. Mass Production of Interleaved ERMs

One example of how interleaved ERMs could be produced in large volume is now addressed. Key features of the finished product include: interleaved eccentric masses; balanced as an assembly; and integrated position sensors. As will be explained, this process is scalable to very small ERMs that can be used in cellular phones and other portable mobile devices.

Figure 126A:
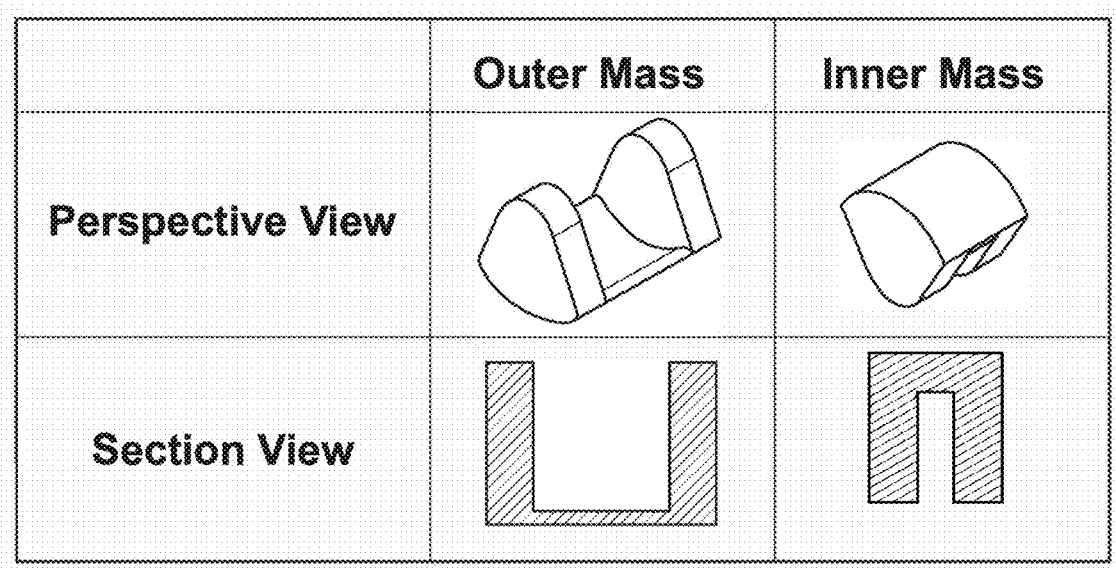
Figure 126B:
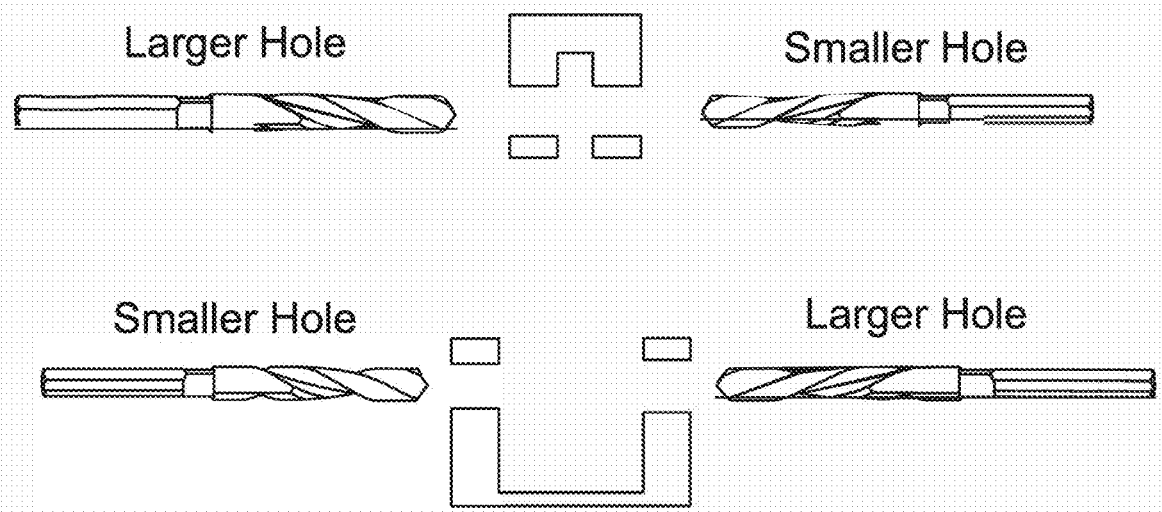
Figure 126C:
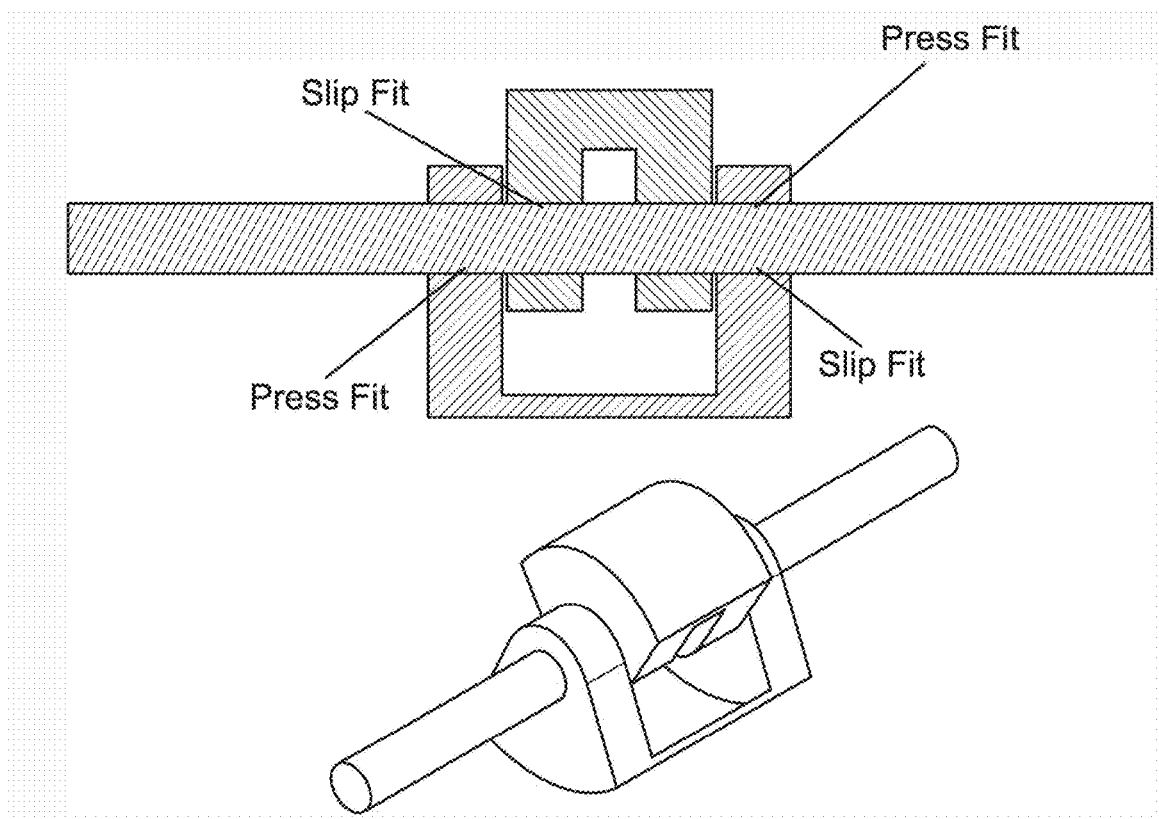
Figure 126D:
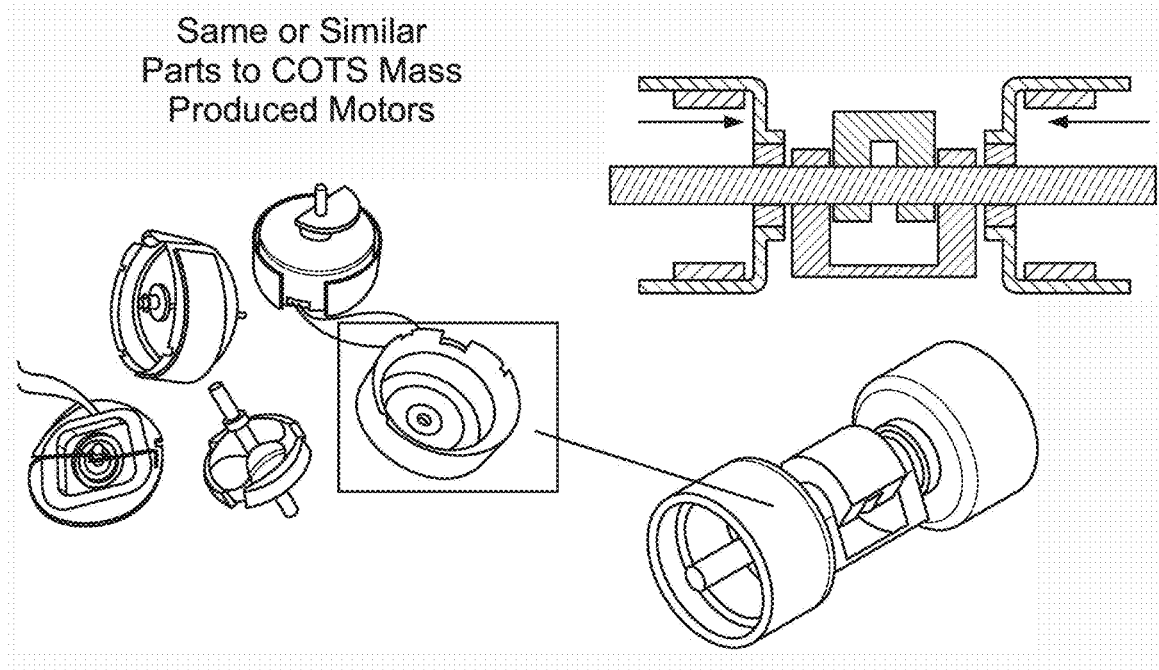
Figure 126E:
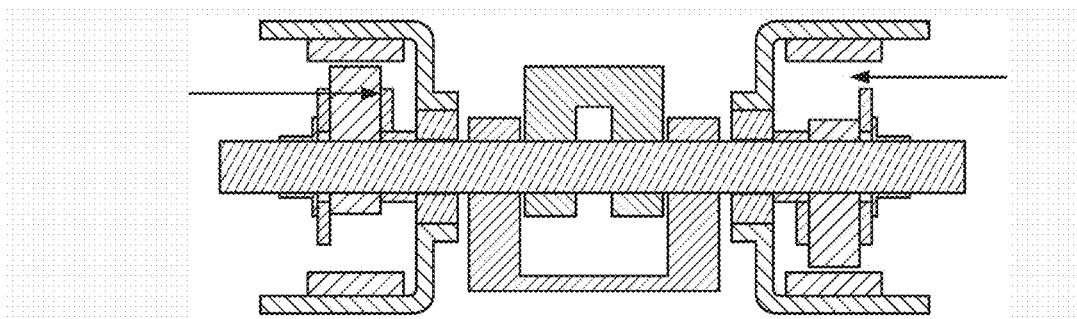
Figure 126F:
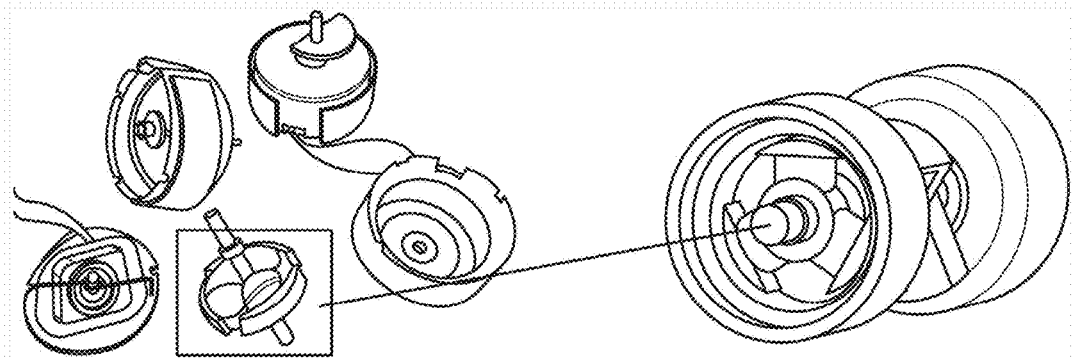
Figure 126G:
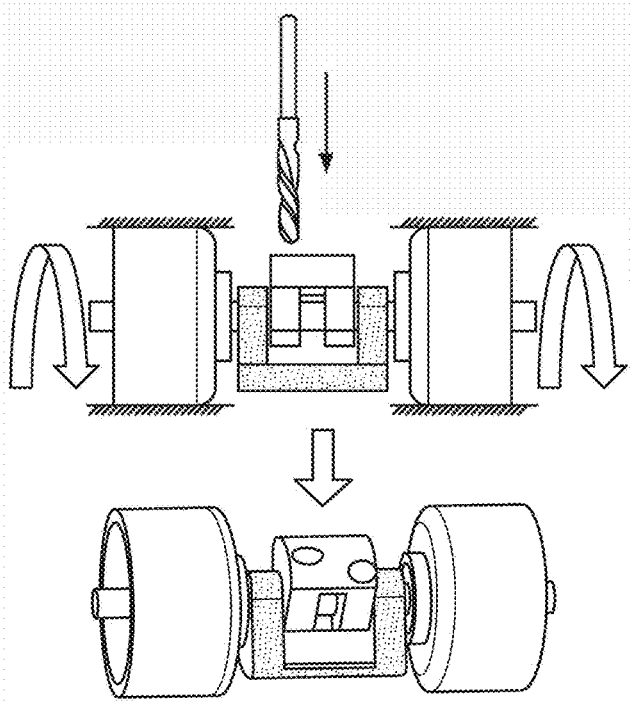
Figure 126H:
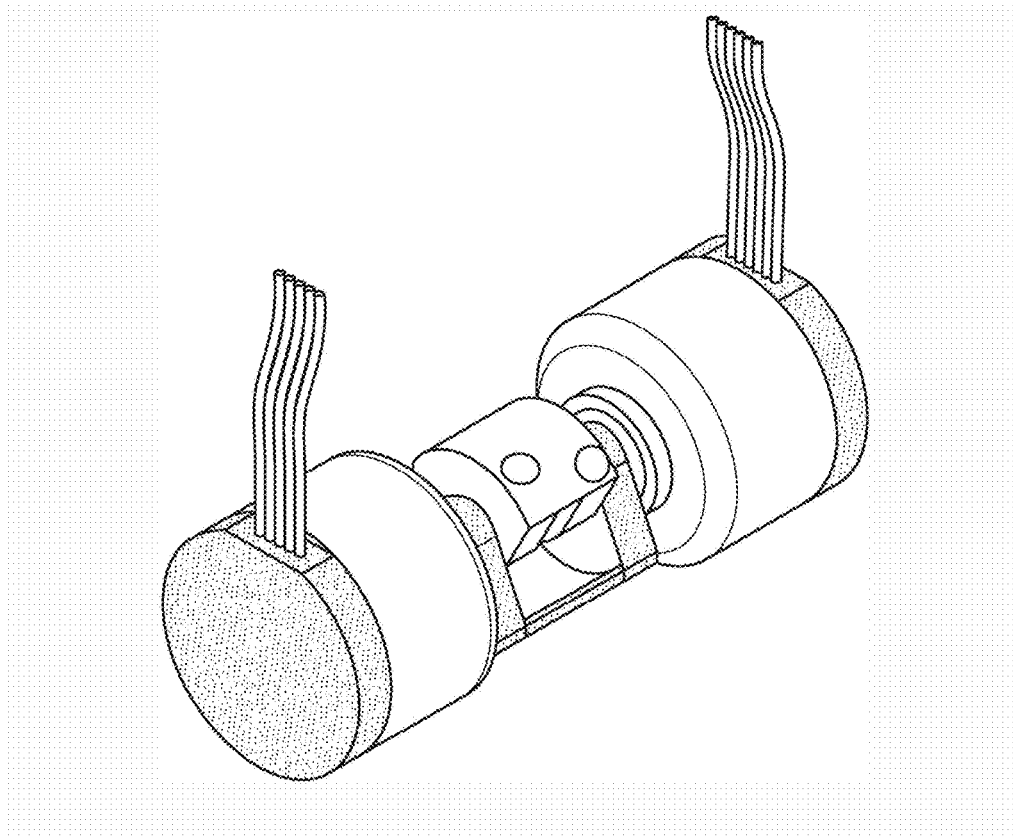
Figure 126I:
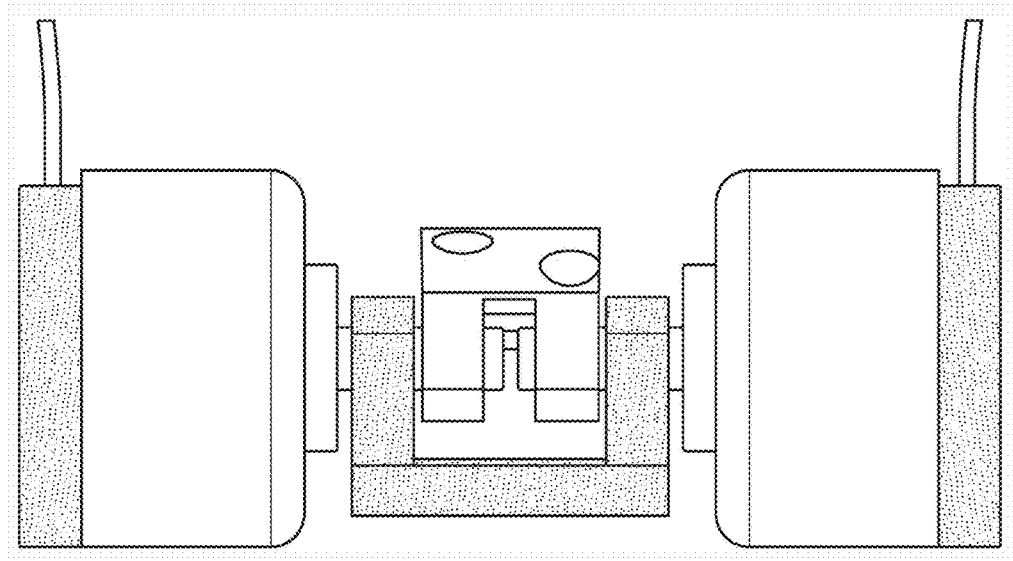

An initial step includes providing masses that can be forged, cast, machined, stamped or otherwise manufactured in a high volume, loose tolerance process. Suitable mass materials may include those used as a sleeve bearing, e.g., bronze. One example of inner and outer masses is shown in FIG. 126A. FIG. 126B illustrates the drilling and reaming of the holes for the masses. FIG. 126C illustrates fitting the shaft through both masses. FIG. 126D illustrates examples of motor casings slid onto the masses. FIGS. 126E and 126F illustrate the rotor assemblies being presses onto the masses. FIG. 126G illustrates that the motor casings are fixed in place, the shaft is spun from the ends, and force sensors are used to determine the balance. In this example, automated tooling touches the masses to take off material until the assembly is balanced. And as shown in FIGS. 126H and I, end caps are applied to the ends of the assembly. The end caps include brushes to commutate the motor and one or more positions sensors for the motor. A microprocessor may also be included in one or both endcaps. Finally, as illustrated in FIG. 126I, the shaft is split as shown by arrow 126x so that each mass is independently rotatable.

5. Driving the ERMs Through a Transmission to the Motors

In Most of the ERM Embodiments Shown in this Specification, the ERMs are Directly Driven and are coaxial to the driving motor. However the eccentric masses do not need to be driven this way in order to produce the correct vibration effects. There can be instead driven through a transmission such as gears, belts, joints, cables, or any other transmission capable of transferring rotational motion.

The main advantage of driving ERMs through a transmission is the ability to orient the motors in different ways to the masses, so that the package fits better into a given device. Some example embodiments are shown in FIGS. 127-129. FIGS. 127A-C show an embodiment of interleaved ERMs where they are directly driven and coaxial to the motors. FIGS. 128A-B illustrate examples of the ERMs manufactured as discussed above with regard to FIGS. 126A-I. FIGS. 129A and 129B show an embodiment of interleaved ERMs driven by spur gears, where the axes of rotation of the motors are parallel to the axis of the ERMs. And FIGS. 130A and 130B show an embodiment of interleaved ERMs driven by bevel gears, where the axes of the motors are perpendicular to the axis of the ERMs.

In addition to these example embodiments, there are many other possibilities for driving ERMs through a transmission. For example the transmission could be a cable drive, where the motors are positioned in convenient locations far away from the module. There could be more than two interleaved ERMs, with one or more driven through a transmission. As long as the ERMs themselves are positioned in the correct way, the motors can be placed wherever is most convenient and an appropriate transmission device can be selected in order to drive the ERMs with the motors.

6. Vibration Cancellation (in General)

Many types of equipment experiences problems with self-generated vibration. These vibrations can lead to wasted energy, fatigue, premature failure of components, audible noise, and other issues. In the case of sensor networks it can be very beneficial for the sensor fidelity to cancel vibrations that the sensor is experiencing, which could potentially improve many sensor characteristics and allow for deployment of sensors and sensor networks in more harsh or non-ideal environments than such sensors would normally tolerate or produce useful data.

Often times the self-generated vibrations are periodic, meaning that they occur at one or more specific frequencies. This is especially true for equipment with rotating parts, where vibration is caused by an imbalance in rotating components, and occurs at the frequency of rotation. In some cases the vibrations may be composed of multiple frequencies, but typically there will be a dominant resonance mode where much of the vibration energy exists.

In order to cancel out a vibration force, an equal and opposite force must be applied to the equipment to counteract the force causing the vibration. For periodic vibrations, particularly with rotating equipment, this force is sinusoidal in nature along a given axis.

One or more dual ERM modules are an ideal solution for canceling out periodic vibrations. A single module can produce a vibration force that rotates at a specific frequency and magnitude, which on its own could cancel out some types of periodic vibrations. Two modules paired together and counter-rotating with respect to each other can produce a directional vibration at a specific frequency and magnitude, which could prove even more useful for canceling out a vibration. Four modules together would provide two adjustable directional vibrations, which could be used to completely cancel out a specific frequency of vibration in some cases (e.g. in rotating machinery). Six modules together could provide three orthogonal directional vibrations, which could prove even more useful.

Modules could be attached in strategic locations on a piece of machinery to cancel out vibrations. The closer to the source of vibration, the easier it is to cancel it, however it may also be sufficient to cancel vibration in a particular location (such as the cab of a large machine where an operator may sit, or at the mounting point of a sensor in order to decouple it from the effects of that vibration).

Modules could contain their own accelerometers or other sensors, to automatically pick out resonant modes for cancellation. This would allow greater accuracy and speed, as well as dynamic adaptability than a sensor-less design, though it is possible to use the modules initially passively to measure the vibration frequencies in terms of their effects on the eccentric masses in the case where cost, complexity, or size is an issue.

Modules could communicate with each other to strategically cancel out many vibration frequencies with minimal effort. The modules, in the course of their measurements may determine that certain modules are most strategically placed for a particular vibration, using all the sensors together as a network. The effects of the vibration cancellation as it propagates through the system can also be measured by the remote sensors of other modules. The communication of multiple modules could also be used to cancel distributed or complex vibrations which one module would not be able to measure alone.

7. Generating Beat Patterns Effects Using a Synchronized Pair of ERMs

As previously shown, it is possible to generate beating patterns with vibrating actuators. For instance, FIG. 112 shows an example beat pattern which may easily be achieved with a pair of LRAs as described herein.

ERMs can also be used to produce beating patterns, although there are some practical differences when compared to LRAs. Any two ERMs co-rotating at different frequencies in the same device will produce a beating vibrational pattern. The direction of the beating force rotates in the same direction as the ERMs, and the frequency of the beating force is based on the speed difference between the ERMs. The amplitude and shape of the beating force is a function of the speeds of the ERMs and their eccentricities. In general, both the amplitude and frequency of the beating force can be varied.

Some example beating patterns for a pair of co-rotating ERMs with equal eccentricities are shown in FIGS. 131, 132 and 133. In all of these examples, the ERMs begin and end in "Spinning Reserve". In FIG. 131 the beating effect has constant magnitude (amplitude) and constant frequency. In FIG. 132 the beating effect has constant frequency, but has an increasing magnitude throughout the effect. And in FIG. 133 the beating effect has constant magnitude, but has a variable frequency. Varying the beat frequency and the amplitude (magnitude) is also possible.

The beating patterns in FIGS. 131-133 are only a small subset of the possible effects that utilize beating phenomenon with two ERMs. Still more things are possible with more than two ERMs. One notable example is to use one pair of co-rotating ERMs to produce a beating force with respect to another pair of co-rotating ERMs. With this configuration, it is possible to achieve adjust the phase difference between co-rotating ERMs so that the beating force goes completely to zero during the low points of the vibration waveform, for any given beating frequency.

When there is a single ERM, one can only control the input force, which most directly determines the angular velocity. This angular velocity thus determines the force felt by the user. This means that one cannot for instance use a single ERM to create an arbitrarily large force at an arbitrarily small rotation frequency. When there are two ERMs, the force felt by the user depends on both angular velocities. This means that one can keep the force constant even while continuously varying the individual angular velocities. (See plots showing varying angular velocities/forces and the constant sum in the X-direction.)

When driven in a manner as to produce a constant angular velocity, an individual ERM produces a sinusoidal force in any given direction in its rotational plane with a frequency proportional to its angular velocity. When each ERM is driven in such a manner, but with different angular velocities, there is a resulting beat pattern in the force. This beat frequency is given by the difference of the angular velocities divided by 2*pi.

This beat pattern can be particularly useful in haptic devices because of the disparity between typical ERM driving frequencies and frequencies which humans are typically responsive to. People tend to only be able to discern individual pulses in waveforms with frequencies less than about 5 Hz. Since the force output of an ERM is proportional to the square of its rotation frequency, typical ERMs used in handheld devices cannot produce noticeable forces in the haptically relevant range.

When one has two ERMs, though, it is very easy to produce haptically relevant frequencies. By setting the difference between the two ERM frequencies to be less than 5 Hz, the envelope of the beat pattern will provide the illusion of a low frequency force. The ERMs can spin arbitrarily fast, creating arbitrarily high amplitudes, while still maintaining a constant beat frequency.

The resultant beat patterns can have many applications in everyday devices. Such beat patterns by a mini Gemini drive or other proximal SAVANT device may be used to generate clicks. A particularly salient application is that of haptic navigation. There are two output dimensions available to beating ERMs: their amplitude and their beat frequency. Haptic navigation devices could leverage either or both of these modalities for navigation. For instance, as a user approached a desired end point the ERMs could be driven in such a way as to maintain a constant amplitude but vary the beat frequency. Making it such that, for instance, the beat frequency increased as the user approached the desired end point and decreased as they moved away from it. The same could be true for a scenario where the ERMs are driven with a constant beat frequency but the overall amplitude changes as the distance to the target position varies. Finally, these modalities can be combined in many ways. One example would be to choose two orthogonal spatial directions and to have, e.g., the beat frequency vary as the user moved the device along one direction (e.g., parallel to the ground) and the amplitude vary as they moved along the orthogonal direction (e.g., perpendicular to the ground).

These vibration beat patterns may be simultaneously enhanced with relevant visual stimuli, relevant audio stimuli, or both. These types of devices could be used for indoor navigation, object location within a dense collection of objects, or navigation to another person or animal. There are also myriad applications for persons with sensory impairments, for instance a haptic feedback pointing device that used beat patterns to let the user know when they were close to an icon or target region. They could also be used to gently and humanely guide animals away from certain areas via vibration collars, particularly if there were certain frequencies that produced sharp responses in the given animal. This type of navigation could also be used as an active feedback mechanism in pedagogical settings, for instance to train people to drive certain vehicles. Beat patterns could also be useful in therapeutic devices such as massage chairs and personal massagers.

Beyond beat patterns it is possible use arbitrarily complicated input control functions to create complex output forces. These output force pattern need not be cyclic or repetitive. To create such force patterns we have created interactive software tools that allow one to vary the input control functions and see the resultant outcome. These tools allow for arbitrary input control patterns and are extensible to multiple dual-ERM SAVANT integrated modules. With a sufficiently high number of dual-ERM SAVANT integrated modules, any reasonably conceivable output force pattern is achievable.

8. Generating Vibrato Effect Effects Using Synchronized ERM Pair to Delineate an Axis of Vibration When two ERMs have the same eccentricity and have concentric and coplanar rotating force vectors with equal magnitude that counter-rotate they produce a linear vibration along an axis in the plane. The direction of this axis depends on the initial phase of the two ERMs. A person may have difficulty recognizing the direction of the axis of vibration if the amplitudes are small or if the oscillation is fast. One way to make the direction axis more discernable is to create small perturbations in the motion. These perturbations can come in three forms: a fast perturbation in the phase relative to the oscillation along the axis; a slow perturbation in the phase relative to the oscillation along the axis; and an oscillation about the extremum of each oscillation. These perturbations are referred to herein as "vibrato effects".

The axis of vibration can rotate at a slower rate than the vibration frequency and it is quite noticeable. For example, the ERMs can counter-rotate at 25 Hz, and the linear axis of vibration may be rotated for example at 0.5 Hz. However, the axis of vibration can also oscillate about a given angle in the plane, and thus create a vibrato effect, also making the axis of vibration noticeable. Vibrato is used with stringed instruments such as a cello when a performer is required to play a sustained note. The vibrato adds a brilliance to the auditory perception of the sustained note, otherwise, our sensory and perceptual systems are designed to adapt and filter out such constant stimuli.

This haptic vibrato effect modulates the axis of vibration in the plane; thus, this effect can have several parameters: the angle of the axis of vibration in the plane (because of symmetry that angle can range from 0 to 180 degrees); the amplitude of the oscillation of the haptic vibrato; the frequency of the oscillation of the haptic vibrato.

To understand how vibrato effects are constructed, we first consider the resultant forces from a stationary linear vibration:

$$FE_{1x} = A_1\cos(\omega_{1t} + \Phi_1 + \sigma_1) + A_1\cos(-\omega_{1t} - \Phi_1 + \sigma_1)$$
$$FE_{1y} = A_1\sin(\omega_{1t} + \Phi_1 + \sigma_1) + A_1\sin(-\omega_{1t} - \Phi_1 + \sigma_1)$$

where A1 is the amplitude of the vibration along the axis, $\omega 1$ is the co-rotation angular velocity, and $\Phi 1$ and $\sigma 1$ represent relative and absolute phases.

In order to produce the vibrato perturbations, a time-varying phase function is added. For simplicity we will consider sinusoidally-varying phases but they could in principle be any function of time. These phases will be represented as $\alpha^*\sin(\Omega^*t)$, where a is the amplitude of the variation and $\Omega$ is the angular frequency. With these additions, the resultant forces are:

$$FE_{1x} = A_1\ \cos(\omega_{1t} + \Phi_1 + \sigma_1 + \alpha^*\sin(\Omega^*t)) +$$
$$A_1\ \cos(-\omega_{1t} - \Phi_1 + \sigma_1 + \alpha^*\sin(\Omega^*t))$$

$$FE_{1y} = A1\ \sin(\omega_{1t}+\Phi_1+\sigma_1+\alpha^*\sin(\Omega^*t)) + A_1\ \sin(-\omega_{1t}-\Phi 1+\sigma_1+\alpha^*\sin(\Omega^*t))$$

where $\alpha$ controls the angle range that the vibrato effect happens between (it equals half the total range). While in principle it can be arbitrarily large, practically it should probably be kept smaller than pi/2, because $\alpha$=pi/2 means the vibrato would sweep through an angle of pi (180 degrees). For most applications the angular variations should be constrained to a few degrees around the oscillation axis. Beyond a few degrees it seems the effect loses meaning, though it may be useful for other haptic effects. $\Omega$ controls the frequency of the vibrato, such that $\Omega$=2*pi would be a vibrato at 1 Hz.

9. External Control of One or More SAVANT Integrated Modules

Once a SAVANT integrated module is available, it may be controlled by an external computer or by attaching a human interface device such as a MIDI controller to produce a variety of effects. Additionally, a SAVANT integrated module may have a variety of functions that may be utilized by selecting the function and including various parameters. Moreover, a SAVANT integrated module may include a library of haptic effects.

9.1. Balance Control Between Two or More Modules

It is easy to emulate a stereo balance control. For instance:

Amplitude of Module 1+Amplitude of Module 2=constant while Frequency of Module 1=Frequency of Module 2.

More generally, a function F(x) could be used, for example to have a nonlinear mapping of amplitude, such that:

$F$(Amplitude of Module 1)+$F$(Amplitude of Module 2)=constant while Frequency of Module 1=Frequency of Module 2.

This approach can be expanded from two Modules as described above to n Modules.

An interleaved ERM module is capable of controlled modulation of many types of effects. Examples include:
Varying the frequency of a beating effect, while keeping constant force amplitude
Varying the force amplitude of a beating effect, while keeping constant beat frequency
Varying both force amplitude and beat frequency simultaneously
Varying the amplitude of vibration while keeping frequency constant
Varying the speed of a rotating directional effect while keeping the force amplitude constant
Varying the direction of a directional effect with constant force amplitude
Sweeping a directional vibration back and forth at a varying rate Any effect that can be modulated on single module can be used to differentially vary two or more modules. For example:
Increasing vibration amplitude of one module while decreasing vibration amplitude of a second module
Increasing beating frequency in one module while decreasing beating in another module The above may be coupled with sensors that determine position and orientation so that the device can be used for navigation.

10. Vibration Tracks for Handheld and Wearable Devices

With SAVANT's ability to create arbitrary motion output in a device, it is possible to create pre-programmed control schemes for handheld and/or wearable devices that synchronize with multimedia events such as watching a movie, listening to music or playing a video game. We denote these control schemes as "vibration tracks" in analogy with audio and video tracks in film. These tracks can exists alongside multimedia signals as a separate signal layer or they can be embedded together into a single framework.

As a simple example, consider watching a movie on a video game console. The video game console can add value to the movie watching experience relative to watching it on a standard DVD or Blu-ray player by leveraging the motion output capabilities of the handheld controller. While watching the movie, the user could download a vibration track—either officially created be the movie producers or created by third-parties—that would produce haptic effects during the movie that were synchronized to the film. These effects could be, for example, rumbling during scenes in moving vehicles, sharp impulses when guns fire, or any other haptic effect synchronized to the film in a manner as to add entertainment value. As previously stated these vibration tracks could be created for synchronization with any multimedia event and intended for any hand-held or wearable device.

11. Methods for System Identification and Classification of the System to which a Module is Coupled The dual ERM's capabilities regarding generation of arbitrary force amplitudes, frequencies, and directions, as well as the range of high fidelity sensors such as accelerometers and gyroscopes allow for not only measurement of the system coupled to the module (such as a hand holding a game controller), but also application of forces to that system. Most modern game controllers now have a variety of MEMS sensors integrated with sensor fusion algorithms which provide motion tracking feedback such as position, orientation, velocity, and acceleration. These signals can be used for the system identification procedure. With the combination of input and output to a system, the ERM module or module group can effectively 'shake' the system and measure the response. For an example of the type of input needed for this procedure, consider a ten second sine wave generated by the dual ERM which ranges from 1 Hz to 50 Hz at 2N peak-to-peak force, pausing at each frequency for brief intervals. The input frequencies are recorded, as well as the actual acceleration and velocity of the system. Then a model of that system can be fitted to that data which estimates many types of parameters. That model could be used to classify various system characteristics such as the size of hand holding the controller (in the case of a game controller), how tightly the hand is holding the controller, whether it is likely to be a child, adult, female, or male hand, as well as the type of grip, potentially even identify a particular individual. This model can easily be updated over time, and so could potentially be useful in the medical fields for rehabilitation and assessment.

In the case of other systems being coupled to the ERM, system identification could be used by the ERMs, especially in a network, to identify or classify the structure, changes in the structure over time, dynamic behaviors of the structure, orientation (in the case where there are no accelerometers or there is too much noise in the system for the accelerometers), or to determine other parameters.

12. Harvesting Vibrational Energy

When the motors in an individual SAVANT module have no energy applied, and when they are subject to vibrations, the resulting movement of the masses moves the motors, and thus generate electrical current. This current can be harvested and stored by a simple addition to the circuit (in some cases, motor driver chips have this functionality built-in already), extending the life of any battery the SAVANT system is powered by. The amount of energy generated by the modules relative to the amount required for operation depends on how much vibration the module is exposed to, the size of the masses, and the frequency contents of the vibrations.

Since SAVANT systems are designed to span N spatial dimensions, this in principle allows for energy harvesting from motion in N spatial dimensions. What this means is if the vibration is not just in, for example, the x direction, but also y and z, then an arbitrary strategically oriented group of modules could harvest that energy. This is a direct advantage over current energy harvesting technologies, which tend to be along a single axis or in one plane. Thus, if for example a phone had three orthogonal SAVANT nodes integrated then it could continuously regenerate its battery during transportation of the device in clothes or a bag.

IV. Position Measurement Using a Single Sensor

This portion of the disclosure describes multiple examples and embodiments relating to a novel rotational position sensing system, referred to herein as the "MOHAWK Sensor System," and additionally its industrial applicability to eccentric rotating mass (ERM) vibration actuators.

1. Incorporating Low Cost Feedback into an ERM Actuator 1.1 the Need for Sensor-Based Measurement There is an ever-increasing need for more accurate, more precise, more robust, and lower-cost measurement, especially for high volume production of components for consumer electronics. This ever-increasing need is especially true for rotational position measurement, though not limited to that case. More and more microprocessors and feedback control are being incorporated into everyday consumer as well as industrial devices. In order to control a system with feedback, at least some information must be measured and fed back into the system in order for an algorithm to compute a control action. This allows the device to interact with and respond to the world. While it is in theory possible to build a perfect understanding of the world, and thus use no sensor measurements (and thus utilize open loop control methods), this is impractical in reality.

For example, consider a modern touchscreen interface for a smart phone. If one had a perfect model of the universe and the particular human owner of the smart phone, the phone could know what a person would type in on a particular day at a particular millisecond, but clearly there are many aspects of the universe beyond our ability to model, and even if we could create such a model it would be too complicated to run on current processor architectures. The answer is to incorporate a touchscreen to provide feedback to a relatively simple algorithm that can map states into actions. Similarly here, we will map measured and differing states into a consistent measurement. That measurement can be used for feedback and other purposes.

While there exist a multitude of sensors available in great varieties, often these sensors fail to meet one or more of the above criteria necessary for inclusion in consumer products. Common low-cost sensors frequently used in high volume consumer electronics products include, for example, Hall effect sensors that sense magnetic fields and optoelectronic sensors such as an IR detector which is typically paired with an IR emitter. Clearly it is advantageous to use the least number of components to perform the position measurement function, so that it is cheaper to use one Hall effect sensor rather than two Hall effect sensors. The least number of dedicated sensors is one: Therefore, it is an objective to have a single sensor rotational position measurement solution.

1.2 Sensing Modalities—Feature-Based Sensors

For most conventional rotational position measurement system requirements, the system must be able to produce the position at any given time. However, for SAVANT ("Synchronized Array of Vibration Actuators in a Network Topology") Integrated Modules, since there are often many times when the vibration actuators are not vibrating, and thus in a quiescent state, we can exploit that opportunity to produce this novel, single sensor concept presented herein this inventive disclosure, namely the MOHAWK Sensor System. The MOHAWK Sensor System includes a measurement target specially designed to affect a magnetic field or an electromagnetic light field, then calibrated during quiescent states, so that the MOHAWK Sensor System is calibrated when needed and when the opportunity presents itself, and furthermore methods are utilized to minimize vibrational output during the calibration phase.

The concept of a feature-based field is explained as follows. If we know the features of a particular field, generated by a field source, in which we place a sensor, then changes in those features will produce changes in the sensor's output which can be used to compute some state measurement (such as position of the sensor relative to the field at 'zero'). Consider, for example, a permanent magnet that generates a magnetic field of known and predictable shape. If the orientation or distance of the magnet to a Hall effect sensor (which transduces a magnetic field into a voltage) is varied, the output voltage of the Hall effect sensor will vary correspondingly. Now if one included several magnets which are each oriented to generate opposing fields around a disk outward, the Hall Effect sensor will measure alternating positive and negative magnetic fields, and thus outputs something like a sine or square wave. Since the waves are of known shape, the angle of the rotating section of the sensing device can be calculated easily.

The type of sensor modality or the type of field can be mixed, so that the combination provides additional information. For example, consider an angular position sensor that employs a magnetic field that is generated and then measured as one modality. One of the surfaces that are part of the sensor can be reflective and shaped to vary distance from the sensor with rotation, thus the second modality of a mixed modality sensor can be an optical sensor which bounces an infrared light off one of the surfaces, then measures reflective intensity or timing.

1.3 the MOHAWK Concept 1.3.1 Basic Principles

Given the previous discussion, the MOHAWK Sensor System (See FIG. 134) incorporates the following:
1) An element that generates a measurable field;
2) A sensor that measures said field;
3) A target which modifies said field as measured by said sensor to have a shape with a) at least a single measurable feature for a zero reference point; and b) a shape that varies throughout the rest of the angles such that the shaft's rotational position can be determined with desired angular accuracy;

/*So 4 below is, for example, some timer or interrupt*/
4) Means to determine when to calibrate said system, e.g., a controller;

/*So 5 below is, for example, how to spin the ERMs so people don't feel them when calibrating*/
5) Means to calibrate said system such that vibrational forces are beneath a human perceptual threshold, e.g., a controller;

/*So 6 below is that the MOHAWK Sensor System can be queried via a call to ask what angle it is at*/
6) Means to receive a rotational position query for said system, e.g., a controller;

/*So 7 below is that the MOHAWK Sensor System can reply to the query with the angle estimate and perhaps an error estimate*/
7) Means for the system to respond to said rotational position query, e.g., a controller.

Aspects 1 2 and 3 are part of the so-called 'hardware layer' as they are the main components of the hardware, while 4, 5, 6 and 7 may be implemented by one or more controllers having routines that run on the controller(s), and so are part of the 'software layer.'

Field Source: Some field generating element examples are a magnetic field generated by a permanent magnet (though it does not need to be permanent), and an optical field, such as light from an infrared emitter (for example, the Kingbright APT2012F3C).

Sensor: A typical magnetic sensor that is low cost and accurate is a Hall effect sensor, such as the Honeywell SS49E, which outputs a voltage that is linearly proportional to a magnetic field intensity acting on the sensor in one or more particular axes (many sensors such as this type require no external circuitry and so further reduce costs and complexity). A typical infrared sensor is the Everlight PD15-21B/TR8 (again this outputs a voltage that is proportional to infrared light intensity striking the sensor).

Target: The target (see FIG. 136 for several examples) may be a continuous or spatially modulated annulus or periphery shape (or a combination). In the case of a magnetic sensor the target may be composed, at least in part, of soft magnetic material. Example soft magnetic materials include magnet steel, soft iron and permalloys, such as Hitachi Metals permalloys. A Hall effect sensor may be positioned between the permanent magnet and the target, for example, as illustrated in the accompanying figures (e.g., FIG. 138). The distortion of a soft magnetic material within a magnetic field falls off with distance from the edge of the material on the order of the inverse square of the radial distance. Knowing this, the shape of the material can be adjusted to produce a desired output. In the case of absolute position sensing, the shape can be designed to produce a linear relationship to angle. A toothed design can be used to produce pulses for a relative encoder. The absolute reference can be a tooth of differing depth or a missing tooth. For an optical sensor the target can be designed to reflect light. This can be done simply, by varying surface roughness, by a similar shape method to the magnetic target just described, by coloring, or by other means.

Embedded System: There is a need for an embedded software layer in order for the sensor to be useful, since regular calibration is a potentially important behavior of the sensor system, and an estimate of the position and uncertainty of that estimate needs to be maintained. The basic components listed above are each responsible for different functions. The entire software layer is potentially multi-threaded in order to serve multiple sensors and vibration actuator modules. There are many variables stored in data, along with measurements used by the estimator. The states of the system can be accessed through the API (application programming interface), which will send the position to functions asking for the current information about position. This serves to protect internal variables from accidental modification. Finally, there are several routines which run algorithms related to estimating the current state using models of the system, as well as any available external sensor measurements and controlling the ERM using those state measurements.

The control commands may be passed down to a motor controller, or the motor controller may be simple motor driver circuitry. This depends on the particular application. Typically an estimator will incorporate some least squares calculation that balances between the current measurement and the current estimate using the uncertainty about the sensor measurement and model (for example, consider a Kalman filter). This can easily be integrated with a typical control structure such as a Linear Quadratic Gaussian (LQG) controller. Such a controller assumes a linear system model where the controller is required to optimize with a quadratic constraint (such as position error and control energy), assuming uncertainty that is Gaussian (random with mean zero and some variance). So a typical loop will have a high priority portion and a lower priority portion. During the high priority portion the measurement is taken, estimate and model updated and data stored, then new control command computed and executed. The lower priority portion or separate thread will process any commands and respond to requests for data.

1.3.2 Modulating the Signal

The field can also be modulated to improve the signal-to-noise ratio. What this does is improve robustness when in a noisy, non-ideal environment (most applications are far from ideal and filled with noise). The strategy here is that the modulation (on-off cycling of the field) provides a lower boundary for the 'off' portion of the modulation. Therefore, the sensor can be constantly adjusting the expected range of intensities it should expect to measure.

1.3.3 Integration into an ERM System

The MOHAWK Sensor System can quite easily be added to one or more actuators in an ERM system to provide position feedback. FIGS. 135 and 137-144 show a few examples for the physical integration. The required feedback algorithm is actually simplified in the monotonically increasing version, as absolute position is a simple analog measure of the Hall or optical sensor. This will allow a lower cost processor that does not have an encoder module integrated to be used.

If an optical emitter-detector pair modality is used, the rotating masses will have possibly integrated into them the surface designed to vary a parameter measured by the detector, such as surface roughness, and thus specular reflectivity. The sensor is placed to reflect a beam off the surface onto the detector, and there needs to be a means of enclosing the detector and emitter area by some carefully shaped material to prevent ambient light from striking the detector and providing false signals. This can easily be achieved with a piece of plastic, for example, that simultaneously serves to mount both the emitter and detector relative to the reflecting target. Finally the voltage output from the detector is routed to an analog to digital converter built into the processor (or as part of external circuitry) to be measured and converted to a digital value between a minimum and maximum. This value is converted to an angle after a calibration procedure is performed to match angle with the values. This calibration can be once (factory-calibrated) or periodic to continue to account for variations in parameters of the system, and can be completely automated. The calibration may also be performed a periodically, for example, as part of an opportunistic algorithm that seeks to calibrate the system when it is known to be in a quiescent state.

2. Self-Calibration Rapidly and Slowly

Calibration is a key component to the sensor system. Most of the time an ERM actuator, especially ones used in Haptic or gaming type applications, is in a dormant state. During this time the system can calibrate the sensor, as long as that calibration does not interfere with normal functioning or be apparent to the user.

Calibration as a process includes rotating the sensor target and the system searching for the absolute position feature. Once that is detected, there are multiple methods of using the feature to determine the angular range of the sensor. One example is for the absolute monotonically changing target. In this case the calibration determines the range of voltages the sensor can generate, and then maps those voltages, from minimum to maximum, to a 0-360 degree range. In the case of a spatially modulated annulus or periphery target, the absolute feature is searched for, at which point position may be reset to zero or corrected.

In order to calibrate unobtrusively, the system rotates the masses slowly in general. However, in the case that the MOHAWK Sensor System is integrated into a SAVANT dual ERM system, the masses can be placed in a 180-degree out of phase orientation during calibration, which allows rapid calibrations with no vibration output.

The timing of the calibration can be determined by many methods. One straightforward approach is a simple timer interrupt on a microcontroller. A more complex approach can involve an intelligent algorithm that estimates uncertainty of the position measurement, then calibrates when the uncertainty is above a particular value. In most cases, calibration is given a lower priority than responding to control requests. There may be cases where it is more important to calibrate rather than respond, such as when the position estimate becomes corrupted or very poor.

3. Strategies for Robustness

Aside from the modulation strategy previously discussed, it may be necessary to add design elements to the sensor system that improve robustness to varying environments. In the case of an optical sensor system, the emitter and detector portion may need an umbrella type shape to mostly enclose the relevant area of the target from ambient light. Modulation may also help avoid the effects of ambient light sources. If a reflective method is used, care must be taken to use a material that does not easily corrode, or protect the material from corrosion, so that the surface properties change in a minimal way over time. If a printed coloring is used, the ink must not be of a type that fades easily. Optical surfaces must also be protected from dust.

In the case of a magnetic sensor technology, the sensor may need to be enclosed in a Faraday cage to prevent interference from ambient magnetic fields or fields generated by the nearby motors.

In all cases, care must be taken with thermal expansion of all components to avoid warping of the precision shapes, as the motors will have a large range of temperatures depending on usage. There are well-known thermal design strategies in mechanical engineering that can account for thermal issues.

4. Specific Design Examples

Consider FIG. 135, beginning with a traditional ERM system. Let a target and a Hall effect sensor with a magnet mounted behind it be coupled to the system. The target rotates with the eccentric mass, and thus the output of the MOHAWK Sensor System provides an absolute measure of the angular position of the shaft.

Now consider FIG. 137. Similar to as previously described, a target is coupled to the ERM system. In this case the target provides an absolute reference and is a pulsed output.

5. Forward and Inverse Mathematical Models of Magnetic Field for Manual or Autonomous Design Given that there are well-known models of magnetic and optical phenomena, the designer can use those physical models to design the shape of the target for a desired output. Additionally, these models can predict with high accuracy the signal that the sensor will measure. The model is based on the physics of a soft magnetic material placed inside a magnetic field. The equations can be solved numerically or in closed form to yield a prediction of the magnetic field at any point around the material. One advantage of this modeling approach is that an iterative design approach can be employed by which optimizations can be performed to reduce material costs while optimizing signal response to provide the best accuracy sensor for the lowest price, as far as shape and material parameters.

6. Mixed Analog and Digital Circuitry for Accelerating Rapid Processing of the Signal with Lower Complexity Processors It is possible to perform some of the computation with analog circuits in order to allow less expensive processors to be employed in the design. There is a balance between complexity, cost, and processing in terms of how much of the circuit should be rendered in an analog form, and there are several approaches that can be used. For example, an indexed signal of pulses can be converted into a counted analog number with comparators and analog mathematical operations. The advantage of analog circuitry is that it avoids any need for a digital sampling rate, being a continuous implementation of operations such as addition, subtraction, multiplication, and division. However, with the falling prices of processing power there is a balance between adding many circuit elements with potentially adding a small processor dedicated to sensing alone.

FIGS. 147A-B illustrate an example of an assembled GEMINI module without magnets. Similarly, FIGS. 147C-D illustrate the assembled GEMINI module with magnets.

7. Example Mohawk Drive Prototype

The goal in this section is to provide rotational position sensing to a motor control algorithm. According to one aspect, the design should have a low part count, low processor overhead, and implemented with standard machine processes in the field. A design is presented that uses one Hall sensor, a small, low power magnet, and a specially shaped flywheel (steel, iron). In this disclosure, the term "flywheel" is used interchangeably with the term "target" to mean a rotating object that is able to affect the transmission of a field from a field source to a field detector, such that as the object rotates, variations in one or more aspects of the shape, size and material composition of the rotating object produce measurable changes in the field as detected by the field detector or sensor that can be used to determine the angular position of the object.

The Hall sensor needs to be a linear or ratiometric type. This example uses the Optek OHS3151U. There are many low cost Hall sensors, and they range between $1~$2 at 1000 pcs. The magnet needs to be not very strong, so that it won't disturb the rotation of the flywheel. A good candidate would be made of ferrite, and have a small disk or bar shape (<0.25" diameter, <0.25" thick). This example uses a small piece of a larger ferrite disk magnet.

The flywheel can be made of low cost sheet steel, or iron. Iron may be softer and easier to stamp. The flywheel shape is optimized for a linear voltage output from the sensor. In this example, the diameter ranges from 0.5" to 0.3" with a log taper (see FIG. 148). This encoder wheel design can be optimized for range of radial distance and taper. Production tooling specs can be accommodated as well.

7.1 Physical Setup

In the example discussed herein and shown in FIGS. 149A-B, the motor used was removed from working equipment, in this case a Nintendo game controller. The steel flywheel is hand made from a piece of 0.032" zinc plated sheet. The Hall sensor is an Optek OHS3151U ratiometric linear type. The speed of the motor is controlled of the motor with Arduino PWM output and 2N3904 transistor. The sensor and motor voltage is 5V in this example.

7.2 Tests

In this example, the Hall sensor values are read with 12 bit ADC (Arduino) and 1 KHz sample rate. FIGS. 150A-B show a graphs of ADC values over time with the motor spinning at different rates. The contents of an array of samples taken over ½ second is shown. Absolute values range from X to Y. This range of output can be improved with magnet and Hall sensor selection. The peak value is at 272, and the trough value is at 200.

V. Generating Multi-Frequency Vibrations with a Single LRA

1. Introduction

We now describe methods and embodiments to transduce an electrical signal to produce mechanical vibrations of beat frequencies with a single linear resonant actuator ("LRA"). We also now describe multiple inventions and embodiments of using the inventive methods to implement arrays of beating LRAs building upon the previously described Synchronized Array of Vibration Actuators in a Network Topology ("SAVANT") architecture.

For example, two similar LRAs rigidly attached so that the axes of their vibrating masses are collinear and driven with two sine waves having different yet similar frequencies near the resonant frequencies of the two LRAs will produce an output vibration having a beating waveform resulting from constructive and destructive interference. We have previously described this as temporal mode in our SAVANT architecture.

Although LRAs can be manufactured in a small package, in this scenario it is necessary for the LRAs to vibrate at a high frequency in order for a consumer to feel the vibration in a consumer device when worn in the pocket of a loose garment. For example, one suitable device is made by Samsung Electro-mechanics Company, Limited ("SEMCO"), which manufactures the DMJBRN1030BJ LRA, which is approximately 10 mm in diameter and 3 mm in height, and has a resonant frequency of approximately 205 Hz and can be driven with a 0-2.0 V. AC sine wave.

We have previously disclosed the utility of producing beats from arrays of two or more eccentric rotating mass vibration actuators ("ERMs") and from arrays of two or more LRAs for use in haptic guidance applications.

Within this inventive disclosure we introduce an novel and useful means to drive a single LRA with a multi-frequency signal and produce beat patterns from the single LRA, an approach that is counter-intuitive to most engineers and yet has great utility since it allows a single component design in comparison to a conventional two component design. A lower parts count can result in a lower bill of materials, a smaller space requirement, and greater simplicity in the engineering design.

Furthermore, we show how multiple LRA can be spatially arranged into a SAVANT, and that each LRA in the SAVANT can be driven with a multi-frequency signal to produce beats that can emulate the rotating beat sensation of a Gemini Drive, which are two interleaved ERMs driven at slightly different frequencies.

Another advantage of the LRAs when generating spatial beats over ERMs is that ERMs in a Gemini Drive at different frequencies generate slightly different centripetal forces that never exactly cancel out. With LRAs generating spatial beats, the forces can exactly cancel out. Still another advantage is that LRAs can be driven open-loop while the ERMs in a Gemini Drive need to be controlled with a closed-loop.

The generation of beats from LRAs and ERMs is also useful to producing relaxing and pleasurable sensations, for example in personal massage or adult vibration devices. Beats also may have significant utility for generating features in seismic sources for oil exploration, providing a robust feature set that can be analyzed when the dataset from an array of seismic sensors is processed.

For now, we can think of the LRA as a narrow bandpass filter centered on the LRAs resonant frequency. We show in this inventive disclosure that multiple waves can interact with each other yet get through this filter to produce important vibrational patterns at amplitudes substantially close to the maximum amplitude available to the LRA.

We are innovating on an existing design by utilizing it in a non-standard fashion. LRAs are designed to be forced at a single frequency, the resonant frequency, but we have discovered utility in forcing a single LRA with a linear combination of a few different frequencies. Our result is unexpected because it is generally accepted that the frequency response of an LRA is too narrow to effectively utilize multiple input frequencies. By keeping the separation between frequencies relatively small we find we can include multiple frequencies in the forcing function and still see response amplitudes nearly identical to the maximum possible.

For each of the component sine waves, we can determine the frequency, the start-time, the end-time, the phase and the amplitude. Furthermore, these parameters can vary during the effect, such as a frequency sweep.

We can create LRA invariant sensations, since the same beat frequency can be produced on different LRAs having different resonant frequencies.

Also, multiple LRAs can be combined into a SAVANT, so that spatial beats can be generated, and ERMs can be emulated.

Power efficiency for actuators used in wearable devices is of paramount importance. For example, in a white paper published by Texas Instruments entitled "Haptic Energy Consumption" by Flora Wang, Application Report SLOA194—May 2014 (this white paper is entirely incorporated by reference within this disclosure), LRAs are considered the most suitable actuator for wearable devices. In this inventive disclosure, we add still another reason to choose LRAs for wearable devices, that is the capability to generate salient haptic events such as beats.

1.1 Vibration Generation in Consumer Electronics

Vibration capabilities of almost all current consumer electronic devices are provided by one of three vibration solutions: eccentric rotating masses ("ERMs"); linear resonant actuators ("LRAs") or piezoelectric actuators ("piezos"). Each of these vibration solutions have relative strengths and weaknesses compared to the others as well as well-accepted standard modes of operation.

For ERMs the standard mode of operation is to drive them with a constant input current so as to produce a constant rotational velocity of the moving mass. The force felt by the ERM depends on this rotational velocity. We have previously described novel ERM embodiments such as the Gemini Drive. In this embodiment two ERMs are interleaved, allowing them to produce multiple-frequency output patterns such as beat patterns.

Advantages of LRAs compared to ERMs and Piezos:
Due to having a single axis of vibration, vibration strength (acceleration) is generally better than a comparable ERM.
LRAs tend to produce their maximum accelerations significantly faster than comparable ERMs.
LRAs are significantly quieter in operation than ERMs.
LRAs have higher gain than ERMs making them more energy efficient. A recent report ("Haptic Energy Consumption" by Flora Wang) from Texas Instruments found the energy consumption for a brief (~50 ms) vibration of the LRA studied required about a third of the energy required to produce a similar brief vibration in the ERM studied.
Current piezo actuators are almost exclusively too expensive for consumer electronic applications. Most consumer devices employ either ERMs or LRAs due to the high cost of piezo actuators and their associated drive electronics.
Piezos also require much higher driving voltages than either ERMs or LRAs.

2. How to Generate Beats Using a Multi-Frequency Signal to Drive an LRA

We model the response function of an LRA as that of a damped harmonic oscillator with a resonant angular frequency $\omega_0$, a mass m and a damping ratio $\xi$. Note that LRAs are usually labeled by their resonant frequency $f_0$, where $\omega_0 = 2\pi f_0$. Let us consider a simple sinusoidal driving force. The equation of motion for a single LRA will be the solution of the differential equation:

$$x''(t) + 2\zeta\omega_0 x'(t) + \omega_0^2 x(t) = \frac{f \cos(\omega t + \phi)}{m} \quad \text{(Eq. 111)}$$

where $\omega$ and $\varphi$ are characteristics of the driving force. If the LRA is starting from rest then the initial conditions are given by $x(O)=0$, $x'(0)=0$.

If we were to have 2 identical LRAs each driven by their own simple sinusoidal function then each LRA would be governed by its own equation:

$$x_1''(t) + 2\zeta\omega_0 x_1'(t) + \omega_0^2 x_1(t) = \frac{f_1 \cos(\omega_1 t + \phi_1)}{m} \quad \text{(Eq. 112)}$$
$$x_2''(t) + 2\zeta\omega_0 x_2'(t) + \omega_0^2 x_2(t) = \frac{f_2 \cos(\omega_t t + \phi_2)}{m}$$

and the total response system would be proportional to $x(t)=x_1(t)+x_2(t)$. We can reduced the number of equations though be introducing a change of variables. Let $$X(t) = x_1(t) + X_2(t) \; (3) \quad \text{(Eq. 113)}$$

which leads to $$X'(t) = x_1'(t) + x_2'(t) \; (4) \quad \text{(Eq. 114)}$$

and $$X''(t) = x_1''(t) + x_2''(t). \quad \text{(Eq. 115)}$$

Summing the left-hand sides of Eq. 113 we have:

$$(x_1''(t) + x_2''(t)) + 2\zeta\omega_0(x_1'(t) + x_2'(t)) + \omega_0^2(x_1(t) + x_2(t)) = \quad \text{(Eq. 116)}$$
$$X''(t) + 2\zeta\omega_0 X'(t) + \omega_0^2 X(t)$$

which we recognize as the response function for a single LRA whose position is given by X(t). On the right-hand side we are left with the sum of the individual forcing functions. When the number of forcing functions is greater than two, there is generically no simplification of the addition of multiple sinusoidal functions. When we restrict the inputs to be two sinusoidal functions with the same amplitude and phase, we can use a trigonometric identity to find:

$$X''(t) + 2\zeta\omega_0 X'(t) + \omega_0^2 X(t) = 2\frac{f}{m}\cos\left(\frac{\omega_1 - \omega_2}{2}t\right)\cos\left(\frac{\omega_1 + \omega_2}{2}t\right) \quad \text{(Eq. 117)}$$

This yields the equation of motion for our single LRA driven by two sinusoidal input functions. We consider this case simply for the ease of analytic construction-because we are dealing with linear equations, the concepts we develop herein are valid for any number of sinusoidal inputs with arbitrary amplitudes and relative phases. Please see the description of the SAVANT architecture herein for a more detailed derivation for N sinusoidal input functions.

The solution to this differential equation is given by the classic "beat pattern". The composite steady-state motion of the oscillating mass in the LRA can be seen as the linear superposition of two component motions. First, the mass oscillates sinusoidally at the average angular frequency of the two inputs:

$$\frac{\omega_1 + \omega_2}{2}.$$

Second, this oscillation is modulated by a sinusoidal envelope given by a sinusoidal wave with angular frequency $$\frac{\omega_1 - \omega_2}{2}.$$

This envelope modulates the amplitude of the inner oscillation between 0 and 1, resulting in smooth pulses. Due to the inner oscillations during each half-wavelength of the sinusoidal envelope, the perceived frequency between pulses is twice the modulating frequency and is called the beat frequency:

$$f_b = \frac{(\omega_1 - \omega_2)}{2\pi} = f_1 - f_2. \quad \text{(Eq. 118)}$$

Thus we find the somewhat surprising result that a single linear oscillator such as an LRA can exhibit a beat pattern in response to being driven by the sum of two different sinusoidal functions. This result follows directly from the properties of linear systems, in particular the principle of superposition. The steady-state composite motion resulting from forcing by two input functions is just the sum of the motions resulting from each individual forcing function acting separately.

Equivalence of Beating ERMs and LRAs

If one has two coaxial ERMs with equal eccentricities, oriented such that the planes spanned by each eccentric rotating mass are sufficiently close to each other in space to be perceptually indistinguishable (as in a Gemini Drive where the two planes are identical) and the ERMs are rotating at different angular velocities, $\omega_1$ and $\omega_2$, and their relative phase is $\varphi$, then the components of the forces produced by each ERM are given (in a Cartesian coordinate system spanning the plane perpendicular to the ERM axis of symmetry and centered on the centroid of the ERM motion) by the expressions:

$$F_{ERM1} = m_1 R_1 \omega_1^2 \{\cos(\omega_1 t), \sin(\omega_1 t)\} \quad \text{(Eq. 119)}$$

$$F_{ERM2} = m_2 R_2 \omega_2^2 \{\cos(\omega_2 t + \phi), \sin(\omega_2 t + \phi)\} \quad \text{(Eq. 120)}$$

Here each component is taken to be, for example, in the orthogonal X and Y directions. We note that for the Gemini Drive system, the eccentricities of the two ERMs are equal, meaning that $m_1 R_1 = m_2 R_2 = m R$. We will assume this to be true for this example system as well. Summing these two forces we find the resultant, composite force felt by the system to be:

$$F_{ERM} = mR \quad \text{(Eq. 121)}$$
$$\{\omega_1^2 \cos(\omega_1 t) + \omega_2^2 \cos(\omega_2 t + \phi), \omega_1^2 \sin(\omega_1 t) + \omega_2^2 (\omega_2 t + \phi)\}$$

If we now consider two orthogonal LRAs, each pointing in e.g., the X and Y directions respectively, where each is driven by a composite sinusoidal input so as to produce a beat pattern in each LRA (possibly with a relative phase separation $\varphi$ between the two sinusoidal inputs), then their respective forces (in a similar X-Y coordinate representation) are given by:

$$F_{LRA1} = \{A_{11} \cos(\omega_1 t) + A_{12} \cos(\omega_2 t + \phi), 0\} \quad \text{(Eq. 122)}$$

$$F_{LRA2} = \{0, A_{21} \sin(\omega_1 t) + A_{22} \sin(\omega_2 t + \phi)\} \quad \text{(Eq. 123)}$$

The resultant composite force felt by these two LRAs is then given by:

$$F_{LRA} = [A_{11}\cos(\omega_1 t) + A_{12}\cos(\omega_2 t + \phi), \quad \text{(Eq. 124)}$$
$$A_{21}\sin(\omega_1 t) + A_{22}\sin(\omega_2 t + \phi)]$$

We can see that these two forces FERM and FLRA will be equal under certain conditions, namely:

$$A_{11} = mR\omega_1^2 \quad \text{(Eq. 125)}$$
$$A_{12} = mR\omega_2^2$$
$$A_{21} = mR\omega_1^2$$
$$A_{22} = mR\omega_2^2$$

Thus we claim that by driving two orthogonal LRAs are described above we can exactly emulate two beating ERMs, for example a Gemini Drive exhibiting a beat pattern. Please see the description of the Gemini Drive design as discussed herein for a more detailed explanation of a Gemini Drive. As a specific example, let us consider emulating two interleaved ERMs joined together as a Gemini Drive. These ERMs have the following characteristics:

$m_1 = 5.690322533$ grams (Eq. 126)

$m_2 = 4.812397782$ grams $R_1 = 4.291464331$ mm $R_2 = 5.074263494$ mm $m_1 R_1 = 24.41981618$ grams·mm $m_2 R_2 = 24.41937438$ grams·mm Will we consider the eccentricities to be equal to five significant digits. If we consider these ERMs to be driven at 100 Hz and 105 Hz then they will produce a beat pattern with a beat frequency of 5 Hz. We will assume that there is no relative phase between the two ERMs. In order to emulate this beating Gemini Drive, we would need to drive two orthogonal LRAs in such a manner that the total forces output by each LRA are given by:

$$F_{LRA_1} = (24.419 \text{ grams·mm})(100/\text{sec})^2 \cos\left(2\pi\frac{100}{\text{sec}}t\right) + \qquad \text{(Eq. 127)}$$
$$(24.419 \text{ grams·mm})(105/\text{sec})^2 \cos\left(2\pi\frac{105}{\text{sec}}t\right)$$
$$F_{LRA_2} = (24.419 \text{ grams·mm})(100/\text{sec})^2 \sin\left(2\pi\frac{100}{\text{sec}}t\right) +$$
$$(24.419 \text{ grams·mm})(105/\text{sec})^2 \sin\left(2\pi\frac{105}{\text{sec}}t\right).$$

2.1 Definitions

Let LRA1 have a resonant frequency of $F_r$. Let us construct a multi-frequency composite signal with multiple sinusoidal wave function components having $F_{min}$ as the minimum frequency and $F_{max}$ as the maximum frequency. Let $F_{max}>0$, $F_{min}>0$, and $F_{max}-F_{min}>0$. Let $F_{min}$ and $F_{max}$ both be frequencies that produce signal gain within the LRA. We are interested in the frequency band within the difference between the maximum frequency, Fmax, and the minimum frequency, $F_{min}$. Let $1<F_{max}/F_{min}<2$. We can define this as the bandwidth ratio to ensure the waves beat.

2.2. The Emulation of the Circular Beating Sensation Produced by ERMs

The sensation of the beating of two ERMs for example in a Gemini Drive is perceived as a rotating, circular, modulation that is also very pleasant. Here we teach how this spatial beating can be emulated using multiple LRAs spatially arranged, each LRA driven by a multi-frequency composite signal of multiple component sinusoidal waveforms of different frequencies.

2.3. Spatial Beats

For a single LRA exhibiting a beating pattern, the LRA will create "pulses" of duration 1/Fb, where Fb is the beat frequency. We refer to this time duration as the "beat period". If one has multiple LRAs exhibiting a beat pattern it is possible to set the initial conditions such that these beat pulses occur identically or it could be set up such that there is a phase difference between the beat pulses. This means that one beat pulse amplitude may be at maximum when, for example, the other one is at zero. If the beat pulses have equal beat periods then this relative phase will remain constant. We refer to this time separation between beat pulse maxima as the "beat phase". If the beat periods are constant and equal then the beat phase will be modular, repeating every beat period.

Consider a series of identical LRAs situated in a linear configuration with the axis of vibration for each LRA pointing in the same direction, perpendicular to the line of the configuration. Each LRA is vibrated in such a fashion as to produce a beat pattern with a given beat frequency $F_b$. If the initial conditions are such that the beats are all in phase then the configuration of LRAs will pulsate in unison providing a linear surface exhibiting a uniform beat pattern. On the other hand it is possible to change the relative beat phase between any two LRAs to create different sensations, for example for haptic purposes.

For ease of consideration, let us number each of the N LRAs in the line 1, 2, 3, . . . , N. Let us vibrate each LRA with a beat pattern and set each even LRA to the same beat phase while setting the beat phase of each odd LRA such that they are completely out-of-phase from the even LRAs. In this scenario half of the LRAs will be at maximum amplitude while the other half are at zero. This may be a desirable effect, for example in haptic applications. It may also be desirable to have the beat phase between each adjacent LRA pair shifted slightly. This would produce the effect of having "beat waves", or traveling beat pulses, moving along the linear configuration. This phenomenon is analogous to the phenomenon of soliton pulses traveling along a continuous oscillatory medium, such as a string. These beat waves could be trivially extended to other geometries such as beat waves moving along a circular configuration of LRAs or circular (spherical) beat wavefronts moving along a two-dimensional (three-dimensional) grid of LRAs.

2.4. Calibration of the System and the Use of a Lookup Table.

LRAs are important actuators but they can be very challenging to run optimally or even near optimally.

As the frequency of the sine wave in the forcing function moves away from an LRA's resonant frequency, there is an associated drop in gain and a phase shift. We can calibrate the system and produce a lookup table to correct for these issues.

The approach that some semiconductor companies have taken is to continuously calibrate by monitoring the back-ERF of the LRA to determine its resonance frequency. This method is called "auto-resonance." For example, Texas Instruments offers the DRV2603 Haptic Driver with Auto-Resonance Detection for Linear Resonance Actuators and the DRV2605 Haptic Driver for ERM and LRA with Built-In Library and Smart Loop Architecture.

The methods described in this inventive disclosure for producing beats and mixing frequencies can be implemented in a haptic driver chip, a specialized microprocessor, or other systems, in such implementations that are well understood by those generally skilled in these areas of expertise.

Another way to calibrate is to employ an external accelerometer and sweep each LRA through a frequency band, recording the amplitude gain and phase shift for each frequency. FIG. 163 illustrates a example system to do this. The system in FIG. 163 has a microcontroller, an analog to digital converter ("ADC"), a digital to analog converter ("ADC"), a signal amplifier ("amplifier"), a Random Access Memory ("RAM") connected to the microcontroller, an accelerometer, and an LRA. The accelerometer and the LRA are both contained in a device, for example a game controller. The accelerometer measures the vibration forces output from the LRA. The RAM contains lookup calibration tables used to store the calibration data of the necessary phase and amplitude correction values determined during a calibration procedure for the LRA. A calibration procedure would sweep through the frequency band of the LRA (preferably at a low output amplitude to minimize the haptic effect perceived by a person holding the device), measuring the associated amplitude gain and phase shift for each frequency, and storing these correction values in the lookup calibration table associated with the LRA. Later, either before or during the output of a desired waveform to the LRA, the output waveform would be corrected for the phase offset and amplitude gain associated with each frequency in the output waveform, thereby ensuring that the LRA will produce the correct vibration force waveform. This calibration can be performed as needed. The functions of this example system may be implanted in an integrated haptic driver semiconductor component. Other systems, for example using pulse width modulation, are also suitable for driving the LRA, as explained elsewhere in the descriptions associated with this inventive disclosure and as known to persons skilled in the arts used to practice the inventions contained within this inventive disclosure.

2.5. Beating Frequency Examples 2.5.1. Example 1: Two Beating Frequencies

Two sine waves, vibrating near the resonant frequency (for example at 149 Hz and 151 Hz respectively) with similar amplitudes produce a salient beating sensation. Having identical amplitudes produces 100% modulation (that is to say, the amplitude of the beats goes all the way down to zero), having non-identical amplitudes produces less than 100% modulation. Maximum gain is usually achieved when $F_{min} < F_r < F_{max}$. An example of two sine waves beating is illustrated in FIG. 164, and the parameters for this example are provided below.

```
In[160] :=
(* Example 1 *)
F_r = 40;           (* resonant frequency *)
F_b = 3;            (* beat frequency *)

F_0 = F_r - F_b/2;  (* frequency 0 frequency *)

A_0 = 1;            (* frequency 0 amplitude *)
ϕ_0 = 0;            (* frequency 0 phase *)

F_1 = F_r + F_b/2;  (* frequency 1 frequency *)

A_1 = 1;            (* frequency 1 amplitude *)
ϕ_1 = π;            (* frequency 1 phase *)
{F_r, F_b, F_0, A_0, F_1, A_1}
Plot [(A_0 Sin[F_0 2πt + ϕ_0] + A_1 Sin[F_1 2πt + ϕ_1]},
  {t, 0, 1}, PlotPoints → 100, MaxRecursion → 5,
  PlotRange → {{0, 1}, {-2, 2}} , PlotTheme → "Business", Filling → Axis]

Out[160] = {40, 3, 77/2, 1, 83/2, 1}
```

2.5.2. Example 2: Superbeats

Three equally spaced beating sine wave functions, for example 148 Hz, 150 Hz, 152 Hz, centered on the resonant frequency, in this example 150 Hz, produce more sharply defined beat pulses. This is because there are three beating patterns superimposed: 148 Hz beats with 150 Hz, 148 Hz beats with 152 Hz, and 150 Hz beats with 152 Hz. We call this composite waveform a superbeat, because it is the superposition of multiple beat patterns. An example of three sine waves beating and producing superbeats is illustrated in FIG. 165, and the parameters for this example are provided below.

```
In[162]:= (* Example 2 *)
F_r = 80;           (* resonant frequency     *)
F_b = 3;            (* beat frequency         *)
F_0 = F_r - F_b;    (* frequency 0 frequency     *)
A_0 = 1;            (* frequency 0 amplitude  *)
ϕ_0 = 0;            (* frequency 0 phase      *)
A_r = 1;            (* frequency 0 amplitude  *)
ϕ_r = 0;            (* frequency 0 phase      *)
F_1 = F_r + F_b;    (* frequency 1 frequency     *)
A_1 = 1;            (* frequency 1 amplitude  *)
ϕ_1 = 0;            (* frequency 1 phase      *)
{F_r, F_b, F_0, A_0, F_1, A_1}
Plot [ { A_0 Sin [F_0 2 π t + ϕ_0] + A_r Sin[F_r 2 π t + ϕ_r] +
  A_1 Sin [F_1 2 π t + ϕ_1] },
  {t, 0, 1}, PlotPoints → 100, MaxRecursion → 5,
  PlotRange → {{0, 1}, {-4, 4}}, PlotTheme →
  "Business", Filling → Axis]
Out[162]= {80, 3, 77, 1, 83, 1}
```

2.5.3. Example 3: Mixed Sine Wave Frequencies

More than two sine wave functions, for example 148 Hz, 149 Hz, and 152 Hz, near the resonant frequency, for example 150 Hz, when the sine waves phases and amplitudes are varied can produce interesting and discernible haptic textures. An example of three sine waves producing a haptic texture is illustrated in FIG. 166, and the parameters for this example are provided below.

```
In[164] := (* Example 3 *)
F_r = 50;           (* resonant frequency *)
F_b = 3;            (* beat frequency *)
F_0 = F_r - F_b;    (* frequency 0 frequency *)
A_0 = 1;            (* frequency 0 amplitude *)
```

```
φ₀ = π/3;        (* frequency 0 phase *)

Aᵣ = 1;          (* frequency 0 amplitude *)
φᵣ = 0;          (* frequency 0 phase *)
F₁ = .9Fᵣ + F_b; (* frequency 1 frequency *)
A₁ = 1;          (* frequency 1 amplitude *)
φ₁ = 0;          (* frequency 1 phase *)
{Fᵣ, F_b, F₀, A₀, F₁, A₁}
Plot [(A₀ Sin[F₀2πt + φ₀] + AᵣSin[Fᵣ2πt + φᵣ] + A₁Sin[F₁2πt + φ₁]},
   {t, 0, 1}, PlotPoints → 100, MaxRecursion → 5,
     PlotRange → {{0, 1}, {−4, 4}} , PlotTheme → "Business", Filling → Axis]
Out[166] = {50, 3, 47, 1, 48., 1}
```

2.6. Fourier Synthesis Using a Single LRA

In the related work associated with this inventive disclosure we have introduced and described our SAVANT framework. In the SAVANT framework we have shown that Fourier Synthesis can be performed with multiple LRAs, with each LRA producing a single harmonic and driven by a sinusoidal waveform. It may be useful, in some scenarios, to produce two harmonics on a single LRA, even though the amplitude gain from the LRA may be very low. This is done by forming a composite driving signal having the two harmonics, each adjusted for the associated amplitude gain and phase shift caused by the LRA. This would allow the production of asymmetric waveforms, for example, that we believe have utility for directional haptic cues. The amplitude gain of the composite output from the LRA having multiple harmonics, in this example scenario, may be increased by using an array of two or more LRAs to enable the SAVANT magnitude mode. The motivation to do this is because it may be more energy efficient or more optimal utilization of the LRAs to produce a multi-harmonic waveform in each LRA and then combine them using SAVANT magnitude mode rather than producing individual harmonics, one per LRA. FIG. 167 is an example of a composite signal having two harmonic component at different amplitudes being output to a single LRA. The parameters for this example are provided below.

3. The Importance of Haptic Beats

LRAs when driven off-resonance will produce lower amplitudes than those driven on-resonance. Normally this is a big stopping point for LRAs but not for us, because we are interested in haptic applications and we do not need a lot of amplitude get the skin's attention. We are passing information through temporal changes in the LRAs (the beat pattern, beat frequency, and so on) and not relying on the spatial changes produced by an LRA (the distance it moves your skin back and forth).

Advantages for driving an LRA with beats compared to normal LRA operation:

Beats are resonance frequency agnostic. This allows for substantially similar effects to be produced on different hardware.

Beat waveforms are fairly robust against changes in the resonant frequency. This means that the effects a device displays will not change substantially even if the resonant frequency drifts due to materials aging, normal usage, temperature variations, etc, except for beat waveform amplitude. This allows for devices to display substantive and useful beat patterns even when there is slight uncertainty in the actuator's resonant frequency.

Beat displays convey information through the time separation of the beats (or pulses). This is in contrast to normal sinusoidal LRA output, where the main modal-

```
In[168] := (* Example 4 *)
Fᵣ = 50;         (* resonant frequency *)
F_b = 3;         (* beat frequency *)
F₀ = .75Fᵣ;      (* frequency 0 frequency *)
A₀ = 1;          (* frequency 0 amplitude *)

φ₀ = π/2;        (* frequency 0 phase *)

F₁ = 2F₀;        (* frequency 1 *)
A₁ = .5;         (* frequency 1 amplitude *)

φ₁ = π/2;        (* frequency 1 phase *)

{Fᵣ, F_b, F₀, A₀, F₁, A₁}
Plot [(A₀ Sin[F₀2πt + φ₀] + A₁Sin[F₁2πt + φ₁]},
   {t, 0, .25}, PlotPoints → 100, MaxRecursion → 5,
     PlotRange → {{0, .25}, {−1, 2}} , PlotTheme → "Business", Filling → Axis]
Out[168] = {50, 3, 37.5, 1, 75., 0.5}
```

2.7. Mixing Beats, Superbeats and Fourier Synthesis

Although it is clearly a non-traditional use of LRAs to mix any combination of sinusoidal wave components that form beats, superbeats and Fourier Synthesis, these afford important opportunities to increase haptic cues and sensations with conventional, off-the-shelf, vibration actuators.

ity of information conveyance is through the amplitude of the vibration. Because the salient quantity in the display is the time difference between pulses, one need only enough amplitude to create a "just noticeable difference" on the object reading the display. For haptic applications, the LRAs are in close contact with the skin and human skin is extremely sensitive to the presence of vibration sources.

Beat patterns are produced from the combination of two vibration frequencies. In the case of the Gemini Drive, one ERM is driven at one frequency, $(F_0-F_b/2)$, and the other ERM is driven at $(F_0+F_b/2)$, where $F_0$ is the "base frequency" and Fb is the "beat frequency". The beat pattern consists of sinusoidal oscillations at the base frequency modulated by an envelope that oscillates at the beat frequency and it has a rotating circular spatial beat that is caused by the precession of the constructive interference of the two ERMs.

For practical haptic purposes, the user is unable to discern the base frequency because it is much higher than what the skin can perceive. Instead the user feels a "buzzing" vibration whose amplitude modulates sinusoidally at the beat frequency. When the beat frequency is chosen to be small (roughly less than 20 Hz) then users are better able to discern each pulse of the beat pattern ("beat pulse") individually.

When the beat frequency is low and the user can discern each beat pulse individually, the time delay between beat pulses (the "beat period", given by the inverse of the beat frequency) can be utilized in a fashion as to convey information through haptics. Using the beat period to convey information is a substantially different haptic display from the standard mode of operation because it relies on the user's ability to detect time intervals in roughly the 50 ms-1000 ms range rather than the roughly 5 ms-10 ms range. Moreover, it only requires the user to ascertain the existence of the vibrations, it does not require the user to make judgments about small amplitude changes in sustained vibratory impulses. This means that a vibration device need only produce a "just noticeable difference" ("JND") on the skin. Since skin is extremely sensitive to the presence of vibration, producing a JND requires a minimal of energy input, thus allowing for great energy savings compared to standard modes of operation.

3.1. Optimizing the Affect of Haptic Effect Sensations

Many of the haptic effects described in the Haptic Energy Consumption reference are transient effects, since energy is a consideration when consumer electronics devices are powered from a replaceable or rechargeable battery. However, we have established that for some consumer applications that use vibration, sustained modulation such as beating, or smooth, non-jarring transient haptic effects are sometimes more desirable. Because they are more pleasant and do not demand attention, the user can maintain a state of relaxation or reverie. As taught herein, beating and variations of beating during the haptic effects can emulate such sensations as feeling a heartbeat, a familiar and pleasant haptic effect, which may achieve the ability to alert a person within their dream-state, while ensuring that they are not jarred out of the sleep-state.

The modulations are able to produce discernible rhythms using beats, varying the beat frequency and the number of beats, and the interval between beat groups. We can also vary the haptic texture and vary a roughness quality from rough to smooth by adding additional sine wave components such that no two sine waves have a harmonic relationship.

3.2. Some Example Applications of Haptic Beating 3.2.1. Lucid Dreaming Haptic Alerts Lucid dreaming is a mode whereby one can have conscious awareness and achieve some conscious control while within a dreaming state. Some research has shown that vibrotactile stimulation can be used to alert a person that they are dreaming allowing them to achieve lucid dreaming. However, if the vibrotactile stimulation is unpleasant it can wake the person up out of the dream state.

3.2.2. Nocturnal Enuresis Haptic Alerts for Behavior Modification

Nocturnal enuresis, conventionally known as bedwetting, can be electronically detected with sensors and the person can be alerted through a wearable vibration device that generates a vibration alert than can be adjusted for the person's optimum haptic pattern, which may include using beats in a haptic effect. The wearable vibration device is preferably wireless.

3.2.3. Other Physiological States that May Trigger Haptic Alerts

Other medical conditions might relate to haptic alerts triggered by the detection of a person snoring, to aide in snoring behavior modification. Thus, more generally, if a physiological state can be discerned, an appropriate haptic effect can be displayed. The haptic display may be a wearable device, or alternatively it may be in a pillow or a pad placed under the person.

3.2.4. The Mitigation of Pain and the Production of Pleasure

Vibration is often used for personal massage and adult vibration devices, and generating beats LRAs as shown in this inventive disclosure may both mitigate pain and produce pleasure and relaxation.

3.2.5. Entrainment with Real-World Physiological Measurements

The beat frequency may be correlated with a real-world phenomenon such as a person's heart rate, based on a physiological measurement via a sensor or group of sensors. It may be that a person's heartbeat is scaled by a factor of ten, so that a heartbeat of 80 Hz is scaled to a beating frequency of 8 Hz, for example. A heartbeat may be modeled as a group of two beats followed by an time interval or period, and then the repetition of the group of two beats. The heartbeat rate could be represented as proportional to the reciprocal of that time interval.

3.2.6. Telephone Call Alerting

Beats may be used to convey the occurrence of a telephone call, for example through a wearable electronic device that communicates with a cellular phone.

3.2.7. Alarm Clock Alerts

Beats may be used to convey the occurrence of an alarm to wake up for example. It is possible that the vibration cue may be provided to a person wearing a haptic display.

3.2.8. Subway Train Stop Alerting

Beats may be used to convey that a person is near his or her subway train stop or other mass transit destination. It is possible that the vibration cue may be provided to a person wearing a haptic display.

3.2.9. Automobile Alerting

Beats may be used to convey that a person driving an automobile or motor vehicle that there is a situation that requires immediate attention. It is possible that the vibration cue may be provided to a person wearing a haptic display, or alternatively in automobile equipment such as a steering wheel or driver's seat cushions.

3.2.10. Autism Spectrum Disorder Calming

Vibration pillows are sometimes used to help calm persons with Autism spectrum disorder. The haptic sensations afforded by beating increase the scope of vibration sensations available.

3.2.11. Plush Toy

Vibrating plush toys are sometimes used to help children go to sleep. The haptic sensations afforded by beating, for example, emulating a heartbeat, may increase the effectiveness of the toys in assisting children to go to sleep.

3.2.12. Wearable Garments and Wearable Devices

Garments, including vests, shirts, pants, or wearable accessories such as a belt, a harness, an armband, a wristband, or watch that can produce haptic sensations including beating from LRAs may be used to signal the wearer of an event or the proximity of another person of interest, such as a potential boyfriend or girlfriend, in a dating scenario.

3.2.13. Geofencing Alerts and Proximity Alerts

A physical space may be electronically defined, and haptic cues using beats from a single LRA or multiple LRAs may be used to convey the bounds of that space, including proximity to the bounds using, for example, beat frequency. This may be useful for helping children stay within a geofence, or alerting their parents or guardian if they have crossed through the geofence. This also may be useful for a surgeon to have haptic cues to intuitively define the boundaries of an area that he or she should not move his or her scalpel outside.

3.3. Pseudo-Rumble

Psuedo-rumble is the use of beats, superbeats or spatial beats to convey low frequency rumble sensations on high frequency LRAs or ERMs used in mobile devices. It is well established that game controllers use low frequency ERMs, that generate large forces at low frequencies, such as 15 Hz-45 Hz, which are proven to be superb frequencies for improving the immersive experience of a video game. Mobile devices often rely on very small LRAs and ERMs and these need to vibrate at significantly higher frequencies in order to achieve the necessary vibration amplitudes to alert a user. By using beats, superbeats or spatial beats, we can emulate the low frequency forces even though we are using the high frequency, miniature vibration actuators.

4. Non-Haptic Applications

4.1. Modulating the Beat Frequency to Transmit Information Between Devices

The capability to amplitude modulate the sinusoidal response of an LRA driven at a frequency $F_0$, especially if $F_0 = F_r$, opens the door to information transfer between two devices, for example a first device having an LRA and a second device having an accelerometer which can measure the output vibrations of the LRA and demodulate the information.

5. Example Arrangements

FIGS. 164-167 were generated using the parameters set forth above, and used the 10 mm diameter×3 mm width dimensions of a SEMCO DMJBRN1030XX linear vibrator as an example. FIGS. 168A-B through 175A-B illustrate various LRA configurations for use in accordance with aspects of the invention. For instance, FIGS. 168A-B illustrate side and cross-sectional views of a compact LRA arrangement for spatial beating with two LRAs. FIGS. 169A-B illustrate side and cross-sectional views of a compact LRA arrangement for spatial beating with two LRAs. FIGS. 170A-B illustrate side and cross-sectional views of a compact LRA arrangement for spatial beating with three LRAs. FIGS. 171A-B illustrate side and cross-sectional views of a compact LRA arrangement for spatial beating with three LRAs. FIGS. 172A-B illustrate side and cross-sectional views of a compact LRA arrangement for spatial beating with four LRAs. FIGS. 173A-B illustrate side and cross-sectional views of a compact LRA arrangement for spatial beating with four LRAs. FIGS. 174A-B illustrate side and cross-sectional views of a compact LRA arrangement for spatial beating with four LRAs. And FIGS. 175A-B illustrate side and cross-sectional views of a compact LRA arrangement for spatial beating with four LRAs.

6. Glossary

6.1. Multi-Frequency Band

The frequency band bounded by the lowest frequency and the highest frequency in the LRA forcing function composed of sinusoidal wave components.

6.2. Multi-Frequency Band Ratio

The ratio of the highest frequency and the lowest frequency in the LRA forcing function composed of sinusoidal wave components. The bandwidth ratio, $B_r$, must be greater than 1 and less than 2 to ensure that the two frequencies beat, or $1 < B_r < 2$. This is because a ratio of one occurs if there is no difference between the frequencies, and a ratio of two occurs if the maximum frequency sinusoidal wave component is the first harmonic of the minimum sinusoidal wave frequency component. If harmonics are desired, than the bandwidth ratio does not need to have these upper and lower limits.

6.3. Beat Pulse (Haptic)

A beat that doesn't feel like it is moving, such as those generated by a single LRA. Smoother than a click.

6.4. Superbeats (Haptic)

The waveform resulting from the superposition of multiple beat patterns, especially if the each of the beat patterns has the same beat frequency and the same beat phase. This results in a beat haptic texture.

6.5. Spatial Beats (Haptic)

Beats that feel like they are traversing a spatial path, for example the circular beating sensation of a Gemini Drive, in contrast to a beat that doesn't feel like it is moving, such as a beat pulse.

VI. Differential Haptic Guidance for Personal Navigation

This portion of the disclosure describes multiple examples and embodiments relating to wearable devices (and also to implantable medical devices or IMDs and holdable devices such as mobile phones) such as wristbands, that can provide haptic guidance to a person for such example tasks as to: help one navigate one's body or body part from a first location to a second location; help a person maintain one's body or body part at a given location or within a defined spatial zone; or help a person navigate one's body or body part along a defined path, while avoiding obstacles; or assist one in stasis or motion maintain one's body in a fixed relation to other adjacent people or objects. Also, this portion of the disclosure describes how haptic feedback can convey proximity and range information using vibration beating sensations produced from a single LRA or a SAVANT.

This technology has broad industrial utility for guiding people using haptic stimuli for use as an assistive device when a person may have a vision deficit (such as blindness) or when a person prefers to use the haptic sensory modality instead or in addition to using a person's sensory modalities of vision and audition. While this disclosure describes embodiments of assistive and augmentative technology for modern humans (*Homo sapiens sapiens*), other embodiments of the invention can be built for individuals of species including: dogs (*Canine lupus*), cattle (*Bos primigenius*), horses (*Equusferus caballus*), sheep (*Ovis aries*), etc.

Various embodiments of the present disclosure are designed to be worn and used persistently, so that it may be used as an artificial sensory modality similar to the lateral line in aquatic invertebrates such as fish and sharks. To achieve this goal of persistence, various embodiments of the invention may include subsystems and methods to manage an "energy budget" (a process commonly known as "power management") and an "attention budget" to prevent sensory overload (for the purposes of this inventive disclosure we shall call this process "attention budget management").

Soon it will be commonplace to have the capability to continuously locate a person, or a device worn on a person, spatially, with great precision due to the rapid advances and deployment of wearable sensor technologies in consumer electronics and indoor positioning technology and associated indoor and outdoor location services.

This pervasive capability, combined with body-worn vibration or other tactile actuators, and guidance algorithms as disclosed herein this inventive disclosure will enable personal navigation by essentially "feeling" one's way through space to a given target destination, and many other practical applications.

Desirable qualities in such a system include a) intuitive haptic feedback to allow rapid and fluid movement along a good path to the target; b) low cost to manufacture; c) portable; d) low power consumption; and e) minimal impact on a person's attention since vibration can often dominate one's attention. It is desirable to use low cost, conventional, and widely available actuators, including Linear Resonant Actuators and Eccentric Rotating Masses, and various SAVANTs (described elsewhere) including a Gemini Drive or a miniature version of a Gemini Drive, known as a mini Gemini Drive (described below).

VI.1: Clicks, Bursts of Clicks, Continuous Streams of Clicks, Scalar Haptic Feedback Responses and Vector Haptic Feedback Responses Guidance via haptic navigation will, in certain embodiments, comprise a continuous stream or series of discrete haptic feedback responses ("clicks", e.g., produced by one or more beat patterns) that will guide the user. A click is defined to be a vibrational stimulus that is so short in duration it feels like an instantaneous haptic feedback response ("response") from the guidance algorithm/process. It is a temporally discrete, spatially localized, momentary sensation resulting from either the impulse of a single actuator or the combined output of a group of actuators known as a SAVANT, which is described in more detail in the accompanying appendices. A click may be varied in amplitude, and duration, for example. A burst of clicks and a continuous stream of clicks can also be generated by producing beating vibration patterns as generated by a single vibration actuator or a SAVANT, as described elsewhere herein.

FIG. 151 is an example system level diagram of a wearable haptic device with haptic actuators and a differential haptic guidance algorithm in its program and data storage. The algorithm is run on a local MCU which has a wireless communication module, an inertial measurement unit, and multiple haptic actuator drivers. The n haptic actuators are connected to the haptic actuator drivers on board the wearable device. In some embodiments SAVANTs such as a mini Gemini Drive may be used in place of a standard haptic actuator such as an eccentric rotating mass or linear resonant actuator, and may have directional communication with the MCU. The IMU may periodically calibrate its position and orientation through querying the external location based services, either indoor or outdoor, via the differential haptic guidance algorithm. In one embodiment the algorithm is able to locate and track a target via external location based services, either indoor or outdoor.

FIG. 152 illustrates a person's arm with a wearable wristband having two mini Gemini Drives attached to haptically display clicks and bursts of clicks.

FIG. 153 illustrates a tablet stylus with a mini Gemini Drive attached to haptically display clicks and bursts of clicks. This is an example of a tool that can be used to haptically display clicks and bursts of clicks controlled by a guidance algorithm. Besides a stylus, other example tools include a smartphone, a game controller, a remote control, a tablet computer, a pair of glasses, a cane, a walking stick, a ski used for skiing, a snowboard, a golf club and a skateboard.

FIG. 154 illustrates assembled and exploded views of a mini Gemini Drive and an interior view of its construction.

These clicks can also be organized into periodic collections of multiple clicks, which we denote as "bursts" of clicks. Bursts are defined to be short periods of multiple clicks in rapid succession. These clicks or bursts may come from a single vibration device (which we will call "scalar" responses) or from two (or more) nearby or paired vibration devices (which we will call "vector" responses). In certain examples, scalar responses will guide the user solely through a magnitude related to the response, either the magnitude of the vibration click or burst amplitude, the duration of the vibration burst or the frequency of clicks or bursts. Vector responses will rely on differences between the multiple vibration sources. For instance, the user might be guided by trying to match the frequency of clicks in vibration device A to those in vibration device B, the amplitude of vibrations in device A to those in device B or the duration of bursts from device A to those in device B. It is also possible that haptic guidance could incorporate matching multiple stimuli at once, for example the period between bursts could shorten while the amplitude of the clicks in the bursts increased. In addition to the characteristics of the bursts as a whole, the clicks comprising each burst may change to affect the feel or haptic timbre or texture of the bursts. This could comprise for example a series of bursts where each burst is comprised of 10 clicks of ascending amplitude. Another example would be a series of bursts of 10 clicks each, but the frequency of clicks within each burst is increasing. The rhythm and relative amplitudes of the clicks may vary during a burst to convey a unique pattern, such as a heartbeat. Then the absolute amplitude of that unique pattern may be varied across time or space, for example, to convey distance or orientation cues, as part of this haptic guidance invention.

For the purposes of energy conservation, attention conservation and stimulus differentiation, it is desirable in some embodiments to replace a fairly continuous stream of clicks with a series of periodic bursts. For brevity in the remainder of this discussion we will generally only refer to clicks though bursts of clicks may be substituted interchangeably.

VI.2: Click Gradients and Click Spaces

Regardless of how the vibrational cues are manifested, it is necessary to define an abstract space in which both the user and the target are embedded and a "click gradient" between the two. The click gradient is a topological construct that represents the variation of the salient vibration parameter (be it the amplitude or frequency of the clicks or the duration of a click burst) between the user and the target. The click gradient controls, for example, how the frequency of clicks changes as a user approaches the target. The click gradient between the user and the target is a one-dimensional object and it represents a line in the three-dimensional click representation of physical 3-space (we hereby refer to this three-dimensional space of all possible click gradients between any two physical points as the "click space").

Obstacles and targets can be represented in the click space with the notion of an "energy function," similar to how heights in a hilly landscape are differentiated by their gravitational potential energy (see FIG. 162). Obstacles such as walls could be given very high energy values, which would ensure that if the user deviated from the optimal path towards an obstacle, there would be a steep click gradient as they approached the obstacle, resulting in a significant increase in vibrational feedback indicating they change course (see FIG. 161). The target destination may be given the lowest energy value and thus the optimal path between the user and the target would then be the path of least energy between the user and the target. If the user deviated from the best path, the new best path would be the path of least energy from the new user position to the target. In cases where the click space is sufficiently flat, it may be desirable to leverage the distance between the user and the target as an additional variable indicating the direction towards the target. Alternatively, the path itself could have the highest energy values.

The topology of the click space does not need to be uniquely defined a priori and therefore must be determined by the guidance algorithm of the haptic navigational device. This means that there is freedom for the guidance algorithm designer to define the click gradients between, for example, the user and hard obstacles as they think would be best for navigational purposes. A selection of three possible click gradients between a user and an obstacle are shown in FIG. 160. The different curvatures represent different energy gradients in click space and are translated into different ways in which the salient vibrational parameter would change as the user approached the obstacle: the top curve would warn the user early; the middle curve would warn the user uniformly and the bottom curve would warn the user more the closer they were to the obstacle. The click gradient need not necessarily be the energy gradient; it could also for example be the slope of the energy gradient (which is akin to a "force" gradient). See FIGS. 161 and 162.

VI.3: Use Cases

Once the click space is defined, the topology of the click space will translate into haptic feedback for the user which will guide them in the space. Each vibration actuator in the navigation device may have click series and bursts with various salient parameters, including: the amplitude of the clicks/bursts; the duration of a click, the duration of the bursts and the frequency of the clicks/bursts, and the rhythm of the clicks within a burst. Each of these parameters may vary in time and they will be determined as functions of any or all of the following: the position of the actuator; the position of the target; the positions of other actuators in the device and the velocity and/or acceleration of the user. The functions that prescribe the salient vibrational parameters are open to the guidance algorithm designer and different functions will result in different navigational experiences. Below are some examples of different usage scenarios.

FIG. 155A illustrates three identical click bursts each having the same click duration, click amplitude, and number of clicks per burst, and rhythm. FIG. 155B illustrates three different click bursts each having the same click duration, click amplitude, but varying in the number of clicks per burst.

FIG. 156A illustrates three identical click bursts each having the same click duration and number of clicks per burst, but varying in their amplitudes from high to low in a descending sequence. FIG. 156B illustrates three identical click bursts each having the same click duration and number of clicks per burst, but varying in their amplitudes from low to high in an ascending sequence.

FIG. 157 illustrates how a user may compare click simultaneous click bursts across a pair of distal (spatially displaced) actuators or SAVANTs.

FIG. 158 illustrates how a user may compare a pair of sequential click bursts produced by a single actuator or a SAVANT.

VI.3.1: Use Case: Wrist Moving from Position 1 to Position 2 (Differential or Vector Response)

Consider a wrist-worn device with two vibration actuators A and B on opposite sides of the device, both attached to sensor arrays and computers capable of determining their positions in space and time and the positions of all other objects in the nearby area with sufficient accuracy. The device is to be used to navigate a user along a circuitous, curvy path from point 1 to point 2 while avoiding intermediary obstacles. To do this, each vibration actuator will emit click bursts of constant (equal) amplitude, with only the frequency of the clicks per burst varying as the user moves through space. If the user followed the path of least energy exactly they would feel bursts at a base rate of 10 clicks per burst ("cpb") in both actuators. Deviating from this path will introduce a difference in the click rates between the two actuators that will be directed towards the path of least energy. For instance, if the user deviated to the left of this path, the click rate in the leftmost actuator would increase while the one on the right would stay at 10 cpb. The user would sense the difference in click rates and find their way back to the path of least energy by matching the vibrational stimuli. The obstacles will be represented at the maximum burst rate of 25 cpb, meaning that if the user is directly adjacent to an obstacle they feel 25 cpb in the actuator closest to the obstacle and 5 cpb in the actuator farthest away. As the user moved through the space the burst rates in each actuator would change accordingly and the user would guide themselves by dynamically equilibrating the click rates.

VI.3.2: Use Case: Cane or Walking Stick Moving from Position 1 to Position 2 (Scalar response)

Consider situation similar to that above, but this time with a cylindrical device like a cane or walking stick that has a circular array of 12 actuators evenly spaced in a plane perpendicular to the axis of the cylinder (for purposes of reference the forward-most actuator will be designated 12, the rear-most will be designated 6 and the others will be designated around the circle like hours on a clock face). In this device the clicks will be used and the frequency of the clicks will be constant, but the amplitudes will change according to the user's position in space. Consider that the user starts out on the facing in the direction of the path between the user and the target. The 12 actuators will then begin to click at the base rate of 60 clicks per minute ("cpm") with full amplitude. As the user moves forward, the path bends to the right. In order to guide the user towards this geodesic the 12 and 1 actuators will start clicking at half amplitude at the rate of 60 cpm, then the 1 actuator will click at full amplitude at 60 cpm, then 1 and 2 at half amplitude and so on. The direction of the vibrational cues will always point parallel to the path. As the user turns the orientation of the device the vibrational cues will react, always pointing towards the path. This is similar to how a compass needle always points north no matter how the user orients it.

VI.3.3: Use Case: Keeping Wrist in a Single Place or within a Zone

Rather than navigating from a starting point to an ending point, it may also be desirable to use haptic navigation to maintain a position in space. In this case the user's initial position will correspond to the target position, which will also correspond to the global energy minimum in the click space. Any deviation from this minimum will result in the ascent of a click gradient which will elicit a vibrational response. This response may come as, for example, an increase in the click frequency over the base rate. The response need not be radially symmetric around the energy minimum as one direction of motion away from the target point may elicit a weak response while another direction would elicit a strong response due to the presence of obstacles.

VI.3.4: Use Case: Wayfinding from Waypoint to Waypoint

It may also be desirable to navigate through a series of unrelated points ("wayfinding"). The paths between these points may be determined by the guidance algorithm designer and may, for example, be straight lines in physical space or curved lines determined for example by Bezier interpolation. See FIGS. 159A and 159B. In either case, the problem of wayfinding is equivalent to a connected series of point-to-point navigations with the interpolation between the waypoints defining the path of least energy.

VI.3.5: Use Case: Moving Target

It may be that the target position is dynamically changing in time. In that case the path to the target will also have to be updated. If the device is capable of knowing instantaneously the new position of the target then it could recompute the path dynamically. If the device cannot know the new target position it may be that the device would first guide the user to the original target position, acquire the new target position and then guide the user to that new target position. In this case the moving target problem reduces to a concatenated series of single target problems, similar to the case of linearly interpolated wayfinding as discussed above.

VI.3.6: Use Case: Constant Relative Position

A user may wish to always maintain a constant relative position to external objects, for instance a marching band member marching in formation. This usage case is similar to the usage case of keeping one's wrist in a defined position, but now the energy landscape is dynamically changing. In this scenario, the desired relative position would be considered the energy minimum and its position would have to be updated whenever the external elements changed their positions. Once it is updated, if it is found that the target position is no longer where the user's position is, then there will be a click gradient from the user to the target. This usage case is a combination of the maintaining constant position case and the moving target case.

VI.3.7: Use Case: A Stylus with a Tablet

FIG. 153 is an example of a haptic stylus device outfitted with a mini Gemini Drive to allow a user to obtain differential haptic guidance to navigate the surface of a tablet. Other handheld tools may be similarly outfitted.

Similarly a glove could be outfitted with mini Gemini Drives or other SAVANTs or actuators at the fingertips to allow a person to "feel space" and obtain haptic guidance according to the precepts of this inventive disclosure. Similarly other apparel such as running shoes, an armband, a legband, a hat, a vest, a halter, a belt or a visor that permit a constant relationship between an local haptic display such as an actuator or a proximal SAVANT may be used as part of a wearable haptic guidance system. Handlebar grips of a bicycle or a motorcycle, or a steering wheel grip, may be also useful for mounting the haptic display elements of a haptic guidance system that is non-wearable.

VI.4: Sensory Difference Thresholds and the JND and Differential Haptic Guidance A central principle of this portion of the disclosure is to leverage human (or other species) abilities for comparing different stimuli, differentiated in time (sequential clicks or click bursts) or space (spatially distributed clicks on different parts on one's body) or combinations of time and space. Sensory difference thresholds and just noticeable differences (JNDs) are well known in the scientific literature related to the field of Experimental Psychology including Psychophysics.

VI.5: How to Generate a Click or a Series of Clicks

The following describes how to generate a click, a continuous series of clicks, or a burst of clicks using illustrative actuator types including: (a) a conventional LRA; b) a mini-Gemini Drive; c) a full-bandwidth haptic actuator such as a piezoelectric actuator; and d) a mini-solenoid with a spring return).

VI.5.a: Conventional LRA

Conventional LRAs have a narrow range of resonant frequencies over which they produce sizeable forces. A click can be generated by providing an amplitude modulated sine wave which rapidly increases then decreases. LRAs have moderately fast response times, and can move into and out of resonance fast enough to produce a click experience. A single click may be produced by taking a static LRA, instantaneously providing a sinusoid of desired amplitude for a minimum number of cycles to produce resonance or partial resonance, then dropping it to zero, at which point the LRA moves back into a static state (depending on the time scale). If the actuator resonates rapidly enough, this will be experienced as a single click. Repeating this process periodically at the desired click frequency will produce a series of clicks.

VI.5.b: Mini-Gemini Drive

A series of clicks can be produced with a mini-Gemini Drive in the following way. First, the Gemini is brought into spinning reserve, with the dual masses 180 degrees out of phase. This way there is no vibrational force. Then, the masses are briefly brought into phase, held there for a period of time, then brought back into spinning reserve (180 degrees out of phase). The amount of time required to generate a single click should be as brief as possible to generate the full desired amplitude then return to spinning reserve, but with the Gemini Drive any desired profile within bandwidth can be reproduced (for example sinusoidal, square, or spiked).

A series of clicks are produced by repeating the above procedure for a single click periodically at the click frequency. For example, if the click frequency is desired to be 5 Hz, then the period for the process should be ⅕ second. The amplitude is determined by how close the masses come to becoming completely in phase during the click procedure, as well as the base frequency. The velocity must not be so large that the motors cannot perform rapid accelerations, but must be large enough to produce desirable amplitudes. Similarly the phase change must not be too large or the click may not be experienced as sharp enough.

If the directly of the click matters, the Gemini Drive can be directed to bring the masses into and out of phase in the same portions of a rotation. For example, if the desired effect is to feel a force to the left, the Gemini Drive can bring the masses into phase (to whatever desired degree) only from 90-270 degrees of the rotation, and possibly a more narrow range, then when passing through the right half plane (from −90 to 90 degrees) the masses should be back to 180 degrees out of phase. Otherwise if the direction of the force is not specified, the timing would be controlled of when to generate a click but not the direction of the force vector. This would create a randomized force vector direction (but not amplitude or frequency). In the case of preventing accommodation (keeping the user attending correctly to the clicks, if desired), the randomized force vector may be useful as a feature.

VI.5.c: Full-Bandwidth Haptic Actuator (e.g., a Piezoelectric Actuator)

Producing a click with a piezoelectric actuator is a matter of generating a click profile, and providing this as a reference signal for the actuator to track. These actuators have extremely fast response times (though small travel, which is quite acceptable in this situation), can generate relatively large forces, and are in general well behaved. Therefore, once a single click profile is created, generating a series of clicks is a matter of repeating the reference profile periodically at the click frequency.

VI.5.d: Mini-Solenoid with Spring Return

This is one of the simplest methods of creating a series of clicks from a mechanistic standpoint, as a solenoid is a unidirectional device (without the spring return). So to generate a series of clicks with this device a brief current of sufficient time to generate a force would periodically be passed through the solenoid at the click frequency. The spring would return the solenoid to its resting position between clicks. In this case, the spring-mass system of the solenoid has a maximum bandwidth due to the time it takes for the spring to return the moving mass to its rest state. Thus the click (and corresponding click frequency, which should be lower than a single click frequency) must not be 'faster' than the bandwidth of this system.

Multiple clicks are generated as previously described in (b), by periodically repeating the process just described at the desired click frequency. It is possible some control may be implemented to minimize resonance due to the spring return by applying some force to decelerate the spring-mass system at just the right moment during the completion of a return cycle. This would serve to smooth the non-click part of the motion for the user, and avoid 'ghost clicks' that any resonance may generate as an experience.

VI.6: Determining Haptic Guidance Onset and Offset

Another way of conserving energy and attention is to only turn the haptic guidance system on when needed and to turn it off when not needed. The system could determine it was needed through context. A person could also make a gesture or press a button to turn it on. It could turn off when the person had reached the location point. It may also be desirable for the user to invoke a gesture or press a button to change the overall vibration response; for example shaking a wrist-worn device could increase or decrease the base rate of vibrations or tapping on the device could increase or decrease the difference in feedback magnitudes for navigation using differential stimuli.

Conversely, changes in frequency or amplitude could be used periodically to 'shake' a user out of a state of accommodation, where their sensory system had become adapted to the clicks and thus began to ignore cues. By periodically providing random shifts then returning to the base signal, the user's brain would not as easily accommodate. However, some accommodation may be desirable to make the system become integrated into the user's perceptions without demanding too much attention.

VI.7: Multimodal Applications

There are many forms of guidance based upon sensory stimuli which can be used for navigation. These include but are not limited to visual, auditory, or other forms of tactile stimuli (such as continuous forces). The human sensory system has a limited bandwidth per sensory modality, so combining multiple modalities may produce a system that can provide more information than a single modality alone.

It can also be used to reinforce a single modality. For example, if a user is driving a car, and there is an augmented display system for obstacle avoidance or navigation, the user may be provided with some visual cues, or in an emergency, both visual and vibrational. If the user is in the middle of highly complex visual information such as a traffic jam, the use of visual and auditory cues may not be processed as quickly as vibrational cues.

One method of multimodal stimulation is to provide the multiple stimuli closely in time (temporally). What this does is help the user to fuse the information. In some cases, one modality can be used to prime a user to respond more rapidly to another modality. For example, to return to a navigation-based application, assume a person is driving, and approaching a turn, but there is too much auditory background noise to hear a spoken voice, and it may be dangerous for the user to look at the screen for visual cues. In this case, vibrational cues may be provided to the user through a wristband, seats, the steering wheel, or other means. A click burst begins at low amplitude, gradually increasing to cue the driver they have an upcoming turn. In this way, various stimuli can be used either together or as a panel of available cues to provide guidance to a user.

In some cases, immersive experience can create a stronger response to navigational cues. Augmented reality provides feedback on top of visual and auditory stimuli. With the addition of vibration to the group of cues, more deeply integrated and immersive experiences can be smoothly provided to a user.

VI.8: Navigation with Haptic Patterns

Perceptual haptic patterns can be varied spatially across distal actuators, such as one on the left, and one on the right. Clicks and click bursts are one type of haptic pattern, but there is an infinite set of possible patterns that could be used. Employing patterns which are innately meaningful, such as a heartbeat, can provide a stronger sense of urgency, or just help a user to relate to, recognize, and engage with the cue. Providing an easily recognized pattern will also assist a user in attending to haptic cues when in noisy or complex environments with a reduced attentional load. For example, consider a user navigational task where the goal is to balance a heartbeat pattern between left and right actuators worn on wristbands or built into a jacket's arms.

A simple heartbeat effect can be produced easily with, for example, a Gemini Drive with a strong perception of a heartbeat that can be repeated as necessary. Some subtle additions can be made to tune the effect, but the user's pattern recognition immediately fills in with the details, reducing the need to process more complex sensory input, and simplifying the code necessary to generate this effect. This meaningful pattern is very effective for haptic stereo panning cues, for example.

An example of providing differential haptic guidance with a haptic pattern such a heartbeat would be: a person is outfitted with one wearable haptic display on the left wrist and an identical haptic display on the right wrist; the guidance algorithm knows where each wrist is located and where the target location is; the guidance algorithm is able to command a heartbeat pattern to each wrist, and control each heartbeat pattern's magnitude. When the magnitude of the heartbeat pattern is identical on each wrist haptic display, the person knows he or she is on the right path. Once the person is on the right path, the person can determine the correct direction along the path to the target by having the magnitude increase towards the target, for example. This has a low cognitive load and leverages innate human abilities to compare different haptic stimuli.

VI.9: Minimizing Energy Consumption and Attention Consumption

As previously mentioned in this inventive disclosure, it is a key design objective to minimize energy consumption and also to minimize attention consumption, so as not to intrude on a person's attention space to the point of being annoying or counter-productive to one's tasks and priorities. Thus, the amplitude of the clicks may be varied from person to person, as part of a personal preference in a system menu or determined as an optimum performance parameter through a personal calibration. Alternatively, it may be varied according to the context, for example, a firefighter responding to a need to immediately exit a building may be provided an extremely elevated amplitude of click stimuli.

Beating is a sensation that that can be readily synchronized between different vibration devices of patterns, since it is produced through matching the difference between the component vibration frequencies across two or more vibration modules. Generally, it is easier to match the difference of the component frequencies across two distinct vibration modules, rather than to match the component frequencies across the two distinct vibration modules.

The precession of the beat crests in a pair of co-rotating ERMs, for example in a Gemini Drive, produces a slowly circular undulating sensation that rotates in the same direction as the two ERMs. Thus, two Gemini Drives can generate similar beating patterns that can synchronize their beats in beat frequency, and beat phase, even though the base frequencies are different. For example one Gemini Drive can generate a beat frequency of two Hertz with a base frequency of 30 Hz, and synchronize its beats with a second Gemini Drive having a beat frequency of two Hertz with a base frequency of 45 Hz. A single LRA can generate beat frequencies of two Hertz, and a pair of LRAs in a SAVANT can generate a circular beating pattern. Thus beating is a very desirable vibration pattern because it is able to convey perceptually salient across a wide variety of conventional vibration actuators such as ERMs and LRAs, and the amplitude of beat patterns can be increased by displaying a synchronized beating pattern simultaneously across multiple different SAVANTs or individual LRAs. Therefore there is great utility in haptic beating patterns for three reasons: 1) they easily convey perceptually discernible low frequency rate information even though their base frequencies are high; and 2) the exact same beating pattern can reproduced using across a diversity of vibration actuator types (for example, LRAs and ERMs) and geometric network topologies; and 3) multiple vibration modules can be readily configured to synchronize their beats, producing larger amplitude beat patterns, as a first example, or enabling a beat pattern to appear to move between spatially separated vibration modules, as a second example.

VII. Haptic Display Using Synthesized Elliptically Rotating Forces

1. Introduction:

In this section we describe the theory, along with novel, practical and useful embodiments of a haptic display using SAVANTs (Synchronized Arrays of Vibration Actuators in a Network Topology) and low-cost, off-the-shelf vibration actuators to produce haptic sensations and directional haptic cues based on contact forces produced by synthesizing elliptically rotating forces, using a new SAVANT actuator class we call an "elliptical drive." SAVANTs were described and illustrated in detail above. We introduce several embodiments of haptic display using the elliptical drive. We also introduce a second new SAVANT actuator class that we call a "stiction" drive for locomotion and describe several embodiments of the stiction drive.

Ultrasonic motors are a type of piezoelectric-based motor that have found great success in high precision devices such as auto-focus camera lenses and surgical micro-walking machines. These motors generate motion from ultrasonic oscillations of piezoelectric material. Ultrasonic motors operate by generating a friction wave that produces motion on a movable element of the motor. The friction wave is produced by simultaneously rotating many small regions of a frictive surface in localized circular or elliptical paths. While these ultrasonic motors have important advantages including high speed, high torque, and precision motion, they generically require expensive materials that are difficult to handle and produce, and require high voltages. In this disclosure we describe a vibration device that also creates contact forces capable of providing an overall non-zero displacement using circular or elliptical motion of a frictive surface, however our device is created with combinations of low-cost, widely available actuator components such as linear resonant actuators (LRAs) and eccentric rotating masses (ERMs) within our framework of SAVANT (Synchronized Array of Vibration Actuators in a Network Topology). These low-cost actuators either naturally produce circularly rotating forces or produce linearly directed forces that can be combined with linear vector algebra to produce circularly or elliptically rotating forces. SAVANTs with conventional, low-cost, off-the-shelf vibration actuators are well suited to synthesize these elliptically rotating forces for the purpose of producing contact forces and haptic cues.

2. Industrial Applicability:

Haptic displays that may use the embodiments described herein include mobile phones, game controllers, and adult vibrator for personal pleasure. Other uses may include locomotion and materials handling.

3. Introduction of the Elliptical Drive and Force Ellipses

With the framework of SAVANT, we can combine and synchronize the force vectors produced by actuators such as LRAs and ERMs to create resultant force vectors that rotate in a circular or elliptical path. As a circle is merely an ellipse with degenerate foci we shall henceforth only refer to circular or elliptical paths as elliptical paths. By changing the phase, amplitude and frequency of the component actuators we can apply arbitrary geometric transformations to these elliptical paths, effectively scaling, shearing, rotating, and reflecting them, or any combinations of those linear operations, while controlling their rotation frequency and phases. All that is necessary is that the vibrational axes of the component actuators span the space of interest: two non-collinear vibration axes to span a plane and three non-collinear and non-co-planar vibration axes to span a 3-volume. We call these elliptical paths "Force Ellipses."

Generically, the devices we describe herein can produce non-zero average displacement by pairing elliptical forces with external forces such as friction, gravity or elastic forces, in a similar manner as ultrasonic motors. We refer to these configurations of low-cost actuators designed to produce non-zero average displacement via elliptically rotating resultant forces as "Elliptical Drives." The external forces created by an Elliptical Drive can be utilized for many applications, including producing a haptic cue from lateral stretching of the skin and locomotion of an object comprising, among other things, an Elliptical Drive. Individual Elliptical Drives can be combined to create contact forces at multiple contact points for more sophisticated haptic cues, such as a wave.

We may wish to embed the SAVANTs in an elastic medium such as foam. (The elastic medium may exert restoring forces upon the SAVANT. This allows the SAVANTs to generate the force ellipse beneath the surface. It also partially decouples a given force ellipse from other force ellipses embedded in the device and other rigid parts of the device.

Generically Elliptical Drives will create non-zero average displacement by driving an object external to the comprising vibrational actuators. This object will generically have a frictive surface which will produce contact forces on external bodies. This object might be a simple rectangular block housing the battery and controllers for the vibration actuators or it could be a volume of viscoelastic (elastic material or viscoelastic) material protruding through an aperture of hard plastic. Regardless of the nature of the force-transmitting object, the principle is the same: During half of its rotation, the Elliptical Drive will push the object closer to the external contact surface and in one lateral direction; during the other half of its rotation, the Elliptical Drive will pull the object away from the external contact surface and pull it back in the opposite lateral direction so it will repeat the cycle starting from the same initial contact point when the Elliptical Drive has made a full rotation. In this manner the friction forces between the force-transmitting object and the external contact surface will continually provide unidirectional propulsion forces to either the force-transmitting object or the external contact surface. These forces will repeat at a frequency equal to the rotational frequency of the Elliptical Drive and their duration will be half of the period of the Elliptical Drive's rotation. The direction of the forces depends solely on the rotational direction of the Elliptical Drive and can be changed by reversing the direction of rotation.

3.1 Embodiments

In analogy with ultrasonic motors, we wish to create propulsive forces via the elliptical motion of a frictive surface. Rather than rely on deformations of piezoelectric materials though, we can achieve the same propulsive forces using low-cost, widely available vibration actuators such as linear resonant actuators (LRAs) and eccentric rotating masses (ERMs). In the simplest case we shall consider a single ERM providing the driving force and from there we shall discuss successively more intricate devices including more vibration actuators. We leverage the SAVANT framework to combine and synchronize the component actuators.

In all example embodiments we shall embed the vibration actuator in a viscoelastic material such as foam or silicone. This medium will transmit part of the elliptical force to a contact surface and shall suppress the remaining part of the elliptical force.

This embodiment shown in FIG. 178A illustrates an Elliptical Drive with an ERM embedded in an elastic region with a nub contact. In this embodiment we present a device composed of a solid material such as a plastic housing embedded with a region of elastic material such as foam. Embedded in the elastic material is a single ERM. On the contact surface of the elastic material there is a small nub, possibly made from a different material such as rubber. As the ERM rotates it will transmit a circular force pattern to the nub, which will respond by moving in a circular manner. If pressure is applied to the nub by a fingertip or hand as it moves then the skin will feel a friction force reacting to the motion of the nub against the skin. As the nub is pushed into and pulled away from the surface, the friction force on the hand will increase and decrease respectively. Depending on the orientation of the skin on the nub, it will feel a lateral force stronger in one direction than the other due to this oscillation in the normal force. The nub will create for example a repetitious force in the forward direction when the ERM is rotating in one direction and a repetitious force in the backward direction when the ERM is rotating in the opposite direction.

The embodiment shown in FIG. 178B illustrates an Elliptical Drive with dual LRAs embedded in an elastic region with a nub contact. In this embodiment we present a device composed of a solid material such as a plastic housing embedded with a region of elastic material such as foam. Embedded in the elastic material are two non-collinear LRAs driven in such a manner that the resultant force vector traces an elliptical path. On the contact surface of the elastic material there is a small nub, possibly made from a different material such as rubber. As the LRAs oscillate they will transmit an elliptical force pattern to the nub, which will respond by moving in an elliptical manner. If pressure is applied to the nub by a fingertip or hand as it moves then the skin will feel a friction force reacting to the motion of the nub against the skin. As the nub is pushed into and pulled away from the surface, the friction force on the hand will increase and decrease respectively. Depending on the orientation of the skin on the nub, it will feel a lateral force stronger in one direction than the other due to this oscillation in the normal force. The nub will create for example a repetitious force in the forward direction when the resultant is rotating in one direction and a repetitious force in the backward direction when the resultant is rotating in the opposite direction.

The embodiment shown in FIG. 178C illustrates an Elliptical Drive with dual LRAs embedded in an elastic region with a deformable membrane. In this embodiment we present a device composed of a solid material such as a plastic housing embedded with a region of elastic material such as foam. Embedded in the elastic material are two non-collinear LRAs driven in such a manner that the resultant force vector traces an elliptical path. The contact surface of the elastic material is covered by a deformable membrane, possibly made from a different material such as rubber. As the LRAs oscillate they will transmit an elliptical force pattern to the deformable membrane, which will respond by deforming in an elliptical manner. If pressure is applied to the membrane by a fingertip or hand as it moves then the skin will feel a friction force reacting to the motion of the membrane against the skin. As the membrane is pushed into and pulled away from the surface, the friction force on the hand will increase and decrease respectively. Depending on the orientation of the skin on the membrane, it will feel a lateral force stronger in one direction than the other due to this oscillation in the normal force. The membrane will create for example a repetitious force in the forward direction when the resultant is rotating in one direction and a repetitious force in the backward direction when the resultant is rotating in the opposite direction.

In the embodiment of FIG. 179, we present a device composed of a solid material such as a plastic housing embedded with two regions of elastic material such as foam oriented oppositely on the device. Embedded in each elastic material region are two non-collinear LRAs driven in such a manner that the resultant force vectors trace elliptical paths perpendicular to the contact surface. On the two contact surfaces of the elastic material regions there may be an auxiliary force transmitting material, such as a small nub or a deformable membrane, possibly made from a different material such as rubber. As the LRAs oscillate they will transmit elliptical force patterns to the force transmitting materials, which will respond by moving in an elliptical manner. If pressure is applied to the contact surface by a fingertip or hand as they move then the skin will feel a friction force reacting to the motion of the force transmitting material against the skin. As the force transmitting material is pushed into and pulled away from the surface, the friction force on the hand will increase and decrease respectively. Depending on the orientation of the skin on the force transmitting material, it will feel a lateral force stronger in one direction than the other due to this oscillation in the normal force. The two LRA pairs can produce a total of four composite forces on the skin. When their force ellipses are rotating in opposite directions they will convey a uniform force oriented parallel to the contact surface. One direction of this uniform force might convey a signal for the user to move forward while the opposite direction might convey a signal to move backward. When the two force ellipses are rotating in the same direction then the forces conveyed on each side of the device will be oppositely oriented and they might signal the user to turn in a direction.

FIG. 180 illustrates the cross-section of a Vertical Handgrip Controller with Opposing Arrays of Dual LRA Elliptical Drives. Building upon the single Elliptical Drive embodiments described in FIG. 178A-C, we now present in this embodiment a device composed of a linearly situated series of Elliptical Drives. These Elliptical Drives may be embedded along a surface for the purpose of moving a stage or they may be embedded in a device such as a smartphone or a controller handgrip. They may also be paired with another linearly situated series of Elliptical Drives in the same device for the purpose of conveying haptic sensations to multiple parts of a hand or other body part simultaneously. Each Elliptical Drive in the series will have a phase corresponding with the angular position of the tip of the resultant vector in the force ellipse. When all of the Elliptical Drives in the series share the same phase, their lateral forces will combine producing a stronger haptic effect than a single Elliptical Drive. The phases of the Elliptical Drives may be controlled in such a manner as to mimic unified periodic motion of the whole series, for example to create a wave-like haptic sensation on the skin.

FIG. 181 illustrates a Vertical Handgrip with Opposing Translating Grips Driven by Stiction Drives. In this embodiment we present a device comprised of several Stiction Drives. The Stiction Drives are situated adjacent to each other in a linear manner and are embedded in a larger device such as a smartphone, surface or handgrip controller. Atop each of the arrays of Stiction Drives rests a movable platform possibly made of a harder material such as plastic, which is constrained to move along a track. If the Stiction Drives and movable platform are oriented horizontally within a surface then they could provide horizontal propulsion for the platform across the surface. If they are oriented vertically then they will provide vertical propulsion for the platforms. When a hand grips the device the propulsion of the platforms will impart a lateral contact force that conveys a motion either up or down on the skin. If two such series of Stiction Drives and movable platforms are oriented on opposite sides of a handgrip controller then the motion of the movable platforms can be used to convey either a strong contact force in the up or down direction, when the two platforms are moving in the same direction, or a strong torque on the hand, when the two platforms are moving in opposite directions.

4. Locomotion with SAVANTs 4.1. Review of Locomotion Achieved by Asymmetric Lateral Vibration FIG. 90 discussed above illustrates how the positive peak of an asymmetric lateral vibration can surmount a friction threshold in the positive direction while failing to surmount it in the negative direction, thus producing locomotion with repeated cycles. The asymmetric lateral vibration can be synthesized by using Fourier Synthesis of two or more harmonics of a frequency.

4.2. Introducing the Stiction Drive for Locomotion

Since linear resonant actuators are not readily available at this time in multiple resonances in harmonics of a frequency, for example a first harmonic of 100 Hz and a second harmonic of 200 Hz, as is necessary to produce locomotion by asymmetric lateral vibration, it is desirable to produce a SAVANT actuator class that uses arrays of LRAs operating at the same frequency, for example 150 Hz or 175 Hz.

A Stiction Drive can also be made from a SAVANT actuator class we call a "Gemini Drive," which is a synchronized pair of interleaved eccentric rotating mass motors, operating to produce a rotatable linear axis of vibration, used for locomotion. The principle of using this type of SAVANT is described in the included reference, Synchronized Array of Vibration Actuators in a Network Topology.

4.3. Introduction of the Stiction Drive Based on Pairs of LRAs or Pairs of ERMs

Now we describe a device having two preferably orthogonal linear resonant actuators (LRAs) in a movable drive resting on a surface, or two interleaved counter-rotating eccentric rotating masses (ERMs). The two LRAs are rigidly or semi-rigidly coupled to a moveable platform or housing, and are driven by electronics as described elsewhere herein.

One LRA rests atop the housing with its axis of vibration oriented perpendicular to the ground. The second LRA is attached to the side of the housing and has its axis of vibration oriented parallel to the ground. See FIG. 176C for an illustration. We note that due to the principles of vector addition and linear algebra, the axes of vibration need not be orthogonal or oriented in any special manner with respect to the ground. All that is necessary is that the two axes of vibration are not completely collinear. They could for example be orthogonal to each other but oriented at an arbitrary angle with respect to the ground or they could be non-orthogonal, as in shown in FIGS. 176A and 176B, respectively.

The two LRAs can in general have different characteristics but without loss of generality let us assume they are both identical, having the same resonant frequency, gain and maximum force output. Let us also assume that the oscillations of the two LRAs are in phase. This means that the tip of the resultant force vector formed from the vector addition of the two LRA forces oscillates in a linear path that makes a 45 degree angle with both the surface and the surface normal.

When the resultant force vector (hereinafter referred to as the "resultant") is pointed away from the ground, there will be a component that acts to lift up on the object and a component that acts to propel the object forward. The component that lifts up on the object effectively diminishes the normal force vector, which in turn reduces the frictional response felt on the object. When the resultant reverses direction and points inward towards the Earth, there is a component that pushes into the ground and a component that acts to propel the object backward. The component pushing into the ground effectively increases the normal force on the object and thus increases the frictional response force to the propulsion force.

A complete mathematical description of this device requires examining the equations of motion in both the direction perpendicular to the ground and the direction parallel to the ground. In the parallel direction (x), from $\Sigma F=m\,a$, we have that the sum of the force components acting on the whole device will provide the acceleration and therefore any resulting motion. Summing up the force components acting in this direction, we have the oscillatory propulsion force provided by the actuator in contact with the ground, $A_B \sin(\omega t)$ as well as the friction force, which is simply given by $F_{fric}=\mu F_N$, where $F_N$ is the normal force.

In the perpendicular direction the sum of forces will equal the normal force, which determines the friction force felt by the bottom LRA. We will assume for our analysis here that the perpendicular oscillatory force is never enough to entirely counteract gravity, meaning that the device never jumps off the ground. If it leaves the ground then the analysis needs additional mechanics. Summing up the vertical forces we have the total weight of the two LRAs and the sinusoidal force produced by the upper LRA. Thus we have that $F_N=m\,g+A_\tau \sin(\omega t+\varphi)$. Substituting this into our expression above (and replacing the acceleration a with differential notation for the position variable, x) we find:

$$m\,x''(t)=A_B \sin(\omega t)-\mu(m\,g+A_\tau \sin(\omega t+\varphi))\mathrm{sgn}(x'(t)),$$

where we have the amplitudes of the top and bottom LRAs as $A_\tau$ and $A_B$ respectively. Note the inclusion of the factor $\mathrm{sgn}(x'(t))$. This ensures that the friction force is always pointing in the direction opposite the motion. The motion of the device thus follows from the numerical solution to this differential equation.

This asymmetry in the frictional response force creates an overall non-zero displacement for the object. If not for the friction force, the object would oscillate back-and-forth equally because the propulsion components are equal in both directions. In the presence of the normal-modulating vertical force components though, the friction response is always less in one direction than in the other, which provides an overall net force in one direction. The direction of the overall net force can be reversed by reversing the orientation of the resultant force—effectively changing the phase between the top and bottom LRAs from 0 degrees to 180 degrees.

This device as described can produce propulsion forces along a straight line. By combining multiple devices in a manner that spans multiple spatial dimensions we can produce propulsion forces in a plane. We could use a SAVANT actuator class which we call in this inventive disclosure a Gemini Drive, which is a synchronized pair of eccentric rotating masses e.g., as described elsewhere herein, preferably with interleaved masses. A Gemini Drive has a mode of operation to counter-rotate a pair of synchronized interleaved ERMs to produce linear vibration forces at an arbitrary orientation in a plane. The orientation of these linear forces can also be changed as desired during operation. By implementing a Stiction Drive based either on a synchronized pair of LRAs or on a Gemini Drive which is a synchronized pair of ERMs as described in this inventive disclosure and wholly included references, we produce a device that is capable of producing dynamically changing propulsive forces along its plane of motion. This could be used for instance as a mechanism of locomotion in a robotic device or, if the device is mechanically grounded, to move a carriage or stage.

4.4. Introduction of a Coaster Robot for Maneuvering a Planar Surface

Another proposed embodiment is a device that joins two orthogonal LRA pairs onto a flat, round stage that also may include such components as a microcontroller unit (MCU), cameras for sensing absolute position, a battery or batteries for power, a wireless transceiver for communicating with a host computer or other CoasterBots, and other sensors such as an Inertial Measurement Unit (IMU) for relative motion measurement, as illustrated in FIG. 177.

The two orthogonal LRA pairs serving as stiction drives can be driven in four combinations: both forward; both backward; left one forward and right one backward; and left one backward and right one forward. When the drive pairs are driven both in the same direction they will produce a net propulsive force in that direction. When they are driven in opposite directions they will produce a net torque on the object resulting in either a clockwise or a counter-clockwise rotation. By dynamically changing each LRA's direction of propulsion during operation the device can move and maneuver in the plane via translations and rotations. We call this device a "Coaster Robot" or a "CoasterBot".

Viii. Aerodynamic Eccentric Rotating Mass Attachment for Vibration Motor

1. Introduction and Overview

If one attaches a wheel to a motor shaft, it generates traction, and one can use it as an element in an array of wheels for locomotion, such as for an automobile. If one attaches a propeller to a motor shaft, it generates thrust and one can use it as an element in an array of propellers for controlled flight, such as for a quadcopter. If one attaches an off-center mass to a motor shaft, it generates a vibration, and one can use it as an element for providing haptic sensations. This class of vibration device is conventionally known as ERM vibration devices or motors.

The concept of a "Spinor" is now introduced. A Spinor is an aerodynamic attachment to the shaft of a vibration motor that is designed to have the properties of eccentricity and an aerodynamic shape. This aerodynamic shape may modify or enhance the performance of the ERM-based device. Performance here may mean current draw, noise, or controllability of the Spinor. A Spinor may have additional properties such as an embedded or otherwise incorporated shape or target that facilitates the estimation or measurement of the Spinor's angular position, angular velocity, or both, by a sensor or sensors. Spinors are especially useful when making eccentric rotating mass vibration devices which are arranged in SAVANT arrays. As discussed herein, SAVANTs have industrial utility in many applications, including but not limited to, haptics.

Spinors decouple the process of designing and manufacturing a precision engineered attachment component for ERM-based SAVANTs, from the well-established high volume manufacturing process of vibration motors, including brushed permanent magnet motors and brushless permanent magnet motors.

Since ERM-based SAVANTs use phase control—it is necessary to measure or estimate the angular position or angular velocity of the center of mass of the ERM. (Note: the Mohawk angular measurement approach is described elsewhere in this inventive disclosure, and in related inventive disclosures, along with example embodiments.). Therefore, a Spinor may also include either an embedded Mohawk passive target which may be measurable by external sensors—or include an embedded internal wireless sensor or sensors which can measure its angular position or angular velocity by measuring its proximity to an external fixed passive Mohawk target. Alternatively, the angular position or angular velocity of a Spinor may be measured or estimated by other means, for example, quadrature encoding for angular velocity, or quadrature encoding plus an index for absolute angular position.

2. Existing Solutions

Conventional eccentric rotating masses are mass produced at low cost.

2.a. Parameters of an Eccentric Rotating Mass

An ERM has intrinsic parameters as described in this section.

2.a.1. Eccentricity

Each ERM has a characteristic eccentricity, or E, which is the mass of the ERM multiplied by the radius of that mass center to the axis of rotation. As the ERM spins, it generates a rotating force vector from the axis of rotation through the center of mass. The amplitude of the rotating force vector is a function of the angular velocity of the mass. A high eccentricity is desirable to produce the maximum vibration force at a given angular velocity; however, sometimes eccentricity can be reduced to increase the maximum angular velocity for a given vibration motor. A Sony PlayStation DualShock® game controller has two ERMs, a small ERM inside the right grip and a large ERM inside the left grip. When they are attached to the same type of motor, the small ERM provides fast, highly dynamic, vibrations and the large ERM provides slow, less dynamic, vibrations.

2.a.2. Rotational Inertia

An eccentric rotating mass has a scalar value that describes its rotational inertia about its axis of revolution. A high rotational inertia is more resistant to transients when trying to control the ERM to maintain a constant angular velocity, since it has greater angular momentum than an ERM with low rotational inertia. However, for ERMs that are being controlled to rapidly change angular velocity (such as the small ERM or the large ERM inside the grips of a DualShock® game controller), a lower rotational inertia is desirable.

2.a.4. Hole for Attachment to the Rotating Motor Shaft

Eccentric rotating masses have an opening (usually either a through hole or sometimes alternatively a blind hole) to admit the rotatable shaft of the motor. The eccentric rotating masses are often pressed onto the shaft and attached via a mechanical press fit.

2.a.5. Material

Eccentric Rotating Masses are usually made of metal materials, for example: steel (an alloy of iron and carbon and sometimes other elements); brass (an alloy of copper and zinc); or a tungsten alloy—tungsten has an extremely high density—so that for a given eccentricity an ERM made from a tungsten alloy can be much smaller than an ERM made from steel or brass alloys.

2.a.6. Geometric Shape of the Eccentric Rotating Mass

Eccentric rotating masses have a geometric shape that exists in the physical world. Specifically, the eccentric rotating mass rotates typically in a gas such as air, and this motivates, in part, the inventive concepts presented herein. Here are two examples: a) a cylinder with an off-center hole; and b) a cylindrical section with a central hole. In both cases the metal material is often homogeneous. In both cases the masses are press fit onto the rotating shaft of the vibration motors. Therefore, in both cases a single object possesses both the eccentricity and the attachment point, which is a hole to admit the shaft of the motor and attach by a press fit.

2.a.6.1. Cylinder with an Off-Center Hole

One commonly occurring design is a metal right cylinder drilled with an off-center hole so it may be press fit onto the motor's shaft. (See FIGS. 188A and 188B).

2.a.6.2. Partial Cylinder with a Central Hole

One commonly occurring design is a metal partial right cylinder having a central hole or hub so it may be mechanically attached onto the motor's shaft. (See FIGS. 188C and 188D). Another commonly occurring design is to bolt together a stack of identical metal plates. Each metal plate is a partial disc having eccentricity when spun about its axis of rotation. The metal plates may be manufactured by stamping them out of sheet metal. FIG. 189B shows a disassembled game controller having a small ERM inside one grip and a large ERM inside the other grip. FIG. 189A shows a single ERM attached to a motor constructed as a partial cylinder comprised of a stack of plates. FIG. 189C illustrates examples of inexpensive, mass produced, ERMs using similar sized motors but with different masses and fabrication methods. Collectively the assembled plates of this ERM look like a cylinder or a disc with a segment removed. The removed segment is often about half the cylinder or disc, when viewed from the top.

2.a.7. Geometric Dimensions of the Eccentric Rotating Mass

ERMs together with their attached motor have geometric dimensions. ERMs can fit inside a bounding cylinder which has an outside diameter and length, for example.

3. ERM Savant Arrangements

As mentioned, it is well known and widely practiced method to generate vibration by attaching an off-center mass to the rotating shaft of a motor and then rotating the motor's shaft.

For Synchronized Arrays of Vibration Actuators in a Network Topology or ("SAVANTs"), eccentric rotating mass vibration devices are spatially arranged into arrays of two or more motors and phase controlled. Often the arrays are compact, so the eccentric rotating masses are very closely packed together. FIG. 182 is an example of a SAVANT comprised of four identical ERMs in a square topology. ERM SAVANTs that have the capability to enter "Spinning Reserve", which is a mode of operation where the sum of forces and torques of the ERMs within the SAVANT are controlled to be zero even though the individual ERMs are rotating at a non-zero angular velocity, are of particular interest. Spinning Reserve is described in greater depth elsewhere in this inventive disclosure. Some ERM SAVANTs capable of Spinning Reserve include:

3.a. Quad Planar Array

This SAVANT can be designed to be capable of achieving Spinning Reserve. (See FIG. 182 for an example of a quad planar array using identical ERMs).

3.B. Dual Interleaved Array

In this SAVANT the two ERMs are matched in eccentricity so they can be controlled to cancel out each other's vibration. The ERMs will be different in some combination of shape geometry, weight, rotational inertia, etc. (FIGS. 190A and 190B show pictures of interleaved masses matched in eccentricity).

3.C. Dual Traditional Non-Interleaved Array

In this SAVANT the two ERMs can completely cancel out each other's vibration forces, but there is typically a residual or parasitic torque vibration which cannot be cancelled out. However, the residual vibration can be minimized by design of the masses and their relative placements, so that the simplicity and low cost of this SAVANT overcomes the drawback of the residual vibration. One advantage of this dual ERM SAVANT over a dual interleaved SAVANT is that the two ERMs can have identical shapes and rotational inertia, in addition to identical eccentricities.

4. Design Goals

4.a. Goal 1: Minimize Acoustic Noise

It is a key design goal to have the ERM vibration motors be as silent as possible. One aspect of the technology is the ability to eliminate or at least minimize the acoustic noise from the motors. One source of acoustic noise is rotating mechanical parts in contact with each other—that source is outside the scope of this discussion. Another source of acoustic noise is aeroacoustic noise. Aeroacoustic noise may arise when rotating an eccentric rotating mass in air, for example, especially in ERM SAVANTs, which Often has the motors rapidly changing the angular velocities of closely packed arrangement eccentric rotating masses surrounded by air. The air passing between two closely spaced ERMs may generate a pressure waves which is undesirable and could be perceived by a user. In some embodiments presented later herein, this noise may be mitigated via aerodynamic shrouding of the ERMs in a Spinor type device.

Aeroacoustics has been defined as follows is Wikipedia as "Aeroacoustics is a branch of acoustics that studies noise generation via either turbulent fluid motion or aerodynamic forces interacting with surfaces. Noise generation can also be associated with periodically varying flows".

4.B. Goal 2: Minimize Energy Consumption

It is a key design goal to have vibration actuators consume the least energy possible from its power source, which is often a rechargeable battery. An ERM usually operates inside a device that is not airtight, and therefore air is part of its normal environment. Air can help serve as a natural cooling mechanism for the ERM motors. Thus, it is not always possible nor is it always desirable to remove the air and produce a vacuum.

When ERMs are arranged into a SAVANT, there is a possibility that within a restricted airspace, the rapid maneuvers of the ERMs may cause either: a) aero-acoustic noise; or b) undesirable pressure waves upon a single ERM or between adjacent ERMs—similar to the forces of two trains closely passing each other from opposite directions, or a single train entering a narrow tunnel, since conventional ERM shapes may act as impellers—pushing air; or c) aerodynamic drag or air resistance, which is a countervailing force or torque to changes in angular velocity; or d) some combination of a, b, and c. Having the ERM perform unnecessary work such as pushing air (as an impeller) or dragging air (air resistance) consumes power, which is a scarce resource for many battery-powered devices. Thus, there is a need to manage aerodynamic forces upon the ERMs in a SAVANT.

4.C. Goal 3: Easy to Measure Angular Position and Angular Velocity with High Precision and Low Cost ERM SAVANTs use phase control of the angular positions and angular velocities of the eccentric rotating masses. It is a design object that the ERM be designed to facilitate the measurement or estimation of its angular position, its angular velocity, or both.

Quadrature Encoding Approach: one solution is to use a quadrature encoder plus an index encoder to provide absolute angular position measurement. This can be implemented, for example, by attaching an encoder disc to the eccentric rotating mass and fixing three sensors onto the motor's case, one for quadrature channel A, one for quadrature channel B, and one for the index. The signals from these sensors can then be decoded to compute the absolute angular position. The derivative of the absolute angular position measurements over time can be used to compute the angular velocity. Alternatively, with the recent introduction of wireless sensors, other embodiments can be constructed so that wireless sensors may be embedded inside the ERM, and the encoder wheel attached to the motor case.

Mohawk Encoding Approach: One inventive solution presented above is the Mohawk measurement subsystem. This approach only requires a single sensor, although redundant sensors can be used for a more robust solution. FIG. 192A shows an illustrative computation of a Mohawk target shape having a single discontinuity. FIG. 192B shows an example cross section of a Mohawk target shape. FIG. 192C shows an example top view of another Mohawk target shape. In particular, FIG. 192A illustrates example Mathematica code and parametric plot showing an example curvature for a Mohawk target, FIG. 192B illustrates a cross-section view of an example Mohawk target shape, and FIG. 192C illustrates a top view of an example Mohawk target shape constructed as a thin tube with a lateral displacement as the discontinuity.

4.D. Goal 4: Precision Engineering for Mass Production

When building an ERM-based SAVANT, it is desirable that the SAVANT can operate in the mode we describe as "Spinning Reserve," as described elsewhere in this inventive disclosure. Therefore, one aspect involves the ability to be able to cancel and add forces and torques very precisely. Therefore, the eccentric rotating mass attachment must be manufacturable in high volume and with precision engineering, which is more sophisticated than the current deployed eccentric rotating mass attachments.

5. Solution 1: Spinors

A single ERM acts additionally as an impeller by pushing air around the internal air space within its enclosure. By providing a single ERM with an aerodynamic shape, one aspect of the technology is able to mitigate this side effect, and in turn may reduce the ERM's power draw, which is especially important for battery powered ERMs.

The placement of eccentric rotating mass vibration motors into a closely packed array and then operating them as a SAVANT can introduce aerodynamic issues including aerodynamic drag and aeroacoustic noise that need to be eliminated or at a minimum, mitigated.

A "Spinor" is a device that has numerous desirable properties for ERM SAVANTs. Spinors are a new class of eccentric rotating mass attachments for vibration motors that have aerodynamic shapes in addition to eccentricity.

Measurability as a key property of Spinors. Some embodiments of Spinors are passive and inert yet can be internally constructed to be easily measurable for angular position, angular velocity, or both—for example as part of a Mohawk measurement subsystem as described elsewhere in this inventive disclosure. Other embodiments of Spinors may have embedded sensors or active components that enable the measurement or estimation of a Spinor's angular position, angular velocity, or both.

Computer-aided design of Spinors. Spinors may be designed using multi-objective optimization methods, computational fluid dynamic simulations and computational design to enable the manufacturing of them as precision engineered components in high volume and low cost. In some embodiments, a Spinor can be constructed as an assembly of various different elements, each element having a single desirable property. In other embodiments, a Spinor can be designed to have more desirable properties than elements, in fact it should be possible to have a single element providing all the necessary properties. The Spinor element or elements can be designed by computer so that the Spinor meets design goals for the requirements of various ERM-based SAVANTs.

5.a. The Aerodynamic Shape of the Spinor

In geometry, circular symmetry is a type of continuous symmetry for a planar object that can be rotated by any arbitrary angle and map onto itself. In 3-dimensions, a surface or solid of revolution has circular symmetry around an axis, also called cylindrical symmetry. (See Wikipedia entry on circular symmetry.)

The shape of the Spinor can be designed to be aerodynamic, for example, having cylindrical symmetry as well as being axisymmetric, to achieve the goals of: 1) minimizing aeroacoustic noise; 2) minimizing aerodynamic drag; and 3) minimizing aerodynamic air pressure forces between adjacent Spinors. Both of these off-center masses may act as impellers within the restricted air space of an enclosure or housing. Pushing air as an impeller or dragging air may expend energy, which is a scarce resource. SAVANT ERMs often are placed in close proximity and controlled to perform high speed maneuvers such as to rapidly change angular position or to rapidly angular velocity. Therefore, it is important to consider the shape of the ERM and to design it to be aerodynamic.

It is also desirable to reduce drag, since drag requires the energy expended to increase as a function of angular velocity. Therefore it is a goal to have a low drag design at high rotation rates. One approach to make the ERM aerodynamic is to make the three-dimensional surface have cylindrical symmetry, so that as it spins around the axis, its cross section doesn't change. Examples of shapes having cylindrical symmetry (a subset of axisymmetry) include a flying disc such as the Frisbee® (FIG. 185), skateboard wheels (FIGS. 186A and 186B), two conjugate segments (FIGS. 187A and 187B) combined into a complete cylinder (FIG. 187C), a sphere (FIG. 193A), an ellipsoid (FIG. 193B), a cylinder (FIG. 193C), and a conical frustrum (FIG. 193D).

5.B. Conjugate Shapes

An existing ERM may be easily retrofit into an aerodynamic shape by adding a conjugate object, such as a cylindrical section, so that when added to an ERM, the outer surface is axisymmetric or even cylindrically symmetric, such as a cylinder rotating about its axis. For example, FIG. 187A illustrates an ERM shape which when combined with a conjugate shape in FIG. 187B can form a cylindrically symmetric shape in FIG. 187C. The conjugate object can be made out of a material lighter in weight, such as plastic, that is sufficient to deflect air. The conjugate object may be attached to the ERM using an adhesive or other means. Alternatively, the conjugate object may be made out of a material that is heavy, but the conjugate object contains one or more internal voids so that its average material density is less than the average material density of the ERM and therefore the eccentricity of the ERM is only marginally reduced.

5.C. Aerodynamic Enclosure Objects

Alternatively, an aerodynamic enclosure can be made out of a material lighter in weight, such as plastic, that is sufficient to deflect air. For example, a cylindrical enclosure may be designed to surround the ERM. It may be made of a lighter material, such as plastic. Alternatively, it may be made of a heavy material, but be completely hollow inside or have multiple voids. Sharp edges at either end of the cylinder, where the disc end meets the cylinder in a circle, may cause air drag through turbulence creation. Therefore, it is possible to use a chamfer or bevel edge or rounded edge to reduce the air drag. FIG. 186A shows a view of a cylindrically symmetric skateboard wheel having rounded edges.

5.D. Spinors for Quad ERM-Based SAVANTs

5.E. Dual Non-Interleaved Spinors

Reducing the distance between the planes. Typically, ERMs are either right cylinders with an off-center hole for the motor's shaft or a cylindrical segment, but each with a uniform cross section through the length. By varying the size of the cross sections along the height of the cylinder, allows a designer to move the center of mass from the center of the cylinder towards one end, thus the distance between planes of two masses orbits around the axis may be reduced in this method. This reduce parasitic vibrations. For example, a conical frustrum has a small radius at one end, and a large radius at the other. The center of mass of a cylinder is in its center, however the center of mass of a conical frustrum is located closer to its larger end.

Thus, by constructing a dual ERM SAVANT, each having ERMs with identical conical frustrums, oriented such that the large sides of the cones face each other, one can reduce the distance between the masses (but the radii of the two centers of mass will increase and so will the radii of the two ERMs). One can put an off-center hole through a complete conical frustrum, or one can put a central hole through a partial conical frustrum. It is worth noting that the outer shape of a bowling ball is axisymmetric, but that the distribution of mass internally is not, allowing the design of bowling balls to be very sophisticated. It is an example of a simple exterior design hiding a complicated interior design. In addition to the cylindrical shape, another class or cylindrically symmetric shapes is the ellipsoid. This class includes spheres and spheroids.

5.F. Dual Interleaved Spinors

5.F.1. Spinning Reserve with Pairs of Interleaved Spinors

Spinning reserve with a Gemini Drive (as described elsewhere in this inventive disclosure) requires that the centers of mass of the different Spinors are constrained to move along the same circle. Since each of the two Spinors occupy different regions of space, and are in fact two separate solid objects, they must have different shapes. One embodiment for achieving these requirements is to have a Spinor which has a central aperture allowing the coexistence of an inner Spinor.

FIG. 194A is an isometric view of an example shape for an eccentric rotating mass, a half cylinder. FIG. 194B is an isometric view of an example shape for an eccentric rotating mass, a half cylindrical shell which could spin outside a half cylinder. If these two shapes are matched in eccentricity, they can be capable of achieving spinning reserve. These ERM shapes can be enclosed with aerodynamic shaped surfaces to form Spinors. In this instance, the Spinor having the half cylindrical shell would be partially open to admit and have clearance for an inner Spinor which would have the cylindrical segment shaped ERM with a matched eccentricity. FIGS. 195A, 195B, and 195C are views of a simple "mockup" prototype of a cylindrical Spinor cup Shape (represented by acrylic cup) with embedded eccentric mass (represented by blue paper). FIG. 196 is a side view of an interleaved pair of cup-shaped Spinors, showing axis of rotation. FIGS. 197A and 197B are top views of cup-shaped Spinors, each showing its embedded heavy eccentric mass and motor shaft attachment point.

5.H. Designing Spinors to be Easily Measurable

Instrumenting the ERMs Using Mohawk: A Simple Solution Scalable in Size

It is necessary to instrument the ERMs to determine the angular position of the center of mass sufficiently to control the angular position using phase control. We have introduced the Mohawk Sensor Subsystem for this, because it is simple and low cost, and can easily be scaled up or down in size. Alternative solutions exist, for example, quadrature encoding plus an index.

Material Choice for the Mohawk Element.

Hall Effect sensors can be used alone as a single sensor solution for a Mohawk measurement subsystem. (See FIG. 198). A more robust solution can use two or more Hall Effect sensors, so we can cross-correlate or differentially compare multiple sensor readings to obtain a more accurate estimate of the angular position or angular velocity (or both) of the rotating mass. (See FIG. 199).

The concept behind the Mohawk Sensor subsystem is wrap a monotonically increasing, linear or nonlinear, shape around an axis, so that a Hall Effect sensor fixed relative to the motor's case will have a corresponding monotonically increasing measurement that correlates to the distance of the shape's closest point to the sensor. Since this varies circumferentially, the sensor measurement should correlate with the angular position, with a discontinuity at the beginning, which is also the end.

One aspect of interest involves the sensor measuring a signal that can be converted into a sawtooth shape every 2 Pi radians. It matters that when the ERM rotates, it measures this signal. What is important is the relative movement. Therefore, although the traditional thinking is to attach the sensor to the stator, and spin the Mohawk target, alternatively, one could attach the sensor to the Spinor, and the Mohawk target could be fixed. Thus the attached or embedded Mohawk sensor would need to communicate wirelessly and have some local power that is obtains wirelessly. It is possible for wireless sensors to obtain local power from ambient or directed RF signals, or other means.

5.J. External Marking on the Surface of a Spinor

It is sometimes useful to include external marking to signify the location of the center of mass. Spinors can also be marked to identify the characteristics of the Spinor, such as eccentricity and rotational inertia. It can be arranged as a convention, for example, that the angular position of the discontinuity of the Mohawk can be aligned the angular position of the ERM's center of mass. The external mark of the center of mass could be a red dot, for example, which would be the projection of the center of mass along a line parallel to the axis of rotation onto the Spinor's surface. FIGS. 200A and 200B show isometric and top views, respectively, of a (red) dot as external marking on the surface of a Spinor to indicate the Spinor's center of mass projected onto its surface.

Another example embodiment of an external mark of the center of mass could be a red arrow, for example, on the surface of the Spinor which would point from the axis of rotation to the which would be the projection of the center of mass along a line parallel to the axis of rotation onto the Spinor's surface. FIGS. 200C and 200D show isometric and top views, respectively, of a (red) arrow as external marking on the surface of a Spinor to indicate the Spinor's center of mass projected onto its surface.

Another example embodiment of an external mark of the center of mass could be a red arrow, for example, on the surface of the Spinor which would correspond with and represent the interior Mohawk shape. This could be marked as a red arrow entirely circling the axis of rotation so that the tip of the arrow touches the tail of the arrow. The tip-tail intersection could be the projection of the interior Mohawk target's discontinuity onto the Spinor's surface.

5.K. Possible Manufacturing Methods for Spinors

For Spinors that require contoured, complex external or internal surfaces and multi-material construction (e.g. embedded Mohawk, magnets, metal inserts for accepting shafts):

(a) CNC or metal injection molding (MIM) for the metal components which are then aligned a mold and overmolded with a polymer material with a desirable aerodynamic shape, which could then be attached to the motor shaft.

(b) A combination of machining, injection molding, or 3D printing of either the metal or polymer components, which are then assembled together.

(c) Prototyping or low-volume manufacturing techniques could be used to give an approximation to overmolding by using a RTV (room temperature vulcanization) polymer material or other mold-based casting technique.

5.L. Drag Considerations for Spinors

Drag on a Spinor is a function of angular velocity, outer mold line shape, spacing if placed in arrays, and also surface finish. The flow between two Spinor surfaces that are concentrically arranged is referred to as Taylor-Couette flow from the literature. Analytic solutions have been derived for even finite length cylinders for flows of this type.

The flow solution in the gap between the cylinders (or Spinors) is driven largely by viscous effects in the fluid. The closer the gap the higher the shear stress and the more power required to maintain the steady state relative velocity between the cylinders. Higher velocity also results in higher power requirements to maintain the steady-state rotation of the cylinders. Finally, wall surface finish has an effect on the flow field. Higher roughness factors increase total drag through turbulence generation and therefore, also increase power requirements for a given operating condition. Surface finish may be controlled industrially through material choice, manufacturing process, or alternatively post-manufacture coating. For example, a polished injection molding surface will result in lower drag force than a comparably machined surface (through turning) or perhaps a stamped surface. It is desirable to balance manufacturing cost with performance in most applications. One method of affordably improving surface finish in post-manufacture is through application of paint or filler material of the appropriate viscosity to build a coated layer and cover surface imperfections. Spinors may employ all or some combination of these methods in order to produce acceptable performance in context of their ultimate application.

5.M. On the Enclosure/Encapsulation of ERM-Based SAVANTs

For applications that require waterproof or dust-proof operation, or need to be molded into another product or process, an ERM or LRA SAVANT can be encapsulated by placing it in a enclosure that could be sealed through a combination of sealing components such as O-rings, grommets, glands, or other common techniques for sealing out moisture and/or dust, such as potting (using a polymer or other filler material to cover the enclosure). This should not impact the functionality of the SAVANT as long as the required electrical connections are able to pass through the seal, e.g. the wires or traces associated with power and control signals. Thermal issues can be mitigated either through conduction of generated heat through the encapsulation, or by controlling duty cycle.

6. Solution: Baffle Structures

Baffle structures that are fixed in place and rigid in construction may be interposed between adjacent rotating ERMs or Spinors to reduce or eliminate aerodynamic air pressure forces between them. A baffle (per the Online Oxford Dictionary) is "A device used to restrain the flow of a fluid, gas, etc. or to prevent the spreading of sound or light in a particular direction". FIG. 191A illustrates an air baffle (shown as a thick vertical line) interposed between a pair of identical ERMs arranged side by side in a planar SAVANT.

7. Solution: Ducted Fan and Shroud Structures

A fixed in place and rigid circular shroud or ducted fan may encircle or surround a rotating Spinor. Shrouds and ducted fans are used in some multi-rotor aircraft to direct airflow (and the accompanying acoustic noise) away from the aircraft operators or other people in the vicinity of the aircraft—to reduce the acoustic noise perceived by people on the ground. Shrouds and ducted fans may protect users from accidentally touching the rotating Spinors inside an ERM SAVANT that are not otherwise enclosed. FIG. 191B illustrates a pair of identical ERMs, each enclosed with a circular shroud (shown as two thick vertical circles), arranged side by side in a planar SAVANT.

8. On Using Mohawk to Commutate Brushless Motors

The Mohawk sensing arrangement can be used to determine the absolute angular position of a motor shaft, and therefore can be used for commutation of a brushless motor. The function to compute the angular shaft position would be transformed, based on known information about the particular motor windings and magnet configuration, into a position in the commutation cycle of the motor in order to determine what the current and future commutation states should be during motor control. The relationship could be calibrated through Hall effect encoding of the magnet array, aligning the rotor shaft to the Mohawk such that the relationship is known through construction, or calibrated by using a back-EMF based, sensorless method for driving the motor (the motor controller circuitry would apply a pattern of signals to try to rotate the motor, and use the feedback to determine the relationship between the commutation cycle and the Mohawk feedback). After a single calibration routine, the motor controller could then use the Mohawk to determine the commutation state explicitly, potentially reducing the number of measurements required to determine the commutation state, and allowing low-speed operation which cannot be performed effectively with back-EMF based sensorless control.

9. Embodiments of Wireless Sensors and Wireless Tags Embedded Inside Spinors

FIG. 201A illustrates an example Spinor embodiment with a Serial Number TAG (for example RFID) embedded inside the Spinor. This allows a unique identifier to be associated with each Spinor during manufacturing or sometimes afterwards. Then the "health" of the Spinor can be monitored and recorded and analyzed either locally or remotely. Additionally, other information can be stored inside a tag, or associated with a serial number assigned to each unique Spinor—for example, including but not limited to: design parameters and actual measured parameters during testing of Spinor weight, Spinor outside dimension, Spinor height, Spinor material composition, Spinor date of manufacture, Spinor location of manufacture, Spinor eccentricity, Spinor rotational inertia, Spinor Mohawk target type, Spinor embedded sensor list. In one embodiment, the Spinor can also have a digital signature stored inside an integrated circuit which then embedded into and can be accessed wirelessly to verify that the Spinor is an original rather than a counterfeit component.

FIG. 201B illustrates an example Spinor embodiment with a wireless sensor (for example, a Hall Effect sensor) embedded inside the Spinor. Wireless sensors are becoming more available, and it is increasingly cost effective to embed them inside a product. One embodiment is to embed a wireless accelerometer into the Spinor and then compare its measured signals to those obtained from a second accelerometer that is fixed in position to determine the Spinor's relative acceleration).

FIG. 202 illustrates an "Inside out" Mohawk Sensor/Target Embodiment, showing the fixed external Mohawk Target shape and the interior of a Spinor having an embedded wireless proximity Sensor. It may be advantageous to use this embodiment as compared to the "Outside in" Mohawk Sensor/Target embodiment having a rotating Mohawk Target and a fixed sensor.

10. Spinors for Pivoting and Rocking Masses

FIGS. 24A-C, 25A-C, 26, and 27A-F, which have been discussed above, all illustrate embodiments of vibration actuators that may either pivot or rock, and these embodiments may have a center of mass that is either located concentric or eccentric with respect to the vibration actuator's axis. So, by convention we call the eccentric embodiments "eccentric rotating masses" or ERMs and we can call the concentric embodiments "balanced rotating masses," or BRMs. It is both possible and useful to have Spinors for BRMs as well as ERMs.

Various reference materials are mentioned herein, and are wholly incorporated by reference here. The reference materials include the following. The white paper from Immersion Corporation, entitled "Haptics in Touchscreen Hand-Held Devices," dated April 2012. This white paper describes in Section 3.1 four types of actuators: Eccentric Rotating Mass Actuators (ERMs), Linear Resonant Actuators (LRAs), Piezo Modules, and Electro-Active Polymer Actuators (EAPs). The SAVANT architecture can be used with all of these types of actuators, and various instantiations of each.
The monograph, "Engineering Haptic Devices: A Beginner's guide for Engineers," Thorsten A. Kern, editor, published by Springer-Verlag, © 2009.
The monograph, "Vibrations and Waves," by A. P. French, published by W. W. Norton & Company; 1 edition (1971).
The monograph, "Human Haptic Perception: Basics and Applications," edited by Martin Grunwald, published by Birkhauser Verlag; (2008).
The monograph, "Feedback and Control for Everyone" by Pedro Albertos and Iven Mareels, published by Springer-Verlag; (2010).
The blogpost, "Enabling high-definition haptics: introducing piezo actuators," by Eric Siegel of Texas Instruments.
The data sheet, "DRV 8601: Haptic Driver for DC Motors (ERMs) and Linear Vibrators (LRAs) with Ultra-Fast Turn-On," from Texas Instruments Incorporated.
The World Wide Web article "How To Disassemble an Xbox 360 Wireless Controller" from instructables.com.
The following application notes from Precision Microdrives Limited: "AB-002: Discrete H-bridge For Enhanced Vibration Control" and "AB-003: Driving Linear Resonance Vibration Actuators".
Furthermore, the reference by Eric W. Weisstein entitled "Lissajous Curve," from MathWorld-A Wolfram Web Resource.
Datasheet for DRV2605: Haptic Driver for ERM and LRA with Built-In Library and Smart Loop Architecture. SLOS825B—December 2012—Revised January 2014, Texas Instruments.
Application Report SLOA194: Haptic Energy Consumption by Flora Wang. May 2014, Texas Instruments.
User's Guide SLOU348B: DRV2605EVM-CT ERM and LRA Haptic Driver Evaluation Kit. January 2013-Revised March 2014, Texas Instruments.
Specification Sheet for Linear Vibrator, SEMCO Model: DMJBRN1030XX, Aug. 29, 2012, Samsung Electro-Mechanics Co., Ltd. ("SEMCO").
Kenjo, Takashi. Electric motors and their controls: an introduction. New York (Oxford), 1991. Pages 43-48.

If there is a conflict or inconsistency between material in the instant specification and any discussion in the aforementioned references, then the specification dominates. This includes any conflicts or inconsistencies with regard to definitions, concepts, jargon, use of language, terminology or the like.

Each of the vibration devices described herein according to the present disclosure, including the SAVANT integrated modules, can be used as a haptic interface or to provide haptic output for a device. Such devices may include: a game controller, a motion game controller, a handheld game console, a remote control, a handheld portable computer, a navigation device, a handheld construction tool, a handheld surgical tool, a stylus, a plush toy, a pair of eyeglasses, a wristband, a wristwatch, a belt, an armband, a leg band, a mobile phone, a tablet computer, a device for aiding a vision-impaired person, a device for aiding a hearing-impaired person, and a device for augmenting reality with haptic feedback, a personal pleasure device for providing pleasurable haptic sensations, a vibration device used for singly or in a pair for conveying telepresence, a vehicle, a steering mechanism for a vehicle (e.g., a handlebar grip of a bicycle, a handlebar grip of a motorcycle, and a steering wheel grip), a seat for a vehicle, a touch panel, etc.

Although aspects of the disclosure have been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims. By way of example only, it is possible to vary aspects of the embodiments herein to some degree while achieving the advantages of the SAVANT architecture, the MOHAWK Sensor System, Gemini modules and drives, differential haptic guidance and other benefits of the disclosure.

INDUSTRIAL APPLICABILITY

The present invention enjoys wide industrial applicability including, but not limited to, handheld or wearable devices providing haptic sensations or feedback to a user.

The invention claimed is:

1. An attachment configured for affixation to a rotary vibration motor shaft in order to produce vibration when the motor shaft rotates at a non-zero angular velocity, the attachment comprising:
    a polymer subframe configured to attach to the motor shaft, the polymer subframe having a selected shape to reduce aerodynamic drag or air resistance, which is a countervailing force or torque to changes in angular velocity, during rotation of the motor shaft, wherein the polymer subframe does not comprise an Electro-active Polymer;
    a mass comprising a metal material attached to the polymer subframe; and
    a passive target which varies circumferentially, the passive target being configured for use in measuring an angular position of the motor shaft relative to a stator of the motor.

2. The attachment of claim 1, wherein the circumferentially varying passive target is incorporated into the polymer subframe.

3. The attachment of claim 1, wherein the circumferentially varying passive target is attached to the polymer subframe.

4. The attachment of claim 1, wherein the metal material is arranged such that its center of mass is not located on an axis of revolution of the motor shaft when the metal material is attached to the motor shaft, so that the attachment is an eccentric rotating mass with respect to the axis of rotation.

5. The attachment of claim 1, wherein the metal material is selected from the group consisting of: a tungsten alloy, brass, and steel.

6. The attachment of claim 1, wherein the passive target has a shape that varies circumferentially with a monotonically increasing function of angular position starting at a minimum at a first angle and continuing to increase to a maximum until it returns to the first angle, creating a singularity that is a discontinuity between the minimum and maximum.

7. The attachment of claim 6, wherein the passive target is made of ferrous material and the shape to modulate an intensity of a magnetic field that is measurable by a magnetic sensor for use in estimating or measuring the angular position of the motor shaft.

8. The attachment of claim 6, wherein the shape of the passive target is configured to modulate an intensity of a light field that is measurable by an optical sensor for use in estimating or measuring the angular position of the motor shaft.

9. The attachment of claim 6, wherein the passive target has a spiral shape.

10. The attachment of claim 1, wherein the attachment has an axisymmetric shape, and when attached to the motor shaft, an axis of symmetry of the asymmetric shape corresponds to an axis of rotation of the motor shaft.

11. The attachment of claim 10, wherein the axisymmetric shape is circular or cylindrical.

12. The attachment of claim 1, wherein the mass is entirely embedded within the polymer subframe.

13. The attachment of claim 1, wherein the passive target is a separate element that is entirely embedded within the polymer subframe.

14. The attachment of claim 1, further comprising a memory element configured for wireless access to obtain information stored about the attachment.

15. The attachment of claim 14, wherein the memory element contains one or more of a serial number, manufacturing information about the attachment, or information about measured characteristics of the attachment.

16. The attachment of claim 14, wherein the information stored within the memory element is digitally signed for authenticity.

17. The attachment of claim 14, wherein the memory element is entirely embedded in the polymer material of the attachment.

18. The attachment of claim 1, wherein the attachment has a visible mark indicating a characteristic of the attachment.

19. The attachment of claim 1, wherein the attachment comprises a metal insert for attaching to the motor shaft.

20. A rotary vibration motor comprising:
    a motor shaft; and
    an attachment to the motor shaft for producing vibration when the motor shaft rotates at a non-zero angular velocity, the attachment including:
    a polymer subframe attached to the motor shaft, the polymer subframe having a selected shape to reduce aerodynamic drag or air resistance, which is a countervailing force or torque to changes in angular velocity, during rotation of the motor shaft;
    a mass comprising a metal material attached to the polymer subframe; and a passive target which varies circumferentially, the passive target being configured for use in measuring or estimating an angular position of the motor shaft;

wherein the mass is attached to the polymer subframe by one of overmolding or casting.

21. A rotary vibration motor, comprising:

a motor shaft; and an attachment affixed to the motor shaft, the attachment configured to produce vibration when the motor shaft rotates at a non-zero angular velocity, the attachment comprising:

a polymer subframe attached to the motor shaft, the polymer subframe having a selected shape to reduce aerodynamic drag or air resistance, which is a countervailing force or torque to changes in angular velocity, during rotation of the motor shaft;

a mass comprising a metal material attached to the polymer subframe; and at least one wireless sensor embedded in the attachment, the at least one wireless sensor being configured to measure or estimate an angular position of the shaft;

wherein the mass is attached to the polymer subframe upon machining, injection molding or 3D printing either the metal material or the polymer subframe.

* * * * *